US007185176B2

(12) United States Patent
Tanaka et al.

(10) Patent No.: US 7,185,176 B2
(45) Date of Patent: Feb. 27, 2007

(54) PROCESSOR EXECUTING SIMD INSTRUCTIONS

(75) Inventors: Tetsuya Tanaka, Soraku-gun (JP); Hazuki Okabayashi, Hirakata (JP); Taketo Heishi, Osaka (JP); Hajime Ogawa, Suita (JP); Yoshihiro Koga, Otokuni-gun (JP); Manabu Kuroda, Takarazuka (JP); Masato Suzuki, Shiga-gun (JP); Tokuzo Kiyohara, Osaka (JP); Takeshi Tanaka, Neyagawa (JP); Hideshi Nishida, Nishinomiya (JP); Shuji Miyasaka, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 529 days.

(21) Appl. No.: 10/449,788

(22) Filed: Jun. 2, 2003

(65) Prior Publication Data

US 2004/0078549 A1 Apr. 22, 2004

(30) Foreign Application Priority Data

Jun. 3, 2002 (JP) ............................ 2002-161381

(51) Int. Cl.
*G06F 15/80* (2006.01)

(52) U.S. Cl. ........................................................ 712/22

(58) Field of Classification Search .................... 712/4, 712/5, 6, 7, 13, 22

See application file for complete search history.

(56) References Cited

U.S. PATENT DOCUMENTS

| | | | | |
|---|---|---|---|---|
| 5,778,241 | A | 7/1998 | Bindloss et al. | 712/20 |
| 5,881,259 | A | 3/1999 | Glass et al. | |
| 5,963,744 | A * | 10/1999 | Slavenburg et al. | 712/9 |
| 5,991,531 | A * | 11/1999 | Song et al. | 703/26 |
| 6,141,675 | A | 10/2000 | Slavenburg et al. | |
| 6,154,831 | A * | 11/2000 | Thayer et al. | 712/208 |
| 6,530,010 | B1 * | 3/2003 | Hung et al. | 712/1 |
| 6,570,570 | B1 | 5/2003 | Suzuki et al. | |
| 6,753,866 | B2 | 6/2004 | Suzuki et al. | |
| 6,999,985 | B2 | 2/2006 | Symes et al. | |
| 7,043,627 | B2 | 5/2006 | Shimizu et al. | |
| 2002/0026570 | A1 | 2/2002 | Shimizu et al. | 712/225 |
| 2002/0040427 | A1 | 4/2002 | Symes | |
| 2002/0065860 | A1 | 5/2002 | Grisenthwaite et al. | |

FOREIGN PATENT DOCUMENTS

| | | |
|---|---|---|
| JP | 06-035695 | 2/1994 |
| JP | 10-512988 | 12/1998 |
| JP | 11-511575 | 10/1999 |
| JP | 11-513825 | 11/1999 |
| JP | 2000-20486 | 1/2000 |
| JP | 2000-047998 | 2/2000 |
| JP | 2000-057111 | 2/2000 |
| JP | 2001-501001 | 1/2001 |
| JP | 2001-142695 | 5/2001 |
| JP | 2002-132497 | 5/2002 |
| JP | 2002-149400 | 5/2002 |
| WO | 97/08608 | 3/1997 |
| WO | 97/15001 | 4/1997 |

OTHER PUBLICATIONS

Motorola MC68030 user guide 1989, Prentice Hall, 2d Ed pp. 3-32 to 3-33,3-108 to3-109.*

* cited by examiner

*Primary Examiner*—Eric Coleman
(74) *Attorney, Agent, or Firm*—Wenderoth, Lind & Ponack, L.L.P.

(57) ABSTRACT

A processor according to the present invention includes a decoding unit, an operation unit and others. When the decoding unit decodes an instruction "vxaddh Rc, Ra, Rb", an arithmetic and logic/comparison operation unit and others (i) adds the higher 16 bits of a register Ra to the lower 16 bits of the register Rb, stores the result in the higher 16 bits of a register Rc, and in parallel with this, (ii) adds the lower 16 bits of the register Ra to the higher 16 bits of the register Rb, and stores the result in the lower 16 bits of the register Rc.

25 Claims, 741 Drawing Sheets

| | | | | | | | | |
|---|---|---|---|---|---|---|---|---|
| Bit | 31 | 30 | 29 | 28 | 27 | 26 | 25 | 24 |
| Bit name | reserved | SWE | FXP | reserved | IH | EH | PL | |
| Bit | 23 | 22 | 21 | 20 | 19 | 18 | 17 | 16 |
| Bit name | FIE3 | FIE2 | FIE1 | FIE0 | reserved | reserved | AEE | IE |
| Bit | 15 | 14 | 13 | 12 | 11 | 10 | 9 | 8 |
| Bit name | Reserved | | | | | | | |
| Bit | 7 | 6 | 5 | 4 | 3 | 2 | 1 | 0 |
| Bit name | IM[7:0] | | | | | | | |

| | | | | | | | | |
|---|---|---|---|---|---|---|---|---|
| Bit | 31 | 30 | 29 | 28 | 27 | 26 | 25 | 24 |
| Bit name | ALN | | reserved | BPO | | | | |
| Bit | 23 | 22 | 21 | 20 | 19 | 18 | 17 | 16 |
| Bit name | reserved | | | | VC3 | VC2 | VC1 | VC0 |
| Bit | 15 | 14 | 13 | 12 | 11 | 10 | 9 | 8 |
| Bit name | reserved | | | | | | OVS | CAS |
| Bit | 7 | 6 | 5 | 4 | 3 | 2 | 1 | 0 |
| Bit name | C7 | C6 | C5 | C4 | C3 | C2 | C1 | C0 |

Fig. 21

| Category | SIMD | Size | Instruction | Operand | CFR | PSR | Typical behavior | Operation unit | 31 / 16 |
|---|---|---|---|---|---|---|---|---|---|
| ALU add system | SINGLE | Word | add | Rc,Ra,Rb<br>Rb,Ra,i12s<br>SP,i19s | | | | A | 32 |
| | | | | Ra2,Rb2<br>Rc3,Ra3,Rb3<br>Ra2,i05s<br>SP,i11s | | | | | 16 |
| | | | addu | Rb,GP,i16u<br>Rb,SP,i16u | | | | | 32 |
| | | | | Ra3,SP,i08u | | | | | 16 |
| | | | addc | Rc,Ra,Rb | W:cas,c0:c1 | | Addition with carry | | 32 |
| | | | addvw | Rc,Ra,Rb | W:ovs | | Addition with overflow | | |
| | | | adds | Rc,Ra,Rb | | | 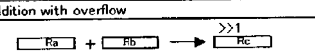 | | |
| | | | addsr | Rc,Ra,Rb | | | 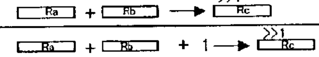 | | |
| | | | s1add | Rc,Ra,Rb | | | 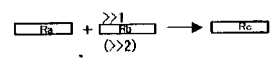 | | |
| | | | | Rc3,Ra3,Rb3 | | | | | 16 |
| | | | s2add | Rc,Ra,Rb | | | | | 32 |
| | | | | Rc3,Ra3,Rb3 | | | | | 16 |
| | | | addmsk | Rc,Ra,Rb | R:BP0 | | 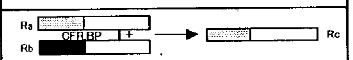 | | 32 |
| | | | addarvw | Rc,Ra,Rb | | | | | |
| | | Half word | faddvh | Rc,Ra,Rb | W:ovs | | | | |
| | SIMD | Half word | vaddh | Rc,Ra,Rb | | | 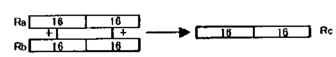 | | |
| | | | vaddhvh | Rc,Ra,Rb | W:ovs | | | | |
| | | | vsaddh | Rb,Ra,i08s | | | 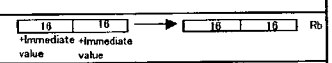 | | |
| | | | vaddsh | Rc,Ra,Rb | | | 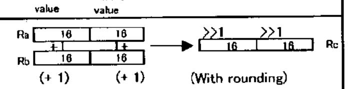 | | |
| | | | vaddsrh | Rc,Ra,Rb | | | | | |
| | | | vaddhvc<br>vaddrhvc | Rc,Ra,Rb<br>Rc,Ra,Rb | R:VC | | | | |
| | | | vxaddh | Rc,Ra,Rb | | | 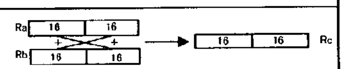 | | |
| | | | vxaddhvh | Rc,Ra,Rb | W:ovs | | | | |
| | | | vhaddh | Rc,Ra,Rb | | | 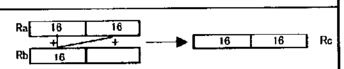 | | |
| | | | vhaddhvh | Rc,Ra,Rb | W:ovs | | | | |
| | | | vladdh | Rc,Ra,Rb | | | 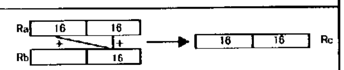 | | |
| | | | vladdhvh | Rc,Ra,Rb | W:ovs | | | | |
| | | Byte | vaddb | Rc,Ra,Rb | | | 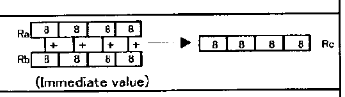 | | |
| | | | vsaddb | Rb,Ra,i08s | | | | | |
| | | | vaddsb | Rc,Ra,Rb | | | 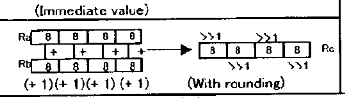 | | |
| | | | vaddsrb | Rc,Ra,Rb | | | | | |

Fig. 22

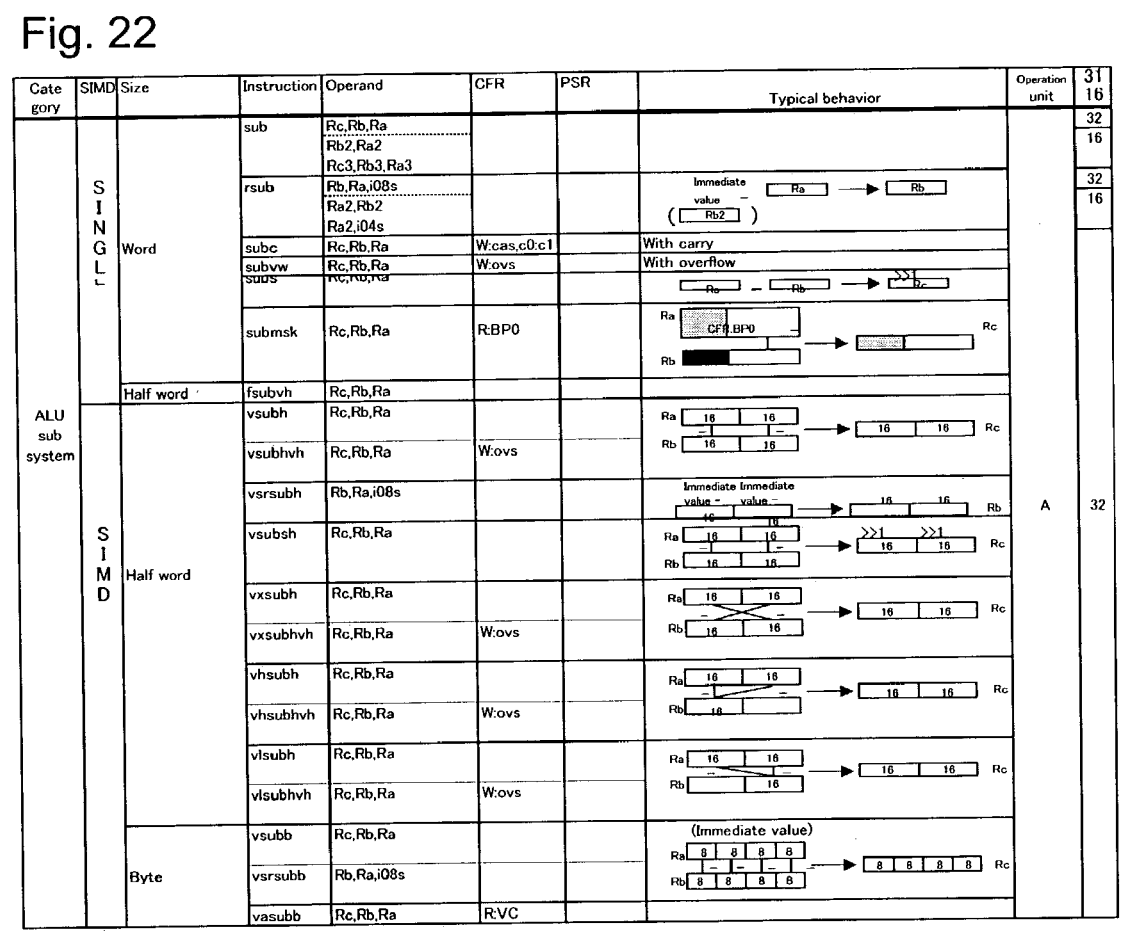

| Category | SIMD | Size | Instruction | Operand | CFR | PSR | Typical behavior | Operation unit | 31<br>16 |
|---|---|---|---|---|---|---|---|---|---|
| ALU sub system | SINGLE | Word | sub | Rc,Rb,Ra<br>Rb2,Ra2<br>Rc3,Rb3,Ra3 | | | | A | 32<br>16 |
| | | | rsub | Rb,Ra,i08s<br>Ra2,Rb2<br>Ra2,i04s | | | Immediate value − Ra → Rb<br>( Rb2 ) | | 32<br>16 |
| | | | subc | Rc,Rb,Ra | W:cas,c0:c1 | | With carry | | 32 |
| | | | subvw | Rc,Rb,Ra | W:ovs | | With overflow | | |
| | | | subs | Rc,Rb,Ra | | | Ra − Rb → >>1 Rc | | |
| | | | submsk | Rc,Rb,Ra | R:BP0 | | Ra CFR.BP0 − Rb → Rc | | |
| | | Half word | fsubvh | Rc,Rb,Ra | | | | | |
| | SIMD | Half word | vsubh | Rc,Rb,Ra | | | Ra 16 16 − Rb 16 16 → 16 16 Rc | | |
| | | | vsubhvh | Rc,Rb,Ra | W:ovs | | | | |
| | | | vsrsubh | Rb,Ra,i08s | | | Immediate value − 16, Immediate value − 16 → 16 16 Rb | | |
| | | | vsubsh | Rc,Rb,Ra | | | Ra 16 16 − Rb 16 16 → >>1 16 >>1 16 Rc | | |
| | | | vxsubh | Rc,Rb,Ra | | | Ra 16 16 − Rb 16 16 (crossed) → 16 16 Rc | | |
| | | | vxsubhvh | Rc,Rb,Ra | W:ovs | | | | |
| | | | vhsubh | Rc,Rb,Ra | | | Ra 16 16 − Rb 16 → 16 16 Rc | | |
| | | | vhsubhvh | Rc,Rb,Ra | W:ovs | | | | |
| | | | vlsubh | Rc,Rb,Ra | | | Ra 16 16 − Rb 16 → 16 16 Rc | | |
| | | | vlsubhvh | Rc,Rb,Ra | W:ovs | | | | |
| | | Byte | vsubb | Rc,Rb,Ra | | | (Immediate value)<br>Ra 8 8 8 8 − Rb 8 8 8 8 → 8 8 8 8 Rc | | |
| | | | vsrsubb | Rb,Ra,i08s | | | | | |
| | | | vasubb | Rc,Rb,Ra | R:VC | | | | |

Fig. 23

| Category | SIMD | Size | Instruction | Operand | CFR | PSR | Typical behavior | Operation unit | 31 16 |
|---|---|---|---|---|---|---|---|---|---|
| ALU logic system | SINGLE | Word | and | Rc,Ra,Rb | | | AND | A | 32 |
| | | | | Rb,Ra,i08u | | | | | |
| | | | | Ra2,Rb2 | | | | | 16 |
| | | | andn | Rc,Ra,Rb | | | | | 32 |
| | | | | Rb,Ra,i08u | | | | | |
| | | | | Ra2,Rb2 | | | | | 16 |
| | | | or | Rc,Ra,Rb | | | OR | | 32 |
| | | | | Rb,Ra,i08u | | | | | |
| | | | | Ra2,Rb2 | | | | | 16 |
| | | | xor | Rc,Ra,Rb | | | Exclusive OR | | 32 |
| | | | | Rb,Ra,i08u | | | | | |
| | | | | Ra2,Rb2 | | | | | 16 |
| ALU mov system | SINGLE | Word | mov | Rb,Reg32 | | | Reg32 = TAR LR SVR PSR CFR MH0 MH1 ML0 ML1 EPSR IPC IPSR PC EPC PSR0 PSR1 PSR2 PSR3 CFR0 CFR1 CFR2 CFR3 | A | 32 |
| | | | | Reg32,Rb | | | Reg16 = TAR LR MH0 MH1 | | |
| | | | | Rb2,Reg16 | | | | | 16 |
| | | | | Reg16,Rb2 | | | | | |
| | | | | Ra2,Rb | | | | | |
| | | | | Ra,i16s | | | | | 32 |
| | | | | Ra2,i08s | | | | | 16 |
| | | | movp | Rc:Rc+1,Ra,Rb | | | Rc<-Ra; Rc+1<-Rb; | | 32 |
| | | | movcf | Ck,Cj,Cm,Cn | | | Ci<-Cj; Cm<-Cn; | | |
| | | | mvclovs | Cm:Cm+1 | W:ovs | | Cm:Cm+1<-CFR.OVS:~CFR.OVS; CFR.OVS<-0; | | 16 |
| | | | mvclcas | Cm:Cm+1 | W:cas | | Cm:Cm+1<-CFR.CAS:~CFR.CAS; CFR.CAS<-0; | | |
| | | | sethi | Ra,i16s | | | | | 32 |
| ALU max min system | SINGLE | Word | max | Rc,Ra,Rb | W:c0:c1 | | Rc <- max(Ra,Rb) | A | 32 |
| | | | min | Rc,Ra,Rb | W:c0:c1 | | Rc <- min(Ra,Rb) | | |
| | SIMD | Half word | vmaxh | Rc,Ra,Rb | | | | | |
| | | | vminh | Rc,Ra,Rb | | | | | |
| | | Byte | vmaxb | Rc,Ra,Rb | | | | | |
| | | | vminb | Rc,Ra,Rb | | | | | |
| ALU abs system | SINGLE | | abs | Rb,Ra | | | Absolute value | A | 32 |
| | | | absvw | Rb,Ra | W:ovs | | With overflow | | |
| | | | fabsvh | Rb,Ra | W:ovs | | | | |
| | SIMD | Half word | vabshvh | Rb,Ra | W:ovs | | | | |
| ALU neg system | SINGLE | Word | negvw | Rb,Ra | W:ovs | | | A | 32 |
| | | Half word | fnegvh | Rb,Ra | W:ovs | | | | |
| | SIMD | | vneghvh | Rb,Ra | W:ovs | | | | |
| ALU sum system | SIMD | Half word | vsumh | Rb,Ra | | | 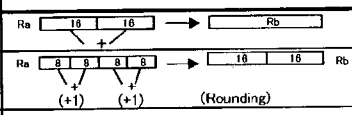 | A | 32 |
| | | | vsumh2 | Rb,Ra | | | | A | |
| | | | vsumrh2 | Rb,Ra | | | (Rounding) | | |
| | | Byte | vabssumb | Rc,Ra,Rb | | | | C | |
| ALU other | SINGLE | | frndvh | Rb,Ra | W:ovs | | Rounding | C | 32 |
| | SIMD | | vfrndvh | Rb,Mn | W:ovs | | | | |
| | | | vsel | Rc,Ra,Rb | R:VC | | | A | |
| | | | vsgnh | Rb,Ra | | | | C | |

Fig. 24

| Cate gory | SIMD | Size | Instruction | Operand | CFR | PSR | Typical behavior | Operation unit | 31<br>16 |
|---|---|---|---|---|---|---|---|---|---|
| CMP | SINGLE | | cmpCCn | Cm,Ra,Rb,Cn<br>Cm,Ra,i05s,Cn<br>Cm:Cm+1,Ra,Rb,Cn<br>Cm:Cm+1,Ra,i05s,Cn | W:CF | | CC = eq, ne, gt, ge, gtu, geu, le, lt, leu, leu<br>Cm <- result & Cn;<br>(Cm+1 <- ~result & Cn;) | A | 32 |
| | | | cmpCCa | Cm:Cm+1,Ra,Rb,Cn<br>Cm:Cm+1,Ra,i05s,Cn | W:CF | | Cm <- result & Cn;<br>Cm+1 <- ~(result & Cn); | | |
| | | | cmpCCo | Cm:Cm+1,Ra,Rb,Cn<br>Cm:Cm+1,Ra,i05s,Cn | W:CF | | Cm <- result \| Cn;<br>Cm+1 <- ~(result \| Cn); | | |
| | | | cmpCC | C6,Ra2,Rb2<br>C6,Ra2,i04s | W:CF | | CC = eq, ne, gt, ge, le, lt<br>C6 <- result | | 16 |
| | | | tstzn | Cm,Ra,Rb,Cn<br>Cm,Ra,i05u,Cn<br>Cm:Cm+1,Ra,Rb,Cn<br>Cm:Cm+1,Ra,i05u,Cn | W:CF | | Cm <- (Ra & Rb == 0) & Cn;<br>(Cm+1 <- ~(Ra & Rb ==0) & Cn;) | | 32 |
| | | | tstza | Cm:Cm+1,Ra,Rb,Cn<br>Cm:Cm+1,Ra,i05u,Cn | W:CF | | Cm <- (Ra & Rb == 0) & Cn;<br>Cm+1 <- ~((Ra & Rb == 0) & Cn); | | |
| | | | tstzo | Cm:Cm+1,Ra,Rb,Cn<br>Cm:Cm+1,Ra,i05u,Cn | W:CF | | Cm <- (Ra & Rb == 0) \| Cn;<br>Cm+1 <- ~((Ra & Rb == 0) \| Cn); | | |
| | | | tstnn | Cm,Ra,Rb,Cn<br>Cm,Ra,i05u,Cn<br>Cm:Cm+1,Ra,Rb,Cn<br>Cm:Cm+1,Ra,i05u,Cn | W:CF | | Cm <- (Ra & Rb != 0) & Cn;<br>(Cm+1 <- ~(Ra & Rb != 0) & Cn;) | | |
| | | | tstna | Cm:Cm+1,Ra,Rb,Cn<br>Cm:Cm+1,Ra,i05u,Cn | W:CF | | Cm <- (Ra & Rb != 0) & Cn;<br>Cm+1 <- ~((Ra & Rb != 0) & Cn); | | |
| | | | tstno | Cm:Cm+1,Ra,Rb,Cn<br>Cm:Cm+1,Ra,i05u,Cn | W:CF | | Cm <- (Ra & Rb != 0) \| Cn;<br>Cm+1 <- ~((Ra & Rb != 0) \| Cn); | | |
| | | | tstz | C6,Ra2,Rb2<br>C6,Ra2,i04u | W:CF | | C6 <- (Ra2&Rb2 == 0 ) | | 16 |
| | | | tstn | C6,Ra2,Rb2<br>C6,Ra2,i04u | W:CF | | C6 <- (Ra2&Rb2 != 0 ) | | |
| | SIMD | Half word | vcmpCCh<br>vscmpCCh | Ra,Rb<br>Ra,i05s | W:CF | | CC = eq, ne, gt, le, ge, lt | | 32 |
| | | Byte | vcmpCCb<br>vscmpCCb | Ra,Rb<br>Ra,i05s | W:CF | | CC = eq, ne, gt, le ge, lt | | |

Fig. 25

| Category | SIMD | Size | Instruction | Operand | CFR | PSR | Typical behavior | Operation unit | 31 16 |
|---|---|---|---|---|---|---|---|---|---|
| mul system | SINGLE | Word × Word | mul | Mm,Rc,Ra,Rb<br>Mm,Rb,Ra,i08s | | | 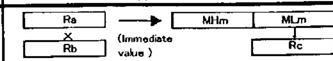 | X2 | 32 |
| | | | mulu | Mm,Rc,Ra,Rb<br>Mm,Rb,Ra,i08s | | | Unsigned multiplication | | |
| | | | fmulww | Mm,Rc,Ra,Rb | | fxp | Fixed point operation | | |
| | | Word × Half word | hmul<br>lmul | Mm,Rc,Ra,Rb<br>Mm,Rc,Ra,Rb | | | 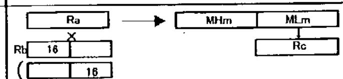 | X1 | |
| | | | fmulhww | Mm,Rc,Ra,Rb | | fxp | 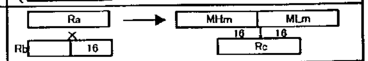 | | |
| | | Half word × Half word | fmulhw | Mm,Rc,Ra,Rb | | fxp | 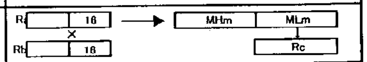 | | |
| | | | fmulhh<br>fmulhhr | Mm,Rc,Ra,Rb<br>Mm,Rc,Ra,Rb | | fxp<br>fxp | 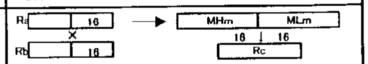<br>With rounding | | |
| | SIMD | HALF WORD × HALF WORD | vmul | Mm,Rc,Ra,Rb | | | 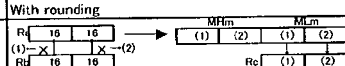 | X2 | |
| | | | vfmulw | Mm,Rc,Ra,Rb | | fxp | 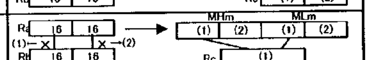 | | |
| | | | vfmulh<br>vfmulhr | Mm,Rc,Ra,Rb<br>Mm,Rc,Ra,Rb | | fxp<br>fxp | 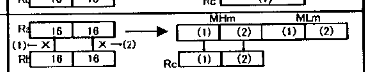<br>With rounding | | |
| | | | vxmul | Mm,Rc,Ra,Rb | | | 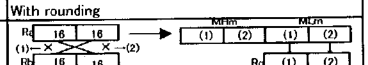 | | |
| | | | vxfmulw | Mm,Rc,Ra,Rb | | fxp | 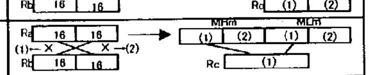 | | |
| | | | vxfmulh<br>vxfmulhr | Mm,Rc,Ra,Rb<br>Mm,Rc,Ra,Rb | | fxp<br>fxp | 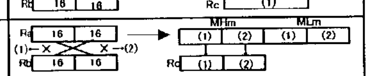<br>With rounding | | |
| | | | vhmul | Mm,Rc,Ra,Rb | | | 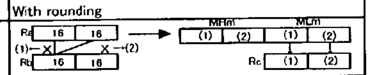 | | |
| | | | vhfmulw | Mm,Rc,Ra,Rb | | fxp | 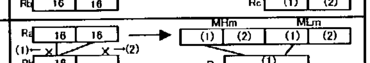 | | |
| | | | vhfmulh<br>vhfmulhr | Mm,Rc,Ra,Rb<br>Mm,Rc,Ra,Rb | | fxp<br>fxp | 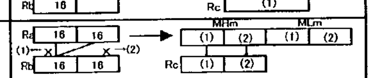<br>With rounding | | |
| | | | vlmul | Mm,Rc,Ra,Rb | | | 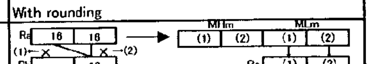 | | |
| | | | vlfmulw | Mm,Rc,Ra,Rb | | fxp | 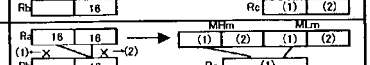 | | |
| | | | vlfmulh<br>vlfmulhr | Mm,Rc,Ra,Rb<br>Mm,Rc,Ra,Rb | | fxp<br>fxp | 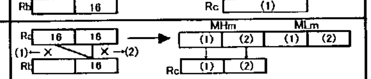<br>With rounding | | |
| | | Word × Half word | vpfmulhww | Mm,Rc:Rc+1,Ra,Rb<br>Mm,Rc:Rc+1,Ra,Rb | | fxp<br>fxp | | | |

Fig. 26

| Category | SIMD | Size | Instruction | Operand | CFR | PSR | Typical behavior | Operation unit | 31 16 |
|---|---|---|---|---|---|---|---|---|---|
| mac system | SINGLE | Word × Word | mac | Mm,Rc,Ra,Rb,Mn<br>M0,Rc,Ra,Rb,Rx | | | Sum of products operation using mul | X2 | 32 |
| | | | fmacww | Mm,Rc,Ra,Rb,Mn<br>M0,Rc,Ra,Rb,Rx | | fxp | Sum of products operation using fmulww | | |
| | | Word × Half word | hmac | Mm,Rc,Ra,Rb,Mn<br>M0,Rc,Ra,Rb,Rx | | | Sum of products operation using hmul | X1 | 16 |
| | | | lmac | Mm,Rc,Ra,Rb,Mn<br>M0,Rc,Ra,Rb,Rx | | | Sum of products operation using lmul | | 32 |
| | | | fmachww | Mm,Rc,Ra,Rb,Mn<br>M0,Rc,Ra,Rb,Rx | | fxp | Sum of products operation using fmulhww | | 16 |
| | | Half word × Half word | fmachw | Mm,Rc,Ra,Rb,Mn<br>M0,Rc,Ra,Rb,Rx | | fxp | Sum of products operation using fmulhw | | 32 |
| | | | fmachh | Mm,Rc,Ra,Rb,Mn<br>M0,Rc,Ra,Rb,Rx | | fxp | Sum of products operation using fmulhh | | |
| | | | fmachhr | Mm,Rc,Ra,Rb,Mn<br>M0,Rc,Ra,Rb,Rx | | fxp | With rounding | | |
| | SIMD | HALF WORD × HALF WORD | vmac | Mm,Rc,Ra,Rb,Mn<br>M0,Rc,Ra,Rb,Rx | | | Sum of products operation using vmul | X2 | 16 |
| | | | vfmacw | Mm,Rc,Ra,Rb,Mn | | fxp | Sum of products operation using vfmulw | | 32<br>16 |
| | | | vxmac | Mm,Rc,Ra,Rb,Mn<br>M0,Rc,Ra,Rb,Rx | | | Sum of products operation using vxmul | | 32 |
| | | | vxfmacw | Mm,Rc,Ra,Rb,Mn | | fxp | Sum of products operation using vxfmulw | | |
| | | | vxfmach | Mm,Rc,Ra,Rb,Mn<br>M0,Rc,Ra,Rb,Rx | | fxp | Sum of products operation using vxfmulh | | |
| | | | vxfmachr | Mm,Rc,Ra,Rb,Mn<br>M0,Rc,Ra,Rb,Rx | | fxp | With rounding | | |
| | | | vhmac | Mm,Rc,Ra,Rb,Mn<br>M0,Rc,Ra,Rb,Rx | | | Sum of products operation using vhmul | | |
| | | | vhfmacw | Mm,Rc,Ra,Rb,Mn | | fxp | Sum of products operation using vhfmulw | | |
| | | | vhfmach | Mm,Rc,Ra,Rb,Mn<br>M0,Rc,Ra,Rb,Rx | | fxp | Sum of products operation using vhfmulh | | |
| | | | vhfmachr | Mm,Rc,Ra,Rb,Mn<br>M0,Rc,Ra,Rb,Rx | | | | | |
| | | | vlmac | Mm,Rc,Ra,Rb,Mn<br>M0,Rc,Ra,Rb,Rx | | | Sum of products operation using vlmul | | |
| | | | vlfmacw | Mm,Rc,Ra,Rb,Mn | | fxp | Sum of products operation using vlfmulw | | |
| | | | vfmach | Mm,Rc,Ra,Rb,Mn<br>M0,Rc,Ra,Rb,Rx | | fxp | Sum of products operation using vfmulh | | |
| | | | vfmachr | Mm,Rc,Ra,Rb,Mn<br>M0,Rc,Ra,Rb,Rx | | fxp | With rounding | | |
| | | | vlfmach | Mm,Rc,Ra,Rb,Mn<br>Mm,Rc,Ra,Rb,Mn | | fxp | Sum of products operation using vlfmulh | | |
| | | | vlfmachr | Mm,Rc,Ra,Rb,Mn<br>M0,Rc,Ra,Rb,Rx | | fxp | With rounding | | |
| | | Word × Half word | vpfmachww | Mm,Rc:Rc+1,Ra,Rb,Mn | | fxp | | | |

Fig. 27

| Category | SIMD | Size | Instruction | Operand | CFR | PSR | Typical behavior | Operation unit | 31 16 |
|---|---|---|---|---|---|---|---|---|---|
| msu system | SINGLE | Word × Word | msu | Mm,Rc,Ra,Rb,Mn<br>M0,Rc,Ra,Rb,Rx | | | Difference of products operation using mul | X2 | 32 |
| | | | fmsuww | Mm,Rc,Ra,Rb,Mn<br>M0,Rc,Ra,Rb,Rx | | fxp | Difference of products operation using fmulww | | |
| | | Word × Half word | hmsu | Mm,Rc,Ra,Rb,Mn<br>M0,Rc,Ra,Rb,Rx | | | Difference of products operation using hmul | X1 | |
| | | | lmsu | Mm,Rc,Ra,Rb,Mn<br>M0,Rc,Ra,Rb,Rx | | | Difference of products operation using lmul | | |
| | | | fmsuhww | Mm,Rc,Ra,Rb,Mn<br>M0,Rc,Ra,Rb,Rx | | fxp | Difference of products operation using fmulhww | | |
| | | Half word × Half word | fmsuhw | Mm,Rc,Ra,Rb,Mn<br>M0,Rc,Ra,Rb,Rx | | fxp | Difference of products operation using fmulhw | | |
| | | | fmsuhh | Mm,Rc,Ra,Rb,Mn<br>M0,Rc,Ra,Rb,Rx | | fxp | Difference of products operation using fmulhh | | |
| | | | fmsuhhr | Mm,Rc,Ra,Rb,Mn<br>M0,Rc,Ra,Rb,Rx | | fxp | With rounding | | |
| | | HALF WORD × HALF WORD | vmsu | Mm,Rc,Ra,Rb,Mn<br>M0,Rc,Ra,Rb,Rx | | | Difference of products operation using vmul | X2 | |
| | | | vfmsuw | Mm,Rc,Ra,Rb,Mn | | fxp | Difference of products operation using vfmul | | |
| | | | vfmsuh | Mm,Rc,Ra,Rb,Mn<br>M0,Rc,Ra,Rb,Rx | | fxp | Difference of products operation using vfmulh | | |
| | | | vxmsu | Mm,Rc,Ra,Rb,Mn<br>M0,Rc,Ra,Rb,Rx | | | Difference of products operation using vxmul | | |
| | | | vxfmsuw | Mm,Rc,Ra,Rb,Mn | | fxp | Difference of products operation using vxfmulw | | |
| | | | vxfmsuh | Mm,Rc,Ra,Rb,Mn<br>M0,Rc,Ra,Rb,Rx | | fxp | Difference of products operation using vxfmulh | | |
| | | | vhmsu | Mm,Rc,Ra,Rb,Mn<br>M0,Rc,Ra,Rb,Rx | | | Difference of products operation using vhmul | | |
| | | | vhfmsuw | Mm,Rc,Ra,Rb,Mn | | fxp | Difference of products operation using vhfmulw | | |
| | | | vhfmsuh | Mm,Rc,Ra,Rb,Mn<br>M0,Rc,Ra,Rb,Rx | | fxp | Difference of products operation using vhfmulh | | |
| | | | vlmsu | Mm,Rc,Ra,Rb,Mn<br>M0,Rc,Ra,Rb,Rx | | | Difference of products operation using vlmul | | |
| | | | vlfmsuw | Mm,Rc,Ra,Rb,Mn | | fxp | Difference of products operation using vlfmulw | | |
| | | | vlfmsuh | Mm,Rc,Ra,Rb,Mn<br>M0,Rc,Ra,Rb,Rx | | fxp | Difference of products operation using vlfmulh | | |

Fig. 28

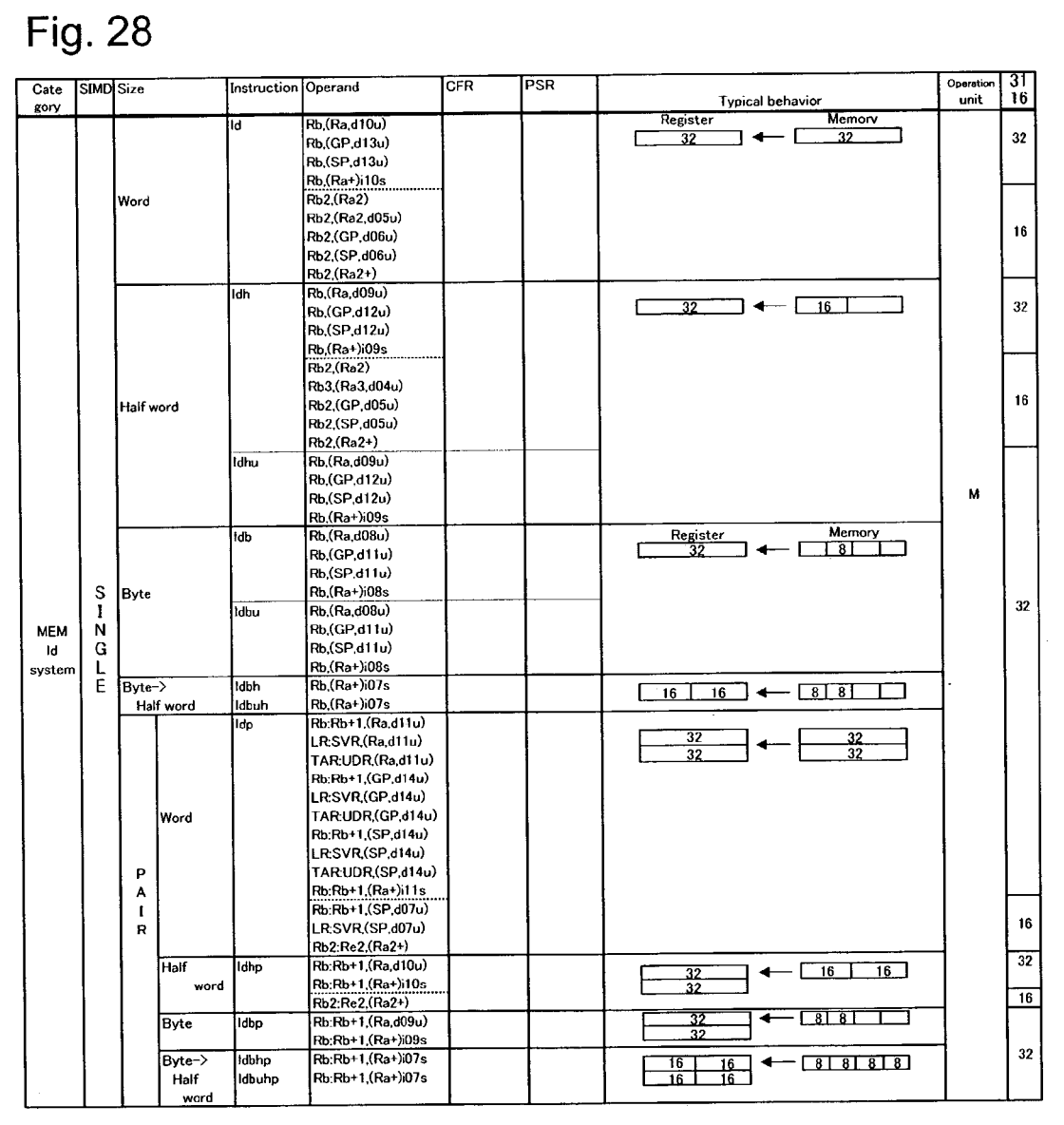

| Cate gory | SIMD | Size | Instruction | Operand | CFR | PSR | Typical behavior | Operation unit | 31<br>16 |
|---|---|---|---|---|---|---|---|---|---|
| MEM<br>ld<br>system | SINGLE | Word | ld | Rb,(Ra,d10u)<br>Rb,(GP,d13u)<br>Rb,(SP,d13u)<br>Rb,(Ra+)i10s | | | Register [32] ← Memory [32] | M | 32 |
| | | | | Rb2,(Ra2)<br>Rb2,(Ra2,d05u)<br>Rb2,(GP,d06u)<br>Rb2,(SP,d06u)<br>Rb2,(Ra2+) | | | | | 16 |
| | | Half word | ldh | Rb,(Ra,d09u)<br>Rb,(GP,d12u)<br>Rb,(SP,d12u)<br>Rb,(Ra+)i09s | | | [32] ← [16 \| ] | | 32 |
| | | | | Rb2,(Ra2)<br>Rb3,(Ra3,d04u)<br>Rb2,(GP,d05u)<br>Rb2,(SP,d05u)<br>Rb2,(Ra2+) | | | | | 16 |
| | | | ldhu | Rb,(Ra,d09u)<br>Rb,(GP,d12u)<br>Rb,(SP,d12u)<br>Rb,(Ra+)i09s | | | | | 32 |
| | | Byte | ldb | Rb,(Ra,d08u)<br>Rb,(GP,d11u)<br>Rb,(SP,d11u)<br>Rb,(Ra+)i08s | | | Register [32] ← Memory [8 \| \| \| ] | | |
| | | | ldbu | Rb,(Ra,d08u)<br>Rb,(GP,d11u)<br>Rb,(SP,d11u)<br>Rb,(Ra+)i08s | | | | | |
| | | Byte-> Half word | ldbh<br>ldbuh | Rb,(Ra+)i07s<br>Rb,(Ra+)i07s | | | [16 \| 16] ← [8 \| 8 \| \| ] | | |
| | PAIR | Word | ldp | Rb:Rb+1,(Ra,d11u)<br>LR:SVR,(Ra,d11u)<br>TAR:UDR,(Ra,d11u)<br>Rb:Rb+1,(GP,d14u)<br>LR:SVR,(GP,d14u)<br>TAR:UDR,(GP,d14u)<br>Rb:Rb+1,(SP,d14u)<br>LR:SVR,(SP,d14u)<br>TAR:UDR,(SP,d14u)<br>Rb:Rb+1,(Ra+)i11s | | | [32 / 32] ← [32 / 32] | | |
| | | | | Rb:Rb+1,(SP,d07u)<br>LR:SVR,(SP,d07u)<br>Rb2:Re2,(Ra2+) | | | | | 16 |
| | | Half word | ldhp | Rb:Rb+1,(Ra,d10u)<br>Rb:Rb+1,(Ra+)i10s | | | [32 / 32] ← [16 \| 16] | | 32 |
| | | | | Rb2:Re2,(Ra2+) | | | | | 16 |
| | | Byte | ldbp | Rb:Rb+1,(Ra,d09u)<br>Rb:Rb+1,(Ra+)i09s | | | [32 / 32] ← [8 \| 8 \| \| ] | | 32 |
| | | Byte-> Half word | ldbhp<br>ldbuhp | Rb:Rb+1,(Ra+)i07s<br>Rb:Rb+1,(Ra+)i07s | | | [16 \| 16 / 16 \| 16] ← [8 \| 8 \| 8 \| 8] | | |

Fig. 29

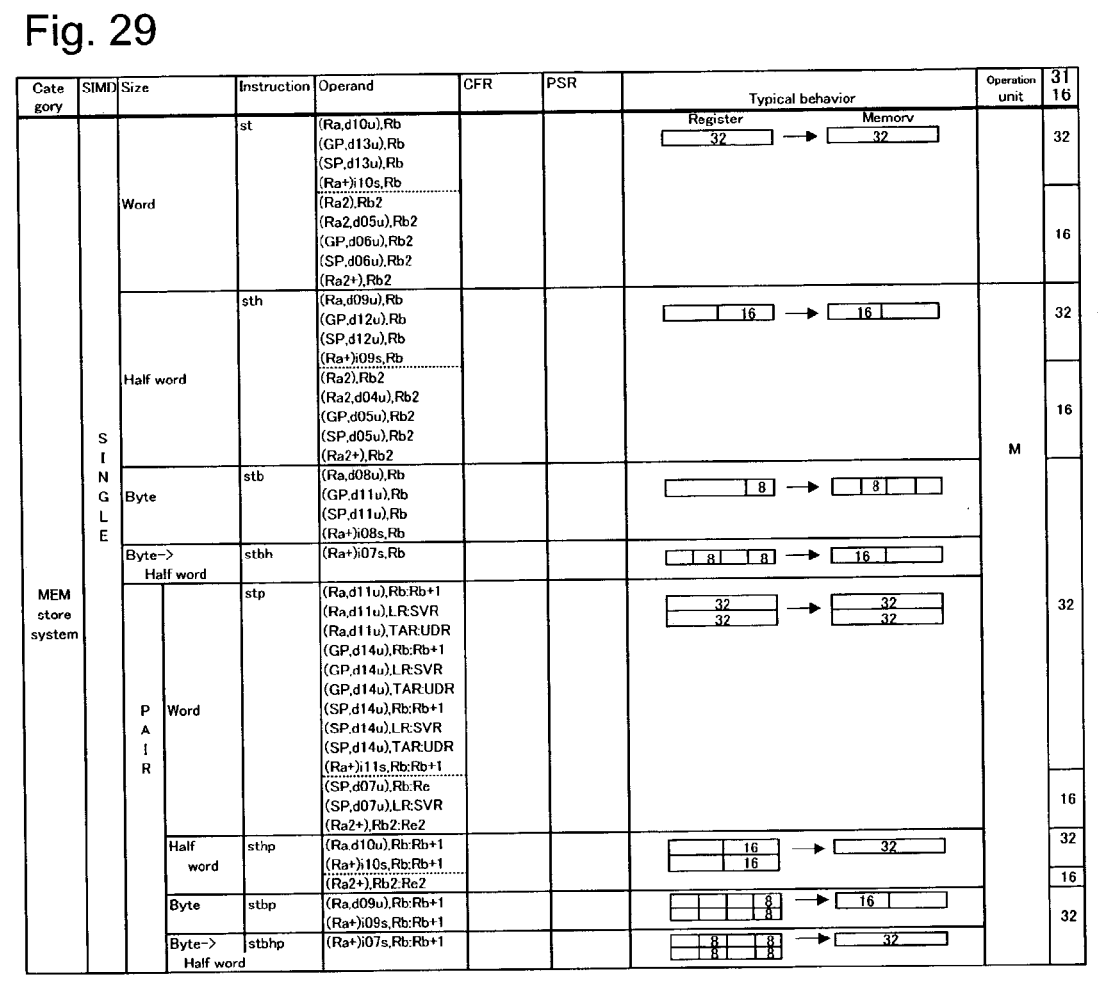

| Category | SIMD | Size | | Instruction | Operand | CFR | PSR | Typical behavior (Register → Memory) | Operation unit | 31 / 16 |
|---|---|---|---|---|---|---|---|---|---|---|
| MEM store system | SINGLE | Word | | st | (Ra,d10u),Rb<br>(GP,d13u),Rb<br>(SP,d13u),Rb<br>(Ra+)i10s,Rb | | | 32 → 32 | M | 32 |
| | | | | | (Ra2),Rb2<br>(Ra2,d05u),Rb2<br>(GP,d06u),Rb2<br>(SP,d06u),Rb2<br>(Ra2+),Rb2 | | | | | 16 |
| | | Half word | | sth | (Ra,d09u),Rb<br>(GP,d12u),Rb<br>(SP,d12u),Rb<br>(Ra+)i09s,Rb | | | 16 → 16 | | 32 |
| | | | | | (Ra2),Rb2<br>(Ra2,d04u),Rb2<br>(GP,d05u),Rb2<br>(SP,d05u),Rb2<br>(Ra2+),Rb2 | | | | | 16 |
| | | Byte | | stb | (Ra,d08u),Rb<br>(GP,d11u),Rb<br>(SP,d11u),Rb<br>(Ra+)i08s,Rb | | | 8 → 8 | | 32 |
| | | Byte-> Half word | | stbh | (Ra+)i07s,Rb | | | 8, 8 → 16 | | |
| | PAIR | | Word | stp | (Ra,d11u),Rb:Rb+1<br>(Ra,d11u),LR:SVR<br>(Ra,d11u),TAR:UDR<br>(GP,d14u),Rb:Rb+1<br>(GP,d14u),LR:SVR<br>(GP,d14u),TAR:UDR<br>(SP,d14u),Rb:Rb+1<br>(SP,d14u),LR:SVR<br>(SP,d14u),TAR:UDR<br>(Ra+)i11s,Rb:Rb+1 | | | 32, 32 → 32, 32 | | |
| | | | | | (SP,d07u),Rb:Re<br>(SP,d07u),LR:SVR<br>(Ra2+),Rb2:Re2 | | | | | 16 |
| | | | Half word | sthp | (Ra,d10u),Rb:Rb+1<br>(Ra+)i10s,Rb:Rb+1 | | | 16, 16 → 32 | | 32 |
| | | | | | (Ra2+),Rb2:Re2 | | | | | 16 |
| | | | Byte | stbp | (Ra,d09u),Rb:Rb+1<br>(Ra+)i09s,Rb:Rb+1 | | | 8, 8 → 16 | | 32 |
| | | | Byte-> Half word | stbhp | (Ra+)i07s,Rb:Rb+1 | | | 8, 8, 8, 8 → 32 | | |

Fig. 30

| Category | SIMD | Size | Instruction | Operand | CFR | PSR | Typical behavior | Operation unit | 31 16 |
|---|---|---|---|---|---|---|---|---|---|
| BRA | | | setlr | d09s | | | Set LR | B | 32 |
| | | | | C5,d09s | | | Store instruction fetched from LR in branch buffer | | |
| | | | settar | d09s | | | Set TAR | | |
| | | | | C6,d09s | W:c6 | | Store instruction fetched from TAR in branch buffer | | |
| | | | | C6,C2:C4,d09s | W:c2:c4,c6 | | | | |
| | | | | C6,Cm,d09s | W:c6,cm | | | | |
| | | | | C6,C4,d09s | W:c6 | | | | |
| | | | setbb | LR | | | Store instruction fetched from LR in branch buffer | | 16 |
| | | | | TAR | | | Store instruction fetched from TAE in branch buffer | | |
| | | | jloop | C5,LR,Ra,i08s | W:c5 | | Only predicate [c5] | | 32 |
| | | | | C6,TAR,Ra,i08s | W:c6 | | Only predicate [c6] | | |
| | | | | C6,C2:C4,TAR,Ra,i08s | W:c2:c4,c6 | | | | |
| | | | | C6,Cm,TAR,Ra,i08s | W:c6,cm | | | | |
| | | | | C6,TAR,Ra2 | W:c6 | | | | 16 |
| | | | | C6,C2:C4,TAR,Ra2 | W:c2:c4,c6 | | | | |
| | | | | C6,Cm,TAR,Ra2 | W:c6 | | | | |
| | | | jmp | TAR | | | | | |
| | | | | LR | | | | | |
| | | | jmpl | TAR | R:CF | | | | |
| | | | | LR | | | | | |
| | | | jmpf | TAR | | | | | |
| | | | | LR | | | | | |
| | | | | Cm,TAR | | | | | |
| | | | | C6,C2:C4,TAR | | | | | |
| | | | jmpr | LR | | | | | |
| | | | br | d20s | | | | | 32 |
| | | | | d09s | | | Only predicates [c6][c7] | | 16 |
| | | | brl | d20s | R:CF | | | | 32 |
| | | | | d09s | | | | | 16 |
| | | | rti | | | W:PSR<br>R:eh | | | |

Fig. 31

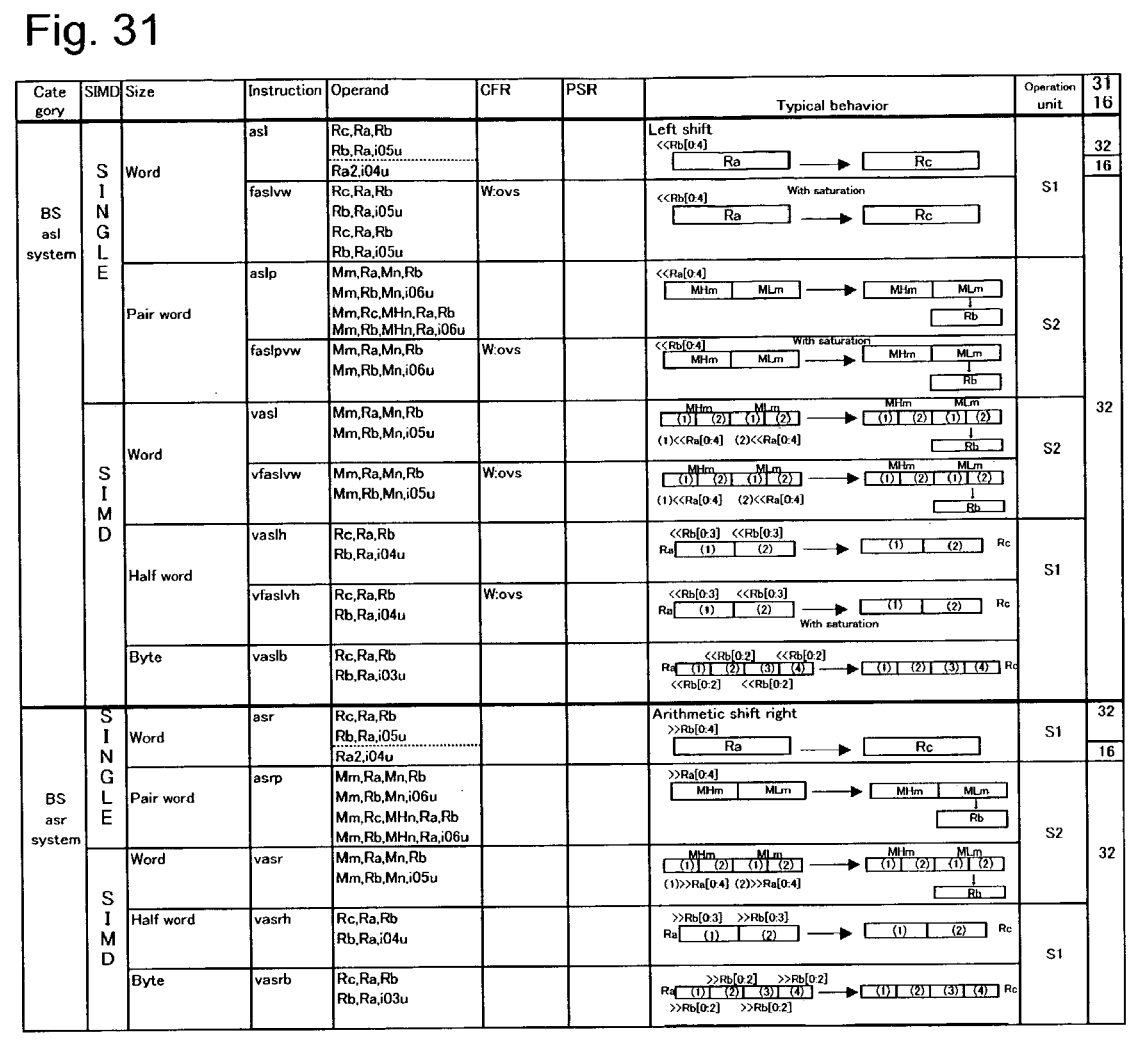

| Category | SIMD | Size | Instruction | Operand | CFR | PSR | Typical behavior | Operation unit | 31 / 16 |
|---|---|---|---|---|---|---|---|---|---|
| BS asl system | SINGLE | Word | asl | Rc,Ra,Rb<br>Rb,Ra,i05u<br>Ra2,i04u | | | Left shift<br><<Rb[0:4]<br>Ra → Rc | S1 | 32<br>16 |
| | | | faslvw | Rc,Ra,Rb<br>Rb,Ra,i05u<br>Rc,Ra,Rb<br>Rb,Ra,i05u | W:ovs | | <<Rb[0:4] With saturation<br>Ra → Rc | | 32 |
| | | Pair word | aslp | Mm,Ra,Mn,Rb<br>Mm,Rb,Mn,i06u<br>Mm,Rc,MHn,Ra,Rb<br>Mm,Rb,MHn,Ra,i06u | | | <<Ra[0:4]<br>MHm MLm → MHm MLm<br>Rb | S2 | |
| | | | faslpvw | Mm,Ra,Mn,Rb<br>Mm,Rb,Mn,i06u | W:ovs | | <<Rb[0:4] With saturation<br>MHm MLm → MHm MLm<br>Rb | | |
| | SIMD | Word | vasl | Mm,Ra,Mn,Rb<br>Mm,Rb,Mn,i05u | | | MHm MLm<br>(1) (2) (1) (2) → MHm MLm (1) (2) (1) (2)<br>(1)<<Ra[0:4] (2)<<Ra[0:4]<br>Rb | S2 | |
| | | | vfaslvw | Mm,Ra,Mn,Rb<br>Mm,Rb,Mn,i05u | W:ovs | | MHm MLm<br>(1) (2) (1) (2) → MHm MLm (1) (2) (1) (2)<br>(1)<<Ra[0:4] (2)<<Ra[0:4]<br>Rb | | |
| | | Half word | vaslh | Rc,Ra,Rb<br>Rb,Ra,i04u | | | <<Rb[0:3] <<Rb[0:3]<br>Ra (1) (2) → (1) (2) Rc | S1 | |
| | | | vfaslvh | Rc,Ra,Rb<br>Rb,Ra,i04u | W:ovs | | <<Rb[0:3] <<Rb[0:3]<br>Ra (1) (2) → (1) (2) Rc<br>With saturation | | |
| | | Byte | vaslb | Rc,Ra,Rb<br>Rb,Ra,i03u | | | <<Rb[0:2] <<Rb[0:2]<br>Ra (1) (2) (3) (4) → (1) (2) (3) (4) Rc<br><<Rb[0:2] <<Rb[0:2] | | |
| BS asr system | SINGLE | Word | asr | Rc,Ra,Rb<br>Rb,Ra,i05u<br>Ra2,i04u | | | Arithmetic shift right<br>>>Rb[0:4]<br>Ra → Rc | S1 | 32<br>16 |
| | | Pair word | asrp | Mm,Ra,Mn,Rb<br>Mm,Rb,Mn,i06u<br>Mm,Rc,MHn,Ra,Rb<br>Mm,Rb,MHn,Ra,i06u | | | >>Ra[0:4]<br>MHm MLm → MHm MLm<br>Rb | S2 | 32 |
| | SIMD | Word | vasr | Mm,Ra,Mn,Rb<br>Mm,Rb,Mn,i05u | | | MHm MLm<br>(1) (2) (1) (2) → MHm MLm (1) (2) (1) (2)<br>(1)>>Ra[0:4] (2)>>Ra[0:4]<br>Rb | | |
| | | Half word | vasrh | Rc,Ra,Rb<br>Rb,Ra,i04u | | | >>Rb[0:3] >>Rb[0:3]<br>Ra (1) (2) → (1) (2) Rc | S1 | |
| | | Byte | vasrb | Rc,Ra,Rb<br>Rb,Ra,i03u | | | >>Rb[0:2] >>Rb[0:2]<br>Ra (1) (2) (3) (4) → (1) (2) (3) (4) Rc<br>>>Rb[0:2] >>Rb[0:2] | | |

Fig. 32

| Category | SIMD | Size | Instruction | Operand | CFR | PSR | Typical behavior | Operation unit | 31<br>16 |
|---|---|---|---|---|---|---|---|---|---|
| BS<br>lsr<br>system | SINGLE | Word | lsr | Rc,Ra,Rb<br>Rb,Ra,i05u | | | Logical shift right<br>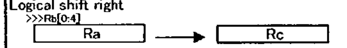 | S1 | 32 |
| | | Pair word | lsrp | Mm,Ra,Mn,Rb<br>Mm,Rb,Mn,i06u<br>Mm,Rc,MHn,Ra,Rb<br>Mm,Rb,MHn,Ra,i06u | | | 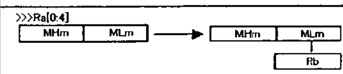 | S2 | |
| | SIMD | Word | vlsr | Mm,Ra,Mn,Rb<br>Mm,Rb,Mn,i05u | | | 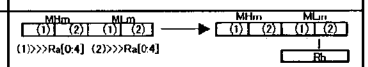 | | |
| | | Half word | vlsrh | Rc,Ra,Rb<br>Rb,Ra,i04u | | | 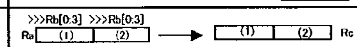 | S1 | |
| | | Byte | vlsrb | Rc,Ra,Rb<br>Rb,Ra,i03u | | | 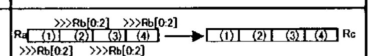 | | |
| BS<br>rotate<br>system | SINGLE | Word | rol | Rc,Ra,Rb<br>Rb,Ra,i05u | | | 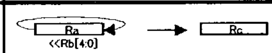 | S1 | 32 |
| | SIMD | Half word | vrolh | Rc,Ra,Rb<br>Rb,Ra,i04u | | | | | |
| | | Byte | vrolb | Rc,Ra,Rb<br>Rb,Ra,i03u | | | | | |
| BS<br>ext<br>system | SINGLE | Word | extw | Mm,Rb,Ra | | | 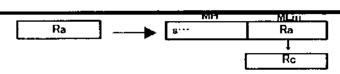 | C | 32 |
| | | Half word | exth | Ra2 | | | 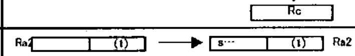 | S2 | 16 |
| | | | exthu | Ra2 | | | 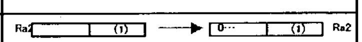 | | |
| | | Byte | extb | Ra2 | | | 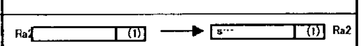 | | |
| | | | extbu | Ra2 | | | 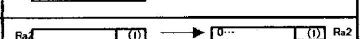 | | |
| | SIMD | Half word | vexth | Mm,Rb,Ra | | | 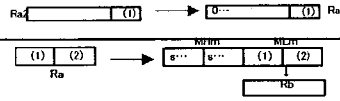 | C | 32 |

Fig. 33

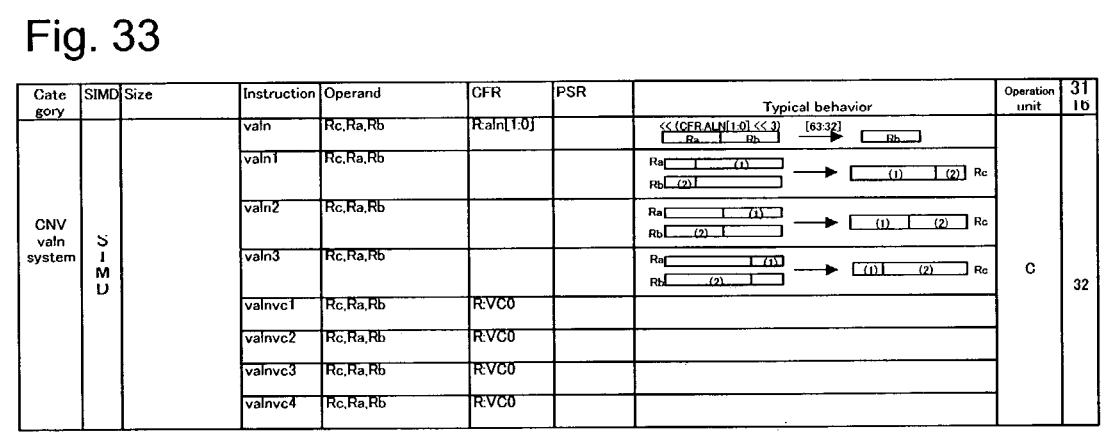

| Cate gory | SIMD | Size | Instruction | Operand | CFR | PSR | Typical behavior | Operation unit | 31 16 |
|---|---|---|---|---|---|---|---|---|---|
| CNV valn system | SIMD | | valn | Rc,Ra,Rb | R:aln[1:0] | | << (CFR.ALN[1:0] << 3) Ra Rb → [63:32] Rb | C | 32 |
| | | | valn1 | Rc,Ra,Rb | | | Ra (1) Rb (2) → (1) (2) Rc | | |
| | | | valn2 | Rc,Ra,Rb | | | Ra (1) Rb (2) → (1) (2) Rc | | |
| | | | valn3 | Rc,Ra,Rb | | | Ra (1) Rb (2) → (1) (2) Rc | | |
| | | | valnvc1 | Rc,Ra,Rb | R:VC0 | | | | |
| | | | valnvc2 | Rc,Ra,Rb | R:VC0 | | | | |
| | | | valnvc3 | Rc,Ra,Rb | R:VC0 | | | | |
| | | | valnvc4 | Rc,Ra,Rb | R:VC0 | | | | |

Fig. 34

| Category | SIMD | Size | Instruction | Operand | CFR | PSR | Typical behavior | Operation unit | 31 16 |
|---|---|---|---|---|---|---|---|---|---|
| CNV | SINGLE | | bcnt1 | Rb,Ra | | | Count the number of 1s | C | 32 |
| | | | bseq0 | Rb,Ra | | | Count number of values from MSB until first 0 is reached | | |
| | | | bseq1 | Rb,Ra | | | Count number of values from MSB until first 1is reached | | |
| | | | bseq | Rb,Ra | | | Count number of values from MSB until first −1 is reached | | |
| | | | mskbrvh | Rc,Ra,Rb | RBP0 | | | | |
| | | | byterev | Rb,Ra | | | | | |
| | | | mskbrvb | Rc,Ra,Rb | RBP0 | | | | |
| | SIMD | Half word | vintllh | Rc,Ra,Rb | | | | | |
| | | | vintlhh | Rc,Ra,Rb | | | | | |
| | | Byte | vintllb | Rc,Ra,Rb | | | | | |
| | | | vintlhb | Rc,Ra,Rb | | | | | |
| | | Half word | vhunpkh | Rb:Rb+1,Ra | | | | | |
| | | Byte | vhunpkb | Rb:Rb+1,Ra | | | | | |
| | | Half word | vlunpkh | Rb:Rb+1,Ra | | | | | |
| | | | vlunpkhu | Rb:Rb+1,Ra | | | | | |
| | | Byte | vlunpkb | Rb:Rb+1,Ra | | | | | |
| | | | vlunpkbu | Rb:Rb+1,Ra | | | | | |
| | | Half word | vunpk1 | Rb,Mn | | | | | |
| | | | vunpk2 | Rb,Mn | | | | | |
| | | | vstovh | Rb,Ra | | | | | |
| | | Byte | vstovb | Rb,Ra | | | | | |
| | | | vhpkb | Rc,Ra,Rb | | | | | |

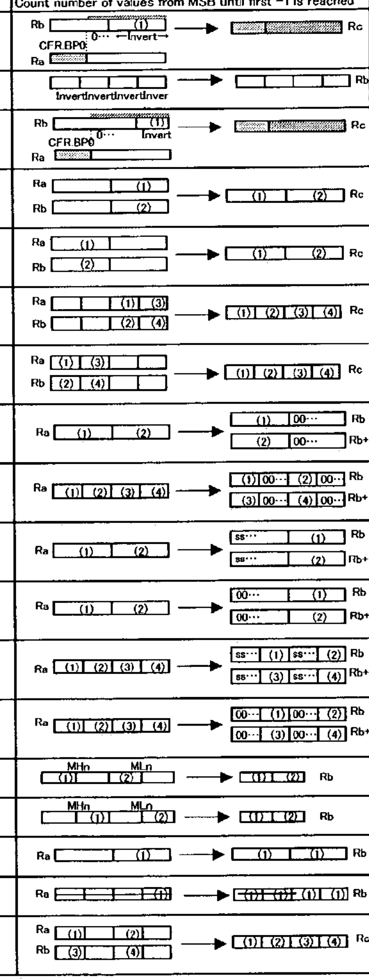

Fig. 35

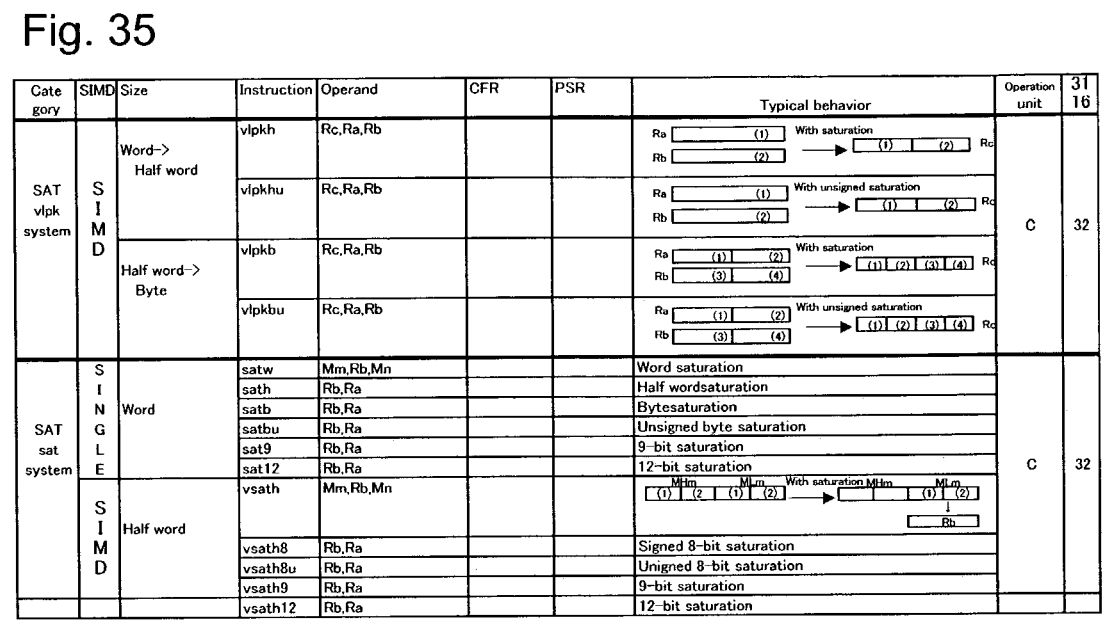

| Category | SIMD | Size | Instruction | Operand | CFR | PSR | Typical behavior | Operation unit | 31<br>16 |
|---|---|---|---|---|---|---|---|---|---|
| SAT vlpk system | SIMD | Word-> Half word | vlpkh | Rc,Ra,Rb | | | Ra (1) Rb (2) With saturation → (1) (2) Rc | C | 32 |
| | | | vlpkhu | Rc,Ra,Rb | | | Ra (1) Rb (2) With unsigned saturation → (1) (2) Rc | | |
| | | Half word-> Byte | vlpkb | Rc,Ra,Rb | | | Ra (1) (2) Rb (3) (4) With saturation → (1) (2) (3) (4) Rc | | |
| | | | vlpkbu | Rc,Ra,Rb | | | Ra (1) (2) Rb (3) (4) With unsigned saturation → (1) (2) (3) (4) Rc | | |
| SAT sat system | SINGLE | Word | satw | Mm,Rb,Mn | | | Word saturation | C | 32 |
| | | | sath | Rb,Ra | | | Half wordsaturation | | |
| | | | satb | Rb,Ra | | | Bytesaturation | | |
| | | | satbu | Rb,Ra | | | Unsigned byte saturation | | |
| | | | sat9 | Rb,Ra | | | 9-bit saturation | | |
| | | | sat12 | Rb,Ra | | | 12-bit saturation | | |
| | SIMD | Half word | vsath | Mm,Rb,Mn | | | MHm (1) (2 MLm (1) (2) With saturation → MHm MLm (1) (2) ↓ Rb | | |
| | | | vsath8 | Rb,Ra | | | Signed 8-bit saturation | | |
| | | | vsath8u | Rb,Ra | | | Unigned 8-bit saturation | | |
| | | | vsath9 | Rb,Ra | | | 9-bit saturation | | |
| | | | vsath12 | Rb,Ra | | | 12-bit saturation | | |

Fig. 36

| Category | SIMD | Size | Instruction | Operand | CFR | PSR | Typical behavior | Operation unit | 31 16 |
|---|---|---|---|---|---|---|---|---|---|
| MSK | | | mskgen | Rc,Rb<br>Rb,I05U,i05u | | | Generate mask 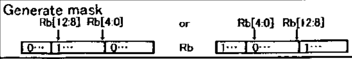  | S2 | 32 |
| | | | msk | Rc,Ra,Rb<br>Rb,Ra,I05U,i05u | | | 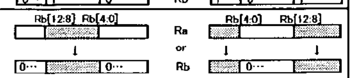  | | |
| EXTR | | | extr<br>extru | Rc,Ra,Rb<br>Rb,Ra,I05U,i05u<br>Rc,Ra,Rb<br>Rb,Ra,I05U,i05u | | | 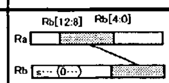  With sign extension (Without sign extension) | S2 | 32 |
| DIV | | | div<br>divu | MHm,Rc,MHn,Ra,Rb<br>MHm,Rc,MHn,Ra,Rb | W:ovs | | Division | DIV | 32 |
| ETC | | | piNI | | | W:ih,ie,fie,pl<br>R:PSR | Software interrupt N=0～7 | B | 32 |
| | | | piN | | | W:ih,ie,pl<br>R:PSR | Software interrupt N=0～7 | | 16 |
| | | | scN | | | W:ih,ie,pl<br>R:PSR | System call N=0～7 | | |
| | | | ldstb | Rb,(Ra) | | | load bus lock | M | 32 |
| | | | rd | Rb,(Ra)<br>Rb,(d11u) | | R:eee | External register read | | |
| | | | | Rb2,(Ra2) | | | | | 16 |
| | | | wt | (Ra),Rb<br>(d11u),Rb | | R:eee | External register write | | 32 |
| | | | | (Ra2),Rb2 | | | | | 16 |
| | | | dpref | (Ra,d11u) | | | Pre-fetch | | 32 |
| | | | dbgmN | i18u | | | N=0～3 | DBGM | |
| | | | vcchk | | W:CF R:VC | | VC flag check | B | |
| | | | vmpsw<br>vmpsw | <br>LR | | | VMP switching | | |
| | | | vmpintd1<br>vmpintd2<br>vmpintd3 | | | W:ie<br><br>W:ie | VMP switching disabled | | |
| | | | vmpinte1<br>vmpinte2<br>vmpinte3 | | | W:ie | VMP switching enabled | | |
| | | | nop | | | | no operation | A | 16 |

Fig. 37 ld Rb,(Ra,D10)

| | |
|---|---|
| Behavior | **Rb <- W[Ra+(uext(D10[9:2]) << 2)];**<br><br>**Load word data from address resulted from adding displacement value (D10) to Ra.** |

| Assembler mnemonic | Format | Affecting flag | Affected flag |
|---|---|---|---|
| **ld Rb,(Ra,D10)** | 32bits | — | PSR.AEE |

| Remarks |
|---|
| D10 is an unsigned value whose lower 2 bits shall be 0.<br><br>Misalignment exception occurs when Ra + (uext(D10[9:2]) << 2) is not aligned to 4 bytes.<br><br>Forwarding penalty of Ra does not occur for some cases when D10 is 0. |

Fig. 38 ld Rb3,(Ra3,D5)

| | |
|---|---|
| Behavior | **Rb3 <- W[Ra3+uext(D5[4:2]) << 2];**<br><br>**Load word data from address resulted from adding displacement value (D5) to Ra3.** |

| Assembler mnemonic | Format | Affecting flag | Affected flag |
|---|---|---|---|
| **ld Rb3,(Ra3,D5)** | 16bits | — | PSR.AEE |

| Remarks |
|---|
| D5 is an unsigned value whose lower 2 bits shall be 0.<br>Misalignment exception occurs when Ra3+(uext(D5[4:2]) << 2) is not aligned to 4 bytes.<br>Forwarding penalty of Ra3 does not occur for some cases when D5 is 0.<br>C7 is the only predicate which can be used (condition cannot be executed) |

Fig. 39 ld Rb,(GP,D13)

| | |
|---|---|
| Behavior | **Rb <- W[GP+(uext(D13[12:2]) << 2)];**<br><br>**Load word data from address resulted from adding displacement value (D13) to GP.** |

| Assembler mnemonic | Format | Affecting flag | Affected flag |
|---|---|---|---|
| **ld Rb,(GP,D13)** | 32bits | — | PSR.AEE |

| Remarks |
|---|
| D12 is an unsigned value whose lower 1 bit shall be 0.<br>Misalignment exception occurs when GP + (uext(D13[12:2]) << 2) is not aligned to 4 bytes.<br>Forwarding penalty of GP does not occur for some cases when D13 is 0. |

Fig. 40 ld Rb2,(GP,D6)

| | |
|---|---|
| Behavior | **Rb2 <- W(GP+(uext(D6[5:2]) << 2));**<br><br>**Load word data from address resulted from adding displacement value (D6) to GP.** |

| Assembler mnemonic | Format | Affecting flag | Affected flag |
|---|---|---|---|
| **ld Rb2,(GP,D6)** | 16bits | — | PSR.AEE |

| Remarks |
|---|
| D6 is an unsigned value whose lower 2 bits shall be 0.<br>Misalignment exception occurs when GP+(uext(D6[5:2]) << 2) is not aligned to 4 bytes.<br>Forwarding penalty of GP does not occur for some cases when D6 is 0.<br>C7 is the only predicate which can be used (condition cannot be executed) |

Fig. 41 ld Rb2,(GP)

| | | | |
|---|---|---|---|
| Behavior | **=> ld Rb2,(GP,0)**<br><br>**Rb2 <- W(GP);**<br><br>**Load word data from address indicated by GP.** | | |
| Assembler mnemonic | Format | Affecting flag | Affected flag |
| **ld Rb2,(GP)** | 16bit synonym | — | PSR.AEE |
| Remarks | | | |
| Misalignment exception occurs when GP is not aligned to 4 bytes.<br><br>※Forwarding penalty of GP does not occur for some cases.<br><br>C7 is the only predicate which can be used (condition cannot be executed) | | | |

Fig. 42 ld Rb,(SP,D13)

| | | | |
|---|---|---|---|
| Behavior | **Rb <- W[SP+(uext(D13[12:2]) << 2)];**<br><br>**Load word data from address resulted from adding displacement value (D13) to SP.** | | |
| Assembler mnemonic | Format | Affecting flag | Affected flag |
| **ld Rb,(SP,D13)** | 32bits | — | — |
| Remarks | | | |
| D13 is an unsigned value whose lower 2 bits shall be 0.<br>Misalignment exception occurs when GP + (uext(D13[12:2]) << 2) is not aligned to 4 bytes.<br>Forwarding penalty of SP does not occur for some cases when D13 is 0. | | | |

Fig. 43 ld Rb2,(SP,D6)

| | |
|---|---|
| Behavior | **Rb2 <- W(SP+(uext(D6[5:2]) << 2));**<br><br>**Load word data from address resulted from adding displacement value (D6) to SP.** |

| Assembler mnemonic | Format | Affecting flag | Affected flag |
|---|---|---|---|
| **ld Rb2,(SP,D6)** | 16bits | — | PSR.AEE |

| Remarks |
|---|
| D6 is an unsigned value whose lower 2 bits shall be 0.<br>Misalignment exception occurs when SP+(uext(D6[5:2]) << 2) is not aligned to 4 bytes.<br>Forwarding penalty of SP does not occur for some cases when D6 is 0.<br>C7 is the only predicate which can be used（condition cannot be executed) |

Fig. 44 ld Rb2,(SP)

| | |
|---|---|
| Behavior | **=> ld Rb2,(SP,0)**<br><br>**Rb2 <- W(SP);**<br><br>**Load word data from address indicated by SP.** |

| Assembler mnemonic | Format | Affecting flag | Affected flag |
|---|---|---|---|
| **ld Rb2,(SP)** | 16bit synonym | — | PSR.AEE |

| Remarks |
|---|
| Misalignment exception occurs when SP is not aligned to 4 bytes.<br><br>※Forwarding penalty of SP does not occur for some cases.<br><br>C7 is the only predicate which can be used (condition cannot be executed) |

Fig. 45 ld Rb,(Ra+)I10

| | |
|---|---|
| Behavior | **Rb <- W(Ra); Ra <- Ra+(sext(I10[9:2]) << 2);**<br><br>**Load word data from address indicated by Ra.**<br>**Furthermore, add immediate value (I10) to Ra and store result in Ra.** |

| Assembler mnemonic | Format | Affecting flag | Affected flag |
|---|---|---|---|
| **ld Rb,(Ra+)I10** | 32bits | — | PSR.AEE |

| Remarks |
|---|
| I10 is a signed value whose lower 2 bits shall be 0.<br>Writing to Ra does not take place when I10 is 0<br>Behavior when Rb and Ra equal to each other is undefined. (when I10≠0)<br>Misalignment exception occurs when Ra is not aligned to 4 bytes. |

Fig. 46 ld Rb,(Ra+)

| | |
|---|---|
| Behavior | **=> ld Rb,(Ra+)4**<br><br>**Rb <- W(Ra); Ra <- Ra+sext(4);**<br><br>**Load word data from address indicated by Ra.**<br>**Furthermore, add 4 to Ra and store result in Ra.** |

| Assembler mnemonic | Format | Affecting flag | Affected flag |
|---|---|---|---|
| **ld Rb,(Ra+)** | 32bit synonym | — | PSR.AEE |

| Remarks |
|---|
| Behavior when Rb and Ra equal to each other is undefined.<br><br>Misalignment exception occurs when Ra is not aligned to 4 bytes. |

Fig. 47 ld Rb2,(Ra2+)

| | |
|---|---|
| Behavior | **Rb2 <- W(Ra2);      Ra2 <- Ra2+sext(4);**<br><br>**Sign-extend word data from address indicated by Ra2 and load it.**<br>**Furthermore, add 4 to Ra2 and store result in Ra2.** |

| Assembler mnemonic | Format | Affecting flag | Affected flag |
|---|---|---|---|
| **ld Rb2,(Ra2+)** | 16bits | — | PSR.AEE |

| Remarks |
|---|
| Misalignment exception occurs when Ra2 is not aligned to 4 bytes.<br>C7 is the only predicate which can be used (condition cannot be executed)<br>Behavior when Rb2 and Ra2 equal to each other is undefined. |

Fig. 48 ld Rb,(Ra)

| | |
|---|---|
| Behavior | **=> ld Rb,(Ra+)0**<br><br>**Rb <- W(Ra);**<br><br>**Load word data from address indicated by Ra.** |

| Assembler mnemonic | Format | Affecting flag | Affected flag |
|---|---|---|---|
| **ld Rb,(Ra)** | 32bit synonym | — | PSR.AEE |

| Remarks |
|---|
| Misalignment exception occurs when Ra is not aligned to 4 bytes.<br><br>Forwarding penalty of Ra does not occur for some cases. |

Fig. 49 ld Rb2,(Ra2)

| | |
|---|---|
| Behavior | **Rb2 <- W(Ra2);**<br><br>**Sign-extend word data from address indicated byRa2 and load it.** |

| Assembler mnemonic | Format | Affecting flag | Affected flag |
|---|---|---|---|
| **ld Rb2,(Ra2)** | 16bits | — | PSR.AEE |

| Remarks |
|---|
| Misalignment exception occurs when Ra2 is not aligned to 4 bytes.<br><br>C7 is the only predicate which can be used (condition cannot be executed) |

Fig. 50 ldh Rb,(Ra,D9)

| Behavior | **Rb <- sext(H[Ra+(uext(D9[8:1]) << 1)]);**<br><br>**Sign-extend half word data from address resulted from adding displacement value (D9) to Ra, and load result.** | | |
|---|---|---|---|
| Assembler mnemonic | Format | Affecting flag | Affected flag |
| **ldh Rb,(Ra,D9)** | 32bits | — | PSR.AEE |
| Remarks | | | |
| D9 is an unsigned value whose lower 1 bit shall be 0.<br>Misalignment exception occurs when Ra + (uext(D9[8:1]) << 1) is not aligned to 2 bytes.<br>Forwarding penalty of Ra does not occur for some cases when D9 is 0. | | | |

Fig. 51 ldh Rb3,(Ra3,D4)

| | |
|---|---|
| Behavior | **Rb3 <- H[Ra3+(uext(D4[3:1]) << 1)];**<br><br>**Sign-extend half word data from address resulted from adding displacement value (D4) to Ra3, and load result.** |

| Assembler mnemonic | Format | Affecting flag | Affected flag |
|---|---|---|---|
| **ldh Rb3,(Ra3,D4)** | 16bits | — | PSR.AEE |

| Remarks |
|---|
| D4 is an unsigned value whose lower 1 bit shall be 0.<br>Misalignment exception occurs when Ra3+(uext(D4[3:1]) << 1) is not aligned to 2 bytes.<br>Forwarding penalty of Ra3 does not occur for some cases when D4 is 0.<br>C7 is the only predicate which can be used (condition cannot be executed) |

Fig. 52 ldh Rb,(GP,D12)

| | | | | |
|---|---|---|---|---|
| Behavior | **Rb <- sext(H[GP+(uext(D12[11:1]) << 1)]);**<br><br>**Sign-extend half word data from address resulted from adding displacement value (D12) to GP, and load result.** | | | |
| Assembler mnemonic | | Format | Affecting flag | Affected flag |
| **ldh Rb,(GP,D12)** | | 32bits | — | PSR.AEE |
| Remarks | | | | |
| D12 is an unsigned value whose lower 1 bit shall be 0.<br>Misalignment exception occurs when GP + (uext(D12[11:1]) << 1) is not aligned to 2 bytes.<br>Forwarding penalty of GP does not occur for some cases when D12 is 0. | | | | |

Fig. 53 ldh Rb2,(GP,D5)

| Behavior | |
|---|---|
| Behavior | **Rb2 <- sext(H(GP+(uext(D5[4:1]) << 1)));**<br><br>**Sign-extend half word data from address resulted from adding displacement value (D5) to GP, and load result.** |

| Assembler mnemonic | Format | Affecting flag | Affected flag |
|---|---|---|---|
| **ldh Rb2,(GP,D5)** | 16bits | — | PSR.AEE |

| Remarks |
|---|
| D5 is an unsigned value whose lower 1 bit shall be 0.<br>Misalignment exception occurs when GP+(uext(D5[4:1]) << 1) is not aligned to 2 bytes.<br>Forwarding penalty of GP does not occur for some cases when D5 is 0.<br>C7 is the only predicate which can be used (condition cannot be executed) |

Fig. 54 ldh Rb2,(GP)

| | |
|---|---|
| Behavior | **=> ldh Rb2,(GP,0)**<br><br>**Rb2 <- sext(H(GP));**<br><br>**Sign-extend half word data from address indicated by GP and load it.** |

| Assembler mnemonic | Format | Affecting flag | Affected flag |
|---|---|---|---|
| **ldh Rb2,(GP)** | 16bit synonym | — | PSR.AEE |

| Remarks |
|---|
| Alignment exception occurs when GPM is not aligned to 2 bytes.<br><br>Forwarding penalty of GP does not occur for some cases.<br><br>C7 is the only predicate which can be used (condition cannot be executed) |

Fig. 55 ldh Rb,(SP,D12)

| Behavior | **Rb <- uext(H[SP+(uext(D12[11:1]) << 1)]);**<br><br>**Sign-extend half word data from address resulted from adding displacement value (D12) to SP, and load result.** | | |
|---|---|---|---|
| **Assembler mnemonic** | **Format** | **Affecting flag** | **Affected flag** |
| **ldh Rb,(SP,D12)** | 32bits | — | PSR.AEE |

| Remarks |
|---|
| D12 is an unsigned value whose lower 1 bit shall be 0.<br><br>Misalignment exception occurs when SP + (uext(D12[11:1]) << 1) is not aligned to 2 bytes.<br><br>Forwarding penalty of SP does not occur for some cases when D12 is 0. |

Fig. 56 ldh Rb2,(SP,D5)

| | |
|---|---|
| Behavior | **Rb2 <- sext(H(SP+(uext(D5[4:1]) << 1)));**<br><br>**Sign-extend half word data from address resulted from adding displacement value (D5) to SP, and load result.** |

| Assembler mnemonic | Format | Affecting flag | Affected flag |
|---|---|---|---|
| **ldh Rb2,(SP,D5)** | 16bits | | PSR.AEE |

| Remarks |
|---|
| D5 is an unsigned value whose lower 1 bit shall be 0.<br><br>Misalignment exception occurs when SP+(uext(D5[4:1]) << 1) is not aligned to 2 bytes.<br><br>Forwarding penalty of SP does not occur for some cases when D5 is 0.<br><br>C7 is the only predicate which can be used (condition cannot be executed) |

Fig. 57 ldh Rb2,(SP)

| | |
|---|---|
| Behavior | **=> ldh Rb2,(SP,0)**<br><br>**Rb2 <- sext(H(SP));**<br><br>**Sign-extend half word data from address indicated by SP and load it.** |

| Assembler mnemonic | Format | Affecting flag | Affected flag |
|---|---|---|---|
| **ldh Rb2,(SP)** | 16bit synonym | — | PSR.AEE |

| Remarks |
|---|
| Alignment exception occurs when SPM is not aligned to 2 bytes.<br>※Forwarding penalty of SP does not occur for some cases.<br>C7 is the only predicate which can be used (condition cannot be executed) |

Fig. 58 ldh Rb,(Ra+)I9

| | |
|---|---|
| Behavior | **Rb <- sext(H(Ra)); Ra <- Ra+(sext(I9[8:1]) << 1);**<br><br>**Sign-extend half word data from address indicated by Ra and load it.**<br><br>**Furthermore, add immediate value (I9) to Ra and store result in Ra.** |

| Assembler mnemonic | Format | Affecting flag | Affected flag |
|---|---|---|---|
| **ldh Rb,(Ra+)I9** | 32bits | — | PSR.AEE |

| Remarks |
|---|
| I9 is a signed value whose lower 1 bit shall be 0.<br>Writing to Ra does not take place when I9 is 0.<br>Behavior when Rb and Ra equal to each other is undefined. (when $I9 \neq 0$)<br>Misalignment exception occurs when Ra is not aligned to 2 bytes. |

Fig. 59 ldh Rb,(Ra+)

| | |
|---|---|
| Behavior | **=> ldh Rb,(Ra+)2**<br><br>**Rb <- sext(H(Ra)); Ra <- Ra+sext(2);**<br><br>**Sign-extend half word data from address indicated by Ra and load it.**<br>**Furthermore, add 2 to Ra and store result in Ra.** |

| Assembler mnemonic | Format | Affecting flag | Affected flag |
|---|---|---|---|
| **ldh Rb,(Ra+)** | 32bit synonym | — | PSR.AEE |

| Remarks |
|---|
| Behavior when Rb and Ra equal to each other is undefined.<br>Misalignment exception occurs when Ra is not aligned to 2 bytes. |

Fig. 60 ldh Rb2,(Ra2+)

| | | | |
|---|---|---|---|
| Behavior | **Rb2 <- sext(H(Ra2)); Ra2 <- Ra2+sext(2);**<br><br>**Sign-extend half word data from address indicated by Ra2 and load it.** | | |
| Assembler mnemonic | Format | Affecting flag | Affected flag |
| **ldh Rb2,(Ra2+)** | 16bits | – | PSR.AEE |
| Remarks | | | |
| Misalignment exception occurs when Ra2 is not aligned to 2 bytes.<br>C7 is the only predicate which can be used (condition cannot be executed)<br>Behavior when Rb2 and Ra2 equal to each other is undefined. | | | |

Fig. 61 ldh Rb,(Ra)

<table>
<tr><td>Behavior</td><td colspan="3">=> ldh Rb,(Ra+)0<br><br>Rb <- sext(H(Ra));<br><br>Sign-extend half word data from address indicated by Ra and load it.</td></tr>
<tr><td>Assembler mnemonic</td><td>Format</td><td>Affecting flag</td><td>Affected flag</td></tr>
<tr><td>ldh Rb,(Ra)</td><td>32bit synonym</td><td>—</td><td>PSR.AEE</td></tr>
<tr><td colspan="4">Remarks</td></tr>
<tr><td colspan="4">Misalignment exception occurs when Ra is not aligned to 2 bytes.<br><br>Forwarding penalty of Ra does not occur for some cases.</td></tr>
</table>

Fig. 62 ldh Rb2,(Ra2)

| | |
|---|---|
| Behavior | **Rb2 <- sext(H(Ra2));**<br><br>**Sign-extend half word data from address indicated by Ra2 and load it.** |

| Assembler mnemonic | Format | Affecting flag | Affected flag |
|---|---|---|---|
| **ldh Rb2,(Ra2)** | 16bits | — | PSR.AEE |

| Remarks |
|---|
| Misalignment exception occurs when Ra2 is not aligned to 2 bytes.<br><br>C7 is the only predicate which can be used (condition cannot be executed) |

Fig. 63 ldhu Rb,(Ra,D9)

<table>
<tr><td>Behavior</td><td colspan="3">Rb <- uext(H[Ra+(uext(D9[8:1]) << 1)]);<br><br>Load half word data from address resulted from adding displacement value (D9) to Ra without performing sign extension.</td></tr>
<tr><td>Assembler mnemonic</td><td>Format</td><td>Affecting flag</td><td>Affected flag</td></tr>
<tr><td>ldhu Rb,(Ra,D9</td><td>32bits</td><td>—</td><td>PSR.AEE</td></tr>
<tr><td colspan="4">Remarks</td></tr>
<tr><td colspan="4">D9 is an unsigned value whose lower 1 bit shall be 0.<br>Misalignment exception occurs when Ra + (uext(D9[8:1]) << 1) is not aligned to 2 bytes.<br>Forwarding penalty of Ra does not occur for some cases when D9 is 0.</td></tr>
</table>

Fig. 64 ldhu Rb,(GP,D12)

| | |
|---|---|
| Behavior | **Rb <- uext(H[GP+(uext(D12[11:1]) << 1)]);**<br><br>**Load half word data from address resulted from adding displacement value (D12) to GP without performing sign extension.** |

| Assembler mnemonic | Format | Affecting flag | Affected flag |
|---|---|---|---|
| **ldhu Rb,(GP,D12)** | 32bits | – | PSR.AEE |

| Remarks |
|---|
| D12 is an unsigned value whose lower 1 bit shall be 0.<br>Misalignment exception occurs when GP + (uext(D12[11:1]) << 1) is not aligned to 2 bytes.<br>Forwarding penalty of GP does not occur for some cases when D12 is 0. |

Fig. 65 ldhu Rb,(SP,D12)

| | |
|---|---|
| Behavior | **Rb <- uext(H[SP+(uext(D12[11:1]) << 1)]);**<br><br>**Load half word data from address resulted from adding displacement value (D12) to SP without performing sign extension.** |

| Assembler mnemonic | Format | Affecting flag | Affected flag |
|---|---|---|---|
| **ldhu Rb,(SP,D12)** | 32bits | — | PSR.AEE |

| Remarks |
|---|
| D12 is an unsigned value whose lower 1 bit shall be 0.<br>Misalignment exception occurs when SP + (uext(D12[11:1]) << 1) is not aligned to 2 bytes.<br>Forwarding penalty of SP does not occur for some cases when D12 is 0. |

Fig. 66 ldhu Rb,(Ra+)I9

| | |
|---|---|
| Behavior | **Rb <- uext(H(Ra)); Ra <- Ra+(sext(I9[8:1]) << 1);**<br><br>**Load half word data from address indicated by Ra without performing sign extension.**<br>**Furthermore, add immediate value (I9) to Ra and store result in Ra.** |

| Assembler mnemonic | Format | Affecting flag | Affected flag |
|---|---|---|---|
| **ldhu Rb,(Ra+)I9** | 32bits | | PSR.AEE |

| Remarks |
|---|
| I9 is a signed value whose lower 1 bit shall be 0.<br>Writing to Ra does not take place when I9 is 0.<br>Behavior when Rb and Ra equal to each other is undefined. (when I9≠0)<br>Misalignment exception occurs when Ra is not aligned to 2 bytes. |

Fig. 67 ldhu Rb,(Ra+)

| | |
|---|---|
| Behavior | => ldhu Rb,(Ra+)2<br><br>Rb <- uext(H(Ra)); Ra <- Ra+sext(2);<br><br>**Load half word data from address indicated by Ra without performing sign extension.**<br>**Furthermore, add 2 to Ra and store result in Ra.** |

| Assembler mnemonic | Format | Affecting flag | Affected flag |
|---|---|---|---|
| **ldhu Rb,(Ra+)** | 32bit synonym | — | PSR.AEE |

| Remarks |
|---|
| Behavior when Rb and Ra equal to each other is undefined.<br>Misalignment exception occurs when Ra is not aligned to 2 bytes. |

Fig. 68 ldhu Rb,(Ra)

| | |
|---|---|
| Behavior | **=> ldhu Rb,(Ra+)0**<br><br>**Rb <- uext(H(Ra));**<br><br>**Load half word data from address indicated by Ra without performing sign extension.** |

| Assembler mnemonic | Format | Affecting flag | Affected flag |
|---|---|---|---|
| **ldhu Rb,(Ra)** | 32bit synonym | — | PSR.AEE |

| Remarks |
|---|
| Misalignment exception occurs when Ra is not aligned to 2 bytes.<br><br>Forwarding penalty of Ra does not occur for some cases. |

Fig. 69 ldb Rb,(Ra,D8)

| | |
|---|---|
| Behavior | **Rb <- sext(B[Ra+uext(D8)]);**<br><br>**Sign-extend byte data from address resulted from adding displacement value (D8) to Ra, and load result.** |

| Assembler mnemonic | Format | Affecting flag | Affected flag |
|---|---|---|---|
| **ldb Rb,(Ra,D8)** | 32bits | — | — |

| Remarks |
|---|
| D8 is an unsigned value.<br><br>Forwarding penalty of Ra does not occur for some cases when D8 is 0. |

Fig. 70 ldb Rb,(GP,D11)

| | |
|---|---|
| Behavior | **Rb <- sext(B[GP+uext(D11)]);**<br><br>**Sign-extend byte data from address resulted from adding displacement value (D11) to GP, and load result.** |

| Assembler mnemonic | Format | Affecting flag | Affected flag |
|---|---|---|---|
| **ldb Rb,(GP,D11)** | 32bits | — | — |

| Remarks |
|---|
| D11 is an unsigned value.<br><br>Forwarding penalty of GP does not occur for some cases when D11 is 0. |

Fig. 71 ldb Rb,(SP,D11)

| | | | | |
|---|---|---|---|---|
| Behavior | **Rb <- sext(B[SP+uext(D11)]);**<br><br>**Sign-extend byte data from address resulted from adding displacement value (D11) to SP, and load result.** | | | |
| Assembler mnemonic | | Format | Affecting flag | Affected flag |
| **ldb Rb,(SP,D11)** | | 32bits | — | — |
| Remarks | | | | |
| D11 is an unsigned value.<br><br>Forwarding penalty of SP does not occur for some cases when D11 is 0. | | | | |

Fig. 72 ldb Rb,(Ra+)I8

| | |
|---|---|
| Behavior | **Rb <- sext(B(Ra)); Ra <- Ra+sext(I8);**<br><br>**Load byte data from address indicated by Ra without performing sign extension.**<br>**Furthermore, add immediate value (I8) to Ra and store result in Ra.** |

| Assembler mnemonic | Format | Affecting flag | Affected flag |
|---|---|---|---|
| **ldb Rb,(Ra+)I8** | 32bits | — | — |

| Remarks |
|---|
| I8 is a signed value.<br>Writing to Ra does not take place when I8 is 0.<br>Behavior when Rb and Ra equal to each other is undefined. (when I8≠0) |

Fig. 73 ldb Rb,(Ra+)

| | |
|---|---|
| Behavior | **=> ldb Rb,(Ra+)1**<br><br>**Rb <- sext(B(Ra)); Ra <- Ra+sext(1);**<br><br>**Sign-extend byte data from address indicated by Ra, and load result.**<br>**Furthermore, add 1 to Ra and store result in Ra.** |

| Assembler mnemonic | Format | Affecting flag | Affected flag |
|---|---|---|---|
| **ldb Rb,(Ra+)** | 32bit synonym | — | — |

| Remarks |
|---|
| Behavior when Rb and Ra equal to each other is undefined. |

Fig. 74 ldb Rb,(Ra)

<table>
<tr><td>Behavior</td><td colspan="3">=> ldb Rb,(Ra+)0<br><br>Rb <- sext(B(Ra));<br><br>Sign-extend byte data from address indicated by Ra, and load result.</td></tr>
<tr><td>Assembler mnemonic</td><td>Format</td><td>Affecting flag</td><td>Affected flag</td></tr>
<tr><td>ldb Rb,(Ra)</td><td>32bit synonym</td><td>—</td><td>—</td></tr>
<tr><td colspan="4">Remarks</td></tr>
<tr><td colspan="4">Forwarding penalty of Ra does not occur for some cases.</td></tr>
</table>

Fig. 75 ldbu Rb,(Ra,D8)

<table>
<tr><td>Behavior</td><td colspan="4">Rb <- uext(B[Ra+uext(D8)]);<br><br>Load byte data from address resulted from adding displacement value (D8) to Ra without performing sign extension.</td></tr>
<tr><td colspan="2">Assembler mnemonic</td><td>Format</td><td>Affecting flag</td><td>Affected flag</td></tr>
<tr><td colspan="2">ldbu Rb,(Ra,D8)</td><td>32bits</td><td>—</td><td>—</td></tr>
<tr><td colspan="5">Remarks</td></tr>
<tr><td colspan="5">D8 is an unsigned value.<br><br>Forwarding penalty of Ra does not occur for some cases when D8 is 0.</td></tr>
</table>

Fig. 76 ldbu Rb,(GP,D11)

| | |
|---|---|
| Behavior | **Rb <- uext(B[GP+uext(D11)]);**<br><br>**Load byte data from address resulted from adding displacement value (D11) to GP without performing sign extension.** |

| Assembler mnemonic | Format | Affecting flag | Affected flag |
|---|---|---|---|
| **ldbu Rb,(GP,D11)** | 32bits | — | — |

| Remarks |
|---|
| I10 is a signed value whose lower 2 bits shall be 0.<br><br>Forwarding penalty of GP does not occur for some cases when D11 is 0. |

Fig. 77 ldbu Rb,(SP,D11)

| | |
|---|---|
| Behavior | **Rb <- uext(B[SP+uext(D11)]);**<br><br>**Load byte data from address resulted from adding displacement value (D11) to SP without performing sign extension.** |

| Assembler mnemonic | Format | Affecting flag | Affected flag |
|---|---|---|---|
| **ldbu Rb,(SP,D11)** | 32bits | — | — |

| Remarks |
|---|
| D11 is an unsigned value.<br><br>Forwarding penalty of SP does not occur for some cases when D11 is 0. |

Fig. 78 ldbu Rb,(Ra+)I8

<table>
<tr><td>Behavior</td><td colspan="3">Rb <- uext(B(Ra)); Ra <- Ra+sext(I8);<br><br>Load byte data from address indicated by Ra without performing sign extension.<br>Furthermore, add immediate value (I8) to Ra and store result in Ra.</td></tr>
<tr><td>Assembler mnemonic</td><td>Format</td><td>Affecting flag</td><td>Affected flag</td></tr>
<tr><td>ldbu Rb,(Ra+)I8</td><td>32bits</td><td>…</td><td>—</td></tr>
<tr><td colspan="4">Remarks</td></tr>
<tr><td colspan="4">I8 is a signed value.<br>Writing to Ra does not take place when I8 is 0.<br>Behavior when Rb and Ra equal to each other is undefined. (when I8≠0)</td></tr>
</table>

Fig. 79 ldbu Rb,(Ra+)

| | |
|---|---|
| Behavior | **=> ldbu Rb,(Ra+)1**<br><br>**Rb <- uext(B(Ra)); Ra <- Ra+sext(1);**<br><br>**Load byte data from address indicated by Ra without performing sign extension.**<br>**Furthermore, add 1 to Ra and store result in Ra.** |

| Assembler mnemonic | Format | Affecting flag | Affected flag |
|---|---|---|---|
| **ldbu Rb,(Ra+)** | 32bit synonym | — | PSR.AEE |

| Remarks |
|---|
| Behavior when Rb and Ra equal to each other is undefined. |

Fig. 80 ldbu Rb,(Ra)

| | |
|---|---|
| Behavior | **=> ldbu Rb,(Ra+)0**<br><br>**Rb <- uext(B(Ra));**<br><br>**Load byte data from address indicated by Ra without performing sign extension.** |

| Assembler mnemonic | Format | Affecting flag | Affected flag |
|---|---|---|---|
| **ldbu Rb,(Ra)** | 32bit synonym | — | — |

| Remarks |
|---|
| Forwarding penalty of Ra does not occur for some cases. |

Fig. 81 ldp Rb:Rb+1,(Ra,D11)

| | |
|---|---|
| Behavior | **Rb:Rb+1 <- D(Ra+(uext(D11[10:3]) << 3));**<br><br>**Sign-extend 2 items of word data from address resulted from adding displacement value (D11) to Ra, and load result.** |

| Assembler mnemonic | Format | Affecting flag | Affected flag |
|---|---|---|---|
| **ldp Rb:Rb+1,(Ra,D11)** | 32bits | — | PSR.AEE |

Remarks

D11 is an unsigned value whose lower 3 bits shall be 0.

Rb shall be an even number.

Misalignment exception occurs when Ra+(uext(D11[10:3]) << 3) is not aligned to 8 bytes.

Forwarding penalty of Ra does not occur for some cases when D11 is 0.

Rb:Rb+1 <- D(Ra+(uext(D11[10:3]) << 3)) precisely means as follows:

effective_address <- Ra + (uext(D11[10:3]) << 3)

Rb <- W(effective_address)

Rb+1 <- W(effective_address+4)

Fixed regardless of endian

Fig. 82 ldp Rb:Rb+1,(GP,D14)

| | |
|---|---|
| Behavior | **Rb:Rb+1 <- D(GP+(uext(D14[13:3]) << 3));**<br><br>**Sign-extend 2 items of word data from address resulted from adding displacement value (D14) to GP, and load result.** |

| Assembler mnemonic | Format | Affecting flag | Affected flag |
|---|---|---|---|
| **ldp Rb:Rb+1,(GP,D14)** | 32bits | — | PSR.AEE |

| Remarks |
|---|
| D14 is an unsigned value whose lower 3 bits shall be 0.<br><br>Rb shall be an even number.<br><br>Misalignment exception occurs when GP+(uext(D14[13:3]) << 3) is not aligned to 8 bytes.<br><br>Forwarding penalty of GP does not occur for some cases when D14 is 0.<br><br>Rb:Rb+1 <- D(GP+(uext(D14[13:3]) << 3)) precisely means as follows:<br><br>effective_address <- GP + (uext(D14[13:3]) << 3)<br><br>Rb <- W(effective_address)<br><br>Rb+1 <- W(effective_address+4)<br><br>Fixed regardless of endian |

Fig. 83 ldp Rb:Rb+1,(SP,D14)

| | |
|---|---|
| Behavior | **Rb:Rb+1 <- D(SP+(uext(D14[13:3]) << 3));**<br><br>**Sign-extend 2 items of word data from address resulted from adding displacement value (D14) to SP, and load result.** |

| Assembler mnemonic | Format | Affecting flag | Affected flag |
|---|---|---|---|
| **ldp Rb:Rb+1,(SP,D14)** | 32bits | — | PSR.AEE |

| Remarks |
|---|
| D14 is an unsigned value whose lower 3 bits shall be 0.<br>Rb shall be an even number.<br>Misalignment exception occurs when SP+(uext(D14[13:3]) << 3) is not aligned to 8 bytes.<br>Forwarding penalty of SP does not occur for some cases when D14 is 0.<br>Rb:Rb+1 <- D(SP+(uext(D14[13:3]) << 3)) precisely means as follows:<br>effective_address <- SP + (uext(D14[13:3]) << 3)<br>Rb <- W(effective_address)<br>Rb+1 <- W(effective_address+4)<br>Fixed regardless of endian |

Fig. 84 ldp Rb:Rb+1,(SP,D7)

| | |
|---|---|
| Behavior | **Rb:Rb+1 <- D(SP+(uext(D7[6:3]) << 3));**<br><br>**Sign-extend 2 items of word data from address resulted from adding displacement value (D7) to SP, and load result.** |

| Assembler mnemonic | Format | Affecting flag | Affected flag |
|---|---|---|---|
| **ldp Rb:Rb+1,(SP,D7)** | 16bits | — | PSR.AEE |

Remarks

D7 is an unsigned value whose lower 3 bits shall be 0.

Rb shall be an even number.

Misalignment exception occurs when SP+(uext(D7[6:3]) << 3) is not aligned to 8 bytes.

Forwarding penalty of SP docs not occur for some cases when D7 is 0.

Rb:Rb+1 <- D(SP+(uext(D7[6:3]) << 3)) precisely means as follows:

effective address <- SP+(uext(D7[6:3]) << 3);

Rb <- W(effective_address);

Rb+1 <- W(effective_address+4);

Fixed regardless of endian

C7 is the only predicate which can be used (condition cannot be executed)

Fig. 85 ldp Rb:Rb+1,(SP)

| | |
|---|---|
| Behavior | **=> ldp Rb:Rb+1,(SP,0)**<br><br>**Rb:Rb+1 <- D(SP);**<br><br>**Sign-extend 2 items of word data from address indicated by SP, and load result.** |

| Assembler mnemonic | Format | Affecting flag | Affected flag |
|---|---|---|---|
| **ldp Rb:Rb+1,(SP)** | 16bit synonym | — | PSR.AEE |

| Remarks |
|---|
| ※ Rb shall be an even number.<br>Misalignment exception occurs when SP is not aligned to 8 bytes.<br>Forwarding penalty of SP does not occur for some cases.<br>Rb:Rb+1 <- D(SP) precisely means as follows:<br>effective_address <- SP;<br>Rb <- W(effective_address);<br>Rb+1 <- W(effective_address+4);<br>Fixed regardless of endian<br>C7 is the only predicate which can be used (condition cannot be executed) |

Fig. 86 ldp Rb:Rb+1,(Ra+)I11

| | |
|---|---|
| Behavior | **Rb:Rb+1 <- D(Ra);**<br>**Ra <- Ra+(sext(I11[10:3]) << 3);**<br><br>**Sign-extend 2 items of word data from address indicated by Ra, and load result.**<br>**Furthermore, add immediate value (I11) to Ra and store result in Ra.** |

| Assembler mnemonic | Format | Affecting flag | Affected flag |
|---|---|---|---|
| **ldp Rb:Rb+1,(Ra+)I11** | 32bits | — | PSR.AEE |

| Remarks |
|---|
| I11 is a signed value whose lower 3 bits shall be 0.<br>Rb shall be an even number.<br>Writing to Ra does not take place when I11 is 0.<br>Behavior when Rb and Ra equal to each other is undefined. (when I11 ≠ 0)<br>Behavior when Rb+1 and Ra equal to each other is undefined. (when I11 ≠ 0)<br>Misalignment exception occurs when Ra is not aligned to 8 bytes.<br>Rb:Rb+1 <- D(Ra) precisely means as follows:<br>effective_address <- Ra<br>Rb <- W(effective_address)<br>Rb+1 <- W(effective_address+4)<br>Fixed regardless of endian |

Fig. 87 ldp Rb2:Rb2+1,(Ra2+)

| | |
|---|---|
| Behavior | **Rb2:Rb2+1 <- D(Ra2);**<br>**Ra2 <- Ra2 + sext(8);**<br><br>**Sign-extend 2 items of word data from address indicated by Ra2, and load result.**<br>**Furthermore, add 8 to Ra2 and store result in Ra2.** |

| Assembler mnemonic | Format | Affecting flag | Affected flag |
|---|---|---|---|
| **ldp Rb2:Rb2+1,(Ra2+)** | 16bits | – | PSR.AEE |

| Remarks |
|---|
| Rb2 shall be an even number.<br>Behavior when Rb2 and Ra2 equal to each other is undefined.<br>Behavior when Rb2+1 and Ra2 equal to each other is undefined.<br>Misalignment exception occurs when Ra2 is not aligned to 8 bytes.<br>Rb2:Rb2+1 <- D(Ra2) precisely means as follows:<br>effective_address <- Ra2<br>Rb2 <- W(effective_address)<br>Rb2+1 <- W(effective_address+4)<br>Fixed regardless of endian<br>C7 is the only predicate which can be used (condition cannot be executed) |

Fig. 88 ldp Rb:Rb+1,(Ra+)

| | |
|---|---|
| Behavior | => ldp Rb:Rb+1,(Ra+)8<br><br>Rb:Rb+1 <- D(Ra);<br><br>Ra <- Ra+sext(8);<br><br>Sign-extend 2 items of word data from address indicated by Ra, and load result.<br><br>Furthermore, add 8 to Ra and store result in Ra. |

| Assembler mnemonic | Format | Affecting flag | Affected flag |
|---|---|---|---|
| ldp Rb:Rb+1,(Ra+) | 32bit synonym | — | PSR.AEE |

| Remarks |
|---|
| Rb shall be an even number.<br><br>Misalignment exception occurs when Ra is not aligned to 8 bytes. |

Fig. 89 ldp Rb:Rb+1,(Ra)

| | |
|---|---|
| Behavior | **=> ldp Rb:Rb+1,(Ra+)0**<br><br>**Rb:Rb+1 <- D(Ra);**<br><br>**Sign-extend 2 items of word data from address indicated by Ra, and load result.** |

| Assembler mnemonic | Format | Affecting flag | Affected flag |
|---|---|---|---|
| **ldp Rb:Rb+1,(Ra)** | 32bit synonym | — | PSR.AEE |

| Remarks |
|---|
| ※Rb shall be an even number.<br>Misalignment exception occurs when Ra is not aligned to 8 bytes.<br>Forwarding penalty of Ra does not occur for some cases.<br>Rb:Rb+1 <- D(Ra) precisely means as follows:<br>effective_address <- Ra<br>Rb <- W(effective_address)<br>Rb+1 <- W(effective_address+4)<br>Fixed regardless of endian |

Fig. 90 ldp LR:SVR,(Ra,D14)

| | |
|---|---|
| Behavior | **tmp[63:0] <- D(Ra+(uext(D11[10:3]) << 3));**<br>**LR <- tmp[63:32];**<br>**SVR <- tmp[15:0];**<br><br>**Load 2 items of word data from address resulted from adding displacement value (D11) to Ra, and store result in LR and SVR.** |

| Assembler mnemonic | Format | Affecting flag | Affected flag |
|---|---|---|---|
| **ldp LR:SVR,(Ra,D14)** | 32bits | — | PSR.AEE |

| Remarks |
|---|
| D11 is an unsigned value whose lower 3 bits shall be 0.<br>tmp[31:16] is destroyed.<br>Misalignment exception occurs when Ra+(uext(D11[10:3]) << 3) is not aligned to 8 bytes.<br>Forwarding penalty of Ra does not occur for some cases when D11 is 0.<br>LR:SVR <- D(Ra+(uext(D11[10:3]) << 3)) precisely means as follows:<br>effective_address <- Ra + (uext(D11[10:3]) << 3)<br>LR <- W(effective_address)<br>tmp <- W(effective_address+4)<br>SVR <- tmp[15:0];<br>Fixed regardless of endian |

Fig. 91 ldp LR:SVR,(Ra)

| | |
|---|---|
| Behavior | **=> ldp LR:SVR,(Ra,0)**<br><br>**tmp[63:0] <- D(Ra);**<br>**LR <- tmp[63:32];**<br>**SVR <- tmp[15:0];**<br><br>**Load 2 items of word data from address indicated by Ra, and store result in LR and SVR.** |

| Assembler mnemonic | Format | Affecting flag | Affected flag |
|---|---|---|---|
| **ldp LR:SVR,(Ra)** | 32bit synonym | — | PSR.AEE |

Remarks

※tmp[31:16] is destroyed.

Misalignment exception occurs when Ra is not aligned to 8 bytes.

Forwarding penalty of Ra does not occur for some cases.

LR:SVR <- D(Ra) precisely means as follows:

effective_address <- Ra

LR <- W(effective_address)

tmp <- W(effective_address+4)

SVR <- tmp[15:0];

Fixed regardless of endian

Fig. 92 ldp LR:SVR,(GP,D14)

| | |
|---|---|
| Behavior | **tmp[63:0] <- D(GP+(uext(D14[13:3]) << 3));**<br>**LR <- tmp[63:32];**<br>**SVR <- tmp[15:0];**<br><br>**Load 2 items of word data from address resulted from adding displacement value (D14) to GP, and store result in LR and SVR.** |

| Assembler mnemonic | Format | Affecting flag | Affected flag |
|---|---|---|---|
| **ldp LR:SVR,(GP,D14)** | 32bits | – | PSR.AEE |

| Remarks |
|---|
| D14 is an unsigned value whose lower 3 bits shall be 0.<br>tmp[31:16] is destroyed.<br>Misalignment exception occurs when GP+(uext(D14[13:3]) << 3) is not aligned to 8 bytes.<br>Forwarding penalty of GP does not occur for some cases when D14 is 0.<br>LR:SVR <- D(GP+(uext(D14[13:3]) << 3)) precisely means as follows:<br>effective_address <- GP + (uext(D14[13:3]) << 3)<br>LR <- W(effective_address)<br>tmp <- W(effective_address+4)<br>SVR <- tmp[15:0];<br>Fixed regardless of endian |

Fig. 93 ldp LR:SVR,(SP,D14)

| | |
|---|---|
| Behavior | **tmp[63:0] <- D(SP+(uext(D14[13:3]) << 3));**<br>**LR <- tmp[63:32];**<br>**SVR <- tmp[15:0];**<br><br>**Load 2 items of word data from address resulted from adding displacement value (D14) to SP, and store result in LR and SVR.** |

| Assembler mnemonic | Format | Affecting flag | Affected flag |
|---|---|---|---|
| **ldp LR:SVR,(SP,D14)** | 32bits | — | PSR.AEE |

Remarks

D14 is an unsigned value whose lower 3 bits shall be 0.

tmp[31:16] is destroyed.

Misalignment exception occurs when SP+(uext(D14[13:3]) << 3) is not aligned to 8 bytes.

Forwarding penalty of SP does not occur for some cases when D14 is 0.

LR:SVR <- D(SP+(uext(D14[13:3]) << 3)) precisely means as follows:

effective_address <- SP + (uext(D14[13:3]) << 3)

LR <- W(effective_address)

tmp <- W(effective_address+4)

SVR <- tmp[15:0];

Fixed regardless of endian

Fig. 94 ldp LR:SVR,(SP,D7)

| | |
|---|---|
| Behavior | **tmp[63:0] <- D(SP+(uext(D7[6:3]) << 3));**<br>**LR <- tmp[63:32];**<br>**SVR <- tmp[15: 0];**<br><br>**Load 2 items of word data from address resulted from adding displacement value (D7) to SP, and store result in LR and SVR.** |

| Assembler mnemonic | Format | Affecting flag | Affected flag |
|---|---|---|---|
| **ldp LR:SVR,(SP,D7)** | 16bits | SVR | PSR.AEE |

Remarks

D7 is an unsigned value whose lower 3 bits shall be 0.

tmp[31:16] is destroyed.

Misalignment exception occurs when SP+(uext(D4[6:3]) << 3)is not aligned to 8 bytes.

Forwarding penalty of SP does not occur for some cases when D7 is 0.

LR:SVR <- D(SP+(uext(D7[6:3]) << 3)) precisely means as follows:

effective_address <- SP+(uext(D7[6:3]) << 3);

LR <- W(effective_address);

tmp[31:0] <- W(effective_address+4);

SVR <- tmp[15:0];

Fixed regardless of endian

C7 is the only predicate which can be used (condition cannot be executed)

Fig. 95 ldp LR:SVR,(SP)

| | |
|---|---|
| Behavior | => ldp LR:SVR,(SP,0)<br><br>tmp[63:0] <- D(SP);<br>LR <- tmp[63:32];<br>SVR <- tmp[15: 0];<br><br>**Load 2 items of word data from address indicated by SP, and store result in LR and SVR.** |

| Assembler mnemonic | Format | Affecting flag | Affected flag |
|---|---|---|---|
| ldp LR:SVR,(SP) | 16bit synonym | SVR | PSR.AEE |

Remarks

※tmp[31:16] is destroyed.

Misalignment exception occurs when SPis not aligned to 8 bytes.

Forwarding penalty of SP does not occur for some cases.

LR:SVR <- D(SP) precisely means as follows:

effective_address <- SP;

LR <- W(effective_address);

tmp[31:0] <- W(effective_address+4);

SVR <- tmp[15:0];

Fixed regardless of endian

C7 is the only predicate which can be used (condition cannot be executed)

Fig. 96 ldp TAR:UDR,(Ra,D11)

| | | | | |
|---|---|---|---|---|
| Behavior | **Instruction not implemented.** | | | |
| Assembler mnemonic | | Format | Affecting flag | Affected flag |
| **ldp TAR:UDR,(Ra,D11)** | | 32bits | — | PSR.AEE |
| Remarks | | | | |
| | | | | |

Fig. 97 ldp TAR:UDR,(GP,D14)

| Behavior | **Instruction not implemented.** | | |
|---|---|---|---|
| Assembler mnemonic | Format | Affecting flag | Affected flag |
| **ldp TAR:UDR,(GP,D14)** | 32bits | — | — |
| Remarks | | | |
| | | | |

Fig. 98 ldp TAR:UDR,(SP,D14)

| | | | |
|---|---|---|---|
| Behavior | **Instruction not implemented.** | | |
| Assembler mnemonic | Format | Affecting flag | Affected flag |
| **ldp TAR:UDR,(SP,D14)** | 32bits | — | — |
| Remarks | | | |
| | | | |

Fig. 99 ldhp Rb:Rb+1,(Ra,D10)

| | |
|---|---|
| Behavior | **tmp <- W(Ra+(uext(D10[9:2]) << 2));**<br>**Rb <- sext(tmp[31:16]);**<br>**Rb+1 <- sext(tmp[15: 0]);**<br><br>**Sign-extend two half word data from address resulted from adding displacement value (D1o) to Ra, and load result.** |

| Assembler mnemonic | Format | Affecting flag | Affected flag |
|---|---|---|---|
| **ldhp Rb:Rb+1,(Ra,D10)** | 32bits | – | PSR.AEE |

| Remarks |
|---|
| D10 is an unsigned value whose lower 2 bits shall be 0.<br>Rb shall be an even number.<br>Misalignment exception occurs when Ra+(uext(D10[9:2]) << 2) is not aligned to 4 bytes.<br>Forwarding penalty of Ra does not occur for some cases when D10 is 0. |

Fig. 100 ldhp Rb:Rb+1,(Ra+)I10

| | |
|---|---|
| Behavior | **tmp <- W(Ra);**<br>**Rb <- sext(tmp[31:16]);**<br>**Rb+1 <- sext(tmp[15: 0]);**<br>**Ra <- Ra+(sext(I10[9:2]) << 2);**<br><br>**Sign-extend 2 items of half word data from address indicated by Ra, and load result.**<br>**Furthermore, add immediate value (I10) to Ra and store result in Ra.** |

| Assembler mnemonic | Format | Affecting flag | Affected flag |
|---|---|---|---|
| **ldhp Rb:Rb+1,(Ra+)I10** | 32bits | — | PSR.AEE |

| Remarks |
|---|
| I10 is a signed value whose lower 2 bits shall be 0.<br>Rb shall be an even number.<br>Writing to Ra does not take place when I10 is 0.<br>Behavior when Rb and Ra equal to each other is undefined. (when I10≠0)<br>Behavior when Rb+1 and Ra equal to each other is undefined. (when I10≠0)<br>Misalignment exception occurs when Ra is not aligned to 4 bytes. |

Fig. 101 ldhp Rb2:Rb2+1,(Ra2+)

| | |
|---|---|
| Behavior | **tmp <- W(Ra2);**<br>**Rb2 <- sext(tmp[31:16]);**<br>**Rb2+1 <- sext(tmp[15: 0]);**<br>**Ra2 <- Ra2 + sext(4);**<br><br>**Sign-extend 2 items of half word data from address indicated by Ra2, and load result.**<br>**Furthermore, add 4 to Ra and store result in Ra.** |

| Assembler mnemonic | Format | Affecting flag | Affected flag |
|---|---|---|---|
| **ldhp Rb2:Rb2+1,(Ra2+)** | 16bits | — | PSR.AEE |

| Remarks |
|---|
| Rb2 shall be an even number.<br>Behavior when Rb2 and Ra2 equal to each other is undefined.<br>Behavior when Rb2+1 and Ra2 equal to each other is undefined.<br>Misalignment exception occurs when Ra2 is not aligned to 4 bytes.<br>C7 is the only predicate which can be used (condition cannot be executed) |

Fig. 102 ldhp Rb:Rb+1, (Ra+)

| | |
|---|---|
| Behavior | **=> ldhp Rb:Rb+1,(Ra+)4**<br><br>**tmp <- W(Ra);**<br>**Rb <- sext(tmp[31:16]);**<br>**Rb+1 <- sext(tmp[15: 0]);**<br>**Ra <- Ra+sext(4);**<br><br>**Sign-extend 2 items of half word data from address indicated by Ra, and load result.**<br>**Furthermore, add 4 to Ra and store result in Ra.** |

| Assembler mnemonic | Format | Affecting flag | Affected flag |
|---|---|---|---|
| **ldhp Rb:Rb+1,(Ra+)** | 32bit synonym | — | PSR.AEE |

| Remarks |
|---|
| Rb shall be an even number.<br>Misalignment exception occurs when Ra is not aligned to 4 bytes. |

Fig. 103 ldhp Rb:Rb+1,(Ra)

<table>
<tr><td>Behavior</td><td colspan="3">=> ldhp Rb:Rb+1,(Ra+)0<br><br>tmp <- W(Ra);<br>Rb <- sext(tmp[31:16]);<br>Rb+1 <- sext(tmp[15: 0]);<br><br>Sign-extend 2 items of half word data from address indicated by Ra, and load result.</td></tr>
<tr><td>Assembler mnemonic</td><td>Format</td><td>Affecting flag</td><td>Affected flag</td></tr>
<tr><td>ldhp Rb:Rb+1,(Ra)</td><td>32bit synonym</td><td>—</td><td>PSR.AEE</td></tr>
<tr><td colspan="4">Remarks</td></tr>
<tr><td colspan="4">Rb shall be an even number.<br>Misalignment exception occurs when Ra is not aligned to 4 bytes.<br>Forwarding penalty of Ra does not occur for some cases.</td></tr>
</table>

Fig. 104 ldbp Rb:Rb+1,(Ra,D9)

| | |
|---|---|
| Behavior | **tmp <- H(Ra+(uext(D9[8:1]) << 1))**<br>**Rb <- sext(tmp[15: 8]);**<br>**Rb+1 <- sext(tmp[ 7: 0]);**<br><br>**Sign-extend 2 items of byte data from address resulted from adding displacement value (D9) to Ra, and load result.** |

| Assembler mnemonic | Format | Affecting flag | Affected flag |
|---|---|---|---|
| **ldbp Rb:Rb+1,(Ra,D9)** | 32bits | — | PSR.AEE |

| Remarks |
|---|
| D9 is an unsigned value whose lower 1 bit shall be 0.<br>Rb shall be an even number.<br>Misalignment exception occurs when Ra + (uext(D9[8:1]) << 1) is not aligned to 2 bytes.<br>Forwarding penalty of Ra does not occur for some cases when D9 is 0. |

Fig. 105 ldbp Rb:Rb+1,(Ra+)I9

| | |
|---|---|
| Behavior | **tmp <- H(Ra);**<br>**Rb <- sext(tmp[15: 8]);**<br>**Rb+1 <- sext(tmp[ 7: 0]);**<br>**Ra <- Ra+(sext(I9[8:1]) << 1);**<br><br>**Sign-extend 2 items of byte data from address indicated by Ra and load it.**<br>**Furthermore, add immediate value (I9) to Ra and store result in Ra.** |

| Assembler mnemonic | Format | Affecting flag | Affected flag |
|---|---|---|---|
| **ldbp Rb:Rb+1,(Ra+)I9** | 32bits | — | PSR.AEE |

| Remarks |
|---|
| I9 is a signed value whose lower 1 bit shall be 0.<br>Rb shall be an even number.<br>Writing to Ra does not take place when I9 is 0.<br>Behavior when Rb and Ra equal to each other is undefined. (when I9 ≠ 0)<br>Behavior when Rb+1 and Ra equal to each other is undefined. (when I9 ≠ 0)<br>Misalignment exception occurs when Ra is not aligned to 2 bytes. |

Fig. 106 ldbp Rb:Rb+1,(Ra+)

| | |
|---|---|
| Behavior | => ldbp Rb:Rb+1,(Ra+)2<br><br>tmp <- H(Ra);<br>Rb <- sext(tmp[15: 8]);<br>Rb+1 <- sext(tmp[ 7: 0]);<br>Ra <- Ra+sext(2);<br><br>Sign-extend 2 items of byte data from address indicated by Ra and load it.<br>Furthermore, add 2 to Ra and store result in Ra. |

| Assembler mnemonic | Format | Affecting flag | Affected flag |
|---|---|---|---|
| ldbp Rb:Rb+1,(Ra+) | 32bit synonym | — | PSR.AEE |

| Remarks |
|---|
| Rb shall be an even number.<br>Misalignment exception occurs when Ra is not aligned to 2 bytes. |

Fig. 107 ldbp Rb:Rb+1,(Ra)

<table>
<tr><td>Behavior</td><td colspan="3">=> ldbp Rb:Rb+1,(Ra+)0<br><br>tmp <- H(Ra);<br>Rb <- sext(tmp[15: 8]);<br>Rb+1 <- sext(tmp[ 7: 0]);<br><br>Sign-extend 2 items of byte data from address indicated by Ra and load it.</td></tr>
<tr><td>Assembler mnemonic</td><td>Format</td><td>Affecting flag</td><td>Affected flag</td></tr>
<tr><td>ldbp Rb:Rb+1,(Ra,D9)</td><td>32bit synonym</td><td>—</td><td>PSR.AEE</td></tr>
<tr><td colspan="4">Remarks</td></tr>
<tr><td colspan="4">Rb shall be an even number.<br>Misalignment exception occurs when Ra is not aligned to 2 bytes.<br>Forwarding penalty of Ra does not occur for some cases.</td></tr>
</table>

Fig. 108 ldbh Rb,(Ra+)I7

Behavior

```
tmp <- H(Ra);
Rb[31:16] <- sext(tmp[15: 8]);
Rb[15: 0] <- sext(tmp[ 7: 0]);
Ra <- Ra+(sext(I7[6:1]) << 1);
```

Load 2 items of byte data from address indicated by Ra. Each of higher 8 bits and lower 8 bits of data is sign-extended, and stored in higher 16 bits and lower 16 bits of Rb.

Furthermore, add immediate value (I7) to Ra and store result in Ra.

| Assembler mnemonic | Format | Affecting flag | Affected flag |
|---|---|---|---|
| ldbh Rb,(Ra+)I7 | 32bits | — | PSR.AEE |

Remarks

I7 is a signed value whose lower 1 bit shall be 0.

Writing to Ra does not take place when I7 is 0.

Behavior when Rb and Ra equal to each other is undefined. (when I7 ≠ 0)

Misalignment exception occurs when Ra is not aligned to 2 bytes.

Fig. 109 ldbh Rb,(Ra+)

<table>
<tr><td rowspan="1">Behavior</td><td colspan="3">=> ldbh Rb,(Ra+)2<br><br>tmp <- H(Ra);<br>Rb[31:16] <- sext(tmp[15: 8]);<br>Rb[15: 0] <- sext(tmp[ 7: 0]);<br>Ra <- Ra+sext(2);<br><br>Load 2 items of byte data from address indicated by Ra, and each of them is sign-extended to be stored in higher 16 bits and lower 16 bits of Rb.<br>Furthermore, add 2 to Ra and store result in Ra.</td></tr>
<tr><td>Assembler mnemonic</td><td>Format</td><td>Affecting flag</td><td>Affected flag</td></tr>
<tr><td>ldbh Rb,(Ra+)</td><td>32bit synonym</td><td>—</td><td>PSR.AEE</td></tr>
<tr><td colspan="4">Remarks</td></tr>
<tr><td colspan="4">Behavior when Rb and Ra equal to each other is undefined.<br>Misalignment exception occurs when Ra is not aligned to 2 bytes.</td></tr>
</table>

Fig. 110 ldbh Rb,(Ra)

| Behavior | |
|---|---|
| | **=> ldbh Rb,(Ra+)0**<br><br>**tmp <- H(Ra);**<br>**Rb[31:16] <- sext(tmp[15: 8]);**<br>**Rb[15: 0] <- sext(tmp[ 7: 0]);**<br><br>**Load 2 items of byte data from address indicated by Ra, and each of them is sign-extended to be stored in higher 16 bits and lower 16 bits of Rb.** |

| Assembler mnemonic | Format | Affecting flag | Affected flag |
|---|---|---|---|
| **ldbh Rb,(Ra)** | 32bit synonym | — | PSR.AEE |

| Remarks |
|---|
| Misalignment exception occurs when Ra is not aligned to 2 bytes. |

Fig. 111 ldbuh Rb,(Ra+)I7

| | |
|---|---|
| Behavior | tmp <- W(Ra);<br>Rb [31:16] <- uext(tmp[31:24]);<br>Rb [15: 0] <- uext(tmp[23:16]);<br>Rb+1[31:16] <- uext(tmp[15: 8]);<br>Rb+1[15: 0] <- uext(tmp[ 7: 0]);<br>Ra <- Ra+(sext(I7[6:2]) << 2);<br><br>**Load 2 items of byte data from address indicated by Ra. Each of higher 8 bits and lower 8 bits of data is stored in higher 16 bits and lower 16 bits of Rb without being sign-extended.**<br>**Furthermore, add immediate value (I7) to Ra and store result in Ra.** |

| Assembler mnemonic | Format | Affecting flag | Affected flag |
|---|---|---|---|
| **ldbuh Rb,(Ra+)I7** | 32bits | — | PSR.AEE |

| Remarks |
|---|
| I7 is a signed value whose lower 1 bit shall be 0.<br>Writing to Ra does not take place when I7 is 0.<br>Behavior when Rb and Ra equal to each other is undefined. (when I7≠0)<br>Misalignment exception occurs when Ra is not aligned to 2 bytes. |

Fig. 112 ldbuh Rb,(Ra+)

| | |
|---|---|
| Behavior | **=> ldbuh Rb,(Ra+)2**<br><br>**tmp <- W(Ra);**<br>**Rb [31:16] <- uext(tmp[31:24]);**<br>**Rb [15: 0] <- uext(tmp[23:16]);**<br>**Ra <- Ra+(sext(2);**<br><br>**Load 2 items of byte data from address indicated by Ra, and each of them is stored in higher 16 bits and lower 16 bits of Rb without being sign-extended.**<br>**Furthermore, add 2 to Ra and store result in Ra.** |

| Assembler mnemonic | Format | Affecting flag | Affected flag |
|---|---|---|---|
| **ldbuh Rb,(Ra+)** | 32bit synonym | — | PSR.AEE |

| Remarks |
|---|
| ※Behavior when Rb and Ra equal to each other is undefined.<br>Misalignment exception occurs when Ra is not aligned to 2 bytes. |

Fig. 113 ldbuh Rb,(Ra)

| | |
|---|---|
| Behavior | **=> ldbuh Rb,(Ra+)0**<br><br>**tmp <- W(Ra);**<br>**Rb [31:16] <- uext(tmp[31:24]);**<br>**Rb [15: 0] <- uext(tmp[23:16]);**<br><br>**Load 2 items of byte data from address indicated by Ra, and each of them is stored in higher 16 bits and lower 16 bits of Rb without being sign-extended.** |

| Assembler mnemonic | Format | Affecting flag | Affected flag |
|---|---|---|---|
| **ldbuh Rb,(Ra)** | 32bit synonym | — | PSR.AEE |

| Remarks |
|---|
| Misalignment exception occurs when Ra is not aligned to 2 bytes. |

Fig. 114 ldbhp Rb:Rb+1,(Ra+)I7

| | |
|---|---|
| Behavior | tmp <- W(Ra);<br>Rb [31:16] <- sext(tmp[31:24]);<br>Rb [15: 0] <- sext(tmp[23:16]);<br>Rb+1[31:16] <- sext(tmp[15: 8]);<br>Rb+1[15: 0] <- sext(tmp[ 7: 0]);<br>Ra <- Ra+(sext(I7[6:2]) << 2);<br><br>Load 4 items of byte data from address indicated by Ra. Each of higher 8 bits and lower 8 bits of data is sign-extended and stored in higher 16 bits and lower 16 bits of Rb and Rb+1.<br>Furthermore, add immediate value (I7) to Ra and store result in Ra. |

| Assembler mnemonic | Format | Affecting flag | Affected flag |
|---|---|---|---|
| ldbhp Rb:Rb+1,(Ra+)I7 | 32bits | — | PSR.AEE |

| Remarks |
|---|
| I7 is a signed value whose lower 2 bits shall be 0.<br>Rb shall be an even number.<br>Writing to Ra does not take place when I7 is 0.<br>Behavior when Rb and Ra equal to each other is undefined. (when I7≠0)<br>Behavior when Rb+1 and Ra equal to each other is undefined. (when I7≠0)<br>Misalignment exception occurs when Ra is not aligned to 4 bytes. |

Fig. 115 ldbhp Rb:Rb+1,(Ra+)

| | |
|---|---|
| Behavior | **=> ldbhp Rb:Rb+1,(Ra+)4**<br><br>**tmp <- W(Ra);**<br>**Rb [31:16] <- sext(tmp[31:24]);**<br>**Rb [15: 0] <- sext(tmp[23:16]);**<br>**Rb+1[31:16] <- sext(tmp[15: 8]);**<br>**Rb+1[15: 0] <- sext(tmp[ 7: 0]);**<br>**Ra <- Ra+sext(4);**<br><br>**Load 4 items of byte data from address indicated by Ra. Each of them is sign-extended and stored in higher 16 bits and lower 16 bits of Rb and Rb+1.**<br>**Furthermore, add 4 to Ra and store result in Ra.** |

| Assembler mnemonic | Format | Affecting flag | Affected flag |
|---|---|---|---|
| **ldbhp Rb:Rb+1,(Ra+)** | 32bit synonym | — | PSR.AEE |

| Remarks |
|---|
| Rb shall be an even number.<br>Behavior when Rb and Ra equal to each other is undefined.<br>Behavior when Rb+1 and Ra equal to each other is undefined.<br>Misalignment exception occurs when Ra is not aligned to 4 bytes. |

Fig. 116 ldbhp Rb:Rb+1,(Ra)

| | |
|---|---|
| Behavior | **=> ldbhp Rb:Rb+1,(Ra+)0**<br><br>**tmp <- W(Ra);**<br>**Rb [31:16] <- sext(tmp[31:24]);**<br>**Rb [15: 0] <- sext(tmp[23:16]);**<br>**Rb+1[31:16] <- sext(tmp[15: 8]);**<br>**Rb+1[15: 0] <- sext(tmp[ 7: 0]);**<br>**Ra <- Ra+(sext(I7[6:2]) << 2);**<br><br>**Load 4 items of byte data from address indicated by Ra. Each of them is sign-extended and stored in higher 16 bits and lower 16 bits of Rb and Rb+1.** |

| Assembler mnemonic | Format | Affecting flag | Affected flag |
|---|---|---|---|
| **ldbhp Rb:Rb+1,(Ra)** | 32bit synonym | — | PSR.AEE |

| Remarks |
|---|
| ※ Rb shall be an even number.<br>Misalignment exception occurs when Ra is not aligned to 4 bytes. |

Fig. 117 ldbuhp Rb:Rb+1,(Ra+)I7

| | |
|---|---|
| Behavior | **tmp <- W(Ra);**<br>**Rb [31:16] <- uext(tmp[31:24]);**<br>**Rb [15: 0] <- uext(tmp[23:16]);**<br>**Rb+1[31:16] <- uext(tmp[15: 8]);**<br>**Rb+1[15: 0] <- uext(tmp[ 7: 0]);**<br>**Ra <- Ra+(sext(I7[6:2]) << 2);**<br><br>**Load 4 items of byte data from address indicated by Ra. Each of higher 8 bits and lower 8 bits of 2 items of half word data is stored in higher 16 bits and lower 16 bits of Rb and Rb+1 without being sign-extended.**<br>**Furthermore, add immediate value (I7) to Ra and store result in Ra.** |

| Assembler mnemonic | Format | Affecting flag | Affected flag |
|---|---|---|---|
| **ldbuhp Rb:Rb+1,(Ra+)I7** | 32bits | — | PSR.AEE |

| Remarks |
|---|
| I7 is a signed value whose lower 2 bits shall be 0.<br>Writing to Ra does not take place when I7 is 0.<br>Behavior when Rb and Ra equal to each other is undefined. (when $I7 \neq 0$)<br>Behavior when Rb+1 and Ra equal to each other is undefined. (when $I7 \neq 0$)<br>Misalignment exception occurs when Ra is not aligned to 4 bytes. |

Fig. 118 ldbuhp Rb:Rb+1,(Ra+)

| | |
|---|---|
| Behavior | => ldbuhp Rb:Rb+1,(Ra+)4<br>tmp <- W(Ra);<br>Rb [31:16] <- uext(tmp[31:24]);<br>Rb [15: 0] <- uext(tmp[23:16]);<br>Rb+1[31:16] <- uext(tmp[15: 8]);<br>Rb+1[15: 0] <- uext(tmp[ 7: 0]);<br>Ra <- Ra+sext(4);<br><br>**Load 2 items of byte data from address indicated by Ra. Each of them is stored in higher 16 bits and lower 16 bits of Rb without being sign-extended.**<br>**Furthermore, add 4 to Ra and store result in Ra.** |

| Assembler mnemonic | Format | Affecting flag | Affected flag |
|---|---|---|---|
| **ldbuhp Rb:Re,(Ra+)** | 32bit synonym | — | PSR.AEE |

| Remarks |
|---|
| ※Behavior when Rb and Ra equal to each other is undefined.<br>※Behavior when Rb+1 and Ra equal to each other is undefined.<br>Misalignment exception occurs when Ra is not aligned to 4 bytes. |

Fig. 119 ldbuhp Rb:Rb+1,(Ra)

| | |
|---|---|
| Behavior | **=> ldbuhp Rb:Rb+1,(Ra+)0**<br><br>**tmp <- W(Ra);**<br>**Rb [31:16] <- uext(tmp[31:24]);**<br>**Rb [15: 0] <- uext(tmp[23:16]);**<br>**Rb+1[31:16] <- uext(tmp[15: 8]);**<br>**Rb+1[15: 0] <- uext(tmp[ 7: 0]);**<br><br>**Load 2 items of byte data from address indicated by Ra. Each of them is stored in higher 16 bits and lower 16 bits of Rb without being sign-extended.** |

| Assembler mnemonic | Format | Affecting flag | Affected flag |
|---|---|---|---|
| **ldbuhp Rb:Rb+1,(Ra)** | 32bit synonym | – | PSR.AEE |

| Remarks |
|---|
| Misalignment exception occurs when Ra is not aligned to 4 bytes. |

Fig. 120 st (Ra,D10),Rb

| | |
|---|---|
| Behavior | **W[Ra+(uext(D10[9:2]) << 2)] <- Rb;**<br><br>**Store word data stored in Rb to address resulted from adding displacement value (D10) to Ra.** |

| Assembler mnemonic | Format | Affecting flag | Affected flag |
|---|---|---|---|
| **st (Ra,D10),Rb** | 32bits | — | PSR.AEE |

| Remarks |
|---|
| D10 is an unsigned value whose lower 2 bits shall be 0.<br>Misalignment exception occurs when Ra+(uext(D10[9:2]) << 2) is not aligned to 4 bytes.<br>Forwarding penalty of Ra does not occur for some cases when D10 is 0. |

Fig. 121 st (Ra3,D5),Rb3

<table>
<tr><td>Behavior</td><td colspan="3">W[Ra3+(uext(D5[4:2]) << 2)] <- Rb3;<br><br>Store word data stored in Rb to address resulted from adding displacement value (D5) to Ra3.</td></tr>
<tr><td>Assembler mnemonic</td><td>Format</td><td>Affecting flag</td><td>Affected flag</td></tr>
<tr><td>st (Ra3,D5),Rb3</td><td>16bits</td><td>—</td><td>PSR.AEE</td></tr>
<tr><td colspan="4">Remarks</td></tr>
<tr><td colspan="4">D5 is an unsigned value whose lower 2 bits shall be 0.<br>Misalignment exception occurs when Ra3+(uext(D5[4:2]) << 2) is not aligned to 4 bytes.<br>Forwarding penalty of Ra3 does not occur for some cases when D5 is 0.<br>C7 is the only predicate which can be used (condition cannot be executed)</td></tr>
</table>

Fig. 122 st (GP,D13),Rb

| | |
|---|---|
| Behavior | **W[GP+(uext(D13[12:2]) << 2)] <- Rb;**<br><br>**Store half word data stored in Rb to address resulted from adding displacement value (D13) to GP.** |

| Assembler mnemonic | Format | Affecting flag | Affected flag |
|---|---|---|---|
| **st (GP,D13),Rb** | 32bits | — | PSR.AEE |

| Remarks |
|---|
| D13 is an unsigned value whose lower 2 bits shall be 0.<br><br>Misalignment exception occurs when GP+(uext(D13[12:2]) << 2) is not aligned to 4 bytes.<br><br>Forwarding penalty of GP does not occur for some cases when D13 is 0. |

Fig. 123 st (GP,D6),Rb2

| | | | |
|---|---|---|---|
| Behavior | **W(GP+(uext(D6[5:2]) << 2)) <- Rb2;**<br><br>**Store word data stored in Rb2 to address resulted from adding displacement value (D6) to GP.** | | |
| Assembler mnemonic | Format | Affecting flag | Affected flag |
| **st (GP,D6),Rb2** | 16bits | — | PSR.AEE |
| Remarks | | | |
| D6 is an unsigned value whose lower 2 bits shall be 0.<br>Misalignment exception occurs when GP+(uext(D6[5:2]) << 2) is not aligned to 4 bytes.<br>Forwarding penalty of GP does not occur for some cases when D6 is 0.<br>C7 is the only predicate which can be used (condition cannot be executed) | | | |

Fig. 124 st (GP),Rb2

| | |
|---|---|
| Behavior | **=> st (GP,0),Rb2**<br><br>**W(GP) <- Rb2;**<br><br>**Store word data stored in Rb2 to address indicated by GP.** |

| Assembler mnemonic | Format | Affecting flag | Affected flag |
|---|---|---|---|
| **st (GP),Rb2** | 16bit synonym | — | PSR.AEE |

| Remarks |
|---|
| Misalignment exception occurs when GP is not aligned to 4 bytes.<br>※Forwarding penalty of GP does not occur for some cases.<br>C7 is the only predicate which can be used (condition cannot be executed) |

Fig. 125 st (SP,D13),Rb

| | |
|---|---|
| Behavior | **W[SP+(uext(D13[12:2]) << 2)] <- Rb;**<br><br>**Store half word data stored in Rb to address resulted from adding displacement value (D13) to SP.** |

| Assembler mnemonic | Format | Affecting flag | Affected flag |
|---|---|---|---|
| **st (SP,D13),Rb** | 32bits | -- | PSR.AEE |

| Remarks |
|---|
| D13 is an unsigned value whose lower 2 bits shall be 0.<br><br>Misalignment exception occurs when SP+(uext(D13[12:2]) << 2) is not aligned to 4 bytes.<br><br>Forwarding penalty of SP does not occur for some cases when D13 is 0. |

Fig. 126 st (SP,D6),Rb2

| | |
|---|---|
| Behavior | **W(SP+(uext(D6[5:2]) << 2)) <- Rb2;**<br><br>**Store word data stored in Rb2 to address resulted from adding displacement value (D6) to SP.** |

| Assembler mnemonic | Format | Affecting flag | Affected flag |
|---|---|---|---|
| **st (SP,D6),Rb2** | 16bits | — | PSR.AEE |

| Remarks |
|---|
| Misalignment exception occurs when SP+(uext(D6[5:2]) << 2) is not aligned to 4 bytes.<br>Forwarding penalty of SP does not occur for some cases when D6 is 0.<br>D6 is an unsigned value whose lower 2 bits shall be 0.<br>C7 is the only predicate which can be used (condition cannot be executed) |

Fig. 127 st (SP),Rb2

| | |
|---|---|
| Behavior | **=> st (SP,0),Rb2**<br><br>**W(SP) <- Rb2;**<br><br>**Store word data stored in Rb2 to address indicated by SP.** |

| Assembler mnemonic | Format | Affecting flag | Affected flag |
|---|---|---|---|
| **st (SP),Rb2** | 16bit synonym | — | PSR.AEE |

| Remarks |
|---|
| Misalignment exception occurs when SP is not aligned to 4 bytes.<br>※Forwarding penalty of SP does not occur for some cases.<br>C7 is the only predicate which can be used (condition cannot be executed) |

Fig. 128 st (Ra+)I10,Rb

| | | | | |
|---|---|---|---|---|
| Behavior | **W[Ra] <- Rb; Ra <- Ra+(sext(I10[9:2]) << 2);**<br><br>**Store word data stored in Rb to address indicated by Ra.**<br>**Furthermore, add immediate value (I10) to Ra and store result in Ra.** | | | |
| Assembler mnemonic | | Format | Affecting flag | Affected flag |
| **st (Ra+)I10,Rb** | | 32bits | — | PSR.AEE |
| Remarks | | | | |
| I10 is a signed value whose lower 2 bits shall be 0.<br>Writing to Ra does not take place when I10 is 0.<br>Misalignment exception occurs when Ra is not aligned to 4 bytes. | | | | |

Fig. 129 st (Ra+),Rb

| | |
|---|---|
| Behavior | **=> st (Ra+)4,Rb**<br><br>**W(Ra) <- Rb; Ra <- Ra+sext(4);**<br><br>**Store word data stored in Rb to address indicated by Ra.**<br>**Furthermore, add 4 to Ra and store result in Ra.** |

| Assembler mnemonic | Format | Affecting flag | Affected flag |
|---|---|---|---|
| **st (Ra+),Rb** | 32bit synonym | — | PSR.AEE |

| Remarks |
|---|
| Misalignment exception occurs when Ra is not aligned to 4 bytes. |

Fig. 130 st (Ra2+),Rb2

| | |
|---|---|
| Behavior | **W(Ra2) <- Rb2; Ra2 <- Ra2 + sext(4);**<br><br>**Store word data stored in Rb2 to address indicated by Ra2.**<br>**Furthermore, add 4 to Ra2 and store result in Ra2.** |

| Assembler mnemonic | Format | Affecting flag | Affected flag |
|---|---|---|---|
| **st (Ra2+),Rb2** | 16bits | — | PSR.AEE |

| Remarks |
|---|
| Misalignment exception occurs when Ra2 is not aligned to 4 bytes.<br>C7 is the only predicate which can be used (condition cannot be executed) |

Fig. 131 st (Ra),Rb

| | |
|---|---|
| Behavior | **=> st (Ra+)0,Rb**<br><br>**W(Ra) <- Rb; Ra <- Ra;**<br><br>**Store word data stored in Rb to address indicated by Ra.** |

| Assembler mnemonic | Format | Affecting flag | Affected flag |
|---|---|---|---|
| **st (Ra),Rb** | 32bit synonym | — | PSR.AEE |

| Remarks |
|---|
| Misalignment exception occurs when Ra is not aligned to 4 bytes.<br><br>Forwarding penalty of Ra does not occur for some cases. |

Fig. 132 st (Ra2),Rb2

| | |
|---|---|
| Behavior | **W(Ra2) <- Rb2;**<br><br>**Store word data stored in Rb2 to address indicated by Ra2.** |

| Assembler mnemonic | Format | Affecting flag | Affected flag |
|---|---|---|---|
| **st (Ra2),Rb2** | 16bits | — | PSR.AEE |

| Remarks |
|---|
| Misalignment exception occurs when Ra2 is not aligned to 4 bytes.<br><br>C7 is the only predicate which can be used (condition cannot be executed) |

Fig. 133 sth (Ra,D9),Rb

| | |
|---|---|
| Behavior | **H[Ra+(uext(D9[8:1]) << 1)] <- Rb[15:0];**<br><br>**Store half word data stored in Rb to address resulted from adding displacement value (D9) to Ra.** |

| Assembler mnemonic | Format | Affecting flag | Affected flag |
|---|---|---|---|
| **sth (Ra,D9),Rb** | 32bits | — | PSR.AEE |

| Remarks |
|---|
| D9 is an unsigned value whose lower 1 bit shall be 0.<br><br>Misalignment exception occurs when Ra+(uext(D9[8:1]) << 1) is not aligned to 2 bytes.<br><br>Forwarding penalty of Ra does not occur for some cases when D9 is 0. |

Fig. 134 sth (Ra3,D4),Rb3

<table>
<tr><td>Behavior</td><td colspan="3">H[Ra3+(uext(D4[3:1]) << 1)] <- Rb3;<br><br>Store half word data stored in Rb to address resulted from adding displacement value (D4) to Ra3.</td></tr>
<tr><td>Assembler mnemonic</td><td>Format</td><td>Affecting flag</td><td>Affected flag</td></tr>
<tr><td>sth (Ra3,D4),Rb3</td><td>16bits</td><td>—</td><td>PSR.AEE</td></tr>
<tr><td colspan="4">Remarks</td></tr>
<tr><td colspan="4">D4 is an unsigned value whose lower 1 bit shall be 0.<br>Misalignment exception occurs when Ra3+(uext(D4[3:1]) << 1) is not aligned to 2 bytes.<br>Forwarding penalty of Ra3 does not occur for some cases when D4 is 0.<br>C7 is the only predicate which can be used (condition cannot be executed)</td></tr>
</table>

Fig. 135 sth (GP,D12),Rb

| | | | | |
|---|---|---|---|---|
| Behavior | **H[GP+(uext(D12[11:1]) << 1)] <- Rb[15:0];**<br><br>**Store half word data stored in Rb to address resulted from adding displacement value (D12) to GP.** | | | |
| Assembler mnemonic | | Format | Affecting flag | Affected flag |
| **sth (GP,D12),Rb** | | 32bits | — | PSR.AEE |
| Remarks | | | | |
| D12 is an unsigned value whose lower 1 bit shall be 0.<br><br>Misalignment exception occurs when GP+(uext(D12[11:1]) << 1) is not aligned to 2 bytes.<br><br>Forwarding penalty of GP does not occur for some cases when D12 is 0. | | | | |

Fig. 136 sth (GP,D5),Rb2

| | | | |
|---|---|---|---|
| Behavior | **H(GP+(uext(D5[4:1]) << 1)) <- Rb2[15:0];**<br><br>**Store half word data stored in Rb2 to address resulted from adding displacement value (D5) to GP.** | | |
| Assembler mnemonic | Format | Affecting flag | Affected flag |
| **sth (GP,D5),Rb2** | 16bits | — | PSR.AEE |
| Remarks | | | |
| D5 is an unsigned value whose lower 1 bit shall be 0.<br>Misalignment exception occurs when GP+(uext(D5[4:1]) << 1) is not aligned to 2 bytes.<br>Forwarding penalty of GP does not occur for some cases when D5 is 0.<br>C7 is the only predicate which can be used (condition cannot be executed) | | | |

Fig. 137 sth (GP),Rb2

| | |
|---|---|
| Behavior | **=> sth (GP,0),Rb2**<br><br>**H(GP) <- Rb2[15:0];**<br><br>**Store half word data stored in Rb2 to address indicated by GP.** |

| Assembler mnemonic | Format | Affecting flag | Affected flag |
|---|---|---|---|
| **sth (GP),Rb2** | 16bit synonym | — | PSR.AEE |

| Remarks |
|---|
| Misalignment exception occurs when GP is not aligned to 2 bytes.<br>※Forwarding penalty of GP does not occur for some cases.<br>C7 is the only predicate which can be used (condition cannot be executed) |

Fig. 138 sth (SP,D12),Rb

| | |
|---|---|
| Behavior | **H[SP+(uext(D12[11:1]) << 1)] <- Rb[15:0];**<br><br>**Store half word data stored in Rb to address resulted from adding displacement value (D12) to SP.** |

| Assembler mnemonic | Format | Affecting flag | Affected flag |
|---|---|---|---|
| **sth (SP,D12),Rb** | 32bits | — | PSR.AEE |

| Remarks |
|---|
| D12 is an unsigned value whose lower 1 bit shall be 0.<br>Misalignment exception occurs when SP+(uext(D12[11:1]) << 1) is not aligned to 2 bytes.<br>Forwarding penalty of SP does not occur for some cases when D12 is 0. |

Fig. 139 sth (SP,D5),Rb2

| | |
|---|---|
| Behavior | **H(SP+(uext(D5[4:1]) << 1)) <- Rb2[15:0];**<br><br>**Store half word data stored in Rb2 to address resulted from adding displacement value (D5) to SP.** |

| Assembler mnemonic | Format | Affecting flag | Affected flag |
|---|---|---|---|
| **sth (SP,D5),Rb2** | 16bits | — | PSR.AEE |

| Remarks |
|---|
| D5 is an unsigned value whose lower 1 bit shall be 0.<br>Misalignment exception occurs when SP+(uext(D5[4:1]) << 1) is not aligned to 2 bytes.<br>Forwarding penalty of SP does not occur for some cases when D5 is 0.<br>C7 is the only predicate which can be used (condition cannot be executed) |

Fig. 140 sth (SP),Rb2

| Behavior | => sth (SP,0),Rb2<br><br>H(SP) <- Rb2[15:0];<br><br>Store half word data stored in Rb2 to address indicated by SP. | | |
|---|---|---|---|
| **Assembler mnemonic** | **Format** | **Affecting flag** | **Affected flag** |
| **sth (SP),Rb2** | 16bit synonym | — | PSR.AEE |
| **Remarks** | | | |
| Misalignment exception occurs when SP is not aligned to 2 bytes.<br>※Forwarding penalty of SP does not occur for some cases.<br>C7 is the only predicate which can be used (condition cannot be executed) | | | |

Fig. 141 sth (Ra+)I9,Rb

| | |
|---|---|
| Behavior | **H[Ra] <- Rb[15:0]; Ra <- Ra+(sext(I9[8:1]) << 1);**<br><br>**Store half word data stored in Rb to address indicated by Ra.**<br>**Furthermore, add immediate value (I9) to Ra and store result in Ra.** |

| Assembler mnemonic | Format | Affecting flag | Affected flag |
|---|---|---|---|
| **sth (Ra+)I9,Rb** | 32bits | — | PSR.AEE |

| Remarks |
|---|
| Writing to Ra does not take place when I9 is 0.<br>Misalignment exception occurs when Ra is not aligned to 2 bytes.<br>I9 is a signed value whose lower 1 bit shall be 0. |

Fig. 142 sth (Ra+),Rb

| | |
|---|---|
| Behavior | **=> sth (Ra+)2,Rb**<br><br>**H(Ra) <- Rb[15:0]; Ra <- Ra+sext(2);**<br><br>**Store half word data stored in Rb to address indicated Ra.**<br>**Furthermore, add 2 to Ra and store result in Ra.** |

| Assembler mnemonic | Format | Affecting flag | Affected flag |
|---|---|---|---|
| **sth (Ra+),Rb** | 32bit synonym | — | PSR.AEE |

| Remarks |
|---|
| Misalignment exception occurs when Ra is not aligned to 2 bytes. |

Fig. 143 sth (Ra2+),Rb2

| | |
|---|---|
| Behavior | **H(Ra2) <- Rb2[15:0]; Ra2 <- Ra2 + sext(2);**<br><br>**Store half word data stored in Rb2 to address indicated Ra2.**<br>**Furthermore, add 2 to Ra2 and store result in Ra2.** |

| Assembler mnemonic | Format | Affecting flag | Affected flag |
|---|---|---|---|
| **sth (Ra2+),Rb2** | 16bits | — | PSR.AEE |

| Remarks |
|---|
| Misalignment exception occurs when Ra2 is not aligned to 2 bytes.<br>C7 is the only predicate which can be used (condition cannot be executed) |

Fig. 144 sth (Ra),Rb

| | |
|---|---|
| Behavior | **=> sth (Ra+)0,Rb**<br><br>**H(Ra) <- Rb[15:0];**<br><br>**Store half word data stored in Rb to address indicated Ra.** |

| Assembler mnemonic | Format | Affecting flag | Affected flag |
|---|---|---|---|
| **sth (Ra),Rb** | 32bit synonym | — | PSR.AEE |

| Remarks |
|---|
| Misalignment exception occurs when Ra is not aligned to 2 bytes.<br><br>Forwarding penalty of Ra does not occur for some cases. |

Fig. 145 sth (Ra2),Rb2

| | | | |
|---|---|---|---|
| Behavior | **H(Ra2) <- Rb2[15:0];**<br><br>**Store half word data stored in Rb2 to address indicated Ra2.** | | |
| Assembler mnemonic | Format | Affecting flag | Affected flag |
| **sth (Ra2),Rb2** | 16bits | — | PSR.AEE |
| Remarks | | | |
| Misalignment exception occurs when Ra2 is not aligned to 2 bytes.<br><br>C7 is the only predicate which can be used （condition cannot be executed） | | | |

Fig. 146 stb (Ra,D8),Rb

| | |
|---|---|
| Behavior | **B[Ra+uext(D8)] <- Rb[ 7:0];**<br><br>**Store byte data stored in Rb to address resulted from adding displacement value (D8) to Ra.** |

| Assembler mnemonic | Format | Affecting flag | Affected flag |
|---|---|---|---|
| **stb (Ra,D8),Rb** | 32bits | — | — |

| Remarks |
|---|
| D8 is an unsigned value.<br><br>Forwarding penalty of Ra does not occur for some cases when D8 is 0. |

Fig. 147 stb (GP,D11),Rb

| Behavior | B[GP+uext(D11)] <- Rb[ 7:0];<br><br>**Store byte data stored in Rb to address resulted from adding displacement value (D11) to GP.** |
|---|---|

| Assembler mnemonic | Format | Affecting flag | Affected flag |
|---|---|---|---|
| **stb (GP,D11),Rb** | 32bits | — | — |

| Remarks |
|---|
| D11 is an unsigned value.<br><br>Forwarding penalty of GP does not occur when D11 is 0. |

Fig. 148 stb (SP,D11),Rb

| | |
|---|---|
| Behavior | **B[SP+uext(D11)] <- Rb[ 7:0];**<br><br>**Store byte data stored in Rb to address resulted from adding displacement value (D11) to SP.** |

| Assembler mnemonic | Format | Affecting flag | Affected flag |
|---|---|---|---|
| **stb (SP,D11),Rb** | 32bits | — | — |

| Remarks |
|---|
| D11 is an unsigned value.<br><br>Forwarding penalty of SP does not occur for some cases when D11 is 0. |

Fig. 149 stb (Ra+)I8,Rb

| Behavior | **B[Ra] <- Rb[ 7:0]; Ra <- Ra+sext(I8);**<br><br>**Store byte data stored in Rb to address indicated Ra.**<br>**Furthermore, add immediate value (I8) to Ra and store result in Ra.** | | |
|---|---|---|---|
| Assembler mnemonic | Format | Affecting flag | Affected flag |
| **stb (Ra+)I8,Rb** | 32bits | — | |
| Remarks | | | |
| I8 is a signed value.<br>Writing to Ra does not take place when I8 is 0. | | | |

Fig. 150 stb (Ra+),Rb

| | |
|---|---|
| Behavior | **=> stb (Ra+)1,Rb**<br><br>**B(Ra) <- Rb[ 7:0]; Ra <- Ra+sext(1);**<br><br>**Store byte data stored in Rb to address indicated Ra.**<br>**Furthermore, add 1 to Ra and store result in Ra.** |

| Assembler mnemonic | Format | Affecting flag | Affected flag |
|---|---|---|---|
| **stb (Ra+),Rb** | 32bit synonym | — | — |

| Remarks |
|---|
| |

Fig. 151 stb (Ra),Rb

| | |
|---|---|
| Behavior | **=>stb (Ra+)0,Rb**<br><br>**B(Ra) <- Rb[ 7:0];**<br><br>**Store byte data stored in Rb to address indicated Ra.** |

| Assembler mnemonic | Format | Affecting flag | Affected flag |
|---|---|---|---|
| **stb (Ra),Rb** | 32bit synonym | — | — |

| Remarks |
|---|
| Forwarding penalty of Ra does not occur for some cases. |

Fig. 152 stp (Ra,D11),Rb:Rb+1

| | |
|---|---|
| Behavior | **D(Ra+(uext(D11[10:3]) << 3)) <- Rb:Rb+1;**<br><br>**Store 2 items of word data stored in Rb and Rb+1 to address resulted from adding displacement value (D11) to Ra.** |

| Assembler mnemonic | Format | Affecting flag | Affected flag |
|---|---|---|---|
| **stp (Ra,D11),Rb:Rb+1** | 32bits | — | PSR.AEE |

| Remarks |
|---|
| D11 is an unsigned value whose lower 3 bits shall be 0.<br><br>Rb shall be an even number.<br><br>Misalignment exception occurs when Ra+(uext(D11[10:3]) << 3)is not aligned to 8 bytes.<br><br>Forwarding penalty of Ra does not occur for some cases when D11 is 0.<br><br>D(Ra+(uext(D11[10:3]) << 3)) <- Rb:Rb+1 precisely means as follows:<br><br>effective_address <- Ra+(uext(D11[10:3]) << 3);<br><br>W(effective_address) <- Rb;<br><br>W(effective_address+4) <- Rb+1;<br><br>Fixed regardless of endian |

Fig. 153 stp (GP,D14),Rb:Rb+1

| Behavior | **D(GP+(uext(D14[13:3]) << 3)) <- Rb:Rb+1;**<br><br>**Store 2 items of word data stored in Rb and Rb+1 to address resulted from adding displacement value (D14) to GP.** |
|---|---|

| Assembler mnemonic | Format | Affecting flag | Affected flag |
|---|---|---|---|
| **stp (GP,D14),Rb:Rb+1** | 32bits | – | PSR.AEE |

Remarks

D14 is an unsigned value whose lower 3 bits shall be 0.

Rb shall be an even number.

Misalignment exception occurs when GP+(uext(D14[13:3]) << 3) is not aligned to 8 bytes.

Forwarding penalty of GP does not occur for some cases when D14 is 0.

D(GP+(uext(D14[13:3]) << 3)) <- Rb:Rb+1 precisely means as follows:

```
effective_address <- GP+(uext(D14[13:3]) << 3);
W(effective_address)     <- Rb;
W(effective_address+4) <- Rb+1;
Fixed regardless of endian
```

Fig. 154 stp (SP,D14),Rb:Rb+1

| Behavior | |
|---|---|
| Behavior | **D(SP+(uext(D14[13:3]) << 3)) <- Rb:Rb+1;**<br><br>**Store 2 items of word data stored in Rb and Rb+1 to address resulted from adding displacement value (D14) to SP.** |

| Assembler mnemonic | Format | Affecting flag | Affected flag |
|---|---|---|---|
| **stp (SP,D14),Rb:Rb+1** | 32bits | — | PSR.AEE |

Remarks

D14 is an unsigned value whose lower 3 bits shall be 0.

Rb shall be an even number.

Misalignment exception occurs when SP+(uext(D14[13:3]) << 3) is not aligned to 8 bytes.

Forwarding penalty of SP does not occur for some cases when D14 is 0.

D(SP+(uext(D14[13:3]) << 3)) <- Rb:Rb+1 precisely means as follows:

effective_address <- SP+(uext(D14[13:3]) << 3);

W(effective_address) <- Rb;

W(effective_address+4) <- Rb+1;

Fixed regardless of endian

Fig. 155 stp (SP,D7),Rb:Rb+1

| | |
|---|---|
| Behavior | **D(SP+(uext(D7[6:3]) << 3)) <- Rb:Rb+1;**<br><br>**Store 2 items of word data stored in Rb and Rb+1 to address resulted from adding displacement value (D7) to SP.** |

| Assembler mnemonic | Format | Affecting flag | Affected flag |
|---|---|---|---|
| **stp (SP,D7),Rb:Rb+1** | 16bits | — | PSR.AEE |

Remarks

D7 is an unsigned value whose lower 3 bits shall be 0.

Rb shall be an even number.

Misalignment exception occurs when SP+(uext(D7[6:3]) << 3)is not aligned to 8 bytes.

Forwarding penalty of SP does not occur for some cases when D7 is 0.

D(SP+(uext(D7[6:3]) << 3)) <- Rb:Rb+1 precisely means as follows:

effective_address <- SP+(uext(D7[6:3]) << 3);

W(effective_address) <- Rb;

W(effective_address+4) <- Rb+1;

Fixed regardless of endian

C7 is the only predicate which can be used (condition cannot be executed)

Fig. 156 stp (SP),Rb:Rb+1

| | |
|---|---|
| Behavior | **=> stp (SP,0),Rb:Rb+1**<br><br>**D(SP) <- Rb:Rb+1;**<br><br>**Store 2 items of word data stored in LR and SVR to address indicated by SP.** |

| Assembler mnemonic | Format | Affecting flag | Affected flag |
|---|---|---|---|
| **stp (SP),Rb:Rb+1** | 16bit synonym | — | PSR.AEE |

| Remarks |
|---|
| ※ Rb shall be an even number.<br>Misalignment exception occurs when SPis not aligned to 8 bytes.<br>※Forwarding penalty of SP does not occur for some cases.<br>D(SP) <- Rb:Rb+1 precisely means as follows:<br>effective_address <- SP;<br>W(effective_address) <- Rb;<br>W(effective_address+4) <- Rb+1;<br>Fixed regardless of endian<br>C7 is the only predicate which can be used (condition cannot be executed) |

Fig. 157 stp (Ra+)I11,Rb:Rb+1

| | |
|---|---|
| Behavior | **D(Ra) <- Rb:Rb+1;**<br>**Ra <- Ra+(sext(I11[10:3]) << 3);**<br><br>**Store 2 items of word data stored in Rb and Rb+1 to address indicated by Ra.**<br>**Furthermore, add immediate value (I11) to Ra and store result in Ra.** |

| Assembler mnemonic | Format | Affecting flag | Affected flag |
|---|---|---|---|
| **stp (Ra+)I11,Rb:Rb+1** | 32bits | — | PSR.AEE |

| Remarks |
|---|
| I11 is a signed value whose lower 3 bits shall be 0.<br>Rb shall be an even number.<br>Writing to Ra does not take place when I11 is 0.<br>Misalignment exception occurs when Ra is not aligned to 8 bytes.<br>D(Ra) <- Rb:Rb+1 precisely means as follows:<br>effective_address <- Ra<br>W(effective_address) <- Rb<br>W(effective_address+4) <- Rb+1<br>Fixed regardless of endian |

Fig. 158 stp (Ra+),Rb:Rb+1

| | |
|---|---|
| Behavior | => stp (Ra+)8,Rb:Rb+1<br><br>D(Ra) <- Rb:Rb+1;<br>Ra <- Ra+(8);<br><br>Store 2 items of word data stored in Rb and Rb+1 to address indicated by Ra.<br><br>Furthermore, add 8 to Ra and store result in Ra. |

| Assembler mnemonic | Format | Affecting flag | Affected flag |
|---|---|---|---|
| stp (Ra+),Rb:Rb+1 | 32bit synonym | — | PSR.AEE |

| Remarks |
|---|
| ※Rb shall be an even number.<br>Misalignment exception occurs when Ra is not aligned to 8 bytes.<br>D(Ra) <- Rb:Rb+1 precisely means as follows:<br>effective_address <- Ra<br>W(effective_address) <- Rb<br>W(effective_address+4) <- Rb+1<br>Fixed regardless of endian |

Fig. 159 stp (Ra2+),Rb2:Rb2+1

| | |
|---|---|
| Behavior | **D(Ra2) <- Rb2:Rb2+1;**<br>**Ra2 <- Ra2 + sext(8);**<br><br>**Store 2 items of word data stored in Rb2 and Rb2+1 to address indicated by Ra2.**<br><br>**Furthermore, add 8 to Ra2 and store result in Ra2.** |

| Assembler mnemonic | Format | Affecting flag | Affected flag |
|---|---|---|---|
| **stp (Ra2+),Rb2:Rb2+1** | 16bits | — | PSR.AEE |

| Remarks |
|---|
| Rb2 shall be an even number.<br>Misalignment exception occurs when Ra2 is not aligned to 8 bytes.<br>D(Ra2) <- Rb2:Rb2+1 precisely means as follows:<br>effective_address <- Ra2<br>W(effective_address) <- Rb2<br>W(effective_address+4) <- Rb2+1<br>Fixed regardless of endian<br>C7 is the only predicate which can be used (condition cannot be executed) |

Fig. 160 stp (Ra),Rb:Rb+1

| | |
|---|---|
| Behavior | **=> stp (Ra+)0,Rb:Rb+1**<br><br>**D(Ra) <- Rb:Rb+1;**<br><br>**Store 2 items of word data stored in Rb and Rb+1 to address indicated by Ra.** |

| Assembler mnemonic | Format | Affecting flag | Affected flag |
|---|---|---|---|
| **stp (Ra),Rb:Rb+1** | 32bit synonym | — | PSR.AEE |

| Remarks |
|---|
| ※Rb shall be an even number.<br><br>Misalignment exception occurs when Ra is not aligned to 8 bytes.<br><br>Forwarding penalty of Ra does not occur for some cases.<br><br>D(Ra) <- Rb:Rb+1 precisely means as follows:<br><br>effective_address <- Ra<br><br>W(effective_address) <- Rb<br><br>W(effective_address+4) <- Rb+1<br><br>Fixed regardless of endian |

Fig. 161 stp (Ra,D11),LR:SVR

| | |
|---|---|
| Behavior | **tmp[63:32] <- LR;**<br>**tmp[31:16] <- 0x00;**<br>**tmp[15: 0] <- SVR;**<br>**D(Ra+(uext(D11[10:3]) << 3)) <- tmp[63;0];**<br><br>**Store 2 items of word data stored in LR and SVR to address resulted from adding displacement value (D11) to Ra.** |

| Assembler mnemonic | Format | Affecting flag | Affected flag |
|---|---|---|---|
| **stp (Ra,D11),LR:SVR** | 32bits | — | SVR,PSR.AEE |

| Remarks |
|---|
| D11 is an unsigned value whose lower 3 bits shall be 0.<br>Misalignment exception occurs when Ra+(uext(D11[10:3]) << 3) is not aligned to 8 bytes.<br>Forwarding penalty of Ra does not occur for some cases when D11 is 0.<br>D(Ra+(uext(D11[10:3]) << 3)) <- LR:SVR precisely means as follows:<br>effective_address <- Ra+(uext(D11[10:3]) << 3);<br>W(effective_address) <- LR;<br>tmp[31:16] <- 0x00;<br>tmp[15: 0] <- SVR;<br>W(effective_address+4) <- tmp[31:0];<br>Fixed regardless of endian |

Fig. 162 stp (Ra),LR:SVR

Behavior

=> stp (Ra,0),LR:SVR tmp[63:32] <- LR;

tmp[31:16] <- 0x00;

tmp[15: 0] <- SVR;

D(Ra) <- tmp[63;0];

Store 2 items of word data stored in LR and SVR to address indicated by Ra.

| Assembler mnemonic | Format | Affecting flag | Affected flag |
|---|---|---|---|
| **stp (Ra),LR:SVR** | 32bit synonym | — | PSR.AEE |

Remarks

Misalignment exception occurs when Ra is not aligned to 8 bytes.

Forwarding penalty of Ra does not occur for some cases.

D(Ra) <- LR:SVR precisely means as follows:

```
effective_address <- Ra;
W(effective_address)    <- LR;
tmp[31:16] <- 0x00;
tmp[15: 0] <- SVR;
W(effective_address+4) <- tmp[31:0];
Fixed regardless of endian
```

Fig. 163 stp (GP,D14),LR:SVR

| | |
|---|---|
| Behavior | **tmp[63:32] <- LR;**<br>**tmp[31:16] <- 0x00;**<br>**tmp[15: 0] <- SVR;**<br>**D(GP+(uext(D14[13:3]) << 3)) <- tmp[63;0];**<br><br>**Store 2 items of word data stored in LR and SVR to address resulted from adding displacement value (D14) to GP.** |

| Assembler mnemonic | Format | Affecting flag | Affected flag |
|---|---|---|---|
| **stp (GP,D14),LR:SVR** | 32bits | — | SVR,PSR.AEE |

| Remarks |
|---|
| D14 is an unsigned value whose lower 3 bits shall be 0.<br>Misalignment exception occurs when GP+(uext(D14[13:3]) << 3) is not aligned to 8 bytes.<br>Forwarding penalty of GP does not occur for some cases when D14 is 0.<br>D(GP+(uext(D14[13:3]) << 3)) <- LR:SVR precisely means as follows:<br>effective_address <- GP+(uext(D14[13:3]) << 3);<br>W(effective_address) <- LR;<br>tmp[31:16] <- 0x00;<br>tmp[15: 0] <- SVR;<br>W(effective_address+4) <- tmp[31:0];<br>Fixed regardless of endian |

Fig. 164 stp (SP,D14),LR:SVR

| | |
|---|---|
| Behavior | **tmp[63:32] <- LR;**<br>**tmp[31:16] <- 0x00;**<br>**tmp[15: 0] <- SVR;**<br>**D(SP+(uext(D14[13:3]) << 3)) <- tmp[63;0];**<br><br>**Store 2 items of word data stored in LR and SVR to address resulted from adding displacement value (D14) to SP.** |

| Assembler mnemonic | Format | Affecting flag | Affected flag |
|---|---|---|---|
| **stp (SP,D14),LR:SVR** | 32bits | — | SVR,PSR.AEE |

| Remarks |
|---|
| D14 is an unsigned value whose lower 3 bits shall be 0.<br>Misalignment exception occurs when SP+(uext(D14[13:3]) << 3) is not aligned to 8 bytes.<br>Forwarding penalty of SP does not occur for some cases when D14 is 0.<br>D(SP+(uext(D14[13:3]) << 3)) <- LR:SVR precisely means as follows:<br>effective_address <- SP+(uext(D14[13:3]) << 3);<br>W(effective_address) <- LR;<br>tmp[31:16] <- 0x00;<br>tmp[15: 0] <- SVR;<br>W(effective_address+4) <- tmp[31:0];<br>Fixed regardless of endian |

Fig. 165 stp (SP,D7),LR:SVR

| | |
|---|---|
| Behavior | **tmp[63:32] <- LR;**<br>**tmp[31:16] <- 0x00;**<br>**tmp[15: 0] <- SVR;**<br>**D(SP+(uext(D7[6:3]) << 3)) <- tmp[63:0];**<br><br>**Store 2 items of word data stored in LR and SVR to address resulted from adding displacement value (D7) to SP.** |

| Assembler mnemonic | Format | Affecting flag | Affected flag |
|---|---|---|---|
| **stp (SP,D7),LR:SVR** | 16bits | — | SVR,PSR.AEE |

| Remarks |
|---|
| D7 is an unsigned value whose lower 3 bits shall be 0.<br>Misalignment exception occurs when SP+(uext(D7[6:3]) << 3) is not aligned to 8 bytes.<br>Forwarding penalty of SP does not occur for some cases when D7 is 0.<br>D(SP+(uext(D7[6:3]) << 3)) <- LR:SVR precisely means as follows:<br>effective_address <- Ra+(uext(D7[6:3]) << 3);<br>W(effective_address) <- LR;<br>tmp[31:16] <- 0x00;<br>tmp[15: 0] <- SVR;<br>W(effective_address+4) <- tmp;<br>Fixed regardless of endian<br>C7 is the only predicate which can be used (condition cannot be executed) |

Fig. 166 stp (SP),LR:SVR

| | |
|---|---|
| Behavior | **=>stp (SP,0),LR:SVR**<br><br>**tmp[63:32] <- LR;**<br>**tmp[31:16] <- 0x00;**<br>**tmp[15: 0] <- SVR;**<br>**D(SP) <- tmp[63:0];**<br><br>**Store 2 items of word data stored in LR and SVR to address indicated by SP.** |

| Assembler mnemonic | Format | Affecting flag | Affected flag |
|---|---|---|---|
| **stp (SP),LR:SVR** | 16bit synonym | — | SVR,PSR.AEE |

| Remarks |
|---|
| Misalignment exception occurs when SP is not aligned to 8 bytes.<br>※Forwarding penalty of SP does not occur for some cases.<br>D(SP) <- LR:SVR precisely means as follows:<br>effective_address <- SP;<br>W(effective_address) <- LR;<br>tmp[31:16] <- 0x00;<br>tmp[15: 0] <- SVR;<br>W(effective_address+4) <- tmp;<br>Fixed regardless of endian<br>C7 is the only predicate which can be used (condition cannot be executed) |

Fig. 167 stp (Ra,D11),TAR:UDR

| Behavior | **Instruction not implemented.** | | |
|---|---|---|---|
| Assembler mnemonic | Format | Affecting flag | Affected flag |
| **stp (Ra,D11),TAR:UDR** | 32bits | — | — |
| Remarks | | | |
| | | | |

Fig. 168 stp (GP,D14),TAR:UDR

| | | | | |
|---|---|---|---|---|
| Behavior | **Instruction not implemented.** | | | |
| Assembler mnemonic | | Format | Affecting flag | Affected flag |
| **stp (GP,D14),TAR:UDR** | | 32bits | — | — |
| Remarks | | | | |
| | | | | |

Fig. 169 stp (SP,D14),TAR:UDR

| Behavior | Instruction not implemented. | | |
|---|---|---|---|
| Assembler mnemonic | Format | Affecting flag | Affected flag |
| **stp (SP,D14),TAR:UDR** | 32bits | — | — |
| Remarks | | | |
| | | | |

Fig. 170 sthp (Ra,D10),Rb:Rb+1

| | | | | |
|---|---|---|---|---|
| Behavior | **W(Ra+(uext(D10[9:2]) << 2)) <- Rb[15:0]:Rb+1[15:0];**<br><br>**Store 2 items of half word data stored in Rb and Rb+1 to address resulted from adding displacement value (D10) to Ra.** | | | |
| Assembler mnemonic | | Format | Affecting flag | Affected flag |
| **sthp (Ra,D10),Rb:Rb+1** | | 32bits | — | PSR.AEE |
| Remarks | | | | |
| D10 is an unsigned value whose lower 2 bits shall be 0.<br>Rb shall be an even number.<br>Misalignment exception occurs when Ra+(uext(D10[9:2]) << 2) is not aligned to 4 bytes.<br>Forwarding penalty of Ra does not occur for some cases when D10 is 0. | | | | |

Fig. 171 sthp (Ra+)I10,Rb:Rb+1

| | | | | |
|---|---|---|---|---|
| Behavior | **W(Ra) <- Rb[15:0]:Rb+1[15:0];**<br>**Ra <- Ra+(sext(I10[9:2]) << 2);**<br><br>**Store 2 items of half word data stored in Rb and Rb+1 to address indicated by Ra.**<br>**Furthermore, add immediate value (I10) to Ra and store result in Ra.** | | | |
| Assembler mnemonic | | Format | Affecting flag | Affected flag |
| **sthp (Ra+)I10,Rb:Rb+1** | | 32bits | – | PSR.AEE |
| Remarks | | | | |
| I10 is a signed value whose lower 2 bits shall be 0.<br>Rb shall be an even number.<br>Writing to Ra does not take place when I10 is 0.<br>Misalignment exception occurs when Ra is not aligned to 4 bytes. | | | | |

Fig. 172 sthp (Ra+),Rb:Rb+1

| | |
|---|---|
| Behavior | **=> sthp (Ra+)4,Rb:Rb+1**<br><br>**W(Ra) <- Rb[15:0]:Rb+1[15:0];**<br><br>**Ra <- Ra+sext(4);**<br><br>**Store 2 items of half word data stored in Rb and Rb+1 to address indicated by Ra.**<br><br>**Furthermore, add 4 to Ra and store result in Ra.** |

| Assembler mnemonic | Format | Affecting flag | Affected flag |
|---|---|---|---|
| **sthp (Ra+),Rb:Rb+1** | 32bit synonym | — | PSR.AEE |

| Remarks |
|---|
| ※Rb shall be an even number.<br><br>Misalignment exception occurs when Ra is not aligned to 4 bytes. |

Fig. 173 sthp (Ra2+),Rb2:Rb2+1

| | |
|---|---|
| Behavior | **W(Ra2) <- Rb2[15:0]:Rb2+1[15:0];**<br>**Ra2 <- Ra2 + sext(4);**<br><br>**Store 2 items of half word data stored in Rb2 and Rb2+1 to address indicated by Ra2.**<br>**Furthermore, add 4 to Ra and store result in Ra.** |

| Assembler mnemonic | Format | Affecting flag | Affected flag |
|---|---|---|---|
| **sthp (Ra2+),Rb2:Rb2+1** | 16bits | — | PSR.AEE |

| Remarks |
|---|
| Rb2 shall be an even number.<br>Misalignment exception occurs when Ra2 is not aligned to 4 bytes.<br>C7 is the only predicate which can be used (condition cannot be executed) |

Fig. 174 sthp (Ra),Rb:Rb+1

| | |
|---|---|
| Behavior | => sthp (Ra+)0,Rb:Rb+1<br><br>W(Ra) <- Rb[15:0]:Rb+1[15:0];<br><br>Store 2 items of half word data stored in Rb and Rb+1 to address indicated by Ra. |

| Assembler mnemonic | Format | Affecting flag | Affected flag |
|---|---|---|---|
| sthp (Ra),Rb:Rb+1 | 32bit synonym | — | PSR.AEE |

| Remarks |
|---|
| ※Rb shall be an even number.<br><br>Misalignment exception occurs when Ra is not aligned to 4 bytes.<br><br>Forwarding penalty of Ra does not occur for some cases. |

Fig. 175 stbp (Ra,D9),Rb:Rb+1

| | |
|---|---|
| Behavior | **H(Ra+(uext(D9[8:1]) << 1)) <- Rb[7:0]:Rb+1[7:0];**<br><br>**Store 2 items of byte data stored in Rb and Rb+1 to address resulted from adding displacement value (D9) to Ra.** |

| Assembler mnemonic | Format | Affecting flag | Affected flag |
|---|---|---|---|
| **stbp (Ra,D9),Rb:Rb+1** | 32bits | — | PSR.AEE |

| Remarks |
|---|
| D9 is an unsigned value whose lower 1 bit shall be 0.<br><br>Rb shall be an even number.<br><br>Misalignment exception occurs when Ra+(uext(D9[8:1]) << 1) is not aligned to 2 bytes.<br><br>Forwarding penalty of Ra does not occur for some cases when D9 is 0. |

Fig. 176 stbp (Ra+)I9,Rb:Rb+1

| | |
|---|---|
| Behavior | **H(Ra) <- Rb[7:0]:Rb+1[7:0];**<br>**Ra <- Ra+(sext(I9[8:1]) << 1);**<br><br>**Store 2 items of byte data stored in Rb and Rb+1 to address indicated by Ra.**<br>**Furthermore, add immediate value (I9) to Ra and store result in Ra.** |

| Assembler mnemonic | Format | Affecting flag | Affected flag |
|---|---|---|---|
| **stbp (Ra+)I9,Rb:Rb+1** | 32bits | — | PSR.AEE |

| Remarks |
|---|
| I9 is a signed value whose lower 1 bit shall be 0.<br>Rb shall be an even number.<br>Writing to Ra does not take place when I9 is 0.<br>Misalignment exception occurs when Ra is not aligned to 2 bytes. |

Fig. 177 stbp (Ra+),Rb:Rb+1

| | |
|---|---|
| Behavior | **=> stbp (Ra+)2,Rb:Rb+1**<br><br>**H(Ra) <- Rb[7:0]:Rb+1[7:0];**<br>**Ra <- Ra+(sext(2);**<br><br>**Store 2 items of byte data stored in Rb and Rb+1 to address indicated by Ra.**<br>**Furthermore, add 2 to Ra and store result in Ra.** |

| Assembler mnemonic | Format | Affecting flag | Affected flag |
|---|---|---|---|
| **stbp (Ra+),Rb:Rb+1** | 32bit synonym | — | PSR.AEE |

| Remarks |
|---|
| ※Rb shall be an even number.<br>Misalignment exception occurs when Ra is not aligned to 2 bytes. |

Fig. 178 stbp (Ra),Rb:Rb+1

| | |
|---|---|
| Behavior | **=> stbp (Ra+)0,Rb:Rb+1**<br><br>**H(Ra) <- Rb[7:0]:Rb+1[7:0];**<br><br>**Store 2 items of byte data stored in Rb and Rb+1 to address indicated by Ra.** |

| Assembler mnemonic | Format | Affecting flag | Affected flag |
|---|---|---|---|
| **stbp (Ra),Rb:Rb+1** | 32bit synonym | — | PSR.AEE |

| Remarks |
|---|
| ※Rb shall be an even number.<br>Misalignment exception occurs when Ra is not aligned to 2 bytes.<br>Forwarding penalty of Ra does not occur for some cases. |

Fig. 179 stbh (Ra+)I7,Rb

| | |
|---|---|
| Behavior | **H(Ra) <- Rb[23:16]:Rb[7:0];**<br>**Ra <- Ra+(sext(I7[6:1]) << 1);**<br><br>**Store 2 items of byte data stored in Rb to address indicated by Ra. 2 items of byte data are stored in 16 ~ 23 bits and 0 ~ 7 bits in Rb.**<br>**Furthermore, add immediate value (I7) to Ra and store result in Ra.** |

| Assembler mnemonic | Format | Affecting flag | Affected flag |
|---|---|---|---|
| **stbh (Ra+)I7,Rb** | 32bits | — | PSR.AEE |

| Remarks |
|---|
| I7 is a signed value whose lower 1 bit shall be 0.<br>Writing to Ra does not take place when I7 is 0.<br>Misalignment exception occurs when Ra is not aligned to 2 bytes. |

Fig. 180 stbh (Ra+),Rb

| | |
|---|---|
| Behavior | **=> stbh (Ra+)2,Rb**<br><br>**H(Ra) <- Rb[23:16]:Rb[7:0];**<br>**Ra <- Ra+sext(2);**<br><br>**Store 2 items of byte data stored in Rb to address indicated by Ra. 2 items of byte data are stored in 16 ~ 23 bits and 0 ~ 7 bits in Rb.**<br>**Furthermore, add 2 to Ra and store result in Ra.** |

| Assembler mnemonic | Format | Affecting flag | Affected flag |
|---|---|---|---|
| **stbh (Ra+),Rb** | 32bit synonym | — | PSR.AEE |

| Remarks |
|---|
| Misalignment exception occurs when Ra is not aligned to 2 bytes. |

Fig. 181 stbh (Ra),Rb

| | |
|---|---|
| Behavior | => stbh (Ra+)0,Rb<br><br>H(Ra) <- Rb[23:16]:Rb[7:0];<br><br>Store 2 items of byte data stored in Rb to address indicated by Ra. 2 items of byte data are stored in 16 ~ 23 bits and 0 ~ 7 bits in Rb. |

| Assembler mnemonic | Format | Affecting flag | Affected flag |
|---|---|---|---|
| stbh (Ra),Rb | 32bit synonym | — | PSR.AEE |

| Remarks |
|---|
| Misalignment exception occurs when Ra is not aligned to 2 bytes. |

Fig. 182 stbhp (Ra+)I7,Rb:Rb+1

| | |
|---|---|
| Behavior | **W(Ra) <- Rb[23:16]:Rb[7:0]:Rb+1[23:16]:Rb+1[7:0];**<br>**Ra <- Ra+(sext(I7[6:2]) << 2);**<br><br>**Store 4 items of byte data stored in Rb and Rb+1 to address indicated by Ra. 4 items of byte data are stored in 16 ~ 23 bits and 0 ~ 7 bits in Rb and Rb+1.**<br>**Furthermore, add immediate value (I7) to Ra and store result in Ra.** |

| Assembler mnemonic | Format | Affecting flag | Affected flag |
|---|---|---|---|
| **stbhp (Ra+)I7,Rb:Rb+1** | 32bits | — | PSR.AEE |

| Remarks |
|---|
| I7 is a signed value whose lower 2 bits shall be 0.<br>Writing to Ra does not take place when I7 is 0.<br>Misalignment exception occurs when Ra is not aligned to 4 bytes. |

Fig. 183 stbhp (Ra+),Rb:Rb+1

| | |
|---|---|
| Behavior | **=> stbhp (Ra+)4,Rb:Rb+1**<br><br>**W(Ra) <- Rb[23:16]:Rb[7:0]:Rb+1[23:16]:Rb+1[7:0];**<br>**Ra <- Ra+sext(4);**<br><br>**Store 4 items of byte data stored in Rb and Rb+1 to address indicated by Ra. 4 items of byte data are stored in 16 ~ 23 bits and 0 ~ 7 bits in Rb and Rb+1.**<br>**Furthermore, add 4 to Ra and store result in Ra.** |

| Assembler mnemonic | Format | Affecting flag | Affected flag |
|---|---|---|---|
| **stbhp (Ra+),Rb:Rb+1** | 32bit synonym | — | PSR.AEE |

| Remarks |
|---|
| Misalignment exception occurs when Ra is not aligned to 2 bytes. |

Fig. 184 stbhp (Ra),Rb:Rb+1

| | |
|---|---|
| Behavior | **=> stbhp (Ra+)0,Rb:Rb+1**<br><br>**W(Ra) <- Rb[23:16]:Rb[7:0]:Rb+1[23:16]:Rb+1[7:0];**<br><br>**Store 4 items of byte data stored in Rb and Rb+1 to address indicated by Ra. 4 items of byte data are stored in 16 ~ 23 bits and 0 ~ 7 bits in Rb and Rb+1.** |

| Assembler mnemonic | Format | Affecting flag | Affected flag |
|---|---|---|---|
| **stbhp (Ra),Rb:Rb+1** | 32bit synonym | — | PSR.AEE |

| Remarks |
|---|
| Misalignment exception occurs when Ra is not aligned to 4 bytes. |

Fig. 185 dpref (Ra,D8)

| | |
|---|---|
| Behavior | **Pre-fetch data from address resulted from adding displacement value (D8) to Ra.**<br>**This instruction is not implemented.** |

| Assembler mnemonic | Format | Affecting flag | Affected flag |
|---|---|---|---|
| **dpref (Ra,D8)** | 32bits | — | — |

| Remarks |
|---|
| ★Under discussion |

Fig. 186 ldstb Rb,(Ra)

| | |
|---|---|
| Behavior | **tmp[31:0] <- sext(B(Ra,bus_lock));**<br>**B(Ra,bus_unlock) <- Rb;**<br>**Rb <- tmp[31:0];**<br><br>**Implement atomic load/store.**<br>**Lock bus and exchange value of Rb with memory value of address indicated by Ra. After this, unlock bus.** |

| Assembler mnemonic | Format | Affecting flag | Affected flag |
|---|---|---|---|
| **ldstb Rb,(Ra)** | 32bits | — | — |

| Remarks |
|---|
| VMP switching is disabled while the instruction is being executed. |

Fig. 187 rd C0:C1,Rb,(D11)

<table>
<tr><td>Behavior</td><td colspan="3">

```
if (EREG(D11) is not implemented) {
  extended register access exception
} else {
  tmp <- EREG(D11)
  if (EREG_ERR == 1) {
    Rb <- UD;
    C0:C1 <- 1:0;
  } else {
    Rb <- tmp;
    C0:C1 <- 0:1
  }
}
```

Use immediate value (D11) as external register number, and read in value of such external register.

Output success/failure of reading to C0 and C1.</td></tr>
<tr><td>Assembler mnemonic</td><td>Format</td><td>Affecting flag</td><td>Affected flag</td></tr>
<tr><td>rd C0:C1,Rb,(D11)</td><td>32bit</td><td>C0,C1</td><td>—</td></tr>
<tr><td colspan="4">Remarks</td></tr>
<tr><td colspan="4">D11 is an unsigned value.</td></tr>
</table>

Fig. 188 rd C0:C1,Rb,(Ra,D5)

Behavior

```
if (EREG(Ra+uext(D5)) is not implemented) {
  extended register access exception
} else {
  tmp <- EREG(Ra+uext(D5))
  if (EREG_ERR == 1) {
    Rb <- UD;
    C0:C1 <- 1:0;
  } else {
    Rb <- tmp;
    C0:C1 <- 0:1;
  }
}
```

Use value resulted from adding Ra and displacement value (D5) as external register number, and read value of such external register into Rb.

Output success/failure of reading to C0 and C1.

| Assembler mnemonic | Format | Affecting flag | Affected flag |
|---|---|---|---|
| rd C0:C1,Rb,(Ra,D5) | 32bit | C0,C1 | — |

Remarks

D5 is an unsigned value.

The contents of Ra+uext(D5) represents a register number.

Fig. 189 rd C0:C1,Rb,(Ra)

<table>
<tr><td>Behavior</td><td colspan="3">

=> rd C0:C1,Rb,(Ra,0)

```
if (EREG(Ra) is not implemented) {
  extended register access exception
} else {
  tmp <- EREG(Ra)
  if (EREG_ERR == 1) {
    Rb <- UD;
    C0:C1 <- 1:0;
  } else {
    Rb <- tmp;
    C0:C1 <- 0:1
  }
}
```

Use Ra as external register number, and read value of such external register into Rb.

Output success/failure of reading to C0 and C1.
</td></tr>
<tr><td>Assembler mnemonic</td><td>Format</td><td>Affecting flag</td><td>Affected flag</td></tr>
<tr><td>rd C0:C1,Rb,(Ra)</td><td>32bit synonym</td><td>C0,C1</td><td>—</td></tr>
<tr><td colspan="4">Remarks</td></tr>
<tr><td colspan="4"></td></tr>
</table>

Fig. 190 rd C0:C1,Rb2,(Ra2)

| | |
|---|---|
| Behavior | if (EREG(Ra2) is not implemented) {<br>extended register access exception<br>} else {<br>tmp <- EREG(Ra2)<br>if (EREG_ERR == 1) {<br>Rb2 <- UD;<br>C0:C1 <- 1:0;<br>} else {<br>Rb2 <- tmp;<br>C0:C1 <- 0:1;<br>}<br>}<br><br>Use Ra2 as external register number, and read value of such external register into Rb2.<br>Output success/failure of reading to C0 and C1. |

| Assembler mnemonic | Format | Affecting flag | Affected flag |
|---|---|---|---|
| rd C0:C1,Rb2,(Ra2) | 16bit | C0,C1 | — |

| Remarks |
|---|
| The contents of Ra2 represents a register number.<br>C7 is the only predicate which can be used (condition cannot be executed). |

Fig. 191 rd C2:C3,Rb,(Ra,D5)

| | |
|---|---|
| Behavior | if (EREG(Ra+uext(D5)) is not implemented) {<br>extended register access exception<br>} else {<br>tmp <- EREG(Ra+uext(D5))<br>if (EREG_ERR == 1) {<br>Rb <- UD;<br>C2:C3 <- 1:0;<br>} else {<br>Rb <- tmp;<br>C2:C3 <- 0:1;<br>}<br>}<br><br>Use value resulted from adding Ra and displacement value (D5) as external register number, and read value of such external register into Rb.<br>Output success/failure of reading to C2 and C3. |

| Assembler mnemonic | Format | Affecting flag | Affected flag |
|---|---|---|---|
| rd C2:C3,Rb,(Ra,D5) | 32bit | C2,C3 | — |

| Remarks |
|---|
| D5 is an unsigned value.<br>The contents of Ra+uext(D5) represents a register number. |

Fig. 192 rd C2:C3,Rb,(Ra)

Behavior

```
=> rd C2:C3,Rb,(Ra,0)


if (EREG(Ra) is not implemented) {
  extended register access exception
} else {
  tmp <- EREG(Ra)
  if (EREG_ERR == 1) {
    Rb <- UD;
    C2:C3 <- 1:0;
  } else {
    Rb <- tmp;
    C2:C3 <- 0:1;
  }
}
```

Use Ra as external register number, and read value of such external register into Rb.

Output success/failure of reading to C2 and C3.

| Assembler mnemonic | Format | Affecting flag | Affected flag |
|---|---|---|---|
| rd C2:C3,Rb,(Ra) | 32bit synonym | C2,C3 | — |

Remarks

※The contents of Ra represents a register number.

Fig. 193 rde C0:C1,Rb,(Ra,D5)

Behavior

```
if (EREG(Ra+uext(D5)) is not implemented) {
  extended register access exception
} else {
  tmp <- EREG(Ra+uext(D5))
  if (EREG_ERR == 1) {
    Rb <- UD; C0:C1 <- 1:0;
    extended register error exception
  } else {
    Rb <- tmp;
    C0:C1 <- 0:1;
  }
}
```

Use value resulted from adding Ra and displacement value (D5) as external register number, and read value of such external register into Rb.

Output success/failure of reading to C0 and C1, and extended register error exception occurs in case of failure.

| Assembler mnemonic | Format | Affecting flag | Affected flag |
|---|---|---|---|
| rde C0:C1,Rb,(Ra,D5) | 32bit | C0,C1 | — |

Remarks

D5 is an unsigned value.

The contents of Ra+uext(D5) represents a register number.

Fig. 194 rde C0:C1,Rb,(Ra)

<table>
<tr><td>Behavior</td><td colspan="3">=> rde C0:C1,Rb,(Ra,0)<br><br>if (EREG(Ra) is not implemented) {<br>  extended register access exception<br>} else {<br>  tmp <- EREG(Ra);<br>  if (EREG_ERR == 1) {<br>    Rb <- UD; C0:C1 <- 1:0;<br>    extended register error exception<br>  } else {<br>    Rb <- tmp;<br>    C0:C1 <- 0:1;<br>  }<br>}<br><br>Use Ra as external register number, and read value of such external register into Rb.<br>Output success/failure of reading to C0 and C1, and extended register error exception occurs in case of failure.</td></tr>
<tr><td>Assembler mnemonic</td><td>Format</td><td>Affecting flag</td><td>Affected flag</td></tr>
<tr><td>rde C0:C1,Rb,(Ra)</td><td>32bit synonym</td><td>C0,C1</td><td>—</td></tr>
<tr><td colspan="4">Remarks</td></tr>
<tr><td colspan="4">※The contents of Ra represents a register number.</td></tr>
</table>

Fig. 195 rde C2:C3,Rb,(Ra,D5)

<table>
<tr><td>Behavior</td><td colspan="3">if (EREG(Ra+uext(D5)) is not implemented) {<br>  extended register access exception<br>} else {<br>  tmp <- EREG(Ra+uext(D5))<br>  if (EREG_ERR == 1) {<br>    Rb <- UD;<br>    C2:C3 <- 1:0;<br>    extended register error exception<br>  } else {<br>    Rb <- tmp;<br>    C2:C3 <- 0:1;<br>  }<br>}<br><br>Use value resulted from adding Ra and displacement value (D5) as external register number, and read value of such external register into Rb.<br>Output success/failure of reading to C2 and C3, and extended register error exception occurs in case of failure.</td></tr>
<tr><td>Assembler mnemonic</td><td>Format</td><td>Affecting flag</td><td>Affected flag</td></tr>
<tr><td>rde C2:C3,Rb,(Ra,D5)</td><td>32bit</td><td>C2,C3</td><td>—</td></tr>
<tr><td colspan="4">Remarks</td></tr>
<tr><td colspan="4">D5 is an unsigned value.<br><br>The contents of Ra+uext(D5) represents a register number.</td></tr>
</table>

Fig. 196 rde C2:C3,Rb,(Ra)

| | |
|---|---|
| Behavior | => rde C2:C3,Rb,(Ra,0)<br><br>if (EREG(Ra) is not implemented) {<br>extended register access exception<br>} else {<br>tmp <- EREG(Ra);<br>if (EREG_ERR == 1) {<br>Rb <- UD; C2:C3 <- 1:0;<br>extended register error exception<br>} else {<br>Rb <- tmp;<br>C2:C3 <- 0:1;<br>}<br>}<br><br>Use Ra as external register number, and read value of such external register into Rb.<br>Output success/failure of reading to C2 and C3, and extended register error exception occurs in case of failure. |

| Assembler mnemonic | Format | Affecting flag | Affected flag |
|---|---|---|---|
| rde C2:C3,Rb,(Ra) | 32bit synonym | C2,C3 | — |

| Remarks |
|---|
| ※The contents of Ra represents a register number. |

Fig. 197 wt C0:C1,(D11),Rb

| | |
|---|---|
| Behavior | if (EREG(D11) is not implemented) {<br>extended register access exception<br>} else {<br>EREG(D11) <- Rb;<br>If (EREG_ERR == 1){<br>C0:C1 <- 1:0;<br>} else {<br>C0:C1 <- 0:1;<br>}<br>}<br><br>Use immediate value (D11) as external register number, and write value of Rb into such external register.<br>Output success/failure of writing to C0 and C1. |

| Assembler mnemonic | Format | Affecting flag | Affected flag |
|---|---|---|---|
| wt C0:C1,(D11),Rb | 32bit | C0,C1 | — |

| Remarks |
|---|
| D11 is an unsigned value.<br>How the extended register is updated at the time of error depends on its implementation. |

Fig. 198 wt C0:C1,(Ra,D5),Rb

<table>
<tr><td>Behavior</td><td colspan="3">

```
if (EREG(Ra+uext(D5)) is not implemented) {
  extended register access exception
} else {
  EREG(Ra+uext(D5)) <- Rb;
   if (EREG_ERR == 1) {
    C0:C1 <- 1:0;
   } else {
    C0:C1 <- 0:1;
  }
}
```

Use value resulted from adding Ra and displacement value (D5) as external register number, and write value of Rb into such external register.

Output success/failure of writing to C0 and C1.</td></tr>
<tr><td>Assembler mnemonic</td><td>Format</td><td>Affecting flag</td><td>Affected flag</td></tr>
<tr><td>wt C0:C1,(Ra,D5),Rb</td><td>32bit</td><td>C0,C1</td><td>—</td></tr>
<tr><td colspan="4">Remarks</td></tr>
<tr><td colspan="4">D5 is an unsigned value.<br>The contents of Ra+uext(D5) represents a register number.<br>How the extended register is updated at the time of error depends on its implementation.</td></tr>
</table>

Fig. 199 wt C0:C1,(Ra),Rb

| | |
|---|---|
| Behavior | => wt C0:C1,(Ra,0),Rb<br><br>if (EREG(Ra) is not implemented) {<br>  extended register access exception<br>} else {<br>  EREG(Ra) <- Rb;<br>  If (EREG_ERR == 1){<br>    C0:C1 <- 1:0;<br>  } else {<br>    C0:C1 <- 0:1;<br>  }<br>}<br><br>Use Ra as external register number, and write value of Rb into such external register.<br>Output success/failure of writing to C0 and C1. |

| Assembler mnemonic | Format | Affecting flag | Affected flag |
|---|---|---|---|
| wt C0:C1,(Ra),Rb | 32bit synonym | C0,C1 | — |

| Remarks |
|---|
| ※How the extended register is updated at the time of error depends on its implementation. |

Fig. 200 wt C0:C1,(Ra2),Rb2

| | |
|---|---|
| Behavior | if (EREG(Ra2) is not implemented) {<br>extended register access exception<br>} else {<br>EREG(Ra2) <- Rb2;<br>if (EREG_ERR == 1) {<br>C0:C1 <- 1:0;<br>} else {<br>C0:C1 <- 0:1;<br>}<br>}<br><br>Use Ra2 as external register number, and write value of Rb2 into such external register.<br>Output success/failure of writing to C0 and C1. |

| Assembler mnemonic | Format | Affecting flag | Affected flag |
|---|---|---|---|
| wt C0:C1,(Ra2),Rb2 | 16bit | C0,C1 | — |

| Remarks |
|---|
| The contents of Ra2 represents a register number.<br>How the extended register is updated at the time of error depends on its implementation.<br>C7 is the only predicate which can be used (condition cannot be executed). |

Fig. 201 wt C2:C3,(Ra,D5),Rb

| | |
|---|---|
| Behavior | if (EREG(Ra+uext(D5)) is not implemented) {<br>extended register access exception<br>} else {<br>EREG(Ra+uext(D5)) <- Rb;<br>if (EREG_ERR == 1) {<br>C2:C3 <- 1:0;<br>} else {<br>C2:C3 <- 0:1;<br>}<br>}<br><br>Use value resulted from adding Ra and displacement value (D5) as external register number, and write value of Rb into such external register.<br>Output success/failure of writing to C2 and C3. |

| Assembler mnemonic | Format | Affecting flag | Affected flag |
|---|---|---|---|
| wt C2:C3,(Ra,D5),Rb | 32bit | C2,C3 | — |

| Remarks |
|---|
| D5 is an unsigned value.<br>The contents of Ra+uext(D5) represents a register number.<br>How the extended register is updated at the time of error depends on its implementation. |

Fig. 202 wt C2:C3,(Ra),Rb

| | |
|---|---|
| Behavior | => wt C2:C3,(Ra,0),Rb<br><br>if (EREG(Ra) is not implemented) {<br>extended register access exception<br>} else {<br>EREG(Ra) <- Rb;<br>if (EREG_ERR == 1) {<br>C2:C3 <- 1:0;<br>} else {<br>C2:C3 <- 0:1;<br>}<br>}<br><br>Use Ra as external register number, and write value of Rb into such external register.<br>Output success/failure of writing to C2 and C3. |

| Assembler mnemonic | Format | Affecting flag | Affected flag |
|---|---|---|---|
| wt C2:C3,(Ra),Rb | 32bit synonym | C2,C3 | — |

| Remarks |
|---|
| ※The contents of Ra represents a register number.<br>※How the extended register is updated at the time of error depends on its implementation. |

Fig. 203 wte C0:C1,(Ra,D5),Rb

| | |
|---|---|
| Behavior | if (EREG(Ra+uext(D5)) is not implemented) {<br>extended register access exception<br>} else {<br>EREG(Ra+uext(D5)) <- Rb;<br>if (EREG_ERR == 1) {<br>C0:C1 <- 1:0;<br>extended register error exception<br>} else {<br>C0:C1 <- 0:1;<br>}<br>}<br><br>Use value resulted from adding Ra and displacement value (D5) as external register number, and write value of Rb into such external register.<br>Output success/failure of writing to C2 and C3, and extended register error exception occurs in case of failure. |

| Assembler mnemonic | Format | Affecting flag | Affected flag |
|---|---|---|---|
| wte C0:C1,(Ra,D5),Rb | 32bit | C0,C1 | — |

| Remarks |
|---|
| D5 is an unsigned value.<br>The contents of Ra+uext(D5) represents a register number.<br>How the extended register is updated at the time of error depends on its implementation. |

Fig. 204 wte C0:C1,(Ra),Rb

Behavior

```
=> wte          C0:C1,(Ra,0),Rb

if (EREG(Ra) is not implemented) {
  extended register access exception
} else {
  EREG(Ra) <- Rb;
  if (EREG_ERR == 1) {
    C0:C1 <- 1:0;
    extended register error exception
  } else {
    C0:C1 <- 0:1;
  }
}
```

Use Ra as external register number, and write value of Rb into such external register.
Output success/failure of writing to C0 and C1, and extended register error exception occurs in case of failure.

| Assembler mnemonic | Format | Affecting flag | Affected flag |
|---|---|---|---|
| **wte C0:C1,(Ra),Rb** | 32bit synonym | C0,C1 | – |

Remarks

※The contents of Ra represents a register number.

※How the extended register is updated at the time of error depends on its implementation.

Fig. 205 wte C2:C3,(Ra,D5),Rb

Behavior

```
if (EREG(Ra+uext(D5)) is not implemented) {
  extended register access exception
} else {
  EREG(Ra+uext(D5)) <- Rb;
  If (EREG_ERR == 1){
    C2:C3 <- 1:0;
    extended register error exception
  } else {
    C2:C3 <- 0:1;
  }
}
```

Use value resulted from adding Ra and displacement value (D5) as external register number, and write value of Rb into such external register.

| Assembler mnemonic | Format | Affecting flag | Affected flag |
|---|---|---|---|
| wt C2:C3,(Ra,D5),Rb | 32bit | C2,C3 | — |

| Remarks |
|---|
| D5 is an unsigned value.<br>The contents of Ra+uext(D5) represents a register number.<br>How the extended register is updated at the time of error depends on its implementation. |

Fig. 206 wte C2:C3,(Ra),Rb

<table>
<tr><td>Behavior</td><td colspan="3">

```
=> wte C2:C3,(Ra,0),Rb

if (EREG(Ra) is not implemented) {
  extended register access exception
} else {
  EREG(Ra) <- Rb;
  if (EREG_ERR == 1) {
    C2:C3 <- 1:0;
    extended register error exception
  } else {
    C2:C3 <- 0:1;
  }
}
```

Use Ra as external register number, and write value of Rb into such external register.

Output success/failure of writing to C2 and C3, and extended register error exception occurs in case of failure.
</td></tr>
</table>

| Assembler mnemonic | Format | Affecting flag | Affected flag |
|---|---|---|---|
| wte C2:C3,(Ra),Rb | 32bit synonym | C2,C3 | — |

| Remarks |
|---|
| ※The contents of Ra represents a register number.<br>※How the extended register is updated at the time of error depends on its implementation. |

Fig. 207 br D20

| | |
|---|---|
| Behavior | **PC <- PC + (sext(D20[19:1]) << 1);**<br><br>**Add displacement value (D20) to current PC value, and branch to address represented by addition result.** |

| Assembler mnemonic | Format | Affecting flag | Affected flag |
|---|---|---|---|
| **br D20** | 32bit | — | — |

| Remarks |
|---|
| D20 is a signed value whose lower 1 bit shall be 0. |

Fig. 208 br D9

| Behavior | **PC <- PC + (sext(D9[8:1]) << 1);**<br><br>**Add displacement value (D9) to current PC value, and branch to address represented by addition result.** | | |
|---|---|---|---|
| Assembler mnemonic | Format | Affecting flag | Affected flag |
| **br D9** | 16bit | — | — |
| Remarks | | | |
| D9 is a signed value whose lower 1 bit shall be 0.<br><br>C6 and C7 are predicates which can be used. | | | |

Fig. 209 brl D20

| | |
|---|---|
| Behavior | **PC <- PC + (sext(D20[19:1]) << 1);**<br>**LR <- next_PC;**<br>**SVR.CF <- CFR.CF;**<br><br>**Branch instruction for subroutine call.**<br>**Add displacement value (D20) to current PC value, and branch to address represented by addition result.**<br>**Store return destination address (PC of next instruction) to LR, and save CFR.CF to SVR,CF.** |

| Assembler mnemonic | Format | Affecting flag | Affected flag |
|---|---|---|---|
| **brl D20** | 32bit | SVR.CF | CFR.CF |

| Remarks |
|---|
| D20 is a signed value whose lower 1 bit shall be 0. |

Fig. 210 call D20

| | |
|---|---|
| Behavior | **=> brl D20**<br><br>**PC <- PC + (sext(D20[19:1]) << 1);**<br>**LR <- next_PC;**<br>**SVR.CF <- CFR.CF;**<br><br>**Branch instruction for subroutine call.**<br>**Add displacement value (D20) to current PC value, and branch to address represented by addition result.**<br>**Store return destination address (PC of next instruction) to LR, and save CFR.CF to SVR,CF.** |

| Assembler mnemonic | Format | Affecting flag | Affected flag |
|---|---|---|---|
| **call D20** | 32bit synonym | SVR.CF | CFR.CF |

| Remarks |
|---|
| D20 is a signed value whose lower 1 bit shall be 0. |

Fig. 211 brl D9

| | |
|---|---|
| Behavior | **PC <- PC + (sext(D9[8:1]) << 1);**<br>**LR <- next_PC;**<br>**SVR.CF <- CFR.CF;**<br><br>**Branch instruction for subroutine call.**<br>**Add displacement value (D9) to current PC value, and branch to address represented by addition result.**<br>**Store return destination address (PC of next instruction) to LR, and save CFR.CF to SVR,CF.** |

| Assembler mnemonic | Format | Affecting flag | Affected flag |
|---|---|---|---|
| **brl D9** | 16bit | SVR.CF | CFR.CF |

| Remarks |
|---|
| D9 is a signed value whose lower 1 bit shall be 0.<br>C7 is the only predicate which can be used (condition cannot be executed). |

Fig. 212 call D9

| | |
|---|---|
| Behavior | **=> brl D9**<br><br>**PC <- PC + (sext(D9[8:1]) << 1);**<br>**LR <- next_PC;**<br>**SVR.CF <- CFR.CF;**<br><br>**Branch instruction for subroutine call.**<br>**Add displacement value (D9) to current PC value, and branch to address represented by addition result.**<br>**Store return destination address (PC of next instruction) to LR, and save CFR.CF to SVR,CF.** |

| Assembler mnemonic | Format | Affecting flag | Affected flag |
|---|---|---|---|
| **call D9** | 16bit synonym | SVR.CF | CFR.CF |

| Remarks |
|---|
| |

Fig. 213 jmp LR

| | | | | |
|---|---|---|---|---|
| Behavior | **PC <- LR;**<br><br>**Branch to address stored in LR.** | | | |
| Assembler mnemonic | | Format | Affecting flag | Affected flag |
| **jmp LR** | | 16bit | — | — |
| Remarks | | | | |
| | | | | |

Fig. 214 jmp TAR

| | | | |
|---|---|---|---|
| Behavior | PC <- TAR;<br><br>Branch to address stored in TAR. | | |
| Assembler mnemonic | Format | Affecting flag | Affected flag |
| jmp TAR | 16bit | — | — |
| Remarks | | | |
| | | | |

Fig. 215 jmpl LR

| | |
|---|---|
| Behavior | **PC <- LR;**<br>**LR <- next_PC;**<br>**SVR.CF <- CFR.CF;**<br><br>**Used for subroutine call.**<br>**Branch to address stored in LR. Store return destination address (PC of next instruction) to LR, and save CFR.CF to SVR,CF.** |

| Assembler mnemonic | Format | Affecting flag | Affected flag |
|---|---|---|---|
| **jmpl LR** | 16bit | SVR.CF | CFR.CF |

| Remarks |
|---|
| |

Fig. 216 call LR

| | |
|---|---|
| Behavior | => jmpl LR<br><br>PC <- LR;<br>LR <- next_PC;<br>SVR.CF <- CFR.CF;<br><br>Used for subroutine call.<br>Branch to address stored in LR. Store return destination address (PC of next instruction) to LR, and save CFR.CF to SVR,CF. |

| Assembler mnemonic | Format | Affecting flag | Affected flag |
|---|---|---|---|
| **call LR** | 16bit synonym | SVR.CF | CFR.CF |

| Remarks |
|---|
| |

Fig. 217 jmpl TAR

| | |
|---|---|
| Behavior | **PC <- TAR;**<br>**LR <- next_PC;**<br>**SVR.CF <- CFR.CF;**<br><br>**Used for subroutine call.**<br>**Branch to address stored in TAR. Store return destination address (PC of next instruction) to LR, and save CFR.CF to SVR,CF.** |

| Assembler mnemonic | Format | Affecting flag | Affected flag |
|---|---|---|---|
| **jmpl TAR** | 16bit | SVR.CF | CFR.CF |
| Remarks | | | |
| | | | |

Fig. 218 call TAR

| | |
|---|---|
| Behavior | => jmpl TAR<br><br>PC <- TAR;<br>LR <- next_PC;<br>SVR.CF <- CFR.CF;<br><br>Used for subroutine call.<br>Branch to address stored in TAR. Store return destination address (PC of next instruction) to LR, and save CFR.CF to SVR,CF. |

| Assembler mnemonic | Format | Affecting flag | Affected flag |
|---|---|---|---|
| call TAR | 16bit synonym | SVR.CF | CFR.CF |

| Remarks |
|---|
| |

Fig. 219 jmpr LR

| | | | |
|---|---|---|---|
| Behavior | **PC <- LR;**<br><br>**CFR.CF <- SVR.CF;**<br><br>**Used for returning from subroutine.**<br><br>**Branch to address stored in LR. Transfer SVR.CF to CFR.CF.** | | |
| Assembler mnemonic | Format | Affecting flag | Affected flag |
| **jmpr LR** | 16bit | CFR.CF | SVR.CF |
| Remarks | | | |
| | | | |

Fig. 220 ret

| | |
|---|---|
| Behavior | **=> jmpr LR**<br><br>**PC <- LR;**<br>**CFR.CF <- SVR.CF;**<br><br>**Used for returning from subroutine call.**<br>**Branch to address stored in LR. Transfer SVR.CF to CFR.CF.** |

| Assembler mnemonic | Format | Affecting flag | Affected flag |
|---|---|---|---|
| **jmpr LR** | 16bit synonym | CFR.CF | SVR.CF |

| Remarks |
|---|
| |

Fig. 221 jmpf LR

| | |
|---|---|
| Behavior | **PC <- LR;**<br><br>**Branch to address stored in LR. Fill branch destination instruction, if there is no branch destination instruction filled in branch destination buffer.** |

| Assembler mnemonic | Format | Affecting flag | Affected flag |
|---|---|---|---|
| **jmpf LR** | 16bit | — | — |

| Remarks |
|---|
| |

Fig. 222 jmpf C6,C2:C4,TAR

| | |
|---|---|
| Behavior | **PC <- TAR;**<br>**C2 <- C3; C3 <- C4; C6 <- C4;**<br><br>**After transferring C3 to C2, and C4 to C3 and C6, branch to address stored in TAR. Fill branch destination instruction, if there is no branch destination instruction filled in branch destination buffer.** |

| Assembler mnemonic | Format | Affecting flag | Affected flag |
|---|---|---|---|
| **jmpf C6,C2:C4,TAR** | 16bit | C2,C6,C3 | C4,C3 |

| Remarks |
|---|
| |

Fig. 223 jmpf Cm,TAR

| Behavior | **PC <- TAR;**<br><br>**Cm <- 1;**<br><br>**Write 1 to Cm, and branch to address stored in TAR. Fill branch destination instruction, if there is no branch destination instruction filled in branch destination buffer.** | | |
|---|---|---|---|
| Assembler mnemonic | Format | Affecting flag | Affected flag |
| **jmpf Cm,TAR** | 16bit | Cm | — |
| Remarks | | | |
| | | | |

Fig. 224 jmpf TAR

| | |
|---|---|
| Behavior | **=> jmpf C7,TAR**<br><br>**PC <- TAR;**<br><br>**Branch to address stored in TAR.** |

| Assembler mnemonic | Format | Affecting flag | Affected flag |
|---|---|---|---|
| **jmpf TAR** | 16bit synonym | – | – |

| Remarks |
|---|
| |

Fig. 225 jloop C6,TAR,Ra,I8

| | |
|---|---|
| Behavior | **=> jloop C6,C7,TAR,Ra,I8**<br><br>**PC <- TAR; C6 <- (Ra >= 0)? 1:0;**<br>**Ra <- Ra + sext(I8);**<br><br>**Used as part of loop. Following processing is performed:**<br>**(1) Add immediate value (I8) to Ra, and store result in Ra. Set 0 to C6 when Ra becomes smaller than 0.**<br>**(2) JUMP TO ADDRESS INDICATED BY TAR.** |

| Assembler mnemonic | Format | Affecting flag | Affected flag |
|---|---|---|---|
| **jloop C6,TAR,Ra,I8** | 32bit synonym | C6 | — |

| Remarks |
|---|
| I8 is a signed value.<br>※Care must be taken when a value of 0 or over is set as I8. |

Fig. 226 jloop C6,TAR,Ra

| | |
|---|---|
| Behavior | **=> jloop C6,C7,TAR,Ra,-1**<br><br>**PC <- TAR; C6 <- (Ra >= 0)? 1:0;**<br>**Ra <- Ra - sext(1);**<br><br>**Used as part of loop. Following processing is performed:**<br>**(1) Add -1 to Ra, and store result in Ra. Set 0 to C6 when Ra becomes smaller than 0.**<br>**(2) Branch to address stored in TAR. Fill branch destination instruction, if there is no branch destination instruction filled in branch destination buffer.** |

| Assembler mnemonic | Format | Affecting flag | Affected flag |
|---|---|---|---|
| **jloop C6,TAR,Ra** | 32bit synonym | C6 | — |

| Remarks |
|---|
| |

Fig. 227 jloop C6,TAR,Ra2

| | |
|---|---|
| Behavior | **=> jloop C6,C7,TAR,Ra2**<br><br>**PC <- TAR; C6 <- (Ra2 >= 0)? 1 : 0;**<br>**Ra2 <- Ra2 -1;**<br><br>**Used as part of loop.**<br>**Following processing is performed:**<br>**(1) Add -1 to Ra2, and store result in Ra2. Set 0 to C6 when Ra2 becomes smaller than 0.**<br>**(2) Jump to address indicated by TAR.** |

| Assembler mnemonic | Format | Affecting flag | Affected flag |
|---|---|---|---|
| **jloop C6,TAR,Ra2** | 16bit synonym | C6 | — |

| Remarks |
|---|
| C6 is the only predicate which can be used (condition is to be executed without fail). |

Fig. 228 jloop C6,TAR,Ra2,-1

| | |
|---|---|
| Behavior | **=> jloop C6,C7,TAR,Ra2**<br><br>**PC <- TAR;**<br>**C6 <- (Ra2 >= 0)? 1 : 0;**<br>**Ra2 <- Ra2 -1;**<br><br>**Used as part of loop.**<br>**Following processing is performed:**<br>**(1) Add -1 to Ra2, and store result in Ra2. Set 0 to C6 when Ra2 becomes smaller than 0.**<br>**(2) Jump to adderss indicated by TAR.** |

| Assembler mnemonic | Format | Affecting flag | Affected flag |
|---|---|---|---|
| **jloop C6,TAR,Ra2,-1** | 16bit synonym | C6 | — |

| Remarks |
|---|
| C6 is the only predicate which can be used (condition is to be executed without fail). |

Fig. 229 jloop C6,Cm,TAR,Ra,I8

| | |
|---|---|
| Behavior | **PC <- TAR; C6 <- (Ra >= 0)? 1:0; Cm <- 1;**<br>**Ra <- Ra + sext(I8);**<br><br>**Used as part of loop.**<br>**Following processing is performed:**<br>**(1) Set 1 to Cm.**<br>**(2) Add immediate value (I8) to Ra, and store result in Ra. Set 0 to C6 when Ra becomes smaller than 0.**<br>**(3) Branch to address stored in TAR. Fill branch destination instruction, if there is no branch destination instruction filled in branch destination buffer.** |

| Assembler mnemonic | Format | Affecting flag | Affected flag |
|---|---|---|---|
| **jloop C6,Cm,TAR,Ra,I8** | 32bit | Cm,C6 | — |

| Remarks |
|---|
| I8 is a signed value.<br>Care must be taken when a value of 0 or over is set as I8.<br>Behavior when Cm=C6 is undefined. |

Fig. 230 jloop C6,Cm,TAR,Ra

<table>
<tr><td>Behavior</td><td colspan="3">=>jloop C6,Cm,TAR,Ra,-1<br><br>PC <- TAR; C6 <- (Ra >= 0)? 1:0; Cm <- 1;<br>Ra <- Ra - sext(1);<br><br>Used as part of loop.<br>Following processing is performed:<br>(1) Set 1 to Cm.<br>(2) Add -1 to Ra, and store result in Ra. Set 0 to C6 when Ra becomes smaller than 0.<br>(3) Branch to address stored in TAR. Fill branch destination instruction, if there is no branch destination instruction filled in branch destination buffer.</td></tr>
<tr><td>Assembler mnemonic</td><td>Format</td><td>Affecting flag</td><td>Affected flag</td></tr>
<tr><td>jloop C6,Cm,TAR,Ra</td><td>32bit synonym</td><td>Cm,C6</td><td>—</td></tr>
<tr><td colspan="4">Remarks</td></tr>
<tr><td colspan="4">※Behavior when Cm=C6 is undefined.</td></tr>
</table>

Fig. 231 jloop C6,Cm,TAR,Ra2

| | |
|---|---|
| Behavior | **PC <- TAR;**<br><br>**C6 <- (Ra2 >= 0)? 1 : 0; Cm <- 1; Ra2 <- Ra2 -1;**<br><br>**Used as part of loop. Following processing is performed:**<br>**(1) Set 1 to Cm.**<br>**(2) Add -1 to Ra2, and store result in Ra2. Set 0 to C6 when Ra2 becomes smaller than 0.**<br>**(3) Branch to address stored in TAR. Fill branch destination instruction, if there is no branch destination instruction filled in branch destination buffer.** |

| Assembler mnemonic | Format | Affecting flag | Affected flag |
|---|---|---|---|
| **jloop C6,Cm,TAR,Ra2** | 16bit | Cm,C6 | — |

| Remarks |
|---|
| Behavior when Cm=C6 is undefined.<br><br>C6 is the only predicate which can be used (condition is to be executed without fail). |

Fig. 232 jloop C6,Cm,TAR,Ra2,-1

| | |
|---|---|
| Behavior | **=> jloop C6,Cm,TAR,Ra2**<br><br>**PC <- TAR;**<br>**C6 <- (Ra2 >= 0)? 1 : 0;**<br>**Cm <- 1;**<br>**Ra2 <- Ra2 -1;**<br><br>**Used as part of loop.**<br>**Following processing is performed:**<br>**(1) Set 1 to Cm.**<br>**(2) Add -1 to Ra2, and store result in Ra2. Set 0 to C6 when Ra2 becomes smaller than 0.**<br>**(3) Jump to adderss indicated by TAR.** |

| Assembler mnemonic | Format | Affecting flag | Affected flag |
|---|---|---|---|
| **jloop C6,Cm,TAR,Ra2,-1** | 16bit | Cm,C6 | — |

| Remarks |
|---|
| ※Behavior when Cm=C6 is undefined.<br>C6 is the only predicate which can be used (condition is to be executed without fail). |

Fig. 233 jloop C6,C2:C4,TAR,Ra,I8

| | |
|---|---|
| Behavior | PC <- TAR;<br><br>C2 <- C3, C3 <- C4, C6 <- C4;<br><br>C4 <- (Ra >= 0)? 1 : 0;<br><br>Ra2 <- Ra + sext(I8);<br><br><br>**Used as part of loop. Following processing is performed:**<br>**(1) Transfer C3 to C2, and C4 to C3 and C6.**<br>**(2) Add immediate value (I8) to Ra, and store result in Ra. Set 0 to C4 when Ra becomes smaller than 0.**<br>**(3) Branch to address stored in TAR. Fill branch destination instruction, if there is no branch destination instruction filled in branch destination buffer.** |

| Assembler mnemonic | Format | Affecting flag | Affected flag |
|---|---|---|---|
| **jloop C6,C2:C4,TAR,Ra,I8** | 32bit | C2,C4,C6,C3 | — |

| Remarks |
|---|
| I8 is a signed value.<br><br>Care must be taken when a value of 0 or over is set as I8. |

Fig. 234 jloop C6,C2:C4,TAR,Ra

| | |
|---|---|
| Behavior | **=> jloop C6,C2:C4,TAR,Ra,-1**<br><br>**PC <- TAR;**<br>**C2 <- C3, C3 <- C4, C6 <- C4;**<br>**C4 <- (Ra >= 0)? 1 : 0;**<br>**Ra <- Ra - sext(1);**<br><br>**Used as part of loop. Following processing is performed:**<br>**(1) Transfer C3 to C2, and C4 to C3 and C6.**<br>**(2) Add -1 to Ra, and store result in Ra. Set 0 to C4 when Ra becomes smaller than 0.**<br>**(3) Branch to address stored in TAR. Fill branch destination instruction, if there is no branch destination instruction filled in branch destination buffer.** |

| Assembler mnemonic | Format | Affecting flag | Affected flag |
|---|---|---|---|
| **jloop C6,C2:C4,TAR,Ra** | 32bit synonym | C2,C4,C6,C3 | — |

| Remarks |
|---|
| |

Fig. 235 jloop C6,C2:C4,TAR,Ra2

| | |
|---|---|
| Behavior | **PC <- TAR;**<br>**C2 <- C3; C3 <- C4; C6 <- C4;**<br>**C4 <- (Ra2 >= 0)? 1 : 0;**<br>**Ra2 <- Ra2 -1;**<br><br>**Used as part of loop. Following processing is performed:**<br>**(1) Transfer C3 to C2, and C4 to C3 and C6.**<br>**(2) Add -1 to Ra2, and store result in Ra2. Set 0 to C4 when Ra2 becomes smaller than 0.**<br>**(3) Branch to address stored in TAR. Fill branch destination instruction, if there is no branch destination instruction filled in branch destination buffer.** |

| Assembler mnemonic | Format | Affecting flag | Affected flag |
|---|---|---|---|
| **jloop C6,C2:C4,TAR,Ra2** | 16bit | C2,C4,C6,C3 | C4,C3 |

| Remarks |
|---|
| C6 is the only predicate which can be used (condition is to be executed without fail). |

Fig. 236 jloop C6,C2:C4,TAR,Ra2,-1

| | |
|---|---|
| Behavior | **=> jloop C6,C2:C4,TAR,Ra2**<br><br>**PC <- TAR;**<br>**C2 <- C3; C3 <- C4; C6 <- C4;**<br>**C4 <- (Ra2 >= 0)? 1 : 0;**<br>**Ra2 <- Ra2 -1;**<br><br>**Used as part of loop.**<br>**Following processing is performed:**<br>**(1) Transfer C3 to C2, and C4 to C3 and C6.**<br>**(2) Add -1 to Ra2, and store result in Ra2. Set 0 to C4 when Ra2 becomes smaller than 0.**<br>**(3) Jump to adderss indicated by TAR.** |

| Assembler mnemonic | Format | Affecting flag | Affected flag |
|---|---|---|---|
| **jloop C6,C2:C4,TAR,Ra2,-1** | 16bit synonym | C2,C4,C6,C3 | C4,C3 |

| Remarks |
|---|
| C6 is the only predicate which can be used (condition is to be executed without fail). |

Fig. 237 jloop C5,LR,Ra,I8

| | |
|---|---|
| Behavior | **PC <- LR;**<br>**C5 <- (Ra >= 0)? 1:0;**<br>**Ra <- Ra + sext(I8);**<br><br>**Used as part of loop. Following processing is performed:**<br>**(1) Add immediate value (I8) to Ra, and store result in Ra. Set 0 to C5 when Ra becomes smaller than 0.**<br>**(2) Branch to address stored in LR. Fill branch destination instruction, if there is no branch destination instruction filled in branch destination buffer.** |

| Assembler mnemonic | Format | Affecting flag | Affected flag |
|---|---|---|---|
| **jloop C5,LR,Ra,I8** | 32bit | C5 | — |

| Remarks |
|---|
| I8 is a signed value.<br>Care must be taken when a value of 0 or over is set as I8. |

Fig. 238 jloop C5,LR,Ra

| | |
|---|---|
| Behavior | **=> jloop C5,LR,Ra,-1**<br><br>**PC <- LR;**<br>**C5 <- (Ra >= 0)? 1:0;**<br>**Ra <- Ra - sext(1);**<br><br>**Used as part of loop. Following processing is performed:**<br>**(1) Add -1 to Ra, and store result in Ra. Set 0 to C5 when Ra becomes smaller than 0.**<br>**(2) Branch to address stored in LR. Fill branch destination instruction, if there is no branch destination instruction filled in branch destination buffer.** |

| Assembler mnemonic | Format | Affecting flag | Affected flag |
|---|---|---|---|
| **jloop C5,LR,Ra** | 32bit synonym | C5 | — |

| Remarks |
|---|
| |

Fig. 239 settar D9

| Behavior | **TAR <- PC + (sext(D9[8:1]) <<1 );**<br><br>**Following processing is performed:**<br>**(1) Store address resulted from adding PC value to displacement value (D9) to TAR.**<br>**(2) Fetch instruction corresponding to such address, and store it in branch destination buffer.** |
|---|---|

| Assembler mnemonic | Format | Affecting flag | Affected flag |
|---|---|---|---|
| **settar D9** | 32bit | — | — |

| Remarks |
|---|
| D9 is a signed value whose lower 1 bit shall be 0. |

Fig. 240 settar C6,Cm,D9

| | |
|---|---|
| Behavior | **TAR <- PC + (sext(D9[8:1]) <<1 );**<br>**C6 <- 1; Cm <- 0;**<br><br>**Following processing is performed:**<br>**(1) Store address resulted from adding PC value to displacement value (D9) to TAR.**<br>**(2) Fetch instruction corresponding to such address, and store it in branch destination buffer.**<br>**(3) Set C6 to 1, and Cm to 0.** |

| Assembler mnemonic | Format | Affecting flag | Affected flag |
|---|---|---|---|
| **settar C6,Cm,D9** | 32bit | Cm,C6 | — |

| Remarks |
|---|
| D9 is a signed value whose lower 1 bit shall be 0.<br>Behavior when Cm=C6 is undefined. |

Fig. 241 settar C6,D9

| | |
|---|---|
| Behavior | => settar C6,C7,D9<br><br>TAR <- PC + (sext(D9[8:1]) <<1 );<br>C6 <- 1;<br><br>Following processing is performed:<br>(1) Store address resulted from adding PC value to displacement value (D9) to TAR.<br>(2) Fetch instruction corresponding to such address, and store it in branch destination buffer.<br>(3) Set C6 to1. |

| Assembler mnemonic | Format | Affecting flag | Affected flag |
|---|---|---|---|
| **settar C6,D9** | 32bit synonym | C6 | — |

| Remarks |
|---|
| D9 is a signed value whose lower 1 bit shall be 0. |

Fig. 242 settar C6,C2:C4,D9

| | |
|---|---|
| Behavior | **TAR <- PC + (sext(D9[8:1]) <<1 );**<br>**C2 <- 0; C3 <- 0; C4 <- 1, C6 <- 1;**<br><br>**Following processing is performed:**<br>**(1) Store address resulted from adding PC value to displacement value (D9) to TAR.**<br>**(2) Fetch instruction corresponding to such address, and store it in branch destination buffer.**<br>**(3) Set C4 and C6 to1, and C2 and C3 to 0.** |

| Assembler mnemonic | Format | Affecting flag | Affected flag |
|---|---|---|---|
| **settar C6,C2:C4,D9** | 32bit | C2,C4,C6,C3 | — |

| Remarks |
|---|
| D9 is a signed value whose lower 1 bit shall be 0. |

Fig. 243 settar C6,C4,D9

| | |
|---|---|
| Behavior | **TAR <- PC + (sext(D9[8:1]) << 1);**<br>**C4 <- 0; C6 <-1;**<br><br>**Following processing is performed:**<br>**(1) Store address resulted from adding PC value to displacement value (D9) to TAR.**<br>**(2) Fetch instruction corresponding to such address, and store it in branch destination buffer.**<br>**(3) Set C6 to 1, and C4 to 0.** |

| Assembler mnemonic | Format | Affecting flag | Affected flag |
|---|---|---|---|
| **settar C6,C4,D9** | 16bit | C4,C6 | — |

| Remarks |
|---|
| C7 is the only predicate which can be used (condition cannot be executed).<br>D9 is a signed value whose lower 1 bit shall be 0. |

Fig. 244 setlr D9

| | |
|---|---|
| Behavior | **LR <- PC + (sext(D9[8:1]) <<1 );**<br><br>**Following processing is performed:**<br>**(1) Store address resulted from adding PC value to displacement value (D9) to LR.**<br>**(2) Fetch instruction corresponding to such address, and store it in branch destination buffer.** |

| Assembler mnemonic | Format | Affecting flag | Affected flag |
|---|---|---|---|
| **setlr D9** | 32bit | — | — |

| Remarks |
|---|
| D9 is a signed value whose lower 1 bit shall be 0. |

Fig. 245 setlr C5,D9

| | |
|---|---|
| Behavior | **LR <- PC + (sext(D9[8:1]) <<1 );**<br>**C5 <- 1;**<br><br>**Following processing is performed:**<br>**(1) Store address resulted from adding PC value to displacement value (D9) to LR.**<br>**(2) Fetch instruction corresponding to such address, and store it in branch destination buffer.**<br>**(3) Set C5 to1.** |

| Assembler mnemonic | Format | Affecting flag | Affected flag |
|---|---|---|---|
| **setlr C5,D9** | 32bit | C5 | — |

| Remarks |
|---|
| D9 is a signed value whose lower 1 bit shall be 0. |

Fig. 246 setbb TAR

| Behavior | Fill branch instruction buffer with instruction fetched from address from address indicated by TAR. | | |
|---|---|---|---|
| **Assembler mnemonic** | **Format** | **Affecting flag** | **Affected flag** |
| **setbb TAR** | 16bit | — | — |
| Remarks | | | |
| | | | |

Fig. 247 setbb LR

| Behavior | Fill branch instruction buffer with instruction fetched from address from address indicated by LR. | | |
|---|---|---|---|
| Assembler mnemonic | Format | Affecting flag | Affected flag |
| **setbb LR** | 16bit | — | — |
| Remarks | | | |
| | | | |

Fig. 248 intd

| Behavior | **PSR.IE <- 0;**<br><br>**Disable interrupts.** | | |
|---|---|---|---|
| Assembler mnemonic | Format | Affecting flag | Affected flag |
| **intd** | 32bit | PSR.IE | — |
| Remarks | | | |
| This instruction can be executed at privilege levels 0 and 2. When executed at the privilege level 3, a privileged instruction execution exception occurs. | | | |

Fig. 249 inte

| | | | |
|---|---|---|---|
| Behavior | **PSR.IE <- 1;**<br><br>**Enable interrupt.** | | |
| Assembler mnemonic | Format | Affecting flag | Affected flag |
| **inte** | 32bit | PSR.IE | — |
| Remarks | | | |
| This instruction can be executed at privilege levels 0 and 2. When executed at the privilege level 3, a privileged instruction execution exception occurs. | | | |

Fig. 250 vmpswd

| | |
|---|---|
| Behavior | **PSR.SWE <- 0;**<br><br>**Disable dispatch.** |

| Assembler mnemonic | Format | Affecting flag | Affected flag |
|---|---|---|---|
| **vmpswd** | 32bit | PSR.SWE | — |

| Remarks |
|---|
| This instruction can be executed at privilege levels 0 and 2. When executed at the privilege level 3, a privileged instruction execution exception occurs. |

Fig. 251 vmpswe

| | |
|---|---|
| Behavior | **PSR.SWE <- 1;**<br><br>**Enable dispatch.** |

| Assembler mnemonic | Format | Affecting flag | Affected flag |
|---|---|---|---|
| **vmpswe** | 32bit | PSR.SWE | — |

| Remarks |
|---|
| This instruction can be executed at privilege levels 0 and 2. When executed at the privilege level 3, a privileged instruction execution exception occurs. |

Fig. 252 vmpsleep

| | |
|---|---|
| Behavior | **PSR.SWE <- 1;**<br>**LP sleep;**<br>**VMP switch;**<br><br>**Halt issue of instructions, and transit from "running" to "ready" so as to switch LP.** |

| Assembler mnemonic | Format | Affecting flag | Affected flag |
|---|---|---|---|
| **vmpsleep** | 32bit | PSR.SWE | – |

| Remarks |
|---|
| Halt (block) the issue of instructions until VMP switching becomes enabled. |

Fig. 253 vmpwait

| | |
|---|---|
| Behavior | **PSR.SWE <- 1;**<br>**LP wait;**<br>**VMP switch;**<br><br>**Halt issue of instructions, and transit from "running" to "waiting" so as to switch LP.** |

| Assembler mnemonic | Format | Affecting flag | Affected flag |
|---|---|---|---|
| **vmpwait** | 32bit | PSR.SWE | — |

| Remarks |
|---|
| Halt (block) the issue of instructions until VMP switching becomes enabled. |

Fig. 254 vmpsus

| | |
|---|---|
| Behavior | **PSR.SWE <- 1;**<br>**LP suspend;**<br>**VMP switch;**<br><br>**Halt issue of instructions, and transit from "running" to "suspended waiting" so as to switch LP.** |

| Assembler mnemonic | Format | Affecting flag | Affected flag |
|---|---|---|---|
| **vmpsus** | 32bit | PSR.SWE | — |

| Remarks |
|---|
| Halt (block) the issue of instructions until VMP switching becomes enabled. |

Fig. 255 rti

| | |
|---|---|
| Behavior | **if (PSR.EH == 0) {**<br>**PC <- IPC; PSR <- IPSR;**<br>**} else {**<br>**PC <- EPC; PSR <- EPSR;**<br>**}**<br><br>**Used for returning from interrupt processing and exception processing.**<br>**Transfer IPSR or EPSR to PSR, and branch to address stored in IPC or EPC.** |

| Assembler mnemonic | Format | Affecting flag | Affected flag |
|---|---|---|---|
| rti | 16bit | PSR | PSR.EH |

| Remarks |
|---|
| This instruction can be executed at privilege levels 0 and 2. When executed at the privilege level 3, a privileged instruction execution exception occurs. |

Fig. 256 piNI(pi0I,pi1I,pi2I,pi3I,pi4I,pi5I,pi6I,pi7I)

Behavior

```
N ranges from 0~7(pi0I,pi1I,...,pi7I)
step1:
        ISR.PIEXE <- 1;
        if (IDMR1.piN == 1) {
            freeze
            interrupt transition sequence ends
        }
        IPSR <- PSR;
        IPC <- PC;
        if (L0IPLR1.piN == 0) {
            L0IVBR.IC <- 0x30+N;
            new_PC <- L0IVBR;
            new_PL <- 0;
        } else {
            IVBR.IC <- 0x30+N;
            new_PC <- IVBR;
            new_PL <- 2;
        }
step2:
        PSR.IH <- 1;
        PSR.IE <- 0;
        PSR.LPIE[3:0] <- 0b0000;
        if (PSR.PL[1:0] >(u) new_PL[1:0]) {
            PSR.PL <- new_PL;
        }
        PC <- new_PC;
```

Perform program interrupt.

| Assembler mnemonic | Format | Affecting flag | Affected flag |
|---|---|---|---|
| piNI (pi0I,pi1I,pi2I,pi3I, pi4I,pi5I,pi6I,pi7I) | 32bit | PSR.IH,PSR.IE, PSR.PL,PSR.LPIE | PSR |

Remarks

Each bit of PSR other than PSR.IH, PSR.IE, PSR.PL, and PSR.LPIE remain unchanged.

Fig. 257 piN(pi0,pi1,pi2,pi3,pi4,pi5,pi6,pi7)

Behavior

```
N ranges from 0~7(pi0,pi1,...,pi7)
step1:
  ISR.PIEXE <- 1;
  if (IDMR1.piN == 1) {
    freeze
    interrupt transition sequence ends
  }
  IPSR <- PSR;
  IPC <- PC;
  if (L0IPLR1.piN == 0) {
    L0IVBR.IC <- 0x30+N;
    new_PC <- L0IVBR;
    new_PL <- 0;
  } else {
    IVBR.IC <- 0x30+N;
    new_PC <- IVBR;
    new_PL <- 2;
  }
step2:
  PSR.IH <- 1;
  PSR.IE <- 0;
  PSR.LPIE[3:0] <- 0b0000;
  if (PSR.PL[1:0] >(u) new_PL[1:0]) {
    PSR.PL <- new_PL;
    }
  PC <- new_PC;
```

Used for program interrupts.
Save PSR and PC to IPSR andIPC, branch to interrupt routine, and change privilege level.

| Assembler mnemonic | Format | Affecting flag | Affected flag |
|---|---|---|---|
| **piN(pi0,pi1,pi2,pi3, pi4,pi5,pi6,pi7)** | 16bit | PSR.IH,PSR.IE, PSR.PL,PSR.LPIE | PSR |

| Remarks |
|---|
| Each bit of PSR other than PSR.IH, PSR.IE, PSR.PL, and PSR.LPIE remain unchanged. |

Fig. 258 scN(sc0,sc1,sc2,sc3,sc4,sc5,sc6,sc7)

| | |
|---|---|
| Behavior | N ranges from 0~7(sc0,sc1,...,sc7)<br>step1:<br>ISR.SYSCALL <- 1;<br>if (IDMR1.scN == 1) {<br>freeze<br>interrupt transition sequence ends<br>}<br>IPSR <- PSR;<br>IPC <- PC;<br>if (L0IPLR1.scN == 0) {<br>L0IVBR.IC <- 0x08+N;<br>new_PC <- L0IVBR;<br>new_PL <- 0;<br>} else {<br>IVBR.IC <- 0x08+N;<br>new_PC <- IVBR;<br>new_PL <- 2;<br>}<br>step2:<br>PSR.IH <- 1;<br>PSR.IE <- 0;<br>if (PSR.PL[1:0] >(u) new_PL[1:0]) {<br>PSR.PL <- new_PL;<br>}<br>PC <- new_PC;<br><br>Used for system calls.<br>Save PSR and PC to IPSR and IPC, branch to interrupt routine, and change privilege level. |

| Assembler mnemonic | Format | Affecting flag | Affected flag |
|---|---|---|---|
| scN(sc0,sc1,sc2,sc3<br>(sc4,sc5,sc6,sc7) | 16bit | PSR.III,PSR.IE,<br>PSR.PL | PSR |

| Remarks |
|---|
| Each bit of PSR other than PSR.IH, PSR.IE, PSR.PL remain unchanged. |

Fig. 259 add Rc,Ra,Rb

| Behavior | **Rc <- Ra + Rb;**<br><br>**Add Ra and Rb.** | | |
|---|---|---|---|
| Assembler mnemonic | Format | Affecting flag | Affected flag |
| **Rc <- Ra + Rb;** | 32bit | — | — |
| Remarks | | | |
| | | | |

Fig. 260 add Rc3,Ra3,Rb3

| | |
|---|---|
| Behavior | **Rc3 <- Ra3 + Rb3;**<br><br>**Add Ra3 and Rb3, and store result in Rc3.** |

| Assembler mnemonic | Format | Affecting flag | Affected flag |
|---|---|---|---|
| **add Rc3,Ra3,Rb3** | 16bit | — | — |

| Remarks |
|---|
| C7 is the only predicate which can bc uscd (condition cannot be executed). |

Fig. 261 add Ra2,Rb2

| Behavior | Ra2 <- Rb2 + Ra2;<br><br>Add Ra2 and Rb2, and store result in Rc2. | | |
|---|---|---|---|
| **Assembler mnemonic** | **Format** | **Affecting flag** | **Affected flag** |
| add Ra2,Rb2 | 16bit | — | — |
| **Remarks** | | | |
| C7 is the only predicate which can be used (condition cannot be executed). | | | |

Fig. 262 add Rb,Ra,I12

| | | | | |
|---|---|---|---|---|
| Behavior | Rb <- Ra + sext(I12);<br><br>Add immediate value (I12) to Ra. | | | |
| Assembler mnemonic | | Format | Affecting flag | Affected flag |
| **add Rb,Ra,I12** | | 32bit | — | — |
| Remarks | | | | |
| I12 is a signed value. | | | | |

Fig. 263 add Ra2,I5

| | |
|---|---|
| Behavior | **Ra2 <- Ra2 + sext(I5);**<br><br>**Add immediate value (I5) to Ra2, and store result in Ra2.** |

| Assembler mnemonic | Format | Affecting flag | Affected flag |
|---|---|---|---|
| **add Ra2,I5** | 16bit | — | — |

| Remarks |
|---|
| I5 is a signed value.<br><br>C7 is the only predicate which can be used (condition cannot be executed). |

Fig. 264 add SP,I19

| | |
|---|---|
| Behavior | **SP <- SP + (sext(I19[18:3]) << 3);**<br><br>**Add immediate value (I19) to SP, and store result in SP.** |

| Assembler mnemonic | Format | Affecting flag | Affected flag |
|---|---|---|---|
| **add SP,I19** | 32bit | — | — |

| Remarks |
|---|
| I19 is a signed value whose lower 3 bits shall be 0. |

Fig. 265 add SP,I11

| | |
|---|---|
| Behavior | **SP <- SP + (sext(I11[10:3]) << 3);**<br><br>**Add immediate value (I11) to SP, and store result in SP.** |

| Assembler mnemonic | Format | Affecting flag | Affected flag |
|---|---|---|---|
| **add SP,I11** | 16bit | — | — |

| Remarks |
|---|
| I11 is a signed value whose lower 3 bits shall be 0.<br><br>C7 is the only predicate which can be used (condition cannot be executed). |

Fig. 266 addu Rb,GP,I13

| | |
|---|---|
| Behavior | **Rb <- GP + uext(I13);**<br><br>**Add immediate value (I13) to GP, and store result in Rb.** |

| Assembler mnemonic | Format | Affecting flag | Affected flag |
|---|---|---|---|
| **addu Rb,GP,I13** | 32bit | — | — |

| Remarks |
|---|
| I13 is an unsigned value. |

Fig. 267 addu Rb,SP,I13

| | |
|---|---|
| Behavior | **Rb <- SP + uext(I13);**<br><br>**Add immediate value (I13) to SP, and store result in Rb.** |

| Assembler mnemonic | Format | Affecting flag | Affected flag |
|---|---|---|---|
| **addu Rb,SP,I13** | 32bit | — | — |

| Remarks |
|---|
| I13 is an unsigned value. |

Fig. 268 addu Ra3,SP,I6

<table>
<tr><td>Behavior</td><td colspan="3">Ra3 <- SP + (uext(I6[5:1]) << 1 );<br><br>Add immediate value (I6) to SP, and store result in Ra3.</td></tr>
<tr><td>Assembler mnemonic</td><td>Format</td><td>Affecting flag</td><td>Affected flag</td></tr>
<tr><td>addu Ra3,SP,I6</td><td>16bit</td><td>—</td><td>—</td></tr>
<tr><td colspan="4">Remarks</td></tr>
<tr><td colspan="4">I6 is an unsigned value whose lower 1 bit shall be 0.<br><br>C7 is the only predicate which can be used (condition cannot be executed).</td></tr>
</table>

Fig. 269 addvw Rc,Ra,Rb

| | |
|---|---|
| Behavior | **tmp[32:0] <- sext33(Ra[31:0]) + sext33(Rb[31:0]);**<br>**Rc <- tmp[31:0];**<br>**Rc <- 0x7fff_ffff, CFR.OVS <- 1,**<br>**if (tmp[32:0] > 0x0_7fff_ffff[32:0]);**<br>**Rc <- 0x8000_0000, CFR.OVS <- 1,**<br>**if (tmp[32:0] < 0x1_8000_0000[32:0]);**<br><br>**Add Ra to Rb. Saturate result when it cannot be represented by signed 32-bit value.** |

| Assembler mnemonic | Format | Affecting flag | Affected flag |
|---|---|---|---|
| **addvw Rc,Ra,Rb** | 32bit | CFR.OVS | — |

| Remarks |
|---|
| |

Fig. 270 addvh Rc,Ra,Rb

| | |
|---|---|
| Behavior | **tmp[16:0] <- sext17(Ra[15:0]) + sext17(Rb[15:0]);**<br>**Rc[31:0] <- Ra[31:0] + Rb[31:0];**<br>**Rc <- 0x0000_7fff, CFR.OVS <- 1,**<br>**if (tmp[16:0] > 0x0_7fff[16:0]);**<br>**Rc <- 0xffff_8000, CFR.OVS <- 1,**<br>**if (tmp[16:0] < 0x1_8000[16:0]);**<br><br>**Add Ra to Rb. Saturate result when it cannot be represented by signed 16-bit value.** |

| Assembler mnemonic | Format | Affecting flag | Affected flag |
|---|---|---|---|
| **addvh Rc,Ra,Rb** | 32bit | — | — |

| Remarks |
|---|
| |

Fig. 271 addc Rc,Ra,Rb

| | |
|---|---|
| Behavior | **tmp[32:0] <- Ra[31:0] + Rb[31:0] + C0;**<br>**Rc <- tmp[31:0];**<br>**C0:C1 <- 0:1;**<br>**C0:C1 <- 1:0, CFR.CAS <- 1, if (tmp[32] == 1);**<br><br>**Add Ra, Rb and C0. Resulting carry is stored in C0, C1 and CFR.CAS.** |

| Assembler mnemonic | Format | Affecting flag | Affected flag |
|---|---|---|---|
| **addc Rc,Ra,Rb** | 32bit | C0,C1,CFR.CAS | C0 |

| Remarks |
|---|
| |

Fig. 272 adds Rc,Ra,Rb

| Behavior | Rc <- (sext33(Ra) + sext33(Rb))[32:1];<br><br>Add Ra and Rb, and perform arithmetic shift right of result by 1 bit. | | |
|---|---|---|---|
| Assembler mnemonic | Format | Affecting flag | Affected flag |
| adds Rc,Ra,Rb | 32bit | – | – |
| Remarks | | | |
| | | | |

Fig. 273 addsr Rc,Ra,Rb

| | |
|---|---|
| Behavior | **Rc <- (sext33(Ra) + sext33(Rb) + 0x0_0000_0001[32:0])[32: 1];**<br><br>**Add Ra, Rb and 1, and perform arithmetic shift right of result by 1 bit.** |

| Assembler mnemonic | Format | Affecting flag | Affected flag |
|---|---|---|---|
| **addsr Rc,Ra,Rb** | 32bit | — | — |

| Remarks |
|---|
| |

Fig. 274 s1add Rc,Ra,Rb

| Behavior | **Rc <- Ra + (Rb << 1);** **Add to Ra value resulted from performing arithmetic shift left for Rb by 1 bit.** | | |
|---|---|---|---|
| Assembler mnemonic | Format | Affecting flag | Affected flag |
| **s1add Rc,Ra,Rb** | 32bit | — | — |
| Remarks | | | |
| | | | |

Fig. 275 s1add Rc3,Ra3,Rb3

| | |
|---|---|
| Behavior | **Rc3 <- Ra3 + (Rb3 << 1);**<br><br>**Add values resulted from performing arithmetic shift left for Ra3 and Rb3 by 1 bit, and store result in Rc3.** |

| Assembler mnemonic | Format | Affecting flag | Affected flag |
|---|---|---|---|
| **s1add Rc3,Ra3,Rb3** | 16bit | — | — |

| Remarks |
|---|
| C7 is the only predicate which can be used (condition cannot be executed). |

Fig. 276 s2add Rc,Ra,Rb

| Behavior | Rc <- Ra + (Rb << 2);<br><br>Add to Ra value resulted from performing arithmetic shift left for Rb by 2 bits. | | |
|---|---|---|---|
| **Assembler mnemonic** | **Format** | **Affecting flag** | **Affected flag** |
| s2add Rc,Ra,Rb | 32bit | – | – |
| Remarks | | | |
| | | | |

Fig. 277 s2add Rc3,Ra3,Rb3

| | |
|---|---|
| Behavior | **Rc3 <- Ra3 + (Rb3 << 2);**<br><br>**Add values resulted from performing arithmetic shift left for Ra3 and Rb3 by 2 bits, and store result in Rc3.** |

| Assembler mnemonic | Format | Affecting flag | Affected flag |
|---|---|---|---|
| **s2add Rc3,Ra3,Rb3** | 16bit | — | — |

| Remarks |
|---|
| C7 is the only predicate which can be used (condition cannot be executed). |

Fig. 278 addmsk Rc,Ra,Rb

| | |
|---|---|
| Behavior | **if (CFR.BPO <(u) 31) {**<br>**Rc[31:CFR.BPO+1] <- Ra[31:CFR.BPO+1];**<br>**Rc[CFR.BPO:0]<- Ra[CFR.BPO:0] + Rb[CFR.BPO:0];**<br>**} else {**<br>**Rc[31:0] <- Ra[31:0] + Rb[31:0];**<br>**}**<br><br>**Used for modulo addressing.**<br>**Add Ra and Rb only within range specified by CFR.BPO. Value of Ra is directly transferred for unspecified range.** |

| Assembler mnemonic | Format | Affecting flag | Affected flag |
|---|---|---|---|
| **addmsk Rc,Ra,Rb** | 32bit | — | CFR.BPO |

| Remarks |
|---|
| |

Fig. 279 addarvw Rc,Ra,Rb

| | |
|---|---|
| Behavior | **tmp[32:0] <- sext33(Ra) + sext33(Rb) + uext33(~(Ra[31:31]));**<br>**Rc <- tmp[31:0];**<br>**Rc <- 0x7fff_ffff, CFR.OVS <- 1,**<br>**if ( tmp[32:0] > 0x0_7fff_ffff[32:0] );**<br>**Rc <- 0x8000_0000, CFR.OVS <- 1,**<br>**if ( tmp[32:0] < 0x1_8000_0000[32:0] );**<br><br>**Round up absolute values in image processing.**<br>**Add Ra and Rb. Further add 1 if value of Ra is positive.** |

| Assembler mnemonic | Format | Affecting flag | Affected flag |
|---|---|---|---|
| **addarvw Rc,Ra,Rb** | 32bit | CFR.OVS | — |

| Remarks |
|---|
| When rounding an absolute value (away from zero), a value resulted from padding, with 1, a bits lower than a target bit to be rounded shall be stored in Rb<br>ex. Rb <- 0x0000_7fff (when rounded to MSB 16 bits) |

Fig. 280 sub Rc,Rb,Ra

| Behavior | Rc <- Rb - Ra;<br><br>Subtract Ra from Rb. | | |
|---|---|---|---|
| **Assembler mnemonic** | **Format** | **Affecting flag** | **Affected flag** |
| **sub Rc,Rb,Ra** | 32bit | — | — |
| Remarks | | | |
| Be careful with the order of operands. | | | |

Fig. 281 sub Rc3,Rb3,Ra3

| | | | |
|---|---|---|---|
| Behavior | Rc3 <- Rb3 - Ra3;<br><br>**Subtract Ra3 from Rb3, and store result in Rc3.** | | |
| Assembler mnemonic | Format | Affecting flag | Affected flag |
| **sub Rc3,Rb3,Ra3** | 16bit | — | — |
| Remarks | | | |
| Be careful with the order of operands.<br><br>C7 is the only predicate which can be used (condition cannot be executed). | | | |

Fig. 282 sub Rb2,Ra2

| | | | | |
|---|---|---|---|---|
| Behavior | **Rb2 <- Rb2 - Ra2;**<br><br>**Subtract Ra2 from Rb2, and store result in Rb2.** | | | |
| Assembler mnemonic | | Format | Affecting flag | Affected flag |
| **sub Rb2,Ra2** | | 16bit | — | — |
| Remarks | | | | |
| Be careful with the order of operands.<br><br>C7 is the only predicate which can be used (condition cannot be executed). | | | | |

Fig. 283 sub Rb,Ra,I12

| | |
|---|---|
| Behavior | **=> add Rb,Ra,-I12**<br><br>**Rb <- Ra - sext(I12);**<br><br>**Subtract immediate value (I12) from Ra.** |

| Assembler mnemonic | Format | Affecting flag | Affected flag |
|---|---|---|---|
| **sub Rb,Ra,I12** | 32bit synonym | — | — |

| Remarks |
|---|
| I12 is a signed value. |

Fig. 284 sub Ra2,I5

| | |
|---|---|
| Behavior | **=> add Ra2,-I5**<br><br>**Ra2 <- Ra2 + sext(I5);**<br><br>**Subtract immediate value (I5) from Ra2, and store result in Ra2.** |

| Assembler mnemonic | Format | Affecting flag | Affected flag |
|---|---|---|---|
| **sub Ra2,I5** | 16bit synonym | — | — |

| Remarks |
|---|
| I5 is a signed value.<br><br>C7 is the only predicate which can be used (condition cannot be executed). |

Fig. 285 sub SP,I19

| | | | | |
|---|---|---|---|---|
| Behavior | => add SP,-I19<br><br>SP <- SP - (sext(I19[18:3]) << 3);<br><br>Subtract immediate value (I19) from SP, and store result in SP. | | | |
| Assembler mnemonic | Format | Affecting flag | Affected flag | |
| sub SP,I19 | 32bit synonym | — | — | |
| Remarks | | | | |
| I19 is a signed value whose lower 3 bits shall be 0. | | | | |

Fig. 286 sub SP,I11

| | | | |
|---|---|---|---|
| Behavior | **=> add SP,-I11**<br><br>**SP <- SP + (sext(I11[10:3]) << 3);**<br><br>**Subtract immediate value (I11) from SP, and store result in SP.** | | |
| Assembler mnemonic | Format | Affecting flag | Affected flag |
| **sub SP,I11** | 16bit synonym | — | — |
| Remarks | | | |
| I11 is a signed value whose lower 3 bits shall be 0.<br><br>C7 is the only predicate which can be used (condition cannot be executed). | | | |

Fig. 287 subc Rc,Rb,Ra

| | |
|---|---|
| Behavior | **tmp[32:0] <- Rb[31:0] - Ra[31:0] - C0;**<br>**Rc <- tmp[31:0];**<br>**C0:C1 <- 0:1;**<br>**C0:C1 <- 1:0, CFR.CAS <- 1, if (tmp[32] == 1);**<br><br>**Subtract Ra from Rb, and further subtract C0 from result. Store borrow of subtraction result in C0, C1, and CFR.CAS.** |

| Assembler mnemonic | Format | Affecting flag | Affected flag |
|---|---|---|---|
| **subc Rc,Rb,Ra** | 32bit | C0,C1,CFR.CAS | C0 |

| Remarks |
|---|
| Be careful with the order of operands. |

Fig. 288 subvw Rc,Rb,Ra

| | |
|---|---|
| Behavior | **tmp[32:0] <- sext33(Rb[31:0]) - sext33(Ra[31:0]);**<br>**Rc <- tmp[31:0];**<br>**Rc <- 0x7fff_ffff, CFR.OVS <- 1,**<br>**if (tmp[32:0] > 0x0_7fff_ffff[32:0]);**<br>**Rc <- 0x8000_0000, CFR.OVS <- 1,**<br>**if (tmp[32:0] < 0x1_8000_0000[32:0]);**<br><br>**Subtract Ra from Rb. Saturate result when it cannot be represented by signed 32 bits.** |

| Assembler mnemonic | Format | Affecting flag | Affected flag |
|---|---|---|---|
| **subvw Rc,Rb,Ra** | 32bit | CFR.OVS | — |

| Remarks |
|---|
| Be careful with the order of operands. |

Fig. 289 subvh Rc,Rb,Ra

| | |
|---|---|
| Behavior | **tmp[16:0] <- sext17(Rb[15:0]) - sext17(Ra[15:0]);**<br>**Rc[31:0] <- Rb[31:0] - Ra[31:0];**<br>**Rc <- 0x0000_7fff, CFR.OVS <- 1, if (tmp[16:0] > 0x0_7fff[16:0]);**<br>**Rc <- 0xffff_8000, CFR.OVS <- 1, if (tmp[16:0] < 0x1_8000[16:0]);**<br><br>**Subtract Ra from Rb. Saturate result when it cannot be represented by signed 16-bit value.** |

| Assembler mnemonic | Format | Affecting flag | Affected flag |
|---|---|---|---|
| **subvh Rc,Rb,Ra** | 32bit | CFR.OVS | — |

| Remarks |
|---|
| Be careful with the order of operands. |

Fig. 290 subs Rc,Rb,Ra

| Behavior | Rc <- (sext33(Rb) - sext33(Ra))[32:1];<br><br>**Subtract Ra from Rb, and perform arithmetic shift right of result by 1 bit.** | | |
|---|---|---|---|
| Assembler mnemonic | Format | Affecting flag | Affected flag |
| **subs Rc,Rb,Ra** | 32bit | — | — |
| Remarks | | | |
| Be careful with the order of operands. | | | |

Fig. 291 submsk Rc,Rb,Ra

<table>
<tr><td>Behavior</td><td colspan="3">

```
if (CFR.BPO <(u) 31) {
  Rc[31:CFR.BPO+1] <- Rb[31:CFR.BPO+1];
  Rc[CFR.BPO:0]<- Rb[CFR.BPO:0] - Ra[CFR.BPO:0];
} else {
  Rc[31:0]   <- Rb[31:0] - Ra[31:0];
}
```

Used for modulo addressing.<br>Subtract Ra from Rb only within range specified by CFR.BPO.<br>Value of Rb is directly transferred for unspecified range.</td></tr>
<tr><td>Assembler mnemonic</td><td>Format</td><td>Affecting flag</td><td>Affected flag</td></tr>
<tr><td>submsk Rc,Rb,Ra</td><td>32bit</td><td>—</td><td>CFR.BPO</td></tr>
<tr><td colspan="4">Remarks</td></tr>
<tr><td colspan="4">Be careful with the order of operands.</td></tr>
</table>

Fig. 292 rsub Rb,Ra,I8

| | | | | |
|---|---|---|---|---|
| Behavior | **Rb <- sext(I8) - Ra;**<br><br>**Subtract Ra from immediate value (I12).** | | | |
| Assembler mnemonic | | Format | Affecting flag | Affected flag |
| **rsub Rb,Ra,I8** | | 32bit | — | — |
| Remarks | | | | |
| I8 is a signed value.<br><br>Be careful with the order of operands. | | | | |

Fig. 293 rsub Ra2,I4

| | |
|---|---|
| Behavior | **Ra2 <- sext(I4) - Ra2;**<br><br>**Subtract Ra2 from immediate value (I4), and store result in Ra2.** |

| Assembler mnemonic | Format | Affecting flag | Affected flag |
|---|---|---|---|
| **rsub Ra2,I4** | 16bit | — | — |

| Remarks |
|---|
| I4 is a signed value.<br>Be careful with the order of operands.<br>C7 is the only predicate which can be used (condition cannot be executed). |

Fig. 294 rsub Ra2,Rb2

| | |
|---|---|
| Behavior | **Ra2 <- Rb2 - Ra2;**<br><br>**Subtract Ra2 from Rb2 and store result in Ra2.** |

| Assembler mnemonic | Format | Affecting flag | Affected flag |
|---|---|---|---|
| **rsub Ra2,Rb2** | 16bit | — | -- |

| Remarks |
|---|
| Be careful with the order of operands.<br><br>C7 is the only predicate which can be used (condition cannot be executed). |

Fig. 295 neg Rb,Ra

| | |
|---|---|
| Behavior | **=> rsub Rb,Ra,0**<br><br>**Rb <- - Ra;**<br><br>**Invert sign of Ra.** |

| Assembler mnemonic | Format | Affecting flag | Affected flag |
|---|---|---|---|
| **rsub Rb,Ra,0** | 32bit synonym | — | — |

| Remarks |
|---|
| |

Fig. 296 neg Ra2

| | |
|---|---|
| Behavior | **=> rsub Ra2,0**<br><br>**Ra2 <- sext(I4) - Ra2;**<br><br>**Invert sign of Ra2, and store result in Ra2.** |

| Assembler mnemonic | Format | Affecting flag | Affected flag |
|---|---|---|---|
| **neg Ra2** | 16bit synonym | — | — |

| Remarks |
|---|
| C7 is the only predicate which can be used (condition cannot be executed). |

Fig. 297 negvh Rb,Ra

| | |
|---|---|
| Behavior | tmp[16:0] <- -sext17(Ra[15:0]);<br>Rb[31:0] <- -Ra[31:0];<br>Rb <- 0x0000_7fff, CFR.OVS <- 1, if (tmp[16:0] > 0x0_7fff[16:0]);<br>Rb <- 0xffff_8000, CFR.OVS <- 1, if (tmp[16:0] < 0x1_8000[16:0]);<br><br>Sign-invert Ra. Saturate result when it cannot be represented by signed 16 bits. |

| Assembler mnemonic | Format | Affecting flag | Affected flag |
|---|---|---|---|
| negvh Rb,Ra | 32bit | CFR.OVS | — |

| Remarks |
|---|
| |

Fig. 298 negvw Rb,Ra

| | |
|---|---|
| Behavior | **tmp[32:0] <- -sext33(Ra[31:0]);**<br>**Rb <- tmp[31:0],**<br>**Rb <- 0x7fff_ffff, CFR.OVS <- 1,**<br>**if (tmp[32:0] > 0x0_7fff_ffff[32:0]);**<br>**Rb <- 0x8000_0000, CFR.OVS <- 1,**<br>**if (tmp[32:0] < 0x1_8000_0000[32:0]);**<br><br>**Sign-invert Ra. Saturate result when it cannot be represented by signed 32 bits.** |

| Assembler mnemonic | Format | Affecting flag | Affected flag |
|---|---|---|---|
| **negvw Rb,Ra** | 32bit | CFR.OVS | — |

| Remarks |
|---|
| |

Fig. 299 abs Rb,Ra

| | | | | |
|---|---|---|---|---|
| Behavior | **Rb <- Ra, if (Ra >= 0);**<br>**Rb <- -Ra, if (Ra < 0);**<br><br>**Determine absolute value of Ra.** | | | |
| Assembler mnemonic | | Format | Affecting flag | Affected flag |
| **abs Rb,Ra** | | 32bit | — | — |
| Remarks | | | | |
| | | | | |

Fig. 300 absvw Rb,Ra

| | |
|---|---|
| Behavior | Rb <- Ra, if(Ra >= 0);<br>Rb <- -Ra, if(Ra < 0);<br>Rb <- 0x7fff_ffff, CFR.OVS <- 1, if (Ra == 0x8000_0000);<br><br>**Determine absolute value of Ra. Saturate result when it cannot be represented by signed 32 bits.** |

| Assembler mnemonic | Format | Affecting flag | Affected flag |
|---|---|---|---|
| **absvw Rb,Ra** | 32bit | CFR.OVS | — |

| Remarks |
|---|
| |

Fig. 301 absvh Rb,Ra

| | |
|---|---|
| Behavior | **Rb <- Ra, if (Ra[15:0] >= 0);**<br>**Rb <- -Ra, if (Ra[15:0] < 0);**<br>**Rb <- 0x0000_7fff, CFR.OVS <- 1, if (Ra[15:0] == 0x8000);**<br><br>**Determine absolute value of Ra. Saturate result when it cannot be represented by signed 16 bits.** |

| Assembler mnemonic | Format | Affecting flag | Affected flag |
|---|---|---|---|
| **absvh Rb,Ra** | 32bit | CFR.OVS | — |

| Remarks |
|---|
| |

Fig. 302 max Rc,Ra,Rb

| | |
|---|---|
| Behavior | **Rc <- Ra, C0:C1 <- 0:1, if (Ra >= Rb);**<br>**Rc <- Rb, C0:C1 <- 1:0, if (Ra < Rb);**<br><br>**Compare Ra with Rb, and store bigger one in Rc. Furthermore, output comparison result to C0 and C1.** |

| Assembler mnemonic | Format | Affecting flag | Affected flag |
|---|---|---|---|
| **max Rc,Ra,Rb** | 32bit | C0,C1 | — |

| Remarks |
|---|
| |

Fig. 303 min Rc,Ra,Rb

<table>
<tr><td>Behavior</td><td colspan="3">Rc <- Ra, C0:C1 <- 0:1, if (Ra < Rb);<br>Rc <- Ra, C0:C1 <- 1:0, if (Ra >= Rb);<br><br>Compare Ra with Rb, and store smaller one in Rc. Furthermore, output comparison result to C0 and C1.</td></tr>
<tr><td>Assembler mnemonic</td><td>Format</td><td>Affecting flag</td><td>Affected flag</td></tr>
<tr><td>min Rc,Ra,Rb</td><td>32bit</td><td>C0,C1</td><td>—</td></tr>
<tr><td colspan="4">Remarks</td></tr>
<tr><td colspan="4"></td></tr>
</table>

Fig. 304 and Rc,Ra,Rb

| | | | |
|---|---|---|---|
| Behavior | Rc <- Ra & Rb;<br><br>Carry out logical AND between Ra and Rb. | | |
| Assembler mnemonic | Format | Affecting flag | Affected flag |
| **and Rc,Ra,Rb** | 32bit | — | — |
| Remarks | | | |
| | | | |

Fig. 305 and Ra2,Rb2

| | | | | |
|---|---|---|---|---|
| Behavior | **and Ra2,Rb2;**<br><br>**Carry out logical AND between Ra2 and Rb2, and store result in Ra2.** | | | |
| Assembler mnemonic | Format | Affecting flag | Affected flag | |
| **and Ra2,Rb2** | 16bit | — | — | |
| Remarks | | | | |
| C7 is the only predicate which can be used (condition cannot be executed). | | | | |

Fig. 306 and Rb,Ra,I8

| | | | | |
|---|---|---|---|---|
| Behavior | **Rb <- Ra & uext(I8);**<br><br>**Carry out logical AND between Ra and immediate value (I8).** | | | |
| Assembler mnemonic | Format | Affecting flag | Affected flag | |
| **and Rb,Ra,I8** | 32bit | — | — | |
| Remarks | | | | |
| I8 is an unsigned value. | | | | |

Fig. 307 andn Rc,Ra,Rb

| Behavior | Rc <- Ra & ~Rb;<br><br>Carry out logical AND between Ra and inverted Rb. | | |
|---|---|---|---|
| **Assembler mnemonic** | **Format** | **Affecting flag** | **Affected flag** |
| andn Rc,Ra,Rb | 32bit | — | — |
| Remarks | | | |
| | | | |

Fig. 308 andn Ra2,Rb2

| | |
|---|---|
| Behavior | **Ra2 <- Ra2 & ~Rb2;**<br><br>**Carry out logical AND between Ra2 and inverted Rb2, and store result in Ra2.** |

| Assembler mnemonic | Format | Affecting flag | Affected flag |
|---|---|---|---|
| **andn Ra2,Rb2** | 16bit | — | — |

| Remarks |
|---|
| C7 is the only predicate which can be used (condition cannot be executed). |

Fig. 309 andn Rb,Ra,I8

| | | | | |
|---|---|---|---|---|
| Behavior | **Rb <- Ra & ~uext(I8);**<br><br>**Carry out logical AND between Ra and inverted immediate value (I8).** | | | |
| Assembler mnemonic | | Format | Affecting flag | Affected flag |
| **andn Rb,Ra,I8** | | 32bit | — | — |
| Remarks | | | | |
| I8 is an unsigned value. | | | | |

Fig. 310 or Rc,Ra,Rb

| | | | | |
|---|---|---|---|---|
| Behavior | **Rc <- Ra \| Rb;**<br><br>**Carry out logical OR between Ra and Rb.** | | | |
| Assembler mnemonic | | Format | Affecting flag | Affected flag |
| **or Rc,Ra,Rb** | | 32bit | — | — |
| Remarks | | | | |
| | | | | |

Fig. 311 or Ra2,Rb2

<table>
<tr><td rowspan="2">Behavior</td><td colspan="4">Ra2 <- Ra2 | Rb2;</td></tr>
<tr><td colspan="4">Carry out logical OR between Ra2 and Rb2, and store result in Ra2.</td></tr>
<tr><td colspan="2">Assembler mnemonic</td><td>Format</td><td>Affecting flag</td><td>Affected flag</td></tr>
<tr><td colspan="2">or Ra2,Rb2</td><td>16bit</td><td>—</td><td>—</td></tr>
<tr><td colspan="5">Remarks</td></tr>
<tr><td colspan="5">C7 is the only predicate which can be used (condition cannot be executed).</td></tr>
</table>

Fig. 312 or Rb,Ra,I8

<table>
<tr><td>Behavior</td><td colspan="3">Rb <- Ra | uext(I8);<br><br>Carry out logical OR between Ra and immediate value (I8).</td></tr>
<tr><td>Assembler mnemonic</td><td>Format</td><td>Affecting flag</td><td>Affected flag</td></tr>
<tr><td>or Rb,Ra,I8</td><td>32bit</td><td>—</td><td>—</td></tr>
<tr><td colspan="4">Remarks</td></tr>
<tr><td colspan="4">I8 is an unsigned value.</td></tr>
</table>

Fig. 313 xor Rc,Ra,Rb

| | |
|---|---|
| Behavior | **Rc <- Ra ^ Rb;**<br><br>**Carry out exclusive logical OR between Ra and Rb.** |

| Assembler mnemonic | Format | Affecting flag | Affected flag |
|---|---|---|---|
| **xor Rc,Ra,Rb** | 32bit | — | — |

| Remarks |
|---|
| |

Fig. 314 xor Ra2,Rb2

| | | | |
|---|---|---|---|
| Behavior | **Ra2 <- Ra2 ^ Rb2;**<br><br>**Carry out exclusive logical OR between Ra2 and Rb2, and store result in Ra2.** | | |
| Assembler mnemonic | Format | Affecting flag | Affected flag |
| **xor Ra2,Rb2** | 16bit | — | — |
| Remarks | | | |
| C7 is the only predicate which can be used (condition cannot be executed). | | | |

Fig. 315 xor Rb,Ra,I8

| | | | | |
|---|---|---|---|---|
| Behavior | **Rb <- Ra ^ uext(I8);**<br><br>**Carry out exclusive logical OR between Ra and immediate value (I8). I8 is an unsigned value.** | | | |
| Assembler mnemonic | Format | Affecting flag | Affected flag | |
| **xor Rb,Ra,I8** | 32bit | — | — | |
| Remarks | | | | |
| I8 is an unsigned value. | | | | |

Fig. 316 not Rb,Ra

| Behavior | => rsub Rb,Ra,-1<br><br>Rb <- sext(-1) - Ra;<br><br>Invert each bit in Ra. | | |
|---|---|---|---|
| Assembler mnemonic | Format | Affecting flag | Affected flag |
| **not Rb,Ra** | 32bit synonym | — | — |
| Remarks | | | |
| | | | |

Fig. 317 not Ra2

| | |
|---|---|
| Behavior | **=> rsub Ra2,-1**<br>**Ra2 <- sext(I4) - Ra2;**<br>**Invert all bits in Ra2, and store inverted bits in Ra2.** |

| Assembler mnemonic | Format | Affecting flag | Affected flag |
|---|---|---|---|
| **not Ra2** | 16bit synonym | — | — |

| Remarks |
|---|
| C7 is the only predicate which can be used (condition cannot be executed). |

Fig. 318 cmpCC Cm,Ra,Rb

| | |
|---|---|
| Behavior | **=> cmpCCn Cm,Ra,Rb,C7**<br><br>**Cm <- result ;**<br><br>**Compare Ra and Rb, and store comparison result in Cm.** |

| Assembler mnemonic | Format | Affecting flag | Affected flag |
|---|---|---|---|
| **cmpCC Cm,Ra,Rb** | 32bit synonym | Cm | — |

| Remarks |
|---|
| The following CC relation conditions can be described in CC: eq/ne/gt/ge/gtu/geu/le/lt/leu/ltu |

Fig. 319 cmpCC C6,Ra2,Rb2

| | |
|---|---|
| Behavior | **C6 <- result;**<br><br>**Compare Ra2 and Rb2, and store result in C6.** |

| Assembler mnemonic | Format | Affecting flag | Affected flag |
|---|---|---|---|
| **cmpCC C6,Ra2,Rb2** | 16bit | C6 | — |

| Remarks |
|---|
| The following CC relation conditions can be described in CC: eq/ne/gt/ge/le/lt<br><br>C7 is the only predicate which can be used (condition cannot be executed). |

Fig. 320 cmpCC Cm,Ra,I5

| | |
|---|---|
| Behavior | **=> cmpCCn Cm,Ra,I5,C7**<br><br>**Cm <- result;**<br><br>**Store result of comparison made between Ra and immediate value (I5) in Cm.** |

| Assembler mnemonic | Format | Affecting flag | Affected flag |
|---|---|---|---|
| **cmpCC Cm,Ra,I5** | 32bit synonym | Cm | — |

| Remarks |
|---|
| The following CC relation conditions can be described in CC: eq/ne/gt/ge/gtu/geu/le/lt/leu/ltu<br>When CC is eq/ne/gt/ge/le/lt, I5 is a signed value which will be sign-extended before being compared.<br>When CC is gtu/geu/leu/ltu, I5 is an unsigned value. |

Fig. 321 cmpCC C6,Ra2,I4

| | |
|---|---|
| Behavior | **C6 <-result;**<br><br>**Compare Ra2 and immediate value (I4), and store result in C6.** |

| Assembler mnemonic | Format | Affecting flag | Affected flag |
|---|---|---|---|
| **cmpCC C6,Ra2,I4** | 16bit | C6 | — |

| Remarks |
|---|
| The following CC relation conditions can be described in CC: eq/ne/gt/ge/le/lt<br><br>I4 is a signed value.<br><br>C7 is the only predicate which can be used (condition cannot be executed). |

Fig. 322 cmpCC Cm:Cm+1,Ra,Rb

<table>
<tr><td>Behavior</td><td colspan="3">=> cmpCCn Cm:Cm+1,Ra,Rb,C7<br><br>Cm <- result;<br>Cm+1 <- ~result;<br><br>Compare Ra and Rb, and store comparison result in Cm and Cm+1.</td></tr>
<tr><td>Assembler mnemonic</td><td>Format</td><td>Affecting flag</td><td>Affected flag</td></tr>
<tr><td>cmpCC Cm:Cm+1,Ra,Rb</td><td>32bit synonym</td><td>Cm,Cm+1</td><td>—</td></tr>
<tr><td colspan="4">Remarks</td></tr>
<tr><td colspan="4">The following CC relation conditions can be described in CC: eq/ne/gt/ge/gtu/geu/le/lt/leu/ltu<br><br>m shall be an even number.</td></tr>
</table>

Fig. 323 cmpCC Cm:Cm+1,Ra,I5

Behavior

```
=> cmpCCn Cm:Cm+1,Ra,I5,C7

Cm    <-   result;
Cm+1 <- ~result;
```

Store result of comparison made between Ra and immediate value (I5) in Cm and Cm+1.

| Assembler mnemonic | Format | Affecting flag | Affected flag |
|---|---|---|---|
| **cmpCC Cm:Cm+1,Ra,I5** | 32bit synonym | Cm,Cm+1 | — |

Remarks

The following CC relation conditions can be described in CC: eq/ne/gt/ge/gtu/geu/le/lt/leu/ltu m shall be an even number.

When CC is eq/ne/gt/ge/le/lt, I5 is a signed value which will be sign-extended before being compared.

When CC is gtu/geu/leu/ltu, I5 is an unsigned value.

Fig. 324 cmpCCn Cm,Ra,Rb,Cn

| | |
|---|---|
| Behavior | **Cm <- result & Cn;**<br><br>**Take nest condition between result of comparison made between Ra and Rb, and Cn, and store result in Cm.** |

| Assembler mnemonic | Format | Affecting flag | Affected flag |
|---|---|---|---|
| **cmpCCn Cm,Ra,Rb,Cn** | 32bit | Cm | Cn |

| Remarks |
|---|
| The following CC relation conditions can be described in CC: eq/ne/gt/ge/gtu/geu/le/lt/leu/ltu |

Fig. 325 cmpCCn Cm,Ra,I5,Cn

<table>
<tr><td>Behavior</td><td colspan="3">Cm <- result & Cn;<br><br>Take nest condition between result of comparison made between Ra and immediate value (I5), and Cn, and store result in Cm.</td></tr>
<tr><td>Assembler mnemonic</td><td>Format</td><td>Affecting flag</td><td>Affected flag</td></tr>
<tr><td>cmpCCn Cm,Ra,I5,Cn</td><td>32bit</td><td>Cm</td><td>Cn</td></tr>
<tr><td colspan="4">Remarks</td></tr>
<tr><td colspan="4">m shall be an even number.<br>The following CC relation conditions can be described in CC: eq/ne/gt/ge/gtu/geu/le/lt/leu/ltu<br>When CC is eq/ne/gt/ge/le/lt, I5 is a signed value which will be sign-extended before being compared.<br>When CC is gtu/geu/leu/ltu, I5 is an unsigned value.</td></tr>
</table>

Fig. 326 cmpCCn Cm:Cm+1,Ra,Rb,Cn

| | |
|---|---|
| Behavior | **Cm <- result & Cn;**<br>**Cm+1 <- ~result & Cn;**<br><br>**Take nest condition between result of comparison made between Ra and Rb, and Cn, and store result in Cm and Cm+1.** |

| Assembler mnemonic | Format | Affecting flag | Affected flag |
|---|---|---|---|
| **cmpCCn Cm:Cm+1,Ra,Rb,Cn** | 32bit | Cm,Cm+1 | Cn |

| Remarks |
|---|
| The following CC relation conditions can be described in CC: eq/ne/gt/ge/gtu/geu/le/lt/leu/ltu<br><br>m shall be an even number. |

Fig. 327 cmpCCn Cm:Cm+1,Ra,I5,Cn

| | |
|---|---|
| Behavior | **Cm <- result & Cn;**<br>**Cm+1 <- ~result & Cn;**<br>**Take nest condition between result of comparison made between Ra and immediate value (I5), and Cn, and store result in Cm and Cm+1.** |

| Assembler mnemonic | Format | Affecting flag | Affected flag |
|---|---|---|---|
| **cmpCCn Cm:Cm+1,Ra,I5,Cn** | 32bit | Cm,Cm+1 | Cn |

| Remarks |
|---|
| m shall be an even number.<br>The following CC relation conditions can be described in CC: eq/ne/gt/ge/gtu/geu/le/lt/leu/ltu<br>When CC is eq/ne/gt/ge/le/lt, I5 is a signed value which will be sign-extended before being compared.<br>When CC is gtu/geu/leu/ltu, I5 is an unsigned value. |

Fig. 328 cmpCCa Cm:Cm+1,Ra,Rb,Cn

| | |
|---|---|
| Behavior | **Cm <- result & Cn;**<br>**Cm+1 <- ~(result & Cn);**<br><br>**Take AND condition between result of comparison made between Ra and Rb, and Cn, and store result in Cm and Cm+1.** |

| Assembler mnemonic | Format | Affecting flag | Affected flag |
|---|---|---|---|
| **cmpCCa Cm:Cm+1,Ra,Rb,Cn** | 32bit | Cm,Cm+1 | Cn |

| Remarks |
|---|
| The following CC relation conditions can be described in CC: eq/ne/gt/ge/gtu/geu/le/lt/leu/ltu<br><br>m shall be an even number. |

Fig. 329 cmpCCa Cm:Cm+1,Ra,I5,Cn

| | |
|---|---|
| Behavior | **Cm <- result & Cn;**<br>**Cm+1 <- ~(result & Cn);**<br><br>**Take AND condition between result of comparison made between Ra and immediate value (I5), and Cn, and store result in Cm and Cm+1.** |

| Assembler mnemonic | Format | Affecting flag | Affected flag |
|---|---|---|---|
| **cmpCCa Cm:Cm+1,Ra,I5,Cn** | 32bit | Cm,Cm+1 | Cn |

| Remarks |
|---|
| m shall be an even number.<br>The following CC relation conditions can be described in CC: eq/ne/gt/ge/gtu/geu/le/lt/leu/ltu<br>When CC is eq/ne/gt/ge/le/lt, I5 is a signed value which will be sign-extended before being compared.<br>When CC is gtu/geu/leu/ltu, I5 is an unsigned value. |

Fig. 330 cmpCCo Cm:Cm+1,Ra,Rb,Cn

<table>
<tr><td>Behavior</td><td colspan="4">Cm <- result | Cn;<br>Cm+1 <- ~(result | Cn);<br><br>Take OR condition between result of comparison made between Ra and Rb, and Cn, and store result in Cm and Cm+1.</td></tr>
<tr><td colspan="2">Assembler mnemonic</td><td>Format</td><td>Affecting flag</td><td>Affected flag</td></tr>
<tr><td colspan="2">cmpCCo Cm:Cm+1,Ra,Rb,Cn</td><td>32bit</td><td>Cm,Cm+1</td><td>Cn</td></tr>
<tr><td colspan="5">Remarks</td></tr>
<tr><td colspan="5">The following CC relation conditions can be described in CC: eq/ne/gt/ge/gtu/geu/le/lt/leu/ltu<br><br>m shall be an even number.</td></tr>
</table>

Fig. 331 cmpCCo Cm:Cm+1,Ra,I5,Cn

| | | | |
|---|---|---|---|
| Behavior | **Cm <- result \| Cn;**<br>**Cm+1 <- ~(result \| Cn);**<br><br>**Take OR condition between result of comparison made between Ra and Rb, and Cn, and store result in Cm and Cm+1.** | | |
| Assembler mnemonic | Format | Affecting flag | Affected flag |
| **cmpCCo Cm:Cm+1,Ra,I5,Cn** | 32bit | Cm,Cm+1 | Cn |
| Remarks | | | |
| m shall be an even number.<br>The following CC relation conditions can be described in CC: eq/ne/gt/ge/gtu/geu/le/lt/leu/ltu<br>When CC is eq/ne/gt/ge/le/lt, I5 is a signed value which will be sign-extended before being compared.<br>When CC is gtu/geu/leu/ltu, I5 is an unsigned value. | | | |

Fig. 332 tstz Cm,Ra,Rb

| | |
|---|---|
| Behavior | **=> tstzn Cm,Ra,Rb,C7**<br><br>**Cm <- tstz(Ra,Rb);**<br><br>**Store result of bit test performed for Ra and Rb in Cm. Output 1 when AND is 0 in bit test.** |

| Assembler mnemonic | Format | Affecting flag | Affected flag |
|---|---|---|---|
| **tstz Cm,Ra,Rb** | 32bit synonym | Cm | — |

| Remarks |
|---|
| |

Fig. 333 tstz C6,Ra2,Rb2

| | |
|---|---|
| Behavior | **C6 <- tstz(Ra2,Rb2);**<br><br>**Perform bit test for Ra2 and Rb2, store result in C6. Output 1 when AND is 0 in bit test.** |

| Assembler mnemonic | Format | Affecting flag | Affected flag |
|---|---|---|---|
| **tstz C6,Ra2,Rb2** | 16bit | C6 | — |

| Remarks |
|---|
| C7 is the only predicate which can be used (condition cannot be executed). |

Fig. 334 tstz Cm,Ra,I5

| | | | |
|---|---|---|---|
| Behavior | **=> tstzn Cm,Ra,I5,C7**<br><br>**Cm <- tstz(Ra,uext(I5));**<br><br>**Store result of bit test performed for Ra and immediate value (I5) in Cm. Output 1 when AND is 0 in bit test.** | | |
| Assembler mnemonic | Format | Affecting flag | Affected flag |
| **tstz Cm,Ra,I5** | 32bit synonym | Cm | — |
| Remarks | | | |
| I5 is an unsigned value. | | | |

Fig. 335 tstz C6,Ra2,I4

| | | | |
|---|---|---|---|
| Behavior | **C6 <- tstz(Ra2,uext(I4));**<br><br>**Perform bit test for Ra2 and Rb2, and store result in C6. Output 1 when AND is 0 in bit test.** | | |
| Assembler mnemonic | Format | Affecting flag | Affected flag |
| **tstz C6,Ra2,I4** | 16bit | C6 | — |
| Remarks | | | |
| I4 is an unsigned value.<br>C7 is the only predicate which can be used (condition cannot be executed). | | | |

Fig. 336 tstz Cm:Cm+1,Ra,Rb

| | |
|---|---|
| Behavior | **=> tstzn Cm:Cm+1,Ra,Rb,C7**<br><br>**Cm <- tstz(Ra,Rb);**<br>**Cm+1 <- ~tstz(Ra,Rb);**<br><br>**Store result of bit test performed for Ra and Rb in Cm and Cm+1.**<br>**Output 1 when AND is 0 in bit test.** |

| Assembler mnemonic | Format | Affecting flag | Affected flag |
|---|---|---|---|
| **tstz Cm:Cm+1,Ra,Rb** | 32bit synonym | Cm,Cm+1 | — |

| Remarks |
|---|
| m shall be an even number. |

Fig. 337 tstz Cm:Cm+1,Ra,I5

| | |
|---|---|
| Behavior | **=> tstzn Cm:Cm+1,Ra,I5,C7**<br><br>**Cm <- tstz(Ra,uext(I5));**<br>**Cm+1 <- ~tstz(Ra,uext(I5));**<br><br>**Store result of bit test performed for Ra and immediate value (I5) in Cm and Cm+1. Output 1 when AND is 0 in bit test.** |

| Assembler mnemonic | Format | Affecting flag | Affected flag |
|---|---|---|---|
| **tstz Cm:Cm+1,Ra,I5** | 32bit synonym | Cm,Cm+1 | — |

| Remarks |
|---|
| m shall be an even number.<br>I5 is an unsigned value. |

Fig. 338 tstzn Cm,Ra,Rb,Cn

| | | | | |
|---|---|---|---|---|
| Behavior | **Cm <- tstz(Ra,Rb) & Cn;**<br><br>**Take nest condition between result of bit test performed for Ra and Rb, and Cn, and store result in Cm. Output 1 when AND is 0 in bit test.** | | | |
| Assembler mnemonic | | Format | Affecting flag | Affected flag |
| **tstzn Cm,Ra,Rb,Cn** | | 32bit | Cm | Cn |
| Remarks | | | | |
| | | | | |

Fig. 339 tstzn Cm,Ra,I5,Cn

| | |
|---|---|
| Behavior | **Cm <- tstz(Ra,uext(I5)) & Cn;**<br><br>**Take nest condition between result of bit test performed for Ra and immediate value (I5), and Cn, and store result in Cm. Output 1 when AND is 0 in bit test.** |

| Assembler mnemonic | Format | Affecting flag | Affected flag |
|---|---|---|---|
| **tstzn Cm,Ra,I5,Cn** | 32bit | Cm | Cn |

| Remarks |
|---|
| I5 is an unsigned value. |

Fig. 340 tstzn Cm:Cm+1,Ra,Rb,Cn

| | | | |
|---|---|---|---|
| Behavior | **Cm <- tstz(Ra,Rb) & Cn;**<br>**Cm+1 <- ~tstz(Ra,Rb) & Cn;**<br><br>**Take nest condition between result of bit test performed for Ra and Rb, and Cn, and store result in Cm and Cm+1. Output 1 when AND is 0 in bit test.** | | |
| Assembler mnemonic | Format | Affecting flag | Affected flag |
| **tstzn Cm:Cm+1,Ra,Rb,Cn** | 32bit | Cm,Cm+1 | Cn |
| Remarks | | | |
| m shall be an even number. | | | |

Fig. 341 tstzn Cm:Cm+1,Ra,I5,Cn

| | |
|---|---|
| Behavior | **Cm <- tstz(Ra,uext(I5)) & Cn;**<br>**Cm+1 <- ~tstz(Ra,uext(I5)) & Cn;**<br><br>**Take nest condition between result of bit test performed for Ra and immediate value (I5), and Cn, and store result in Cm and Cm+1. Output 1 when AND is 0 in bit test.** |

| Assembler mnemonic | Format | Affecting flag | Affected flag |
|---|---|---|---|
| **tstzn Cm:Cm+1,Ra,I5,Cn** | 32bit | Cm,Cm+1 | Cn |

| Remarks |
|---|
| m shall be an even number.<br>I5 is an unsigned value. |

Fig. 342 tstza Cm:Cm+1,Ra,Rb,Cn

| | |
|---|---|
| Behavior | **Cm <- tstz(Ra,Rb) & Cn;**<br>**Cm+1 <- ~(tstz(Ra,Rb) & Cn);**<br><br>**Take AND condition between result of bit test performed for Ra and Rb, and Cn, and store result in Cm and Cm+1. Output 1 when AND is 0 in bit test.** |

| Assembler mnemonic | Format | Affecting flag | Affected flag |
|---|---|---|---|
| **tstza Cm:Cm+1,Ra,Rb,Cn** | 32bit | Cm,Cm+1 | Cn |

| Remarks |
|---|
| m shall be an even number. |

Fig. 343 tstza Cm:Cm+1,Ra,I5,Cn

| Behavior | Cm <- tstz(Ra,uext(I5)) & Cn;<br>Cm+1 <- ~(tstz(Ra,uext(I5)) & Cn);<br><br>**Take AND condition between result of bit test performed for Ra and immediate value (I5), and Cn, and store result in Cm and Cm+1. Output 1 when AND is 0 in bit test.** | | |
|---|---|---|---|
| Assembler mnemonic | Format | Affecting flag | Affected flag |
| **tstza Cm:Cm+1,Ra,I5,Cn** | 32bit | Cm,Cm+1 | Cn |
| Remarks | | | |
| m shall be an even number.<br>I5 is an unsigned value. | | | |

Fig. 344 tstzo Cm:Cm+1,Ra,Rb,Cn

| | | | |
|---|---|---|---|
| Behavior | **Cm <- tstz(Ra,Rb) \| Cn;**<br>**Cm+1 <- ~(tstz(Ra,Rb) \| Cn);**<br><br>**Take OR condition between result of bit test performed for Ra and Rb, and Cn, and store result in Cm and Cm+1. Output 1 when AND is 0 in bit test.** | | |
| Assembler mnemonic | Format | Affecting flag | Affected flag |
| **tstzo Cm:Cm+1,Ra,Rb,Cn** | 32bit | Cm,Cm+1 | Cn |
| Remarks | | | |
| m shall be an even number. | | | |

Fig. 345 tstzo Cm:Cm+1,Ra,I5,Cn

| | | | | |
|---|---|---|---|---|
| Behavior | **Cm <- tstz(Ra,uext(I5)) \| Cn;**<br>**Cm+1 <- ~(tstz(Ra,uext(I5)) \| Cn);**<br><br>**Take OR condition between result of bit test performed for Ra and immediate value (I5), and Cn, and store result in Cm and Cm+1. Output 1 when AND is 0 in bit test.** | | | |
| Assembler mnemonic | | Format | Affecting flag | Affected flag |
| **tstzo Cm:Cm+1,Ra,I5,Cn** | | 32bit | Cm,Cm+1 | Cn |
| Remarks | | | | |
| m shall be an even number.<br>I5 is an unsigned value. | | | | |

Fig. 346 tstn Cm,Ra,Rb

| | |
|---|---|
| Behavior | **=> tstnn Cm,Ra,Rb,C7**<br><br>**Cm <- tstn(Ra,Rb);**<br><br>**Store result of bit test performed for Ra and Rb in Cm. Output 1 when AND is not 0 in bit test.** |

| Assembler mnemonic | Format | Affecting flag | Affected flag |
|---|---|---|---|
| **tstn Cm,Ra,Rb** | 32bit synonym | Cm | — |

| Remarks |
|---|
| |

Fig. 347 tstn C6,Ra2,Rb2

| | | | |
|---|---|---|---|
| Behavior | **C6 <- tstn(Ra2,Rb2);**<br><br>**Perform bit test for Ra2 and Rb2, and store result in C6. Output 1 when AND is not 0 in bit test.** | | |
| Assembler mnemonic | Format | Affecting flag | Affected flag |
| **tstn C6,Ra2,Rb2** | 16bit | C6 | — |
| Remarks | | | |
| C7 is the only predicate which can be used (condition cannot be executed). | | | |

Fig. 348 tstn Cm,Ra,I5

| | |
|---|---|
| Behavior | **=> tstnn Cm,Ra,I5,C7**<br><br>**Cm <- tstn(Ra,uext(I5));**<br><br>**Store result of bit test performed for Ra and immediate value (I5) in Cm. Output 1 when AND is not 0 in bit test.** |

| Assembler mnemonic | Format | Affecting flag | Affected flag |
|---|---|---|---|
| **tstn Cm,Ra,I5** | 32bit synonym | Cm | — |

| Remarks |
|---|
| I5 is an unsigned value. |

Fig. 349 tstn C6,Ra2,I4

<table>
<tr><td>Behavior</td><td colspan="3">C6 <- tstn(Ra2,uext(I4));<br><br>Perform bit test for Ra2 and Rb2, and store result in C6. Output 1 when AND is not 0 in bit test.</td></tr>
<tr><td>Assembler mnemonic</td><td>Format</td><td>Affecting flag</td><td>Affected flag</td></tr>
<tr><td>tstn C6,Ra2,I4</td><td>16bit</td><td>C6</td><td>—</td></tr>
<tr><td colspan="4">Remarks</td></tr>
<tr><td colspan="4">I4 is an unsigned value.<br><br>C7 is the only predicate which can be used (condition cannot be executed).</td></tr>
</table>

Fig. 350 tstn Cm:Cm+1,Ra,Rb

| | |
|---|---|
| Behavior | **=> tstnn Cm:Cm+1,Ra,Rb,C7**<br><br>**Cm <- tstn(Ra,Rb);**<br>**Cm+1 <- ~tstn(Ra,Rb);**<br><br>**Store result of bit test performed for Ra and Rb in Cm and Cm+1.**<br>**Output 1 when AND is not 0 in bit test.** |

| Assembler mnemonic | Format | Affecting flag | Affected flag |
|---|---|---|---|
| **tstn Cm:Cm+1,Ra,Rb** | 32bit synonym | Cm,Cm+1 | — |

| Remarks |
|---|
| m shall be an even number. |

Fig. 351 tstn Cm:Cm+1,Ra,I5

| | |
|---|---|
| Behavior | **=> tstnn Cm:Cm+1,Ra,I5,C7**<br><br>**Cm <- tstn(Ra,uext(I5));**<br>**Cm+1 <- ~tstn(Ra,uext(I5));**<br><br>**Store result of bit test performed for Ra and immediate value (I5) in Cm and Cm+1. Output 1 when AND is not 0 in bit test.** |

| Assembler mnemonic | Format | Affecting flag | Affected flag |
|---|---|---|---|
| **tstn Cm:Cm+1,Ra,I5** | 32bit synonym | Cm,Cm+1 | — |

| Remarks |
|---|
| m shall be an even number.<br>I5 is an unsigned value. |

Fig. 352 tstnn Cm,Ra,Rb,Cn

| | |
|---|---|
| Behavior | **Cm <- tstn(Ra,Rb) & Cn;**<br><br>**Take nest condition between result of bit test performed for Ra and Rb, and Cn, and store result in Cm. Output 1 when AND is not 0 in bit test.** |

| Assembler mnemonic | Format | Affecting flag | Affected flag |
|---|---|---|---|
| **tstnn Cm,Ra,Rb,Cn** | 32bit | Cm | Cn |

| Remarks |
|---|
| |

Fig. 353 tstnn Cm,Ra,I5,Cn

| | |
|---|---|
| Behavior | **Cm <- tstn(Ra,uext(I5)) & Cn;**<br><br>**Take nest condition between result of bit test performed for Ra and immediate value (I5), and Cn, and store result in Cm. Output 1 when AND is not 0 in bit test.** |

| Assembler mnemonic | Format | Affecting flag | Affected flag |
|---|---|---|---|
| **tstnn Cm,Ra,I5,Cn** | 32bit | Cm | Cn |

| Remarks |
|---|
| I5 is an unsigned value. |

Fig. 354 tstnn Cm:Cm+1,Ra,Rb,Cn

Behavior

```
Cm    <-  tstn(Ra,Rb) & Cn;
Cm+1 <- ~tstn(Ra,Rb) & Cn;
```

Take nest condition between result of bit test performed for Ra and Rb, and Cn, and store result in Cm and Cm+1. Output 1 when AND is not 0 in bit test.

| Assembler mnemonic | Format | Affecting flag | Affected flag |
|---|---|---|---|
| **tstnn Cm:Cm+1,Ra,Rb,Cn** | 32bit | Cm,Cm+1 | Cn |

Remarks m shall be an even number.

Fig. 355 tstnn Cm:Cm+1,Ra,I5,Cn

| | |
|---|---|
| Behavior | **Cm <- tstn(Ra,uext(I5)) & Cn;**<br>**Cm+1 <- ~tstn(Ra,uext(I5)) & Cn;**<br><br>**Take nest condition between result of bit test performed for Ra and immediate value (I5), and Cn, and store result in Cm and Cm+1. Output 1 when AND is not 0 in bit test.** |

| Assembler mnemonic | Format | Affecting flag | Affected flag |
|---|---|---|---|
| **tstnn Cm:Cm+1,Ra,I5,Cn** | 32bit | Cm,Cm+1 | Cn |

| Remarks |
|---|
| m shall be an even number.<br>I5 is an unsigned value. |

Fig. 356 tstna Cm:Cm+1,Ra,Rb,Cn

| | | | |
|---|---|---|---|
| Behavior | **Cm <- tstn(Ra,Rb) & Cn;**<br>**Cm+1 <- ~(tstn(Ra,Rb) & Cn);**<br><br>**Take OR condition between result of bit test performed for Ra and Rb, and Cn, and store result in Cm and Cm+1. Output 1 when AND is not 0 in bit test.** | | |
| Assembler mnemonic | Format | Affecting flag | Affected flag |
| **tstna Cm:Cm+1,Ra,Rb,Cn** | 32bit | Cm,Cm+1 | Cn |
| Remarks | | | |
| m shall be an even number. | | | |

Fig. 357 tstna Cm:Cm+1,Ra,I5,Cn

| | |
|---|---|
| Behavior | **Cm <- tstn(Ra,uext(I5)) & Cn;**<br>**Cm+1 <- ~(tstn(Ra,uext(I5)) & Cn);**<br><br>**Take OR condition between result of bit test performed for Ra and immediate value (I5), and Cn, and store result in Cm and Cm+1. Output 1 when AND is not 0 in bit test.** |

| Assembler mnemonic | Format | Affecting flag | Affected flag |
|---|---|---|---|
| **tstna Cm:Cm+1,Ra,I5,Cn** | 32bit | Cm,Cm+1 | Cn |

| Remarks |
|---|
| m shall be an even number.<br>I5 is an unsigned value. |

Fig. 358 tstno Cm:Cm+1,Ra,Rb,Cn

| | | | | |
|---|---|---|---|---|
| Behavior | Cm <- tstn(Ra,Rb) | Cn;<br>Cm+1 <- ~(tstn(Ra,Rb) | Cn);<br><br>Take OR condition between result of bit test performed for Ra and Rb, and Cn, and store result in Cm and Cm+1. Output 1 when AND is not in bit test. | | | |
| Assembler mnemonic | | Format | Affecting flag | Affected flag |
| tstno Cm:Cm+1,Ra,Rb,Cn | | 32bit | Cm,Cm+1 | Cn |
| Remarks | | | | |
| m shall be an even number. | | | | |

Fig. 359 tstno Cm:Cm+1,Ra,I5,Cn

<table>
<tr><td>Behavior</td><td colspan="3">Cm <- tstn(Ra,uext(I5)) | Cn;<br>Cm+1 <- ~(tstn(Ra,uext(I5)) | Cn);<br><br>Take OR condition between result of bit test performed for Ra and immediate value (I5), and Cn, and store result in Cm and Cm+1. Output 1 when AND is not 0 in bit test.</td></tr>
<tr><td>Assembler mnemonic</td><td>Format</td><td>Affecting flag</td><td>Affected flag</td></tr>
<tr><td>tstno Cm:Cm+1,Ra,I5,Cn</td><td>32bit</td><td>Cm,Cm+1</td><td>Cn</td></tr>
<tr><td colspan="4">Remarks</td></tr>
<tr><td colspan="4">m shall be an even number.<br>I5 is an unsigned value.</td></tr>
</table>

Fig. 360 mov Rb,Ra

| Behavior | => or Rb,Ra,0<br><br>Rb <- Ra;<br><br>Move Ra to Rb. | | |
|---|---|---|---|
| Assembler mnemonic | Format | Affecting flag | Affected flag |
| mov Rb,Ra | 32bit synonym | — | — |
| Remarks | | | |
| | | | |

Fig. 361 mov Ra2,Rb

| | | | | |
|---|---|---|---|---|
| Behavior | **Ra2 <- Rb;**<br><br>**Move Rb to Ra2.** | | | |
| Assembler mnemonic | Format | Affecting flag | Affected flag | |
| **mov Ra2,Rb** | 16bit | — | — | |
| Remarks | | | | |
| C7 is the only predicate which can be used (condition cannot be executed). | | | | |

Fig. 362 mov Ra,I16

| Behavior | **Ra <- sext(I16);**<br><br>**Sign-extend immediate value (I16) and store it in Ra.** | | |
|---|---|---|---|
| Assembler mnemonic | Format | Affecting flag | Affected flag |
| **mov Ra,I16** | 32bit | — | — |
| Remarks | | | |
| I16 is a signed value. | | | |

Fig. 363 mov Ra2,I8

| | |
|---|---|
| Behavior | **Ra2 <- sext(I8);**<br><br>**Sign-extend immediate value (I8) and store it in Ra2.** |

| Assembler mnemonic | Format | Affecting flag | Affected flag |
|---|---|---|---|
| **mov Ra2,I8** | 16bit | — | — |

| Remarks |
|---|
| I8 is a signed value.<br><br>C7 is the only predicate which can be used (condition cannot be executed). |

Fig. 364 mov Rb,TAR

| | |
|---|---|
| Behavior | **Rb <- TAR;**<br><br>**Move value of TAR to Rb.** |

| Assembler mnemonic | Format | Affecting flag | Affected flag |
|---|---|---|---|
| **mov Rb,TAR** | 32bit | — | — |

| Remarks |
|---|
| |

Fig. 365 mov Rb2,TAR

| | |
|---|---|
| Behavior | **Rb2 <- TAR;**<br><br>**Move value of TAR to Rb2.** |

| Assembler mnemonic | Format | Affecting flag | Affected flag |
|---|---|---|---|
| **mov Rb2,TAR** | 16bit | — | — |

| Remarks |
|---|
| C7 is the only predicate which can be used (condition cannot be executed). |

Fig. 366 mov Rb,LR

| | | | | |
|---|---|---|---|---|
| Behavior | Rb <- LR;<br><br>Move value of LR to Rb. | | | |
| Assembler mnemonic | | Format | Affecting flag | Affected flag |
| **mov Rb,LR** | | 32bit | — | — |
| Remarks | | | | |
| | | | | |

Fig. 367 mov Rb2,LR

| | | | | |
|---|---|---|---|---|
| Behavior | **Rb2 <- LR;**<br><br>**Move value of LR to Rb2.** | | | |
| Assembler mnemonic | Format | Affecting flag | Affected flag | |
| **mov Rb2,LR** | 16bit | — | — | |
| Remarks | | | | |
| C7 is the only predicate which can be used (condition cannot be executed). | | | | |

Fig. 368 mov Rb,SVR

| | |
|---|---|
| Behavior | **Rb[31:16] <- 0x0000;**<br>**Rb[15: 0] <- SVR;**<br><br>**Move value of SVR to lower 16 bits of Rb. 0 is put in higher 16 bits of Rb.** |

| Assembler mnemonic | Format | Affecting flag | Affected flag |
|---|---|---|---|
| **mov Rb,SVR** | 32bit | — | SVR |

| Remarks |
|---|
| |

Fig. 369 mov Rb,PSR

| | | | | |
|---|---|---|---|---|
| Behavior | **Rb <- PSR;**<br><br>**Move value of PSR to Rb.** | | | |
| Assembler mnemonic | Format | Affecting flag | Affected flag | |
| **mov Rb,PSR** | 32bit | – | PSR | |
| Remarks | | | | |
| | | | | |

Fig. 370 mov Rb,CFR

| | |
|---|---|
| Behavior | **Rb <- CFR;**<br><br>**Move value of CFR to Rb.** |

| Assembler mnemonic | Format | Affecting flag | Affected flag |
|---|---|---|---|
| **mov Rb,CFR** | 32bit | — | CFR |

| Remarks |
|---|
| |

Fig. 371 mov Rb,MH0

| | |
|---|---|
| Behavior | **Rb <- MH0;**<br><br>**Move value of MH0 to Rb.** |

| Assembler mnemonic | Format | Affecting flag | Affected flag |
|---|---|---|---|
| **mov Rb,MH0** | 32bit | — | — |

| Remarks |
|---|
| |

Fig. 372 mov Rb2,MH0

| | |
|---|---|
| Behavior | **Rb2 <- MH0;**<br><br>**Move value of MH0 to Rb2.** |

| Assembler mnemonic | Format | Affecting flag | Affected flag |
|---|---|---|---|
| **mov Rb2,MH0** | 16bit | — | — |

| Remarks |
|---|
| C7 is the only predicate which can be used (condition cannot be executed). |

Fig. 373 mov Rb,MH1

| Behavior | Rb <- MH1;<br><br>Move value of MH1 to Rb. | | |
|---|---|---|---|
| **Assembler mnemonic** | **Format** | **Affecting flag** | **Affected flag** |
| **mov Rb,MH1** | 32bit | — | — |
| **Remarks** | | | |
| | | | |

Fig. 374 mov Rb2,MH1

| | | | | |
|---|---|---|---|---|
| Behavior | **Rb2 <- MH1;**<br><br>**Move value of MH1 to Rb2.** | | | |
| Assembler mnemonic | Format | Affecting flag | Affected flag | |
| **mov Rb2,MH1** | 16bit | – | – | |
| Remarks | | | | |
| C7 is the only predicate which can be used (condition cannot be executed). | | | | |

Fig. 375 mov Rb,ML0

| | |
|---|---|
| Behavior | **Rb <- ML0;**<br><br>**Move value of ML0 to Rb.** |

| Assembler mnemonic | Format | Affecting flag | Affected flag |
|---|---|---|---|
| **mov Rb,ML0** | 32bit | — | — |

| Remarks |
|---|
| |

Fig. 376 mov Rb,ML1

| | |
|---|---|
| Behavior | **Rb <- ML1;**<br><br>**Move value of ML1 to Rb.** |

| Assembler mnemonic | Format | Affecting flag | Affected flag |
|---|---|---|---|
| **mov Rb,ML1** | 32bit | — | — |

| Remarks |
|---|
| |

Fig. 377 mov Rb,IPC

| | | | |
|---|---|---|---|
| Behavior | **Rb <- IPC;**<br><br>**Move value of IPC to Rb.** | | |
| Assembler mnemonic | Format | Affecting flag | Affected flag |
| **mov Rb,IPC** | 32bit | — | — |
| Remarks | | | |
| | | | |

Fig. 378 mov Rb,IPSR

| | |
|---|---|
| Behavior | **Rb <- IPSR;**<br><br>**Move value of IPSR to Rb.** |

| Assembler mnemonic | Format | Affecting flag | Affected flag |
|---|---|---|---|
| **mov Rb,IPSR** | 32bit | — | — |

| Remarks |
|---|
| |

Fig. 379 mov Rb,PC

| | | | | |
|---|---|---|---|---|
| Behavior | **Rb <- next_PC;**<br><br>**Move value of PC to Rb.** | | | |
| Assembler mnemonic | | Format | Affecting flag | Affected flag |
| **mov Rb,PC** | | 32bit | — | — |
| Remarks | | | | |
| PC of the next instruction is stored in Rb even if such next instruction is not to be executed according to a predicate. | | | | |

Fig. 380 mov Rb,EPC

| | |
|---|---|
| Behavior | **Rb <- EPC;**<br><br>**Move value of EPC to Rb.** |

| Assembler mnemonic | Format | Affecting flag | Affected flag |
|---|---|---|---|
| **mov Rb,EPC** | 32bit | — | — |

| Remarks |
|---|
| |

Fig. 381 mov Rb,EPSR

| | | | |
|---|---|---|---|
| Behavior | Rb <- EPSR;<br><br>Move value of EPSR to Rb. | | |
| Assembler mnemonic | Format | Affecting flag | Affected flag |
| **mov Rb,EPSR** | 32bit | — | — |
| Remarks | | | |
| | | | |

Fig. 382 mov Rb,PSR0

| Behavior | Rb[7:0] <- PSR[31:24]; Rb[31:8] <- 0;<br><br>Move value of PSR0 to Rb. | | |
|---|---|---|---|
| Assembler mnemonic | Format | Affecting flag | Affected flag |
| mov Rb,PSR0 | 32bit | — | PSR0 |
| Remarks | | | |
| | | | |

Fig. 383 mov Rb,PSR1

| Behavior | Rb[7:0] <- PSR[23:16]; Rb[31:8] <- 0;<br><br>Move value of PSR1 to Rb. | | |
|---|---|---|---|
| Assembler mnemonic | Format | Affecting flag | Affected flag |
| mov Rb,PSR1 | 32bit | — | PSR1 |
| Remarks | | | |
| | | | |

Fig. 384 mov Rb,PSR2

| | |
|---|---|
| Behavior | **Rb[7:0] <- PSR[15: 8]; Rb[31:8] <- 0;**<br><br>**Move value of PSR2 to Rb.** |

| Assembler mnemonic | Format | Affecting flag | Affected flag |
|---|---|---|---|
| **mov Rb,PSR2** | 32bit | — | PSR2 |

| Remarks |
|---|
| |

Fig. 385 mov Rb,PSR3

| | |
|---|---|
| Behavior | **Rb[7:0] <- PSR[ 7: 0]; Rb[31:8] <- 0;**<br><br>**Move value of PSR3 to Rb.** |

| Assembler mnemonic | Format | Affecting flag | Affected flag |
|---|---|---|---|
| **mov Rb,PSR3** | 32bit | — | PSR3 |

| Remarks |
|---|
| |

Fig. 386 mov Rb,CFR0

| | | | | |
|---|---|---|---|---|
| Behavior | Rb[7:0] <- CFR[31:24]; Rb[31:8] <- 0;<br><br>Move value of CFR0 to Rb. | | | |
| Assembler mnemonic | Format | Affecting flag | Affected flag | |
| mov Rb,CFR0 | 32bit | — | CFR0 | |
| Remarks | | | | |
| | | | | |

Fig. 387 mov Rb,CFR1

| | | | | |
|---|---|---|---|---|
| Behavior | **Rb[7:0] <- CFR[23:16]; Rb[31:8] <- 0;**<br><br>**Move value of CFR1 to Rb.** | | | |
| Assembler mnemonic | Format | Affecting flag | Affected flag | |
| **mov Rb,CFR1** | 32bit | — | CFR1 | |
| Remarks | | | | |
| | | | | |

Fig. 388 mov Rb,CFR2

| | |
|---|---|
| Behavior | **Rb[7:0] <- CFR[15: 8]; Rb[31:8] <- 0;**<br><br>**Move value of CFR3 to Rb.** |

| Assembler mnemonic | Format | Affecting flag | Affected flag |
|---|---|---|---|
| **mov Rb,CFR2** | 32bit | — | CFR2 |

| Remarks |
|---|
| |

Fig. 389 mov Rb,CFR3

| | | | | |
|---|---|---|---|---|
| Behavior | Rb[7:0] <- CFR[ 7: 0]; Rb[31:8] <- 0;<br><br>Move value of CFR3 to Rb. | | | |
| Assembler mnemonic | | Format | Affecting flag | Affected flag |
| mov Rb,CFR3 | | 32bit | — | CFR3 |
| Remarks | | | | |
| | | | | |

Fig. 390 mov LR,Rb

| | | | | |
|---|---|---|---|---|
| Behavior | **LR <- Rb;**<br><br>**Move value of Rb to LR.** | | | |
| Assembler mnemonic | | Format | Affecting flag | Affected flag |
| **mov LR,Rb** | | 32bit | — | — |
| Remarks | | | | |
| This instruction is not to be filled in the branch instruction buffer. | | | | |

Fig. 391 mov LR,Rb2

| Behavior | LR <- Rb2;<br><br>Move value of Rb2 to LR. | | |
|---|---|---|---|
| **Assembler mnemonic** | **Format** | **Affecting flag** | **Affected flag** |
| **mov LR,Rb2** | 16bit | — | — |
| **Remarks** | | | |
| This instruction is not to be filled in the branch instruction buffer. | | | |

Fig. 392 mov TAR,Rb

| | | | | |
|---|---|---|---|---|
| Behavior | **TAR <- Rb;**<br><br>**Move value of Rb to TAR.** | | | |
| Assembler mnemonic | | Format | Affecting flag | Affected flag |
| **mov TAR,Rb** | | 32bit | — | — |
| Remarks | | | | |
| This instruction is not to be filled in the branch instruction buffer. | | | | |

Fig. 393 mov TAR,Rb2

| | |
|---|---|
| Behavior | **TAR <- Rb2;**<br><br>**Move value of Rb2 to TAR.** |

| Assembler mnemonic | Format | Affecting flag | Affected flag |
|---|---|---|---|
| **mov TAR,Rb2** | 16bit | — | — |

| Remarks |
|---|
| C7 is the only predicate which can be used (condition cannot be executed).<br><br>This instruction is not to be filled in the branch instruction buffer. |

Fig. 394 mov SVR,Rb

| | | | |
|---|---|---|---|
| Behavior | **SVR <- Rb[15:0];**<br><br>**Move value of Lower 16 bits of Rb to SVR.** | | |
| Assembler mnemonic | Format | Affecting flag | Affected flag |
| **mov SVR,Rb** | 32bit | SVR | – |
| Remarks | | | |
| | | | |

Fig. 395 mov PSR,Rb

<table>
<tr><td>Behavior</td><td colspan="3">PSR <- Rb;<br><br>Move value of Rb to PSR.</td></tr>
<tr><td>Assembler mnemonic</td><td>Format</td><td>Affecting flag</td><td>Affected flag</td></tr>
<tr><td>mov PSR,Rb</td><td>32bit</td><td>PSR</td><td>—</td></tr>
<tr><td colspan="4">Remarks</td></tr>
<tr><td colspan="4">This instruction can be executed at privilege levels 0 and 2. When executed at the privilege level 3, a privileged instruction execution exception occurs.</td></tr>
</table>

Fig. 396 mov CFR,Rb

| | | | | |
|---|---|---|---|---|
| Behavior | **CFR <- Rb;**<br><br>**Move value of Rb to CFR.** | | | |
| Assembler mnemonic | | Format | Affecting flag | Affected flag |
| **mov CFR,Rb** | | 32bit | CFR | — |
| Remarks | | | | |
| | | | | |

Fig. 397 mov MH0,Rb

| Behavior | **MH0 <- Rb;**<br><br>**Move value of Rb to MH0.** | | |
|---|---|---|---|
| Assembler mnemonic | Format | Affecting flag | Affected flag |
| **mov MH0,Rb** | 32bit | — | — |
| Remarks | | | |
| For the purpose of using MHm/MLm for sum of products instructions, use mul Mm,r31,Ra, and 0 when storing 0 in MIIm/MLm. In instructions other than sum of products instructions, a hazard is detected if MH is used after multiplication/sum of products, and latency occurs. | | | |

Fig. 398 mov MH0,Rb2

| | | | |
|---|---|---|---|
| Behavior | **MH0 <- Rb2;**<br><br>**Move value of Rb2 to MH0.** | | |
| Assembler mnemonic | Format | Affecting flag | Affected flag |
| **mov MH0,Rb2** | 16bit | — | — |
| Remarks | | | |
| C7 is the only predicate which can be used (condition cannot be executed). | | | |

Fig. 399 mov MH1,Rb

| | |
|---|---|
| Behavior | **MH1 <- Rb;**<br><br>**Move value of Rb to MH1.** |

| Assembler mnemonic | Format | Affecting flag | Affected flag |
|---|---|---|---|
| **mov MH1,Rb** | 32bit | — | — |

| Remarks |
|---|
| For the purpose of using MHm/MLm for sum of products instructions, use mul Mm,r31,Ra, and 0 when storing 0 in MHm/MLm. In instructions other than sum of products instructions, a hazard is detected if MH is used after multiplication/sum of products, and latency occurs. |

Fig. 400 mov MH1,Rb2

| | |
|---|---|
| Behavior | **MH1 <- Rb2;**<br><br>**Move value of Rb2 to MH1.** |

| Assembler mnemonic | Format | Affecting flag | Affected flag |
|---|---|---|---|
| **mov MH1,Rb2** | 16bit | — | — |

| Remarks |
|---|
| C7 is the only predicate which can be used (condition cannot be executed). |

Fig. 401 mov ML0,Rb

| | |
|---|---|
| Behavior | **ML0 <- Rb;**<br><br>**Move value of Rb to ML0.** |

| Assembler mnemonic | Format | Affecting flag | Affected flag |
|---|---|---|---|
| **mov ML0,Rb** | 32bit | — | — |

| Remarks |
|---|
| For the purpose of using MHm/MLm for sum of products instructions, use mul Mm,r31,Ra, and 0 when storing 0 in MHm/MLm. In instructions other than sum of products instructions, a hazard is detected if MH is used after multiplication/sum of products, and latency occurs. |

Fig. 402 mov ML1,Rb

| | |
|---|---|
| Behavior | **ML1 <- Rb;**<br><br>**Move value of Rb to ML1.** |

| Assembler mnemonic | Format | Affecting flag | Affected flag |
|---|---|---|---|
| **mov ML1,Rb** | 32bit | — | — |

| Remarks |
|---|
| For the purpose of using MHm/MLm for sum of products instructions, use mul Mm,r31,Ra, and 0 when storing 0 in MHm/MLm. In instructions other than sum of products instructions, a hazard is detected if MH is used after multiplication/sum of products, and latency occurs. |

Fig. 403 mov IPC,Rb

| | |
|---|---|
| Behavior | **IPC <- Rb;**<br><br>**Move value of Rb to IPC.** |

| Assembler mnemonic | Format | Affecting flag | Affected flag |
|---|---|---|---|
| **mov IPC,Rb** | 32bit | — | — |

| Remarks |
|---|
| This instruction can be executed at privilege levels 0 and 2. When executed at the privilege level 3, a privileged instruction execution exception occurs. |

Fig. 404 mov IPSR,Rb

| | | | |
|---|---|---|---|
| Behavior | **IPSR <- Rb;**<br><br>**Move value of Rb to IPSR.** | | |
| Assembler mnemonic | Format | Affecting flag | Affected flag |
| **mov IPSR,Rb** | 32bit | — | — |
| Remarks | | | |
| This instruction can be executed at privilege levels 0 and 2. When executed at the privilege level 3, a privileged instruction execution exception occurs. | | | |

Fig. 405 mov EPC,Rb

| | |
|---|---|
| Behavior | **EPC <- Rb;**<br><br>**Move value of Rb to EPC.** |

| Assembler mnemonic | Format | Affecting flag | Affected flag |
|---|---|---|---|
| **mov EPC,Rb** | 32bit | — | — |

| Remarks |
|---|
| This instruction can be executed at privilege levels 0 and 2. When executed at the privilege level 3, a privileged instruction execution exception occurs. |

Fig. 406 mov EPSR,Rb

| | |
|---|---|
| Behavior | **EPSR <- Rb;**<br><br>**Move value of Rb to EPSR.** |

| Assembler mnemonic | Format | Affecting flag | Affected flag |
|---|---|---|---|
| **mov EPSR,Rb** | 32bit | – | – |

| Remarks |
|---|
| This instruction can be executed at privilege levels 0 and 2. When executed at the privilege level 3, a privileged instruction execution exception occurs. |

Fig. 407 mov PSR0,Rb

| | | | |
|---|---|---|---|
| Behavior | **PSR[31:24] <- Rb[7:0];**<br><br>**Move value of Rb to PSR0.** | | |
| Assembler mnemonic | Format | Affecting flag | Affected flag |
| **mov PSR0,Rb** | 32bit | PSR0 | — |
| Remarks | | | |
| This instruction can be executed at privilege levels 0 and 2. When executed at the privilege level 3, a privileged instruction execution exception occurs. | | | |

Fig. 408 mov PSR1,Rb

| | | | |
|---|---|---|---|
| Behavior | **PSR[23:16] <- Rb[7:0];**<br><br>**Move value of Rb to PSR1.** | | |
| Assembler mnemonic | Format | Affecting flag | Affected flag |
| **mov PSR1,Rb** | 32bit | PSR1 | — |
| Remarks | | | |
| This instruction can be executed at privilege levels 0 and 2. When executed at the privilege level 3, a privileged instruction execution exception occurs. | | | |

Fig. 409 mov PSR2,Rb

<table>
<tr><td>Behavior</td><td colspan="3">PSR[23:16] <- Rb[7:0];<br><br>Move value of Rb to PSR2.</td></tr>
<tr><td>Assembler mnemonic</td><td>Format</td><td>Affecting flag</td><td>Affected flag</td></tr>
<tr><td>mov PSR2,Rb</td><td>32bit</td><td>PSR2</td><td>—</td></tr>
<tr><td colspan="4">Remarks</td></tr>
<tr><td colspan="4">This instruction can be executed at privilege levels 0 and 2. When executed at the privilege level 3, a privileged instruction execution exception occurs.</td></tr>
</table>

Fig. 410 mov PSR3,Rb

| | | | |
|---|---|---|---|
| Behavior | **PSR[23:16] <- Rb[7:0];**<br><br>**Move value of Rb to PSR3.** | | |
| Assembler mnemonic | Format | Affecting flag | Affected flag |
| **mov PSR3,Rb** | 32bit | PSR3 | — |
| Remarks | | | |
| This instruction can be executed at privilege levels 0 and 2. When executed at the privilege level 3, a privileged instruction execution exception occurs. | | | |

Fig. 411 mov CFR0,Rb

| Behavior | CFR[31:24] <- Rb[7:0];<br><br>Move value of Rb to CFR0. | | |
|---|---|---|---|
| **Assembler mnemonic** | **Format** | **Affecting flag** | **Affected flag** |
| mov CFR0,Rb | 32bit | CFR | – |
| Remarks | | | |
| | | | |

Fig. 412 mov CFR1,Rb

<table>
<tr><td>Behavior</td><td colspan="3">CFR[23:16] <- Rb[7:0];<br><br>Move value of Rb to CFR1.</td></tr>
<tr><td>Assembler mnemonic</td><td>Format</td><td>Affecting flag</td><td>Affected flag</td></tr>
<tr><td>mov CFR1,Rb</td><td>32bit</td><td>CFR1</td><td>—</td></tr>
<tr><td colspan="4">Remarks</td></tr>
<tr><td colspan="4"></td></tr>
</table>

Fig. 413 mov CFR2,Rb

| | | | | |
|---|---|---|---|---|
| Behavior | **CFR[15: 8] <- Rb[7:0];**<br><br>**Move value of Rb to CFR2.** | | | |
| Assembler mnemonic | | Format | Affecting flag | Affected flag |
| **mov CFR2,Rb** | | 32bit | CFR2 | — |
| Remarks | | | | |
| | | | | |

Fig. 414 mov CFR3,Rb

| Behavior | CFR[ 7: 0] <- Rb[7:0];<br><br>Move value of Rb to CFR3. | | |
|---|---|---|---|
| Assembler mnemonic | Format | Affecting flag | Affected flag |
| mov CFR3,Rb | 32bit | CFR3 | — |
| Remarks | | | |
| | | | |

Fig. 415 mvclovs Cm:Cm+1

| | |
|---|---|
| Behavior | **Cm:Cm+1 <- CFR.OVS:~CFR.OVS; CFR.OVS <- 0;**<br><br>**Clear CFR.OVS, and transfer it to Cm and Cm+1.** |

| Assembler mnemonic | Format | Affecting flag | Affected flag |
|---|---|---|---|
| **mvclovs Cm:Cm+1** | 16bit | Cm,Cm+1,CFR.OVS | CFR.OVS |

| Remarks |
|---|
| Cm shall be an even number. |

Fig. 416 movcf Ci,Cj,Cm,Cn

| | |
|---|---|
| Behavior | **Ci <- Cj; Cm <- Cn;**<br><br>**Move flags. Move Cj to Ci, and Cn to Cm.** |

| Assembler mnemonic | Format | Affecting flag | Affected flag |
|---|---|---|---|
| **movcf Ci,Cj,Cm,Cn** | 32bit | Ci,Cm | Cj,Cn |

| Remarks |
|---|
| The same flag cannot be specified as Ci and Cm. Behavior in such a case is undefined (implementation-dependent). |

Fig. 417 mvclcas Cm:Cm+1

| | | | |
|---|---|---|---|
| Behavior | **Cm:Cm+1 <- CFR.CAS:~CFR.CAS; CFR.CAS <- 0;**<br><br>**Clear CFR.CAS, and transfer it to Cm and Cm+1.** | | |
| Assembler mnemonic | Format | Affecting flag | Affected flag |
| **mvclcas Cm:Cm+1** | 16bit | Cm,Cm+1,CFR.CAS | CFR.CAS |
| Remarks | | | |
| Cm shall be an even number. | | | |

Fig. 418 sethi Ra,I16

<table>
<tr><td>Behavior</td><td colspan="3">Ra <- (uext(I16) << 16)+uext(Ra[15:0]);<br><br>Store immediate value (I16) to higher 16 bits of Ra. Lower 16 bits of Ra is not affected by this.</td></tr>
<tr><td>Assembler mnemonic</td><td>Format</td><td>Affecting flag</td><td>Affected flag</td></tr>
<tr><td>sethi Ra,I16</td><td>32bit</td><td>—</td><td>—</td></tr>
<tr><td colspan="4">Remarks</td></tr>
<tr><td colspan="4">I16 is an unsigned value.</td></tr>
</table>

Fig. 419 setlo Ra,I16

| | |
|---|---|
| Behavior | **=> mov Ra,I16**<br><br>**Ra <- sext(I16);**<br><br>**Sign-extend immediate value (I16) and store it in Ra R** |

| Assembler mnemonic | Format | Affecting flag | Affected flag |
|---|---|---|---|
| **setlo Ra,I16** | 32bit synonym | — | — |

| Remarks |
|---|
| An unsigned value is written as I16, while a value resulted from performing sign extension for the most significant bit of I16 by regarding it as a sign bit, is written to Ra. If a negative value is written to I16, an assemble error occurs.<br>This instruction is used, together with sethi instruction, for writing a 32-bit value to a register. |

Fig. 420 vcchk

Behavior

```
if (VC3:VC2:VC1:VC0==0b0000) {
  C4:C5 <- 1:0;
} else {
    C4:C5 <- 0:1;
}
C3:C2:C1:C0 <- VC3:VC2:VC1:VC0;
```

Judge whether VC0~VC3 are all 0, and output judgment result to C4 and C5.

Move VC0~VC3 to C0~C3.

| Assembler mnemonic | Format | Affecting flag | Affected flag |
|---|---|---|---|
| **vcchk** | 16bit | C0,C1,C2,C3,C4,C5 | VC0,VC1,VC2,VC3 |

| Remarks |
|---|
| |

Fig. 421 nop

| Behavior | **no operation**<br><br>**Perform nothing.** | | |
|---|---|---|---|
| Assembler mnemonic | Format | Affecting flag | Affected flag |
| **nop** | 16bit | — | — |
| Remarks | | | |
| No hazard occurs. | | | |

Fig. 422 asl Rc,Ra,Rb

| | |
|---|---|
| Behavior | **tmp[5:0] <- Rb[5:0];**<br>**tmp[5:0] <- 31, if (Rb > 0x0000_001f );**<br>**tmp[5:0] <- -31, if (Rb < 0xffff_ffe1 );**<br>**Rc <- Ra << abs(tmp[5:0]);**<br>**Rc <- Ra >> abs(tmp[5:0]) ,if (tmp[5:0] < 0);**<br><br>**Perform arithmetic shift left of Ra only by the number of bits indicated by Rb. Rb is saturated to ±31 or fewer, and arithmetic shift right is performed if value of Rb is negative.** |

| Assembler mnemonic | Format | Affecting flag | Affected flag |
|---|---|---|---|
| **asl Rc,Ra,Rb** | 32bit | — | — |

| Remarks |
|---|
| |

Fig. 423 asl Rb,Ra,I5

| Behavior | Rb <- Ra << I5[4:0];<br><br>**Perform arithmetic shift left of Ra only by the number of bits represented by immediate value (I5).** | | |
|---|---|---|---|
| **Assembler mnemonic** | **Format** | **Affecting flag** | **Affected flag** |
| **asl Rb,Ra,I5** | 32bit | — | — |
| **Remarks** | | | |
| I5 is an unsigned value. | | | |

Fig. 424 asl Ra2,I4

| | |
|---|---|
| Behavior | **Ra2 <- Ra2 << uext(I4);**<br>**Ra2 <- Ra2 << 16, if ( I4 == 0 );**<br><br>**Perform arithmetic shift left of Ra2 only by the number of bits represented by immediate value (I4), and store result in Ra2. If immediate value (14) is 0, 16-bit arithmetic shift left is performed.** |

| Assembler mnemonic | Format | Affecting flag | Affected flag |
|---|---|---|---|
| **asl Ra2,I4** | 16bit | — | — |

| Remarks |
|---|
| I4 is a signed value.<br>C7 is the only predicate which can be used (condition cannot be executed). |

Fig. 425 aslvw Rc,Ra,Rb

Behavior

```
tmp[5:0] <- Rb[5:0];
tmp[5:0] <-   31, if (Rb > 0x0000_001f );
tmp[5:0] <-  -31, if (Rb < 0xffff_ffe1 );
tmp2[62:0] <- sext63(Ra[31:0]) << abs(tmp[5:0]);
tmp2[62:0] <- sext63(Ra[31:0]) >> abs(tmp[5:0]), if (tmp[5:0] < 0);
Rc <- tmp2[31:0];
Rc <- 0x7fff_ffff, CFR.OVS <- 1,
                if (tmp2[62:0] > 0x0000_0000_7fff_ffff[62:0]);
Rc <- 0x8000_0000, CFR.OVS <- 1,
                if (tmp2[62:0] < 0x7fff_ffff_8000_0000[62:0]);
```

Perform arithmetic shift left of Ra only by the number of bits indicated by Rb. Saturate result if it cannot be represented by signed 32 bits. Rb is saturated to ±31 or fewer, and arithmetic shift right is performed if value of Rb is negative.

| Assembler mnemonic | Format | Affecting flag | Affected flag |
|---|---|---|---|
| **aslvw Rc,Ra,Rb** | 32bit | CFR.OVS | — |

Remarks

Fig. 426 aslvw Rb,Ra,I5

| | |
|---|---|
| Behavior | **tmp[62:0] <- sext63(Ra[31:0]) << I5[4:0];**<br>**Rb <- tmp[31:0];**<br>**Rb <- 0x7fff_ffff, CFR.OVS <- 1,**<br>**if (tmp[62:0] > 0x0000_0000_7fff_ffff[62:0]);**<br>**Rb <- 0x8000_0000, CFR.OVS <- 1,**<br>**if (tmp[62:0] < 0x7fff_ffff_8000_0000[62:0]);**<br><br>**Perform arithmetic shift left of Ra only by the number of bits represented by immediate value (I5). Saturate result if it cannot be represented by signed 32 bits.** |

| Assembler mnemonic | Format | Affecting flag | Affected flag |
|---|---|---|---|
| **aslvw Rb,Ra,I5** | 32bit | CFR.OVS | — |

| Remarks |
|---|
| I5 is an unsigned value. |

Fig. 427 aslvh Rc,Ra,Rb

Behavior

```
tmp[5:0] <- Rb[5:0];
tmp[5:0] <-    31, if (Rb > 0x0000_001f );
tmp[5:0] <-   -31, if (Rb < 0xffff_ffe1 );
tmp2[46:0] <- sext47(Ra[15:0]) << abs(tmp[5:0]);
tmp2[46:0] <- sext47(Ra[15:0]) >> abs(tmp[5:0]), if (tmp[5:0] < 0);
Rc <- sext(tmp2[15:0]);
Rc <- 0x0000_7fff, CFR.OVS <- 1,
                  if (tmp2[46:0] > 0x0000_0000_7fff[46:0]);
Rc <- 0xffff_8000, CFR.OVS <- 1,
                  if (tmp2[46:0] < 0x7fff_ffff_8000[46:0]);
```

Perform arithmetic shift left of Ra only by the number of bits indicated by Rb. Saturate result if it cannot be represented by signed 16 bits. Rb is saturated to ±31 or fewer, and arithmetic shift right is performed if value of Rb is negative.

| Assembler mnemonic | Format | Affecting flag | Affected flag |
|---|---|---|---|
| aslvh Rc,Ra,Rb | 32bit | CFR.OVS | — |

| Remarks |
|---|
| |

Fig. 428 aslvh Rb,Ra,I5

| | |
|---|---|
| Behavior | **tmp[46:0] <- sext47(Ra[[15:0]) << I5[4:0];**<br>**Rb <- tmp[31:0];**<br>**Rb <- 0x0000_7fff, CFR.OVS <- 1,**<br>**if (tmp[46:0] > 0x0000_0000_7fff[46:0]);**<br>**Rb <- 0xffff_8000, CFR.OVS <- 1,**<br>**if (tmp[46:0] < 0x7fff_ffff_8000[46:0]);**<br><br>**Perform arithmetic shift left of Ra only by the number of bits represented by immediate value (I5). Saturate result if it cannot be represented by signed 16 bits.** |

| Assembler mnemonic | Format | Affecting flag | Affected flag |
|---|---|---|---|
| **aslvh Rb,Ra,I5** | 32bit | CFR.OVS | — |
| Remarks | | | |
| I5 is an unsigned value. | | | |

Fig. 429 asr Rc,Ra,Rb

| | |
|---|---|
| Behavior | **tmp[5:0] <- Rb[5:0];**<br>**tmp[5:0] <- 31, if (Rb > 0x0000_001f );**<br>**tmp[5:0] <- -31, if (Rb < 0xffff_ffe1 );**<br>**Rc <- Ra >> abs(tmp[5:0]);**<br>**Rc <- Ra << abs(tmp[5:0]), if (tmp[5:0] < 0);**<br><br>**Rb is saturated to ±31 or fewer, and arithmetic shift left is performed if value of Rb is negative.** |

| Assembler mnemonic | Format | Affecting flag | Affected flag |
|---|---|---|---|
| **asr Rc,Ra,Rb** | 32bit | — | — |

| Remarks |
|---|
| |

Fig. 430 asr Rb,Ra,I5

| | |
|---|---|
| Behavior | **Rb <- Ra >> I5[4:0];**<br><br>**Perform arithmetic shift right of Ra only by the number of bits represented by immediate value (I5).** |

| Assembler mnemonic | Format | Affecting flag | Affected flag |
|---|---|---|---|
| **asr Rb,Ra,I5** | 32bit | — | — |

| Remarks |
|---|
| I5 is an unsigned value. |

Fig. 431 asr Ra2,I4

| Behavior | Ra2 <- Ra2 >> uext(I4);<br>Ra2 <- Ra2 >> 16, if ( I4 == 0 );<br><br>Perform arithmetic shift right of Ra2 only by the number of bits represented by immediate value (I4), and store result in Ra2. Perform 16-bit arithmetic shift right if immediate value (I4) is 0. | | |
|---|---|---|---|
| Assembler mnemonic | Format | Affecting flag | Affected flag |
| asr Ra2,I4 | 16bit | — | — |
| Remarks | | | |
| I4 is an unsigned value.<br>C7 is the only predicate which can be used (condition cannot be executed). | | | |

Fig. 432 asrvw Rc,Ra,Rb

| | |
|---|---|
| Behavior | tmp[5:0] <- Rb[5:0];<br>tmp[5:0] <- 31, if (Rb > 0x0000_001f );<br>tmp[5:0] <- -31, if (Rb < 0xffff_ffe1 );<br>tmp2[62:0] <- sext63(Ra[31:0]) >> abs(tmp[5:0]);<br>tmp2[62:0] <- sext63(Ra[31:0]) << abs(tmp[5:0]), if (tmp[5:0] < 0);<br>Rc <- tmp2[31:0];<br>Rc <- 0x7fff_ffff, CFR.OVS <- 1,<br>if (tmp2[62:0] > 0x0000_0000_7fff_ffff[62:0]);<br>Rc <- 0x8000_0000, CFR.OVS <- 1,<br>if (tmp2[62:0] < 0x7fff_ffff_8000_0000[62:0]);<br><br>Perform arithmetic shift right of Ra only by the number of bits indicated by Rb. Saturate result if it cannot be represented by signed 32 bits. Rb is saturated to ±31 or fewer, and arithmetic shift left is performed if value of Rb is negative. |

| Assembler mnemonic | Format | Affecting flag | Affected flag |
|---|---|---|---|
| asrvw Rc,Ra,Rb | 32bit | CFR.OVS | — |

| Remarks |
|---|
| |

Fig. 433 asrvh Rc,Ra,Rb

| | |
|---|---|
| Behavior | tmp[5:0] <- Rb[5:0];<br>tmp[5:0] <- 31, if (Rb > 0x0000_001f );<br>tmp[5:0] <- -31, if (Rb < 0xffff_ffe1 );<br>tmp2[46:0] <- sext47(Ra[15:0]) >> abs(tmp[5:0]);<br>tmp2[46:0] <- sext47(Ra[15:0]) << abs(tmp[5:0]), if (tmp[5:0] < 0);<br>Rc <- sext(tmp2[15:0]);<br>Rc <- 0x0000_7fff, CFR.OVS <- 1,<br>if (tmp2[46:0] > 0x0000_0000_7fff[46:0]);<br>Rc <- 0xffff_8000, CFR.OVS <- 1,<br>if (tmp2[46:0] < 0x7fff_ffff_8000[46:0]);<br><br>Perform arithmetic shift right of Ra only by the number of bits indicated by Rb. Saturate result if it cannot be represented by signed 16 bits. Rb is saturated to ±31 or fewer, and arithmetic shift left is performed if value of Rb is negative. |

| Assembler mnemonic | Format | Affecting flag | Affected flag |
|---|---|---|---|
| asrvh Rc,Ra,Rb | 32bit | CFR.OVS | — |

| Remarks |
|---|
| |

Fig. 434 lsl Rc,Ra,Rb

| | |
|---|---|
| Behavior | => asl Rc,Ra,Rb<br><br>tmp[5:0] <- Rb[5:0];<br>tmp[5:0] <- 31, if (Rb > 0x0000_001f );<br>tmp[5:0] <- -31, if (Rb < 0xffff_ffe1 );<br>Rc <- Ra << abs(tmp[5:0]);<br>Rc <- Ra >> abs(tmp[5:0]) ,if (tmp[5:0] < 0);<br><br>Perform logical shift left of Ra only by the number of bits indicated by Rb. Rb is saturated to ±31 or fewer, and arithmetic shift right is performed if value of Rb is negative. |

| Assembler mnemonic | Format | Affecting flag | Affected flag |
|---|---|---|---|
| lsl Rc,Ra,Rb | 32bit synonym | — | — |

Remarks

※Arithmetic shift right is performed if the amount of shift is negative.

Fig. 435 lsl Rc,Ra,I5

| | |
|---|---|
| Behavior | **=> asl Rc,Ra,I5**<br><br>**Rb <- Ra << I5[4:0];**<br><br>**Perform logical shift left of Ra only by the number of bits represented by immediate value (I5).** |

| Assembler mnemonic | Format | Affecting flag | Affected flag |
|---|---|---|---|
| **lsl Rc,Ra,I5** | 32bit synonym | — | — |

| Remarks |
|---|
| I5 is an unsigned value. |

Fig. 436 lsl Ra2,I4

| | | | |
|---|---|---|---|
| Behavior | **=> asl Ra2,I4**<br><br>**Ra2 <- Ra2 << uext(I4);**<br>**Ra2 <- Ra2 << 16, if ( I4 == 0 );**<br><br>**Perform arithmetic shift left of Ra2 only by the number of bits represented by immediate value (I4), and store result in Ra2.** | | |
| Assembler mnemonic | Format | Affecting flag | Affected flag |
| **lsl Ra2,I4** | 16bit synonym | — | — |
| Remarks | | | |
| I4 is an unsigned value. 16-bit logical shift left is performed when I4 is 0.<br><br>C7 is the only predicate which can be used (condition cannot be executed). | | | |

Fig. 437 lsr Rc,Ra,Rb

| | |
|---|---|
| Behavior | tmp[5:0] <- Rb[5:0];<br>tmp[5:0] <- 31, if (Rb > 0x0000_001f );<br>tmp[5:0] <- -31, if (Rb < 0xffff_ffe1 );<br>Rc <- Ra >>> abs(tmp[5:0]);<br>Rc <- Ra << abs(tmp[5:0]), if (tmp[5:0] < 0);<br><br>Perform logical shift right of Ra only by the number of bits indicated by Rb. Rb is saturated to ±31 or fewer, and arithmetic shift left is performed if value of Rb is negative. |

| Assembler mnemonic | Format | Affecting flag | Affected flag |
|---|---|---|---|
| **lsr Rc,Ra,Rb** | 32bit | — | — |

| Remarks |
|---|
| |

Fig. 438 lsr Rb,Ra,I5

| | |
|---|---|
| Behavior | **Rb <- Ra >>> I5[4:0];**<br><br>**Perform arithmetic shift right of Ra only by the number of bits represented by immediate value (I5).** |

| Assembler mnemonic | Format | Affecting flag | Affected flag |
|---|---|---|---|
| **lsr Rb,Ra,I5** | 32bit | — | — |

| Remarks |
|---|
| I5 is an unsigned value. |

Fig. 439 rol Rc,Ra,Rb

| | |
|---|---|
| Behavior | tmp[31:0] <- Ra << Rb[4:0];<br>tmp2[31:0] <- Ra >>> (32 - Rb[4:0]);<br>Rc <- tmp[31:0] \| tmp2[31:0];<br><br>Rotate Ra to left only by the number of bits indicated by Rb. |

| Assembler mnemonic | Format | Affecting flag | Affected flag |
|---|---|---|---|
| **rol Rc,Ra,Rb** | 32bit | — | — |

| Remarks |
|---|
| |

Fig. 440 rol Rb,Ra,I5

| | |
|---|---|
| Behavior | **tmp [31:0] <- Ra << I5[4:0];**<br>**tmp2[31:0] <- Ra >>> (32 - I5[4:0]);**<br>**Rb <- tmp[31:0] \| tmp2[31:0];**<br><br>**Rotate Ra to left only by the number of bits represented by immediate value (I5).** |

| Assembler mnemonic | Format | Affecting flag | Affected flag |
|---|---|---|---|
| **rol Rb,Ra,I5** | 32bit | — | — |

| Remarks |
|---|
| I5 is an unsigned value. |

Fig. 441 ror Rb,Ra,I5

| | |
|---|---|
| Behavior | **=> rol Rb,Ra,(32-I5)&0x1f**<br><br>**tmp [31:0] <- Ra << I5[4:0];**<br>**tmp2[31:0] <- Ra >>> (32 - I5[4:0]);**<br>**Rb <- tmp[31:0] \| tmp2[31:0];**<br><br>**Rotate Ra to right only by the number of bits represented by immediate value (I5).** |

| Assembler mnemonic | Format | Affecting flag | Affected flag |
|---|---|---|---|
| **ror Rb,Ra,I5** | 32bit synonym | — | — |

| Remarks |
|---|
| I5 is an unsigned value. |

Fig. 442 aslp Mm,Ra,Mn,Rb

| | |
|---|---|
| Behavior | **tmp[6:0] <- Rb[6:0];**<br>**tmp[6:0] <- 63, if (Rb > 0x0000_003f );**<br>**tmp[6:0] <- -63, if (Rb < 0xffff_ffc1 );**<br>**MHm:MLm <- MHn:MLn << abs(tmp[6:0]);**<br>**MHm:MLm <- MHn:MLn >> abs(tmp[6:0]), if (tmp[6:0] < 0);**<br>**Ra <- MLm;**<br><br>**Perform arithmetic shift left of Mn only by the number of bits indicated by Rb. Rb is saturated to ±63 or fewer, and arithmetic shift right is performed if value of Rb is negative.** |

| Assembler mnemonic | Format | Affecting flag | Affected flag |
|---|---|---|---|
| **aslp Mm,Ra,Mn,Rb** | 32bit | — | — |

| Remarks |
|---|
| |

Fig. 443 aslp Mm,Rb,Mn,I6

| | |
|---|---|
| Behavior | **MHm:MLm <- MHn:MLn << I6[5:0]; Rb <- MLm;**<br><br>**Perform arithmetic shift left of Mn only by the number of bits represented by immediate value (I6).** |

| Assembler mnemonic | Format | Affecting flag | Affected flag |
|---|---|---|---|
| **aslp Mm,Rb,Mn,I6** | 32bit | — | — |

| Remarks |
|---|
| I6 is an unsigned value. |

Fig. 444 aslp Mm,Rc,MHn,Ra,Rb

| | |
|---|---|
| Behavior | **tmp[6:0] <- Rb[6:0];**<br>**tmp[6:0] <- 63, if (Rb > 0x0000_003f );**<br>**tmp[6:0] <- -63, if (Rb < 0xffff_ffc1 );**<br>**MHm:MLm <- MHn:Ra << abs(tmp[6:0]);**<br>**MHm:MLm <- MHn:Ra >> abs(tmp[6:0]),if (tmp[6:0] < 0);**<br>**Rc <- MLm;**<br><br>**Perform arithmetic shift left of MHn: Ra only by the number of bits indicated by Rb. Rb is saturated to ±63 or fewer, and arithmetic shift right is performed if value of Rb is negative.** |

| Assembler mnemonic | Format | Affecting flag | Affected flag |
|---|---|---|---|
| **aslp Mm,Rc,MHn,Ra,Rb** | 32bit | — | |

| Remarks |
|---|
| |

Fig. 445 aslp Mm,Rb,MHn,Ra,I6

| | |
|---|---|
| Behavior | **MHm:MLm <- MHn:Ra << I6[5:0]; Rb <- MLm;**<br><br>**Perform arithmetic shift left of MHn: Ra only by the number of bits represented by immediate value (I6).** |

| Assembler mnemonic | Format | Affecting flag | Affected flag |
|---|---|---|---|
| **aslp Mm,Rb,MHn,Ra,I6** | 32bit | — | — |

| Remarks |
|---|
| I6 is an unsigned value. |

Fig. 446 aslpvw Mm,Ra,Mn,Rb

| | |
|---|---|
| Behavior | **tmp[6:0] <- Rb[6:0];**<br>**tmp[6:0] <- 63, if (Rb > 0x0000_003f );**<br>**tmp[6:0] <- -63, if (Rb < 0xffff_ffc1 );**<br>**tmp2[126:0]<- sext127(MHn:MLn) << abs(tmp[6:0]);**<br>**tmp2[126:0]<- sext127(MHn:MLn) >> abs(tmp[6:0]),**<br>**if (tmp[6:0] < 0);**<br>**MHm:MLm<- tmp2[63:0];**<br>**MHm:MLm<- 0x0000_0000_7fff_ffff, CFR.OVS <- 1,**<br>**if (tmp2[126:0] > sext127(0x0_7fff_ffff[126:0]);**<br>**MHm:MLm<- 0x0000_0000_8000_0000, CFR.OVS <- 1,**<br>**if (tmp2[126:0] <sext127(0x1_8000_0000[126:0]);**<br>**Ra <- MLm;**<br><br>**Perform arithmetic shift left of Mn only by the number of bits indicated by Rb. Saturate result if it cannot be represented by signed 32 bit-number. Rb is saturated to ±63 or fewer, and arithmetic shift right is performed if value of Rb is negative.** |

| Assembler mnemonic | Format | Affecting flag | Affected flag |
|---|---|---|---|
| **aslpvw Mm,Ra,Mn,Rb** | 32bit | CFR.OVS | — |

| Remarks |
|---|
| |

Fig. 447 aslpvw Mm,Rb,Mn,I6

| | |
|---|---|
| Behavior | tmp[126:0] <- sext127(MHn:MLn) << I6[5:0];<br>MHm:MLm <- tmp[63:0];<br>MHm:MLm <- 0x0000_0000_7fff_ffff, CFR.OVS <- 1,<br>if (tmp[126:0] > sext127(0x0_7fff_ffff);<br>MHm:MLm <- 0xffff_ffff_8000_0000, CFR.OVS <- 1,<br>if (tmp[126:0] < sext127(0x1_8000_0000);<br>Rb <- MLm;<br><br>Perform arithmetic shift left of Mn only by the number of bits represented by immediate value (I6). Saturate result if it cannot be represented by signed 32 bits. |

| Assembler mnemonic | Format | Affecting flag | Affected flag |
|---|---|---|---|
| aslpvw Mm,Rb,Mn,I6 | 32bit | CFR.OVS | — |

| Remarks |
|---|
| I6 is an unsigned value. |

Fig. 448 asrp Mm,Ra,Mn,Rb

| | |
|---|---|
| Behavior | tmp[6:0] <- Rb[6:0];<br>tmp[6:0] <- 63, if (Rb > 0x0000_003f );<br>tmp[6:0] <- -63, if (Rb < 0xffff_ffc1 );<br>MHm:MLm <- MHn:MLn >> abs(tmp[6:0]);<br>MHm:MLm <- MHn:MLn << abs(tmp[6:0]), if (tmp[6:0] < 0);<br>Ra <- MLm;<br><br>Perform arithmetic shift right of Mn only by the number of bits indicated by Rb. Rb is saturated to ±63 or fewer, and arithmetic shift left is performed if value of Rb is negative. |

| Assembler mnemonic | Format | Affecting flag | Affected flag |
|---|---|---|---|
| asrp Mm,Ra,Mn,Rb | 32bit | — | — |

| Remarks |
|---|
| |

Fig. 449 asrp Mm,Rb,Mn,I6

| | | | | |
|---|---|---|---|---|
| Behavior | **MHm:MLm <- MHn:MLn >> I6[5:0]; Rb <- MLm;**<br><br>**Perform arithmetic shift right of Mn only by the number of bits represented by immediate value (I6).** | | | |
| Assembler mnemonic | | Format | Affecting flag | Affected flag |
| **asrp Mm,Rb,Mn,I6** | | 32bit | — | — |
| Remarks | | | | |
| I6 is an unsigned value. | | | | |

Fig. 450 asrp Mm,Rc,MHn,Ra,Rb

| | |
|---|---|
| Behavior | tmp[6:0] <- Rb[6:0];<br>tmp[6:0] <- 63, if (Rb > 0x0000_003f );<br>tmp[6:0] <- -63, if (Rb < 0xffff_ffc1 );<br>MHm:MLm <- MHn:Ra >> abs(tmp[6:0]);<br>MHm:MLm <- MHn:Ra << abs(tmp[6:0]), if (tmp[6:0] < 0);<br>Rc <- MLm;<br><br>Perform arithmetic shift right of MHn: Ra only by the number of bits indicated by Rb. Rb is saturated to ±63 or fewer, and arithmetic shift left is performed if value of Rb is negative. |

| Assembler mnemonic | Format | Affecting flag | Affected flag |
|---|---|---|---|
| asrp Mm,Rc,MHn,Ra,Rb | 32bit | — | — |

| Remarks |
|---|
| |

Fig. 451 asrp Mm,Rb,MHn,Ra,I6

| | |
|---|---|
| Behavior | **MHm:MLm <- MHn:Ra >> I6[5:0]; Rb <- MLm;**<br><br>**Perform arithmetic shift right of MHn: Ra only by the number of bits represented by immediate value (I6).** |

| Assembler mnemonic | Format | Affecting flag | Affected flag |
|---|---|---|---|
| **asrp Mm,Rb,MHn,Ra,I6** | 32bit | – | – |

| Remarks |
|---|
| I6 is an unsigned value. |

Fig. 452 asrpvw Mm,Ra,Mn,Rb

| | |
|---|---|
| Behavior | tmp[6:0] <- Rb[6:0];<br>tmp[6:0] <- 63, if (Rb > 0x0000_003f );<br>tmp[6:0] <- -63, if (Rb < 0xffff_ffc1 );<br>tmp2[126:0]<- sext127(MHn:MLn) >> abs(tmp[6:0]);<br>tmp2[126:0]<- sext127(MHn:MLn) << abs(tmp[6:0]),<br>if (tmp[6:0] < 0);<br>MHm:MLm<- tmp2[63:0];<br>MHm:MLm<- 0x0000_0000_7fff_ffff, CFR.OVS <- 1,<br>if (tmp2[126:0] > sext127(0x0_7fff_ffff[126:0]);<br><br>MHm:MLm<- 0x0000_0000_8000_0000, CFR.OVS <- 1,<br>if (tmp2[126:0] < sext127(0x1_8000_0000[126:0]);<br>Ra <- MLm;<br><br>Perform arithmetic shift right of Mn only by the number of bits indicated by Rb. Saturate result if it cannot be represented by signed 32 bit-number. Rb is saturated to ±63 or fewer, and arithmetic shift left is performed if value of Rb is negative. |

| Assembler mnemonic | Format | Affecting flag | Affected flag |
|---|---|---|---|
| asrpvw Mm,Ra,Mn,Rb | 32bit | CFR.OVS | — |
| Remarks | | | |
| | | | |

Fig. 453 lslp Mm,Ra,Mn,Rb

| | |
|---|---|
| Behavior | => aslp Mm,Ra,Mn,Rb<br><br>**MHm:MLm <- MHn:MLn << I6[5:0];**<br>**Rb <- MLm;**<br><br>**Perform logical shift left of Mn only by the number of bits indicated by Rb. Rb is saturated to ±63 or fewer, and arithmetic shift right is performed if value of Rb is negative.** |

| Assembler mnemonic | Format | Affecting flag | Affected flag |
|---|---|---|---|
| **lslp Mm,Ra,Mn,Rb** | 32bit synonym | — | — |

| Remarks |
|---|
| ※Arithmetic shift right is performed if the amount of shift is negative. |

Fig. 454 lslp Mm,Rb,Mn,I6

| | |
|---|---|
| Behavior | **=> aslp Mm,Rb,Mn,I6**<br><br>**MHm:MLm <- MHn:MLn << I6[5:0]; Rb <- MLm;**<br><br>**Perform logical shift left of Mn only by the number of bits represented by immediate value (I6).** |

| Assembler mnemonic | Format | Affecting flag | Affected flag |
|---|---|---|---|
| **lslp Mm,Rb,Mn,I6** | 32bit synonym | — | — |

| Remarks |
|---|
| I6 is an unsigned value. |

Fig. 455 lslp Mm,Rc,MHn,Ra,Rb

Behavior

```
=> aslp Mm,Rc,MHn,Ra,Rb

tmp[6:0] <- Rb[6:0];
tmp[6:0] <-   63, if (Rb > 0x0000_003f );
tmp[6:0] <- -63, if (Rb < 0xffff_ffc1 );
MHm:MLm <- MHn:Ra << abs(tmp[6:0]);
MHm:MLm <- MHn:Ra >> abs(tmp[6:0]),if (tmp[6:0] < 0);
Rc <- MLm;
```

Perform logical shift left of MHn: Ra only by the number of bits indicated by Rb. Rb is saturated to ±63 or fewer, and arithmetic shift right is performed if value of Rb is negative.

| Assembler mnemonic | Format | Affecting flag | Affected flag |
|---|---|---|---|
| lslp Mm,Rc,MHn,Ra,Rb | 32bit synonym | — | — |

Remarks

※Arithmetic shift right is performed if the amount of shift is negative.

Fig. 456 lslp Mm,Rb,MHn,Ra,I6

| | |
|---|---|
| Behavior | **=> aslp Mm,Rb,MHn,Ra,I6**<br><br>**MHm:MLm <- MHn:Ra << I6[5:0]; Rb <- MLm;**<br><br>**Perform logical shift left of MHn: Ra only by the number of bits represented by immediate value (I6).** |

| Assembler mnemonic | Format | Affecting flag | Affected flag |
|---|---|---|---|
| **lslp Mm,Rb,MHn,Ra,I6** | 32bit synonym | | — |

| Remarks |
|---|
| I6 is an unsigned value. |

Fig. 457 lsrp Mm,Ra,Mn,Rb

| | |
|---|---|
| Behavior | **tmp[6:0] <- Rb[6:0];**<br>**tmp[6:0] <- 63, if (Rb > 0x0000_003f );**<br>**tmp[6:0] <- -63, if (Rb < 0xffff_ffc1 );**<br>**MHm:MLm <- MHn:MLn >>> abs(tmp[6:0]);**<br>**MHm:MLm <- MHn:MLn << abs(tmp[6:0]), if (tmp[6:0] < 0);**<br>**Ra <- MLm;**<br><br>**Perform logical shift right of Mn only by the number of bits indicated by Rb. Rb is saturated to ±63 or fewer, and arithmetic shift left is performed if value of Rb is negative.** |

| Assembler mnemonic | Format | Affecting flag | Affected flag |
|---|---|---|---|
| **lsrp Mm,Ra,Mn,Rb** | 32bit | — | — |

| Remarks |
|---|
| |

Fig. 458 lsrp Mm,Rb,Mn,I6

| | | | | |
|---|---|---|---|---|
| Behavior | **MHm:MLm <- MHn:MLn >>> I6[5:0]; Rb <- MLm;**<br><br>**Perform logical shift right of Mn only by the number of bits represented by immediate value (I6).** | | | |
| Assembler mnemonic | | Format | Affecting flag | Affected flag |
| **lsrp Mm,Rb,Mn,I6** | | 32bit | — | — |
| Remarks | | | | |
| I6 is an unsigned value. | | | | |

Fig. 459 lsrp Mm,Rc,MHn,Ra,Rb

| | |
|---|---|
| Behavior | **tmp[6:0] <- Rb[6:0];**<br>**tmp[6:0] <- 63, if (Rb > 0x0000_003f );**<br>**tmp[6:0] <- -63, if (Rb < 0xffff_ffc1 );**<br>**MHm:MLm <- MHn:Ra >>> abs(tmp[6:0]);**<br>**MHm:MLm <- MHn:Ra << abs(tmp[6:0]), if (tmp[6:0] < 0);**<br>**Rc <- MLm;**<br><br>**Perform logical shift right of MHn: Ra only by the number of bits indicated by Rb. Rb is saturated to ±63 or fewer, and arithmetic shift left is performed if value of Rb is negative.** |

| Assembler mnemonic | Format | Affecting flag | Affected flag |
|---|---|---|---|
| **lsrp Mm,Rc,MHn,Ra,Rb** | 32bit | — | — |

| Remarks |
|---|
| |

Fig. 460 lsrp Mm,Rb,MHn,Ra,I6

| | |
|---|---|
| Behavior | **MHm:MLm <- MHn:Ra >>> I6[5:0]; Rb <- MLm;**<br><br>**Perform logical shift right of MHn:Ra only by the number of bits represented by immediate value (I6).** |

| Assembler mnemonic | Format | Affecting flag | Affected flag |
|---|---|---|---|
| **lsrp Mm,Rb,MHn,Ra,I6** | 32bit | — | — |

| Remarks |
|---|
| I6 is an unsigned value. |

Fig. 461 extr Rc,Ra,Rb

| | |
|---|---|
| Behavior | **if (Rb[12:8] >=(u) Rb[4:0]) {**<br>**Rc <- sext(Ra[Rb[12:8]:Rb[4:0]],Rb[12:8]-Rb[4:0]+1);**<br>**} else {**<br>**Rc <- UD;**<br>**}**<br><br>**Specify bit position in Rb, mask the contents of Ra, partially extract the contents of Ra so as to sign-extend it, and store result in Rc.** |

| Assembler mnemonic | Format | Affecting flag | Affected flag |
|---|---|---|---|
| **extr Rc,Ra,Rb** | 32bit | — | — |

| Remarks |
|---|
| Rb[12:8],Rb[4:0] are handled as unsigned values. |

Fig. 462 extr Rb,Ra,Ib5,Ia5

| | |
|---|---|
| Behavior | **if (Ib5 >=(u) Ia5) {**<br>**Rb <- sext(Ra[Ib5:Ia5],Ib5-Ia5+1);**<br>**} else {**<br>**Rb <- UD;**<br>**}**<br><br>**Specify bit position by Ia5 and Ib5, mask the contents of Ra, partially extract the contents of Ra so as to sign-extend it, and store result in Rb.** |

| Assembler mnemonic | Format | Affecting flag | Affected flag |
|---|---|---|---|
| **extr Rb,Ra,Ib5,Ia5** | 32bit | — | — |

| Remarks |
|---|
| Ia5 and Ib5 are unsigned values. |

Fig. 463 ext Rb,Ra,I5

| | | | |
|---|---|---|---|
| Behavior | **=> extr Rb,Ra,I5-1,0**<br><br>**if ((I5-1) >=(u) 0) {**<br>**Rb <- sext(Ra[I5-1:0]);**<br>**} else {**<br>**Rb <- UD;**<br>**}**<br>**Perform sign-extension for bits corresponding to 0 bit to immediate value (I15) of Ra and store result in Rb.** | | |
| Assembler mnemonic | Format | Affecting flag | Affected flag |
| **ext Rb,Ra,I5** | 32bit synonym | — | — |
| Remarks | | | |
| I5 is an unsigned value. | | | |

Fig. 464 exth Ra2

| | |
|---|---|
| Behavior | **Ra2 <- sext(Ra2[15:0]);**<br><br>**Sign-extend lower 16 bits of Ra2 and store result in Ra2.** |

| Assembler mnemonic | Format | Affecting flag | Affected flag |
|---|---|---|---|
| **exth Ra2** | 16bit | — | — |

| Remarks |
|---|
| C7 is the only predicate which can be used (condition cannot be executed). |

Fig. 465 extb Ra2

| | | | | |
|---|---|---|---|---|
| Behavior | **Ra2 <- sext(Ra2[ 7:0]);**<br><br>**Sign-extend lower 8 bits of Ra2 and store result in Ra2.** | | | |
| Assembler mnemonic | | Format | Affecting flag | Affected flag |
| **extb Ra2** | | 16bit | — | — |
| Remarks | | | | |
| C7 is the only predicate which can be used (condition cannot be executed). | | | | |

Fig. 466 extru Rc,Ra,Rb

Behavior

```
if (Rb[12:8] >=(u) Rb[4:0]) {
  Rc <- uext(Ra[Rb[12:8]:Rb[4:0]],Rb[12:8]-Rb[4:0]+1);
} else {
  Rc <- UD;
}
```

Specify bit position in Rb, mask the contents of Ra, partially extract the contents of Ra, and store result in Rc without performing sign extension.

| Assembler mnemonic | Format | Affecting flag | Affected flag |
|---|---|---|---|
| **extru Rc,Ra,Rb** | 32bit | — | — |

Remarks

Rb[12:8],Rb[4:0] are handled as unsigned values.

Fig. 467 extru Rb,Ra,Ib5,Ia5

| | |
|---|---|
| Behavior | **if (Ib5 >=(u) Ia5) {**<br>**Rb <- uext(Ra[Ib5:Ia5],Ib5-Ia5+1);**<br>**} else {**<br>**Rb <- UD;**<br>**}**<br><br>**Specify bit position by Ia5 and Ib5, mask the contents of Ra, partially extract the contents of Ra, and store result in Rb without performing sign extension.** |

| Assembler mnemonic | Format | Affecting flag | Affected flag |
|---|---|---|---|
| **extru Rb,Ra,Ib5,Ia5** | 32bit | — | — |

| Remarks |
|---|
| Ia5 and Ib5 are unsigned values. |

Fig. 468 extu Rb,Ra,I5

| | |
|---|---|
| Behavior | **=> extru Rb,Ra,I5-1,0**<br><br>**if ((I5 -1) >=(u) 0) {**<br>**Rb <- uext(Ra[I5-1:0]);**<br>**} else {**<br>**Rb <- UD;**<br>**}**<br><br>**Store bits corresponding to 0 bit to immediate value (I5) bit of Ra in Rb.** |

| Assembler mnemonic | Format | Affecting flag | Affected flag |
|---|---|---|---|
| **extu Rb,Ra,I5** | 32bit synonym | — | — |

| Remarks |
|---|
| I5 is an unsigned value. |

Fig. 469 exthu Ra2

<table>
<tr><td>Behavior</td><td colspan="3">Ra2 <- uext(Ra2[15:0]);<br><br>Store lower 16 bits of Ra2 in Ra2 without performing sign extension.</td></tr>
<tr><td>Assembler mnemonic</td><td>Format</td><td>Affecting flag</td><td>Affected flag</td></tr>
<tr><td>exthu Ra2</td><td>16bit</td><td>—</td><td>—</td></tr>
<tr><td colspan="4">Remarks</td></tr>
<tr><td colspan="4">C7 is the only predicate which can be used (condition cannot be executed).</td></tr>
</table>

Fig. 470 extbu Ra2

| | | | | |
|---|---|---|---|---|
| Behavior | **Ra2 <- uext(Ra2[ 7:0]);** **Store lower 8 bits of Ra2 in Ra2 without performing sign extension.** | | | |
| Assembler mnemonic | Format | Affecting flag | Affected flag | |
| **extbu Ra2** | 16bit | — | — | |
| Remarks | | | | |
| C7 is the only predicate which can be used (condition cannot be executed). | | | | |

Fig. 471 mskgen Rc,Rb

<table>
<tr><td>Behavior</td><td colspan="3">if (Rb[12:8] >=(u) Rb[4:0]) {<br>Rc <- bit position :Rb[4:0]~Rb[12:8] are 1 others:0<br>} else {<br>Rc <- bit position :0~Rb[12:8],Rb[4:0]~31 are 1<br>others:0<br>}<br><br>Specify bit position in Rb, and generate mask data having a value represented by consecutive 1s.</td></tr>
<tr><td>Assembler mnemonic</td><td>Format</td><td>Affecting flag</td><td>Affected flag</td></tr>
<tr><td>mskgen Rc,Rb</td><td>32bit</td><td>—</td><td>—</td></tr>
<tr><td colspan="4">Remarks</td></tr>
<tr><td colspan="4">Rb[12:8],Rb[4:0] are handled as unsigned values.</td></tr>
</table>

Fig. 472 mskgen Rb,Ib5,Ia5

| | |
|---|---|
| Behavior | **if (Ib5 >=(u) Ia5) {**<br>**Rc <- bit position :Ia5~Ib5 are 1 others:0**<br>**} else {**<br>**Rc <- bit position :0~Ib5,Ia5~31 are 1**<br>**others:0**<br>**}**<br><br>**Specify bit position by Ia5 and Ib5, and generate mask data having a value represented by consecutive 1s.** |

| Assembler mnemonic | Format | Affecting flag | Affected flag |
|---|---|---|---|
| **mskgen Rb,Ib5,Ia5** | 32bit | — | — |

| Remarks |
|---|
| Ia5 and Ib5 are unsigned values. |

Fig. 473 msk Rc,Ra,Rb

| | |
|---|---|
| Behavior | **if (Rb[12:8] >=(u) Rb[4:0]]) {**<br>**Rc <- bit position :Rb[4:0]~Rb[12:8] are the contents of Ra**<br>**others:0**<br>**} else {**<br>**Rc <- bit position :0~Rb[4:0],Rb[12:8]~31 are inside Ra**<br>**others:0**<br>**}**<br><br>**Specify bit position in Rb, and mask the contents of Ra.** |

| Assembler mnemonic | Format | Affecting flag | Affected flag |
|---|---|---|---|
| **msk Rc,Ra,Rb** | 32bit | — | — |

| Remarks |
|---|
| Rb[12:8],Rb[4:0] are handled as unsigned values. |

Fig. 474 msk Rb,Ra,Ib5,Ia5

| | |
|---|---|
| Behavior | **if (Ib5 >=(u) Ia5) {**<br>**Rb <- bit position :from Ia5~Ib5 are the contents of Ra others:0**<br>**} else {**<br>**Rb <- bit position :0~Ib5,Ia5~31 are the contents of Ra others:0**<br>**}**<br><br>**Specify bit position by Ia5 and Ib5, and mask the contents of Ra.** |

| Assembler mnemonic | Format | Affecting flag | Affected flag |
|---|---|---|---|
| **msk Rb,Ra,Ib5,Ia5** | 32bit | — | — |

| Remarks |
|---|
| Ia5 and Ib5 are unsigned values. |

Fig. 475 satw Mm,Rb,Mn

| | |
|---|---|
| Behavior | **MHm:MLm <- MHn:MLn;**<br>**MHm:MLm <- 0x7fffffff[31: 0],**<br>**if (MHn:MLn > 0x00000000_7fffffff[63:0]);**<br>**MHm:MLm <- 0x80000000[31: 0],**<br>**if (MHn:MLn < 0xffffffff_80000000[63:0]);**<br>**Rb <- MLm;**<br><br>**Saturate Mn with a signed 32-bit value, and store result in Rb.** |

| Assembler mnemonic | Format | Affecting flag | Affected flag |
|---|---|---|---|
| **satw Mm,Rb,Mn** | 32bit | — | — |

| Remarks |
|---|
| |

Fig. 476 sath Rb,Ra

| | |
|---|---|
| Behavior | **Rb <- Ra;**<br>**Rb <- 0x00007fff[31: 0], if (Ra[31:0] > 0x00007fff[31:0]);**<br>**Rb <- 0xffff8000[31: 0], if (Ra[31:0] < 0xffff8000[31:0]);**<br><br>**Saturate Ra with a signed 16-bit value, and store result in Rb.** |

| Assembler mnemonic | Format | Affecting flag | Affected flag |
|---|---|---|---|
| **sath Rb,Ra** | 32bit | — | — |

| Remarks |
|---|
| |

Fig. 477 sat12 Rb,Ra

| | |
|---|---|
| Behavior | **Rb <- Ra;**<br>**Rb <- 0x000007ff[31: 0], if (Ra[31:0] > 0x000007ff[31:0]);**<br>**Rb <- 0xfffff800[31: 0], if (Ra[31:0] < 0xfffff800[31:0]);**<br><br>**Saturate Ra with a signed 12-bit value, and store result in Rb.** |

| Assembler mnemonic | Format | Affecting flag | Affected flag |
|---|---|---|---|
| **sat12 Rb,Ra** | 32bit | | — |

| Remarks |
|---|
| |

Fig. 478 sat9 Rb,Ra

| | |
|---|---|
| Behavior | **Rb <- Ra;**<br>**Rb <- 0x000000ff[31: 0], if (Ra[31:0] > 0x000000ff[31:0]);**<br>**Rb <- 0xffffff00[31: 0], if (Ra[31:0] < 0xffffff00[31:0]);**<br><br>**Saturate Ra with a signed 9-bit value, and store result in Rb.** |

| Assembler mnemonic | Format | Affecting flag | Affected flag |
|---|---|---|---|
| **sat9 Rb,Ra** | 32bit | — | — |

| Remarks |
|---|
| |

Fig. 479 satb Rb,Ra

| | |
|---|---|
| Behavior | **Rb <- Ra;**<br>**Rb <- 0x0000007f[31: 0], if (Ra[31:0] > 0x0000007f[31:0]);**<br>**Rb <- 0xffffff80[31: 0], if (Ra[31:0] < 0xffffff80[31:0]);**<br><br>**Saturate Ra with a signed 8-bit value, and store result in Rb.** |

| Assembler mnemonic | Format | Affecting flag | Affected flag |
|---|---|---|---|
| **satb Rb,Ra** | 32bit | — | — |

| Remarks |
|---|
| |

Fig. 480 satbu Rb,Ra

| | |
|---|---|
| Behavior | **Rb <- Ra;**<br>**Rb <- 0x000000ff[31: 0], if (Ra[31:0] > 0x000000ff[31:0]);**<br>**Rb <- 0x00000000[31: 0], if (Ra[31:0] < 0x00000000[31:0]);**<br><br>**Saturate Ra with an unsigned 8-bit value, and store result in Rb.** |

| Assembler mnemonic | Format | Affecting flag | Affected flag |
|---|---|---|---|
| **satbu Rb,Ra** | 32bit | — | — |

| Remarks |
|---|
| |

Fig. 481 extw Mm,Rb,Ra

| | |
|---|---|
| Behavior | **MHm:MLm <- 0x0000_0000:Ra, if(Ra[31] == 0);**<br>**MHm:MLm <- 0xffff_ffff:Ra, if(Ra[31] == 1);**<br>**Rb <- MLm;**<br><br>**Sign-extend Ra and store result in Mm.** |

| Assembler mnemonic | Format | Affecting flag | Affected flag |
|---|---|---|---|
| **extw Mm,Rb,Ra** | 32bit | | — |

| Remarks |
|---|
| |

Fig. 482 vintllh Rc,Ra,Rb

| | |
|---|---|
| Behavior | **Rc[31:16] <- Ra[15: 0];**<br>**Rc[15: 0] <- Rb[15: 0];**<br><br>**Handle each register in half word vector format.**<br>**Pack lower 16 bits of Ra and lower 16 bits of Rb.** |

| Assembler mnemonic | Format | Affecting flag | Affected flag |
|---|---|---|---|
| **vintllh Rc,Ra,Rb** | 32bit | — | — |

| Remarks |
|---|
| |

Fig. 483 vintlhh Rc,Ra,Rb

| | |
|---|---|
| Behavior | **Rc[31:16] <- Ra[31:16];**<br>**Rc[15: 0] <- Rb[31:16];**<br><br>**Handle each register in half word vector format.**<br>**Pack higher 16 bits of Ra and higher 16 bits of Rb.** |

| Assembler mnemonic | Format | Affecting flag | Affected flag |
|---|---|---|---|
| **vintlhh Rc,Ra,Rb** | 32bit | — | — |

| Remarks |
|---|
| |

Fig. 484 vintllb Rc,Ra,Rb

| | |
|---|---|
| Behavior | **Rc[31:24] <- Ra[15: 8];**<br>**Rc[23:16] <- Rb[15: 8];**<br>**Rc[15: 8] <- Ra[ 7: 0];**<br>**Rc[ 7: 0] <- Rb[ 7: 0];**<br><br>**Handle each register in byte vector format.**<br>**Pack lower 16 bits of Ra and lower 16 bits of Rb.** |

| Assembler mnemonic | Format | Affecting flag | Affected flag |
|---|---|---|---|
| **vintllb Rc,Ra,Rb** | 32bit | — | — |

| Remarks |
|---|
| |

Fig. 485 vintlhb Rc,Ra,Rb

| | |
|---|---|
| Behavior | **Rc[31:24] <- Ra[31:24];**<br>**Rc[23:16] <- Rb[31:24];**<br>**Rc[15: 8] <- Ra[23:16];**<br>**Rc[ 7: 0] <- Rb[23:16];**<br><br>**Handle each register in byte vector format.**<br>**Pack higher 16 bits of Ra and higher 16 bits of Rb.** |

| Assembler mnemonic | Format | Affecting flag | Affected flag |
|---|---|---|---|
| **vintlhb Rc,Ra,Rb** | 32bit | — | — |

| Remarks |
|---|
| |

Fig. 486 valn Rc,Ra,Rb

<table>
<tr><td>Behavior</td><td colspan="3">tmp[87:0] <- Ra:Rb << (CFR.ALN[1:0] << 3);<br>Rc <- tmp[63:32];<br><br>Perform byte alignment according to CFR.ALN.</td></tr>
<tr><td>Assembler mnemonic</td><td>Format</td><td>Affecting flag</td><td>Affected flag</td></tr>
<tr><td>valn Rc,Ra,Rb</td><td>32bit</td><td>—</td><td>CFR.ALN</td></tr>
<tr><td colspan="4">Remarks</td></tr>
<tr><td colspan="4"></td></tr>
</table>

Fig. 487 valn1 Rc,Ra,Rb

| Behavior | Rc[31: 8] <- Ra[23: 0];<br>Rc[ 7: 0] <- Rb[31:24];<br><br>**Perform byte alignment.** | | |
|---|---|---|---|
| **Assembler mnemonic** | **Format** | **Affecting flag** | **Affected flag** |
| **valn1 Rc,Ra,Rb** | 32bit | — | — |
| Remarks | | | |
| | | | |

Fig. 488 valn2 Rc,Ra,Rb

| | |
|---|---|
| Behavior | **Rc[31:16] <- Ra[15: 0];**<br>**Rc[15: 0] <- Rb[31:16];**<br><br>**Perform byte alignment.** |

| Assembler mnemonic | Format | Affecting flag | Affected flag |
|---|---|---|---|
| **valn2 Rc,Ra,Rb** | 32bit | — | — |

| Remarks |
|---|
| |

Fig. 489 valn3 Rc,Ra,Rb

| Behavior | Rc[31:24] <- Ra[ 7: 0];<br>Rc[23: 0] <- Rb[31: 8];<br><br>**Perform byte alignment according to CFR.ALN.** | | |
|---|---|---|---|
| Assembler mnemonic | Format | Affecting flag | Affected flag |
| **valn3 Rc,Ra,Rb** | 32bit | — | — |
| Remarks | | | |
| | | | |

Fig. 490 valnvc1 Rc,Ra,Rb

<table>
<tr><td>Behavior</td><td colspan="3">tmp [87: 0] <- Ra:Rb << (CFR.ALN[1:0] << 3 );<br>tmp2[31: 0] <- tmp[63:32];<br>Rc <- tmp2[31:24]:tmp2[31:24]:tmp2[23:16]:tmp2[23:16],<br>if (VC0 == 0);<br>Rc <- tmp2[31:24]:tmp2[23:16]:tmp2[23:16]:tmp2[15: 8],<br>if (VC0 == 1);<br><br>Used for motion compensation in image processing.<br>Perform byte alignment according to CFR.ALN, and take out different byte data depending on value of VC0.</td></tr>
<tr><td>Assembler mnemonic</td><td>Format</td><td>Affecting flag</td><td>Affected flag</td></tr>
<tr><td>valnvc1 Rc,Ra,Rb</td><td>32bit</td><td>—</td><td>CFR.ALN,VC0</td></tr>
<tr><td colspan="4">Remarks</td></tr>
<tr><td colspan="4"></td></tr>
</table>

Fig. 491 valnvc2 Rc,Ra,Rb

| | |
|---|---|
| Behavior | **tmp [87: 0] <- Ra:Rb << (CFR.ALN[1:0] << 3 );**<br>**tmp2[31: 0] <- tmp[47:16];**<br>**Rc <- tmp2[31:24]:tmp2[31:24]:tmp2[23:16]:tmp2[23:16],**<br>**if (VC0 == 0);**<br>**Rc <- tmp2[31:24]:tmp2[23:16]:tmp2[23:16]:tmp2[15: 8],**<br>**if (VC0 == 1);**<br><br>**Used for motion compensation in image processing.**<br>**Perform byte alignment according to CFR.ALN, and take out different byte data depending on value of VC0.** |

| Assembler mnemonic | Format | Affecting flag | Affected flag |
|---|---|---|---|
| **valnvc2 Rc,Ra,Rb** | 32bit | — | CFR.ALN,VC0 |

| Remarks |
|---|
| |

Fig. 492 valnvc3 Rc,Ra,Rb

| | |
|---|---|
| Behavior | **tmp [87: 0] <- Ra:Rb << (CFR.ALN[1:0] << 3 );**<br>**tmp2[31: 0] <- tmp[63:32];**<br>**Rc <- tmp2[31:24]:tmp2[31:24]:tmp2[23:16]:tmp2[23:16],**<br>**if (VC0 == 0);**<br>**Rc <- tmp2[31:24]:tmp2[15: 8]:tmp2[23:16]:tmp2[ 7: 0],**<br>**if (VC0 == 1);**<br><br>**Used for motion compensation in image processing.**<br>**Perform byte alignment according to CFR.ALN, and take out different byte data depending on value of VC0.** |

| Assembler mnemonic | Format | Affecting flag | Affected flag |
|---|---|---|---|
| **valnvc3 Rc,Ra,Rb** | 32bit | — | CFR.ALN,VC0 |

| Remarks |
|---|
| |

Fig. 493 valnvc4 Rc,Ra,Rb

Behavior

```
tmp [87: 0] <- Ra:Rb << (CFR.ALN[1:0] << 3 );
tmp2[31: 0] <- tmp[47:16];
Rc <- tmp2[31:24]:tmp2[31:24]:tmp2[23:16]:tmp2[23:16],
                if (VC0 == 0);
Rc <- tmp2[31:24]:tmp2[15: 8]:tmp2[23:16]:tmp2[ 7: 0],
                if (VC0 == 1);
```

Used for motion compensation in image processing.

Perform byte alignment according to CFR.ALN, and take out different byte data depending on value of VC0.

| Assembler mnemonic | Format | Affecting flag | Affected flag |
|---|---|---|---|
| **valnvc4 Rc,Ra,Rb** | 32bit | – | CFR.ALN,VC0 |

Remarks tmp2[ 7: 0] is 0x00 when CFR.ALN[1:0]==3.

Fig. 494 vxchngh Rb,Ra

| | |
|---|---|
| Behavior | **=> valn2 Rb,Ra,Ra**<br><br>**Rb[31:16] <- Ra[15: 0];**<br>**Rb[15: 0] <- Ra[31:16];**<br><br>**Handle each register in half word vector format.**<br>**Exchange positions of higher 16 bits and lower 16 bits of Ra, and store result in Rb.** |

| Assembler mnemonic | Format | Affecting flag | Affected flag |
|---|---|---|---|
| **vxchngh Rb,Ra** | 32bit synonym | — | — |

| Remarks |
|---|
| |

Fig. 495 byterev Rb,Ra

| | | | |
|---|---|---|---|
| Behavior | **Rb[31:24] <- Ra[ 7: 0];**<br>**Rb[23:16] <- Ra[15: 8];**<br>**Rb[15: 8] <- Ra[23:16];**<br>**Rb[ 7: 0] <- Ra[31:24];**<br><br>**Handle each register in byte vector format.**<br>**Reverse byte order.** | | |
| Assembler mnemonic | Format | Affecting flag | Affected flag |
| **byterev Rb,Ra** | 32bit | — | — |
| Remarks | | | |
| | | | |

Fig. 496 vstovb Rb,Ra

| | |
|---|---|
| Behavior | **Rb[31:24] <- Ra[7:0];**<br>**Rb[23:16] <- Ra[7:0];**<br>**Rb[15: 8] <- Ra[7:0];**<br>**Rb[ 7: 0] <- Ra[7:0];**<br><br>**Handle each register in byte vector format.**<br>**Move lower 8 bits of Ra to Rb.** |

| Assembler mnemonic | Format | Affecting flag | Affected flag |
|---|---|---|---|
| **vstovb Rb,Ra** | 32bit | — | — |

| Remarks |
|---|
| |

Fig. 497 vstovh Rb,Ra

| | | | | |
|---|---|---|---|---|
| Behavior | **Rb[31:16] <- Ra[15:0];**<br>**Rb[15: 0] <- Ra[15:0];**<br><br>**Handle each register in half word vector format.**<br>**Move lower 16 bits of Ra to Rb.** | | | |
| Assembler mnemonic | | Format | Affecting flag | Affected flag |
| **vstovh Rb,Ra** | | 32bit | — | — |
| Remarks | | | | |
| | | | | |

Fig. 498 vlunpkh Rb:Rb+1,Ra

| | | | | |
|---|---|---|---|---|
| Behavior | **Rb <- sext(Ra[31:16]);**<br>**Rb+1 <- sext(Ra[15: 0]);**<br><br>**Handle Ra in half word vector format.**<br>**Unpack Ra in lower bits of Rb and Rb+1 after performing sign extension.** | | | |
| Assembler mnemonic | | Format | Affecting flag | Affected flag |
| **vlunpkh Rb:Rb+1,Ra** | | 32bit | — | — |
| Remarks | | | | |
| Rb shall be an even number. | | | | |

Fig. 499 vlunpkhu Rb:Rb+1,Ra

| | | | | |
|---|---|---|---|---|
| Behavior | **Rb <- uext(Ra[31:16]);**<br>**Rb+1 <- uext(Ra[15: 0]);**<br><br>**Handle Ra in half word vector format.**<br>**Unpack Ra in lower bits of Rb and Rb+1 without performing sign extension.** | | | |
| Assembler mnemonic | | Format | Affecting flag | Affected flag |
| **vlunpkhu Rb:Rb+1,Ra** | | 32bit | — | — |
| Remarks | | | | |
| Rb shall be an even number. | | | | |

Fig. 500 vlunpkb Rb:Rb+1,Ra

| | |
|---|---|
| Behavior | **Rb[31:16] <- sext16(Ra[31:24]);**<br>**Rb[15:0] <- sext16(Ra[23:16]);**<br>**Rb+1[31:16] <- sext16(Ra[15:8]);**<br>**Rb+1[15:0] <- sext16(Ra[7:0]);**<br><br>**Handle Ra in byte vector format, and handle Rb and Rb+1 in half word vector format.**<br>**Unpack Ra in lower bits of Rb and Rb+1 after performing sign extension.** |

| Assembler mnemonic | Format | Affecting flag | Affected flag |
|---|---|---|---|
| **vlunpkb Rb:Rb+1,Ra** | 32bit | — | — |

| Remarks |
|---|
| Rb shall be an even number. |

Fig. 501 vlunpkbu Rb:Rb+1,Ra

| | |
|---|---|
| Behavior | **Rb[31:16] <- uext16(Ra[31:24]);**<br>**Rb[15:0] <- uext16(Ra[23:16]);**<br>**Rb+1[31:16] <- uext16(Ra[15:8]);**<br>**Rb+1[15:0] <- uext16(Ra[7:0]);**<br><br>**Handle Ra in byte vector format, and handle Rb and Rb+1 in half word vector format.**<br>**Unpack Ra in lower bits of Rb and Rb+1 without performing sign extension.** |

| Assembler mnemonic | Format | Affecting flag | Affected flag |
|---|---|---|---|
| **vlunpkbu Rb:Rb+1,Ra** | 32bit | — | — |

| Remarks |
|---|
| Rb shall be an even number. |

Fig. 502 vhunpkh Rb:Rb+1,Ra

<table>
<tr><td>Behavior</td><td colspan="3">Rb <- Ra[31:16]:16'b0;<br>Rb+1 <- Ra[15: 0]:16'b0;<br><br>Handle Ra in half word vector format.<br>Unpack Ra in higher bits of Rb and Rb+1.</td></tr>
<tr><td>Assembler mnemonic</td><td>Format</td><td>Affecting flag</td><td>Affected flag</td></tr>
<tr><td>vhunpkh Rb:Rb+1,Ra</td><td>32bit</td><td>—</td><td>—</td></tr>
<tr><td colspan="4">Remarks</td></tr>
<tr><td colspan="4">Rb shall be an even number.</td></tr>
</table>

Fig. 503 vhunpkb Rb:Rb+1,Ra

<table>
<tr><td>Behavior</td><td colspan="3">Rb[31:16] <- Ra[31:24]:8'b0;<br>Rb[15: 0] <- Ra[23:16]:8'b0;<br>Rb+1[31:16] <- Ra[15: 8]:8'b0;<br>Rb+1[15: 0] <- Ra[ 7: 0]:8'b0;<br><br>Handle Ra in byte vector format, and handle Rb and Rb+1 in half word vector format.<br>Unpack Ra in higher bits of Rb and Rb+1.</td></tr>
<tr><td>Assembler mnemonic</td><td>Format</td><td>Affecting flag</td><td>Affected flag</td></tr>
<tr><td>vhunpkb Rb:Rb+1,Ra</td><td>32bit</td><td>—</td><td>—</td></tr>
<tr><td colspan="4">Remarks</td></tr>
<tr><td colspan="4">Rb shall be an even number.</td></tr>
</table>

Fig. 504 vunpk1 Rb,Mn

| Behavior | **Rb <- MHn[31:16]:MLn[31:16]**<br><br>**Handle Mn in word vector format.**<br>**Concatenate higher 16 bits of MHn and MLn, and write result to Rb.** | | |
|---|---|---|---|
| Assembler mnemonic | Format | Affecting flag | Affected flag |
| **vunpk1 Rb,Mn** | 32bit | — | — |
| Remarks | | | |
| | | | |

Fig. 505 vunpk2 Rb,Mn

| Behavior | **Rb <- MHn[15: 0]:MLn[15: 0]**<br><br>**Handle Mn in word vector format.**<br>**Concatenate lower 16 bits of MHn and MLn, and write result to Rb.** | | |
|---|---|---|---|
| **Assembler mnemonic** | **Format** | **Affecting flag** | **Affected flag** |
| **vunpk2 Rb,Mn** | 32bit | — | — |
| Remarks | | | |
| | | | |

Fig. 506 vlpkh Rc,Rb,Ra

| | |
|---|---|
| Behavior | **Rc[31:16] <- Rb[15:0];**<br>**Rc[31:16] <- 0x7fff[15: 0], if (Rb[31:0] > 0x00007fff[31:0]);**<br>**Rc[31:16] <- 0x8000[15: 0], if (Rb[31:0] < 0xffff8000[31:0]);**<br>**Rc[15: 0] <- Ra[15:0];**<br>**Rc[15: 0] <- 0x7fff[15: 0], if (Ra[31:0] > 0x00007fff[31:0]);**<br>**Rc[15: 0] <- 0x8000[15: 0], if (Ra[31:0] < 0xffff8000[31:0]);**<br><br>**Handle Rc in half word vector format.**<br>**Pack lower bit side of Ra and Rb and store result in Rc. Saturate Ra and Rb before packing them if they cannot be represented by signed 16 bits.** |

| Assembler mnemonic | Format | Affecting flag | Affected flag |
|---|---|---|---|
| **vlpkh Rc,Rb,Ra** | 32bit | — | — |

| Remarks |
|---|
| |

Fig. 507 vlpkhu Rc,Rb,Ra

| | |
|---|---|
| Behavior | **Rc[31:16] <- Rb[15:0];**<br>**Rc[31:16] <- 0xffff[15: 0], if (Rb[31:0] > 0x0000ffff[31:0]);**<br>**Rc[31:16] <- 0x0000[15: 0], if (Rb[31:0] < 0x00000000[31:0]);**<br>**Rc[15: 0] <- Ra[15:0];**<br>**Rc[15: 0] <- 0xffff[15: 0], if (Ra[31:0] > 0x0000ffff[31:0]);**<br>**Rc[15: 0] <- 0x0000[15: 0], if (Ra[31:0] < 0x00000000[31:0]);**<br><br>**Handle Rc in half word vector format.**<br>**Pack lower bit side of Ra and Rb and store result in Rc. Saturate Ra and Rb before packing them if they cannot be represented by unsigned 16 bits.** |

| Assembler mnemonic | Format | Affecting flag | Affected flag |
|---|---|---|---|
| **vlpkhu Rc,Rb,Ra** | 32bit | — | — |

| Remarks |
|---|
| |

Fig. 508 vlpkb Rc,Rb,Ra

| | |
|---|---|
| Behavior | **Rc[31:24] <- Rb[23:16];**<br>**Rc[31:24] <- 0x7f[ 7: 0], if (Rb[31:16] > 0x007f[15:0]);**<br>**Rc[31:24] <- 0x80[ 7: 0], if (Rb[31:16] < 0xff80[15:0]);**<br>**Rc[23:16] <- Rb[ 7: 0];**<br>**Rc[23:16] <- 0x7f[ 7: 0], if (Rb[15: 0] > 0x007f[15:0]);**<br>**Rc[23:16] <- 0x80[ 7: 0], if (Rb[15: 0] < 0xff80[15:0]);**<br>**Rc[15: 8] <- Ra[23:16];**<br>**Rc[15: 8] <- 0x7f[ 7: 0], if (Ra[31:16] > 0x007f[15:0]);**<br>**Rc[15: 8] <- 0x80[ 7: 0], if (Ra[31:16] < 0xff80[15:0]);**<br>**Rc[ 7: 0] <- Ra[ 7: 0];**<br>**Rc[ 7: 0] <- 0x7f[ 7: 0], if (Ra[15: 0] > 0x007f[15:0]);**<br>**Rc[ 7: 0] <- 0x80[ 7: 0], if (Ra[15: 0] < 0xff80[15:0]);**<br><br>**Handle Ra and Rb in byte vector format, and handle Rc in half word vector format.**<br>**Pack lower bit side of Ra and Rb and store result in Rc. Saturate Ra and Rb before packing them if they cannot be represented by signed 8 bits.** |

| Assembler mnemonic | Format | Affecting flag | Affected flag |
|---|---|---|---|
| **vlpkb Rc,Rb,Ra** | 32bit | — | — |

| Remarks |
|---|
| |

Fig. 509 vlpkbu Rc,Rb,Ra

| | |
|---|---|
| Behavior | **Rc[31:24] <- Rb[23:16];**<br>**Rc[31:24] <- 0xff[ 7: 0], if (Rb[31:16] > 0x00ff[15:0]);**<br>**Rc[31:24] <- 0x00[ 7: 0], if (Rb[31:16] < 0x0000[15:0]);**<br>**Rc[23:16] <- Rb[ 7: 0];**<br>**Rc[23:16] <- 0xff[ 7: 0], if (Rb[15: 0] > 0x00ff[15:0]);**<br>**Rc[23:16] <- 0x00[ 7: 0], if (Rb[15: 0] < 0x0000[15:0]);**<br>**Rc[15: 8] <- Ra[23:16];**<br>**Rc[15: 8] <- 0xff[ 7: 0], if (Ra[31:16] > 0x00ff[15:0]);**<br>**Rc[15: 8] <- 0x00[ 7: 0], if (Ra[31:16] < 0x0000[15:0]);**<br>**Rc[ 7: 0] <- Ra[ 7: 0];**<br>**Rc[ 7: 0] <- 0xff[ 7: 0], if (Ra[15: 0] > 0x00ff[15:0]);**<br>**Rc[ 7: 0] <- 0x00[ 7: 0], if (Ra[15: 0] < 0x0000[15:0]);**<br><br>**Handle Ra and Rb in byte vector format, and handle Rc in half word vector format.**<br>**Pack lower bit side of Ra and Rb and store result in Rc. Saturate Ra and Rb before packing them if they cannot be represented by unsigned 8 bits.** |

| Assembler mnemonic | Format | Affecting flag | Affected flag |
|---|---|---|---|
| **vlpkbu Rc,Rb,Ra** | 32bit | — | — |

| Remarks |
|---|
| |

Fig. 510 vhpkh Rc,Ra,Rb

| | |
|---|---|
| Behavior | **=> vintlhh Rc,Ra,Rb**<br><br>**Rc[31:16] <- Ra[31:16];**<br>**Rc[15: 0] <- Rb[31:16];**<br><br>**Handle each register in half word vector format.**<br>**Pack higher 16 bits of Ra and higher 16 bits of Rb.** |

| Assembler mnemonic | Format | Affecting flag | Affected flag |
|---|---|---|---|
| **vhpkh Rc,Ra,Rb** | 32bit synonym | — | — |
| Remarks | | | |
| | | | |

Fig. 511 vhpkb Rc,Ra,Rb

<table>
<tr><td>Behavior</td><td colspan="3">Rc[31:24] <- Ra[31:24];<br>Rc[23:16] <- Ra[15: 8];<br>Rc[15: 8] <- Rb[31:24];<br>Rc[ 7: 0] <- Rb[15: 8];<br><br>Handle Ra and Rb in byte vector format, and handle Rc in half word vector format.<br>Pack higher bit side of Ra and Rb and store result in Rc.</td></tr>
<tr><td>Assembler mnemonic</td><td>Format</td><td>Affecting flag</td><td>Affected flag</td></tr>
<tr><td>vhpkb Rc,Ra,Rb</td><td>32bit</td><td>—</td><td>—</td></tr>
<tr><td colspan="4">Remarks</td></tr>
<tr><td colspan="4"></td></tr>
</table>

Fig. 512 vexth Mm,Rb,Ra

| | |
|---|---|
| Behavior | **MHm[31:16]:MLm[31:16] <- 0xffff:Ra[31:16], if (Ra[31] == 1);**<br>**MHm[31:16]:MLm[31:16] <- 0x0000:Ra[31:16], if (Ra[31] == 0);**<br>**MHm[15:0]:MLm[15:0] <- 0xffff:Ra[15: 0], if (Ra[15] == 1);**<br>**MHm[15:0]:MLm[15:0] <- 0x0000:Ra[15: 0], if (Ra[15] == 0);**<br>**Rb <- MLm;**<br><br>**Handle Ra and Rb in half word vector format, and handle Mm in word vector format.**<br>**Sign-extend Ra and store it in Mm.** |

| Assembler mnemonic | Format | Affecting flag | Affected flag |
|---|---|---|---|
| **vexth Mm,Rb,Ra** | 32bit | — | — |

| Remarks |
|---|
| |

Fig. 513 bseq0 Rb,Ra

| | |
|---|---|
| Behavior | **Rb <- bseq(Ra,0);**<br><br>**Count the number of consecutive 0s from MSB of Ra, and store count result in Rb.** |

| Assembler mnemonic | Format | Affecting flag | Affected flag |
|---|---|---|---|
| **bseq0 Rb,Ra** | 32bit | — | — |
| Remarks | | | |
| | | | |

Fig. 514 bseq1 Rb,Ra

| | | | |
|---|---|---|---|
| Behavior | **Rb <- bseq(Ra,1);**<br><br>**Count the number of consecutive 1s from MSB of Ra, and store count result in Rb.** | | |
| Assembler mnemonic | Format | Affecting flag | Affected flag |
| **bseq1 Rb,Ra** | 32bit | — | — |
| Remarks | | | |
| | | | |

Fig. 515 bseq Rb,Ra

| | | | |
|---|---|---|---|
| Behavior | **Rb <- bseq(Ra[30:0]:~Ra[31],Ra[31]);**<br>**Rb <- 0, if ( Ra == 0 );**<br><br>**Count the number of consecutive sign bits from 1 bit below MSB of Ra, and store count result in Rb. Output 0 if Ra is 0.** | | |
| Assembler mnemonic | Format | Affecting flag | Affected flag |
| **bseq Rb,Ra** | 32bit | — | — |
| Remarks | | | |
| Note that MSB is excluded when the above count is made. | | | |

Fig. 516 bcnt1 Rb,Ra

| | | | |
|---|---|---|---|
| Behavior | **Rb <- bcnt(Ra,1);**<br><br>**Count the number of consecutive 1s of Ra, and store count result in Rb.** | | |
| Assembler mnemonic | Format | Affecting flag | Affected flag |
| **bcnt1 Rb,Ra** | 32bit | — | — |
| Remarks | | | |
| | | | |

Fig. 517 rndvh Rb,Ra

| | |
|---|---|
| Behavior | tmp[32:0] <- sext33(Ra) + 0x0_0000_8000[32:0];<br>Rb <- sext(tmp[31:16]);<br>Rb <- 0x0000_7fff, CFR.OVS <- 1, if (tmp[32:0] > 0x0_7fff_ffff);<br><br>Perform operation for rounding 32-bit value down to 16-bit value.<br>Saturate result if it cannot be represented by signed 16 bit. |

| Assembler mnemonic | Format | Affecting flag | Affected flag |
|---|---|---|---|
| rndvh Rb,Ra | 32bit | CFR.OVS | — |

| Remarks |
|---|
| No negative overflow is generated. |

Fig. 518 mskbrvb Rc,Ra,Rb

| | |
|---|---|
| Behavior | **for (i = 0; i < 8; i++) {**<br>**tmp[7-i] <- Rb[i];**<br>**}**<br>**tmp[31:8] <- 0;**<br>**if (CFR.BPO <(u) 31[4:0]) {**<br>**Rc[31:CFR.BPO+1] <- Ra[31:CFR.BPO+1];**<br>**Rc[CFR.BPO:0] <- tmp[CFR.BPO:0];**<br>**} else {**<br>**Rc[31:0] <- tmp[31:0];**<br>**}**<br><br>**Used for bit-reverse addressing.**<br>**Sort lower 8 bits of Rb in reverse order, and concatenate Ra and Rb at bit position indicated by CFR.BPO.** |

| Assembler mnemonic | Format | Affecting flag | Affected flag |
|---|---|---|---|
| **mskbrvb Rc,Ra,Rb** | 32bit | – | CFR.BPO |

| Remarks |
|---|
| |

Fig. 519 mskbrvh Rc,Ra,Rb

Behavior

```
for (i = 0; i < 16; i++) {
        tmp[15-i] <- Rb[i];
}
tmp[31:16] <- 0;
if (CFR.BPO <(u) 31[4:0]) {
        Rc[31:CFR.BPO+1] <-   Ra[31:CFR.BPO+1];
        Rc[CFR.BPO:0]     <- tmp[CFR.BPO:0];
} else {
        Rc[31:0]   <- tmp[31:0];
}
```

Used for bit-reverse addressing.

Sort lower 16 bits of Rb in reverse order, and concatenate Ra and Rb at bit position indicated by CFR.BPO.

| Assembler mnemonic | Format | Affecting flag | Affected flag |
|---|---|---|---|
| **mskbrvh Rc,Ra,Rb** | 32bit | – | CFR.BPO |

| Remarks |
|---|
| |

Fig. 520 movp Rc:Rc+1,Ra,Rb

| | |
|---|---|
| Behavior | **Rc <- Ra;**<br>**Rc+1 <- Rb;**<br><br>**Move Ra to Rc and Rb to Rc+1.** |

| Assembler mnemonic | Format | Affecting flag | Affected flag |
|---|---|---|---|
| **movp Rc:Rc+1,Ra,Rb** | 32bit | — | — |

| Remarks |
|---|
| Rc shall be an even number. |

Fig. 521 hmul Mm,Rc,Ra,Rb

| | |
|---|---|
| Behavior | **MHm:MLm <- smul(Ra,sext(Rb[31:16]));**<br>**Rc <- MLm[31:0], if (reg#(Rc) != 30 && reg#(Rc) != 31);**<br><br>**Handle Rb in half word vector format.**<br>**Perform integer multiplication for higher 16 bits of Ra and Rb.**<br>**Store result in Mm and Rc.** |

| Assembler mnemonic | Format | Affecting flag | Affected flag |
|---|---|---|---|
| **hmul Mm,Rc,Ra,Rb** | 32bit | — | — |

| Remarks |
|---|
| No writing isperformed to Rc, when r30 or r31 is specified as Rc. |

Fig. 522 lmul Mm,Rc,Ra,Rb

| | |
|---|---|
| Behavior | MHm:MLm <- smul(Ra,sext(Rb[15:0]));<br>Rc <- MLm[31:0], if (reg#(Rc) != 30 && reg#(Rc) != 31);<br><br>Handle Rb in half word vector format.<br>Perform integer multiplication for lower 16 bits of Ra and Rb.<br>Store result in Mm and Rc. |

| Assembler mnemonic | Format | Affecting flag | Affected flag |
|---|---|---|---|
| lmul Mm,Rc,Ra,Rb | 32bit | — | — |

| Remarks |
|---|
| No writing is performed to Rc, when r30 or r31 is specified as Rc. |

Fig. 523 fmulhh Mm,Rc,Ra,Rb

<table>
<tr><td>Behavior</td><td colspan="3">tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[15:0] == 0x8000)<br>&& (PSR.FXP == 1));<br>MHm:MLm <- sext64(tmp[31:0]);<br>MHm:MLm <- 0x0000_0000_7fff_ffff, CFR.OVS <- 1,<br>if (tmp[32:0] > 0x0_7fff_ffff);<br>MHm:MLm <- 0xffff_ffff_8000_0000, CFR.OVS <- 1,<br>if (tmp[32:0] < 0x1_8000_0000);<br>Rc <- MHm[15:0]:MLm[31:16],<br>if (reg#(Rc) != 30 && reg#(Rc) != 31);<br><br>Handle Ra, Rb and Rc as 16-bit values, and handle Mm as 32-bit value.<br>Perform fixed point multiplication for Ra and Rb. Store result in Mm and Rc. Saturate result if it cannot be represented by signed 32 bits.</td></tr>
<tr><td>Assembler mnemonic</td><td>Format</td><td>Affecting flag</td><td>Affected flag</td></tr>
<tr><td>fmulhh Mm,Rc,Ra,Rb</td><td>32bit</td><td>CFR.OVS</td><td>PSR.FXP</td></tr>
<tr><td colspan="4">Remarks</td></tr>
<tr><td colspan="4">No writing is performed to Rc, when r30 or r31 is specified as Rc.</td></tr>
</table>

Fig. 524 fmulhhr Mm,Rc,Ra,Rb

| | |
|---|---|
| Behavior | tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[15:0] == 0x8000)<br>&& (PSR.FXP == 1));<br>tmp2[33:0] <- sext34(tmp[32:0]) + sext34(0x0_8000);<br>MHm:MLm <- sext64(tmp2[31:16]:16'b0);<br>MHm:MLm <- 0x0000_0000_7fff_0000, CFR.OVS <- 1,<br>if (tmp2[33:16] > 0x0_7fff[17:0]);<br>MHm:MLm <- 0xffff_ffff_8000_0000, CFR.OVS <- 1,<br>if (tmp2[33:16] < 0x3_8000[17:0]);<br>MHm:MLm <- UD, if (PSR.FXP == 1);<br>Rc <- MHm[15:0]:MLm[31:16],<br>if (reg#(Rc) != 30 && reg#(Rc) != 31);<br><br>Handle Ra, Rb and Rc as 16-bit values, and handle Mm as 32-bit value.<br>Perform fixed point multiplication for Ra and Rb. After this, round result from 32 bit down to 16 bit, and store it in Mm and Rc.<br>Saturate result if it cannot be represented by signed 16 bits. |

| Assembler mnemonic | Format | Affecting flag | Affected flag |
|---|---|---|---|
| fmulhhr Mm,Rc,Ra,Rb | 32bit | CFR.OVS | PSR.FXP |

| Remarks |
|---|
| This instruction is not implemented when PSR.FXP =1, and Mm and Rc are UD.<br><br>The lower 16 bits of Mm are always 0.<br><br>No writing is performed to Rc, when r30 or r31 is specified as Rc. |

Fig. 525 fmulhw Mm,Rc,Ra,Rb

| | |
|---|---|
| Behavior | **tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& (PSR.FXP ==0));<br>tmp[32:0] <- 0x0_ffff_ffff[32:0], CFR.OVS <- 1,<br>if ((Ra[15:0] == 0x8000 && Rb[15:0] == 0x8000)<br>&& (PSR.FXP ==1));<br>MHm:MLm <- sext64(tmp[31:0]);<br>MHm:MLm <- 0x0000_0000_7fff_ffff, CFR.OVS <- 1,<br>if (tmp[32:0] > 0x0_7fff_ffff);<br>MHm:MLm <- 0xffff_ffff_8000_0000, CFR.OVS <- 1,<br>if (tmp[32:0] < 0x1_8000_0000);<br>Rc <- MLm[31:0], if (reg#(Rc) != 30 && reg#(Rc) != 31);<br><br>Handle Ra and Rb as 16-bit values, and handle Mm and Rc as 32-bit values.<br>Perform fixed point multiplication for Ra and Rb. Store result in Mm and Rc. Saturate result if it cannot be represented by signed 32 bits.** |

| Assembler mnemonic | Format | Affecting flag | Affected flag |
|---|---|---|---|
| **fmulhw Mm,Rc,Ra,Rb** | 32bit | CFR.OVS | PSR.FXP |

| Remarks |
|---|
| No writing is performed to Rc, when r30 or r31 is specified as Rc. |

Fig. 526 fmulhww Mm,Rc,Ra,Rb

Behavior

```
tmp[48:0] <- sext49(smul(Ra[31:0],Rb[15:0]))<<FXP_SHIFT;
tmp[48:0] <- 0x0_7fff_ffff_ffff[48:0], CFR.OVS <- 1,
if ((Ra[31:0] == 0x8000_0000 && Rb[15:0] == 0x8000)
                              && (PSR.FXP ==0));
tmp[48:0] <- 0x0_ffff_ffff_ffff[48:0], CFR.OVS <- 1,
if ((Ra[31:0] == 0x8000_0000 && Rb[15:0] == 0x8000)
                              && (PSR.FXP ==1));
MHm:MLm <- sext64(tmp[47:0]);
MHm:MLm <- 0x0000_7fff_ffff_ffff, CFR.OVS <- 1,
                 if (tmp[48:0] > 0x0_7fff_ffff_ffff[48:0];
MHm:MLm <- 0xffff_8000_0000_0000, CFR.OVS <- 1,
                 if (tmp[48:0] < 0x1_8000_0000_0000[48:0];
Rc <- MHm[15:0]:MLm[31:16],
                 if (reg#(Rc) != 30 && reg#(Rc) != 31);
```

Handle Ra and Rc as 32-bit values, and handle Rb as 16-bit value. Perform fixed point multiplication for Ra and Rb. Store result in Mm and Rc. Saturate result if it cannot be represented by signed 48 bits.

| Assembler mnemonic | Format | Affecting flag | Affected flag |
|---|---|---|---|
| fmulhww Mm,Rc,Ra,Rb | 32bit | CFR.OVS | PSR.FXP |

| Remarks |
|---|
| No writing is performed to Rc, when r30 or r31 is specified as Rc. |

Fig. 527 mul Mm,Rc,Ra,Rb

| | |
|---|---|
| **Behavior** | **MHm:MLm <- smul(Ra,Rb);**<br>**Rc <- MLm[31:0], if (reg#(Rc) != 30 && reg#(Rc) != 31);**<br><br>**Perform integer multiplication for Ra and Rb. Store result in Mm and Rc.** |

| Assembler mnemonic | Format | Affecting flag | Affected flag |
|---|---|---|---|
| **mul Mm,Rc,Ra,Rb** | 32bit | — | — |

| Remarks |
|---|
| No writing is performed to Rc, when r30 or r31 is specified as Rc. |

Fig. 528 mul Mm,Rb,Ra,I8

| | | | | |
|---|---|---|---|---|
| Behavior | **MHm:MLm <- smul(Ra,sext(I8));**<br>**Rb <- MLm, if (reg#(Rb) != 30 && reg#(Rb) != 31);**<br><br>**Perform signed multiplication for Ra and immediate value (I8).** | | | |
| Assembler mnemonic | | Format | Affecting flag | Affected flag |
| **mul Mm,Rb,Ra,I8** | | 32bit | — | — |
| Remarks | | | | |
| I8 is a signed value.<br>No writing is performed to Rb, when r30 or r31 is specified as Rb. | | | | |

Fig. 529 mulu Mm,Rc,Ra,Rb

| | |
|---|---|
| Behavior | **MHm:MLm <- umul(Ra,Rb);**<br>**Rc <- MLm, if (reg#(Rc) != 30 && reg#(Rc) != 31);**<br><br>**Perform unsigned integer multiplication for Ra and Rb, and store result in Mm and Rc.** |

| Assembler mnemonic | Format | Affecting flag | Affected flag |
|---|---|---|---|
| **mulu Mm,Rc,Ra,Rb** | 32bit | — | — |

| Remarks |
|---|
| No writing is performed to Rc, when r30 or r31 is specified as Rc. |

Fig. 530 mulu Mm,Rb,Ra,I8

| | |
|---|---|
| Behavior | **MHm:MLm <- umul(Ra,uext(I8));**<br>**Rb <- MLm, if (reg#(Rb) != 30 && reg#(Rb) != 31);**<br><br>**Perform unsigned multiplication for Ra and immediate value (I8).** |

| Assembler mnemonic | Format | Affecting flag | Affected flag |
|---|---|---|---|
| **mulu Mm,Rb,Ra,I8** | 32bit | — | — |

| Remarks |
|---|
| I8 is an unsigned value.<br>No writing is performed to Rb, when r30 or r31 is specified as Rb. |

Fig. 531 fmulww Mm,Rc,Ra,Rb

| | |
|---|---|
| Behavior | **tmp[64:0] <- sext65(smul(Ra,Rb)) << FXP_SHIFT;<br>tmp[64:0] <- 0x0_7fff_ffff_ffff_ffff, CFR.OVS <- 1,<br>if ((Ra == 0x8000_0000 && Rb == 0x8000_0000)<br>&& (PSR.FXP == 0));<br>tmp[64:0] <- 0x0_ffff_ffff_ffff_ffff, CFR.OVS <- 1,<br>if ((Ra == 0x8000_0000 && Rb == 0x8000_0000)<br>&& (PSR.FXP == 1));<br>MHm:MLm <- tmp[63:0];<br>MHm:MLm <- 0x7fff_ffff_ffff_ffff, CFR.OVS <- 1,<br>if (tmp[64:0] > 0x0_7fff_ffff_ffff_ffff[64:0]);<br>MHm:MLm <- 0x8000_0000_0000_0000, CFR.OVS <- 1,<br>if (tmp[64:0] < 0x1_8000_0000_0000_0000[64:0]);<br>Rc <- MHm[31:0], if (reg#(Rc) != 30 && reg#(Rc) != 31);<br><br>Handle Ra, Rb and Rc as 32-bit values, and handle Mm as 64-bit value.<br>Perform fixed point multiplication for Ra and Rb. Store result in Mm and Rc. Saturate result if it cannot be represented by signed 64 bits.** |

| Assembler mnemonic | Format | Affecting flag | Affected flag |
|---|---|---|---|
| **fmulww Mm,Rc,Ra,Rb** | 32bit | CFR.OVS | PSR.FXP |

| Remarks |
|---|
| No writing is performed to Rc, when r30 or r31 is specified as Rc. |

Fig. 532 hmac Mm,Rc,Ra,Rb,Mn

| | |
|---|---|
| Behavior | **MHm:MLm <- smul(Ra,sext(Rb[31:16])) + MHn:MLn;**<br>**Rc <- MLm, if (reg#(Rc) != 30 && reg#(Rc) != 31);**<br><br>**Handle Rb in half word vector format.**<br>**Perform integer multiplication for higher 16 bits of Ra and Rb, and add result to Mn. Store result in Mm and Rc.** |

| Assembler mnemonic | Format | Affecting flag | Affected flag |
|---|---|---|---|
| **hmac Mm,Rc,Ra,Rb,Mn** | 32bit | — | — |

| Remarks |
|---|
| No writing is performed to Rc, when r30 or r31 is specified as Rc. |

Fig. 533 hmac M0,Rc,Ra,Rb,Rx

| Behavior | **MH0:ML0 <- sext64(Rx) + smul(Ra,sext(Rb[31:16]));**<br>**Rc <- ML0, if (reg#(Rc) != 30 && reg#(Rc) != 31);**<br><br>**Handle Rb in half word vector format.**<br>**Perform integer multiplication for higher 16 bits of Ra and Rb, and add result to Rx. Store result in M0 and Rc.** |
|---|---|

| Assembler mnemonic | Format | Affecting flag | Affected flag |
|---|---|---|---|
| **hmac M0,Rc,Ra,Rb,Rx** | 32bit | – | – |

| Remarks |
|---|
| No writing is performed to Rc, when r30 or r31 is specified as Rc. |

Fig. 534 lmac Mm,Rc,Ra,Rb,Mn

| | |
|---|---|
| Behavior | **MHm:MLm <- smul(Ra,sext(Rb[15:0])) + MHn:MLn;**<br>**Rc <- MLm, if (reg#(Rc) != 30 && reg#(Rc) != 31);**<br><br>**Handle Rb in half word vector format.**<br>**Perform integer multiplication for lower 16 bits of Ra and Rb, and add result to Mn. Store result in Mm and Rc.** |

| Assembler mnemonic | Format | Affecting flag | Affected flag |
|---|---|---|---|
| **lmac Mm,Rc,Ra,Rb,Mn** | 32bit | — | — |

| Remarks |
|---|
| No writing is performed to Rc, when r30 or r31 is specified as Rc. |

Fig. 535 lmac M0,Rc,Ra,Rb,Rx

| | |
|---|---|
| Behavior | **MH0:ML0 <- sext64(Rx) + smul(Ra,sext(Rb[15: 0]));**<br>**Rc <- ML0, if (reg#(Rc) != 30 && reg#(Rc) != 31);**<br><br>**Handle Rb in half word vector format.**<br>**Perform integer multiplication for lower 16 bits of Ra and Rb, and add result to Rx. Store result in M0 and Rc.** |

| Assembler mnemonic | Format | Affecting flag | Affected flag |
|---|---|---|---|
| **lmac M0,Rc,Ra,Rb,Rx** | 32bit | — | — |

| Remarks |
|---|
| No writing is performed to Rc, when r30 or r31 is specified as Rc. |

Fig. 536 fmachh Mm,Rc,Ra,Rb,Mn

| | |
|---|---|
| Behavior | tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& PSR.FXP == 0));<br>tmp[32:0] <- 0x0_ffff_ffff[32:0], CFR.OVS <- 1,<br>if ((Ra[15:0] == 0x8000 && Rb[15:0] == 0x8000)<br>&& PSR.FXP == 1));<br>tmp2[33:0] <- MHn[1:0]:MLn + sext34(tmp[31:0]);<br>MHm:MLm <- sext64(tmp2[31:0]);<br>MHm:MLm <- 0x0000_0000_7fff_ffff, CFR.OVS <- 1,<br>if (tmp2[33:0] > 0x0_7fff_ffff[33:0]);<br>MHm:MLm <- 0xffff_ffff_8000_0000, CFR.OVS <- 1,<br>if (tmp2[33:0] < 0x3_8000_0000[33:0]);<br>Rc <- MHm[15:0]:MLm[31:16],<br>if (reg#(Rc) != 30 && reg#(Rc) != 31);<br><br>Handle Ra, Rb and Rc as 16-bit values, and handle Mm and Mn as 32-bit values.<br>Perform fixed point multiplication for Ra and Rb, and add result to Mn. Store result in Mm and Rc. Saturate result if it cannot be represented by signed 32 bits. |

| Assembler mnemonic | Format | Affecting flag | Affected flag |
|---|---|---|---|
| fmachh Mm,Rc,Ra,Rb,Mn | 32bit | CFR.OVS | PSR.FXP |

| Remarks |
|---|
| No writing is performed to Rc, when r30 or r31 is specified as Rc. |

Fig. 537 fmachh M0,Rc,Ra,Rb,Rx

| | |
|---|---|
| Behavior | tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[15:0] == 0x8000)<br>&& (PSR.FXP == 1));<br>tmp2[33:0] <- (sext34(Rx[15:0])<<16) + sext34(tmp[31:0])<br>MH0:ML0 <- sext64(tmp2[31:0]);<br>MH0:ML0 <- 0x0000_0000_7fff_ffff, CFR.OVS <- 1,<br>if (tmp2[33:0] > 0x0_7fff_ffff[33:0]);<br>MH0:ML0 <- 0xffff_ffff_8000_0000, CFR.OVS <- 1,<br>if (tmp2[33:0] < 0x3_8000_0000[33:0]);<br>Rc <- MH0[15:0]:ML0[31:16], if (reg#(Rc) != 30 && reg#(Rc) != 31);<br><br>Handle Ra, Rb and Rc as 16-bit values, and handle M0 and Rx as 32-bit values.<br>Perform fixed point multiplication for Ra and Rb, and add result to Rx. Store result in M0 and Rc. Saturate result if it cannot be represented by signed 32 bits. |

| Assembler mnemonic | Format | Affecting flag | Affected flag |
|---|---|---|---|
| fmachh M0,Rc,Ra,Rb,Rx | 32bit | CFR.OVS | PSR.FXP |

| Remarks |
|---|
| No writing is performed to Rc, when r30 or r31 is specified as Rc. |

Fig. 538 fmachhr Mm,Rc,Ra,Rb,Mn

Behavior

```
tmp[32:0] <- sext33(smul(Ra[15:0],Rb[15:0]))<<FXP_SHIFT;
tmp[32:0] <- 0x0_7fff_ffff[32:0], CFR.OVS <- 1,
                  if ((Ra[15:0] == 0x8000 && Rb[15:0] == 0x8000)
                                    && PSR.FXP == 0));
tmp[32:0] <- 0x0_ffff_ffff[32:0], CFR.OVS <- 1,
                  if ((Ra[15:0] == 0x8000 && Rb[15:0] == 0x8000)
                                    && PSR.FXP == 1));
tmp2[34:0] <- MHn[2:0]:MLn + sext35(tmp[31:0])
                                    + sext35(0x0_8000);
MHm:MLn = sext64(tmp2[31:16]:16'b0);
MHm:MLn <- 0x0000_0000_7fff_0000, CFR.OVS <- 1,
                  if (tmp2[34:16] > 0x0_7fff[18:0]);
MHm:MLn <- 0xffff_ffff_8000_0000, CFR.OVS <- 1,
                  if (tmp2[34:16] < 0x7_8000[18:0]);
MHm:MLn = UD, if (PSR.FXP == 1);
Rc <- MHm[15:0]:MLm[31:16],
                  if (reg#(Rc) != 30 && reg#(Rc) != 31);
```

Handle Ra, Rb and Rc as 16-bit values, and handle Mm and Mn as 32-bit values.

Perform fixed point multiplication for Ra and Rb, and add result to Mn. After this, round result from 32 bits down to 16 bits, and store it in Mm and Rc. Saturate result if it cannot be represented by signed 16 bits.

| Assembler mnemonic | Format | Affecting flag | Affected flag |
|---|---|---|---|
| fmachhr Mm,Rc,Ra,Rb,Mn | 32bit | CFR.OVS | PSR.FXP |

Remarks

This instruction is not implemented when PSR.FXP =1, and Mm and Rc are UD.

The lower 16 bits of Mm are always 0.

No writing is performed to Rc, when r30 or r31 is specified as Rc.

Fig. 539 fmachhr M0,Rc,Ra,Rb,Rx

Behavior

```
tmp[32:0] <- sext33(smul(Ra[15:0],Rb[15:0]))<< FXP_SHIFT;
tmp[32:0] <- 0x0_7fff_ffff[32:0], CFR.OVS <- 1,
                    if ((Ra[15:0] == 0x8000 && Rb[15:0] == 0x8000)
                              && (PSR.FXP ==0));
tmp[32:0] <- 0x0_ffff_ffff[32:0], CFR.OVS <- 1,
                    if ((Ra[15:0] == 0x8000 && Rb[15:0] == 0x8000)
                              && (PSR.FXP ==1));
tmp2[34:0] <- (sext35(Rx[15:0])<<16) + sext35(tmp[32:0])
                                     + sext35(0x0_8000);
MH0:ML0 <- sext64(tmp2[31:16]:16'b0);
MH0:ML0 <- 0x0000_0000_7fff_0000, CFR.OVS <- 1,
                    if (tmp2[34:16] > 0x0_7fff[18:0]);
MH0:ML0 <- 0xffff_ffff_8000_0000, CFR.OVS <- 1,
                    if (tmp2[34:16] < 0x7_8000[18:0]);
MH0:ML0 <- UD, if (PSR.FXP == 1);
Rc <- MH0[15:0]:ML0[31:16], if (reg#(Rc) != 30 && reg#(Rc) != 31);
```

Handle Ra, Rb and Rc as 16-bit values, and handle M0 and Rx as 32-bit values.
Perform fixed point multiplication for Ra and Rb, and add result to Rx. After this, round result from 32 bits down to 16 bits, and store it in M0 and Rc. Saturate result if it cannot be represented by signed 16 bits.

| Assembler mnemonic | Format | Affecting flag | Affected flag |
|---|---|---|---|
| **fmachhr M0,Rc,Ra,Rb,Rx** | 32bit | CFR.OVS | PSR.FXP |

Remarks

This instruction is not implemented when PSR.FXP =1, and Mm and Rc are UD.

The lower 16 bits of Mm are always 0.

No writing is performed to Rc, when r30 or r31 is specified as Rc.

Fig. 540 fmachw Mm,Rc,Ra,Rb,Mn

| | |
|---|---|
| Behavior | tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[15:0] == 0x8000)<br>&& (PSR.FXP == 1));<br>tmp2[33:0] <- MHn[1:0]:MLn + sext34(tmp[32:0]);<br>MHm:MLm <- sext64(tmp2[31:0]);<br>MHm:MLm <- 0x0000_0000_7fff_ffff, CFR.OVS <- 1,<br>if (tmp2[33:0] > 0x0_7fff_ffff[33:0]);<br>MHm:MLm <- 0xffff_ffff_8000_0000, CFR.OVS <- 1,<br>if (tmp2[33:0] < 0x3_8000_0000[33:0]);<br>Rc <- MLm, if (reg#(Rc) != 30 && reg#(Rc) != 31);<br><br>Handle Ra and Rb as 16-bit values, and handle Mm, Mn and Rc as 32-bit values.<br>Perform fixed point multiplication for Ra and Rb, and add result to Mn. Store result in Mm and Rc. Saturate result if it cannot be represented by signed 32 bits. |

| Assembler mnemonic | Format | Affecting flag | Affected flag |
|---|---|---|---|
| fmachw Mm,Rc,Ra,Rb,Mn | 32bit | CFR.OVS | PSR.FXP |

| Remarks |
|---|
| No writing is performed to Rc, when r30 or r31 is specified as Rc. |

Fig. 541 fmachw M0,Rc,Ra,Rb,Rx

| | |
|---|---|
| Behavior | **tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[15:0] == 0x8000)<br>&& (PSR.FXP == 1));<br>tmp2[33:0] <- sext34(Rx) + sext34(tmp[32:0]);<br>MH0:ML0 <- sext64(tmp[31:0]);<br>MH0:ML0 <- 0x0000_0000_7fff_ffff, CFR.OVS <- 1,<br>if (tmp2[33:0] > 0x0_7fff_ffff[33:0]);<br>MH0:ML0 <- 0xffff_ffff_8000_0000, CFR.OVS <- 1,<br>if (tmp2[33:0] < 0x3_8000_0000[33:0]);<br>Rc <- ML0, if (reg#(Rc) != 30 && reg#(Rc) != 31);<br><br>Handle Ra and Rb as 16-bit values, and handle M0, Rx and Rc as 32-bit values.<br>Perform fixed point multiplication for Ra and Rb, and add result to Rx. Store result in M0 and Rc. Saturate result if it cannot be represented by signed 32 bits.** |

| Assembler mnemonic | Format | Affecting flag | Affected flag |
|---|---|---|---|
| **fmachw M0,Rc,Ra,Rb,Rx** | 32bit | CFR.OVS | PSR.FXP |

| Remarks |
|---|
| No writing is performed to Rc, when r30 or r31 is specified as Rc. |

Fig. 542 fmachww Mm,Rc,Ra,Rb,Mn

| | |
|---|---|
| Behavior | tmp[48:0] <- sext49(smul(Ra[31:0],Rb[15:0]))<<FXP_SHIFT<br>tmp[48:0] <- 0x0_7fff_ffff_ffff[48:0], CFR.OVS <- 1,<br>if ((Ra[31:0] == 0x8000_0000 && Rb[15:0] == 0x8000)<br>&& ( PSR.FXP == 0 ));<br>tmp[48:0] <- 0x0_ffff_ffff_ffff[48:0], CFR.OVS <- 1,<br>if ((Ra[31:0] == 0x8000_0000 && Rb[15:0] == 0x8000)<br>&& ( PSR.FXP == 1 ));<br>tmp2[49:0] <- MHn[17:0]:MLn + sext50(tmp[48:0]);<br>MHm:MLm <- sext64(tmp2[47:0]);<br>MHm:MLm <- 0x0000_7fff_ffff_ffff, CFR.OVS <- 1,<br>if (tmp2[49:0] > 0x0_7fff_ffff_ffff[49:0]);<br>MHm:MLm <- 0xffff_8000_0000_0000, CFR.OVS <- 1,<br>if (tmp2[49:0] < 0x3_8000_0000_0000[49:0]);<br>Rc <- MHm[15:0]:MLm[31:16],<br>if (reg#(Rc) != 30 && reg#(Rc) != 31);<br><br>Handle Ra and Rc as 32-bit values, and handle Rb as 16-bit value. Perform fixed point multiplication for Ra and Rb, and add result to Mn. Store result in Mm and Rc. Saturate result if it cannot be represented by signed 48 bits. |

| Assembler mnemonic | Format | Affecting flag | Affected flag |
|---|---|---|---|
| fmachww Mm,Rc,Ra,Rb,Mn | 32bit | CFR.OVS | PSR.FXP |

| Remarks |
|---|
| No writing is performed to Rc, when r30 or r31 is specified as Rc. |

Fig. 543 fmachww M0,Rc,Ra,Rb,Rx

Behavior

```
tmp[48:0] <- sext49(smul(Ra[31:0],Rb[15:0]))<<FXP_SHIFT
tmp[48:0] <- 0x0_7fff_ffff_ffff[48:0], CFR.OVS <- 1,
if ((Ra[31:0] == 0x8000_0000 && Rb[15:0] == 0x8000)
                                    && (PSR.FXP == 0));
tmp[48:0] <- 0x0_ffff_ffff_ffff[48:0], CFR.OVS <- 1,
if ((Ra[31:0] == 0x8000_0000 && Rb[15:0] == 0x8000)
                                    && (PSR.FXP == 1));
tmp2[49:0] <- (sext50(Rx)<<16) + sext50(tmp[48:0]);
MH0:ML0 <- sext64(tmp2[47:0]);
MH0:ML0 <- 0x0000_7fff_ffff_ffff, CFR.OVS <- 1,
                     if (tmp2[49:0] > 0x0_7fff_ffff_ffff[49:0]);
MH0:ML0 <- 0xffff_8000_0000_0000, CFR.OVS <- 1,
                     if (tmp2[49:0] < 0x3_8000_0000_0000[49:0]);
Rc <- MH0[15:0]:ML0[31:16], if (reg#(Rc) != 30 && reg#(Rc) != 31);
```

Handle Ra, Rc and Rx as 32-bit values, and handle M0 as 48-bit value.
Perform fixed point multiplication for Ra and Rb, and add result to Rx. Store result in M0 and Rc. Saturate result if it cannot be represented by signed 48 bits.

| Assembler mnemonic | Format | Affecting flag | Affected flag |
|---|---|---|---|
| **fmachww M0,Rc,Ra,Rb,Rx** | 32bit | CFR.OVS | PSR.FXP |

Remarks

No writing is performed to Rc, when r30 or r31 is specified as Rc.

Fig. 544 mac Mm,Rc,Ra,Rb,Mn

| | |
|---|---|
| Behavior | **MHm:MLm <- smul(Ra,Rb) + MHn:MLn;**<br>**Rc <- MLm, if (reg#(Rc) != 30 && reg#(Rc) != 31);**<br><br>**Perform integer multiplication for Ra and Rb, and add result to Mn. Store result in Mm and Rc.** |

| Assembler mnemonic | Format | Affecting flag | Affected flag |
|---|---|---|---|
| **mac Mm,Rc,Ra,Rb,Mn** | 32bit | — | — |

| Remarks |
|---|
| Writing to Rc is not performed when r30 or r31 is specified as Rc. |

Fig. 545 mac M0,Rc,Ra,Rb,Rx

| | |
|---|---|
| Behavior | **MH0:ML0 <- sext64(Rx) + smul(Ra,Rb);**<br>**Rc <- ML0, if (reg#(Rc) != 30 && reg#(Rc) != 31);**<br><br>**Perform integer multiplication for Ra and Rb, and add result to Rx. Store result in M0 and Rc.** |

| Assembler mnemonic | Format | Affecting flag | Affected flag |
|---|---|---|---|
| **mac M0,Rc,Ra,Rb,Rx** | 32bit | — | — |

| Remarks |
|---|
| Writing to Rc is not performed when r30 or r31 is specified as Rc. |

Fig. 546 fmacww Mm,Rc,Ra,Rb,Mn

| | |
|---|---|
| Behavior | tmp[64:0] <- sext65(smul(Ra,Rb)) << FXP_SHIFT;<br>tmp[64:0] <- 0x0_7fff_ffff_ffff_ffff[64:0], CFR.OVS <- 1<br>if ((Ra == 0x8000_0000 && Rb == 0x8000_0000)<br>&& (PSR.FXP == 0));<br>tmp[64:0] <- 0x0_ffff_ffff_ffff_ffff[64:0], CFR.OVS <- 1<br>if ((Ra == 0x8000_0000 && Rb == 0x8000_0000)<br>&& (PSR.FXP == 1));<br>tmp2[65:0] <- sext66(MHn:MLn) + sext66(tmp[64:0]);<br>MHm:MLm <- tmp2[63:0];<br>MHm:MLm <- 0x7fff_ffff_ffff_ffff, CFR.OVS <- 1,<br>if (tmp2[65:0] > 0x0_7fff_ffff_ffff_ffff[65:0]);<br>MHm:MLm <- 0x8000_0000_0000_0000, CFR.OVS <- 1,<br>if (tmp2[65:0] < 0x3_8000_0000_0000_0000[65:0]);<br>Rc <- MHm, if (reg#(Rc) != 30 && reg#(Rc) != 31);<br><br>Handle Ra and Rc as 32-bit values, handle Rb as 16-bit value, and handle Mm and Mn as 48-bit values.<br>Perform fixed point multiplication for Ra and Rb, and add result to Mn. Store result in Mm and Rc. Saturate result if it cannot be represented by signed 48 bits. |

| Assembler mnemonic | Format | Affecting flag | Affected flag |
|---|---|---|---|
| fmacww Mm,Rc,Ra,Rb,Mn | 32bit | CFR.OVS | PSR.FXP |

| Remarks |
|---|
| Writing to Rc is not performed when r30 or r31 is specified as Rc. |

Fig. 547 fmacww M0,Rc,Ra,Rb,Rx

| | |
|---|---|
| Behavior | tmp[64:0] <- sext65(smul(Ra,Rb))<<FXP_SHIFT;<br>tmp[64:0] <- 0x0_7fff_ffff_ffff_ffff[64:0], CFR.OVS <- 1,<br>if ((Ra == 0x8000_0000 && Rb == 0x8000_0000)<br>&& (PSR.FXP == 0));<br>tmp[64:0] <- 0x0_ffff_ffff_ffff_ffff[64:0], CFR.OVS <- 1,<br>if ((Ra == 0x8000_0000 && Rb == 0x8000_0000)<br>&& (PSR.FXP == 1));<br>tmp2[65:0] <- (sext66(Rx)<<32) + sext66(tmp[64:0]);<br>MH0:ML0 <- tmp2[63:0];<br>MH0:ML0 <- 0x7fff_ffff_ffff_ffff, CFR.OVS <- 1,<br>if (tmp2[65:0] > 0x0_7fff_ffff_ffff_ffff[65:0]);<br>MH0:ML0 <- 0x8000_0000_0000_0000, CFR.OVS <- 1,<br>if (tmp2[65:0] < 0x3_8000_0000_0000_0000[65:0]);<br>Rc <- MH0, if (reg#(Rc) != 30 && reg#(Rc) != 31);<br><br>Handle Rb as 16-bit value, and handle M0 as 64-bit value. Perform fixed point multiplication for Ra and Rb, and add result to Rx. Store result in M0 and Rc. Saturate result if it cannot be represented by signed 64 bits. |

| Assembler mnemonic | Format | Affecting flag | Affected flag |
|---|---|---|---|
| fmacww M0,Rc,Ra,Rb,Rx | 32bit | CFR.OVS | PSR.FXP |

| Remarks |
|---|
| Writing to Rc is not performed when r30 or r31 is specified as Rc. |

Fig. 548 hmsu Mm,Rc,Ra,Rb,Mn

| | | | |
|---|---|---|---|
| Behavior | MHm:MLm <- MHn:MLn - smul(Ra,sext(Rb[31:16]));<br>Rc <- MLm, if (reg#(Rc) != 30 && reg#(Rc) != 31);<br><br>Handle Rb in half word vector format.<br>Perform integer multiplication for higher 16 bits of Ra and Rb, and subtract result from Mn. Store result in Mm and Rc. | | |

| Assembler mnemonic | Format | Affecting flag | Affected flag |
|---|---|---|---|
| hmsu Mm,Rc,Ra,Rb,Mn | 32bit | — | — |

| Remarks |
|---|
| Writing to Rc is not performed when r30 or r31 is specified as Rc. |

Fig. 549 hmsu M0,Rc,Ra,Rb,Rx

| | |
|---|---|
| Behavior | **MH0:ML0 <- sext64(Rx) - smul(Ra,sext(Rb[31:16]));**<br>**Rc <- ML0, if (reg#(Rc) != 30 && reg#(Rc) != 31);**<br><br>**Handle Rb in half word vector format.**<br>**Perform integer multiplication for higher 16 bits of Ra and Rb, and subtract result from Rx. Store result in M0 and Rc.** |

| Assembler mnemonic | Format | Affecting flag | Affected flag |
|---|---|---|---|
| **hmsu M0,Rc,Ra,Rb,Mn** | 32bit | — | — |

| Remarks |
|---|
| Writing to Rc is not performed when r30 or r31 is specified as Rc. |

Fig. 550 lmsu Mm,Rc,Ra,Rb,Mn

| | |
|---|---|
| Behavior | **MHm:MLm <- MHn:MLn - smul(Ra,sext(Rb[15:0]));**<br>**Rc <- MLm, if (reg#(Rc) != 30 && reg#(Rc) != 31);**<br><br>**Handle Rb in half word vector format.**<br>**Perform integer multiplication for higher 16 bits of Ra and Rb, and subtract result from Mn. Store result in Mm and Rc.** |

| Assembler mnemonic | Format | Affecting flag | Affected flag |
|---|---|---|---|
| **lmsu Mm,Rc,Ra,Rb,Mn** | 32bit | — | — |

| Remarks |
|---|
| Writing to Rc is not performed when r30 or r31 is specified as Rc. |

Fig. 551 lmsu M0,Rc,Ra,Rb,Rx

| | | | | |
|---|---|---|---|---|
| Behavior | **MH0:ML0 <- sext64(Rx) - smul(Ra,sext(Rb[15: 0]));**<br>**Rc <- ML0, if (reg#(Rc) != 30 && reg#(Rc) != 31);**<br><br>**Handle Rb in half word vector format.**<br>**Perform integer multiplication for higher 16 bits of Ra and Rb, and subtract result from Rx. Store result in M0 and Rc.** | | | |
| Assembler mnemonic | Format | Affecting flag | Affected flag | |
| **lmsu M0,Rc,Ra,Rb,Rx** | 32bit | — | — | |
| Remarks | | | | |
| Writing to Rc is not performed when r30 or r31 is specified as Rc. | | | | |

Fig. 552 fmsuhh Mm,Rc,Ra,Rb,Mn

Behavior

```
tmp[32:0] <- sext33(smul(Ra[15:0],Rb[15:0]))<<FXP_SHIFT;
tmp[32:0] <- 0x0_7fff_ffff[32:0], CFR.OVS <- 1,
                    if ((Ra[15:0] == 0x8000 && Rb[15:0] == 0x8000)
                              && ( PSR.FXP == 0));
tmp[32:0] <- 0x0_ffff_ffff[32:0], CFR.OVS <- 1,
                    if ((Ra[15:0] == 0x8000 && Rb[15:0] == 0x8000)
                              && ( PSR.FXP == 1));
tmp2[33:0] <- MHn[1:0]:MLn - sext34(tmp[32:0]);
MHm:MLm <- sext64(tmp2[33:0]);
MHm:MLm <- 0x0000_0000_7fff_ffff, CFR.OVS <- 1,
                    if (tmp2[33:0] > 0x0_7fff_ffff[33:0]);
MHm:MLm <- 0xffff_ffff_8000_0000, CFR.OVS <- 1,
                    if (tmp2[33:0] < 0x3_8000_0000[33:0]);
Rc <- MHm[15:0]:MLm[31:16],
                    if (reg#(Rc) != 30 && reg#(Rc) != 31);
```

Handle Ra, Rb and Rc as 16-bit values, and handle Mm and Mn as 32-bit values.
Perform fixed point multiplication for Ra and Rb, and subtract result from Mn. Store result in Mm and Rc. Saturate result if it cannot be represented by signed 32 bits.

| Assembler mnemonic | Format | Affecting flag | Affected flag |
|---|---|---|---|
| **fmsuhh Mm,Rc,Ra,Rb,Mn** | 32bit | CFR.OVS | PSR.FXP |

Remarks

Writing to Rc is not performed when r30 or r31 is specified as Rc.

Fig. 553 fmsuhh M0,Rc,Ra,Rb,Rx

| | |
|---|---|
| Behavior | tmp[32:0] <- sext33(smul(Ra[15:0],Rb[15:0]))<<FXP_SHIFT;<br>tmp[32:0] <- 0x0_7fff_ffff, CFR.OVS <- 1,<br>if ((Ra[15:0] == 0x8000 && Rb[15:0] == 0x8000)<br>&& (PSR.FXP ==0));<br>tmp[32:0] <- 0x0_ffff_ffff, CFR.OVS <- 1,<br>if ((Ra[15:0] == 0x8000 && Rb[15:0] == 0x8000)<br>&& (PSR.FXP ==1));<br>tmp2[33:0] <- (sext34(Rx[15:0])<<16) - sext34(tmp[32:0])<br>MH0:ML0 <- sext64(tmp2[31:0]);<br>MH0:ML0 <- 0x0000_0000_7fff_ffff, CFR.OVS <- 1,<br>if (tmp2[33:0] > 0x0_7fff_ffff[33:0]);<br>MH0:ML0 <- 0xffff_ffff_8000_0000, CFR.OVS <- 1,<br>if (tmp2[33:0] < 0x3_8000_0000[33:0]);<br>Rc <- MH0[15:0]:ML0[31:16], if (reg#(Rc) != 30 && reg#(Rc) != 31);<br><br>Handle Ra, Rb and Rc as 16-bit value, and handle M0 and Rx as 32-bit value.<br>Perform fixed point multiplication for Ra and Rb, and subtract result from Rx. Store result in Mm and Rc. Saturate result if it cannot be represented by signed 32 bits. |

| Assembler mnemonic | Format | Affecting flag | Affected flag |
|---|---|---|---|
| fmsuhh M0,Rc,Ra,Rb,Rx | 32bit | CFR.OVS | PSR.FXP |

| Remarks |
|---|
| Writing to Rc is not performed when r30 or r31 is specified as Rc. |

Fig. 554 fmsuhhr Mm,Rc,Ra,Rb,Mn

| | |
|---|---|
| Behavior | tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& ( PSR.FXP == 0));<br>tmp[32:0] <- 0x0_ffff_ffff[32:0], CFR.OVS <- 1,<br>if ((Ra[15:0] == 0x8000 && Rb[15:0] == 0x8000)<br>&& ( PSR.FXP == 1));<br>tmp2[34:0] <- MHn[2:0]:MLn - sext35(tmp[32:0])<br>+ sext35(0x0_8000);<br>MHm:MLn <- sext64(tmp2[31:16]:16'b0);<br>MHm:MLn <- 0x0000_0000_7fff_0000, CFR.OVS <- 1,<br>if (tmp2[34:16] > 0x0_7fff[18:0]);<br>MHm:MLn <- 0xffff_ffff_8000_0000, CFR.OVS <- 1,<br>if (tmp2[34:16] < 0x7_8000[18:0]);<br>MHm:MLn <- UD, if ( PSR.FXP == 1 );<br>Rc <- MHm[15:0]:MLm[31:16],<br>if (reg#(Rc) != 30 && reg#(Rc) != 31);<br><br>Handle Ra, Rb and Rc as 16-bit values, and handle Mm and Mn as 32-bit values. Perform fixed point multiplication for Ra and Rb, and subtract result from Mn. Store result in M0 and Rc. After this, round result from 32 bits down to 16 bits, and store it in Mm and Rc. Saturate result if it cannot be represented by signed 16 bits. |

| Assembler mnemonic | Format | Affecting flag | Affected flag |
|---|---|---|---|
| **fmsuhhr Mm,Rc,Ra,Rb,Mn** | 32bit | CFR.OVS | PSR.FXP |

| Remarks |
|---|
| This instruction is not implemented when PSR.FXP == 1, and Mm and Rc are UD.<br>The lower 16 bits of Mm are always 0.<br>Writing to Rc is not performed when r30 or r31 is specified as Rc. |

Fig. 555 fmsuhhr M0,Rc,Ra,Rb,Rx

<table>
<tr><td>Behavior</td><td colspan="3">

```
tmp[32:0] <- sext33(smul(Ra[15:0],Rb[15:0]))<<FXP_SHIFT;
tmp[32:0] <- 0x7fff_ffff[32:0], CFR.OVS <- 1,
                if ((Ra[15:0] == 0x8000 && Rb[15:0] == 0x8000)
                        && (PSR.FXP == 0));
tmp[32:0] <- 0xffff_ffff[32:0], CFR.OVS <- 1,
                if ((Ra[15:0] == 0x8000 && Rb[15:0] == 0x8000)
                        && (PSR.FXP == 1));
tmp2[34:0] <- (sext35(Rx[15:0])<<16) - sext35(tmp[32:0])
                                + sext35(0x0_8000);
MH0:ML0 <- sext64(tmp2[31:16]:16'b0);
MH0:ML0 <- 0x0000_0000_7fff_0000, CFR.OVS <- 1,
                if (tmp3[34:16] > 0x0_7fff[18:0]);
MH0:ML0 <- 0xffff_ffff_8000_0000, CFR.OVS <- 1,
                if (tmp2[34:16] < 0x7_8000[18:0]);
MH0:ML0 <- UD, if (PSR.FXP == 1);
Rc <- MH0[15:0]:ML0[31:16], if (reg#(Rc) != 30 && reg#(Rc) != 31);
```

Handle Ra, Rb and Rc as 16-bit values, and handle M0 and Rx as 32-bit values.<br>Perform fixed point multiplication for Ra and Rb, and subtract result from Rx. After this, round result from 32 bits down to 16 bits, and store it in M0 and Rc. Saturate result if it cannot be represented by signed 16 bits.</td></tr>
<tr><td>Assembler mnemonic</td><td>Format</td><td>Affecting flag</td><td>Affected flag</td></tr>
<tr><td>fmsuhhr M0,Rc,Ra,Rb,Rx</td><td>32bit</td><td>CFR.OVS</td><td>PSR.FXP</td></tr>
<tr><td colspan="4">Remarks</td></tr>
<tr><td colspan="4">This instruction is not implemented when PSR.FXP == 1, and Mm and Rc are UD.<br><br>The lower 16 bits of M0 are always 0.<br><br>Writing to Rc is not performed when r30 or r31 is specified as Rc.</td></tr>
</table>

Fig. 556 fmsuhw Mm,Rc,Ra,Rb,Mn

Behavior

```
tmp[32:0] <- sext33(smul(Ra[15:0],Rb[15:0]))<<FXP_SHIFT;
tmp[32:0] <- 0x0_7fff_ffff[32:0], CFR.OVS <- 1,
if ((Ra[15:0] == 0x8000 && Rb[15:0] == 0x8000)
                                && ( PSR.FXP == 0 ));
tmp[32:0] <- 0x0_ffff_ffff[32:0], CFR.OVS <- 1,
if ((Ra[15:0] == 0x8000 && Rb[15:0] == 0x8000)
                                && ( PSR.FXP == 1 ));
tmp2[33:0] <- MHn[1:0]:MLn - sext34(tmp[31:0]);
MHm:MLm <- sext64(tmp2[33:0]);
MHm:MLm <- 0x0000_0000_7fff_ffff, CFR.OVS <- 1,
                 if (tmp2[33:0] > 0x0_7fff_ffff[33:0]);
MHm:MLm <- 0xffff_ffff_8000_0000, CFR.OVS <- 1,
                 if (tmp2[33:0] < 0x3_8000_0000[33:0]);
Rc <- MLm, if (reg#(Rc) != 30 && reg#(Rc) != 31);
```

Handle Ra and Rc as 16-bit values, and handle Mm, Mn and Rc as 32-bit values.
Perform fixed point multiplication for Ra and Rb, and subtract result from Mn. Store result in Mm and Rc. Saturate result if it cannot be represented by signed 32 bits.

| Assembler mnemonic | Format | Affecting flag | Affected flag |
|---|---|---|---|
| fmsuhw Mm,Rc,Ra,Rb,Mn | 32bit | CFR.OVS | PSR.FXP |

| Remarks |
|---|
| Writing to Rc is not performed when r30 or r31 is specified as Rc. |

Fig. 557 fmsuhw M0,Rc,Ra,Rb,Rx

| | |
|---|---|
| Behavior | tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[15:0] == 0x8000)<br>&& (PSR.FXP == 1));<br>tmp2[33:0] <- sext34(Rx) - sext34(tmp[31:0]);<br>MH0:ML0 <- sext64(tmp[31:0]);<br>MH0:ML0 <- 0x0000_0000_7fff_ffff, CFR.OVS <- 1,<br>if (tmp2[33:0] > 0x0_7fff_ffff[33:0]);<br>MH0:ML0 <- 0xffff_ffff_8000_0000, CFR.OVS <- 1,<br>if (tmp2[33:0] <<br>0x3_8000_0000[33:0]);<br>Rc <- ML0, if (reg#(Rc) != 30 && reg#(Rc) != 31);<br><br>Handle Ra and Rb as 16-bit values, and handle M0, Rc and Rx as 32-bit values.<br>Perform fixed point multiplication for Ra and Rb, and subtract result from Rx. Store result in M0 and Rc. Saturate result if it cannot be represented by signed 32 bits. |

| Assembler mnemonic | Format | Affecting flag | Affected flag |
|---|---|---|---|
| fmsuhw M0,Rc,Ra,Rb,Rx | 32bit | CFR.OVS | PSR.FXP |

| Remarks |
|---|
| Writing to Rc is not performed when r30 or r31 is specified as Rc. |

Fig. 558 fmsuhww Mm,Rc,Ra,Rb,Mn

Behavior

```
tmp[48:0] <- sext49(smul(Ra[31:0],Rb[15:0]))<<FXP_SHIFT;
tmp[48:0] <- 0x0_7fff_ffff_ffff[48:0], CFR.OVS <- 1,
if ((Ra[31:0] == 0x8000_0000 && Rb[15:0] == 0x8000)
                                && ( PSR.FXP == 0));
tmp[48:0] <- 0x0_ffff_ffff_ffff[48:0], CFR.OVS <- 1,
if ((Ra[31:0] == 0x8000_0000 && Rb[15:0] == 0x8000)
                                && ( PSR.FXP == 1));
tmp2[49:0] <- sext50(MHn[17:0]:MLn) - sext50(tmp[48:0]);
MHm:MLm <- sext64(tmp2[47:0]);
MHm:MLm <- 0x0000_7fff_ffff_ffff, CFR.OVS <- 1,
                if (tmp2[49:0] > 0x0_7fff_ffff_ffff[49:0]);
MHm:MLm <- 0xffff_8000_0000_0000, CFR.OVS <- 1,
                if (tmp2[49:0] < 0x3_8000_0000_0000[49:0]);
Rc <- MHm[15:0]:MLm[31:16],
                if (reg#(Rc) != 30 && reg#(Rc) != 31);
```

Handle Ra and Rc as 32-bit values, handle Rb as 16-bit value, and handle Mm and Mn as 48-bit values.
Perform fixed point multiplication for Ra and Rb, and subtract result from Mn. Store result in Mm and Rc. Saturate result if it cannot be represented by signed 48 bits.

| Assembler mnemonic | Format | Affecting flag | Affected flag |
|---|---|---|---|
| fmsuhww Mm,Rc,Ra,Rb,Mn | 32bit | CFR.OVS | PSR.FXP |

| Remarks |
|---|
| Writing to Rc is not performed when r30 or r31 is specified as Rc. |

Fig. 559 fmsuhww M0,Rc,Ra,Rb,Rx

Behavior

```
tmp[48:0] <- sext49(smul(Ra[31:0],Rb[15:0]))<<FXP_SHIFT;
tmp[48:0] <- 0x0_7fff_ffff_ffff[48:0], CFR.OVS <- 1,
if ((Ra[31:0] == 0x8000_0000 && Rb[15:0] == 0x8000)
                              && (PSR.FXP == 0));
tmp[48:0] <- 0x0_ffff_ffff_ffff[48:0], CFR.OVS <- 1,
if ((Ra[31:0] == 0x8000_0000 && Rb[15:0] == 0x8000)
                              && (PSR.FXP == 1));
tmp2[49:0] <- (sext50(Rx)<<16) - sext50(tmp[48:0]);
MH0:ML0 <- sext64(tmp2[47:0]);
MH0:ML0 <- 0x0000_7fff_ffff_ffff, CFR.OVS <- 1,
                 if (tmp2[49:0] > 0x0_7fff_ffff_ffff[49:0]);
MH0:ML0 <- 0xffff_8000_0000_0000, CFR.OVS <- 1,
                 if (tmp2[49:0] < 0x3_8000_0000_0000[49:0]);
Rc <- MH0[15:0]:ML0[31:16], if (reg#(Rc) != 30 && reg#(Rc) != 31);
```

Handle Ra, Rc and Rx as 32-bit values, handle Rb as 16-bit value, and handle M0 as 48-bit value.
Perform fixed point multiplication for Ra and Rb, and subtract result from Rx. Store result in M0 and Rc. Saturate result if it cannot be represented by signed 48 bits.

| Assembler mnemonic | Format | Affecting flag | Affected flag |
|---|---|---|---|
| **fmsuhww M0,Rc,Ra,Rb,Rx** | 32bit | CFR.OVS | PSR.FXP |

| Remarks |
|---|
| Writing to Rc is not performed when r30 or r31 is specified as Rc. |

Fig. 560 msu Mm,Rc,Ra,Rb,Mn

| | |
|---|---|
| Behavior | **MHm:MLm <- MHn:MLn - smul(Ra,Rb);**<br>**Rc <- MLm, if (reg#(Rc) != 30 && reg#(Rc) != 31);**<br><br>**Perform integer multiplication for Ra and Rb, and subtract result from Mm. Store result in Mm and Rc.** |

| Assembler mnemonic | Format | Affecting flag | Affected flag |
|---|---|---|---|
| **msu Mm,Rc,Ra,Rb,Mn** | 32bit | — | — |

| Remarks |
|---|
| Writing to Rc is not performed when r30 or r31 is specified as Rc. |

Fig. 561 msu M0,Rc,Ra,Rb,Rx

| | |
|---|---|
| Behavior | **MH0:ML0 <- sext64(Rx) - smul(Ra,Rb);**<br>**Rc <- ML0, if (reg#(Rc) != 30 && reg#(Rc) != 31);**<br><br>**Perform integer multiplication for Ra and Rb, and subtract result from Rx. Store result in M0 and Rc.** |

| Assembler mnemonic | Format | Affecting flag | Affected flag |
|---|---|---|---|
| **msu M0,Rc,Ra,Rb,Rx** | 32bit | — | — |

| Remarks |
|---|
| Writing to Rc is not performed when r30 or r31 is specified as Rc. |

Fig. 562 fmsuww Mm,Rc,Ra,Rb,Mn

| | |
|---|---|
| Behavior | tmp[64:0] <- sext65(smul(Ra,Rb))<<FXP_SHIFT<br>tmp[64:0] <- 0x0_7fff_ffff_ffff_ffff[64:0], CFR.OVS <- 1<br>if ((Ra == 0x8000_0000 && Rb == 0x8000_0000)<br>&& ( PSR.FXP == 0));<br>tmp[64:0] <- 0x0_ffff_ffff_ffff_ffff[64:0], CFR.OVS <- 1<br>if ((Ra == 0x8000_0000 && Rb == 0x8000_0000)<br>&& ( PSR.FXP == 1));<br>tmp2[65:0] <- sext66(MHn:MLn) - sext66(tmp[64:0]);<br>MHm:MLm <- tmp2[63:0];<br>MHm:MLm <- 0x7fff_ffff_ffff_ffff, CFR.OVS <- 1,<br>if (tmp2[65:0] > 0x0_7fff_ffff_ffff_ffff[65:0]);<br>MHm:MLm <- 0x8000_0000_0000_0000, CFR.OVS <- 1,<br>if (tmp2[65:0] <<br>0x3_8000_0000_0000_0000[65:0]);<br>Rc <- MHm, if (reg#(Rc) != 30 && reg#(Rc) != 31);<br><br>Handle Ra, Rb and Rc as 32-bit values, and handle Mm and Mn as 64-bit values.<br>Perform fixed point multiplication for Ra and Rb, and subtract result from Mn. Store result in Mm and Rc. Saturate result if it cannot be represented by signed 64 bits. |

| Assembler mnemonic | Format | Affecting flag | Affected flag |
|---|---|---|---|
| fmsuww Mm,Rc,Ra,Rb,Mn | 32bit | CFR.OVS | PSR.FXP |

| Remarks |
|---|
| Writing to Rc is not performed when r30 or r31 is specified as Rc. |

Fig. 563 fmsuww M0,Rc,Ra,Rb,Rx

Behavior

```
tmp[64:0] <- sext65(smul(Ra,Rb))<<FXP_SHIFT;
tmp[64:0] <- 0x0_7fff_ffff_ffff_ffff[64:0], CFR.OVS <- 1,
                  if ((Ra == 0x8000_0000 && Rb == 0x8000_0000)
                          && (PSR.FXP == 0));
tmp[64:0] <- 0x0_ffff_ffff_ffff_ffff[64:0], CFR.OVS <- 1,
                  if ((Ra == 0x8000_0000 && Rb == 0x8000_0000)
                          && (PSR.FXP == 1));
tmp2[65:0] <- (sext66(Rx)<<32) - sext66(tmp[64:0]);
MH0:ML0 <- tmp2[63:0];
MH0:ML0 <- 0x7fff_ffff_ffff_ffff, CFR.OVS <- 1,
                  if (tmp2[65:0] > 0x0_7fff_ffff_ffff_ffff[65:0])
MH0:ML0 <- 0x8000_0000_0000_0000, CFR.OVS <- 1,
if (tmp2[65:0] <0x3_8000_0000_0000_0000[65:0])
Rc <- MH0, if (reg#(Rc) != 30 && reg#(Rc) != 31);
```

Handle Ra, Rb, Rc and Rx as 32-bit values, and handle M0 as 64-bit value.
Perform fixed point multiplication for Ra and Rb, and subtract result from Rx. Store result in M0 and Rc. Saturate result if it cannot be represented by signed 64 bits.

| Assembler mnemonic | Format | Affecting flag | Affected flag |
|---|---|---|---|
| fmsuww M0,Rc,Ra,Rb,Rx | 32bit | CFR.OVS | PSR.FXP |

Remarks

Writing to Rc is not performed when r30 or r31 is specified as Rc.

Fig. 564 div MHm,Rc,MHn,Ra,Rb

| | |
|---|---|
| Behavior | **tmp[63:0] <- sdiv(MHn:Ra,Rb);**<br>**MHm <- smod(MHn:Ra,Rb);**<br>**Rc <- tmp[31:0];**<br>**Rc <- UD; MHm <- UD; CFR.OVS <- 1,**<br>**if (Rb == 0**<br>**\|\| tmp[63:0] > 0x00000000_7fffffff[63:0]**<br>**\|\| tmp[63:0] < 0xffffffff_80000000[63:0]);**<br><br>**Divide MHn:Ra by Rb as signed value.** |

| Assembler mnemonic | Format | Affecting flag | Affected flag |
|---|---|---|---|
| **div MHm,Rc,MHn,Ra,Rb** | 32bit | CFR.OVS | — |

| Remarks |
|---|
| This instruction is 34-cycle instruction, but it changes to a 17-cycle instruction by dynamically recognizing that a value is of 16 bits or lower. |

Fig. 565 divu MHm,Rc,MHn,Ra,Rb

| | |
|---|---|
| Behavior | **tmp[63:0] <- udiv(MHn:Ra,Rb);**<br>**MHm <- umod(MHn:Ra,Rb);**<br>**Rc <- tmp[31:0];**<br>**Rc <- UD; MHm <- UD; CFR.OVS <- 1,**<br>**if (Rb == 0**<br>**\|\| tmp[63:0] >(u) 0x00000000_ffffffff[63:0]);**<br><br>**Divide MHn:Ra by Rb as unsigned value.** |

| Assembler mnemonic | Format | Affecting flag | Affected flag |
|---|---|---|---|
| **divu MHm,Rc,MHn,Ra,Rb** | 32bit | CFR.OVS | — |

| Remarks |
|---|
| This instruction is 34-cycle instruction, but it changes to a 17-cycle instruction by dynamically recognizing that a value is of 16 bits or lower. |

Fig. 566 dbgm0

| Behavior | Intended for debugging. | | |
|---|---|---|---|
| **Assembler mnemonic** | **Format** | **Affecting flag** | **Affected flag** |
| **dbgm0** | 32bit | — | — |

| Remarks |
|---|
| This issue of this instruction is limited to one. Behavior in the case where this instruction is issued two or more in number is undefined.<br>The usage of I15 is reserved in the system. |

Fig. 567 dbgm1

| Behavior | Intended for debugging. | | |
|---|---|---|---|
| **Assembler mnemonic** | **Format** | **Affecting flag** | **Affected flag** |
| **dbgm1** | 32bit | — | — |
| Remarks | | | |
| This issue of this instruction is limited to one. Behavior in the case where this instruction is issued two or more in number is undefined.<br>The usage of I15 is reserved in the system. | | | |

Fig. 568 dbgm2 I15

| Behavior | Intended for debugging. | | |
|---|---|---|---|
| Assembler mnemonic | Format | Affecting flag | Affected flag |
| dbgm2 I15 | 32bit | — | — |
| Remarks | | | |
| This issue of this instruction is limited to one. Behavior in the case where this instruction is issued two or more in number is undefined.<br>The usage of I15 is reserved in the system. | | | |

Fig. 569 dbgm3 I15

<table>
<tr><td>Behavior</td><td colspan="4">Intended for debugging.</td></tr>
<tr><td colspan="2">Assembler mnemonic</td><td>Format</td><td>Affecting flag</td><td>Affected flag</td></tr>
<tr><td colspan="2">dbgm3 I15</td><td>32bit</td><td>—</td><td>—</td></tr>
<tr><td colspan="5">Remarks</td></tr>
<tr><td colspan="5">This issue of this instruction is limited to one. Behavior in the case where this instruction is issued two or more in number is undefined.<br>The usage of I15 is reserved in the system.</td></tr>
</table>

Fig. 570 vaddh Rc,Ra,Rb

| Behavior | | | |
|---|---|---|---|
| **Rc[31:16] <- Ra[31:16] + Rb[31:16];**<br>**Rc[15: 0] <- Ra[15: 0] + Rb[15: 0];**<br><br>**Handle each register in half word vector format.**<br>**Add Ra and Rb (SIMD straight).** | | | |
| Assembler mnemonic | Format | Affecting flag | Affected flag |
| **vaddh Rc,Ra,Rb** | 32bit | — | — |
| Remarks | | | |
| | | | |

Fig. 571 vxaddh Rc,Ra,Rb

| | |
|---|---|
| Behavior | **Rc[31:16] <- Ra[31:16] + Rb[15: 0];**<br>**Rc[15: 0] <- Ra[15: 0] + Rb[31:16];**<br><br>**Handle each register in half word vector format.**<br>**Add Ra and Rb (SIMD cross).** |

| Assembler mnemonic | Format | Affecting flag | Affected flag |
|---|---|---|---|
| **vxaddh Rc,Ra,Rb** | 32bit | — | — |

| Remarks |
|---|
| |

Fig. 572 vhaddh Rc,Ra,Rb

| | |
|---|---|
| Behavior | **Rc[31:16] <- Ra[31:16] + Rb[31:16];**<br>**Rc[15: 0] <- Ra[15: 0] + Rb[31:16];**<br><br>**Handle each register in half word vector format.**<br>**Add Ra and Rb (SIMD high).** |

| Assembler mnemonic | Format | Affecting flag | Affected flag |
|---|---|---|---|
| **vhaddh Rc,Ra,Rb** | 32bit | — | — |

| Remarks |
|---|
| |

Fig. 573 vladdh Rc,Ra,Rb

| | |
|---|---|
| Behavior | **Rc[31:16] <- Ra[31:16] + Rb[15: 0];**<br>**Rc[15: 0] <- Ra[15: 0] + Rb[15: 0];**<br><br>**Handle each register in half word vector format.**<br>**Add Ra and Rb (SIMD low).** |

| Assembler mnemonic | Format | Affecting flag | Affected flag |
|---|---|---|---|
| **vladdh Rc,Ra,Rb** | 32bit | – | – |

| Remarks |
|---|
| |

Fig. 574 vaddhvh Rc,Ra,Rb

| | |
|---|---|
| Behavior | tmp[16:0] <- sext17(Ra[31:16]) + sext17(Rb[31:16]);<br>Rc[31:16] <- tmp[15: 0];<br>Rc[31:16] <- 0x7fff, CFR.OVS <- 1,<br>if (tmp[16:0] > 0x0_7fff[16:0]);<br>Rc[31:16] <- 0x8000, CFR.OVS <- 1,<br>if (tmp[16:0] < 0x1_8000[16:0]);<br>tmp[16:0] <- sext17(Ra[15: 0]) + sext17(Rb[15: 0]);<br>Rc[15: 0] <- tmp[15:0];<br>Rc[15: 0] <- 0x7fff, CFR.OVS <- 1,<br>if (tmp[16:0] > 0x0_7fff[16:0]);<br>Rc[15: 0] <- 0x8000, CFR.OVS <- 1,<br>if (tmp[16:0] < 0x1_8000[16:0]);<br><br>Handle each register in half word vector format.<br>Add Ra and Rb (SIMD straight). Saturate result if it cannot be represented by signed 16 bits. |

| Assembler mnemonic | Format | Affecting flag | Affected flag |
|---|---|---|---|
| vaddhvh Rc,Ra,Rb | 32bit | — | — |

| Remarks |
|---|
| |

Fig. 575 vxaddhvh Rc,Ra,Rb

| | |
|---|---|
| Behavior | **tmp[16:0] <- sext17(Ra[31:16]) + sext17(Rb[15:0]);**<br>**Rc[31:16] <- tmp[15:0];**<br>**Rc[31:16] <- 0x7fff, CFR.OVS <- 1,**<br>**if (tmp[16:0] > 0x0_7fff[16:0]);**<br>**Rc[31:16] <- 0x8000, CFR.OVS <- 1,**<br>**if (tmp[16:0] < 0x1_8000[16:0]);**<br><br>**tmp[16:0] <- sext17(Ra[15: 0]) + sext17(Rb[31:16]);**<br>**Rc[15: 0] <- tmp[15:0];**<br>**Rc[15: 0] <- 0x7fff, CFR.OVS <- 1,**<br>**if (tmp[16:0] > 0x0_7fff[16:0]);**<br>**Rc[15: 0] <- 0x8000, CFR.OVS <- 1,**<br>**if (tmp[16:0] < 0x1_8000[16:0]);**<br><br>**Handle each register in half word vector format.**<br>**Add Ra and Rb (SIMD cross). Saturate result if it cannot be represented by signed 16 bits.** |

| Assembler mnemonic | Format | Affecting flag | Affected flag |
|---|---|---|---|
| **vxaddhvh Rc,Ra,Rb** | 32bit | CFR.OVS | — |

| Remarks |
|---|
| |

Fig. 576 vhaddhvh Rc,Ra,Rb

| | |
|---|---|
| Behavior | tmp[16:0] <- sext17(Ra[31:16]) + sext17(Rb[31:16]);<br>Rc[31:16] <- tmp[15:0];<br>Rc[31:16] <- 0x7fff, CFR.OVS <- 1,<br>if (tmp[16:0] > 0x0_7fff[16:0]);<br>Rc[31:16] <- 0x8000, CFR.OVS <- 1,<br>if (tmp[16:0] < 0x1_8000[16:0]);<br><br>tmp[16:0] <- sext17(Ra[15: 0]) + sext17(Rb[31:16]);<br>Rc[15: 0] <- tmp[15:0];<br>Rc[15: 0] <- 0x7fff, CFR.OVS <- 1,<br>if (tmp[16:0] > 0x0_7fff[16:0]);<br>Rc[15: 0] <- 0x8000, CFR.OVS <- 1,<br>if (tmp[16:0] < 0x1_8000[16:0]);<br><br>Handle each register in half word vector format.<br>Add Ra and Rb (SIMD high). Saturate result if it cannot be represented by signed 16 bits. |

| Assembler mnemonic | Format | Affecting flag | Affected flag |
|---|---|---|---|
| vhaddhvh Rc,Ra,Rb | 32bit | CFR.OVS | — |

| Remarks |
|---|
| |

Fig. 577 vladdhvh Rc,Ra,Rb

| | |
|---|---|
| Behavior | tmp[16:0] <- sext17(Ra[31:16]) + sext17(Rb[15: 0]);<br>Rc[31:16] <- tmp[15:0];<br>Rc[31:16] <- 0x7fff, CFR.OVS <- 1,<br>if (tmp[16:0] > 0x0_7fff[16:0]);<br>Rc[31:16] <- 0x8000, CFR.OVS <- 1,<br>if (tmp[16:0] < 0x1_8000[16:0]);<br><br>tmp[16:0] <- sext17(Ra[15: 0]) + sext17(Rb[15: 0]);<br>Rc[15: 0] <- tmp[15:0];<br>Rc[15: 0] <- 0x7fff, CFR.OVS <- 1,<br>if (tmp[16:0] > 0x0_7fff[16:0]);<br>Rc[15: 0] <- 0x8000, CFR.OVS <- 1,<br>if (tmp[16:0] < 0x1_8000[16:0]);<br><br>Handle each register in half word vector format.<br>Add Ra and Rb (SIMD low). Saturate result if it cannot be represented by signed 16 bits. |

| Assembler mnemonic | Format | Affecting flag | Affected flag |
|---|---|---|---|
| vladdhvh Rc,Ra,Rb | 32bit | CFR.OVS | — |

| Remarks |
|---|
| |

Fig. 578 vsaddh Rb,Ra,I8

| | |
|---|---|
| Behavior | **Add I8 to two elements of Ra.**<br>**Rb[31:16] <- Ra[31:16] + sext16(I8);**<br>**Rb[15: 0] <- Ra[15: 0] + sext16(I8);**<br><br>**Handle each register in half word vector format.**<br>**Add Ra and immediate value (I8).** |

| Assembler mnemonic | Format | Affecting flag | Affected flag |
|---|---|---|---|
| **vsaddh Rb,Ra,I8** | 32bit | — | — |

| Remarks |
|---|
| I8 is a signed value. |

Fig. 579 vaddsh Rc,Ra,Rb

| | |
|---|---|
| Behavior | **Rc[31:16] <- (sext17(Ra[31:16]) + sext17(Rb[31:16]))[16: 1];**<br>**Rc[15: 0] <- (sext17(Ra[15: 0]) + sext17(Rb[15: 0]))[16: 1];**<br><br>**Handle each register in half word vector format.**<br>**Add Ra and Rb, and perform arithmetic shift right of result by 1 bit.** |

| Assembler mnemonic | Format | Affecting flag | Affected flag |
|---|---|---|---|
| **vaddsh Rc,Ra,Rb** | 32bit | — | — |

| Remarks |
|---|
| |

Fig. 580 vaddsrh Rc,Ra,Rb

| | |
|---|---|
| Behavior | **Rc[31:16] <- (sext17(Ra[31:16]) + sext17(Rb[31:16])**<br>**+ 0x0_0001[16:0])[16:1];**<br>**Rc[15: 0] <- (sext17(Ra[15: 0]) + sext17(Rb[15: 0])**<br>**+ 0x0_0001[16:0])[16:1];**<br><br>**Handle each register in half word vector format.**<br>**Add Ra, Rb and 1, and perform arithmetic shift right of result by 1 bit.** |

| Assembler mnemonic | Format | Affecting flag | Affected flag |
|---|---|---|---|
| **vaddsrh Rc,Ra,Rb** | 32bit | — | — |

| Remarks |
|---|
| |

Fig. 581 vaddhvc Rc,Ra,Rb

| | |
|---|---|
| Behavior | Rc[31:16] <- Ra[31:16] + Ra[31:16], if (VC2 == 0);<br>Rc[31:16] <- Ra[31:16] + Rb[31:16], if (VC2 == 1);<br>Rc[15: 0] <- Ra[15: 0] + Ra[15: 0], if (VC2 == 0);<br>Rc[15: 0] <- Ra[15: 0] + Rb[15: 0], if (VC2 == 1);<br><br>Used for motion compensation in image processing.<br>Handle each register in half word vector format.<br>Whether added with Ra or Rb depends on VC2. |

| Assembler mnemonic | Format | Affecting flag | Affected flag |
|---|---|---|---|
| vaddhvc Rc,Ra,Rb | 32bit | — | VC2 |

| Remarks |
|---|
| |

Fig. 582 vaddrhvc Rc,Ra,Rb

| | |
|---|---|
| Behavior | Rc[31:16] <- Ra[31:16] + Ra[31:16] + sext16(1), if (VC2 == 0);<br>Rc[31:16] <- Ra[31:16] + Rb[31:16] + sext16(1), if (VC2 == 1);<br>Rc[15: 0] <- Ra[15: 0] + Ra[15: 0] + sext16(1), if (VC2 == 0);<br>Rc[15: 0] <- Ra[15: 0] + Rb[15: 0] + sext16(1), if (VC2 == 1);<br><br>Handle each register in half word vector format.<br>Add Ra with Ra or Rb, and further add 1 for rounding purposes.<br>Whether added with Ra or Rb depends on VC2. |

| Assembler mnemonic | Format | Affecting flag | Affected flag |
|---|---|---|---|
| **vaddrhvc Rc,Ra,Rb** | 32bit | — | VC2 |

| Remarks |
|---|
| |

Fig. 583 vaddb Rc,Ra,Rb

| | |
|---|---|
| Behavior | **Rc[31:24] <- Ra[31:24] + Rb[31:24];**<br>**Rc[23:16] <- Ra[23:16] + Rb[23:16];**<br>**Rc[15: 8] <- Ra[15: 8] + Rb[15: 8];**<br>**Rc[ 7: 0] <- Ra[ 7: 0] + Rb[ 7: 0];**<br><br>**Handle each register in byte vector format.**<br>**Add Ra and Rb.** |

| Assembler mnemonic | Format | Affecting flag | Affected flag |
|---|---|---|---|
| **vaddb Rc,Ra,Rb** | 32bit | — | — |

| Remarks |
|---|
| |

Fig. 584 vsaddb Rb,Ra,I8

| | |
|---|---|
| Behavior | **Rb[31:24] <- Ra[31:24] + I8;**<br>**Rb[23:16] <- Ra[23:16] + I8;**<br>**Rb[15: 8] <- Ra[15: 8] + I8;**<br>**Rb[ 7: 0] <- Ra[ 7: 0] + I8;**<br><br>**Handle each register in byte vector format.**<br>**Add Ra and immediate value (I8).** |

| Assembler mnemonic | Format | Affecting flag | Affected flag |
|---|---|---|---|
| **vsaddb Rb,Ra,I8** | 32bit | — | — |

| Remarks |
|---|
| I8 is a signed value. |

Fig. 585 vaddsb Rc,Ra,Rb

| | |
|---|---|
| Behavior | **Rc[31:24] <- (sext9(Ra[31:24]) + sext9(Rb[31:24]))[ 8: 1];**<br>**Rc[23:16] <- (sext9(Ra[23:16]) + sext9(Rb[23:16]))[ 8: 1];**<br>**Rc[15: 8] <- (sext9(Ra[15: 8]) + sext9(Rb[15: 8]))[ 8: 1];**<br>**Rc[ 7: 0] <- (sext9(Ra[ 7: 0]) + sext9(Rb[ 7: 0]))[ 8: 1];**<br><br>**Handle each register in byte vector format.**<br>**Add Ra and Rb, and perform arithmetic shift right of result by 1 bit.** |

| Assembler mnemonic | Format | Affecting flag | Affected flag |
|---|---|---|---|
| **vaddsb Rc,Ra,Rb** | 32bit | — | — |

| Remarks |
|---|
| |

Fig. 586 vaddsrb Rc,Ra,Rb

| | |
|---|---|
| Behavior | **Rc[31:24] <- (sext9(Ra[31:24]) + sext9(Rb[31:24]) + 0x001[8:0])[8:1];**<br>**Rc[23:16] <- (sext9(Ra[23:16]) + sext9(Rb[23:16]) + 0x001[8:0])[8:1];**<br>**Rc[15: 8] <- (sext9(Ra[15: 8]) + sext9(Rb[15: 8]) + 0x001[8:0])[8:1];**<br>**Rc[ 7: 0] <- (sext9(Ra[ 7: 0]) + sext9(Rb[ 7: 0]) + 0x001[8:0])[8:1];**<br><br>**Handle each register in half word vector format.**<br>**Add Ra, Rb and 1, and perform arithmetic shift right of result by 1 bit.** |

| Assembler mnemonic | Format | Affecting flag | Affected flag |
|---|---|---|---|
| **vaddsrb Rc,Ra,Rb** | 32bit | — | — |

| Remarks |
|---|
| |

Fig. 587 vsubh Rc,Rb,Ra

| | |
|---|---|
| Behavior | **Rc[31:16] <- Rb[31:16] - Ra[31:16];**<br>**Rc[15: 0] <- Rb[15: 0] - Ra[15: 0];**<br><br>**Handle each register in half word vector format.**<br>**Subtract Ra from Rb (SIMD straight).** |

| Assembler mnemonic | Format | Affecting flag | Affected flag |
|---|---|---|---|
| **vsubh Rc,Rb,Ra** | 32bit | — | — |

| Remarks |
|---|
| Be careful with the order of operands. |

Fig. 588 vxsubh Rc,Rb,Ra

| | |
|---|---|
| Behavior | **Rc[31:16] <- Rb[31:16] - Ra[15: 0];**<br>**Rc[15: 0] <- Rb[15: 0] - Ra[31:16];**<br><br>**Handle each register in half word vector format.**<br>**Subtract Ra from Rb (SIMD cross).** |

| Assembler mnemonic | Format | Affecting flag | Affected flag |
|---|---|---|---|
| **vxsubh Rc,Rb,Ra** | 32bit | - | — |

| Remarks |
|---|
| Be careful with the order of operands. |

Fig. 589 vhsubh Rc,Rb,Ra

| | |
|---|---|
| Behavior | **Rc[31:16] <- Rb[31:16] - Ra[31:16];**<br>**Rc[15: 0] <- Rb[15: 0] - Ra[31:16];**<br><br>**Handle each register in half word vector format.**<br>**Subtract Ra from Rb (SIMD high).** |

| Assembler mnemonic | Format | Affecting flag | Affected flag |
|---|---|---|---|
| **vhsubh Rc,Rb,Ra** | 32bit | — | — |

| Remarks |
|---|
| Be careful with the order of operands. |

Fig. 590 vlsubh Rc,Rb,Ra

| | | | |
|---|---|---|---|
| Behavior | **Rc[31:16] <- Rb[31:16] - Ra[15: 0];**<br>**Rc[15: 0] <- Rb[15: 0] - Ra[15: 0];**<br><br>**Handle each register in half word vector format.**<br>**Subtract Ra from Rb (SIMD low).** | | |
| Assembler mnemonic | Format | Affecting flag | Affected flag |
| **vlsubh Rc,Rb,Ra** | 32bit | — | — |
| Remarks | | | |
| Be careful with the order of operands. | | | |

Fig. 591 vsubhvh Rc,Rb,Ra

| | |
|---|---|
| Behavior | **tmp[16:0] <- sext17(Rb[31:16]) - sext17(Ra[31:16]);**<br>**Rc[31:16] <- tmp[15:0];**<br>**Rc[31:16] <- 0x7fff, CFR.OVS <- 1,**<br>**if (tmp[16:0] > 0x0_7fff[16:0]);**<br>**Rc[31:16] <- 0x8000, CFR.OVS <- 1,**<br>**if (tmp[16:0] < 0x1_8000[16:0]);**<br><br>**tmp[16:0]<- sext17(Rb[15: 0]) - sext17(Ra[15: 0]);**<br>**Rc[15: 0] <- tmp[15:0];**<br>**Rc[15: 0] <- 0x7fff, CFR.OVS <- 1,**<br>**if (tmp[16:0] > 0x0_7fff[16:0]);**<br>**Rc[15: 0] <- 0x8000, CFR.OVS <- 1,**<br>**if (tmp[16:0] < 0x1_8000[16:0]);**<br><br>**Handle each register in half word vector format.**<br>**Subtract Ra from Rb (SIMD straight). Saturate result if it cannot be represented by signed 16 bits.** |

| Assembler mnemonic | Format | Affecting flag | Affected flag |
|---|---|---|---|
| **vsubhvh Rc,Rb,Ra** | 32bit | CFR.OVS | — |

| Remarks |
|---|
| Be careful with the order of operands. |

Fig. 592 vxsubhvh Rc,Rb,Ra

Behavior

```
tmp[16:0] <- sext17(Rb[31:16]) - sext17(Ra[15:0]);
Rc[31:16] <- tmp[15:0];
Rc[31:16] <- 0x7fff, CFR.OVS <- 1,
                if (tmp[16:0] > 0x0_7fff[16:0]);
Rc[31:16] <- 0x8000, CFR.OVS <- 1,
                if (tmp[16:0] < 0x1_8000[16:0]);

tmp[16:0] <- sext17(Rb[15: 0]) - sext17(Ra[31:16]);
Rc[15: 0] <- tmp[15:0];
Rc[15: 0] <- 0x7fff, CFR.OVS <- 1,
                if (tmp[16:0] > 0x0_7fff[16:0]);
Rc[15: 0] <- 0x8000, CFR.OVS <- 1,
                if (tmp[16:0] < 0x1_8000[16:0]);
```

Handle each register in half word vector format.

Subtract Ra from Rb (SIMD cross). Saturate result if it cannot be represented by signed 16 bits.

| Assembler mnemonic | Format | Affecting flag | Affected flag |
|---|---|---|---|
| **vxsubhvh Rc,Rb,Ra** | 32bit | CFR.OVS | — |

Remarks

Be careful with the order of operands.

Fig. 593 vhsubhvh Rc,Rb,Ra

| | |
|---|---|
| Behavior | tmp[16:0] <- sext17(Rb[31:16]) - sext17(Ra[31:16]);<br>Rc[31:16] <- tmp[15:0];<br>Rc[31:16] <- 0x7fff, CFR.OVS <- 1,<br>if (tmp[16:0] > 0x0_7fff[16:0]);<br>Rc[31:16] <- 0x8000, CFR.OVS <- 1,<br>if (tmp[16:0] < 0x1_8000[16:0]);<br><br>tmp[16:0] <- sext17(Rb[15: 0]) - sext17(Ra[31:16]);<br>Rc[15: 0] <- tmp[15:0];<br>Rc[15: 0] <- 0x7fff, CFR.OVS <- 1,<br>if (tmp[16:0] > 0x0_7fff[16:0]);<br>Rc[15: 0] <- 0x8000, CFR.OVS <- 1,<br>if (tmp[16:0] < 0x1_8000[16:0]);<br><br>Handle each register in half word vector format.<br>Subtract Ra from Rb (SIMD high). Saturate result if it cannot be represented by signed 16 bits. |

| Assembler mnemonic | Format | Affecting flag | Affected flag |
|---|---|---|---|
| **vhsubhvh Rc,Rb,Ra** | 32bit | CFR.OVS | — |

| Remarks |
|---|
| Be careful with the order of operands. |

Fig. 594 vlsubhvh Rc,Rb,Ra

| | |
|---|---|
| Behavior | **tmp[16:0] <- sext17(Rb[31:16]) - sext17(Ra[15: 0]);**<br>**Rc[31:16] <- tmp[15:0];**<br>**Rc[31:16] <- 0x7fff, CFR.OVS <- 1,**<br>**if (tmp[16:0] > 0x0_7fff[16:0]);**<br>**Rc[31:16] <- 0x8000, CFR.OVS <- 1,**<br>**if (tmp[16:0] < 0x1_8000[16:0]);**<br><br>**tmp[16:0] <- sext17(Rb[15: 0]) - sext17(Ra[15: 0]);**<br>**Rc[15: 0] <- tmp[15:0];**<br>**Rc[15: 0] <- 0x7fff, CFR.OVS <- 1,**<br>**if (tmp[16:0] > 0x0_7fff[16:0]);**<br>**Rc[15: 0] <- 0x8000, CFR.OVS <- 1,**<br>**if (tmp[16:0] < 0x1_8000[16:0]);**<br><br>**Handle each register in half word vector format.**<br>**Subtract Ra from Rb (SIMD low). Saturate result if it cannot be represented by signed 16 bits.** |

| Assembler mnemonic | Format | Affecting flag | Affected flag |
|---|---|---|---|
| **vlsubhvh Rc,Rb,Ra** | 32bit | CFR.OVS | — |

| Remarks |
|---|
| Be careful with the order of operands. |

Fig. 595 vssubh Rb,Ra,I8

| | |
|---|---|
| Behavior | **=> vsaddh Rb,Ra,-I8**<br><br>**Rb[31:16] <- Ra[31:16] - sext16(I8);**<br>**Rb[15: 0] <- Ra[15: 0] - sext16(I8);**<br><br>**Handle each register in half word vector format.**<br>**Subtract immediate value (I8) from Ra.** |

| Assembler mnemonic | Format | Affecting flag | Affected flag |
|---|---|---|---|
| **vssubh Rb,Ra,I8** | 32bit synonym | — | — |

| Remarks |
|---|
| I8 is a signed value. |

Fig. 596 vsubb Rc,Rb,Ra

| | |
|---|---|
| Behavior | **Rc[31:24] <- Rb[31:24] - Ra[31:24];**<br>**Rc[23:16] <- Rb[23:16] - Ra[23:16];**<br>**Rc[15: 8] <- Rb[15: 8] - Ra[15: 8];**<br>**Rc[ 7: 0] <- Rb[ 7: 0] - Ra[ 7: 0];**<br><br>**Handle each register in byte vector format.**<br>**Subtract Ra from Rb.** |

| Assembler mnemonic | Format | Affecting flag | Affected flag |
|---|---|---|---|
| **vsubb Rc,Rb,Ra** | 32bit | — | — |

| Remarks |
|---|
| Be careful with the order of operands. |

Fig. 597 vssubb Rb,Ra,I8

| | |
|---|---|
| Behavior | **=> vsaddb Rb,Ra,-I8**<br><br>**Rb[31:24] <- Ra[31:24] - I8;**<br>**Rb[23:16] <- Ra[23:16] - I8;**<br>**Rb[15: 8] <- Ra[15: 8] - I8;**<br>**Rb[ 7: 0] <- Ra[ 7: 0] - I8;**<br><br>**Handle each register in byte vector format.**<br>**Subtract immediate value (I8) from Ra.** |

| Assembler mnemonic | Format | Affecting flag | Affected flag |
|---|---|---|---|
| **vssubb Rb,Ra,I8** | 32bit synonym | — | — |

| Remarks |
|---|
| I8 is a signed value. |

Fig. 598 vsubsh Rc,Rb,Ra

| | |
|---|---|
| Behavior | **Rc[31:16] <- (sext17(Rb[31:16]) - sext17(Ra[31:16]))[16:1];**<br>**Rc[15: 0] <- (sext17(Rb[15: 0]) - sext17(Ra[15: 0]))[16:1];**<br><br>**Handle each register in half word vector format.**<br>**Subtract Ra from, and perform arithmetic shift right of result by 1 bit.** |

| Assembler mnemonic | Format | Affecting flag | Affected flag |
|---|---|---|---|
| **vsubsh Rc,Rb,Ra** | 32bit | — | — |

| Remarks |
|---|
| Be careful with the order of operands. |

Fig. 599 vsrsubh Rb,Ra,I8

| | |
|---|---|
| Behavior | **Rb[31:16] <- sext16(I8) - Ra[31:16];**<br>**Rb[15: 0] <- sext16(I8) - Ra[15: 0];**<br><br>**Handle each register in half word vector format.**<br>**Subtract Ra from immediate value (I8).** |

| Assembler mnemonic | Format | Affecting flag | Affected flag |
|---|---|---|---|
| **vsrsubh Rb,Ra,I8** | 32bit | — | — |

| Remarks |
|---|
| I8 is a signed value.<br>Be careful with the order of operands. |

Fig. 600 vsrsubb Rb,Ra,I8

| | |
|---|---|
| Behavior | **Rb[31:24] <- I8 - Ra[31:24];**<br>**Rb[23:16] <- I8 - Ra[23:16];**<br>**Rb[15: 8] <- I8 - Ra[15: 8];**<br>**Rb[ 7: 0] <- I8 - Ra[ 7: 0];**<br><br>**Handle each register in byte vector format.**<br>**Subtract Ra from immediate value (I8).** |

| Assembler mnemonic | Format | Affecting flag | Affected flag |
|---|---|---|---|
| **vsrsubb Rb,Ra,I8** | 32bit | — | — |

| Remarks |
|---|
| I8 is a signed value.<br>Be careful with the order of operands. |

Fig. 601 vsumh Rb,Ra

<table>
<tr><td>Behavior</td><td colspan="3">Rb[31:0] <- sext(Ra[31:16])+sext(Ra[15: 0]);<br><br>Handle Ra in half word vector format.<br>Add higher 16-bit value of Ra and lower 16-bit value of Ra, and store result in Rb.</td></tr>
<tr><td>Assembler mnemonic</td><td>Format</td><td>Affecting flag</td><td>Affected flag</td></tr>
<tr><td>vsumh Rb,Ra</td><td>32bit</td><td>—</td><td>—</td></tr>
<tr><td colspan="4">Remarks</td></tr>
<tr><td colspan="4"></td></tr>
</table>

Fig. 602 vsumh2 Rb,Ra

| | |
|---|---|
| Behavior | **Rb[31:16] <- sext16(Ra[31:24]) + sext16(Ra[23:16]);**<br>**Rb[15: 0] <- sext16(Ra[15: 8]) + sext16(Ra[ 7: 0]);**<br><br>**Used for motion compensation in image processing.**<br>**Raを Handle Ra in byte vector format, and handle Rb in half word vector format.**<br>**Add two 8-bit values corresponding to higher 16-bit value of Ra and two 8-bit values corresponding to lower 16-bit value of Ra. Result is stored in Rb in half word vector format.** |

| Assembler mnemonic | Format | Affecting flag | Affected flag |
|---|---|---|---|
| **vsumh2 Rb,Ra** | 32bit | — | — |

| Remarks |
|---|
| |

Fig. 603 vsumrh2 Rb,Ra

| | |
|---|---|
| Behavior | Rb[31:16] <- sext16(Ra[31:24]) + sext16(Ra[23:16]) + sext16(1);<br>Rb[15: 0] <- sext16(Ra[15: 8]) + sext16(Ra[ 7: 0]) + sext16(1);<br><br>Used for motion compensation in image processing.<br>Handle Ra in byte vector format, and handle Rb in half word vector format.<br>Add two 8-bit values corresponding to higher 16-bit value of Ra and two 8-bit values corresponding to lower 16-bit value of Ra, and further add 1 to result for rounding purposes. Result is stored in Rb in half word vector format. |

| Assembler mnemonic | Format | Affecting flag | Affected flag |
|---|---|---|---|
| vsumrh2 Rb,Ra | 32bit | — | — |

| Remarks |
|---|
| |

Fig. 604 vnegh Rb,Ra

| | |
|---|---|
| Behavior | **=> vsrsubh Rb,Ra,0**<br><br>**Rb[31:16] <- - Ra[31:16];**<br>**Rb[15: 0] <- - Ra[15: 0];**<br><br>**Handle each register in half word vector format.**<br>**Invert sign of Ra.** |

| Assembler mnemonic | Format | Affecting flag | Affected flag |
|---|---|---|---|
| **vnegh Rb,Ra** | 32bit synonym | — | — |

| Remarks |
|---|
| |

Fig. 605 vneghvh Rb,Ra

| | |
|---|---|
| Behavior | tmp[16:0] <- -sext17(Ra[31:16]);<br>Rb[31:16] <- tmp[15:0];<br>Rb[31:16] <- 0x7fff, CFR.OVS <- 1,<br>if (tmp[16:0] > 0x0_7fff[16:0]);<br>Rb[31:16] <- 0x8000, CFR.OVS <- 1,<br>if (tmp[16:0] < 0x1_8000[16:0]);<br>tmp[16:0] <- -sext17(Ra[15: 0]);<br>Rb[15: 0] <- tmp[15:0];<br>Rb[15: 0] <- 0x7fff, CFR.OVS <- 1,<br>if (tmp[16:0] > 0x0_7fff[16:0]);<br>Rb[15: 0] <- 0x8000, CFR.OVS <- 1,<br>if (tmp[16:0] < 0x1_8000[16:0]);<br><br>Handle each register in half word vector format.<br>Invert sign of Ra, and saturate result if it cannot be represented by signed 16 bits. |

| Assembler mnemonic | Format | Affecting flag | Affected flag |
|---|---|---|---|
| vneghvh Rb,Ra | 32bit | CFR.OVS | — |

| Remarks |
|---|
| |

Fig. 606 vnegb Rb,Ra

| | |
|---|---|
| Behavior | **=> vsrsubb Rb,Ra,0**<br><br>**Rb[31:24] <- - Ra[31:24];**<br>**Rb[23:16] <- - Ra[23:16];**<br>**Rb[15: 8] <- - Ra[15: 8];**<br>**Rb[ 7: 0] <- - Ra[ 7: 0];**<br><br>**Handle each register in byte vector format.**<br>**Invert sign of Ra.** |

| Assembler mnemonic | Format | Affecting flag | Affected flag |
|---|---|---|---|
| **vnegb Rb,Ra** | 32bit synonym | — | — |

| Remarks |
|---|
| |

Fig. 607 vabshvh Rb,Ra

| | |
|---|---|
| Behavior | **Rb[31:16] <- Ra[31:16], if (Ra[31:16] >= 0);**<br>**Rb[31:16] <- -Ra[31:16], if ((Ra[31:16] < 0));**<br>**Rb[31:16] <- 7fff, CFR.OVS <- 1, if (Ra[31:16] == 0x8000);**<br>**Rb[15: 0] <- Ra[15: 0], if (Ra[15: 0] >= 0);**<br>**Rb[15: 0] <- -Ra[15: 0], if ((Ra[15: 0] < 0));**<br>**Rb[15: 0] <- 7fff, CFR.OVS <- 1, if (Ra[15: 0] == 0x8000);**<br><br>**Handle each register in half word vector format.**<br>**Determine absolute value of Ra. and saturate result if it cannot be represented by signed 16 bits.** |

| Assembler mnemonic | Format | Affecting flag | Affected flag |
|---|---|---|---|
| **vabshvh Rb,Ra** | 32bit | CFR.OVS | — |

| Remarks |
|---|
| |

Fig. 608 vasubb Rc,Rb,Ra

<table>
<tr><td>Behavior</td><td colspan="3">VC3:Rc[31:24] <- sext9(Rb[31:24]) - sext9(Ra[31:24]);<br>VC2:Rc[23:16] <- sext9(Rb[23:16]) - sext9(Ra[23:16]);<br>VC1:Rc[15: 8] <- sext9(Rb[15: 8]) - sext9(Ra[15: 8]);<br>VC0:Rc[ 7: 0] <- sext9(Rb[ 7: 0]) - sext9(Ra[ 7: 0]);<br><br>Used for summing up differential absolute values concerning motion estimation in image processing. Used in combination with vabssumb. Handle each register in byte vector format.<br>Subtract Ra from Rb, and sign bit of each 8-bit value is stored in VC0～VC3, respectively.</td></tr>
<tr><td>Assembler mnemonic</td><td>Format</td><td>Affecting flag</td><td>Affected flag</td></tr>
<tr><td>vasubb Rc,Rb,Ra</td><td>32bit</td><td>VC0,VC1,VC2,VC3</td><td>—</td></tr>
<tr><td colspan="4">Remarks</td></tr>
<tr><td colspan="4">Be careful with the order of operands.</td></tr>
</table>

Fig. 609 vsgnh Rb,Ra

| | |
|---|---|
| Behavior | **Rb[31:16] <- 0x0001, if (Ra[31:16] > 0);**<br>**Rb[31:16] <- 0x0000, if (Ra[31:16] == 0);**<br>**Rb[31:16] <- 0xffff, if (Ra[31:16] < 0);**<br>**Rb[15: 0] <- 0x0001, if (Ra[15: 0] > 0);**<br>**Rb[15: 0] <- 0x0000, if (Ra[15: 0] == 0);**<br>**Rb[15: 0] <- 0xffff, if (Ra[15: 0] < 0);**<br><br>**Used for inverse quantization in image processing.**<br>**Handle each register in half word vector format.**<br>**Output 1 when value of Ra is positive, output -1 when value of Ra is negative, and output 0 when value of Ra is 0.** |

| Assembler mnemonic | Format | Affecting flag | Affected flag |
|---|---|---|---|
| **vsgnh Rb,Ra** | 32bit | — | — |

| Remarks |
|---|
| |

Fig. 610 vmaxh Rc,Ra,Rb

| | |
|---|---|
| Behavior | **Rc[31:16] <- max(Ra[31:16],Rb[31:16]);**<br>**Rc[15: 0] <- max(Ra[15: 0],Rb[15: 0]);**<br><br>**Handle each register in half word vector format.**<br>**Compare Ra with Rb, and store bigger one in Rc.** |

| Assembler mnemonic | Format | Affecting flag | Affected flag |
|---|---|---|---|
| **vmaxh Rc,Ra,Rb** | 32bit | — | — |

| Remarks |
|---|
| |

Fig. 611 vmaxb Rc,Ra,Rb

| | |
|---|---|
| Behavior | **Rc[31:24] <- max(Ra[31:24],Rb[31:24]);**<br>**Rc[23:16] <- max(Ra[23:16],Rb[23:16]);**<br>**Rc[15: 8] <- max(Ra[15: 8],Rb[15: 8]);**<br>**Rc[ 7: 0] <- max(Ra[ 7: 0],Rb[ 7: 0]);**<br><br>**Handle each register in byte vector format.**<br>**Compare Ra with Rb. and store bigger one in Rc.** |

| Assembler mnemonic | Format | Affecting flag | Affected flag |
|---|---|---|---|
| **vmaxb Rc,Ra,Rb** | 32bit | — | — |
| Remarks | | | |
| | | | |

Fig. 612 vminh Rc,Ra,Rb

| | | | | |
|---|---|---|---|---|
| Behavior | **Rc[31:16] <- min(Ra[31:16],Rb[31:16]);**<br>**Rc[15: 0] <- min(Ra[15: 0],Rb[15: 0]);**<br><br>**Handle each register in half word vector format.**<br>**Compare Ra with Rb, and store smaller one in Rc.** | | | |
| Assembler mnemonic | | Format | Affecting flag | Affected flag |
| **vminh Rc,Ra,Rb** | | 32bit | — | — |
| Remarks | | | | |
| | | | | |

Fig. 613 vminb Rc,Ra,Rb

| | | | | |
|---|---|---|---|---|
| Behavior | **Rc[31:24] <- min(Ra[31:24],Rb[31:24]);**<br>**Rc[23:16] <- min(Ra[23:16],Rb[23:16]);**<br>**Rc[15: 8] <- min(Ra[15: 8],Rb[15: 8]);**<br>**Rc[ 7: 0] <- min(Ra[ 7: 0],Rb[ 7: 0]);**<br><br>**Handle each register in half word vector format.**<br>**Compare Ra with Rb. and store bigger one in Rc.** | | | |
| Assembler mnemonic | | Format | Affecting flag | Affected flag |
| **vminb Rc,Ra,Rb** | | 32bit | — | — |
| Remarks | | | | |
| | | | | |

Fig. 614 vsel Rc,Ra,Rb

| | |
|---|---|
| Behavior | **Rc[31:24] <- (VC3 == 1) ? Ra[31:24] : Rb[31:24];**<br>**Rc[23:16] <- (VC2 == 1) ? Ra[23:16] : Rb[23:16];**<br>**Rc[15: 8] <- (VC1 == 1) ? Ra[15: 8] : Rb[15: 8];**<br>**Rc[ 7: 0] <- (VC0 == 1) ? Ra[ 7: 0] : Rb[ 7: 0];**<br><br>**Handle each register in byte vector format.**<br>**Select either Ra or Rb depending on values of VC0~VC3, and store result in Rc.** |

| Assembler mnemonic | Format | Affecting flag | Affected flag |
|---|---|---|---|
| **vsel Rc,Ra,Rb** | 32bit | – | VC0,VC1,VC2,VC3 |

| Remarks |
|---|
| |

Fig. 615 vmovt Rb,Ra

| | |
|---|---|
| Behavior | **=> vsel Rb,Ra,Rb**<br><br>**Rb[31:24] <- (VC3 == 1) ? Ra[31:24] : Rb[31:24];**<br>**Rb[23:16] <- (VC2 == 1) ? Ra[23:16] : Rb[23:16];**<br>**Rb[15: 8] <- (VC1 == 1) ? Ra[15: 8] : Rb[15: 8];**<br>**Rb[ 7: 0] <- (VC0 == 1) ? Ra[ 7: 0] : Rb[ 7: 0];**<br><br>**Handle each register in byte vector format.**<br>**Select either Ra or Rb depending on values of VC0~VC3, and store result in Rb.** |

| Assembler mnemonic | Format | Affecting flag | Affected flag |
|---|---|---|---|
| **vmovt Rb,Ra** | 32bit synonym | — | VC0,VC1,VC2,VC3 |

| Remarks |
|---|
| |

Fig. 616 vscmpeqb Ra,I5

| | |
|---|---|
| Behavior | **VC3 <- 0; VC3 <- 1, if(Ra[31:24] == sext8(I5));**<br>**VC2 <- 0; VC2 <- 1, if(Ra[23:16] == sext8(I5));**<br>**VC1 <- 0; VC1 <- 1, if(Ra[15: 8] == sext8(I5));**<br>**VC0 <- 0; VC0 <- 1, if(Ra[ 7: 0] == sext8(I5));**<br><br>**Handle Ra in byte vector format.**<br>**Compare Ra with immediate value (I5), and store result in VC0～VC3.** |

| Assembler mnemonic | Format | Affecting flag | Affected flag |
|---|---|---|---|
| **vscmpeqb Ra,I5** | 32bit | VC0,VC1,<br>VC2,VC3 | — |

| Remarks |
|---|
| I5 is a signed value. |

Fig. 617 vscmpneb Ra,I5

| | |
|---|---|
| Behavior | **VC3 <- 0; VC3 <- 1, if(Ra[31:24] != sext8(I5));**<br>**VC2 <- 0; VC2 <- 1, if(Ra[23:16] != sext8(I5));**<br>**VC1 <- 0; VC1 <- 1, if(Ra[15: 8] != sext8(I5));**<br>**VC0 <- 0; VC0 <- 1, if(Ra[ 7: 0] != sext8(I5));**<br><br>**Handle Ra in byte vector format.**<br>**Compare Ra with immediate value (I5), and store result in VC0～VC3.** |

| Assembler mnemonic | Format | Affecting flag | Affected flag |
|---|---|---|---|
| **vscmpneb Ra,I5** | 32bit | VC0,VC1,<br>VC2,VC3 | — |

| Remarks |
|---|
| I5 is a signed value. |

Fig. 618 vscmpgtb Ra,I5

| | |
|---|---|
| Behavior | **VC3 <- 0; VC3 <- 1, if(Ra[31:24] > sext8(I5));**<br>**VC2 <- 0; VC2 <- 1, if(Ra[23:16] > sext8(I5));**<br>**VC1 <- 0; VC1 <- 1, if(Ra[15: 8] > sext8(I5));**<br>**VC0 <- 0; VC0 <- 1, if(Ra[ 7: 0] > sext8(I5));**<br><br>**Handle Ra in byte vector format.**<br>**Compare Ra with immediate value (I5), and store result in VC0～VC3.** |

| Assembler mnemonic | Format | Affecting flag | Affected flag |
|---|---|---|---|
| **vscmpgtb Ra,I5** | 32bit | VC0,VC1,<br>VC2,VC3 | — |

| Remarks |
|---|
| I5 is a signed value. |

Fig. 619 vscmpleb Ra,I5

| | |
|---|---|
| Behavior | **VC3 <- 0; VC3 <- 1, if(Ra[31:24] <= sext8(I5));**<br>**VC2 <- 0; VC2 <- 1, if(Ra[23:16] <= sext8(I5));**<br>**VC1 <- 0; VC1 <- 1, if(Ra[15: 8] <= sext8(I5));**<br>**VC0 <- 0; VC0 <- 1, if(Ra[ 7: 0] <= sext8(I5));**<br><br>**Handle Ra in byte vector format.**<br>**Compare Ra with immediate value (I5), and store result in VC0～VC3.** |

| Assembler mnemonic | Format | Affecting flag | Affected flag |
|---|---|---|---|
| **vscmpleb Ra,I5** | 32bit | VC0,VC1,<br>VC2,VC3 | — |

| Remarks |
|---|
| I5 is a signed value. |

Fig. 620 vscmpgeb Ra,I5

| | |
|---|---|
| Behavior | **VC3 <- 0; VC3 <- 1, if(Ra[31:24] >= sext8(I5));**<br>**VC2 <- 0; VC2 <- 1, if(Ra[23:16] >= sext8(I5));**<br>**VC1 <- 0; VC1 <- 1, if(Ra[15: 8] >= sext8(I5));**<br>**VC0 <- 0; VC0 <- 1, if(Ra[ 7: 0] >= sext8(I5));**<br><br>**Handle Ra in byte vector format.**<br>**Compare Ra with immediate value (I5), and store result in VC0~VC3.** |

| Assembler mnemonic | Format | Affecting flag | Affected flag |
|---|---|---|---|
| **vscmpgeb Ra,I5** | 32bit | VC0,VC1,<br>VC2,VC3 | — |

| Remarks |
|---|
| I5 is a signed value. |

Fig. 621 vscmpltb Ra,I5

| | |
|---|---|
| Behavior | **VC3 <- 0; VC3 <- 1, if(Ra[31:24] < sext8(I5));**<br>**VC2 <- 0; VC2 <- 1, if(Ra[23:16] < sext8(I5));**<br>**VC1 <- 0; VC1 <- 1, if(Ra[15: 8] < sext8(I5));**<br>**VC0 <- 0; VC0 <- 1, if(Ra[ 7: 0] < sext8(I5));**<br><br>**Handle Ra in byte vector format.**<br>**Compare Ra with immediate value (I5), and store result in VC0~ VC3.** |

| Assembler mnemonic | Format | Affecting flag | Affected flag |
|---|---|---|---|
| **vscmpltb Ra,I5** | 32bit | VC0,VC1,<br>VC2,VC3 | — |

| Remarks |
|---|
| I5 is a signed value. |

Fig. 622 vscmpeqh Ra,I5

| | |
|---|---|
| Behavior | **VC3:VC2 <- 0:0;**<br>**VC3:VC2 <- 1:1, if(Ra[31:16] == sext16(I5));**<br>**VC1:VC0 <- 0:0;**<br>**VC1:VC0 <- 1:1, if(Ra[15: 0] == sext16(I5));**<br><br>**Handle Ra in half word vector format.**<br>**Compare Ra with immediate value (I5), and store result in VC0~VC3.** |

| Assembler mnemonic | Format | Affecting flag | Affected flag |
|---|---|---|---|
| **vscmpeqh Ra,I5** | 32bit | VC0,VC1,<br>VC2,VC3 | — |

| Remarks |
|---|
| I5 is a signed value. |

Fig. 623 vscmpneh Ra,I5

<table>
<tr><td>Behavior</td><td colspan="3">VC3:VC2 <- 0:0;<br>VC3:VC2 <- 1:1, if(Ra[31:16] != sext16(I5));<br>VC1:VC0 <- 0:0;<br>VC1:VC0 <- 1:1, if(Ra[15: 0] != sext16(I5));<br><br>Handle Ra in half word vector format.<br>Compare Ra with immediate value (I5), and store result in VC0~VC3.</td></tr>
<tr><td>Assembler mnemonic</td><td>Format</td><td>Affecting flag</td><td>Affected flag</td></tr>
<tr><td>vscmpneh Ra,I5</td><td>32bit</td><td>VC0,VC1,<br>VC2,VC3</td><td>—</td></tr>
<tr><td colspan="4">Remarks</td></tr>
<tr><td colspan="4">I5 is a signed value.</td></tr>
</table>

Fig. 624 vscmpgth Ra,I5

| | |
|---|---|
| Behavior | **VC3:VC2 <- 0:0;**<br>**VC3:VC2 <- 1:1, if(Ra[31:16] > sext16(I5));**<br>**VC1:VC0 <- 0:0;**<br>**VC1:VC0 <- 1:1, if(Ra[15: 0] > sext16(I5));**<br><br>**Handle Ra in half word vector format.**<br>**Compare Ra with immediate value (I5), and store result in VC0～VC3.** |

| Assembler mnemonic | Format | Affecting flag | Affected flag |
|---|---|---|---|
| **vscmpgth Ra,I5** | 32bit | VC0,VC1,<br>VC2,VC3 | — |

| Remarks |
|---|
| I5 is a signed value. |

Fig. 625 vscmpleh Ra,I5

| | |
|---|---|
| Behavior | **VC3:VC2 <- 0:0;**<br>**VC3:VC2 <- 1:1, if(Ra[31:16] <= sext16(I5));**<br>**VC1:VC0 <- 0:0;**<br>**VC1:VC0 <- 1:1, if(Ra[15: 0] <= sext16(I5));**<br><br>**Handle Ra in half word vector format.**<br>**Compare Ra with immediate value (I5), and store result in VC0～VC3.** |

| Assembler mnemonic | Format | Affecting flag | Affected flag |
|---|---|---|---|
| **vscmpleh Ra,I5** | 32bit | VC0,VC1,<br>VC2,VC3 | — |

| Remarks |
|---|
| I5 is a signed value. |

Fig. 626 vscmpgeh Ra,I5

| | |
|---|---|
| Behavior | **VC3:VC2 <- 0:0;**<br>**VC3:VC2 <- 1:1, if(Ra[31:16] >= sext16(I5));**<br>**VC1:VC0 <- 0:0;**<br>**VC1:VC0 <- 1:1, if(Ra[15: 0] >= sext16(I5));**<br><br>**Handle Ra in half word vector format.**<br>**Compare Ra with immediate value (I5), and store result in VC0～VC3.** |

| Assembler mnemonic | Format | Affecting flag | Affected flag |
|---|---|---|---|
| **vscmpgeh Ra,I5** | 32bit | VC0,VC1,<br>VC2,VC3 | — |

| Remarks |
|---|
| I5 is a signed value. |

Fig. 627 vscmplth Ra,I5

| | |
|---|---|
| Behavior | **VC3:VC2 <- 0:0;**<br>**VC3:VC2 <- 1:1, if(Ra[31:16] < sext16(I5));**<br>**VC1:VC0 <- 0:0;**<br>**VC1:VC0 <- 1:1, if(Ra[15: 0] < sext16(I5));**<br><br>**Handle Ra in half word vector format.**<br>**Compare Ra with immediate value (I5), and store result in VC0～VC3.** |

| Assembler mnemonic | Format | Affecting flag | Affected flag |
|---|---|---|---|
| **vscmplth Ra,I5** | 32bit | — | — |

| Remarks |
|---|
| I5 is a signed value. |

Fig. 628 vcmpeqh Ra,Rb

| | |
|---|---|
| Behavior | if (Ra[31:16]==Rb[31:16]) {<br>VC3:VC2<-1:1;<br>} else {<br>VC3:VC2<-0:0;<br>}<br>if (Ra[15: 0]==Rb[15: 0]) {<br>VC1:VC0<-1:1;<br>} else {<br>VC1:VC0<-0:0;<br>}<br><br>**Handle each register in half word vector format.**<br>**Compare Ra with Rb, and store result in VC0～VC3.** |

| Assembler mnemonic | Format | Affecting flag | Affected flag |
|---|---|---|---|
| **vcmpeqh Ra,Rb** | 32bit | VC0,VC1,VC2,VC3 | — |

| Remarks |
|---|
| |

Fig. 629 vcmpneh Ra,Rb

| | |
|---|---|
| Behavior | **if (Ra[31:16]!=Rb[31:16]) {**<br>**VC3:VC2<-1:1;**<br>**} else {**<br>**VC3:VC2<-0:0;**<br>**}**<br>**if (Ra[15: 0]!=Rb[15: 0]) {**<br>**VC1:VC0<-1:1;**<br>**} else {**<br>**VC1:VC0<-0:0;**<br>**}**<br><br>**Handle each register in half word vector format.**<br>**Compare Ra with Rb, and store result in VC0~VC3.** |

| Assembler mnemonic | Format | Affecting flag | Affected flag |
|---|---|---|---|
| **vcmpneh Ra,Rb** | 32bit | VC0,VC1,VC2,VC3 | — |

| Remarks |
|---|
| |

Fig. 630 vcmpgth Ra,Rb

| | |
|---|---|
| Behavior | **if (Ra[31:16]> Rb[31:16]) {**<br>**VC3:VC2<-1:1;**<br>**} else {**<br>**VC3:VC2<-0:0;**<br>**}**<br>**if (Ra[15: 0]> Rb[15: 0]) {**<br>**VC1:VC0<-1:1;**<br>**} else {**<br>**VC1:VC0<-0:0;**<br>**}**<br><br>**Handle each register in half word vector format.**<br>**Compare Ra with Rb, and store result in VC0～VC3.** |

| Assembler mnemonic | Format | Affecting flag | Affected flag |
|---|---|---|---|
| **vcmpgth Ra,Rb** | 32bit | VC0,VC1,VC2,VC3 | — |

| Remarks |
|---|
| |

Fig. 631 vcmpleh Ra,Rb

Behavior

```
if (Ra[31:16]<=Rb[31:16]) {
        VC3:VC2<-1:1;
} else {
        VC3:VC2<-0:0;
}
if (Ra[15: 0]<=Rb[15: 0]) {
        VC1:VC0<-1:1;
} else {
        VC1:VC0<-0:0;
}
```

Handle each register in half word vector format.

Compare Ra with Rb, and store result in VC0~VC3.

| Assembler mnemonic | Format | Affecting flag | Affected flag |
|---|---|---|---|
| **vcmpleh Ra,Rb** | 32bit | VC0,VC1,VC2,VC3 | — |

| Remarks |
|---|
| |

Fig. 632 vcmpgeh Ra,Rb

| | |
|---|---|
| Behavior | **if (Ra[31:16]>=Rb[31:16]) {**<br>**VC3:VC2<-1:1;**<br>**} else {**<br>**VC3:VC2<-0:0;**<br>**}**<br>**if (Ra[15: 0]>=Rb[15: 0]) {**<br>**VC1:VC0<-1:1;**<br>**} else {**<br>**VC1:VC0<-0:0;**<br>**}**<br><br>**Handle each register in half word vector format.**<br>**Compare Ra with Rb, and store result in VC0～VC3.** |

| Assembler mnemonic | Format | Affecting flag | Affected flag |
|---|---|---|---|
| **vcmpgeh Ra,Rb** | 32bit | VC0,VC1,VC2,VC3 | — |

| Remarks |
|---|
| |

Fig. 633 vcmplth Ra,Rb

<table>
<tr><td>Behavior</td><td colspan="3">

```
if (Ra[31:16]< Rb[31:16]) {
        VC3:VC2<-1:1;
} else {
        VC3:VC2<-0:0;
}
if (Ra[15: 0]< Rb[15: 0]) {
        VC1:VC0<-1:1;
} else {
        VC1:VC0<-0:0;
}
```

Handle each register in half word vector format.<br>Compare Ra with Rb, and store result in VC0~VC3.</td></tr>
<tr><td>Assembler mnemonic</td><td>Format</td><td>Affecting flag</td><td>Affected flag</td></tr>
<tr><td>vcmplth Ra,Rb</td><td>32bit</td><td>VC0,VC1,VC2,VC3</td><td>—</td></tr>
<tr><td colspan="4">Remarks</td></tr>
<tr><td colspan="4"></td></tr>
</table>

Fig. 634 vcmpeqb Ra,Rb

| | |
|---|---|
| Behavior | if (Ra[31:24]==Rb[31:24]) { VC3<-1; } else { VC3<-0; }<br>if (Ra[23:16]==Rb[23:16]) { VC2<-1; } else { VC2<-0; }<br>if (Ra[15: 8]==Rb[15: 8]) { VC1<-1; } else { VC1<-0; }<br>if (Ra[ 7: 0]==Rb[ 7: 0]) { VC0<-1; } else { VC0<-0; }<br><br>**Handle each register in byte vector format.**<br>**Compare Ra with Rb, and store result in VC0～VC3.** |

| Assembler mnemonic | Format | Affecting flag | Affected flag |
|---|---|---|---|
| **vcmpeqb Ra,Rb** | 32bit | VC0,VC1,VC2,VC3 | — |

| Remarks |
|---|
| |

Fig. 635 vcmpneb Ra,Rb

| | |
|---|---|
| Behavior | **if (Ra[31:24]!=Rb[31:24]) { VC3<-1; } else { VC3<-0; }**<br>**if (Ra[23:16]!=Rb[23:16]) { VC2<-1; } else { VC2<-0; }**<br>**if (Ra[15: 8]!=Rb[15: 8]) { VC1<-1; } else { VC1<-0; }**<br>**if (Ra[ 7: 0]!=Rb[ 7: 0]) { VC0<-1; } else { VC0<-0; }**<br><br>**Handle each register in byte vector format.**<br>**Compare Ra with Rb, and store result in VC0~VC3.** |

| Assembler mnemonic | Format | Affecting flag | Affected flag |
|---|---|---|---|
| **vcmpneb Ra,Rb** | 32bit | VC0,VC1,VC2,VC3 | — |

| Remarks |
|---|
| |

Fig. 636 vcmpgtb Ra,Rb

| | |
|---|---|
| Behavior | if (Ra[31:24]> Rb[31:24]) { VC3<-1; } else { VC3<-0; }<br>if (Ra[23:16]> Rb[23:16]) { VC2<-1; } else { VC2<-0; }<br>if (Ra[15: 8]> Rb[15: 8]) { VC1<-1; } else { VC1<-0; }<br>if (Ra[ 7: 0]> Rb[ 7: 0]) { VC0<-1; } else { VC0<-0; }<br><br>Handle each register in byte vector format.<br>Compare Ra with Rb, and store result in VC0～VC3. |

| Assembler mnemonic | Format | Affecting flag | Affected flag |
|---|---|---|---|
| vcmpgtb Ra,Rb | 32bit | VC0,VC1,VC2,VC3 | — |

| Remarks |
|---|
| |

Fig. 637 vcmpleb Ra,Rb

| | |
|---|---|
| Behavior | if (Ra[31:24]<=Rb[31:24]) { VC3<-1; } else { VC3<-0; }<br>if (Ra[23:16]<=Rb[23:16]) { VC2<-1; } else { VC2<-0; }<br>if (Ra[15: 8]<=Rb[15: 8]) { VC1<-1; } else { VC1<-0; }<br>if (Ra[ 7: 0]<=Rb[ 7: 0]) { VC0<-1; } else { VC0<-0; }<br><br>Handle each register in byte vector format.<br>Compare Ra with Rb, and store result in VC0~VC3. |

| Assembler mnemonic | Format | Affecting flag | Affected flag |
|---|---|---|---|
| **vcmpleb Ra,Rb** | 32bit | VC0,VC1,VC2,VC3 | — |

| Remarks |
|---|
| |

Fig. 638 vcmpgeb Ra,Rb

| | |
|---|---|
| Behavior | **if (Ra[31:24] >= Rb[31:24]) { VC3<-1; } else { VC3<-0; }**<br>**if (Ra[23:16] >= Rb[23:16]) { VC2<-1; } else { VC2<-0; }**<br>**if (Ra[15: 8] >= Rb[15: 8]) { VC1<-1; } else { VC1<-0; }**<br>**if (Ra[ 7: 0] >= Rb[ 7: 0]) { VC0<-1; } else { VC0<-0; }**<br><br>**Handle each register in byte vector format.**<br>**Compare Ra with Rb, and store result in VC0~VC3.** |

| Assembler mnemonic | Format | Affecting flag | Affected flag |
|---|---|---|---|
| **vcmpgeb Ra,Rb** | 32bit | VC0,VC1,VC2,VC3 | — |

| Remarks |
|---|
| |

Fig. 639 vcmpltb Ra,Rb

| | |
|---|---|
| Behavior | **if (Ra[31:24]< Rb[31:24]) { VC3<-1; } else { VC3<-0; }**<br>**if (Ra[23:16]< Rb[23:16]) { VC2<-1; } else { VC2<-0; }**<br>**if (Ra[15: 8]< Rb[15: 8]) { VC1<-1; } else { VC1<-0; }**<br>**if (Ra[ 7: 0]< Rb[ 7: 0]) { VC0<-1; } else { VC0<-0; }**<br><br>**Handle each register in byte vector format.**<br>**Compare Ra with Rb, and store result in VC0～VC3.** |

| Assembler mnemonic | Format | Affecting flag | Affected flag |
|---|---|---|---|
| **vcmpltb Ra,Rb** | 32bit | VC0,VC1,VC2,VC3 | – |

| Remarks |
|---|
| |

Fig. 640 vaslh Rc,Ra,Rb

| | |
|---|---|
| Behavior | **tmp[4:0] <- Rb[4:0];**<br>**tmp[4:0] <- 15, if (Rb > 0x0000_000f );**<br>**tmp[4:0] <- -15, if (Rb < 0xffff_fff1 );**<br>**Rc[31:16] <- Ra[31:16] << abs(tmp[4:0]);**<br>**Rc[31:16] <- Ra[31:16] >> abs(tmp[4:0]), if (tmp[4:0] < 0);**<br>**Rc[15: 0] <- Ra[15: 0] << abs(tmp[4:0]);**<br>**Rc[15: 0] <- Ra[15: 0] >> abs(tmp[4:0]), if (tmp[4:0] < 0);**<br><br>**Handle Ra and Rc in half word vector format.**<br>**Perform arithmetic shift left of Ra only by the number of bits indicated by Rb. Rb is saturated to ±15 or fewer, and arithmetic shift right is performed if value of Rb is negative.** |

| Assembler mnemonic | Format | Affecting flag | Affected flag |
|---|---|---|---|
| **vaslh Rc,Ra,Rb** | 32bit | — | — |

| Remarks |
|---|
| |

Fig. 641 vaslh Rb,Ra,I4

| | |
|---|---|
| Behavior | **Rb[31:16] <- Ra[31:16] << I4[3:0];**<br>**Rb[15: 0] <- Ra[15: 0] << I4[3:0];**<br><br>**Handle each register in half word vector format.**<br>**Perform arithmetic shift left of Ra only by the number of bits represented by immediate value (I4).** |

| Assembler mnemonic | Format | Affecting flag | Affected flag |
|---|---|---|---|
| **vaslh Rb,Ra,I4** | 32bit | — | — |

| Remarks |
|---|
| I4 is an unsigned value. |

Fig. 642 vaslvh Rc,Ra,Rb

Behavior

```
tmp[4:0] <- Rb[4:0];
tmp[4:0] <-    15, if (Rb > 0x0000_000f );
tmp[4:0] <-   -15, if (Rb < 0xffff_fff1 );
tmp2[30:0] <- sext31(Ra[31:16]) << abs(tmp[4:0]);
tmp2[30:0] <- sext31(Ra[31:16]) >> abs(tmp[4:0]),if (tmp[4:0] < 0);
Rc[31:16] <- tmp2[15:0];
Rc[31:16] <- 0x7fff, CFR.OVS <- 1,
                 if (tmp2[30:0] > 0x0000_7fff[30:0]);
Rc[31:16] <- 0x8000, CFR.OVS <- 1,
                 if (tmp2[30:0] < 0x7fff_8000[30:0]);

tmp2[30:0] <- sext31(Ra[15: 0]) << abs(tmp[4:0]);
tmp2[30:0] <- sext31(Ra[15: 0]) >> abs(tmp[4:0]),if (tmp[4:0] < 0);
Rc[15: 0] <- tmp2[15:0];
Rc[15: 0] <- 0x7fff, CFR.OVS <- 1,
                 if (tmp2[30:0] > 0x0000_7fff[30:0]);
Rc[15: 0] <- 0x8000, CFR.OVS <- 1,
                 if (tmp2[30:0] < 0x7fff_8000[30:0]);
```

Handle Ra and Rc in half word vector format.
Perform arithmetic shift left of Ra only by the number of bits indicated by Rb. Saturate result if it cannot be represented by signed 16 bits. Rb is saturated to ±15 or fewer, and arithmetic shift right is performed if value of Rb is negative.

| Assembler mnemonic | Format | Affecting flag | Affected flag |
|---|---|---|---|
| **vaslvh Rc,Ra,Rb** | 32bit | CFR.OVS | — |

| Remarks |
|---|
| |

Fig. 643 vaslvh Rb,Ra,I4

| | |
|---|---|
| Behavior | **tmp[30:0] <- sext31(Ra[31:16]) << I4[3:0];**<br>**Rb[31:16] <- Ra[31:16] << I4[3:0];**<br>**Rb[31:16] <- 0x7fff, CFR.OVS <- 1,**<br>**if (tmp[30:0] > 0x0000_7fff[30:0]);**<br>**Rb[31:16] <- 0x8000, CFR.OVS <- 1,**<br>**if (tmp[30:0] < 0x7fff_8000[30:0]);**<br><br>**tmp[30:0] <- sext31(Ra[15: 0]) << I4[3:0];**<br>**Rb[15: 0] <- Ra[15: 0] << I4[3:0];**<br>**Rb[15: 0] <- 0x7fff, CFR.OVS <- 1,**<br>**if (tmp[30:0] > 0x0000_7fff[30:0]);**<br>**Rb[15: 0] <- 0x8000, CFR.OVS <- 1,**<br>**if (tmp[30:0] < 0x7fff_8000[30:0]);**<br><br>**Handle each register in half word vector format.**<br>**Handle Ra as two 16-bit value, and perform arithmetic shift left of Ra only by the number of bits represented by immediate value (I4). Saturate result if it cannot be represented by signed 16 bits.** |

| Assembler mnemonic | Format | Affecting flag | Affected flag |
|---|---|---|---|
| **vaslvh Rb,Ra,I4** | 32bit | CFR.OVS | —¥ |

| Remarks |
|---|
| I4 is an unsigned value. |

Fig. 644 vasrh Rb,Ra,I4

| | |
|---|---|
| Behavior | **Rb[31:16] <- Ra[31:16] >> I4[3:0];**<br>**Rb[15: 0] <- Ra[15: 0] >> I4[3:0];**<br><br>**Handle each register in half word vector format.**<br>**Perform arithmetic shift right of Ra only by the number of bits represented by immediate value (I4).** |

| Assembler mnemonic | Format | Affecting flag | Affected flag |
|---|---|---|---|
| **vasrh Rb,Ra,I4** | 32bit | — | — |

| Remarks |
|---|
| I4 is an unsigned value. |

Fig. 645 vasrvh Rc,Ra,Rb

<table>
<tr><td>Behavior</td><td colspan="3">tmp[4:0] <- Rb[4:0];<br>tmp[4:0] <- 15, if (Rb > 0x0000_000f );<br>tmp[4:0] <- -15, if (Rb < 0xffff_fff1 );<br>tmp2[30:0] <- sext31(Ra[31:16]) >> abs(tmp[4:0]);<br>tmp2[30:0] <- sext31(Ra[31:16]) << abs(tmp[4:0]),<br>if (tmp[4:0] < 0);<br>Rc[31:16] <- tmp2[15:0];<br>Rc[31:16] <- 0x7fff, CFR.OVS <- 1,<br>if (tmp2[30:0] > 0x0000_7fff[30:0]);<br>Rc[31:16] <- 0x8000, CFR.OVS <- 1,<br>if (tmp2[30:0] < 0x7fff_8000[30:0]);<br><br>tmp2[30:0] <- sext31(Ra[15: 0]) >> abs(tmp[4:0]);<br>tmp2[30:0] <- sext31(Ra[15: 0]) << abs(tmp[4:0]),<br>if (tmp[4:0] < 0);<br>Rc[15: 0] <- tmp2[15:0];<br>Rc[15: 0] <- 0x7fff, CFR.OVS <- 1,<br>if (tmp2[30:0] > 0x0000_7fff[30:0]);<br>Rc[15: 0] <- 0x8000, CFR.OVS <- 1,<br>if (tmp2[30:0] < 0x7fff_8000[30:0]);<br><br>Handle Ra and Rc in half word vector format.<br>Perform arithmetic shift right of Ra only by the number of bits indicated by Rb.<br>Saturate result if it cannot be represented by signed 16 bits. Rb is saturated to ±15 or fewer, and arithmetic shift left is performed if value of Rb is negative.</td></tr>
<tr><td>Assembler mnemonic</td><td>Format</td><td>Affecting flag</td><td>Affected flag</td></tr>
<tr><td>vasrvh Rc,Ra,Rb</td><td>32bit</td><td>CFR.OVS</td><td>—</td></tr>
<tr><td colspan="4">Remarks</td></tr>
<tr><td colspan="4"></td></tr>
</table>

Fig. 646 vlslh Rc,Ra,Rb

| | |
|---|---|
| Behavior | => vaslh Rc,Ra,Rb<br><br>tmp[4:0] <- Rb[4:0];<br>tmp[4:0] <- 15, if (Rb > 0x0000_000f );<br>tmp[4:0] <- -15, if (Rb < 0xffff_fff1 );<br>Rc[31:16] <- Ra[31:16] << abs(tmp[4:0]);<br>Rc[31:16] <- Ra[31:16] >> abs(tmp[4:0]), if (tmp[4:0] < 0);<br>Rc[15: 0] <- Ra[15: 0] << abs(tmp[4:0]);<br>Rc[15: 0] <- Ra[15: 0] >> abs(tmp[4:0]), if (tmp[4:0] < 0);<br><br>Handle Ra and Rc in half word vector format.<br>Perform logical shift left of Ra only by the number of bits indicated by Rb. Rb is saturated to ±15 or fewer, and arithmetic shift right is performed if value of Rb is negative. |

| Assembler mnemonic | Format | Affecting flag | Affected flag |
|---|---|---|---|
| vlslh Rc,Ra,Rb | 32bit synonym | — | — |

| Remarks |
|---|
| ※Arithmetic shift right is performed if the amount of shift is negative. |

Fig. 647 vlslh Rb,Ra,I4

| | |
|---|---|
| Behavior | **=> vaslh Rb,Ra,I4**<br><br>**Rb[31:16] <- Ra[31:16] << I4[3:0];**<br>**Rb[15: 0] <- Ra[15: 0] << I4[3:0];**<br><br>**Handle each register in half word vector format.**<br>**Perform arithmetic shift left of Ra only by the number of bits represented by immediate value (I4).** |

| Assembler mnemonic | Format | Affecting flag | Affected flag |
|---|---|---|---|
| **vlslh Rb,Ra,I4** | 32bit synonym | — | — |

| Remarks |
|---|
| I4 is an unsigned value. |

Fig. 648 vlsrh Rc,Ra,Rb

| | |
|---|---|
| Behavior | **tmp[4:0] <- Rb[4:0];**<br>**tmp[4:0] <- 15, if (Rb > 0x0000_000f );**<br>**tmp[4:0] <- -15, if (Rb < 0xffff_fff1 );**<br>**Rc[31:16] <- Ra[31:16] >>> abs(tmp[4:0]);**<br>**Rc[31:16] <- Ra[31:16] << abs(tmp[4:0]), if (tmp[4:0] < 0);**<br>**Rc[15: 0] <- Ra[15: 0] >>> abs(tmp[4:0]);**<br>**Rc[15: 0] <- Ra[15: 0] << abs(tmp[4:0]), if (tmp[4:0] < 0);**<br><br>**Handle Ra and Rc in half word vector format.**<br>**Perform logical shift right of Ra only by the number of bits indicated by Rb. Rb is saturated to ±15 or fewer, and logical shift left is performed if value of Rb is negative.** |

| Assembler mnemonic | Format | Affecting flag | Affected flag |
|---|---|---|---|
| **vlsrh Rc,Ra,Rb** | 32bit | — | — |

| Remarks |
|---|
| |

Fig. 649 vlsrh Rb,Ra,I4

| | |
|---|---|
| Behavior | **Rb[31:16] <- Ra[31:16] >>> I4[3:0];**<br>**Rb[15: 0] <- Ra[15: 0] >>> I4[3:0];**<br><br>**Handle each register in half word vector format.**<br>**Perform arithmetic shift right of Ra only by the number of bits represented by immediate value (I4).** |

| Assembler mnemonic | Format | Affecting flag | Affected flag |
|---|---|---|---|
| **vlsrh Rb,Ra,I4** | 32bit | — | — |

| Remarks |
|---|
| I4 is an unsigned value. |

Fig. 650 vrolh Rc,Ra,Rb

| | | | |
|---|---|---|---|
| Behavior | **tmp[31:16] <- Ra[31:16] << Rb[3:0];**<br>**tmp2[31:16]<- Ra[31:16] >>> (16 - Rb[3:0]);**<br>**Rc[31:16] <- tmp[31:16] \| tmp2[31:16];**<br>**tmp[15: 0] <- Ra[15: 0] << Rb[3:0];**<br>**tmp2[15: 0] <- Ra[15: 0] >>> (16 - Rb[3:0]);**<br>**Rc[15: 0] <- tmp[15: 0] \| tmp2[15: 0];**<br><br>**Handle Ra and Rc in half word vector format.**<br>**Rotate Ra to left only by the number of bits indicated by Rb.** | | |
| Assembler mnemonic | Format | Affecting flag | Affected flag |
| **vrolh Rc,Ra,Rb** | 32bit | — | — |
| Remarks | | | |
| | | | |

Fig. 651 vrolh Rb,Ra,I4

| | |
|---|---|
| Behavior | **tmp1[31:16] <- Ra[31:16] << I4[3:0];**<br>**tmp2[31:16] <- Ra[31:16] >>> (16-I4[3:0]);**<br>**tmp1[15: 0] <- Ra[15: 0] << I4[3:0];**<br>**tmp2[15: 0] <- Ra[15: 0] >>> (16-I4[3:0]);**<br>**Rb <- tmp1[31:0] \| tmp2[31:0];**<br><br>**Handle each register in half word vector format.**<br>**Rotate Ra to left only by the number of bits represented by immediate value (I4).** |

| Assembler mnemonic | Format | Affecting flag | Affected flag |
|---|---|---|---|
| **vrolh Rb,Ra,I4** | 32bit | — | — |

| Remarks |
|---|
| I4 is an unsigned value. |

Fig. 652 vrorh Rb,Ra,I4

| | |
|---|---|
| Behavior | **=> vrolh Rb,Ra,(16-I4)&0xf**<br><br>**tmp1[31:16] <- Ra[31:16] << I4[3:0];**<br>**tmp2[31:16] <- Ra[31:16] >>> (16-I4[3:0]);**<br>**tmp1[15: 0] <- Ra[15: 0] << I4[3:0];**<br>**tmp2[15: 0] <- Ra[15: 0] >>> (16-I4[3:0]);**<br>**Rb <- tmp1[31:0] \| tmp2[31:0];**<br><br>**Handle each register in half word vector format.**<br>**Rotate Ra to right only by the number of bits represented by immediate value (I4).** |

| Assembler mnemonic | Format | Affecting flag | Affected flag |
|---|---|---|---|
| **vrorh Rb,Ra,I4** | 32bit synonym | — | — |

| Remarks |
|---|
| I4 is an unsigned value. |

Fig. 653 vasrh Rc,Ra,Rb

| | |
|---|---|
| Behavior | **tmp[4:0] <- Rb[4:0];**<br>**tmp[4:0] <- 15, if (Rb > 0x0000_000f );**<br>**tmp[4:0] <- -15, if (Rb < 0xffff_fff1 );**<br>**Rc[31:16] <- Ra[31:16] >> abs(tmp[4:0]);**<br>**Rc[31:16] <- Ra[31:16] << abs(tmp[4:0]), if (tmp[4:0] < 0);**<br>**Rc[15: 0] <- Ra[15: 0] >> abs(tmp[4:0]);**<br>**Rc[15: 0] <- Ra[15: 0] << abs(tmp[4:0]), if (tmp[4:0] < 0);**<br><br>**Handle Ra and Rc in half word vector format.**<br>**Perform arithmetic shift right of Ra only by the number of bits indicated by Rb. Rb is saturated to ±15 or fewer, and arithmetic shift left is performed if value of Rb is negative.** |

| Assembler mnemonic | Format | Affecting flag | Affected flag |
|---|---|---|---|
| **vasrh Rc,Ra,Rb** | 32bit | — | — |

| Remarks |
|---|
| |

Fig. 654 vaslb Rc,Ra,Rb

Behavior

```
tmp[3:0] <- Rb[3:0];
tmp[3:0] <-  7, if (Rb > 0x0000_0007 );
tmp[3:0] <- -7, if (Rb < 0xffff_fff9 );
Rc[31:24] <- Ra[31:24] <<  abs(tmp[3:0]);
Rc[31:24] <- Ra[31:24] >>  abs(tmp[3:0]),   if (tmp[3:0] < 0);
Rc[23:16] <- Ra[23:16] <<  abs(tmp[3:0]);
Rc[23:16] <- Ra[23:16] >>  abs(tmp[3:0]),   if (tmp[3:0] < 0);
Rc[15: 8] <- Ra[15: 8] <<  abs(tmp[3:0]);
Rc[15: 8] <- Ra[15: 8] >>  abs(tmp[3:0]),   if (tmp[3:0] < 0);
Rc[ 7: 0] <- Ra[ 7: 0] <<  abs(tmp[3:0]);
Rc[ 7: 0] <- Ra[ 7: 0] >>  abs(tmp[3:0]),   if (tmp[3:0] < 0);
```

Handle Ra and Rc in byte vector format.

Perform arithmetic shift left of Ra only by the number of bits indicated by Rb. Rb is saturated to ±7 or fewer, and arithmetic shift right is performed if value of Rb is negative.

| Assembler mnemonic | Format | Affecting flag | Affected flag |
|---|---|---|---|
| vaslb Rc,Ra,Rb | 32bit | — | — |

Remarks

Fig. 655 vaslb Rb,Ra,I3

| | |
|---|---|
| Behavior | **Rb[31:24] <- Ra[31:24] << I3[2:0];**<br>**Rb[23:16] <- Ra[23:16] << I3[2:0];**<br>**Rb[15: 8] <- Ra[15: 8] << I3[2:0];**<br>**Rb[ 7: 0] <- Ra[ 7: 0] << I3[2:0];**<br><br>**Handle each register in byte vector format.**<br>**Perform arithmetic shift left of Ra only by the number of bits represented by immediate value (I3).** |

| Assembler mnemonic | Format | Affecting flag | Affected flag |
|---|---|---|---|
| **vaslb Rb,Ra,I3** | 32bit | — | — |

| Remarks |
|---|
| I3 is an unsigned value. |

Fig. 656 vasrb Rc,Ra,Rb

| | |
|---|---|
| Behavior | **tmp[3:0] <- Rb[3:0];**<br>**tmp[3:0] <- 7, if (Rb > 0x0000_0007 );**<br>**tmp[3:0] <- -7, if (Rb < 0xffff_fff9 );**<br>**Rc[31:24] <- Ra[31:24] >> abs(tmp[3:0]);**<br>**Rc[31:24] <- Ra[31:24] << abs(tmp[3:0]), if (tmp[3:0] < 0);**<br>**Rc[23:16] <- Ra[23:16] >> abs(tmp[3:0]);**<br>**Rc[23:16] <- Ra[23:16] << abs(tmp[3:0]), if (tmp[3:0] < 0);**<br>**Rc[15: 8] <- Ra[15: 8] >> abs(tmp[3:0]);**<br>**Rc[15: 8] <- Ra[15: 8] << abs(tmp[3:0]), if (tmp[3:0] < 0);**<br>**Rc[ 7: 0] <- Ra[ 7: 0] >> abs(tmp[3:0]);**<br>**Rc[ 7: 0] <- Ra[ 7: 0] << abs(tmp[3:0]), if (tmp[3:0] < 0);**<br><br>**Handle Ra and Rc in byte vector format.**<br>**Perform arithmetic shift right of Ra only by the number of bits indicated by Rb. Rb is saturated to ±7 or fewer, and arithmetic shift left is performed if value of Rb is negative.** |

| Assembler mnemonic | Format | Affecting flag | Affected flag |
|---|---|---|---|
| **vasrb Rc,Ra,Rb** | 32bit | — | — |
| Remarks | | | |
| | | | |

Fig. 657 vasrb Rb,Ra,I3

| | |
|---|---|
| Behavior | **Rb[31:24] <- Ra[31:24] >> I3[2:0];**<br>**Rb[23:16] <- Ra[23:16] >> I3[2:0];**<br>**Rb[15: 8] <- Ra[15: 8] >> I3[2:0];**<br>**Rb[ 7: 0] <- Ra[ 7: 0] >> I3[2:0];**<br><br>**Handle each register in byte vector format.**<br>**Perform arithmetic shift right of Ra only by the number of bits represented by immediate value (I3).** |

| Assembler mnemonic | Format | Affecting flag | Affected flag |
|---|---|---|---|
| **vasrb Rb,Ra,I3** | 32bit | — | — |

| Remarks |
|---|
| I3 is an unsigned value. |

Fig. 658 vlslb Rc,Ra,Rb

| | |
|---|---|
| Behavior | **=> vaslb Rc,Ra,Rb**<br><br>**tmp[3:0] <- Rb[3:0];**<br>**tmp[3:0] <- 7, if (Rb > 0x0000_0007 );**<br>**tmp[3:0] <- -7, if (Rb < 0xffff_fff9 );**<br>**Rc[31:24] <- Ra[31:24] << abs(tmp[3:0]);**<br>**Rc[31:24] <- Ra[31:24] >> abs(tmp[3:0]), if (tmp[3:0] < 0);**<br>**Rc[23:16] <- Ra[23:16] << abs(tmp[3:0]);**<br>**Rc[23:16] <- Ra[23:16] >> abs(tmp[3:0]), if (tmp[3:0] < 0);**<br>**Rc[15: 8] <- Ra[15: 8] << abs(tmp[3:0]);**<br>**Rc[15: 8] <- Ra[15: 8] >> abs(tmp[3:0]), if (tmp[3:0] < 0);**<br>**Rc[ 7: 0] <- Ra[ 7: 0] << abs(tmp[3:0]);**<br>**Rc[ 7: 0] <- Ra[ 7: 0] >> abs(tmp[3:0]), if (tmp[3:0] < 0);**<br><br>**Handle Ra and Rc in byte vector format.**<br>**Perform logical shift left of Ra only by the number of bits indicated by Rb. Rb is saturated to ±7 or fewer, and arithmetic shift right is performed if value of Rb is negative.** |

| Assembler mnemonic | Format | Affecting flag | Affected flag |
|---|---|---|---|
| **vlslb Rc,Ra,Rb** | 32bit synonym | — | — |

| Remarks |
|---|
| ※Arithmetic shift right is performed if the amount of shift is negative. |

Fig. 659 vlslb Rb,Ra,I3

| | |
|---|---|
| Behavior | **=> vaslb Rb,Ra,I3**<br><br>**Rb[31:24] <- Ra[31:24] << I3[2:0];**<br>**Rb[23:16] <- Ra[23:16] << I3[2:0];**<br>**Rb[15: 8] <- Ra[15: 8] << I3[2:0];**<br>**Rb[ 7: 0] <- Ra[ 7: 0] << I3[2:0];**<br><br>**Handle each register in half word vector format.**<br>**Perform arithmetic shift left of Ra only by the number of bits represented by immediate value (I4).** |

| Assembler mnemonic | Format | Affecting flag | Affected flag |
|---|---|---|---|
| **vlslb Rb,Ra,I3** | 32bit synonym | — | — |

| Remarks |
|---|
| I3 is an unsigned value. |

Fig. 660 vlsrb Rc,Ra,Rb

| | |
|---|---|
| Behavior | **tmp[3:0] <- Rb[3:0];**<br>**tmp[3:0] <- 7, if (Rb > 0x0000_0007 );**<br>**tmp[3:0] <- -7, if (Rb < 0xffff_fff9 );**<br>**Rc[31:24] <- Ra[31:24] >>> abs(tmp[3:0]);**<br>**Rc[31:24] <- Ra[31:24] << abs(tmp[3:0]), if (tmp[3:0] < 0);**<br>**Rc[23:16] <- Ra[23:16] >>> abs(tmp[3:0]);**<br>**Rc[23:16] <- Ra[23:16] << abs(tmp[3:0]), if (tmp[3:0] < 0);**<br>**Rc[15: 8] <- Ra[15: 8] >>> abs(tmp[3:0]);**<br>**Rc[15: 8] <- Ra[15: 8] << abs(tmp[3:0]), if (tmp[3:0] < 0);**<br>**Rc[ 7: 0] <- Ra[ 7: 0] >>> abs(tmp[3:0]);**<br>**Rc[ 7: 0] <- Ra[ 7: 0] << abs(tmp[3:0]), if (tmp[3:0] < 0);**<br><br>**Handle Ra and Rc in byte vector format.**<br>**Perform logical shift right of Ra only by the number of bits indicated by Rb. Rb is saturated to ±7 or fewer, and logical shift left is performed if value of Rb is negative.** |

| Assembler mnemonic | Format | Affecting flag | Affected flag |
|---|---|---|---|
| **vlsrb Rc,Ra,Rb** | 32bit | — | — |

| Remarks |
|---|
| |

Fig. 661 vlsrb Rb,Ra,I3

| | |
|---|---|
| Behavior | **Rb[31:24] <- Ra[31:24] >>> I3[2:0];**<br><br>**Rb[23:16] <- Ra[23:16] >>> I3[2:0];**<br><br>**Rb[15: 8] <- Ra[15: 8] >>> I3[2:0];**<br><br>**Rb[ 7: 0] <- Ra[ 7: 0] >>> I3[2:0];**<br><br>**Handle each register in byte vector format.**<br><br>**Perform arithmetic shift right of Ra only by the number of bits represented by immediate value (I3).** |

| Assembler mnemonic | Format | Affecting flag | Affected flag |
|---|---|---|---|
| **vlsrb Rb,Ra,I3** | 32bit | — | — |

| Remarks |
|---|
| I3 is an unsigned value. |

Fig. 662 vrolb Rc,Ra,Rb

| | |
|---|---|
| Behavior | tmp[31:24] <- Ra[31:24] << Rb[2:0];<br>tmp2[31:24]<- Ra[31:24] >>> (8 - Rb[2:0]);<br>Rc[31:24] <- tmp[31:24] \| tmp2[31:24];<br>tmp[23:16] <- Ra[23:16] << Rb[2:0];<br>tmp2[23:16]<- Ra[23:16] >>> (8 - Rb[2:0]);<br>Rc[23:16] <- tmp[23:16] \| tmp2[23:16];<br>tmp[15: 8] <- Ra[15: 8] << Rb[2:0];<br>tmp2[15:8] <- Ra[15: 8] >>> (8 - Rb[2:0]);<br>Rc[15: 8] <- tmp[15:8] \| tmp2[15: 8];<br>tmp[ 7: 0] <- Ra[ 7: 0] << Rb[2:0];<br>tmp2[7:0] <- Ra[ 7: 0] >>> (8 - Rb[2:0]);<br>Rc[ 7: 0] <- tmp[7: 0] \| tmp2[ 7: 0];<br><br>Handle Ra and Rc in byte vector format.<br>Rotate Ra to left only by the number of bits indicated by Rb. |

| Assembler mnemonic | Format | Affecting flag | Affected flag |
|---|---|---|---|
| vrolb Rc,Ra,Rb | 32bit | — | — |

| Remarks |
|---|
| |

Fig. 663 vrolb Rb,Ra,I3

| | |
|---|---|
| Behavior | tmp1[31:24] <- Ra[31:24] << I3[2:0];<br>tmp2[31:24] <- Ra[31:24] >>> (8-I3[2:0]);<br>tmp1[23:16] <- Ra[23:16] << I3[2:0];<br>tmp2[23:16] <- Ra[23:16] >>> (8-I3[2:0]);<br>tmp1[15: 8] <- Ra[15: 8] << I3[2:0];<br>tmp2[15: 8] <- Ra[15: 8] >>> (8-I3[2:0]);<br>tmp1[ 7: 0] <- Ra[ 7: 0] << I3[2:0];<br>tmp2[ 7: 0] <- Ra[ 7: 0] >>> (8-I3[2:0]);<br>Rb <- tmp1[31:0] \| tmp2[31:0];<br><br>Handle each register in byte vector format.<br>Rotate Ra to left only by the number of bits represented by immediate value (I3). |

| Assembler mnemonic | Format | Affecting flag | Affected flag |
|---|---|---|---|
| vrolb Rb,Ra,I3 | 32bit | — | — |

| Remarks |
|---|
| I3 is an unsigned value. |

Fig. 664 vrorb Rb,Ra,I3

Behavior

```
=> vrolb Rb,Ra,( 8-I3)&0x7

tmp1[31:24] <- Ra[31:24] <<   I3[2:0];
tmp2[31:24] <- Ra[31:24] >>> (8-I3[2:0]);
tmp1[23:16] <- Ra[23:16] <<   I3[2:0];
tmp2[23:16] <- Ra[23:16] >>> (8-I3[2:0]);
tmp1[15: 8] <- Ra[15: 8] <<   I3[2:0];
tmp2[15: 8] <- Ra[15: 8] >>> (8-I3[2:0]);
tmp1[ 7: 0] <- Ra[ 7: 0] <<   I3[2:0];
tmp2[ 7: 0] <- Ra[ 7: 0] >>> (8-I3[2:0]);
Rb <- tmp1[31:0] | tmp2[31:0];
```

Handle each register in byte vector format.

Rotate Ra to right only by the number of bits represented by immediate value (I3).

| Assembler mnemonic | Format | Affecting flag | Affected flag |
|---|---|---|---|
| vrorb Rb,Ra,I3 | 32bit synonym | — | — |

Remarks

I3 is an unsigned value.

Fig. 665 vasl Mm,Ra,Mn,Rb

| | |
|---|---|
| Behavior | tmp[5:0] <- Rb[5:0];<br>tmp[5:0] <- 31, if (Rb > 0x0000_001f );<br>tmp[5:0] <- -31, if (Rb < 0xffff_ffe1 );<br>MHm[31:16]:MLm[31:16] <-<br>MHn[31:16]:MLn[31:16] << abs(tmp[5:0]);<br>MHm[31:16]:MLm[31:16] <-<br>MHn[31:16]:MLn[31:16] >> abs(tmp[5:0]), if (tmp[5:0] < 0);<br>MHm[15: 0]:MLm[15: 0] <-<br>MHn[15: 0]:MLn[15: 0] << abs(tmp[5:0]);<br>MHm[15: 0]:MLm[15: 0] <-<br>MHn[15: 0]:MLn[15: 0] >> abs(tmp[5:0]), if (tmp[5:0] < 0);<br>Ra <- MLm;<br><br>Handle Ra in half word vector format, and handle Mm and Mn in word vector format.<br>Perform arithmetic shift left of Mn only by the number of bits indicated by Rb. Rb is saturated to ±31 or fewer, and arithmetic shift right is performed if value of Rb is negative. |

| Assembler mnemonic | Format | Affecting flag | Affected flag |
|---|---|---|---|
| vasl Mm,Ra,Mn,Rb | 32bit | — | — |

| Remarks |
|---|
| |

Fig. 666 vasl Mm,Rb,Mn,I5

| | |
|---|---|
| Behavior | MHm[31:16]:MLm[31:16] <- MHn[31:16]:MLn[31:16] << I5[4:0];<br>MHm[15: 0]:MLm[15: 0] <- MHn[15: 0]:MLn[15: 0] << I5[4:0];<br>Rb <- MLm;<br><br>Handle Mn and Mm in word vector format, and handle Rb in half word vector format.<br>Perform arithmetic shift left of Mn only by the number of bits represented by immediate value (I5). |

| Assembler mnemonic | Format | Affecting flag | Affected flag |
|---|---|---|---|
| vasl Mm,Rb,Mn,I5 | 32bit | — | — |

| Remarks |
|---|
| I5 is an unsigned value. |

Fig. 667 vaslvw Mm,Ra,Mn,Rb

Behavior

```
tmp[5:0] <- Rb[5:0];
tmp[5:0] <-   31, if (Rb > 0x0000_001f );
tmp[5:0] <- -31, if (Rb < 0xffff_ffe1 );
tmp2[62:0]<- sext63(MHn[31:16]:MLn[31:16]) << abs(tmp[5:0]);
tmp2[62:0]<- sext63(MHn[31:16]:MLn[31:16]) >> abs(tmp[5:0]),
                        if (tmp[5:0] < 0);
MHm[31:16]:MLm[31:16]<- tmp2[31:0];
MHm[31:16]:MLm[31:16]<- 0x7fff_ffff, CFR.OVS <- 1,
                        if (tmp2[62:0] > 0x0000_0000_7fff_ffff[62:0]);
MHm[31:16]:MLm[31:16]<- 0x8000_0000, CFR.OVS <- 1,
                        if (tmp2[62:0] < 0x7fff_ffff_8000_0000[62:0]);

tmp2[62:0]<- sext63(MHn[15:0]:MLn[15: 0]) << abs(tmp[5:0]);
tmp2[62:0]<- sext63(MHn[15:0]:MLn[15: 0]) >> abs(tmp[5:0]);
                        if (tmp[5:0] < 0);
MHm[15: 0]:MLm[15: 0]<- tmp2[31:0];
MHm[15: 0]:MLm[15: 0]<- 0x7fff_ffff, CFR.OVS <- 1,
                        if (tmp2[62:0] > 0x0000_0000_7fff_ffff[62:0]);
MHm[15: 0]:MLm[15: 0]<- 0x8000_0000, CFR.OVS <- 1,
                        if (tmp2[62:0] < 0x7fff_ffff_8000_0000[62:0]);
Ra <- MLm;
```

Handle Ra in half word vector format, and handle Mm and Mn in word vector format. Perform arithmetic shift left of Mn only by the number of bits indicated by Rb. Saturate result if it cannot be represented by signed 32 bits. Rb is saturated to ±31 or fewer, and arithmetic shift right is performed if value of Rb is negative.

| Assembler mnemonic | Format | Affecting flag | Affected flag |
|---|---|---|---|
| vaslvw Mm,Ra,Mn,Rb | 32bit | CFR.OVS | — |

| Remarks |
|---|
| |

Fig. 668 vaslvw Mm,Rb,Mn,I5

Behavior

```
tmp[62:0] <- sext63(MHn[31:16]:MLn[31:16]) << I5[4:0];
MHm[31:16]:MLm[31:16] <- tmp[31:0],
MHm[31:16]:MLm[31:16] <- 0x7fff_ffff, CFR.OVS <- 1,
                    if (tmp[62:0] > 0x0000_0000_7fff_ffff[62:0]);
MHm[31:16]:MLm[31:16] <- 0x8000_0000, CFR.OVS <- 1,
                    if (tmp[62:0] < 0x7fff_ffff_8000_0000[62:0]);

tmp[62:0] <- sext63(MHn[15: 0]:MLn[15: 0]) << I5[4:0];
MHm[15: 0]:MLm[15: 0] <- tmp[31:0],
MHm[15: 0]:MLm[15: 0] <- 0x7fff_ffff, CFR.OVS <- 1,
                    if (tmp[62:0] > 0x0000_0000_7fff_ffff[62:0]);
MHm[15: 0]:MLm[15: 0] <- 0x8000_0000, CFR.OVS <- 1,
                    if (tmp[62:0] < 0x7fff_ffff_8000_0000[62:0]);
Rb <- MLm;
```

Handle Mn and Mm in word vector format, and handle Rb in half word vector format.
Perform arithmetic shift left of Mn only by the number of bits represented by immediate value (I5). Saturate result if it cannot be represented by signed 32 bits.

| Assembler mnemonic | Format | Affecting flag | Affected flag |
|---|---|---|---|
| **vaslvw Mm,Rb,Mn,I5** | 32bit | CFR,OVS | — |

Remarks

I5 is an unsigned value.

Fig. 669 vasr Mm,Ra,Mn,Rb

Behavior

```
tmp[5:0] <- Rb[5:0];
tmp[5:0] <-   31, if (Rb > 0x0000_001f );
tmp[5:0] <- -31, if (Rb < 0xffff_ffe1 );
MHm[31:16]:MLm[31:16] <-
    MHn[31:16]:MLn[31:16] >> abs(tmp[5:0]);
MHm[31:16]:MLm[31:16] <-
    MHn[31:16]:MLn[31:16] << abs(tmp[5:0]), if (tmp[5:0] < 0);
MHm[15: 0]:MLm[15: 0] <-
    MHn[15: 0]:MLn[15: 0] >> abs(tmp[5:0]);
MHm[15: 0]:MLm[15: 0] <-
    MHn[15: 0]:MLn[15: 0] << abs(tmp[5:0]), if (tmp[5:0] < 0);
Ra <- MLm;
```

Handle Ra in half word vector format, and handle Mm and Mn in word vector format.

Perform arithmetic shift right of Mn only by the number of bits indicated by Rb. Rb is saturated to ±31 or fewer, and arithmetic shift left is performed if value of Rb is negative.

| Assembler mnemonic | Format | Affecting flag | Affected flag |
|---|---|---|---|
| vasr Mm,Ra,Mn,Rb | 32bit | — | — |

| Remarks |
|---|
| |

Fig. 670 vasr Mm,Rb,Mn,I5

| | |
|---|---|
| Behavior | **MHm[31:16]:MLm[31:16] <- MHn[31:16]:MLn[31:16] >> I5[4:0];**<br>**MHm[15: 0]:MLm[15: 0] <- MHn[15: 0]:MLn[15: 0] >> I5[4:0];**<br>**Rb <- MLm;**<br><br>**Handle Mn and Mm in word vector format, and handle Rb in half word vector format.**<br>**Perform arithmetic shift right of Mn only by the number of bits represented by immediate value (I5).** |

| Assembler mnemonic | Format | Affecting flag | Affected flag |
|---|---|---|---|
| **vasr Mm,Rb,Mn,I5** | 32bit | — | — |

| Remarks |
|---|
| I5 is an unsigned value. |

Fig. 671 vasrvw Mm,Ra,Mn,Rb

Behavior

```
tmp[5:0] <- Rb[5:0];
tmp[5:0] <-   31, if (Rb > 0x0000_001f );
tmp[5:0] <- -31, if (Rb < 0xffff_ffe1 );
tmp2[62:0]<- sext63(MHn[31:16]:MLn[31:16]) >> abs(tmp[5:0]);
tmp2[62:0]<- sext63(MHn[31:16]:MLn[31:16]) << abs(tmp[5:0]),
                        if (tmp[5:0] < 0);
MHm[31:16]:MLm[31:16]<- tmp2[31:0];
MHm[31:16]:MLm[31:16]<- 0x7fff_ffff, CFR.OVS <- 1,
                        if (tmp2[62:0] > 0x0000_0000_7fff_ffff[62:0]);
MHm[31:16]:MLm[31:16]<- 0x8000_0000, CFR.OVS <- 1,
                        if (tmp2[62:0] < 0x7fff_ffff_8000_0000[62:0]);

tmp2[62:0]<- sext63(MHn[15:0]:MLn[15: 0]) >> abs(tmp[5:0]);
tmp2[62:0]<- sext63(MHn[15:0]:MLn[15: 0]) << abs(tmp[5:0]);
                        if (tmp[5:0] < 0);
MHm[15: 0]:MLm[15: 0]<- tmp2[31:0];
MHm[15: 0]:MLm[15: 0]<- 0x7fff_ffff, CFR.OVS <- 1,
                        if (tmp2[62:0] > 0x0000_0000_7fff_ffff[62:0]);
MHm[15: 0]:MLm[15: 0]<- 0x8000_0000, CFR.OVS <- 1,
                        if (tmp2[62:0] < 0x7fff_ffff_8000_0000[62:0]);
Ra <- MLm;
```

Handle Ra in half word vector format, and handle Mm and Mn in word vector format. Perform arithmetic shift right of Mn only by the number of bits indicated by Rb. Saturate result if it cannot be represented by signed 32 bit number. Rb is saturated to ±31 or fewer, and arithmetic shift left is performed if value of Rb is negative.

| Assembler mnemonic | Format | Affecting flag | Affected flag |
|---|---|---|---|
| **vasrvw Mm,Ra,Mn,Rb** | 32bit | CFR.OVS | – |

| Remarks |
|---|
| |

Fig. 672 vlsl Mm,Ra,Mn,Rb

| | |
|---|---|
| Behavior | => vasl Mm,Ra,Mn,Rb<br><br>tmp[5:0] <- Rb[5:0];<br>tmp[5:0] <-  31, if (Rb > 0x0000_001f );<br>tmp[5:0] <- -31, if (Rb < 0xffff_ffe1 );<br>MHm[31:16]:MLm[31:16] <-<br>MHn[31:16]:MLn[31:16] << abs(tmp[5:0]);<br>MHm[31:16]:MLm[31:16] <-<br>MHn[31:16]:MLn[31:16] >> abs(tmp[5:0]), if (tmp[5:0] < 0);<br>MHm[15: 0]:MLm[15: 0] <-<br>MHn[15: 0]:MLn[15: 0] << abs(tmp[5:0]);<br>MHm[15: 0]:MLm[15: 0] <-<br>MHn[15: 0]:MLn[15: 0] >> abs(tmp[5:0]), if (tmp[5:0] < 0);<br>Ra <- MLm;<br><br>Handle Ra in half word vector format, and handle Mm and Mn in word vector format.<br>Perform arithmetic shift left of Mn only by the number of bits indicated by Rb. Rb is saturated to ±31 or fewer, and arithmetic shift right is performed if value of Rb is negative. |

| Assembler mnemonic | Format | Affecting flag | Affected flag |
|---|---|---|---|
| **vlsl Mm,Ra,Mn,Rb** | 32bit synonym | — | — |

| Remarks |
|---|
| ※Arithmetic shift right is performed if the amount of shift is negative. |

Fig. 673 vlsl Mm,Rb,Mn,I5

| | |
|---|---|
| Behavior | **=> vasl Mm,Rb,Mn,I5**<br><br>**MHm[31:16]:MLm[31:16] <- MHn[31:16]:MLn[31:16] << I5[4:0];**<br>**MHm[15: 0]:MLm[15: 0] <- MHn[15: 0]:MLn[15: 0] << I5[4:0];**<br>**Rb <- MLm;**<br><br>**Handle Mn and Mm in word vector format, and handle Rb in half word vector format.**<br>**Perform arithmetic shift left of Mn only by the number of bits represented by immediate value (I5).** |

| Assembler mnemonic | Format | Affecting flag | Affected flag |
|---|---|---|---|
| **vlsl Mm,Rb,Mn,I5** | 32bit synonym | — | — |

| Remarks |
|---|
| I5 is an unsigned value. |

Fig. 674 vlsr Mm,Ra,Mn,Rb

| | |
|---|---|
| Behavior | tmp[5:0] <- Rb[5:0];<br>tmp[5:0] <- 31, if (Rb > 0x0000_001f );<br>tmp[5:0] <- -31, if (Rb < 0xffff_ffe1 );<br>MHm[31:16]:MLm[31:16] <-<br>MHn[31:16]:MLn[31:16] >>> abs(tmp[5:0]);<br>MHm[31:16]:MLm[31:16] <-<br>MHn[31:16]:MLn[31:16] << abs(tmp[5:0]), if (tmp[5:0] < 0);<br>MHm[15: 0]:MLm[15: 0] <-<br>MHn[15: 0]:MLn[15: 0] >>> abs(tmp[5:0]);<br>MHm[15: 0]:MLm[15: 0] <-<br>MHn[15: 0]:MLn[15: 0] << abs(tmp[5:0]), if (tmp[5:0] < 0);<br>Ra <- MLm;<br><br>Perform logical shift right of Mn only by the number of bits indicated by Rb. Rb is saturated to ±31 or fewer, and logical shift left is performed if value of Rb is negative. |

| Assembler mnemonic | Format | Affecting flag | Affected flag |
|---|---|---|---|
| vlsr Mm,Ra,Mn,Rb | 32bit | — | — |

| Remarks |
|---|
| |

Fig. 675 vlsr Mm,Rb,Mn,I5

| | |
|---|---|
| Behavior | **MHm[31:16]:MLm[31:16] <- MHn[31:16]:MLn[31:16] >>> I5[4:0];**<br>**MHm[15: 0]:MLm[15: 0] <- MHn[15: 0]:MLn[15: 0] >>> I5[4:0];**<br>**Rb <- MLm;**<br><br>**Handle Mn and Mm in word vector format, and handle Rb in half word vector format.**<br>**Perform logical shift right of Mn only by the number of bits represented by immediate value (I5).** |

| Assembler mnemonic | Format | Affecting flag | Affected flag |
|---|---|---|---|
| **vlsr Mm,Rb,Mn,I5** | 32bit | – | – |

| Remarks |
|---|
| I5 is an unsigned value. |

Fig. 676 vsath Mm,Rb,Mn

| | |
|---|---|
| Behavior | **MHm[31:16]:MLm[31:16] <- MHn[31:16]:MLn[31:16];**<br>**MHm[31:16]:MLm[31:16] <- 0x0000_7fff,**<br>**if (MHn[31:16]:MLn[31:16] > 0x0000_7fff[31:0]);**<br>**MHm[31:16]:MLm[31:16] <- 0xffff_8000,**<br>**if (MHn[31:16]:MLn[31:16] < 0xffff_8000[31:0]);**<br>**Rb[31:16] <- MLm[31:16];**<br><br>**MHm[15: 0]:MLm[15: 0] <- MHn[15: 0]:MLn[15: 0];**<br>**MHm[15: 0]:MLm[15: 0] <- 0x0000_7fff,**<br>**if (MHn[15: 0]:MLn[15: 0] > 0x0000_7fff[31:0]);**<br>**MHm[15: 0]:MLm[15: 0] <- 0xffff_8000,**<br>**if (MHn[15: 0]:MLn[15: 0] < 0xffff_8000[31:0]);**<br>**Rb[15: 0] <- MLm[15: 0];**<br><br>**Handle Mm and Mn in word vector format, and handle Rb in half word vector format.**<br>**Saturate Mn with signed 32-bit value, and store result in Rb.** |

| Assembler mnemonic | Format | Affecting flag | Affected flag |
|---|---|---|---|
| **vsath Mm,Rb,Mn** | 32bit | — | — |
| Remarks | | | |
| | | | |

Fig. 677 vsath12 Rb,Ra

| | |
|---|---|
| Behavior | **Rb[15: 0] <- Ra[15: 0];**<br>**Rb[15: 0] <- 0x07ff, if (Ra[15: 0] > 0x07ff);**<br>**Rb[15: 0] <- 0xf800, if (Ra[15: 0] < 0xf800);**<br>**Rb[31:16] <- Ra[31:16];**<br>**Rb[31:16] <- 0x07ff, if (Ra[31:16] > 0x07ff);**<br>**Rb[31:16] <- 0xf800, if (Ra[31:16] < 0xf800);**<br><br>**Handle each register in half word vector format.**<br>**Saturate Ra with signed 12-bit value, and store result in Rb.** |

| Assembler mnemonic | Format | Affecting flag | Affected flag |
|---|---|---|---|
| **vsath12 Rb,Ra** | 32bit | — | — |

| Remarks |
|---|
| |

Fig. 678 vsath9 Rb,Ra

| | | | |
|---|---|---|---|
| Behavior | **Rb[15: 0] <- Ra[15: 0];**<br>**Rb[15: 0] <- 0x00ff, if (Ra[15: 0] > 0x00ff);**<br>**Rb[15: 0] <- 0xff00, if (Ra[15: 0] < 0xff00);**<br>**Rb[31:16] <- Ra[31:16];**<br>**Rb[31:16] <- 0x00ff, if (Ra[31:16] > 0x00ff);**<br>**Rb[31:16] <- 0xff00, if (Ra[31:16] < 0xff00);**<br><br>**Handle each register in half word vector format.**<br>**Saturate Ra with signed 9-bit value, and store result in Rb.** | | |
| Assembler mnemonic | Format | Affecting flag | Affected flag |
| **vsath9 Rb,Ra** | 32bit | — | — |
| Remarks | | | |
| | | | |

Fig. 679 vsath8 Rb,Ra

| | |
|---|---|
| Behavior | **Rb[15: 0] <- Ra[15: 0];**<br>**Rb[15: 0] <- 0x007f, if (Ra[15: 0] > 0x007f);**<br>**Rb[15: 0] <- 0xff80, if (Ra[15: 0] < 0xff80);**<br>**Rb[31:16] <- Ra[31:16];**<br>**Rb[31:16] <- 0x007f, if (Ra[31:16] > 0x007f);**<br>**Rb[31:16] <- 0xff80, if (Ra[31:16] < 0xff80);**<br><br>**Handle each register in half word vector format.**<br>**Saturate Ra with signed 8-bit value, and store result in Rb.** |

| Assembler mnemonic | Format | Affecting flag | Affected flag |
|---|---|---|---|
| **vsath8 Rb,Ra** | 32bit | — | — |

| Remarks |
|---|
| |

Fig. 680 vsath8u Rb,Ra

| | |
|---|---|
| Behavior | Rb[15: 0] <- Ra[15: 0];<br>Rb[15: 0] <- 0x00ff, if (Ra[15: 0] > 0x00ff);<br>Rb[15: 0] <- 0x0000, if (Ra[15: 0] < 0x0000);<br>Rb[31:16] <- Ra[31:16];<br>Rb[31:16] <- 0x00ff, if (Ra[31:16] > 0x00ff);<br>Rb[31:16] <- 0x0000, if (Ra[31:16] < 0x0000);<br><br>Handle each register in half word vector format.<br>Saturate Ra with unsigned 8-bit value, and store result in Rb. |

| Assembler mnemonic | Format | Affecting flag | Affected flag |
|---|---|---|---|
| vsath8u Rb,Ra | 32bit | — | — |
| Remarks | | | |
| | | | |

Fig. 681 vrndvh Rb,Mn

| | |
|---|---|
| Behavior | **tmp[17:0] <- sext18(MHn[31:16]:MLn[31:31])+sext18(1);**<br>**Rb[31:16] <- tmp[16:1];**<br>**Rb[31:16] <- 0x7fff, CFR.OVS <- 1,**<br>**if (tmp[17:1] > 0x0_7fff[16:0]);**<br><br>**tmp[17:0] <- sext18(MHn[15:0]:MLn[15:15])+sext18(1);**<br>**Rb[15: 0] <- tmp[16:1];**<br>**Rb[15: 0] <- 0x7fff, CFR.OVS <- 1,**<br>**if (tmp[17:1] > 0x0_7fff[16:0]);**<br><br>**Handle Mn in word vector format, and handle Rb in half word vector format.**<br>**Perform operation for rounding 32-bit value down to 16-bit value. Saturate result if it cannot be represented by signed 16 bits.** |

| Assembler mnemonic | Format | Affecting flag | Affected flag |
|---|---|---|---|
| **vrndvh Rb,Mn** | 32bit | CFR.OVS | — |

| Remarks |
|---|
| No negative overflow is generated. |

Fig. 682 vabssumb Rc,Ra,Rb

<table>
<tr><td>Behavior</td><td colspan="3">Rc <- Rb + uext(abs(VC3:Ra[31:24]))<br>+ uext(abs(VC2:Ra[23:16]))<br>+ uext(abs(VC1:Ra[15: 8]))<br>+ uext(abs(VC0:Ra[ 7: 0]));<br><br>Used for summing absolute value differences in motion prediction in image processing. Used in pairs with vasubb.<br>Handle Ra in byte vector format.<br>Perform absolute value addition of four 8-bit value of Ra, and add result with Rb. Each of 8-bit sign bits are stored VC0~VC3.</td></tr>
<tr><td>Assembler mnemonic</td><td>Format</td><td>Affecting flag</td><td>Affected flag</td></tr>
<tr><td>vabssumb Rc,Ra,Rb</td><td>32bit</td><td>—</td><td>VC0,VC1,VC2,VC3</td></tr>
<tr><td colspan="4">Remarks</td></tr>
<tr><td colspan="4"></td></tr>
</table>

Fig. 683 vmul Mm,Rc,Ra,Rb

| | |
|---|---|
| Behavior | **MHm[31:16]:MLm[31:16] <- smul(Ra[31:16],Rb[31:16]);**<br>**Rc[31:16] <- MLm[31:16], if (reg#(Rc) != 30 && reg#(Rc) != 31);**<br>**MHm[15: 0]:MLm[15: 0] <- smul(Ra[15: 0],Rb[15: 0]);**<br>**Rc[15: 0] <- MLm[15: 0], if (reg#(Rc) != 30 && reg#(Rc) != 31);**<br><br>**Handle Ra, Rb, and Rc in half word vector format, and handle Mm in word vector format.**<br>**Perform integer multiplication (SIMD straight) for Ra and Rb. Store result in Mm and Rc.** |

| Assembler mnemonic | Format | Affecting flag | Affected flag |
|---|---|---|---|
| **vmul Mm,Rc,Ra,Rb** | 32bit | — | — |

| Remarks |
|---|
| No writing is performed to Rc, when r30 or r31 is specified as Rc. |

Fig. 684 vxmul Mm,Rc,Ra,Rb

| | |
|---|---|
| Behavior | **MHm[31:16]:MLm[31:16] <- smul(Ra[31:16],Rb[15: 0]);**<br>**Rc[31:16] <- MLm[31:16], if (reg#(Rc) != 30 && reg#(Rc) != 31);**<br>**MHm[15: 0]:MLm[15: 0] <- smul(Ra[15: 0],Rb[31:16]);**<br>**Rc[15: 0] <- MLm[15: 0], if (reg#(Rc) != 30 && reg#(Rc) != 31);**<br><br>**Handle Ra, Rb, and Rc in half word vector format, and handle Mm in word vector format.**<br>**Perform integer multiplication (SIMD cross) for Ra and Rb. Store result in Mm and Rc.** |

| Assembler mnemonic | Format | Affecting flag | Affected flag |
|---|---|---|---|
| **vxmul Mm,Rc,Ra,Rb** | 32bit | — | — |

| Remarks |
|---|
| No writing is performed to Rc, when r30 or r31 is specified as Rc. |

Fig. 685 vhmul Mm,Rc,Ra,Rb

| | |
|---|---|
| Behavior | **MHm[31:16]:MLm[31:16] <- smul(Ra[31:16],Rb[31:16]);**<br>**Rc[31:16] <- MLm[31:16], if (reg#(Rc) != 30 && reg#(Rc) != 31);**<br>**MHm[15: 0]:MLm[15: 0] <- smul(Ra[15: 0],Rb[31:16]);**<br>**Rc[15: 0] <- MLm[15: 0], if (reg#(Rc) != 30 && reg#(Rc) != 31);**<br><br>**Handle Ra, Rb, and Rc in half word vector format, and handle Mm in word vector format.**<br>**Perform integer multiplication (SIMD high) for Ra and Rb. Store result in Mm and Rc.** |

| Assembler mnemonic | Format | Affecting flag | Affected flag |
|---|---|---|---|
| **vhmul Mm,Rc,Ra,Rb** | 32bit | — | — |

| Remarks |
|---|
| No writing is performed to Rc, when r30 or r31 is specified as Rc. |

Fig. 686 vlmul Mm,Rc,Ra,Rb

| | |
|---|---|
| Behavior | **MHm[31:16]:MLm[31:16] <- smul(Ra[31:16],Rb[15: 0]);**<br>**Rc[31:16] <- MLm[31:16], if (reg#(Rc) != 30 && reg#(Rc) != 31);**<br>**MHm[15: 0]:MLm[15: 0] <- smul(Ra[15: 0],Rb[15: 0]);**<br>**Rc[15: 0] <- MLm[15: 0], if (reg#(Rc) != 30 && reg#(Rc) != 31);**<br><br>**Handle Ra, Rb, and Rc in half word vector format, and handle Mm in word vector format.**<br>**Perform integer multiplication (SIMD low) for Ra and Rb. Store result in Mm and Rc.** |

| Assembler mnemonic | Format | Affecting flag | Affected flag |
|---|---|---|---|
| **vlmul Mm,Rc,Ra,Rb** | 32bit | — | — |

| Remarks |
|---|
| No writing is performed to Rc, when r30 or r31 is specified as Rc. |

Fig. 687 vfmulh Mm,Rc,Ra,Rb

<table>
<tr><td>Behavior</td><td colspan="3">tmp[32:0] <- sext33(smul(Ra[31:16],Rb[31:16]))<<FXP_SHIFT;<br>tmp[32:0] <- 0x0_7fff_ffff[32:0], CFR.OVS <- 1,<br>if ((Ra[31:16] == 0x8000 && Rb[31:16] == 0x8000)<br>&& (PSR.FXP == 0));<br>tmp[32:0] <- 0x0_ffff_ffff[32:0], CFR.OVS <- 1,<br>if ((Ra[31:16] == 0x8000 && Rb[31:16] == 0x8000)<br>&& (PSR.FXP == 1));<br>MHm[31:16]:MLm[31:16] <- tmp[31:0];<br>MHm[31:16]:MLm[31:16] <- 0x7fff_ffff, CFR.OVS <- 1,<br>if (tmp[32:0] > 0x0_7fff_ffff[32:0];<br>MHm[31:16]:MLm[31:16] <- 0x8000_0000, CFR.OVS <- 1,<br>if (tmp[32:0] < 0x1_8000_0000[32:0];<br>Rc[31:16] <- MHm[31:16], if (reg#(Rc) != 30 && reg#(Rc) != 31);<br><br>tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[15:0] == 0x8000)<br>&& (PSR.FXP == 1));<br>MHm[15:0]:MLm[15:0] <- tmp[31:0];<br>MHm[15:0]:MLm[15:0] <- 0x7fff_ffff, CFR.OVS <- 1,<br>if (tmp[32:0] > 0x0_7fff_ffff[32:0]);<br>MHm[15:0]:MLm[15:0] <- 0x8000_0000, CFR.OVS <- 1,<br>if (tmp[32:0] < 0x1_8000_0000[32:0]);<br>Rc[15:0] <- MHm[15:0], if (reg#(Rc) != 30 && reg#(Rc) != 31);<br><br>Handle Ra, Rb, and Rc in half word vector format, and handle Mm in word vector format.<br>Perform fixed point multiplication (SIMD straight) for Ra and Rb.<br>Store result in Mm and Rc. Saturate result when it cannot be represented by signed 32 bits.</td></tr>
<tr><td>Assembler mnemonic</td><td>Format</td><td>Affecting flag</td><td>Affected flag</td></tr>
<tr><td>vfmulh Mm,Rc,Ra,Rb</td><td>32bit</td><td>CFR.OVS</td><td>PSR.FXP</td></tr>
<tr><td colspan="4">Remarks</td></tr>
<tr><td colspan="4">No writing is performed to Rc, when r30 or r31 is specified as Rc.</td></tr>
</table>

Fig. 688 vxfmulh Mm,Rc,Ra,Rb

<table>
<tr><td>Behavior</td><td colspan="3">tmp[32:0] <- sext33(smul(Ra[31:16],Rb[15:0]))<<FXP_SHIFT;<br>tmp[32:0] <- 0x0_7fff_ffff[32:0], CFR.OVS <- 1,<br>if ((Ra[31:16] == 0x8000 && Rb[15:0] == 0x8000)<br>&& (PSR.FXP == 0));<br>tmp[32:0] <- 0x0_ffff_ffff[32:0], CFR.OVS <- 1,<br>if ((Ra[31:16] == 0x8000 && Rb[15:0] == 0x8000)<br>&& (PSR.FXP == 1));<br>MHm[31:16]:MLm[31:16] <- tmp[31:0];<br>MHm[31:16]:MLm[31:16] <- 0x7fff_ffff, CFR.OVS <- 1,<br>if (tmp[32:0] > 0x0_7fff_ffff[32:0])<br>MHm[31:16]:MLm[31:16] <- 0x8000_0000, CFR.OVS <- 1,<br>if (tmp[32:0] < 0x1_8000_0000[32:0])<br>Rc[31:16] <- MHm[31:16], if (reg#(Rc) != 30 && reg#(Rc) != 31);<br><br>tmp[32:0] <- sext33(smul(Ra[15:0],Rb[31:16]))<<FXP_SHIFT;<br>tmp[32:0] <- 0x0_7fff_ffff[32:0], CFR.OVS <- 1,<br>if ((Ra[15:0] == 0x8000 && Rb[31:16] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[31:16] == 0x8000)<br>&& (PSR.FXP == 1));<br>MHm[15: 0]:MLm[15: 0] <- tmp[31:0];<br>MHm[15: 0]:MLm[15: 0] <- 0x7fff_ffff, CFR.OVS <- 1,<br>if (tmp[32:0] > 0x0_7fff_ffff[32:0])<br>MHm[15: 0]:MLm[15: 0] <- 0x8000_0000, CFR.OVS <- 1,<br>if (tmp[32:0] < 0x1_8000_0000[32:0])<br>Rc[15:0] <- MHm[15:0], if (reg#(Rc) != 30 && reg#(Rc) != 31);<br><br>Handle Ra, Rb, and Rc in half word vector format, and handle Mm in word vector format.<br>Perform fixed point multiplication (SIMD cross) for Ra and Rb.<br>Store result in Mm and Rc. Saturate result when it cannot be represented by signed 32 bits.</td></tr>
<tr><td>Assembler mnemonic</td><td>Format</td><td>Affecting flag</td><td>Affected flag</td></tr>
<tr><td>vxfmulh Mm,Rc,Ra,Rb</td><td>32bit</td><td>CFR.OVS</td><td>PSR.FXP</td></tr>
<tr><td colspan="4">Remarks</td></tr>
<tr><td colspan="4">No writing is performed to Rc, when r30 or r31 is specified as Rc.</td></tr>
</table>

Fig. 689 vhfmulh Mm,Rc,Ra,Rb

Behavior

```
tmp[32:0] <- sext33(smul(Ra[31:16],Rb[31:16]))<<FXP_SHIFT;
tmp[32:0] <- 0x0_7fff_ffff, CFR.OVS <- 1,
if ((Ra[31:16] == 0x8000 &&Rb[31:16] == 0x8000)
                    && (PSR.FXP == 0));
tmp[32:0] <- 0x0_ffff_ffff, CFR.OVS <- 1,
if ((Ra[31:16] == 0x8000 &&Rb[31:16] == 0x8000)
                    && (PSR.FXP == 1));
MHm[31:16]:MLm[31:16] <- tmp[31:0];
MHm[31:16]:MLm[31:16] <- 0x7fff_ffff, CFR.OVS <- 1,
                  if (tmp[32:0] > 0x0_7fff_ffff[32:0]);
MHm[31:16]:MLm[31:16] <- 0x8000_0000, CFR.OVS <- 1,
                  if (tmp[32:0] < 0x1_8000_0000[32:0]);
Rc[31:16] <- MHm[31:16], if (reg#(Rc) != 30 && reg#(Rc) != 31);

tmp[32:0] <- sext33(smul(Ra[15:0],Rb[31:16]))<<FXP_SHIFT;
tmp[32:0] <- 0x0_7fff_ffff, CFR.OVS <- 1,
if ((Ra[15:0] == 0x8000 && Rb[31:16] == 0x8000)
                    && (PSR.FXP == 0));
tmp[32:0] <- 0x0_ffff_ffff, CFR.OVS <- 1,
if ((Ra[15:0] == 0x8000 && Rb[31:16] == 0x8000)
                    && (PSR.FXP == 1));
MHm[15:0]:MLm[15:0] <- tmp[31:0];
MHm[15:0]:MLm[15:0] <- 0x7fff_ffff, CFR.OVS <- 1,
                    if (tmp[32:0] > 0x0_7fff_ffff[32:0]);
MHm[15:0]:MLm[15:0] <- 0x8000_0000, CFR.OVS <- 1,
                    if (tmp[32:0] < 0x1_8000_0000[32:0]);
Rc[15:0] <- MHm[15:0], if (reg#(Rc) != 30 && reg#(Rc) != 31);
```

Handle Ra, Rb, and Rc in half word vector format, and handle Mm in word vector format.
Perform fixed point multiplication (SIMD high) for Ra and Rb, and round result from 32 bits down to 16 bits. Store result in Mm and Rc. Saturate result when it cannot be represented by signed 16bits.

| Assembler mnemonic | Format | Affecting flag | Affected flag |
|---|---|---|---|
| **vhfmulh Mm,Rc,Ra,Rb** | 32bit | CFR.OVS | PSR.FXP |

Remarks

This instruction is not implemented when PSR.FXP == 1, and Mm and Rc are UD.

The lower 32 bits of Mm is always 0.

No writing is performed to Rc, when r30 or r31 is specified as Rc.

Fig. 690 vlfmulh Mm,Rc,Ra,Rb

Behavior

```
tmp[32:0] <- sext33(smul(Ra[31:16],Rb[15:0]))<<FXP_SHIFT;
tmp[32:0] <- 0x0_7fff_ffff[32:0], CFR.OVS <- 1,
if ((Ra[31:16] == 0x8000 && Rb[15:0] == 0x8000)
                    && (PSR.FXP == 0));
tmp[32:0] <- 0x0_ffff_ffff[32:0], CFR.OVS <- 1,
if ((Ra[31:16] == 0x8000 && Rb[15:0] == 0x8000)
                    && (PSR.FXP == 1));
MHm[31:16]:MLm[31:16] <- tmp[31:0];
MHm[31:16]:MLm[31:16] <- 0x7fff_ffff, CFR.OVS <- 1,
                  if (tmp[32:0] > 0x0_7fff_ffff[32:0]);
MHm[31:16]:MLm[31:16] <- 0x8000_0000, CFR.OVS <- 1,
                  if (tmp[32:0] < 0x1_8000_0000[32:0]);
Rc[31:16] <- MHm[31:16], if (reg#(Rc) != 30 && reg#(Rc) != 31);

tmp[32:0] <- sext33(smul(Ra[15:0],Rb[15:0]))<<FXP_SHIFT;
tmp[32:0] <- 0x0_7fff_ffff[32:0], CFR.OVS <- 1,
if ((Ra[15:0] == 0x8000 && Rb[15:0] == 0x8000)
                    && (PSR.FXP == 0));
tmp[32:0] <- 0x0_ffff_ffff[32:0], CFR.OVS <- 1,
if ((Ra[15:0] == 0x8000 && Rb[15:0] == 0x8000)
                    && (PSR.FXP == 1));
MHm[15:0]:MLm[15:0] <- tmp[31:0];
MHm[15:0]:MLm[15:0] <- 0x7fff_ffff, CFR.OVS <- 1,
                  if (tmp[32:0] > 0x0_7fff_ffff[32:0]);
MHm[15:0]:MLm[15:0] <- 0x8000_0000, CFR.OVS <- 1,
                  if (tmp[32:0] > 0x1_8000_0000[32:0]);
Rc[15:0] <- MHm[15:0], if (reg#(Rc) != 30 && reg#(Rc) != 31);
```

Handle Ra, Rb, and Rc in half word vector format, and handle Mm and Mn in word vector format.
Perform fixed point multiplication (SIMD low) for Ra and Rb.
Store result in Mm and Rc. Saturate result when it cannot be represented by signed 32 bits.

| Assembler mnemonic | Format | Affecting flag | Affected flag |
|---|---|---|---|
| vlfmulh Mm,Rc,Ra,Rb | 32bit | CFR.OVS | PSR.FXP |

| Remarks |
|---|
| No writing is performed to Rc, when r30 or r31 is specified as Rc. |

Fig. 691 vfmulhr Mm,Rc,Ra,Rb

<table>
<tr><td>Behavior</td><td colspan="3">tmp[32:0] <- sext33(smul(Ra[31:16],Rb[31:16]))<<FXP_SHIFT;<br>tmp[32:0] <- 0x0_7fff_ffff, CFR.OVS <- 1,<br>if ((Ra[31:16] == 0x8000 && Rb[31:16] == 0x8000)<br>&& (PSR.FXP == 0));<br>tmp[32:0] <- 0x0_ffff_ffff, CFR.OVS <- 1,<br>if ((Ra[31:16] == 0x8000 && Rb[31:16] == 0x8000)<br>&& (PSR.FXP == 1));<br>tmp2[33:0] <- sext34(tmp[32:0]) + sext34(0x0_8000);<br>MHm[31:16]:MLm[31:16] <- tmp2[31:16]:16'b0;<br>MHm[31:16]:MLm[31:16] <- 0x7fff_0000, CFR.OVS <- 1,<br>if (tmp2[33:16] > 0x0_7fff[17:0]);<br>MHm[31:16]:MLm[31:16] <- 0x8000_0000, CFR.OVS <- 1,<br>if (tmp2[33:16] < 0x3_8000[17:0]);<br>MHm[31:16]:MLm[31:16] <- UD, if (PSR.FXP == 1);<br>Rc[31:16] <- MHm[31:16], if (reg#(Rc) != 30 && reg#(Rc) != 31);<br><br>tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[15:0] == 0x8000)<br>&& (PSR.FXP == 1));<br>tmp2[33:0] <- sext34(tmp[32:0]) + sext34(0x0_8000);<br>MHm[15:0]:MLm[15:0] <- tmp2[31:16]:16'b0;<br>MHm[15:0]:MLm[15:0] <- 0x7fff_0000, CFR.OVS <- 1,<br>if (tmp2[33:16] > 0x0_7fff[17:0]);<br>MHm[15:0]:MLm[15:0] <- 0x8000_0000, CFR.OVS <- 1,<br>if (tmp2[33:16] < 0x3_8000[17:0]));<br>MHm[15:0]:MLm[15:0] <- UD, if (PSR.FXP == 1);<br>Rc[15: 0] <- MHm[15:0], if (reg#(Rc) != 30 && reg#(Rc) != 31);<br><br>Handle Ra, Rb, and Rc in half word vector format, and handle Mm in word vector format.<br>Perform fixed point multiplication (SIMD straight) for Ra and Rb, and round result from 32 bits down to 16 bits. Store result in Mm and Rc.<br>Saturate result when it cannot be represented by signed 16bits.</td></tr>
<tr><td>Assembler mnemonic</td><td>Format</td><td>Affecting flag</td><td>Affected flag</td></tr>
<tr><td>vfmulhr Mm,Rc,Ra,Rb</td><td>32bit</td><td>CFR.OVS</td><td>PSR.FXP</td></tr>
<tr><td colspan="4">Remarks</td></tr>
<tr><td colspan="4">This instruction is not implemented when PSR.FXP == 1, and Mm and Rc are UD.<br>The lower 32 bits of Mm is always 0.<br>No writing is performed to Rc, when r30 or r31 is specified as Rc.</td></tr>
</table>

Fig. 692 vxfmulhr Mm,Rc,Ra,Rb

| | |
|---|---|
| Behavior | tmp[32:0] <- sext33(smul(Ra[31:16],Rb[15:0]))<<FXP_SHIFT;<br>tmp[32:0] <- 0x0_7fff_ffff, CFR.OVS <- 1,<br>if ((Ra[31:16] == 0x8000 && Rb[15:0] == 0x8000)<br>&& (PSR.FXP == 0));<br>tmp[32:0] <- 0x0_ffff_ffff, CFR.OVS <- 1,<br>if ((Ra[31:16] == 0x8000 && Rb[15:0] == 0x8000)<br>&& (PSR.FXP == 1));<br>tmp2[33:0] <- sext34(tmp[32:0]) + sext34(0x0_8000);<br>MHm[31:16]:MLm[31:16] <- tmp2[31:16]:16'b0;<br>MHm[31:16]:MLm[31:16] <- 0x7fff_0000, CFR.OVS <- 1,<br>if (tmp2[33:16] > 0x0_7fff[17:0]);<br>MHm[31:16]:MLm[31:16] <- 0x8000_0000, CFR.OVS <- 1,<br>if (tmp2[33:16] < 0x3_8000[17:0]);<br>MHm[31:16]:MLm[31:16] <- UD, if (PSR.FXP == 1);<br>Rc[31:16] <- MHm[31:16], if (reg#(Rc) != 30 && reg#(Rc) != 31);<br><br>tmp[32:0] <- sext33(smul(Ra[15:0],Rb[31:16]))<<FXP_SHIFT;<br>tmp[32:0] <- 0x0_7fff_ffff, CFR.OVS <- 1,<br>if ((Ra[15:0] == 0x8000 && Rb[31:16] == 0x8000)<br>&& (PSR.FXP == 0));<br>tmp[32:0] <- 0x0_ffff_ffff, CFR.OVS <- 1,<br>if ((Ra[15:0] == 0x8000 && Rb[31:16] == 0x8000)<br>&& (PSR.FXP == 1));<br>tmp2[33:0] <- sext34(tmp[32:0]) + sext34(0x0_8000);<br>MHm[15:0]:MLm[15:0] <- tmp2[31:16]:16'b0;<br>MHm[15:0]:MLm[15:0] <- 0x7fff_0000, CFR.OVS <- 1,<br>if (tmp2[33:16] > 0x0_7fff[17:0]);<br>MHm[15:0]:MLm[15:0] <- 0x8000_0000, CFR.OVS <- 1,<br>if (tmp2[33:16] < 0x3_8000[17:0]);<br>MHm[15:0]:MLm[15:0] <- UD, if (PSR.FXP == 1);<br>Rc[15:0] <- MHm[15:0], if (reg#(Rc) != 30 && reg#(Rc) != 31);<br><br>Handle Ra, Rb, and Rc in half word vector format, and handle Mm in word vector format.<br>Perform fixed point multiplication (SIMD cross) for Ra and Rb, and round result from 32 bits down to 16 bits. Store result in Mm and Rc. Saturate result when it cannot be represented by signed 16bits. |

| Assembler mnemonic | Format | Affecting flag | Affected flag |
|---|---|---|---|
| vxfmulhr Mm,Rc,Ra,Rb | 32bit | CFR.OVS | PSR.FXP |

| Remarks |
|---|
| This instruction is not implemented when PSR.FXP == 1, and Mm and Rc are UD.<br>The lower 32 bits of Mm is always 0.<br>No writing is performed to Rc, when r30 or r31 is specified as Rc. |

Fig. 693 vhfmulhr Mm,Rc,Ra,Rb

| | |
|---|---|
| Behavior | tmp[32:0] <- sext33(smul(Ra[31:16],Rb[31:16]))<<FXP_SHIFT;<br>tmp[32:0] <- 0x0_7fff_ffff[32:0], CFR.OVS <- 1,<br>if ((Ra[31:16] == 0x8000 &&Rb[31:16] == 0x8000)<br>&& (PSR.FXP == 0));<br>tmp[32:0] <- 0x0_ffff_ffff[32:0], CFR.OVS <- 1,<br>if ((Ra[31:16] == 0x8000 &&Rb[31:16] == 0x8000)<br>&& (PSR.FXP == 1));<br>tmp2[33:0] <- sext34(tmp[32:0]) + sext34(0x0_8000);<br>MHm[31:16]:MLm[31:16] <- tmp2[31:16]:16'b0;<br>MHm[31:16]:MLm[31:16] <- 0x7fff_0000, CFR.OVS <- 1,<br>if (tmp2[33:16] > 0x0_7fff[17:0]);<br>MHm[31:16]:MLm[31:16] <- 0x8000_0000, CFR.OVS <- 1,<br>if (tmp2[33:16] < 0x3_8000[17:0]);<br>MHm[31:16]:MLm[31:16] <- UD, if (PSR.FXP == 1);<br>Rc[31:16] <- MHm[31:16], if (reg#(Rc) != 30 && reg#(Rc) != 31);<br><br>tmp[32:0] <- sext33(smul(Ra[15:0],Rb[31:16]))<<FXP_SHIFT;<br>tmp[32:0] <- 0x0_7fff_ffff[32:0], CFR.OVS <- 1,<br>if ((Ra[15:0] == 0x8000 && Rb[31:16] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[31:16] == 0x8000)<br>&& (PSR.FXP == 1));<br>tmp2[33:0] <- sext34(tmp[32:0]) + sext34(0x0_8000);<br>MHm[15:0]:MLm[15:0] <- tmp2[31:16]:16'b0;<br>MHm[15:0]:MLm[15:0] <- 0x7fff_0000, CFR.OVS <- 1,<br>if (tmp2[33:16] > 0x0_7fff[17:0]);<br>MHm[15:0]:MLm[15:0] <- 0x8000_0000, CFR.OVS <- 1,<br>if (tmp2[32:16] < 0x3_8000[17:0]);<br>MHm[15:0]:MLm[15:0] <- UD, if (PSR.FXP == 1);<br>Rc[15:0] <- MHm[15:0], if (reg#(Rc) != 30 && reg#(Rc) != 31);<br><br>Handle Ra, Rb, and Rc in half word vector format, and handle Mm in word vector format.<br>Perform fixed point multiplication (SIMD high) for Ra and Rb, and round result from 32 bits down to 16 bits. Store result in Mm and Rc. Saturate result when it cannot be represented by signed 16bits. |

| Assembler mnemonic | Format | Affecting flag | Affected flag |
|---|---|---|---|
| **vhfmulhr Mm,Rc,Ra,Rb** | 32bit | CFR.OVS | PSR.FXP |

| Remarks |
|---|
| This instruction is not implemented when PSR.FXP == 1, and Mm and Rc are UD.<br>The lower 32 bits of Mm is always 0.<br>No writing is performed to Rc, when r30 or r31 is specified as Rc. |

Fig. 694 vlfmulhr Mm,Rc,Ra,Rb

Behavior

```
tmp[32:0] <- sext33(smul(Ra[31:16],Rb[15:0]))<<FXP_SHIFT;
tmp[32:0] <- 0x0_7fff_ffff[32:0], CFR.OVS <- 1,
if ((Ra[31:16] == 0x8000 && Rb[15:0] == 0x8000)
                    && (PSR.FXP == 0));
tmp[32:0] <- 0x0_ffff_ffff[32:0], CFR.OVS <- 1,
if ((Ra[31:16] == 0x8000 && Rb[15:0] == 0x8000)
                    && (PSR.FXP == 1));
tmp2[33:0] <- sext34(tmp[31:0]) + sext34(0x0_8000);
MHm[31:16]:MLm[31:16] <- tmp2[31:16]:16'b0;
MHm[31:16]:MLm[31:16] <- 0x7fff_0000, CFR.OVS <- 1,
                  if (tmp2[33:16] > 0x0_7fff[17:0]);
MHm[31:16]:MLm[31:16] <- 0x8000_0000, CFR.OVS <- 1,
                  if (tmp2[33:16] < 0x3_8000[17:0]);
MHm[31:16]:MLm[31:16] <- UD, if (PSR.FXP == 1);
Rc[31:16] <- MHm[31:16], if (reg#(Rc) != 30 && reg#(Rc) != 31);

tmp[32:0] <- sext33(smul(Ra[15:0],Rb[15:0]))<<FXP_SHIFT;
tmp[32:0] <- 0x0_7fff_ffff[32:0], CFR.OVS <- 1,
if ((Ra[15:0] == 0x8000 && Rb[15:0] == 0x8000)
                    && (PSR.FXP == 0));
tmp[32:0] <- 0x0_ffff_ffff[32:0], CFR.OVS <- 1,
if ((Ra[15:0] == 0x8000 && Rb[15:0] == 0x8000)
                    && (PSR.FXP == 1));
tmp2[33:0] <- sext34(tmp[31:0]) + sext34(0x0_8000);
MHm[15:0]:MLm[15:0] <- tmp2[31:16]:16'b0;
MHm[15:0]:MLm[15:0] <- 0x7fff_0000, CFR.OVS <- 1,
                  if (tmp2[33:16] > 0x0_7fff[17:0]);
MHm[15:0]:MLm[15:0] <- 0x8000_0000, CFR.OVS <- 1,
                  if (tmp2[33:16] < 0x3_8000[17:0]);
MHm[15:0]:MLm[15:0] <- UD, if (PSR.FXP == 1);
Rc[15:0] <- MHm[15:0], if (reg#(Rc) != 30 && reg#(Rc) != 31);
```

Handle Ra, Rb, and Rc in half word vector format, and handle Mm and Mn in word vector format.
Perform fixed point multiplication (SIMD low) for Ra and Rb, and round result from 32 bits down to 16 bits. Store result in Mm and Rc.
Saturate result when it cannot be represented by signed 16bits.

| Assembler mnemonic | Format | Affecting flag | Affected flag |
|---|---|---|---|
| **vlfmulhr Mm,Rc,Ra,Rb** | 32bit | CFR.OVS | PSR.FXP |

Remarks

This instruction is not implemented when PSR.FXP == 1, and Mm and Rc are UD.

The lower 32 bits of Mm is always 0.

No writing is performed to Rc, when r30 or r31 is specified as Rc.

Fig. 695 vfmulw Mm,Rc,Ra,Rb

Behavior

```
tmp[32:0] <- sext33(smul(Ra[31:16],Rb[31:16]))<<FXP_SHIFT;
tmp[32:0] <- 0x0_7fff_ffff[32:0], CFR.OVS <- 1,
if ((Ra[31:16] == 0x8000 && Rb[31:16] == 0x8000)
                    && (PSR.FXP == 0));
tmp[32:0] <- 0x0_ffff_ffff[32:0], CFR.OVS <- 1,
if ((Ra[31:16] == 0x8000 && Rb[31:16] == 0x8000)
                    && (PSR.FXP == 1));
MHm[31:16]:MLm[31:16] <- tmp[31:0];
MHm[31:16]:MLm[31:16] <- 0x7fff_ffff, CFR.OVS <- 1,
                  if (tmp[32:0] > 0x0_7fff_ffff);
MHm[31:16]:MLm[31:16] <- 0x8000_0000, CFR.OVS <- 1,
                  if (tmp[32:0] < 0x1_8000_0000);
Rc[31:0] <- MHm[31:16]:MLm[31:16],
                  if (reg#(Rc) != 30 && reg#(Rc) != 31);

tmp[32:0] <- sext33(smul(Ra[15:0],Rb[15:0]))<<FXP_SHIFT;
tmp[32:0] <- 0x0_7fff_ffff[32:0], CFR.OVS <- 1,
                  if ((Ra[15:0] == 0x8000 && Rb[15:0] == 0x8000)
                    && (PSR.FXP == 0));
tmp[32:0] <- 0x0_ffff_ffff[32:0], CFR.OVS <- 1,
                  if ((Ra[15:0] == 0x8000 && Rb[15:0] == 0x8000)
                    && (PSR.FXP == 1));
MHm[15:0]:MLm[15:0] <- tmp[31:0];
MHm[15:0]:MLm[15:0] <- 0x7fff_ffff, CFR.OVS <- 1,
                  if (tmp[32:0] > 0x0_7fff_ffff[32:0]);
MHm[15:0]:MLm[15:0] <- 0x8000_0000, CFR.OVS <- 1,
                  if (tmp[32:0] < 0x1_8000_0000[32:0]);
```

Handle Ra and Rb in half word vector format, and handle Mm in word vector format.
Perform fixed point multiplication (SIMD straight) for Ra and Rb. Store result in Mm and Rc. Saturate result when it cannot be represented by signed 32 bits.

| Assembler mnemonic | Format | Affecting flag | Affected flag |
|---|---|---|---|
| **vfmulw Mm,Rc,Ra,Rb** | 32bit | CFR.OVS | PSR.FXP |

Remarks

Only one of the two SIMD multiplication results is stored in Rc. Take out the other multiplication result from vunpk2 Rb, Mn, and the like.

No writing is performed to Rc, when r30 or r31 is specified as Rc.

Fig. 696 vxfmulw Mm,Rc,Ra,Rb

Behavior

```
tmp[32:0] <- sext33(smul(Ra[31:16],Rb[15:0]))<<FXP_SHIFT;
tmp[32:0] <- 0x0_7fff_ffff[32:0], CFR.OVS <- 1,
                    if ((Ra[31:16] == 0x8000 && Rb[15:0] == 0x8000)
                      && (PSR.FXP == 0));
tmp[32:0] <- 0x0_ffff_ffff[32:0], CFR.OVS <- 1,
                    if ((Ra[31:16] == 0x8000 && Rb[15:0] == 0x8000)
                      && (PSR.FXP == 1));
MHm[31:16]:MLm[31:16] <- tmp[31:0];
MHm[31:16]:MLm[31:16] <- 0x7fff_ffff, CFR.OVS <- 1,
                    if (tmp[32:0] > 0x0_7fff_ffff[32:0]);
MHm[31:16]:MLm[31:16] <- 0x8000_0000, CFR.OVS <- 1,
                    if (tmp[32:0] < 0x1_8000_0000[32:0]);
Rc[31:0] <- MHm[31:16]:MLm[31:16],
                    if (reg#(Rc) != 30 && reg#(Rc) != 31);

tmp[32:0] <- sext33(smul(Ra[15:0],Rb[31:16]))<<FXP_SHIFT;
tmp[32:0] <- 0x0_7fff_ffff[32:0], CFR.OVS <- 1,
                    if ((Ra[15:0] == 0x8000 && Rb[31:16] == 0x8000)
                      && (PSR.FXP == 0));
tmp[32:0] <- 0x0_ffff_ffff[32:0], CFR.OVS <- 1,
                    if ((Ra[15:0] == 0x8000 && Rb[31:16] == 0x8000)
                      && (PSR.FXP == 1));
MHm[15:0]:MLm[15:0] <- tmp[31:0];
MHm[15:0]:MLm[15:0] <- 0x7fff_ffff, CFR.OVS <- 1,
                    if (tmp[32:0] > 0x0_7fff_ffff[32:0]);
MHm[15:0]:MLm[15:0] <- 0x8000_0000, CFR.OVS <- 1,
                    if (tmp[32:0] < 0x1_8000_0000[32:0]);
```

Handle Ra and Rb in half word vector format, and handle Mm in word vector format.
Perform fixed point multiplication (SIMD cross) for Ra and Rb.
Store result in Mm and Rc. Saturate result when it cannot be represented by signed 32 bits.

| Assembler mnemonic | Format | Affecting flag | Affected flag |
|---|---|---|---|
| **vxfmulw Mm,Rc,Ra,Rb** | 32bit | CFR.OVS | PSR.FXP |

Remarks

Only one of the two SIMD multiplication results is stored in Rc. Take out the other multiplication result from vunpk2 Rb, Mn, and the like.

No writing is performed to Rc, when r30 or r31 is specified as Rc.

Fig. 697 vhfmulw Mm,Rc,Ra,Rb

| | |
|---|---|
| Behavior | tmp[32:0] <- sext33(smul(Ra[31:16],Rb[31:16]))<<FXP_SHIFT;<br>tmp[32:0] <- 0x0_7fff_ffff[32:0], CFR.OVS <- 1,<br>if ((Ra[31:16] == 0x8000 && Rb[31:16] == 0x8000)<br>&& (PSR.FXP == 0));<br>tmp[32:0] <- 0x0_ffff_ffff[32:0], CFR.OVS <- 1,<br>if ((Ra[31:16] == 0x8000 && Rb[31:16] == 0x8000)<br>&& (PSR.FXP == 1));<br>MHm[31:16]:MLm[31:16] <- tmp[31:0];<br>MHm[31:16]:MLm[31:16] <- 0x7fff_ffff, CFR.OVS <- 1,<br>if (tmp[32:0] > 0x0_7fff_ffff[32:0]);<br>MHm[31:16]:MLm[31:16] <- 0x8000_0000, CFR.OVS <- 1,<br>if (tmp[32:0] < 0x1_8000_0000[32:0]);<br>Rc[31:0] <- MHm[31:16]:MLm[31:16],<br>if (reg#(Rc) != 30 && reg#(Rc) != 31);<br><br>tmp[32:0] <- sext33(smul(Ra[15:0],Rb[31:16]))<<FXP_SHIFT;<br>tmp[32:0] <- 0x0_7fff_ffff[32:0], CFR.OVS <- 1,<br>if ((Ra[15:0] == 0x8000 && Rb[31:16] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[31:16] == 0x8000)<br>&& (PSR.FXP == 1));<br>MHm[15:0]:MLm[15:0] <- tmp[31:0];<br>MHm[15:0]:MLm[15:0] <- 0x7fff_ffff, CFR.OVS <- 1,<br>if (tmp[32:0] > 0x0_7fff_ffff[32:0]);<br>MHm[15:0]:MLm[15:0] <- 0x8000_0000, CFR.OVS <- 1,<br>if (tmp[32:0] < 0x1_8000_0000[32:0]);<br><br>Handle Ra and Rb in half word vector format, and handle Mm in word vector format.<br>Perform fixed point multiplication (SIMD high) for Ra and Rb.<br>Store result in Mm and Rc. Saturate result when it cannot be represented by signed 32 bits. |

| Assembler mnemonic | Format | Affecting flag | Affected flag |
|---|---|---|---|
| vhfmulw Mm,Rc,Ra,Rb | 32bit | CFR.OVS | PSR.FXP |

| Remarks |
|---|
| Only one of the two SIMD multiplication results is stored in Rc. Take out the other multiplication result from vunpk2 Rb, Mn, and the like.<br><br>No writing is performed to Rc, when r30 or r31 is specified as Rc. |

Fig. 698 vlfmulw Mm,Rc,Ra,Rb

Behavior

```
tmp[32:0] <- sext33(smul(Ra[31:16],Rb[15:0]))<<FXP_SHIFT;
tmp[32:0] <- 0x0_7fff_ffff, CFR.OVS <- 1,
                if ((Ra[31:16] == 0x8000 && Rb[15:0] == 0x8000)
                  && (PSR.FXP == 0))
tmp[32:0] <- 0x0_ffff_ffff, CFR.OVS <- 1,
                if ((Ra[31:16] == 0x8000 && Rb[15:0] == 0x8000)
                  && (PSR.FXP == 1))
MHm[31:16]:MLm[31:16] <- tmp[31:0];
MHm[31:16]:MLm[31:16] <- 0x7fff_ffff, CFR.OVS <- 1,
                if (tmp[32:0] > 0x0_7fff_ffff[32:0]);
MHm[31:16]:MLm[31:16] <- 0x8000_0000, CFR.OVS <- 1,
                if (tmp[32:0] < 0x1_8000_0000[32:0]);
Rc[31:0] <- MHm[31:16]:MLm[31:16],
                if (reg#(Rc) != 30 && reg#(Rc) != 31);

tmp[32:0] <- sext33(smul(Ra[15:0],Rb[15:0]))<<FXP_SHIFT;
tmp[32:0] <- 0x7fff_ffff[32:0], CFR.OVS <- 1,
                if ((Ra[15:0] == 0x8000 && Rb[15:0] == 0x8000)
                  && (PSR.FXP == 0))
tmp[32:0] <- 0xffff_ffff[32:0], CFR.OVS <- 1,
                if ((Ra[15:0] == 0x8000 && Rb[15:0] == 0x8000)
                  && (PSR.FXP == 1))
MHm[15:0]:MLm[15:0] <- tmp[31:0];
MHm[15:0]:MLm[15:0] <- 0x7fff_ffff, CFR.OVS <- 1,
                if (tmp[32:0] > 0x0_7fff_ffff[32:0]);
MHm[15:0]:MLm[15:0] <- 0x8000_0000, CFR.OVS <- 1,
                if (tmp[32:0] < 0x1_8000_0000[32:0]);
```

Handle Ra and Rb in half word vector format, and handle Mm in word vector format.
Perform fixed point multiplication (SIMD low) for Ra and Rb. Store result in Mm and Rc. Saturate result when it cannot be represented by signed 32 bits.

| Assembler mnemonic | Format | Affecting flag | Affected flag |
|---|---|---|---|
| **vlfmulw Mm,Rc,Ra,Rb** | 32bit | CFR.OVS | PSR.FXP |

Remarks

Only one of the two SIMD multiplication results is stored in Rc. Take out the other multiplication result from vunpk2 Rb, Mn, and the like.

No writing is performed to Rc, when r30 or r31 is specified as Rc.

Fig. 699 vpfmulhww Mm,Rc:Rc+1,Ra,Rb

| | |
|---|---|
| Behavior | tmp[48: 0] <- sext49(smul(Ra,Rb[31:16]))<<FXP_SHIFT;<br>tmp[48: 0] <- 0x0_7fff_ffff_ffff[48:0], CFR.OVS <- 1,<br>if ((Ra[31: 0] == 0x8000_0000 && Rb[31:16] == 0x8000)<br>&& (PSR.FXP == 0));<br>tmp[48: 0] <- 0x0_ffff_ffff_ffff[48:0], CFR.OVS <- 1,<br>if ((Ra[31: 0] == 0x8000_0000 && Rb[31:16] == 0x8000)<br>&& (PSR.FXP == 1));<br>MHm[31:16]:MLm[31:16] <- tmp[47:16];<br>MHm[31:16]:MLm[31:16] <- 0x7fff_ffff, CFR.OVS <- 1,<br>if (tmp[48:16] > 0x0_7fff_ffff[32:0]);<br>MHm[31:16]:MLm[31:16] <- 0x8000_0000, CFR.OVS <- 1,<br>if (tmp[48:16] < 0x1_8000_0000[32:0]);<br>Rc <- MHm[31:16]:MLm[31:16],<br>if (reg#(Rc) & 0b11110 != 0b11110);<br><br>tmp[48: 0] <- sext49(smul(Ra,Rb[15: 0])) << FXP_SHIFT ;<br>tmp[48: 0] <- 0x0_7fff_ffff_ffff[48:0], CFR.OVS <- 1,<br>if ((Ra[31: 0] == 0x8000_0000 && Rb[15: 0] == 0x8000)<br>&& (PSR.FXP == 0));<br>tmp[48: 0] <- 0x0_ffff_ffff_ffff[48:0], CFR.OVS <- 1,<br>if ((Ra[31: 0] == 0x8000_0000 && Rb[15: 0] == 0x8000)<br>&& (PSR.FXP == 1));<br>MHm[15: 0]:MLm[15: 0] <- tmp[47:16];<br>MHm[15: 0]:MLm[15: 0] <- 0x7fff_ffff, CFR.OVS <- 1,<br>if (tmp[48:16] > 0x0_7fff_ffff[32:0]);<br>MHm[15: 0]:MLm[15: 0] <- 0x8000_0000, CFR.OVS <- 1,<br>if (tmp[48:16] < 0x1_8000_0000[32:0]);<br>Rc+1 <- MHm[15: 0]:MLm[15: 0],<br>if (reg#(Rc+1) & 0b11110 != 0b11110);<br><br>Handle Ra and Rb in half word vector format, and handle Mm in word vector format.<br>Perform fixed point multiplication (SIMD pair) for Ra and Rb.<br>Store result in Mm, Rc, and Rc+1. Saturate result when it cannot be represented by signed 32 bits. |

| Assembler mnemonic | Format | Affecting flag | Affected flag |
|---|---|---|---|
| vpfmulhww Mm,Rc:Rc+1,Ra,Rb | 32bit | CFR.OVS | PSR.FXP |

| Remarks |
|---|
| No writing is performed to Rc, when r30 or r31 is specified as Rc. |

Fig. 700 vmac Mm,Rc,Ra,Rb,Mn

| | |
|---|---|
| Behavior | **MHm[31:16]:MLm[31:16] <- smul(Ra[31:16],Rb[31:16]) +MHn[31:16]:MLn[31:16];**<br>**Rc[31:16] <- MLm[31:16], if (reg#(Rc) != 30 && reg#(Rc) != 31);**<br>**MHm[15: 0]:MLm[15: 0] <- smul(Ra[15: 0],Rb[15: 0]) +MHn[15: 0]:MLn[15: 0];**<br>**Rc[15: 0] <- MLm[15: 0], if (reg#(Rc) != 30 && reg#(Rc) != 31);**<br><br>**Handle Ra, Rb, and Rc in half word vector format, and handle Mm and Mn in word vector format.**<br>**Perform integer multiplication (SIMD straight) for Ra and Rb, and add result to Mn. Store result in Mm and Rc.** |

| Assembler mnemonic | Format | Affecting flag | Affected flag |
|---|---|---|---|
| **vmac Mm,Rc,Ra,Rb,Mn** | 32bit | — | — |

| Remarks |
|---|
| No writing is performed to Rc, when r30 or r31 is specified as Rc. |

Fig. 701 vmac M0,Rc,Ra,Rb,Rx

| | |
|---|---|
| Behavior | MH0[31:16]:ML0[31:16] <- sext32(Rx[31:16])<br>+ smul(Ra[31:16],Rb[31:16]);<br>Rc[31:16] <- ML0[31:16], if (reg#(Rc) != 30 && reg#(Rc) != 31);<br>MH0[15: 0]:ML0[15: 0] <- sext32(Rx[15: 0])<br>+ smul(Ra[15: 0],Rb[15: 0]);<br>Rc[15: 0] <- ML0[15: 0], if (reg#(Rc) != 30 && reg#(Rc) != 31);<br><br>Handle Ra, Rb, Rc, and Rx in half word vector format, and handle M0 in word vector format.<br>Perform integer multiplication (SIMD straight) for Ra and Rb, and add result to Rx. Store result in M0 and Rc. |

| Assembler mnemonic | Format | Affecting flag | Affected flag |
|---|---|---|---|
| vmac M0,Rc,Ra,Rb,Rx | 32bit | — | — |

| Remarks |
|---|
| No writing is performed to Rc, when r30 or r31 is specified as Rc. |

Fig. 702 vxmac Mm,Rc,Ra,Rb,Mn

| | |
|---|---|
| Behavior | **MHm[31:16]:MLm[31:16] <- smul(Ra[31:16],Rb[15: 0]) +MHn[31:16]:MLn[31:16];**<br>**Rc[31:16] <- MLm[31:16], if (reg#(Rc) != 30 && reg#(Rc) != 31);**<br>**MHm[15: 0]:MLm[15: 0] <- smul(Ra[15: 0],Rb[31:16]) +MHn[15: 0]:MLn[15: 0];**<br>**Rc[15: 0] <- MLm[15: 0], if (reg#(Rc) != 30 && reg#(Rc) != 31);**<br><br>**Handle Ra, Rb, and Rc in half word vector format, and handle Mm and Mn in word vector format.**<br>**Perform integer multiplication (SIMD cross) for Ra and Rb, and add result to Mn. Store result in Mm and Rc.** |

| Assembler mnemonic | Format | Affecting flag | Affected flag |
|---|---|---|---|
| **vxmac Mm,Rc,Ra,Rb,Mn** | 32bit | — | — |

| Remarks |
|---|
| No writing is performed to Rc, when r30 or r31 is specified as Rc. |

Fig. 703 vxmac M0,Rc,Ra,Rb,Rx

| | |
|---|---|
| Behavior | **MH0[31:16]:ML0[31:16] <- sext32(Rx[31:16])<br>+ smul(Ra[31:16],Rb[15: 0]);<br>Rc[31:16] <- ML0[31:16], if (reg#(Rc) != 30 && reg#(Rc) != 31);<br>MH0[15: 0]:ML0[15: 0] <- sext32(Rx[15: 0])<br>+ smul(Ra[15: 0],Rb[31:16]);<br>Rc[15: 0] <- ML0[15: 0], if (reg#(Rc) != 30 && reg#(Rc) != 31);<br><br>Handle Ra, Rb, Rc, and Rx in half word vector format, and handle M0 in word vector format.<br>Perform integer multiplication (SIMD cross) for Ra and Rb, and add result to Rx. Store result in M0 and Rc.** |

| Assembler mnemonic | Format | Affecting flag | Affected flag |
|---|---|---|---|
| **vxmac M0,Rc,Ra,Rb,Rx** | 32bit | — | — |

| Remarks |
|---|
| No writing is performed to Rc, when r30 or r31 is specified as Rc. |

Fig. 704 vhmac Mm,Rc,Ra,Rb,Mn

| | |
|---|---|
| Behavior | **MHm[31:16]:MLm[31:16] <- smul(Ra[31:16],Rb[31:16]) +MHn[31:16]:MLn[31:16];**<br>**Rc[31:16] <- MLm[31:16], if (reg#(Rc) != 30 && reg#(Rc) != 31);**<br>**MHm[15: 0]:MLm[15: 0] <- smul(Ra[15: 0],Rb[31:16]) +MHn[15: 0]:MLn[15: 0];**<br>**Rc[15: 0] <- MLm[15: 0], if (reg#(Rc) != 30 && reg#(Rc) != 31);**<br><br>**Handle Ra, Rb, and Rc in half word vector format, and handle Mm and Mn in word vector format.**<br>**Perform integer multiplication (SIMD high) for Ra and Rb, and add result to Mn. Store result in Mm and Rc.** |

| Assembler mnemonic | Format | Affecting flag | Affected flag |
|---|---|---|---|
| **vhmac Mm,Rc,Ra,Rb,Mn** | 32bit | — | — |

| Remarks |
|---|
| No writing is performed to Rc, when r30 or r31 is specified as Rc. |

Fig. 705 vhmac M0,Rc,Ra,Rb,Rx

| | |
|---|---|
| Behavior | MH0[31:16]:ML0[31:16] <- sext32(Rx[31:16])<br>+ smul(Ra[31:16],Rb[31:16]);<br>Rc[31:16] <- ML0[31:16], if (reg#(Rc) != 30 && reg#(Rc) != 31);<br>MH0[15: 0]:ML0[15: 0] <- sext32(Rx[15: 0])<br>+ smul(Ra[15: 0],Rb[31:16]);<br>Rc[15: 0] <- ML0[15: 0], if (reg#(Rc) != 30 && reg#(Rc) != 31);<br><br>Handle Ra, Rb, Rc, and Rx in half word vector format, and handle M0 in word vector format.<br>Perform integer multiplication (SIMD high) for Ra and Rb, and add result to Rx. Store result in M0 and Rc. |

| Assembler mnemonic | Format | Affecting flag | Affected flag |
|---|---|---|---|
| vhmac M0,Rc,Ra,Rb,Rx | 32bit | — | — |

| Remarks |
|---|
| No writing is performed to Rc, when r30 or r31 is specified as Rc. |

Fig. 706 vlmac Mm,Rc,Ra,Rb,Mn

| | |
|---|---|
| Behavior | **MHm[31:16]:MLm[31:16] <- smul(Ra[31:16],Rb[15: 0])<br>+MHn[31:16]:MLn[31:16];<br>Rc[31:16] <- MLm[31:16], if (reg#(Rc) != 30 && reg#(Rc) != 31);<br>MHm[15: 0]:MLm[15: 0] <- smul(Ra[15: 0],Rb[15: 0])<br>+MHn[15: 0]:MLn[15: 0];<br>Rc[15: 0] <- MLm[15: 0], if (reg#(Rc) != 30 && reg#(Rc) != 31);<br><br>Handle Ra, Rb, and Rc in half word vector format, and handle Mm and Mn in word vector format.<br>Perform integer multiplication (SIMD low) for Ra and Rb, and add result to Mn. Store result in Mm and Rc.** |

| Assembler mnemonic | Format | Affecting flag | Affected flag |
|---|---|---|---|
| **vlmac Mm,Rc,Ra,Rb,Mn** | 32bit | — | — |

| Remarks |
|---|
| No writing is performed to Rc, when r30 or r31 is specified as Rc. |

Fig. 707 vlmac M0,Rc,Ra,Rb,Rx

| | |
|---|---|
| Behavior | MH0[31:16]:ML0[31:16] <- sext32(Rx[31:16])<br>+ smul(Ra[31:16],Rb[15: 0]);<br>Rc[31:16] <- ML0[31:16], if (reg#(Rc) != 30 && reg#(Rc) != 31);<br>MH0[15: 0]:ML0[15: 0] <- sext32(Rx[15: 0])<br>+ smul(Ra[15: 0],Rb[15: 0]);<br>Rc[15: 0] <- ML0[15: 0], if (reg#(Rc) != 30 && reg#(Rc) != 31);<br><br>Handle Ra, Rb, Rc, and Rx in half word vector format, and handle M0 in word vector format.<br>Perform integer multiplication (SIMD low) for Ra and Rb, and add result to Mn. Store result in Mm and Rc. |

| Assembler mnemonic | Format | Affecting flag | Affected flag |
|---|---|---|---|
| vlmac M0,Rc,Ra,Rb,Rx | 32bit | — | — |

| Remarks |
|---|
| No writing is performed to Rc, when r30 or r31 is specified as Rc. |

Fig. 708 vfmach Mm,Rc,Ra,Rb,Mn

Behavior

```
tmp[32:0] <- sext33(smul(Ra[31:16],Rb[31:16]))<<FXP_SHIFT;
tmp[32:0] <- 0x0_7fff_ffff[32:0], CFR.OVS <- 1,
if ((Ra[31:16] == 0x8000     && Rb[31:16] == 0x8000)
                             && ( PSR.FXP == 0));
tmp[32:0] <- 0x0_ffff_ffff[32:0], CFR.OVS <- 1,
if ((Ra[31:16] == 0x8000     &&  Rb[31:16] == 0x8000)
                             && ( PSR.FXP == 1));
tmp2[33:0] <- sext34(MHn[31:16]:MLn[31:16])+sext34(tmp[32:0]);
MHm[31:16]:MLm[31:16] <- tmp2[31:0];
MHm[31:16]:MLm[31:16] <- 0x7fff_ffff, CFR.OVS <- 1,
                   if (tmp2[33:0] > 0x0_7fff_ffff[33:0]);
MHm[31:16]:MLm[31:16] <- 0x8000_0000, CFR.OVS <- 1,
                   if (tmp2[33:0] < 0x3_8000_0000[33:0]);
Rc[31:16] <- MHm[31:16],  if (reg#(Rc) != 30 && reg#(Rc) != 31);

tmp[32:0] <- sext34(smul(Ra[15:0],Rb[15:0])) << FXP_SHIFT;
tmp[32:0] <- 0x0_7fff_ffff[32:0], CFR.OVS <- 1,
if ((Ra[15: 0] == 0x8000 && Rb[15:0] == 0x8000),
                             && ( PSR.FXP == 0 ));
tmp[32:0] <- 0x0_ffff_ffff[32:0], CFR.OVS <- 1,
if ((Ra[15:0] == 0x8000 && Rb[15:0] == 0x8000)
                             && ( PSR.FXP == 1 ));
tmp2[33:0] <- sext34(MHn[15:0]:MLn[15:0])+ sext34(tmp[32:0]);
MHm[15: 0]:MLm[15: 0] <- tmp2[31:0];
MHm[15: 0]:MLm[15: 0] <- 0x7fff_ffff, CFR.OVS <- 1,
                   if (tmp2[33:0] > 0x0_7fff_ffff[33:0]);
MHm[15: 0]:MLm[15: 0] <- 0x8000_0000, CFR.OVS <- 1,
                   if (tmp2[33:0] < 0x3_8000_0000[33:0]);
Rc[15: 0] <- MHm[15: 0], if (reg#(Rc) != 30 && reg#(Rc) != 31);
```

Handle Ra, Rb, and Rc in half word vector format, and handle Mm and Mn in word vector format.
Perform fixed point multiplication (SIMD straight) for Ra and Rb, and add result to Mn. Store result in Mm and Rc. Saturate result when it cannot be represented by signed 32 bits.

| Assembler mnemonic | Format | Affecting flag | Affected flag |
|---|---|---|---|
| vfmach Mm,Rc,Ra,Rb,Mn | 32bit | CFR.OVS | PSR.FXP |

Remarks

No writing is performed to Rc, when r30 or r31 is specified as Rc.

Fig. 709 vfmach M0,Rc,Ra,Rb,Rx

| | |
|---|---|
| Behavior | tmp[32:0] <- sext33(smul(Ra[31:16],Rb[31:16]))<<FXP_SHIFT;<br>tmp[32:0] <- 0x0_7fff_ffff[32:0], CFR.OVS <- 1,<br>if ((Ra[31:16] == 0x8000 && Rb[31:16] == 0x8000<br>&& (PSR.FXP == 0));<br>tmp[32:0] <- 0x0_ffff_ffff[32:0], CFR.OVS <- 1,<br>if ((Ra[31:16] == 0x8000 && Rb[31:16] == 0x8000<br>&& (PSR.FXP == 1));<br>tmp2[33:0] <- (sext34(Rx[31:16])<<16) +sext34(tmp[32:0]);<br>MH0[31:16]:ML0[31:16] <- tmp2[31:0];<br>MH0[31:16]:ML0[31:16] <- 0x7fff_ffff, CFR.OVS <- 1,<br>if (tmp2[33:0] > 0x0_7fff_ffff[33:0]);<br>MH0[31:16]:ML0[31:16] <- 0x8000_0000, CFR.OVS <- 1,<br>if (tmp2[33:0] < 0x3_8000_0000[33:0]);<br>Rc[31:16] <- MH0[31:16], if (reg#(Rc) != 30 && reg#(Rc) != 31);<br><br>tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[15:0] == 0x8000)<br>&& (PSR.FXP == 1));<br>tmp2[33:0] <- (sext34(Rx[15:0])<<16) + sext34(tmp[32:0])<br>MH0[15: 0]:ML0[15: 0] <- tmp2[31:0];<br>MH0[15: 0]:ML0[15: 0] <- 0x7fff_ffff, CFR.OVS <- 1,<br>if (tmp2[33:0] > 0x0_7fff_ffff[33:0]);<br>MH0[15: 0]:ML0[15: 0] <- 0x8000_0000, CFR.OVS <- 1,<br>if (tmp2[33:0] < 0x3_8000_0000[33:0]);<br>Rc[15: 0] <- MH0[15: 0], if (reg#(Rc) != 30 && reg#(Rc) != 31);<br><br>Handle Ra, Rb, Rc, and Rx in half word vector format, and handle M0 in word vector format.<br>Perform fixed point multiplication (SIMD straight) for Ra and Rb, and add result to Rx. Store result in M0 and Rc. Saturate result when it cannot be represented by signed 32 bits. |

| Assembler mnemonic | Format | Affecting flag | Affected flag |
|---|---|---|---|
| **vfmach M0,Rc,Ra,Rb,Rx** | 32bit | CFR.OVS | PSR.FXP |

| Remarks |
|---|
| No writing is performed to Rc, when r30 or r31 is specified as Rc. |

Fig. 710 vxfmach Mm,Rc,Ra,Rb,Mn

| | |
|---|---|
| Behavior | tmp[32:0] <- sext33(smul(Ra[31:16],Rb[15: 0])) << FXP_SHIFT;<br>tmp[32:0] <- 0x0_7fff_ffff[32:0], CFR.OVS <- 1,<br>if ((Ra[31:16] == 0x8000 && Rb[15: 0] == 0x8000)<br>&& ( PSR.FXP == 0));<br>tmp[32:0] <- 0x0_ffff_ffff[32:0], CFR.OVS <- 1,<br>if ((Ra[31:16] == 0x8000 && Rb[15: 0] == 0x8000)<br>&& ( PSR.FXP == 1));<br>tmp2[33:0] <- sext34(MHn[31:16]:MLn[31:16])+ sext34(tmp[32:0]);<br>MHm[31:16]:MLm[31:16] <- tmp2[31:0];<br>MHm[31:16]:MLm[31:16] <- 0x7fff_ffff, CFR.OVS <- 1,<br>if (tmp2[33: 0] > 0x0_7fff_ffff[33:0]);<br>MHm[31:16]:MLm[31:16] <- 0x8000_0000, CFR.OVS <- 1,<br>if (tmp2[33: 0] < 0x3_8000_0000[33:0]);<br>Rc[31:16] <- MHm[31:16], if (reg#(Rc) != 30 && reg#(Rc) != 31);<br>tmp[32:0] <- sext33(smul(Ra[15: 0],Rb[31:16])) << FXP_SHIFT;<br>tmp[32:0] <- 0x0_7fff_ffff[32:0], CFR.OVS <- 1,<br>if ((Ra[15: 0] == 0x8000 && Rb[31:16] == 0x8000)<br>&& ( PSR.FXP ==0));<br>tmp[32:0] <- 0x0_ffff_ffff[32:0], CFR.OVS <- 1,<br>if ((Ra[15: 0] == 0x8000 && Rb[31:16] == 0x8000)<br>&& ( PSR.FXP ==1));<br>tmp2[33:0] <- sext34(MHn[15:0]:MLn[15:0])+ sext34(tmp[31:0]);<br>MHm[15: 0]:MLm[15: 0] <- tmp2[31:0];<br>MHm[15: 0]:MLm[15: 0] <- 0x7fff_ffff, CFR.OVS <- 1,<br>if (tmp2[33:0] > 0x0_7fff_ffff[33:0]);<br>MHm[15: 0]:MLm[15: 0] <- 0x8000_0000, CFR.OVS <- 1,<br>if (tmp2[33:0] < 0x3_8000_0000[33:0]);<br>Rc[15:0] <- MHm[15:0], if (reg#(Rc) != 30 && reg#(Rc) != 31);<br><br>Handle Ra, Rb, and Rc in half word vector format, and handle Mm and Mn in word vector format.<br>Perform fixed point multiplication (SIMD cross) for Ra and Rb, and add result to Mn. Store result in Mm and Rc. Saturate result when it cannot be represented by signed 32 bits. |

| Assembler mnemonic | Format | Affecting flag | Affected flag |
|---|---|---|---|
| vxfmach Mm,Rc,Ra,Rb,Mn | 32bit | CFR.OVS | PSR.FXP |

| Remarks |
|---|
| No writing is performed to Rc, when r30 or r31 is specified as Rc. |

Fig. 711 vxfmach M0,Rc,Ra,Rb,Rx

Behavior

```
tmp[32:0] <- sext33(smul(Ra[31:16],Rb[15:0]))<<FXP_SHIFT;
tmp[32:0] <- 0x0_7fff_ffff[32:0], CFR.OVS <- 1,
if ((Ra[31:16] == 0x8000 && Rb[15: 0] == 0x8000)
                                    && (PSR.FXP == 0));
tmp[32:0] <- 0x0_ffff_ffff[32:0], CFR.OVS <- 1,
if ((Ra[31:16] == 0x8000 && Rb[15: 0] == 0x8000)
                                    && (PSR.FXP == 1));
tmp2[33:0] <- (sext34(Rx[31:16])<<16) +sext34(tmp[32:0]);
MH0[31:16]:ML0[31:16] <- tmp2[31:0];
MH0[31:16]:ML0[31:16] <- 0x7fff_ffff, CFR.OVS <- 1,
                      if (tmp2[33:0] > 0x0_7fff_ffff[33:0]);
MH0[31:16]:ML0[31:16] <- 0x8000_0000, CFR.OVS <- 1,
                      if (tmp2[33:0] < 0x3_8000_0000[33:0]);
Rc[31:16] <- MH0[31:16], if (reg#(Rc) != 30 && reg#(Rc) != 31);

tmp[32:0] <- sext33(smul(Ra[15:0],Rb[31:16]))<<FXP_SHIFT;
tmp[32:0] <- 0x0_7fff_ffff[32:0], CFR.OVS <- 1,
if ((Ra[15: 0] == 0x8000 && Rb[31:16] == 0x8000)
                                    && (PSR.FXP == 0));
tmp[32:0] <- 0x0_ffff_ffff[32:0], CFR.OVS <- 1,
if ((Ra[15: 0] == 0x8000 && Rb[31:16] == 0x8000)
                                    && (PSR.FXP == 1));
tmp2[33:0] <- (sext34(Rx[15:0])<<16) + sext34(tmp[32:0]);
MH0[15: 0]:ML0[15: 0] <- tmp2[31:0];
MH0[15:0]:ML0[15:0] <- 0x7fff_ffff, CFR.OVS <- 1,
                      if (tmp2[33:0] > 0x0_7fff_ffff[33:0]);
MH0[15:0]:ML0[15:0] <- 0x8000_0000, CFR.OVS <- 1,
                      if (tmp2[33:0] < 0x3_8000_0000[33:0]);
Rc[15:0] <- MH0[15:0], if (reg#(Rc) != 30 && reg#(Rc) != 31);
```

Handle Ra, Rb, Rc, and Rx in half word vector format, and handle M0 in word vector format.
Perform fixed point multiplication (SIMD cross) for Ra and Rb, and add result to Rx. Store result in M0 and Rc. Saturate result when it cannot be represented by signed 32 bits.

| Assembler mnemonic | Format | Affecting flag | Affected flag |
|---|---|---|---|
| **vxfmach M0,Rc,Ra,Rb,Rx** | 32bit | CFR.OVS | PSR.FXP |

Remarks

No writing is performed to Rc, when r30 or r31 is specified as Rc.

Fig. 712 vhfmach Mm,Rc,Ra,Rb,Mn

| | |
|---|---|
| Behavior | tmp[32:0] <- sext33(smul(Ra[31:16],Rb[31:16]))<<FXP_SHIFT;<br>tmp[32:0] <- 0x_0_7fff_ffff[32:0], CFR.OVS <- 1,<br>if ((Ra[31:16] == 0x8000 && Rb[31:16] == 0x8000)<br>&& ( PSR.FXP == 0 ));<br>tmp[32:0] <- 0x_0_ffff_ffff[32:0],<br>if ((Ra[31:16] == 0x8000 && Rb[31:16] == 0x8000)<br>&& ( PSR.FXP == 1 ));<br>tmp2[33:0] <- sext34(MHn[31:16]:MLn[31:16])+ sext34(tmp[31:0]);<br>MHm[31:16]:MLm[31:16] <- tmp2[31:0];<br>MHm[31:16]:MLm[31:16] <- 0x7fff_ffff, CFR.OVS <- 1,<br>if (tmp2[33:0] > 0x0_7fff_ffff[33:0]);<br>MHm[31:16]:MLm[31:16] <- 0x8000_0000, CFR.OVS <- 1,<br>if (tmp2[33:0] < 0x3_8000_0000[33:0]);<br>Rc[31:16] <- MHm[31:16], if (reg#(Rc) != 30 && reg#(Rc) != 31);<br><br>tmp[32:0] <- sext33(smul(Ra[15: 0],Rb[31:16]))<<FXP_ SHIFT;<br>mp[32:0] <- 0x0_7fff_ffff[32:0], CFR.OVS <- 1,<br>if ((Ra[15: 0] == 0x8000 && Rb[31:16] == 0x8000)<br>&& ( PSR.FXP == 0 ));<br>mp[32:0] <- 0x0_ffff_ffff[32:0], CFR.OVS <- 1,<br>if ((Ra[15: 0] == 0x8000 && Rb[31:16] == 0x8000)<br>&& ( PSR.FXP == 1 ));<br>mp2[33:0] <- sext34(MHn[15:0]:MLn[15:0])+ sext34(tmp[32:0]);<br>Hm[15: 0]:MLm[15: 0] <- tmp2[31:0];<br>Hm[15: 0]:MLm[15: 0] <- 0x7fff_ffff, CFR.OVS <- 1,<br>if (tmp2[33:0] > 0x0_7fff_ffff[33:0]);<br>Hm[15: 0]:MLm[15: 0] <- 0x8000_0000, CFR.OVS <- 1,<br>if (tmp2[33:0] < 0x3_8000_0000[33:0]);<br>c[15:0] <- MHm[15:0], if (reg#(Rc) != 30 && reg#(Rc) != 31);<br><br>Handle Ra, Rb, and Rc in half word vector format, and handle Mm and Mn in word vector format.<br>Perform fixed point multiplication (SIMD high) for Ra and Rb, and add result to Mn. Store result in Mm and Rc. Saturate result when it cannot be represented by signed 32 bits. |

| Assembler mnemonic | Format | Affecting flag | Affected flag |
|---|---|---|---|
| vhfmach Mm,Rc,Ra,Rb,Mn | 32bit | CFR.OVS | PSR.FXP |

| Remarks |
|---|
| No writing is performed to Rc, when r30 or r31 is specified as Rc. |

Fig. 713 vhfmach M0,Rc,Ra,Rb,Rx

| | |
|---|---|
| Behavior | tmp[32:0] <- sext33(smul(Ra[31:16],Rb[31:16]))<<FXP_SHIFT;<br>tmp[32:0] <- 0x0_7fff_ffff[32:0], CFR.OVS <- 1,<br>if ((Ra[31:16] == 0x8000 && Rb[31:16] == 0x8000)<br>&& (PSR.FXP == 0));<br>tmp[32:0] <- 0x0_ffff_ffff[32:0], CFR.OVS <- 1,<br>if ((Ra[31:16] == 0x8000 && Rb[31:16] == 0x8000)<br>&& (PSR.FXP == 1));<br>tmp2[33:0] <- (sext34(Rx[31:16])<<16) + sext34(tmp[32:0]);<br>MH0[31:16]:ML0[31:16] <- tmp2[31:0];<br>MH0[31:16]:ML0[31:16] <- 0x7fff_ffff, CFR.OVS <- 1,<br>if (tmp2[33:0] > 0x0_7fff_ffff[33:0]);<br>MH0[31:16]:ML0[31:16] <- 0x8000_0000, CFR.OVS <- 1,<br>if (tmp2[33:0] < 0x3_8000_0000[33:0]);<br>Rc[31:16] <- MH0[31:16], if (reg#(Rc) != 30 && reg#(Rc) != 31);<br><br>tmp[32:0] <- sext33(smul(Ra[15:0],Rb[31:16]))<<FXP_SHIFT;<br>tmp[32:0] <- 0x0_7fff_ffff[32:0], CFR.OVS <- 1,<br>if ((Ra[15:0] == 0x8000 && Rb[31:16] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[31:16] == 0x8000)<br>&& (PSR.FXP == 1));<br>tmp2[33:0] <- (sext33(Rx[15:0])<<16) + sext33(tmp[32:0]);<br>MH0[15: 0]:ML0[15: 0] <- tmp2[31:0];<br>MH0[15:0]:ML0[15:0] <- 0x7fff_ffff, CFR.OVS <- 1,<br>if (tmp2[33:0] > 0x0_7fff_ffff[33:0]);<br>MH0[15:0]:ML0[15:0] <- 0x8000_0000, CFR.OVS <- 1,<br>if (tmp2[33:0] < 0x3_8000_0000[33:0]);<br>Rc[15:0] <- MH0[15:0], if (reg#(Rc) != 30 && reg#(Rc) != 31);<br><br>Handle Ra, Rb, Rc, and Rx in half word vector format, and handle M0 in word vector format.<br>Perform fixed point multiplication (SIMD high) for Ra and Rb, and add result to Rx. Store result in M0 and Rc. Saturate result when it cannot be represented by signed 32 bits. |

| Assembler mnemonic | Format | Affecting flag | Affected flag |
|---|---|---|---|
| vhfmach M0,Rc,Ra,Rb,Rx | 32bit | CFR.OVS | PSR.FXP |

| Remarks |
|---|
| No writing is performed to Rc, when r30 or r31 is specified as Rc. |

Fig. 714 vlfmach Mm,Rc,Ra,Rb,Mn

Behavior

```
tmp[32:0] <- sext33(smul(Ra[31:16],Rb[15: 0]))<<FXP_SHIFT;
tmp[32:0] <- 0x0_7fff_ffff[32:0], CFR.OVS <- 1,
  if ((Ra[31:16] == 0x8000 && Rb[15: 0] == 0x8000)
                             && ( PSR.FXP == 0 ));
tmp[32:0] <- 0x0_ffff_ffff[32:0], CFR.OVS <- 1,
  if ((Ra[31:16] == 0x8000 && Rb[15: 0] == 0x8000)
                             && ( PSR.FXP == 1 ));
tmp2[33:0] <- sext34(MHn[31:16]:MLn[31:16])+ sext34(tmp[31:0]);
MHm[31:16]:MLm[31:16] <- tmp2[31:0];
MHm[31:16]:MLm[31:16] <- 0x7fff_ffff, CFR.OVS <- 1,
                 if (tmp2[33:0] > 0x0_7fff_ffff[33:0]);
MHm[31:16]:MLm[31:16] <- 0x8000_0000, CFR.OVS <- 1,
                 if (tmp2[33:0] < 0x3_8000_0000[33:0]);
Rc[31:16] <- MHm[31:16], if (reg#(Rc) != 30 && reg#(Rc) != 31);

tmp[32:0] <- sext33(smul(Ra[15: 0],Rb[15: 0]))<<FXP_ SHIFT;
tmp[32:0] <- 0x0_7fff_ffff[32:0], CFR.OVS <- 1,
  if ((Ra[15: 0] == 0x8000 && Rb[15: 0] == 0x8000)
                             && ( PSR.FXP == 0));
tmp[32:0] <- 0x0_ffff_ffff[32:0], CFR.OVS <- 1,
  if ((Ra[15: 0] == 0x8000 && Rb[15: 0] == 0x8000)
                             && ( PSR.FXP == 1));
tmp2[33:0] <- sext34(MHn[15:0]:MLn[15:0])+ sext34(tmp[31:0]);
MHm[15: 0]:MLm[15: 0] <- tmp2[31:0];
MHm[15: 0]:MLm[15: 0] <- 0x7fff_ffff, CFR.OVS <- 1,
                 if (tmp2[33:0] > 0x0_7fff_ffff[33:0]);
MHm[15: 0]:MLm[15: 0] <- 0x8000_0000, CFR.OVS <- 1,
                 if (tmp2[33:0] < 0x3_8000_0000[33:0]);
Rc[15:0] <- MHm[15:0], if (reg#(Rc) != 30 && reg#(Rc) != 31);
```

Handle Ra, Rb, and Rc in half word vector format, and handle Mm and Mn in word vector format.
Perform fixed point multiplication (SIMD low) for Ra and Rb, and add result to Mn. Store result in Mm and Rc. Saturate result when it cannot be represented by signed 32 bits.

| Assembler mnemonic | Format | Affecting flag | Affected flag |
|---|---|---|---|
| **vlfmach Mm,Rc,Ra,Rb,Mn** | 32bit | CFR.OVS | PSR.FXP |

| Remarks |
|---|
| No writing is performed to Rc, when r30 or r31 is specified as Rc. |

Fig. 715 vlfmach M0,Rc,Ra,Rb,Rx

Behavior

```
tmp[32:0] <- sext33(smul(Ra[31:16],Rb[15:0]))<<FXP_SHIFT;
tmp[32:0] <- 0x0_7fff_ffff[32:0], CFR.OVS <- 1,
if ((Ra[31:16] == 0x8000 && Rb[15:0] == 0x8000)
                              && (PSR.FXP == 0));
tmp[32:0] <- 0x0_ffff_ffff[32:0], CFR.OVS <- 1,
if ((Ra[31:16] == 0x8000 && Rb[15:0] == 0x8000)
                              && (PSR.FXP == 1));
tmp2[33:0] <- (sext34(Rx[31:16])<<16) +sext34(tmp[32:0]);
MH0[31:16]:ML0[31:16] <- tmp2[31:0];
MH0[31:16]:ML0[31:16] <- 0x7fff_ffff, CFR.OVS <- 1,
                   if (tmp2[33:0] > 0x0_7fff_ffff[33:0]);
MH0[31:16]:ML0[31:16] <- 0x8000_0000, CFR.OVS <- 1,
                   if (tmp2[33:0] < 0x3_8000_0000[33:0]);
Rc[31:16] <- MH0[31:16], if (reg#(Rc) != 30 && reg#(Rc) != 31);

tmp[32:0] <- sext33(smul(Ra[15:0],Rb[15:0]))<<FXP_SHIFT;
tmp[32:0] <- 0x0_7fff_ffff[32:0], CFR.OVS <- 1,
if ((Ra[15:0] == 0x8000 && Rb[15:0] == 0x8000)
                              && (PSR.FXP == 0));
tmp[32:0] <- 0x0_ffff_ffff[32:0], CFR.OVS <- 1,
if ((Ra[15:0] == 0x8000 && Rb[15:0] == 0x8000)
                              && (PSR.FXP == 1));
tmp2[33:0] <- (sext34(Rx[15:0])<<16) + sext34(tmp[32:0])
MH0[15: 0]:ML0[15: 0] <- tmp2[31:0];
MH0[15: 0]:ML0[15: 0] <- 0x7fff_ffff, CFR.OVS <- 1,
                   if (tmp2[33:0] > 0x0_7fff_ffff[33:0]);
MH0[15: 0]:ML0[15: 0] <- 0x8000_0000, CFR.OVS <- 1,
                   if (tmp2[33:0] < 0x3_8000_0000[33:0]);
Rc[15:0] <- MH0[15:0], if (reg#(Rc) != 30 && reg#(Rc) != 31);
```

Handle Ra, Rb, Rc, and Rx in half word vector format, and handle M0 in word vector format.
Perform fixed point multiplication (SIMD low) for Ra and Rb, and add result to Rx. Store result in M0 and Rc. Saturate result when it cannot be represented by signed 32 bits.

| Assembler mnemonic | Format | Affecting flag | Affected flag |
|---|---|---|---|
| vlfmach M0,Rc,Ra,Rb,Rx | 32bit | CFR.OVS | PSR.FXP |

Remarks

No writing is performed to Rc, when r30 or r31 is specified as Rc.

Fig. 716 vfmachr Mm,Rc,Ra,Rb,Mn

Behavior

```
tmp[32: 0] <- sext33(smul(Ra[31:16],Rb[31:16]))<<FXP_SHIFT;
tmp[32: 0] <- 0x0_7fff_ffff[32: 0], CFR.OVS <- 1,
if ((Ra[31:16] == 0x8000 &&R b[31:16] == 0x8000)
                          && (PSR.FXP == 0));
tmp[32: 0] <- 0x0_ffff_ffff[32: 0], CFR.OVS <- 1,
if ((Ra[31:16] == 0x8000 &&R b[31:16] == 0x8000)
                          && (PSR.FXP == 1));
tmp2[34: 0] <- sext35(tmp[32: 0])
                          + sext35(MHn[31:16]:MLn[31:16])
                          + sext35(0x0_8000);
MHm[31:16]:MLm[31:16] <- tmp2[31:16]:16'b0;
MHm[31:16]:MLm[31:16] <- 0x7fff_0000, CFR.OVS <- 1,
                       if (tmp2[34:16] > 0x0_7fff[18:0]);
MHm[31:16]:MLm[31:16] <- 0x8000_0000, CFR.OVS <- 1,
                       if (tmp2[34:16] < 0x7_8000[18:0]);
MHm[31:16]:MLm[31:16] <- UD, if (PSR.FXP == 1);
Rc[31:16] <- MHm[31:16], if (reg#(Rc) != 30 && reg#(Rc) != 31);

tmp[32: 0] <- sext33(smul(Ra[15: 0],Rb[15: 0]))<<FXP_SHIFT;
tmp[32: 0] <- 0x0_7fff_ffff[32: 0], CFR.OVS <- 1,
if ((Ra[15: 0] == 0x8000 && Rb[15: 0] == 0x8000)
                          && (PSR.FXP == 0));
tmp[32: 0] <- 0x0_7fff_ffff[32: 0], CFR.OVS <- 1,
if ((Ra[15: 0] == 0x8000 && Rb[15: 0] == 0x8000)
                          && (PSR.FXP == 1));
tmp2[34: 0] <- sext35(tmp[32: 0])
                          + sext35(MHn[15: 0]:MLn[15: 0])
                          + sext35(0x0_8000);
MHm[15:0]:MLm[15:0] <- tmp2[31:16]:16'b0;
MHm[15:0]:MLm[15:0] <- 0x7fff_0000, CFR.OVS <- 1,
                       if (tmp2[34:16] > 0x0_7fff[18: 0]);
MHm[15:0]:MLm[15:0] <- 0x8000_0000, CFR.OVS <- 1,
                       if (tmp2[34:16] < 0x7_8000[18: 0]);
MHm[15:0]:MLm[15:0] <- UD, if (PSR.FXP == 1);
Rc[15: 0] <- MHm[15: 0], if (reg#(Rc) != 30 && reg#(Rc) != 31);
```

Handle Ra, Rb, and Rc in half word vector format, and handle Mm and Mn in word vector format.
Perform fixed point multiplication (SIMD straight) for Ra and Rb, and add result to Mn. Round result from 32 bits down to 16 bits, and store it in Mm and Rc. Saturate result when it cannot be represented by signed 32 bits.

| Assembler mnemonic | Format | Affecting flag | Affected flag |
|---|---|---|---|
| **vfmachr Mm,Rc,Ra,Rb,Mn** | 32bit | CFR.OVS | PSR.FXP |

Remarks

This instruction is not implemented when PSR.FXP == 1, and Mm and Rc are UD.

The lower 32 bits of Mm is always 0.

No writing is performed to Rc, when r30 or r31 is specified as Rc.

Fig. 717 vfmachr M0,Rc,Ra,Rb,Rx

Behavior

```
tmp[32: 0] <- sext33(smul(Ra[31:16],Rb[31:16]))<<FXP_SHIFT;
tmp[32: 0] <- 0x0_7fff_ffff[32: 0], CFR.OVS <- 1,
if ((Ra[31:16] == 0x8000 && Rb[31:16] == 0x8000)
                                && (PSR.FXP == 0));
tmp[32: 0] <- 0x0_ffff_ffff[32: 0], CFR.OVS <- 1,
if ((Ra[31:16] == 0x8000 && Rb[31:16] == 0x8000)
                                && (PSR.FXP == 1));
tmp2[34: 0] <- sext35(tmp[32: 0])
                                + (sext35(Rx[31:16])<<16)
                                + sext35(0x0_8000);
MHm[31:16]:MLm[31:16] <- tmp2[31:16]:16'b0;
MHm[31:16]:MLm[31:16] <- 0x7fff_0000, CFR.OVS <- 1,
                            if (tmp2[34:16] > 0x0_7fff[18:0]);
MHm[31:16]:MLm[31:16] <- 0x8000_0000, CFR.OVS <- 1,
                            if (tmp2[34:16] < 0x7_8000[18:0]);
MHm[31:16]:MLm[31:16] <- UD, if (PSR.FXP == 1);
Rc[31:16] <- MHm[31:16], if (reg#(Rc) != 30 && reg#(Rc) != 31);

tmp[32: 0] <- sext33(smul(Ra[15: 0],Rb[15: 0]))<<FXP_SHIFT;
tmp[32: 0] <- 0x0_7fff_ffff[32: 0], CFR.OVS <- 1,
if ((Ra[15: 0] == 0x8000 && Rb[15: 0] == 0x8000)
                                && (PSR.FXP == 0));
tmp[32: 0] <- 0x0_ffff_ffff[32: 0], CFR.OVS <- 1,
if ((Ra[15: 0] == 0x8000 && Rb[15: 0] == 0x8000)
                                && (PSR.FXP == 1));
tmp2[34: 0] <- sext35(tmp[32: 0])
                                + (sext35(Rx[15: 0])<<16)
                                + sext35(0x0_8000);
MHm[15:0]:MLm[15:0] <- tmp2[31:16]:16'b0;
MHm[15:0]:MLm[15:0] <- 0x7fff_0000, CFR.OVS <- 1,
                            if (tmp2[34:16] > 0x0_7fff[18: 0]);
MHm[15:0]:MLm[15:0] <- 0x8000_0000, CFR.OVS <- 1,
                            if (tmp2[34:16] < 0x7_8000[18: 0]);
MHm[15:0]:MLm[15:0] <- UD, if (PSR.FXP == 1)
Rc[15: 0] <- MHm[15: 0],
                            if (reg#(Rc) != 30 && reg#(Rc) != 31);
```

Handle Ra, Rb, Rc, and Rx in half word vector format, and handle M0 in word vector format.
Perform fixed point multiplication (SIMD straight) for Ra and Rb, and add result to Rx. Round result from 32 bits down to 16 bits, and store it in M0 and Rc. Saturate result when it cannot be represented by signed 16bits.

| Assembler mnemonic | Format | Affecting flag | Affected flag |
|---|---|---|---|
| **vfmachr M0,Rc,Ra,Rb,Rx** | 32bit | CFR.OVS | PSR.FXP |

Remarks

This instruction is not implemented when PSR.FXP == 1, and Mm and Rc are UD.

No writing is performed to Rc, when r30 or r31 is specified as Rc.

Fig. 718 vxfmachr Mm,Rc,Ra,Rb,Mn

<table>
<tr><td>Behavior</td><td colspan="3">tmp[32: 0] <- sext33(smul(Ra[31:16],Rb[15: 0]))<<FXP_SHIFT;<br>tmp[32: 0] <- 0x0_7fff_ffff[32: 0], CFR.OVS <- 1,<br>if ((Ra[31:16] == 0x8000 && Rb[15: 0] == 0x8000)<br>&& (PSR.FXP == 0));<br>tmp[32: 0] <- 0x0_ffff_ffff[32: 0], CFR.OVS <- 1,<br>if ((Ra[31:16] == 0x8000 && Rb[15: 0] == 0x8000)<br>&& (PSR.FXP == 1));<br>tmp2[34: 0] <- sext35(tmp[32: 0])<br>+ sext35(MHn[31:16]:MLn[31:16])<br>+ sext35(0x0_8000);<br>MHm[31:16]:MLm[31:16] <- tmp2[31:16]:16'b0;<br>MHm[31:16]:MLm[31:16] <- 0x7fff_0000, CFR.OVS <- 1,<br>if (tmp2[34:16] > 0x0_7fff[18:0]);<br>MHm[31:16]:MLm[31:16] <- 0x8000_0000, CFR.OVS <- 1,<br>if (tmp2[34:16] < 0x7_8000[18:0]);<br>MHm[31:16]:MLm[31:16] <- UD, if (PSR.FXP == 1);<br>Rc[31:16] <- MHm[31:16], if (reg#(Rc) != 30 && reg#(Rc) != 31);<br><br>tmp[32: 0] <- sext33(smul(Ra[15: 0],Rb[31:16]))<<FXP_SHIFT;<br>tmp[32: 0] <- 0x0_7fff_ffff[32: 0], CFR.OVS <- 1,<br>if ((Ra[15: 0] == 0x8000 && Rb[31:16] == 0x8000)<br>&& (PSR.FXP == 0));<br>tmp[32: 0] <- 0x0_ffff_ffff[32: 0], CFR.OVS <- 1,<br>if ((Ra[15: 0] == 0x8000 && Rb[31:16] == 0x8000)<br>&& (PSR.FXP == 1));<br>tmp2[34: 0] <- sext35(tmp[32: 0])<br>+ sext35(MHn[15: 0]:MLn[15: 0])<br>+ sext35(0x0_8000);<br>MHm[15:0]:MLm[15:0] <- tmp2[31:16]:16'b0;<br>MHm[15:0]:MLm[15:0] <- 0x7fff_0000, CFR.OVS <- 1,<br>if (tmp2[34:16] > 0x0_7fff[18: 0]);<br>MHm[15:0]:MLm[15:0] <- 0x8000_0000, CFR.OVS <- 1,<br>if (tmp2[34:16] < 0x3_8000[18: 0]);<br>MHm[15:0]:MLm[15:0] <- UD, if (PSR.FXP == 1)<br>Rc[15: 0] <- MHm[15: 0], if (reg#(Rc) != 30 && reg#(Rc) != 31);<br><br>Handle Ra, Rb, and Rc in half word vector format, and handle Mm and Mn in word vector format.<br>Perform fixed point multiplication (SIMD cross) for Ra and Rb, and add result to Mn. Round result from 32 bits down to 16 bits, and store it in Mm and Rc.<br>Saturate result when it cannot be represented by signed 32 bits.</td></tr>
<tr><td>Assembler mnemonic</td><td>Format</td><td>Affecting flag</td><td>Affected flag</td></tr>
<tr><td>vxfmachr Mm,Rc,Ra,Rb,Mn</td><td>32bit</td><td>CFR.OVS</td><td>PSR.FXP</td></tr>
<tr><td colspan="4">Remarks</td></tr>
<tr><td colspan="4">This instruction is not implemented when PSR.FXP == 1, and Mm and Rc are UD.<br>The lower 32 bits of Mm is always 0.<br>No writing is performed to Rc, when r30 or r31 is specified as Rc.</td></tr>
</table>

Fig. 719 vxfmachr M0,Rc,Ra,Rb,Rx

Behavior

```
tmp[32: 0] <- sext33(smul(Ra[31:16],Rb[15: 0]))<<FXP_SHIFT;
tmp[32: 0] <- 0x0_7fff_ffff[32: 0], CFR.OVS <- 1,
                        if ((Ra[31:16] == 0x8000 &&Rb[15: 0] == 0x8000)
                           && (PSR.FXP == 0));
tmp[32: 0] <- 0x0_ffff_ffff[32: 0], CFR.OVS <- 1,
                        if ((Ra[31:16] == 0x8000 &&Rb[15: 0] == 0x8000)
                           && (PSR.FXP == 1));
tmp2[34: 0] <- sext35(tmp[32: 0])
                           + (sext35(Rx[31:16])<<16)
                           + sext35(0x0_8000);
MHm[31:16]:MLm[31:16] <- tmp2[31:16]:16'b0;
MHm[31:16]:MLm[31:16] <- 0x7fff_0000, CFR.OVS <- 1,
                        if (tmp2[34:16] > 0x0_7fff[18:0]);
MHm[31:16]:MLm[31:16] <- 0x8000_0000, CFR.OVS <- 1,
                        if (tmp2[34:16] < 0x7_8000[18:0]);
MHm[31:16]:MLm[31:16] <- UD, if (PSR.FXP == 1);
Rc[31:16] <- MHm[31:16],
                        if (reg#(Rc) != 30 && reg#(Rc) != 31);
tmp[32: 0] <- sext33(smul(Ra[15: 0],Rb[31:16]))<<FXP_SHIFT;
tmp[32: 0] <- 0x0_7fff_ffff[32: 0], CFR.OVS <- 1,
                        if ((Ra[15: 0] == 0x8000 && Rb[31:16] == 0x8000)
                           && (PSR.FXP == 0));
tmp[32: 0] <- 0x0_ffff_ffff[32: 0], CFR.OVS <- 1,
                        if ((Ra[15: 0] == 0x8000 && Rb[31:16] == 0x8000)
                           && (PSR.FXP == 1));
tmp2[34: 0] <- sext35(tmp[32: 0])
                           + (sext35(Rx[15: 0])<<16)
                           + sext35(0x0_8000);
MHm[15:0]:MLm[15:0] <- tmp2[31:16]:16'b0;
MHm[15:0]:MLm[15:0] <- 0x7fff_0000, CFR.OVS <- 1,
                        if (tmp2[34:16] > 0x0_7fff[18: 0]);
MHm[15:0]:MLm[15:0] <- 0x8000_0000, CFR.OVS <- 1,
                        if (tmp2[34:16] < 0x7_8000[18: 0]);
MHm[15:0]:MLm[15:0] <- UD, if (PSR.FXP == 1)
Rc[15: 0] <- MHm[15: 0],
                        if (reg#(Rc) != 30 && reg#(Rc) != 31);
```

Handle Ra, Rb, Rc, and Rx in half word vector format, and handle M0 in word vector format.
Perform fixed point multiplication (SIMD cross) for Ra and Rb, and add result to Rx. Round result from 32 bits down to 16 bits, and store it in M0 and Rc.
Saturate result when it cannot be represented by signed 16bits.

| Assembler mnemonic | Format | Affecting flag | Affected flag |
|---|---|---|---|
| **vxfmachr M0,Rc,Ra,Rb,Rx** | 32bit | CFR.OVS | PSR.FXP |

Remarks

This instruction is not implemented when PSR.FXP == 1, and Mm and Rc are UD.

The lower 32 bits of M0 is always 0.

No writing is performed to Rc, when r30 or r31 is specified as Rc.

Fig. 720 vhfmachr Mm,Rc,Ra,Rb,Mn

Behavior

```
tmp[32: 0] <- sext33(smul(Ra[31:16],Rb[31:16]))<<FXP_SHIFT;
tmp[32: 0] <- 0x0_7fff_ffff[32: 0], CFR.OVS <- 1,
if ((Ra[31:16] == 0x8000 && Rb[31:16] == 0x8000)
                            && (PSR.FXP == 0));
tmp[32: 0] <- 0x0_ffff_ffff[32: 0], CFR.OVS <- 1,
if ((Ra[31:16] == 0x8000 && Rb[31:16] == 0x8000)
                            && (PSR.FXP == 1));
tmp2[34: 0] <- sext35(tmp[32: 0])
                            + sext35(MHn[31:16]:MLn[31:16])
                            + sext35(0x0_8000);
MHm[31:16]:MLm[31:16] <- tmp2[31:16]:16'b0;
MHm[31:16]:MLm[31:16] <- 0x7fff_0000, CFR.OVS <- 1,
                         if (tmp2[34:16] > 0x0_7fff[18:0]);
MHm[31:16]:MLm[31:16] <- 0x8000_0000, CFR.OVS <- 1,
                         if (tmp2[34:16] < 0x7_8000[18:0]);
MHm[31:16]:MLm[31:16] <- UD, if (PSR.FXP == 1);
Rc[31:16] <- MHm[31:16], if (reg#(Rc) != 30 && reg#(Rc) != 31);

tmp[32: 0] <- sext33(smul(Ra[15: 0],Rb[31:16]))<<FXP_SHIFT;
tmp[32: 0] <- 0x0_7fff_ffff[32: 0], CFR.OVS <- 1,
if ((Ra[15: 0] == 0x8000 &&Rb[31:16] == 0x8000)
                            && (PSR.FXP == 0));
tmp[32: 0] <- 0x0_ffff_ffff[32: 0], CFR.OVS <- 1,
if ((Ra[15: 0] == 0x8000 &&Rb[31:16] == 0x8000)
                            && (PSR.FXP == 1));
tmp2[34: 0] <- sext35(tmp[32: 0])
                            + sext35(MHn[15: 0]:MLn[15: 0])
                            + sext35(0x0_8000);
MHm[15:0]:MLm[15:0] <- tmp2[31:16]:16'b0;
MHm[15:0]:MLm[15:0] <- 0x7fff_0000, CFR.OVS <- 1,
                         if (tmp2[34:16] > 0x0_7fff[18: 0]);
MHm[15:0]:MLm[15:0] <- 0x8000_0000, CFR.OVS <- 1,
                         if (tmp2[34:16] < 0x7_8000[18: 0]);
MHm[15:0]:MLm[15:0] <- UD, if (PSR.FXP == 1)
Rc[15: 0] <- MHm[15: 0], if (reg#(Rc) != 30 && reg#(Rc) != 31);
```

Handle Ra, Rb, and Rc in half word vector format, and handle Mm and Mn in word vector format.
Perform fixed point multiplication (SIMD high) for Ra and Rb, and add result to Mn. Round result from 32 bits down to 16 bits, and store it in Mm and Rc. Saturate result when it cannot be represented by signed 32 bits.

| Assembler mnemonic | Format | Affecting flag | Affected flag |
|---|---|---|---|
| **vhfmachr Mm,Rc,Ra,Rb,Mn** | 32bit | CFR.OVS | PSR.FXP |

Remarks

This instruction is not implemented when PSR.FXP == 1, and Mm and Rc are UD.

The lower 32 bits of Mm is always 0.

No writing is performed to Rc, when r30 or r31 is specified as Rc.

Fig. 721 vhfmachr M0,Rc,Ra,Rb,Rx

| | |
|---|---|
| Behavior | tmp[32: 0] <- sext33(smul(Ra[31:16],Rb[31:16]))<<FXP_SHIFT;<br>tmp[32: 0] <- 0x0_7fff_ffff[32: 0], CFR.OVS <- 1,<br>if ((Ra[31:16] == 0x8000 && Rb[31:16] == 0x8000)<br>&& (PSR.FXP == 0));<br>tmp[32: 0] <- 0x0_ffff_ffff[32: 0], CFR.OVS <- 1,<br>if ((Ra[31:16] == 0x8000 && Rb[31:16] == 0x8000)<br>&& (PSR.FXP == 1));<br>tmp2[34: 0] <- sext35(tmp[32: 0])<br>+ (sext35(Rx[31:16])<<16)<br>+ sext35(0x0_8000);<br>MHm[31:16]:MLm[31:16] <- tmp2[31:16]:16'b0;<br>MHm[31:16]:MLm[31:16] <- 0x7fff_0000, CFR.OVS <- 1,<br>if (tmp2[34:16] > 0x0_7fff[18:0]);<br>MHm[31:16]:MLm[31:16] <- 0x8000_0000, CFR.OVS <- 1,<br>if (tmp2[34:16] < 0x7_8000[18:0]);<br>MHm[31:16]:MLm[31:16] <- UD, if (PSR.FXP == 1);<br>Rc[31:16] <- MHm[31:16], if (reg#(Rc) != 30 && reg#(Rc) != 31);<br><br>tmp[32: 0] <- sext33(smul(Ra[15: 0],Rb[31:16]))<<FXP_SHIFT;<br>tmp[32: 0] <- 0x0_7fff_ffff[32: 0], CFR.OVS <- 1,<br>if ((Ra[15: 0] == 0x8000 && Rb[31:16] == 0x8000)<br>&& (PSR.FXP == 0));<br>tmp[32: 0] <- 0x0_ffff_ffff[32: 0], CFR.OVS <- 1,<br>if ((Ra[15: 0] == 0x8000 && Rb[31:16] == 0x8000)<br>&& (PSR.FXP == 1));<br>tmp2[34: 0] <- sext35(tmp[32: 0])<br>+ (sext35(Rx[15: 0])<<16)<br>+ sext35(0x0_8000);<br>MHm[15:0]:MLm[15:0] <- tmp2[31:16]:16'b0;<br>MHm[15:0]:MLm[15:0] <- 0x7fff_0000, CFR.OVS <- 1,<br>if (tmp2[34:16] > 0x0_7fff[18: 0]);<br>MHm[15:0]:MLm[15:0] <- 0x8000_0000, CFR.OVS <- 1,<br>if (tmp2[34:16] < 0x7_8000[18: 0]);<br>MHm[15:0]:MLm[15:0] <- UD, if (PSR.FXP == 1)<br>Rc[15: 0] <- MHm[15: 0], if (reg#(Rc) != 30 && reg#(Rc) != 31);<br><br>Handle Ra, Rb, Rc, and Rx in half word vector format, and handle M0 in word vector format.<br>Perform fixed point multiplication (SIMD high) for Ra and Rb, and add result to Rx. Round result from 32 bits down to 16 bits, and store it in M0 and Rc.<br>Saturate result when it cannot be represented by signed 16bits. |

| Assembler mnemonic | Format | Affecting flag | Affected flag |
|---|---|---|---|
| vhfmachr M0,Rc,Ra,Rb,Rx | 32bit | CFR.OVS | PSR.FXP |

| Remarks |
|---|
| This instruction is not implemented when PSR.FXP == 1, and Mm and Rc are UD.<br>The lower 32 bits of M0 is always 0.<br>No writing is performed to Rc, when r30 or r31 is specified as Rc. |

Fig. 722 vlfmachr Mm,Rc,Ra,Rb,Mn

Behavior

```
tmp[32: 0] <- sext33(smul(Ra[31:16],Rb[15: 0]))<<FXP_SHIFT;
tmp[32: 0] <- 0x0_7fff_ffff[32: 0], CFR.OVS <- 1,
if ((Ra[31:16] == 0x8000 &&Rb[15: 0] == 0x8000)
                        && (PSR.FXP == 0));
tmp[32: 0] <- 0x0_ffff_ffff[32: 0], CFR.OVS <- 1,
if ((Ra[31:16] == 0x8000 &&Rb[15: 0] == 0x8000)
                        && (PSR.FXP == 1));
tmp2[34: 0] <- sext35(tmp[32: 0])
                        + sext35(MHn[31:16]:MLn[31:16])
                        + sext35(0x0_8000);
MHm[31:16]:MLm[31:16] <- tmp2[31:16]:16'b0;
MHm[31:16]:MLm[31:16] <- 0x7fff_0000, CFR.OVS <- 1,
                    if (tmp2[34:16] > 0x0_7fff[18:0]);
MHm[31:16]:MLm[31:16] <- 0x8000_0000, CFR.OVS <- 1,
                    if (tmp2[34:16] < 0x7_8000[18:0]);
MHm[31:16]:MLm[31:16] <- UD, if (PSR.FXP == 1);
Rc[31:16] <- MHm[31:16], if (reg#(Rc) != 30 && reg#(Rc) != 31);

tmp[32: 0] <- sext33(smul(Ra[15: 0],Rb[15: 0]))<< FXP_SHIFT;
tmp[32: 0] <- 0x0_7fff_ffff[32: 0], CFR.OVS <- 1,
if ((Ra[15: 0] == 0x8000 && Rb[15: 0] == 0x8000)
                        && (PSR.FXP == 0)); CFR.OVS <- 1,
tmp[32: 0] <- 0x0_ffff_ffff[32: 0],
if ((Ra[15: 0] == 0x8000 && Rb[15: 0] == 0x8000)
                        && (PSR.FXP == 1));
tmp2[34: 0] <- sext35(tmp[32: 0])
                        + sext35(MHn[15: 0]:MLn[15: 0])
                        + sext35(0x0_8000);
MHm[15:0]:MLm[15:0] <- tmp2[31:16]:16'b0;
MHm[15:0]:MLm[15:0] <- 0x7fff_0000, CFR.OVS <- 1,
                    if (tmp2[34:16] > 0x0_7fff[18: 0]);
MHm[15:0]:MLm[15:0] <- 0x8000_0000, CFR.OVS <- 1,
                    if (tmp2[34:16] < 0x7_8000[18: 0]);
MHm[15:0]:MLm[15:0] <- UD, if (PSR.FXP == 1)
Rc[15: 0] <- MHm[15: 0], if (reg#(Rc) != 30 && reg#(Rc) != 31);
```

Handle Ra, Rb, and Rc in half word vector format, and handle Mm and Mn in word vector format.
Perform fixed point multiplication (SIMD low) for Ra and Rb, and add result to Mn. Round result from 32 bits down to 16 bits, and store it in Mm and Rc.
Saturate result when it cannot be represented by signed 32 bits.

| Assembler mnemonic | Format | Affecting flag | Affected flag |
|---|---|---|---|
| vlfmachr Mm,Rc,Ra,Rb,Mn | 32bit | CFR.OVS | PSR.FXP |

Remarks

This instruction is not implemented when PSR.FXP == 1, and Mm and Rc are UD.

The lower 32 bits of Mm is always 0.

No writing is performed to Rc, when r30 or r31 is specified as Rc.

Fig. 723 vlfmachr M0,Rc,Ra,Rb,Rx

Behavior

```
tmp[32: 0] <- sext33(smul(Ra[31:16],Rb[15: 0]))<<FXP_SHIFT;
tmp[32: 0] <- 0x0_7fff_ffff[32: 0], CFR.OVS <- 1,
if ((Ra[31:16] == 0x8000 && Rb[15: 0] == 0x8000)
                                  && (PSR.FXP == 0));
tmp[32: 0] <- 0x0_ffff_ffff[32: 0], CFR.OVS <- 1,
if ((Ra[31:16] == 0x8000 && Rb[15: 0] == 0x8000)
                                  && (PSR.FXP == 1));
tmp2[34: 0] <- sext35(tmp[32: 0])
                                  + (sext35(Rx[31:16])<<16)
                                  + sext35(0x0_8000);
MHm[31:16]:MLm[31:16] <- tmp2[31:16]:16'b0;
MHm[31:16]:MLm[31:16] <- 0x7fff_0000, CFR.OVS <- 1,
                              if (tmp2[34:16] > 0x0_7fff[18:0]);
MHm[31:16]:MLm[31:16] <- 0x8000_0000, CFR.OVS <- 1,
                              if (tmp2[34:16] < 0x7_8000[18:0]);
MHm[31:16]:MLm[31:16] <- UD, if (PSR.FXP == 1);
Rc[31:16] <- MHm[31:16], if (reg#(Rc) != 30 && reg#(Rc) != 31);

tmp[32: 0] <- sext33(smul(Ra[15: 0],Rb[15: 0]))<<FXP_SHIFT;
tmp[32: 0] <- 0x0_7fff_ffff[32: 0], CFR.OVS <- 1,
if ((Ra[15: 0] == 0x8000 && Rb[15: 0] == 0x8000)
                                  && (PSR.FXP == 0));
tmp[32: 0] <- 0x0_ffff_ffff[32: 0], CFR.OVS <- 1,
if ((Ra[15: 0] == 0x8000 && Rb[15: 0] == 0x8000)
                                  && (PSR.FXP == 1));
tmp2[34: 0] <- sext35(tmp[32: 0])
                                  + (sext35(Rx[15: 0])<<16)
                                  + sext35(0x0_8000);
MHm[15:0]:MLm[15:0] <- tmp2[31:16]:16'b0;
MHm[15:0]:MLm[15:0] <- 0x7fff_0000, CFR.OVS <- 1,
                              if (tmp2[34:16] > 0x0_7fff[18: 0]);
MHm[15:0]:MLm[15:0] <- 0x8000_0000, CFR.OVS <- 1,
                              if (tmp2[34:16] < 0x7_8000[18: 0]);
MHm[15:0]:MLm[15:0] <- UD, if (PSR.FXP == 1)
Rc[15: 0] <- MHm[15: 0], if (reg#(Rc) != 30 && reg#(Rc) != 31);
```

Handle Ra, Rb, Rc, and Rx in half word vector format, and handle M0 in word vector format.
Perform fixed point multiplication (SIMD low) for Ra and Rb, and add result to Rx. Round result from 32 bits down to 16 bits, and store it in M0 and Rc. Saturate result when it cannot be represented by signed 16bits.

| Assembler mnemonic | Format | Affecting flag | Affected flag |
|---|---|---|---|
| **vlfmachr M0,Rc,Ra,Rb,Rx** | 32bit | CFR.OVS | PSR.FXP |

Remarks

This instruction is not implemented when PSR.FXP == 1, and Mm and Rc are UD.

The lower 32 bits of M0 is always 0.

No writing is performed to Rc, when r30 or r31 is specified as Rc.

Fig. 724 vfmacw Mm,Rc,Ra,Rb,Mn

Behavior

```
tmp[32: 0] <- sext33(smul(Ra[31:16],Rb[31:16]))<<FXP_SHIFT;
tmp[32: 0] <- 0x0_7fff_ffff[32: 0], CFR.OVS <- 1,
  if ((Ra[31:16] == 0x8000 &&Rb[31:16] == 0x8000)
                  && (PSR.FXP == 0));
tmp[32: 0] <- 0x0_ffff_ffff[32: 0], CFR.OVS <- 1,
  if ((Ra[31:16] == 0x8000 &&Rb[31:16] == 0x8000)
                  && (PSR.FXP == 1));
tmp2[33: 0] <- sext34(MHn[31:16]:MLn[31:16])
                                  + sext34(tmp[32: 0]);
MHm[31:16]:MLm[31:16] <- tmp2[31: 0];
MHm[31:16]:MLm[31:16] <- 0x7fff_ffff, CFR.OVS <- 1,
                 if (tmp2[33: 0] > 0x0_7fff_ffff[33: 0]);
MHm[31:16]:MLm[31:16] <- 0x8000_0000, CFR.OVS <- 1,
                 if (tmp2[33: 0] < 0x3_8000_0000[33: 0]);
Rc[31: 0] <- MHm[31:16]:MLm[31:16],
                 if (reg#(Rc) != 30 && reg#(Rc) != 31);

tmp[32: 0] <- sext33(smul(Ra[15: 0],Rb[15: 0]))<<FXP_SHIFT;
tmp[32: 0] <- 0x0_7fff_ffff[32: 0], CFR.OVS <- 1,
  if ((Ra[15: 0] == 0x8000 && Rb[15: 0] == 0x8000)
                  && (PSR.FXP == 0));
tmp[32: 0] <- 0x0_ffff_ffff[32: 0], CFR.OVS <- 1,
  if ((Ra[15: 0] == 0x8000 && Rb[15: 0] == 0x8000)
                  && (PSR.FXP == 1));
tmp2[33: 0] <- sext34(MHn[15: 0]:MLn[15: 0])
                                  + sext34(tmp[32: 0]);
MHm[15:0]:MLm[15:0] <- tmp2[31: 0];
MHm[15:0]:MLm[15:0] <- 0x7fff_ffff, CFR.OVS <- 1,
                 if (tmp2[33: 0] > 0x0_7fff_ffff[33: 0]);
MHm[15:0]:MLm[15:0] <- 0x8000_0000, CFR.OVS <- 1,
                 if (tmp2[33: 0] < 0x3_8000_0000[33: 0]);
```

Handle Ra and Rb in half word vector format, and handle Mm and Mn in word vector format.
Perform fixed point multiplication (SIMD straight) for Ra and Rb, and add result to Mn. Store result in Mm and Rc. Saturate result when it cannot be represented by signed 32 bits.

| Assembler mnemonic | Format | Affecting flag | Affected flag |
|---|---|---|---|
| vfmacw Mm,Rc,Ra,Rb,Mn | 32bit | CFR.OVS | PSR.FXP |

Remarks

Only one of the two SIMD multiplication results is stored in Rc. Take out the other multiplication result from vunpk2 Rb, Mn, and the like.

No writing is performed to Rc, when r30 or r31 is specified as Rc.

Fig. 725 vxfmacw Mm,Rc,Ra,Rb,Mn

Behavior

```
tmp[32: 0] <- sext33(smul(Ra[31:16],Rb[15: 0]))<<FXP_SHIFT;
tmp[32: 0] <- 0x0_7fff_ffff[32: 0], CFR.OVS <- 1,
if ((Ra[31:16] == 0x8000 && Rb[15: 0] == 0x8000)
                    && (PSR.FXP == 0));
tmp[32: 0] <- 0x0_ffff_ffff[32: 0], CFR.OVS <- 1,
if ((Ra[31:16] == 0x8000 && Rb[15: 0] == 0x8000)
                    && (PSR.FXP == 1));
tmp2[33: 0] <- sext34(MHn[31:16]:MLn[31:16])
                                   + sext34(tmp[32: 0]);
MHm[31:16]:MLm[31:16] <- tmp2[31: 0];
MHm[31:16]:MLm[31:16] <- 0x7fff_ffff, CFR.OVS <- 1,
                  if (tmp2[33: 0] > 0x0_7fff_ffff[33: 0]);
MHm[31:16]:MLm[31:16] <- 0x8000_0000, CFR.OVS <- 1,
                  if (tmp2[33: 0] < 0x3_8000_0000[33: 0]);
Rc[31: 0] <- MHm[31:16]:MLm[31:16],
                  if (reg#(Rc) != 30 && reg#(Rc) != 31);
tmp[32: 0] <- sext33(smul(Ra[15: 0],Rb[31:16]))<<FXP_SHIFT;
tmp[32: 0] <- 0x0_7fff_ffff[32: 0], CFR.OVS <- 1,
if ((Ra[15: 0] == 0x8000 && Rb[31:16] == 0x8000)
                    && (PSR.FXP == 0));
tmp[32: 0] <- 0x0_ffff_ffff[32: 0], CFR.OVS <- 1,
if ((Ra[15: 0] == 0x8000 && Rb[31:16] == 0x8000)
                    && (PSR.FXP == 1));
tmp2[33: 0] <- sext34(MHn[15: 0]:MLn[15: 0])
                                   + sext34(tmp[32: 0]);
MHm[15:0]:MLm[15:0] <- tmp2[31: 0];
MHm[15:0]:MLm[15:0] <- 0x7fff_ffff, CFR.OVS <- 1,
                  if (tmp2[33: 0] > 0x0_7fff_ffff[33: 0]);
MHm[15:0]:MLm[15:0] <- 0x8000_0000, CFR.OVS <- 1,
                  if (tmp2[33: 0] < 0x3_8000_0000[33: 0]);
```

Handle Ra and Rb in half word vector format, and handle Mm and Mn in word vector format.
Perform fixed point multiplication (SIMD cross) for Ra and Rb, and add result to Mn. Store result in Mm and Rc. Saturate result when it cannot be represented by signed 32 bits.

| Assembler mnemonic | Format | Affecting flag | Affected flag |
|---|---|---|---|
| vxfmacw Mm,Rc,Ra,Rb,Mn | 32bit | CFR.OVS | PSR.FXP |

Remarks

Only one of the two SIMD multiplication results is stored in Rc. Take out the other multiplication result from vunpk2 Rb, Mn, and the like.

No writing is performed to Rc, when r30 or r31 is specified as Rc.

Fig. 726 vhfmacw Mm,Rc,Ra,Rb,Mn

Behavior

```
tmp[32: 0] <- sext33(smul(Ra[31:16],Rb[31:16]))<<FXP_SHIFT;
tmp[32: 0] <- 0x0_7fff_ffff[32: 0], CFR.OVS <- 1,
if ((Ra[31:16] == 0x8000 && Rb[31:16] == 0x8000)
                    && (PSR.FXP == 0));
tmp[32: 0] <- 0x0_ffff_ffff[32: 0], CFR.OVS <- 1,
if ((Ra[31:16] == 0x8000 && Rb[31:16] == 0x8000)
                    && (PSR.FXP == 1));
tmp2[33: 0] <- sext34(MHn[31:16]:MLn[31:16])
                                   + sext34(tmp[32: 0]);
MHm[31:16]:MLm[31:16] <- tmp2[31: 0];
MHm[31:16]:MLm[31:16] <- 0x7fff_ffff, CFR.OVS <- 1,
                  if (tmp2[33: 0] > 0x0_7fff_ffff[33: 0]);
MHm[31:16]:MLm[31:16] <- 0x8000_0000, CFR.OVS <- 1,
                  if (tmp2[33: 0] < 0x3_8000_0000[33: 0]);
Rc[31: 0] <- MHm[31:16]:MLm[31:16],
                  if (reg#(Rc) != 30 && reg#(Rc) != 31);
tmp[32: 0] <- sext33(smul(Ra[15: 0],Rb[31:16]))<<FXP_SHIFT;
tmp[32: 0] <- 0x0_7fff_ffff[32: 0], CFR.OVS <- 1,
if ((Ra[15: 0] == 0x8000 && Rb[31:16] == 0x8000)
                    && (PSR.FXP == 0));
tmp[32: 0] <- 0x0_ffff_ffff[32: 0], CFR.OVS <- 1,
if ((Ra[15: 0] == 0x8000 && Rb[31:16] == 0x8000)
                    && (PSR.FXP == 1));
tmp2[33: 0] <- sext34(MHn[15: 0]:MLn[15: 0])
                                   + sext34(tmp[32: 0]);
MHm[15:0]:MLm[15:0] <- tmp2[31: 0];
MHm[15:0]:MLm[15:0] <- 0x7fff_ffff, CFR.OVS <- 1,
                  if (tmp2[33: 0] > 0x0_7fff_ffff[33: 0]);
MHm[15:0]:MLm[15:0] <- 0x8000_0000, CFR.OVS <- 1,
                  if (tmp2[33: 0] < 0x3_8000_0000[33: 0]);
```

Handle Ra and Rb in half word vector format, and handle Mm and Mn in word vector format.
Perform fixed point multiplication (SIMD high) for Ra and Rb, and add result to Mn. Store result in Mm and Rc. Saturate result when it cannot be represented by signed 32 bits.

| Assembler mnemonic | Format | Affecting flag | Affected flag |
|---|---|---|---|
| **vhfmacw Mm,Rc,Ra,Rb,Mn** | 32bit | CFR.OVS | PSR.FXP |

Remarks

Only one of the two SIMD multiplication results is stored in Rc. Take out the other multiplication result from vunpk2 Rb, Mn, and the like.

No writing is performed to Rc, when r30 or r31 is specified as Rc.

Fig. 727 vlfmacw Mm,Rc,Ra,Rb,Mn

Behavior

```
tmp[32: 0] <- sext33(smul(Ra[31:16],Rb[15: 0]))<<FXP_SHIFT;
tmp[32: 0] <- 0x0_7fff_ffff[32: 0], CFR.OVS <- 1,
if ((Ra[31:16] == 0x8000 && Rb[15: 0] == 0x8000)
                    && (PSR.FXP == 0));
tmp[32: 0] <- 0x0_ffff_ffff[32: 0], CFR.OVS <- 1,
if ((Ra[31:16] == 0x8000 && Rb[15: 0] == 0x8000)
                    && (PSR.FXP == 1));
tmp2[33: 0] <- sext34(MHn[31:16]:MLn[31:16])
                                   + sext34(tmp[32: 0]);
MHm[31:16]:MLm[31:16] <- tmp2[31: 0];
MHm[31:16]:MLm[31:16] <- 0x7fff_ffff, CFR.OVS <- 1,
                  if (tmp2[33: 0] > 0x0_7fff_ffff[33: 0]);
MHm[31:16]:MLm[31:16] <- 0x8000_0000, CFR.OVS <- 1,
                  if (tmp2[33: 0] < 0x3_8000_0000[33: 0]);
Rc[31: 0] <- MHm[31:16]:MLm[31:16],
                  if (reg#(Rc) != 30 && reg#(Rc) != 31);
tmp[32: 0] <- sext33(smul(Ra[15: 0],Rb[15: 0]))<<FXP_SHIFT;
tmp[32: 0] <- 0x0_7fff_ffff[32: 0], CFR.OVS <- 1,
if ((Ra[15: 0] == 0x8000 && Rb[15: 0] == 0x8000)
                    && (PSR.FXP == 0));
tmp[32: 0] <- 0x0_ffff_ffff[32: 0], CFR.OVS <- 1,
if ((Ra[15: 0] == 0x8000 && Rb[15: 0] == 0x8000)
                    && (PSR.FXP == 1));
tmp2[33: 0] <- sext34(MHn[15: 0]:MLn[15: 0])
                                   + sext34(tmp[32: 0]);
MHm[15:0]:MLm[15:0] <- tmp2[31: 0];
MHm[15:0]:MLm[15:0] <- 0x7fff_ffff, CFR.OVS <- 1,
                  if (tmp2[33: 0] > 0x0_7fff_ffff[33: 0]);
MHm[15:0]:MLm[15:0] <- 0x8000_0000, CFR.OVS <- 1,
                  if (tmp2[33: 0] < 0x3_8000_0000[33: 0]);
```

Handle Ra and Rb in half word vector format, and handle Mm and Mn in word vector format.
Perform fixed point multiplication (SIMD low) for Ra and Rb, and add result to Mn. Store result in Mm and Rc. Saturate result when it cannot be represented by signed 32 bits.

| Assembler mnemonic | Format | Affecting flag | Affected flag |
|---|---|---|---|
| **vlfmacw Mm,Rc,Ra,Rb,Mn** | 32bit | CFR.OVS | PSR.FXP |

Remarks

Only one of the two SIMD multiplication results is stored in Rc. Take out the other multiplication result from vunpk2 Rb, Mn, and the like.

No writing is performed to Rc, when r30 or r31 is specified as Rc.

Fig. 728 vpfmachww Mm,Rc:Rc+1,Ra,Rb,Mn

| | |
|---|---|
| Behavior | tmp[48: 0] <- sext49(smul(Ra,Rb[31:16]))<<FXP_SHIFT;<br>tmp[48: 0] <- 0x0_7fff_ffff_ffff[48:0], CFR.OVS <- 1,<br>if ((Ra[31: 0] == 0x8000_0000 && Rb[31:16] == 0x8000)<br>&& (PSR.FXP == 0));<br>tmp[48: 0] <- 0x0_ffff_ffff_ffff[48:0], CFR.OVS <- 1,<br>if ((Ra[31: 0] == 0x8000_0000 && Rb[31:16] == 0x8000)<br>&& (PSR.FXP == 1));<br>tmp2[33:0] <- sext34(MHn[31:16]:MLn[31:16])<br>+ sext34(tmp[48:16]);<br>MHm[31:16]:MLm[31:16] <- tmp2[31:0];<br>MHm[31:16]:MLm[31:16] <- 0x7fff_ffff, CFR.OVS <- 1,<br>if (tmp2[33:0] > 0x0_7fff_ffff[33:0]);<br>MHm[31:16]:MLm[31:16] <- 0x8000_0000, CFR.OVS <- 1,<br>if (tmp2[33:0] < 0x3_8000_0000[33:0]);<br>Rc <- MHm[31:16]:MLm[31:16],<br>if (reg#(Rc) & 0b11110 != 0b11110);<br><br>tmp[48: 0] <- sext49(smul(Ra,Rb[15: 0]))<<FXP_SHIFT;<br>tmp[48: 0] <- 0x0_7fff_ffff_ffff[48:0], CFR.OVS <- 1,<br>if ((Ra[31: 0] == 0x8000_0000 && Rb[15: 0] == 0x8000)<br>&& (PSR.FXP == 0));<br>tmp[48: 0] <- 0x0_ffff_ffff_ffff[48:0], CFR.OVS <- 1,<br>if ((Ra[31: 0] == 0x8000_0000 && Rb[15: 0] == 0x8000)<br>&& (PSR.FXP == 1));<br>tmp2[33:0] <- sext34(MHn[15: 0]:MLn[15: 0])<br>+ sext34(tmp[48:16]);<br>MHm[15: 0]:MLm[15: 0] <- tmp2[31:0];<br>MHm[15: 0]:MLm[15: 0] <- 0x7fff_ffff, CFR.OVS <- 1,<br>if (tmp2[33:0] > 0x0_7fff_ffff[33:0]);<br>MHm[15: 0]:MLm[15: 0] <- 0x8000_0000, CFR.OVS <- 1,<br>if (tmp2[33:0] < 0x3_8000_0000[33:0]);<br>Rc+1 <- MHm[15: 0]:MLm[15: 0],<br>if (reg#(Rc+1) & 0b11110 != 0b11110);<br><br>Handle Ra and Rb in half word vector format, and handle Mm and Mn in word vector format.<br>Perform fixed point multiplication (SIMD pair) for Ra and Rb, and add result to Mn. Store result in Mm, Rc, and Rc+1. Saturate result when it cannot be represented by signed 32 bits. |

| Assembler mnemonic | Format | Affecting flag | Affected flag |
|---|---|---|---|
| vpfmachww Mm,Rc:Rc+1,Ra,Rb,Mn | 32bit | CFR.OVS | PSR.FXP |

| Remarks |
|---|
| No writing is performed to Rc, when r30 or r31 is specified as Rc. |

Fig. 729 vmsu Mm,Rc,Ra,Rb,Mn

| | |
|---|---|
| Behavior | **MHm[31:16]:MLm[31:16] <- MHn[31:16]:MLn[31:16]<br>-smul(Ra[31:16],Rb[31:16]);<br>Rc[31:16] <- MLm[31:16], if (reg#(Rc) != 30 && reg#(Rc) != 31);<br>MHm[15: 0]:MLm[15: 0] <- MHn[15: 0]:MLn[15: 0];<br>-smul(Ra[15: 0],Rb[15: 0])<br>Rc[15: 0] <- MLm[15: 0], if (reg#(Rc) != 30 && reg#(Rc) != 31);<br><br>Handle Ra, Rb, and Rc in half word vector format, and handle Mm and Mn in word vector format.<br>Perform integer multiplication (SIMD straight) for Ra and Rb, and subtract result from Mn. Store result in Mm and Rc.** |

| Assembler mnemonic | Format | Affecting flag | Affected flag |
|---|---|---|---|
| **vmsu Mm,Rc,Ra,Rb,Mn** | 32bit | — | — |

| Remarks |
|---|
| No writing is performed to Rc, when r30 or r31 is specified as Rc. |

Fig. 730 vmsu M0,Rc,Ra,Rb,Rx

| | |
|---|---|
| Behavior | **MH0[31:16]:ML0[31:16] <- sext32(Rx[31:16])**<br>**- smul(Ra[31:16],Rb[31:16]);**<br>**Rc[31:16] <- ML0[31:16], if (reg#(Rc) != 30 && reg#(Rc) != 31);**<br>**MH0[15: 0]:ML0[15: 0] <- sext32(Rx[15: 0])**<br>**- smul(Ra[15: 0],Rb[15: 0]);**<br>**Rc[15: 0] <- ML0[15: 0], if (reg#(Rc) != 30 && reg#(Rc) != 31);**<br><br>**Handle Ra, Rb, Rc, and Rx in half word vector format, and handle M0 in word vector format.**<br>**Perform integer multiplication (SIMD straight) for Ra and Rb, and subtract result from Rx. Store result in M0 and Rc.** |

| Assembler mnemonic | Format | Affecting flag | Affected flag |
|---|---|---|---|
| **vmsu M0,Rc,Ra,Rb,Rx** | 32bit | — | — |

| Remarks |
|---|
| No writing is performed to Rc, when r30 or r31 is specified as Rc. |

Fig. 731 vxmsu Mm,Rc,Ra,Rb,Mn

| | |
|---|---|
| Behavior | **MHm[31:16]:MLm[31:16] <- MHn[31:16]:MLn[31:16]<br>-smul(Ra[31:16],Rb[15: 0]);<br>Rc[31:16] <- MLm[31:16], if (reg#(Rc) != 30 && reg#(Rc) != 31);<br>MHm[15: 0]:MLm[15: 0] <- MHn[15: 0]:MLn[15: 0]<br>-smul(Ra[15: 0],Rb[31:16]);<br>Rc[15: 0] <- MLm[15: 0], if (reg#(Rc) != 30 && reg#(Rc) != 31);<br><br>Handle Ra, Rb, and Rc in half word vector format, and handle Mm and Mn in word vector format.<br>Perform integer multiplication (SIMD cross) for Ra and Rb, and subtract result from Mn. Store result in Mm and Rc.** |

| Assembler mnemonic | Format | Affecting flag | Affected flag |
|---|---|---|---|
| **vxmsu Mm,Rc,Ra,Rb,Mn** | 32bit | — | — |

| Remarks |
|---|
| No writing is performed to Rc, when r30 or r31 is specified as Rc. |

Fig. 732 vxmsu M0,Rc,Ra,Rb,Rx

| | |
|---|---|
| Behavior | **MH0[31:16]:ML0[31:16] <- sext32(Rx[31:16])**<br>**- smul(Ra[31:16],Rb[15: 0]);**<br>**Rc[31:16] <- ML0[31:16], if (reg#(Rc) != 30 && reg#(Rc) != 31);**<br>**MH0[15: 0]:ML0[15: 0] <- sext32(Rx[15: 0])**<br>**- smul(Ra[15: 0],Rb[31:16]);**<br>**Rc[15: 0] <- ML0[15: 0], if (reg#(Rc) != 30 && reg#(Rc) != 31);**<br><br>**Handle Ra, Rb, and Rc in half word vector format, and handle Mm and Mn in word vector format.** |

| Assembler mnemonic | Format | Affecting flag | Affected flag |
|---|---|---|---|
| **vxmsu M0,Rc,Ra,Rb,Rx** | 32bit | — | — |

| Remarks |
|---|
| No writing is performed to Rc, when r30 or r31 is specified as Rc. |

Fig. 733 vhmsu Mm,Rc,Ra,Rb,Mn

| | |
|---|---|
| Behavior | **MHm[31:16]:MLm[31:16] <- MHn[31:16]:MLn[31:16]<br>-smul(Ra[31:16],Rb[31:16]);<br>Rc[31:16] <- MLm[31:16], if (reg#(Rc) != 30 && reg#(Rc) != 31);<br>MHm[15: 0]:MLm[15: 0] <- MHn[15: 0]:MLn[15: 0]<br>-smul(Ra[15: 0],Rb[31:16]);<br>Rc[15: 0] <- MLm[15: 0], if (reg#(Rc) != 30 && reg#(Rc) != 31);<br><br>Handle Ra, Rb, and Rc in half word vector format, and handle Mm and Mn in word vector format.<br>Perform integer multiplication (SIMD high) for Ra and Rb, and subtract result from Mn. Store result in Mm and Rc.** |

| Assembler mnemonic | Format | Affecting flag | Affected flag |
|---|---|---|---|
| **vhmsu Mm,Rc,Ra,Rb,Mn** | 32bit | — | — |

| Remarks |
|---|
| No writing is performed to Rc, when r30 or r31 is specified as Rc. |

Fig. 734 vhmsu M0,Rc,Ra,Rb,Rx

| | |
|---|---|
| Behavior | **MH0[31:16]:ML0[31:16] <- sext32(Rx[31:16])**<br>**- smul(Ra[31:16],Rb[31:16]);**<br>**Rc[31:16] <- ML0[31:16], if (reg#(Rc) != 30 && reg#(Rc) != 31);**<br>**MH0[15: 0]:ML0[15: 0] <- sext32(Rx[15: 0])**<br>**- smul(Ra[15: 0],Rb[31:16]);**<br>**Rc[15: 0] <- ML0[15: 0], if (reg#(Rc) != 30 && reg#(Rc) != 31);**<br><br>**Handle Ra, Rb, Rc, and Rx in half word vector format, and handle M0 in word vector format.**<br>**Perform integer multiplication (SIMD high) for Ra and Rb, and subtract result from Rx. Store result in M0 and Rc.** |

| Assembler mnemonic | Format | Affecting flag | Affected flag |
|---|---|---|---|
| **vhmsu M0,Rc,Ra,Rb,Rx** | 32bit | — | — |

| Remarks |
|---|
| No writing is performed to Rc, when r30 or r31 is specified as Rc. |

Fig. 735 vlmsu Mm,Rc,Ra,Rb,Mn

| | |
|---|---|
| Behavior | **MHm[31:16]:MLm[31:16] <- MHn[31:16]:MLn[31:16]**<br>**-smul(Ra[31:16],Rb[15: 0]);**<br>**Rc[31:16] <- MLm[31:16], if (reg#(Rc) != 30 && reg#(Rc) != 31);**<br>**MHm[15: 0]:MLm[15: 0] <- MHn[15: 0]:MLn[15: 0]**<br>**-smul(Ra[15: 0],Rb[15: 0]);**<br>**Rc[15: 0] <- MLm[15: 0], if (reg#(Rc) != 30 && reg#(Rc) != 31);**<br><br>**Handle Ra, Rb, and Rc in half word vector format, and handle Mm and Mn in word vector format.**<br>**Perform integer multiplication (SIMD low) for Ra and Rb, and subtract result from Mn. Store result in Mm and Rc.** |

| Assembler mnemonic | Format | Affecting flag | Affected flag |
|---|---|---|---|
| **vlmsu Mm,Rc,Ra,Rb,Mn** | 32bit | — | — |

| Remarks |
|---|
| No writing is performed to Rc, when r30 or r31 is specified as Rc. |

Fig. 736 vlmsu M0,Rc,Ra,Rb,Rx

| | |
|---|---|
| Behavior | **MH0[31:16]:ML0[31:16] <- sext32(Rx[31:16])<br>- smul(Ra[31:16],Rb[15: 0]);<br>Rc[31:16] <- ML0[31:16], if (reg#(Rc) != 30 && reg#(Rc) != 31);<br>MH0[15: 0]:ML0[15: 0] <- sext32(Rx[15: 0])<br>- smul(Ra[15: 0],Rb[15: 0]);<br>Rc[15: 0] <- ML0[15: 0], if (reg#(Rc) != 30 && reg#(Rc) != 31);<br><br>Handle Ra, Rb, Rc, and Rx in half word vector format, and handle M0 in word vector format.<br>Perform integer multiplication (SIMD low) for Ra and Rb, and subtract result from Rx. Store result in M0 and Rc.** |

| Assembler mnemonic | Format | Affecting flag | Affected flag |
|---|---|---|---|
| **vlmsu M0,Rc,Ra,Rb,Rx** | 32bit | — | — |

| Remarks |
|---|
| No writing is performed to Rc, when r30 or r31 is specified as Rc. |

Fig. 737 vfmsuh Mm,Rc,Ra,Rb,Mn

Behavior

```
tmp[32:0] <- sext33(smul(Ra[31:16],Rb[31:16]))<<FXP_SHIFT;
tmp[32:0] <- 0x0_7fff_ffff[32:0], CFR.OVS <- 1,
  if ((Ra[31:16] == 0x8000 && Rb[31:16] == 0x8000)
                              && (PSR.FXP ==0));
tmp[32:0] <- 0x0_ffff_ffff[32:0], CFR.OVS <- 1,
  if ((Ra[31:16] == 0x8000 && Rb[31:16] == 0x8000)
                              && (PSR.FXP ==1));
tmp2[33:0] <- sext34(MHn[31:16]:MLn[31:16])- sext34(tmp[32:0]);
MHm[31:16]:MLm[31:16] <- tmp2[31:0];
MHm[31:16]:MLm[31:16] <- 0x7fff_ffff, CFR.OVS <- 1,
                    if (tmp2[33:0] > 0x0_7fff_ffff[33:0]);
MHm[31:16]:MLm[31:16] <- 0x8000_0000, CFR.OVS <- 1,
                    if (tmp2[33:0] < 0x3_8000_0000[33:0]);
Rc[31:16] <- MHm[31:16], if (reg#(Rc) != 30 && reg#(Rc) != 31);

tmp[32:0] <- sext33(smul(Ra[15:0],Rb[15:0]))<<FXP_SHIFT
tmp[32:0] <- 0x0_7fff_ffff[32:0], CFR.OVS <- 1,
  if ((Ra[15:0] == 0x8000 && Rb[15:0] == 0x8000)
                              && (PSR.FXP == 0));
tmp[32:0] <- 0x0_ffff_ffff[32:0], CFR.OVS <- 1,
  if ((Ra[15:0] == 0x8000 && Rb[15:0] == 0x8000)
                              && (PSR.FXP == 1));
tmp2[33:0] <- sext34(MHn[15:0]:MLn[15:0])- sext34(tmp[32:0]);
MHm[15: 0]:MLm[15: 0] <- tmp2[31:0];
MHm[15: 0]:MLm[15: 0] <- 0x7fff_ffff, CFR.OVS <- 1,
                    if (tmp2[33:0] > 0x0_7fff_ffff[33:0]);
MHm[15: 0]:MLm[15: 0] <- 0x8000_0000, CFR.OVS <- 1,
                    if (tmp2[33:0] < 0x3_8000_0000[33:0]);
Rc[15: 0] <- MHm[15: 0], if (reg#(Rc) != 30 && reg#(Rc) != 31);
```

Handle Ra, Rb, and Rc in half word vector format, and handle Mm and Mn in word vector format.
Perform fixed point multiplication (SIMD straight) for Ra and Rb, and subtract result from Mn. Store result in Mm and Rc.
Saturate result when it cannot be represented by signed 32 bits.

| Assembler mnemonic | Format | Affecting flag | Affected flag |
|---|---|---|---|
| **vfmsuh Mm,Rc,Ra,Rb,Mn** | 32bit | CFR.OVS | PSR.FXP |

| Remarks |
|---|
| No writing is performed to Rc, when r30 or r31 is specified as Rc. |

Fig. 738 vfmsuh M0,Rc,Ra,Rb,Rx

Behavior

```
tmp[32:0] <- sext33(smul(Ra[31:16],Rb[31:16]))<<FXP_SHIFT;
tmp[32:0] <- 0x0_7fff_ffff[32:0], CFR.OVS <- 1,
  if ((Ra[31:16] == 0x8000 && Rb[31:16] == 0x8000)
                              && (PSR.FXP == 0));
tmp[32:0] <- 0x0_ffff_ffff[32:0], CFR.OVS <- 1,
  if ((Ra[31:16] == 0x8000 && Rb[31:16] == 0x8000)
tmp2[33:0] <- (sext34(Rx[31:16])<<16) -sext34(tmp[32:0]);
MH0[31:16]:ML0[31:16] <- tmp2[31:0];
MH0[31:16]:ML0[31:16] <- 0x7fff_ffff, CFR.OVS <- 1,
                  if (tmp2[33:0] > 0x0_7fff_ffff[32:0]);
MH0[31:16]:ML0[31:16] <- 0x8000_0000, CFR.OVS <- 1,
                  if (tmp2[33:0] < 0x3_8000_0000[32:0]);
Rc[31:16] <- MH0[31:16], if (reg#(Rc) != 30 && reg#(Rc) != 31);

tmp[32:0] <- sext33(smul(Ra[15:0],Rb[15:0]))<<FXP_SHIFT;
tmp[32:0] <- 0x7fff_ffff[32:0], CFR.OVS <- 1,
  if ((Ra[15:0] == 0x8000 && Rb[15:0] == 0x8000)
                              && (PSR.FXP == 0));
tmp[32:0] <- 0xffff_ffff[32:0], CFR.OVS <- 1,
  if ((Ra[15:0] == 0x8000 && Rb[15:0] == 0x8000)
                              && (PSR.FXP == 1));
tmp2[33:0] <- (sext34(Rx[15:0])<<16) - sext34(tmp[32:0]);
MH0[15: 0]:ML0[15: 0] <- tmp2[31:0];
MH0[15: 0]:ML0[15: 0] <- 0x7fff_ffff, CFR.OVS <- 1,
                  if (tmp2[33:0] > 0x0_7fff_ffff[33:0]);
MH0[15: 0]:ML0[15: 0] <- 0x8000_0000, CFR.OVS <- 1,
                  if (tmp2[33:0] < 0x3_8000_0000[33:0]);
Rc[15: 0] <- MH0[15: 0], if (reg#(Rc) != 30 && reg#(Rc) != 31);
```

Handle Ra, Rb, Rc, and Rx in half word vector format, and handle M0 in word vector format.
Perform fixed point multiplication (SIMD straight) for Ra and Rb, and subtract result from Rx. Store result in M0 and Rc. Saturate result when it cannot be represented by signed 32 bits.

| Assembler mnemonic | Format | Affecting flag | Affected flag |
|---|---|---|---|
| **vfmsuh M0,Rc,Ra,Rb,Rx** | 32bit | CFR.OVS | PSR.FXP |

Remarks

No writing is performed to Rc, when r30 or r31 is specified as Rc.

Fig. 739 vxfmsuh Mm,Rc,Ra,Rb,Mn

Behavior

```
tmp[32:0] <- sext33(smul(Ra[31:16],Rb[15: 0]))<<FXP_SHIFT;
tmp[32:0] <- 0x0_7fff_ffff[32:0], CFR.OVS <- 1,
  if ((Ra[31:16] == 0x8000 && Rb[15: 0] == 0x8000)
                              && (PSR.FXP == 0));
tmp[32:0] <- 0x0_ffff_ffff[32:0], CFR.OVS <- 1,
  if ((Ra[31:16] == 0x8000 && Rb[15: 0] == 0x8000)
                              && (PSR.FXP == 1));
tmp2[33:0] <- sext34(MHn[31:16]:MLn[31:16]) - sext34(tmp[32:0]);
MHm[31:16]:MLm[31:16] <- tmp2[31:0];
MHm[31:16]:MLm[31:16] <- 0x7fff_ffff, CFR.OVS <- 1,
                  if (tmp2[33:0] > 0x0_7fff_ffff[33:0]);
MHm[31:16]:MLm[31:16] <- 0x8000_0000, CFR.OVS <- 1,
                  if (tmp2[33:0] < 0x3_8000_0000[33:0]);
Rc[31:16] <- MHm[31:16], if (reg#(Rc) != 30 && reg#(Rc) != 31);

tmp[32:0] <- sext33(smul(Ra[15: 0],Rb[31:16]))<<FXP_ SHIFT;
tmp[32:0] <- 0x0_7fff_ffff[32:0], CFR.OVS <- 1,
  if ((Ra[15:0] == 0x8000 && Rb[31:16] == 0x8000)
                              && (PSR.FXP == 0));
tmp[32:0] <- 0x0_ffff_ffff[32:0], CFR.OVS <- 1,
  if ((Ra[15:0] == 0x8000 && Rb[31:16] == 0x8000)
                              && (PSR.FXP == 1));
tmp2[33:0] <- sext34(MHn[15:0]:MLn[15:0]) - sext34(tmp[32:0]);
MHm[15: 0]:MLm[15: 0] <- tmp2[31:0];
MHm[15: 0]:MLm[15: 0] <- 0x7fff_ffff, CFR.OVS <- 1,
                  if (tmp2[33:0] > 0x0_7fff_ffff[33:0]);
MHm[15: 0]:MLm[15: 0] <- 0x8000_0000, CFR.OVS <- 1,
                  if (tmp2[33:0] < 0x3_8000_0000[33:0]);
Rc[15:0] <- MHm[15:0], if (reg#(Rc) != 30 && reg#(Rc) != 31);
```

Handle Ra, Rb, and Rc in half word vector format, and handle Mm and Mn in word vector format.
Perform fixed point multiplication (SIMD cross) for Ra and Rb, and subtract result from Mn. Store result in Mm and Rc.
Saturate result when it cannot be represented by signed 32 bits.

| Assembler mnemonic | Format | Affecting flag | Affected flag |
|---|---|---|---|
| vxfmsuh Mm,Rc,Ra,Rb,Mn | 32bit | CFR.OVS | PSR.FXP |

Remarks

No writing is performed to Rc, when r30 or r31 is specified as Rc.

Fig. 740 vxfmsuh M0,Rc,Ra,Rb,Rx

Behavior

```
tmp[32:0] <- sext33(smul(Ra[31:16],Rb[15:0]))<<FXP_SHIFT;
tmp[32:0] <- 0x0_7fff_ffff[32:0], CFR.OVS <- 1,
  if ((Ra[31:16] == 0x8000 && Rb[15:0] == 0x8000)
                              && (PSR.FXP == 0));
tmp[32:0] <- 0x0_ffff_ffff[32:0], CFR.OVS <- 1,
  if ((Ra[31:16] == 0x8000 && Rb[15:0] == 0x8000)
                              && (PSR.FXP == 1));
tmp2[33:0] <- (sext34(Rx[31:16])<<16) -sext34(tmp[32:0]);
MH0[31:16]:ML0[31:16] <- tmp2[31:0];
MH0[31:16]:ML0[31:16] <- 0x7fff_ffff, CFR.OVS <- 1,
                    if (tmp2[33:0] > 0x0_7fff_ffff[33:0]);
MH0[31:16]:ML0[31:16] <- 0x8000_0000, CFR.OVS <- 1,
                    if (tmp2[33:0] < 0x3_8000_0000[33:0]);
Rc[31:16] <- MH0[31:16], if (reg#(Rc) != 30 && reg#(Rc) != 31);

tmp[32:0] <- sext33(smul(Ra[15:0],Rb[31:16]))<<FXP_SHIFT;
tmp[32:0] <- 0x0_7fff_ffff[32:0], CFR.OVS <- 1,
  if ((Ra[15:0] == 0x8000 && Rb[31:16] == 0x8000)
                              && (PSR.FXP == 0));
tmp[32:0] <- 0x0_ffff_ffff[32:0], CFR.OVS <- 1,
  if ((Ra[15:0] == 0x8000 && Rb[31:16] == 0x8000)
                              && (PSR.FXP == 1));
tmp2[33:0] <- (sext34(Rx[15:0])<<16) - sext34(tmp[32:0]);
MH0[15: 0]:ML0[15: 0] <- tmp2[31:0];
MH0[15:0]:ML0[15:0] <- 0x7fff_ffff, CFR.OVS <- 1,
                    if (tmp2[33:0] > 0x0_7fff_ffff[33:0]);
MH0[15:0]:ML0[15:0] <- 0x8000_0000, CFR.OVS <- 1,
                    if (tmp2[33:0] < 0x3_8000_0000[33:0]);
Rc[15:0] <- MH0[15:0], if (reg#(Rc) != 30 && reg#(Rc) != 31);
```

Handle Ra, Rb, Rc, and Rx in half word vector format, and handle M0 in word vector format.
Perform fixed point multiplication (SIMD cross) for Ra and Rb, and subtract result from Rx. Store result in M0 and Rc. Saturate result when it cannot be represented by signed 32 bits.

| Assembler mnemonic | Format | Affecting flag | Affected flag |
|---|---|---|---|
| vxfmsuh M0,Rc,Ra,Rb,Rx | 32bit | CFR.OVS | PSR.FXP |

Remarks

No writing is performed to Rc, when r30 or r31 is specified as Rc.

Fig. 741 vhfmsuh Mm,Rc,Ra,Rb,Mn

Behavior

```
tmp[32:0] <- sext33(smul(Ra[31:16],Rb[31:16]))<<FXP_SHIFT;
tmp[32:0] <- 0x0_7fff_ffff[32:0], CFR.OVS <- 1,
if ((Ra[31:16] == 0x8000 && Rb[31:16] == 0x8000)
                                && (PSR.FXP == 0));
tmp[32:0] <- 0x0_ffff_ffff[32:0], CFR.OVS <- 1,
if ((Ra[31:16] == 0x8000 && Rb[31:16] == 0x8000)
                                && (PSR.FXP == 1));
tmp2[33:0] <- sext34(MHn[31:16]:MLn[31:16]) - sext34(tmp[32:0]);
MHm[31:16]:MLm[31:16] <- tmp2[31:0];
MHm[31:16]:MLm[31:16] <- 0x7fff_ffff, CFR.OVS <- 1,
                   if (tmp2[33:0] > 0x0_7fff_ffff[33:0]);
MHm[31:16]:MLm[31:16] <- 0x8000_0000, CFR.OVS <- 1,
                   if (tmp2[33:0] < 0x3_8000_0000[33:0]);
Rc[31:16] <- MHm[31:16], if (reg#(Rc) != 30 && reg#(Rc) != 31);

tmp[32:0] <- sext33(smul(Ra[15: 0],Rb[31:16]))<<FXP_ SHIFT;
tmp[32:0] <- 0x0_7fff_ffff[32:0], CFR.OVS <- 1,
if ((Ra[15: 0] == 0x8000 && Rb[31:16] == 0x8000)
                                && (PSR.FXP == 0));
tmp[32:0] <- 0x0_ffff_ffff[32:0], CFR.OVS <- 1,
if ((Ra[15: 0] == 0x8000 && Rb[31:16] == 0x8000)
                                && (PSR.FXP == 1));
tmp2[33:0] <- sext34(MHn[15:0]:MLn[15:0]) - sext34(tmp[31:0]);
MHm[15: 0]:MLm[15: 0] <- tmp2[31:0];
MHm[15: 0]:MLm[15: 0] <- 0x7fff_ffff, CFR.OVS <- 1,
                   if (tmp2[33:0] > 0x0_7fff_ffff[33:0]);
MHm[15: 0]:MLm[15: 0] <- 0x8000_0000, CFR.OVS <- 1,
                   if (tmp2[33:0] < 0x3_8000_0000[33:0]);
Rc[15:0] <- MHm[15:0], if (reg#(Rc) != 30 && reg#(Rc) != 31);
```

Handle Ra, Rb, and Rc in half word vector format, and handle Mm and Mn in word vector format.
Perform fixed point multiplication (SIMD high) for Ra and Rb, and subtract result from Mn. Store result in Mm and Rc.
Saturate result when it cannot be represented by signed 32 bits.

| Assembler mnemonic | Format | Affecting flag | Affected flag |
|---|---|---|---|
| vhfmsuh Mm,Rc,Ra,Rb,Mn | 32bit | CFR.OVS | PSR.FXP |

Remarks

No writing is performed to Rc, when r30 or r31 is specified as Rc.

Fig. 742 vhfmsuh M0,Rc,Ra,Rb,Rx

Behavior

```
tmp[32:0] <- sext33(smul(Ra[31:16],Rb[31:16]))<<FXP_SHIFT;
tmp[32:0] <- 0x0_7fff_ffff[32:0], CFR.OVS <- 1,
  if ((Ra[31:16] == 0x8000 && Rb[31:16] == 0x8000)
                              && (PSR.FXP == 0));
tmp[32:0] <- 0x0_ffff_ffff[32:0], CFR.OVS <- 1,
  if ((Ra[31:16] == 0x8000 && Rb[31:16] == 0x8000)
                              && (PSR.FXP == 1));
tmp2[33:0] <- (sext34(Rx[31:16])<<16) - sext34(tmp[32:0]);
MH0[31:16]:ML0[31:16] <- tmp2[31:0];
MH0[31:16]:ML0[31:16] <- 0x7fff_ffff, CFR.OVS <- 1,
                   if (tmp2[33:0] > 0x0_7fff_ffff[33:0]);
MH0[31:16]:ML0[31:16] <- 0x8000_0000, CFR.OVS <- 1,
                   if (tmp2[33:0] < 0x3_8000_0000[33:0]);
Rc[31:16] <- MH0[31:16], if (reg#(Rc) != 30 && reg#(Rc) != 31);

tmp[32:0] <- sext33(smul(Ra[15:0],Rb[31:16]))<<FXP_SHIFT;
tmp[32:0] <- 0x0_7fff_ffff[32:0], CFR.OVS <- 1,
  if ((Ra[15:0] == 0x8000 && Rb[31:16] == 0x8000)
                              && (PSR.FXP == 0));
tmp[32:0] <- 0x0_ffff_ffff[32:0], CFR.OVS <- 1,
  if ((Ra[15:0] == 0x8000 && Rb[31:16] == 0x8000)
                              && (PSR.FXP == 1));
tmp2[33:0] <- (sext34(Rx[15:0])<<16) - sext34(tmp[32:0]);
MH0[15: 0]:ML0[15: 0] <- tmp2[31:0];
MH0[15:0]:ML0[15:0] <- 0x7fff_ffff, CFR.OVS <- 1,
                   if (tmp2[33:0] > 0x0_7fff_ffff[33:0]);
MH0[15:0]:ML0[15:0] <- 0x8000_0000, CFR.OVS <- 1,
                   if (tmp2[33:0] < 0x3_8000_0000[33:0]);
Rc[15:0] <- MH0[15:0], if (reg#(Rc) != 30 && reg#(Rc) != 31);
```

Handle Ra, Rb, Rc, and Rx in half word vector format, and handle M0 in word vector format.
Perform fixed point multiplication (SIMD high) for Ra and Rb, and subtract result from Rx. Store result in M0 and Rc. Saturate result when it cannot be represented by signed 32 bits.

| Assembler mnemonic | Format | Affecting flag | Affected flag |
|---|---|---|---|
| **vhfmsuh M0,Rc,Ra,Rb,Rx** | 32bit | CFR.OVS | PSR.FXP |

Remarks

No writing is performed to Rc, when r30 or r31 is specified as Rc.

Fig. 743 vlfmsuh Mm,Rc,Ra,Rb,Mn

| | |
|---|---|
| Behavior | tmp[32:0] <- sext33(smul(Ra[31:16],Rb[15: 0]))<<FXP_SHIFT;<br>tmp[32:0] <- 0x0_7fff_ffff[32:0], CFR.OVS <- 1,<br>if ((Ra[31:16] == 0x8000 && Rb[15: 0] == 0x8000)<br>&& (PSR.FXP == 0));<br>tmp[32:0] <- 0x0_ffff_ffff[32:0], CFR.OVS <- 1,<br>if ((Ra[31:16] == 0x8000 && Rb[15: 0] == 0x8000)<br>&& (PSR.FXP == 1));<br>tmp2[33:0] <- sext34(MHn[31:16]:MLn[31:16]) - sext34(tmp[32:0]);<br>MHm[31:16]:MLm[31:16] <- tmp2[31:0];<br>MHm[31:16]:MLm[31:16] <- 0x7fff_ffff, CFR.OVS <- 1,<br>if (tmp2[33:0] > 0x0_7fff_ffff[33:0]);<br>MHm[31:16]:MLm[31:16] <- 0x8000_0000, CFR.OVS <- 1,<br>if (tmp2[33:0] < 0x3_8000_0000[33:0]);<br>Rc[31:16] <- MHm[31:16], if (reg#(Rc) != 30 && reg#(Rc) != 31);<br><br>tmp[32:0] <- sext33(smul(Ra[15: 0],Rb[15: 0]))<<FXP_ SHIFT;<br>tmp[32:0] <- 0x0_7fff_ffff[32:0], CFR.OVS <- 1,<br>if ((Ra[15: 0] == 0x8000 && Rb[15: 0] == 0x8000)<br>&& (PSR.FXP == 0));<br>tmp[32:0] <- 0x0_ffff_ffff[32:0], CFR.OVS <- 1,<br>if ((Ra[15: 0] == 0x8000 && Rb[15: 0] == 0x8000)<br>&& (PSR.FXP == 1));<br>tmp2[33:0] <- sext34(MHn[15:0]:MLn[15:0]) - sext34(tmp[32:0]);<br>MHm[15: 0]:MLm[15: 0] <- tmp2[31:0];<br>MHm[15: 0]:MLm[15: 0] <- 0x7fff_ffff, CFR.OVS <- 1,<br>if (tmp2[33:0] > 0x0_7fff_ffff[33:0]);<br>MHm[15: 0]:MLm[15: 0] <- 0x8000_0000, CFR.OVS <- 1,<br>if (tmp2[33:0] < 0x3_8000_0000[33:0]);<br>Rc[15:0] <- MHm[15:0], if (reg#(Rc) != 30 && reg#(Rc) != 31);<br><br>Handle Ra, Rb, and Rc in half word vector format, and handle Mm and Mn in word vector format.<br>Perform fixed point multiplication (SIMD low) for Ra and Rb, and subtract result from Mn. Store result in Mm and Rc. Saturate result when it cannot be represented by signed 32 bits. |

| Assembler mnemonic | Format | Affecting flag | Affected flag |
|---|---|---|---|
| **vlfmsuh Mm,Rc,Ra,Rb,Mn** | 32bit | CFR.OVS | PSR.FXP |

| Remarks |
|---|
| No writing is performed to Rc, when r30 or r31 is specified as Rc. |

Fig. 744 vlfmsuh M0,Rc,Ra,Rb,Rx

| | |
|---|---|
| Behavior | tmp[32:0] <- sext33(smul(Ra[31:16],Rb[15:0]))<<FXP_SHIFT;<br>tmp[32:0] <- 0x0_7fff_ffff[32:0], CFR.OVS <- 1,<br>if ((Ra[31:16] == 0x8000 && Rb[15:0] == 0x8000)<br>&& (PSR.FXP == 0));<br>tmp[32:0] <- 0x0_ffff_ffff[32:0], CFR.OVS <- 1,<br>if ((Ra[31:16] == 0x8000 && Rb[15:0] == 0x8000)<br>&& (PSR.FXP == 1));<br>tmp2[33:0] <- (sext34(Rx[31:16])<<16) -sext34(tmp[32:0]);<br>MH0[31:16]:ML0[31:16] <- tmp2[31:0];<br>MH0[31:16]:ML0[31:16] <- 0x7fff_ffff, CFR.OVS <- 1,<br>if (tmp2[33:0] > 0x0_0_7fff_ffff[33:0]);<br>MH0[31:16]:ML0[31:16] <- 0x8000_0000, CFR.OVS <- 1,<br>if (tmp2[33:0] < 0x3_8000_0000[32:0]);<br>Rc[31:16] <- MH0[31:16], if (reg#(Rc) != 30 && reg#(Rc) != 31);<br><br>tmp[32:0] <- sext33(smul(Ra[15:0],Rb[15:0]))<<FXP_SHIFT;<br>tmp[32:0] <- 0x0_7fff_ffff[32:0], CFR.OVS <- 1,<br>if ((Ra[15:0] == 0x8000 && Rb[15:0] == 0x8000)<br>&& (PSR.FXP == 0));<br>tmp[32:0] <- 0x0_ffff_ffff[32:0], CFR.OVS <- 1,<br>if ((Ra[15:0] == 0x8000 && Rb[15:0] == 0x8000)<br>&& (PSR.FXP == 1));<br>tmp2[33:0] <- (sext34(Rx[15:0])<<16) - sext34(tmp[32:0]);<br>MH0[15: 0]:ML0[15: 0] <- tmp2[31:0];<br>MH0[15: 0]:ML0[15: 0] <- 0x7fff_ffff, CFR.OVS <- 1,<br>if (tmp2[33:0] > 0x0_7fff_ffff[33:0]);<br>MH0[15: 0]:ML0[15: 0] <- 0x8000_0000, CFR.OVS <- 1,<br>if (tmp2[33:0] < 0x3_8000_0000[33:0]);<br>Rc[15:0] <- MH0[15:0], if (reg#(Rc) != 30 && reg#(Rc) != 31);<br><br>Handle Ra, Rb, and Rc in half word vector format, and handle Mm and Mn in word vector format.<br>Perform fixed point multiplication (SIMD low) for Ra and Rb, and subtract result from Mn. Store result in Mm and Rc. Saturate result when it cannot be represented by signed 32 bits. |

| Assembler mnemonic | Format | Affecting flag | Affected flag |
|---|---|---|---|
| vlfmsuh M0,Rc,Ra,Rb,Rx | 32bit | CFR.OVS | PSR.FXP |

| Remarks |
|---|
| No writing is performed to Rc, when r30 or r31 is specified as Rc. |

Fig. 745 vfmsuw Mm,Rc,Ra,Rb,Mn

<table>
<tr><td>Behavior</td><td colspan="3">

```
tmp[32: 0] <- sext33(smul(Ra[31:16],Rb[31:16])<<FXP_SHIFT;
tmp[32: 0] <- 0x0_7fff_ffff[32: 0], CFR.OVS <- 1,
  if ((Ra[31:16] == 0x8000 && Rb[31:16] == 0x8000)
                    && (PSR.FXP == 0));
tmp[32: 0] <- 0x0_ffff_ffff[32: 0], CFR.OVS <- 1,
  if ((Ra[31:16] == 0x8000 && Rb[31:16] == 0x8000)
                    && (PSR.FXP == 1));
tmp2[33: 0] <- sext34(MHn[31:16]:MLn[31:16])
                              - sext34(tmp[32: 0]);
MHm[31:16]:MLm[31:16] <- tmp2[31: 0];
MHm[31:16]:MLm[31:16] <- 0x7fff_ffff, CFR.OVS <- 1,
                  if (tmp2[33: 0] > 0x0_7fff_ffff[33: 0]);
MHm[31:16]:MLm[31:16] <- 0x8000_0000, CFR.OVS <- 1,
                  if (tmp2[33: 0] < 0x3_8000_0000[33: 0]));
Rc[31: 0] <- MHm[31:16]:MLm[31:16],
                  if (reg#(Rc) != 30 && reg#(Rc) != 31);
tmp[32: 0] <- sext33(smul(Ra[15: 0],Rb[15: 0]))<<FXP_SHIFT;
tmp[32: 0] <- 0x0_7fff_ffff[32: 0], CFR.OVS <- 1,
  if ((Ra[15: 0] == 0x8000 && Rb[15: 0] == 0x8000)
                    && (PSR.FXP == 0));
tmp[32: 0] <- 0x0_ffff_ffff[32: 0], CFR.OVS <- 1,
  if ((Ra[15: 0] == 0x8000 && Rb[15: 0] == 0x8000)
                    && (PSR.FXP == 1));
tmp2[33: 0] <- sext34(MHn[15: 0]:MLn[15: 0])
                              - sext34(tmp[32: 0]);
MHm[15:0]:MLm[15:0] <- tmp2[31: 0];
MHm[15:0]:MLm[15:0] <- 0x7fff_ffff, CFR.OVS <- 1,
                  if (tmp2[33: 0] > 0x0_7fff_ffff[33: 0]);
MHm[15:0]:MLm[15:0] <- 0x8000_0000, CFR.OVS <- 1,
                  if (tmp2[33: 0] < 0x3_8000_0000[33: 0]);
```

Handle Ra and Rb in half word vector format, and handle Mm and Mn in word vector format.<br>Perform fixed point multiplication (SIMD straight) for Ra and Rb, and subtract result from Mn. Store result in Mm and Rc.<br>Saturate result when it cannot be represented by signed 32 bits.
</td></tr>
<tr><td>Assembler mnemonic</td><td>Format</td><td>Affecting flag</td><td>Affected flag</td></tr>
<tr><td>vfmsuw Mm,Rc,Ra,Rb,Mn</td><td>32bit</td><td>CFR.OVS</td><td>PSR.FXP</td></tr>
<tr><td colspan="4">Remarks</td></tr>
<tr><td colspan="4">Only one of the two SIMD multiplication results is stored in Rc. Take out the other multiplication result from vunpk2 Rb, Mn, and the like.<br><br>No writing is performed to Rc, when r30 or r31 is specified as Rc.</td></tr>
</table>

Fig. 746 vxfmsuw Mm,Rc,Ra,Rb,Mn

| | |
|---|---|
| Behavior | tmp[32: 0] <- sext33(smul(Ra[31:16],Rb[15: 0]))<<FXP_SHIFT;<br>tmp[32: 0] <- 0x0_7fff_ffff[32: 0], CFR.OVS <- 1,<br>if ((Ra[31:16] == 0x8000 && Rb[15: 0] == 0x8000)<br>&& (PSR.FXP == 0));<br>tmp[32: 0] <- 0x0_ffff_ffff[32: 0], CFR.OVS <- 1,<br>if ((Ra[31:16] == 0x8000 && Rb[15: 0] == 0x8000)<br>&& (PSR.FXP == 1));<br>tmp2[33: 0] <- sext34(MHn[31:16]:MLn[31:16])<br>- sext34(tmp[32: 0]);<br>MHm[31:16]:MLm[31:16] <- tmp2[31: 0];<br>MHm[31:16]:MLm[31:16] <- 0x7fff_ffff, CFR.OVS <- 1,<br>if (tmp2[33: 0] > 0x0_7fff_ffff[33: 0]);<br>MHm[31:16]:MLm[31:16] <- 0x8000_0000, CFR.OVS <- 1,<br>if (tmp2[33: 0] < 0x3_8000_0000[33: 0]);<br>Rc[31: 0] <- MHm[31:16]:MLm[31:16],<br>if (reg#(Rc) != 30 && reg#(Rc) != 31);<br>tmp[32: 0] <- sext33(smul(Ra[15: 0],Rb[31:16]))<<FXP_SHIFT;<br>tmp[32: 0] <- 0x0_7fff_ffff[32: 0], CFR.OVS <- 1,<br>if ((Ra[15: 0] == 0x8000 && Rb[31:16] == 0x8000)<br>&& (PSR.FXP == 0));<br>tmp[32: 0] <- 0x0_ffff_ffff[32: 0], CFR.OVS <- 1,<br>if ((Ra[15: 0] == 0x8000 && Rb[31:16] == 0x8000)<br>&& (PSR.FXP == 1));<br>tmp2[33: 0] <- sext34(MHn[15: 0]:MLn[15: 0])<br>- sext34(tmp[32: 0]);<br>MHm[15:0]:MLm[15:0] <- tmp2[31: 0];<br>MHm[15:0]:MLm[15:0] <- 0x7fff_ffff, CFR.OVS <- 1,<br>if (tmp2[33: 0] > 0x0_7fff_ffff[33: 0]);<br>MHm[15:0]:MLm[15:0] <- 0x8000_0000, CFR.OVS <- 1,<br>if (tmp2[33: 0] < 0x3_8000_0000[33: 0]);<br><br>Handle Ra and Rb in half word vector format, and handle Mm and Mn in word vector format.<br>Perform fixed point multiplication (SIMD cross) for Ra and Rb, and subtract result from Mn. Store result in Mm and Rc. Saturate result when it cannot be represented by signed 32 bits. |

| Assembler mnemonic | Format | Affecting flag | Affected flag |
|---|---|---|---|
| vxfmsuw Mm,Rc,Ra,Rb,Mn | 32bit | CFR.OVS | PSR.FXP |

Remarks

Only one of the two SIMD multiplication results is stored in Rc. Take out the other multiplication result from vunpk2 Rb, Mn, and the like.

No writing is performed to Rc, when r30 or r31 is specified as Rc.

Fig. 747 vhfmsuw Mm,Rc,Ra,Rb,Mn

Behavior

```
tmp[32: 0] <- sext33(smul(Ra[31:16],Rb[31:16]))<<FXP_SHIFT;
tmp[32: 0] <- 0x0_7fff_ffff[32: 0], CFR.OVS <- 1,
   if ((Ra[31:16] == 0x8000 && Rb[31:16] == 0x8000)
                  && (PSR.FXP == 0));
tmp[32: 0] <- 0x0_ffff_ffff[32: 0], CFR.OVS <- 1,
   if ((Ra[31:16] == 0x8000 && Rb[31:16] == 0x8000)
                  && (PSR.FXP == 1));
tmp2[33: 0] <- sext34(MHn[31:16]:MLn[31:16])
                                 - sext34(tmp[32: 0]);
MHm[31:16]:MLm[31:16] <- tmp2[31: 0];
MHm[31:16]:MLm[31:16] <- 0x7fff_ffff, CFR.OVS <- 1,
                  if (tmp2[33: 0] > 0x0_7fff_ffff[33: 0]);
MHm[31:16]:MLm[31:16] <- 0x8000_0000, CFR.OVS <- 1,
                  if (tmp2[33: 0] < 0x3_8000_0000[33: 0]);
Rc[31: 0] <- MHm[31:16]:MLm[31:16],
                  if (reg#(Rc) != 30 && reg#(Rc) != 31);
tmp[32: 0] <- sext33(smul(Ra[15: 0],Rb[31:16]))<<FXP_SHIFT;
tmp[32: 0] <- 0x0_7fff_ffff[32: 0], CFR.OVS <- 1,
   if ((Ra[15: 0] == 0x8000 && Rb[31:16] == 0x8000)
                  && (PSR.FXP == 0));
tmp[32: 0] <- 0x0_ffff_ffff[32: 0], CFR.OVS <- 1,
   if ((Ra[15: 0] == 0x8000 && Rb[31:16] == 0x8000)
                  && (PSR.FXP == 1));
tmp2[33: 0] <- sext34(MHn[15: 0]:MLn[15: 0])
                                 - sext34(tmp[32: 0]);
MHm[15:0]:MLm[15:0] <- tmp2[31: 0];
MHm[15:0]:MLm[15:0] <- 0x7fff_ffff, CFR.OVS <- 1,
                  if (tmp2[33: 0] > 0x0_7fff_ffff[33: 0]);
MHm[15:0]:MLm[15:0] <- 0x8000_0000, CFR.OVS <- 1,
                  if (tmp2[33: 0] < 0x3_8000_0000[33: 0]);
```

Handle Ra and Rb in half word vector format, and handle Mm and Mn in word vector format.
Perform fixed point multiplication (SIMD high) for Ra and Rb, and subtract result from Mn. Store result in Mm and Rc. Saturate result when it cannot be represented by signed 32 bits.

| Assembler mnemonic | Format | Affecting flag | Affected flag |
|---|---|---|---|
| **vhfmsuw Mm,Rc,Ra,Rb,Mn** | 32bit | CFR.OVS | PSR.FXP |

Remarks

Only one of the two SIMD multiplication results is stored in Rc. Take out the other multiplication result from vunpk2 Rb, Mn, and the like.

No writing is performed to Rc, when r30 or r31 is specified as Rc.

Fig. 748 vlfmsuw Mm,Rc,Ra,Rb,Mn

| | |
|---|---|
| Behavior | tmp[32: 0] <- sext33(smul(Ra[31:16],Rb[15: 0]))<<FXP_SHIFT;<br>tmp[32: 0] <- 0x0_7fff_ffff[32: 0], CFR.OVS <- 1,<br>if ((Ra[31:16] == 0x8000 && Rb[15: 0] == 0x8000)<br>&& (PSR.FXP == 0));<br>tmp[32: 0] <- 0x0_ffff_ffff[32: 0], CFR.OVS <- 1,<br>if ((Ra[31:16] == 0x8000 && Rb[15: 0] == 0x8000)<br>&& (PSR.FXP == 1));<br>tmp2[33: 0] <- sext34(MHn[31:16]:MLn[31:16])<br>- sext34(tmp[32: 0]);<br>MHm[31:16]:MLm[31:16] <- tmp2[31: 0];<br>MHm[31:16]:MLm[31:16] <- 0x7fff_ffff, CFR.OVS <- 1,<br>if (tmp2[33: 0] > 0x0_7fff_ffff[33: 0]);<br>MHm[31:16]:MLm[31:16] <- 0x8000_0000, CFR.OVS <- 1,<br>if (tmp2[33: 0] < 0x3_8000_0000[33: 0]);<br>Rc[31: 0] <- MHm[31:16]:MLm[31:16],<br>if (reg#(Rc) != 30 && reg#(Rc) != 31);<br>tmp[32: 0] <- sext33(smul(Ra[15: 0],Rb[15: 0]))<<FXP_SHIFT;<br>tmp[32: 0] <- 0x0_7fff_ffff[32: 0], CFR.OVS <- 1,<br>if ((Ra[15: 0] == 0x8000 && Rb[15: 0] == 0x8000)<br>&& (PSR.FXP == 0));<br>tmp[32: 0] <- 0x0_ffff_ffff[32: 0], CFR.OVS <- 1,<br>if ((Ra[15: 0] == 0x8000 && Rb[15: 0] == 0x8000)<br>&& (PSR.FXP == 1));<br>tmp2[33: 0] <- sext34(MHn[15: 0]:MLn[15: 0])<br>- sext34(tmp[32: 0]);<br>MHm[15:0]:MLm[15:0] <- tmp2[31: 0];<br>MHm[15:0]:MLm[15:0] <- 0x7fff_ffff, CFR.OVS <- 1,<br>if (tmp2[33: 0] > 0x0_7fff_ffff[33: 0]);<br>MHm[15:0]:MLm[15:0] <- 0x8000_0000, CFR.OVS <- 1,<br>if (tmp2[33: 0] < 0x3_8000_0000[33: 0]);<br><br>Handle Ra and Rb in half word vector format, and handle Mm and Mn in word vector format.<br>Perform fixed point multiplication (SIMD low) for Ra and Rb, and subtract result from Mn. Store result in Mm and Rc. Saturate result when it cannot be represented by signed 32 bits. |

| Assembler mnemonic | Format | Affecting flag | Affected flag |
|---|---|---|---|
| vlfmsuw Mm,Rc,Ra,Rb,Mn | 32bit | CFR.OVS | PSR.FXP |

| Remarks |
|---|
| Only one of the two SIMD multiplication results is stored in Rc. Take out the other multiplication result from vunpk2 Rb, Mn, and the like.<br>No writing is performed to Rc, when r30 or r31 is specified as Rc. |

PROCESSOR EXECUTING SIMD INSTRUCTIONS

BACKGROUND OF THE INVENTION (1) Field of the Invention

The present invention relates to a processor such as a DSP and CPU, and more particularly to a processor that executes SIMD instructions.

(2) Description of the Related Art

Pentium®/Pentium® III/Pentium 4® MMX/SSE/SSE2 and others of the Intel Corporation of the United States are some of the existing processors that support SIMD (Single Instruction Multiple Data) instructions.

For example, MMX is capable of performing the same operations in one instruction on a maximum of eight integers stored in a 64-bit MMX register.

However, such existing processors have many limitations concerning the positions of operands on which SIMD operations are performed.

For example, when an existing processor executes a SIMD add instruction on the first register and the second register as its operands, with values A and B respectively stored in the higher bits and the lower bits of the first register and values C and D respectively stored in the higher bits and the lower bits of the second register, the resulting values are A+C and B+D. In other words, such added values are obtained as a result of adding data stored in the higher bits of the respective registers and as a result of adding data stored in the lower bits of the respective registers, meaning that an operand depends uniquely on the position in a register where data is stored.

Therefore, in order to obtain an added value A+D and an added value B+C targeting at the aforementioned first and second registers, the storage positions of data stored in the higher bits and data stored in the lower bits in either of the registers need to be exchanged before a SIMD add instruction is executed, or an ordinary SISD (Single Instruction Single Data) add instruction needs to be executed twice instead of using a SIMD add instruction.

Meanwhile, with the recent digitization of communications, it is necessary, in the fields of image processing and sound processing requiring digital signal processing (e.g. Fourier transform and filter processing), to perform the same operations on a plurality of data elements, but many cases require such processing as one for performing the same operations on a plurality of data elements located at a symmetric position with respect to the center of the data array. In such a case, two types of operands need to be sorted in reverse order, and the operation shall be performed on data stored in the higher bits of one of two registers and data stored in the lower bits of the other register, for example.

However, there is a problem in that a SIMD operation performed by the existing processors requires operands to be placed in the same order as each other in respective data arrays as mentioned above, which necessitates the reordering and the like of the operands as well as consuming a substantial time for digital signal processing.

SUMMARY OF THE INVENTION

The present invention has been conceived in view of the above problem, and it is an object of the present invention to provide a processor which involves fewer limitations concerning the positions of operands handled in SIMD operations and which is capable of executing SIMD operations with a high degree of flexibility. More specifically, the present invention aims at providing a processor that is suited to be used for multimedia performing high-speed digital signal processing.

As is obvious from the above explanations, the processor according to the present invention, which is a processor that is capable of executing SIMD instructions for performing operations on a plurality of data elements in a single instruction, executes parallel operations, not only on two pieces of data in the same ordinal rank in different data arrays, but also on data in a diagonally crossed position, and data in a symmetric position. Thus, the present invention enhances the speed of digital filtering and other processing in which the same operations are performed on data in a symmetric position, and therefore, it is possible to embody a processor that is suitable for multimedia processing and other purposes.

When the type of an operation concerned is multiplication, a sum of products or a difference of products, only the lower bits, the higher bits, or a part of operation results of the respective operation types may be outputted. Accordingly, since bit extraction, which is required to be performed when integer data and fixed point data are handled, is carried out in concurrence with the operation in calculating an inner product of complex numbers and others, an increased speed can be achieved for an operation utilizing two-dimensional data including complex numbers (e.g. image processing using a two-dimensional coordinate, audio signal processing using two-dimensional representation of amplitude and phase).

As described above, since the processor according to the present invention is capable of offering a higher degree of parallelism than an ordinary microcomputer, performing high-speed AV media signal processing, as well as capable of being employed as a core processor to be commonly used in a mobile phone, mobile AV device, digital television, DVD and others, the processor according to the present invention is extremely useful in the present age in which the advent of high-performance and cost effective multimedia apparatuses is desired.

Note that it possible to embody the present invention not only as a processor executing the above-mentioned characteristic instructions, but also as an operation processing method for a plurality of data elements and the like, and as a program including such characteristic instructions. Also, it should be also understood that such a program can be distributed via a recording medium including a CD-ROM and the like as well as via a transmission medium including the internet and the like.

As further information about the technical background to this application, Japanese patent application No. 2002-161381 filed Jun. 3, 2002, is incorporated herein by reference.

BRIEF DESCRIPTION OF THE DRAWINGS

These and other subjects, advantages and features of the invention will become apparent from the following description thereof when taken in conjunction with the accompanying drawings which illustrate a specific embodiment of the invention.

FIG. 11 is a diagram showing a configuration of a program status register (PSR) of the processor.

FIG. 12 is a diagram showing a configuration of a condition flag register (CFR) of the processor.

FIG. 21 is a diagram explaining an instruction belonging to a category "ALUadd (addition) system".

FIG. 22 is a diagram explaining an instruction belonging to a category "ALUsub (subtraction) system".

FIG. 23 is a diagram explaining an instruction belonging to a category "ALUlogic (logical operation) system and others".

FIG. 24 is a diagram explaining an instruction belonging to a category "CMP (comparison operation) system".

FIG. 25 is a diagram explaining an instruction belonging to a category "mul (multiplication) system".

FIG. 26 is a diagram explaining an instruction belonging to a category "mac (sum of products operation) system".

FIG. 27 is a diagram explaining an instruction belonging to a category "msu (difference of products) system".

FIG. 28 is a diagram explaining an instruction belonging to a category "MEMld (load from memory) system".

FIG. 29 is a diagram explaining an instruction belonging to a category "MEMstore (store in memory) system".

FIG. 30 is a diagram explaining an instruction belonging to a category "BRA (branch) system".

FIG. 31 is a diagram explaining an instruction belonging to a category "BSasl (arithmetic barrel shift) system and others".

FIG. 32 is a diagram explaining an instruction belonging to a category "BSlsr (logical barrel shift) system and others".

FIG. 33 is a diagram explaining an instruction belonging to a category "CNVvaln (arithmetic conversion) system".

FIG. 34 is a diagram explaining an instruction belonging to a category "CNV (general conversion) system".

FIG. 35 is a diagram explaining an instruction belonging to a category "SATvlpk (saturation processing) system".

FIG. 36 is a diagram explaining an instruction belonging to a category "ETC (et cetera) system".

FIG. 37 is a diagram explaining Instruction "ld Rb,(Ra, D10)".

FIG. 38 is a diagram explaining Instruction "ld Rb3,(Ra3, D5)".

FIG. 39 is a diagram explaining Instruction "ld Rb,(GP, D13)".

FIG. 40 is a diagram explaining Instruction "ld Rb2,(GP, D6)".

FIG. 41 is a diagram explaining Instruction "ld Rb2, (GP)".

FIG. 42 is a diagram explaining Instruction "ld Rb,(SP, D13)".

FIG. 43 is a diagram explaining Instruction "ld Rb2,(SP, D6)".

FIG. 44 is a diagram explaining Instruction "ld Rb2, (SP)".

FIG. 45 is a diagram explaining Instruction "ld Rb,(Ra+) I10".

FIG. 46 is a diagram explaining Instruction "ld Rb, (Ra+)".

FIG. 47 is a diagram explaining Instruction "ld Rb2, (Ra2+)".

FIG. 48 is a diagram explaining Instruction "ld Rb,(Ra)".

FIG. 49 is a diagram explaining Instruction "ld Rb2, (Ra2)".

FIG. 50 is a diagram explaining Instruction "ldh Rb,(Ra, D9)".

FIG. 51 is a diagram explaining Instruction "ldh Rb3, (Ra3,D4)".

FIG. 52 is a diagram explaining Instruction "ldh Rb,(GP, D12)".

FIG. 53 is a diagram explaining Instruction "ldh Rb2,(GP, D5)".

FIG. 54 is a diagram explaining Instruction "ldh Rb2, (GP)".

FIG. 55 is a diagram explaining Instruction "ldh Rb,(SP, D12)".

FIG. 56 is a diagram explaining Instruction "ldh Rb2,(SP, D5)".

FIG. 57 is a diagram explaining Instruction "ldh Rb2, (SP)".

FIG. 58 is a diagram explaining Instruction "ldh Rb,(Ra+) I9".

FIG. 59 is a diagram explaining Instruction "ldh Rb, (Ra+)".

FIG. 60 is a diagram explaining Instruction "ldh Rb2, (Ra2+)".

FIG. 61 is a diagram explaining Instruction "ldh Rb, (Ra)".

FIG. 62 is a diagram explaining Instruction "ldh Rb2, (Ra2)".

FIG. 63 is a diagram explaining Instruction "ldhu Rb,(Ra, D9)".

FIG. 64 is a diagram explaining Instruction "ldhu Rb,(GP, D12)".

FIG. 65 is a diagram explaining Instruction "ldhu Rb,(SP, D12)".

FIG. 66 is a diagram explaining Instruction "ldhu Rb, (Ra+)I9".

FIG. 67 is a diagram explaining Instruction "ldhu Rb, (Ra+)".

FIG. 68 is a diagram explaining Instruction "ldhu Rb, (Ra)".

FIG. 69 is a diagram explaining Instruction “ldb Rb,(Ra, D8)”.

FIG. 70 is a diagram explaining Instruction “ldb Rb,(GP, D11)”.

FIG. 71 is a diagram explaining Instruction “ldb Rb,(SP, D11)”.

FIG. 72 is a diagram explaining Instruction “ldb Rb,(Ra+) I8”.

FIG. 73 is a diagram explaining Instruction “ldb Rb, (Ra+)”.

FIG. 74 is a diagram explaining Instruction “ldb Rb, (Ra)”.

FIG. 75 is a diagram explaining Instruction “ldbu Rb,(Ra, D8)”.

FIG. 76 is a diagram explaining Instruction “ldbu Rb,(GP, D11)”.

FIG. 77 is a diagram explaining Instruction “ldbu Rb,(SP, D11)”.

FIG. 78 is a diagram explaining Instruction “ldbu Rb, (Ra+)I8”.

FIG. 79 is a diagram explaining Instruction “ldbu Rb, (Ra+)”.

FIG. 80 is a diagram explaining Instruction “ldbu Rb, (Ra)”.

FIG. 81 is a diagram explaining Instruction “ldp Rb:Rb+1,(Ra,D11)”.

FIG. 82 is a diagram explaining Instruction “ldp Rb:Rb+1,(GP,D14)”.

FIG. 83 is a diagram explaining Instruction “ldp Rb:Rb+1,(SP,D14)”.

FIG. 84 is a diagram explaining Instruction “ldp Rb:Rb+1,(SP,D7)”.

FIG. 85 is a diagram explaining Instruction “ldp Rb:Rb+1,(SP)”.

FIG. 86 is a diagram explaining Instruction “ldp Rb:Rb+1,(Ra+)I11”.

FIG. 87 is a diagram explaining Instruction “ldp Rb2: Rb2+1,(Ra2+)”.

FIG. 88 is a diagram explaining Instruction “ldp Rb:Rb+1,(Ra+)”.

FIG. 89 is a diagram explaining Instruction “ldp Rb:Rb+1,(Ra)”.

FIG. 90 is a diagram explaining Instruction “ldp LR:SVR, (Ra,D14)”.

FIG. 91 is a diagram explaining Instruction “ldp LR:SVR, (Ra)”.

FIG. 92 is a diagram explaining Instruction “ldp LR:SVR, (GP,D14)”.

FIG. 93 is a diagram explaining Instruction “ldp LR:SVR, (SP,D14)”.

FIG. 94 is a diagram explaining Instruction “ldp LR:SVR, (SP,D7)”.

FIG. 95 is a diagram explaining Instruction “ldp LR:SVR, (SP)”.

FIG. 96 is a diagram explaining Instruction “ldp TAR: UDR,(Ra,D11)”.

FIG. 97 is a diagram explaining Instruction “ldp TAR: UDR,(GP,D14)”.

FIG. 98 is a diagram explaining Instruction “ldp TAR: UDR,(SP,D14)”.

FIG. 99 is a diagram explaining Instruction “ldhp Rb:Rb+1,(Ra,D10)”.

FIG. 100 is a diagram explaining Instruction “ldhp Rb:Rb+1,(Ra+)I10”.

FIG. 101 is a diagram explaining Instruction “ldhp Rb2: Rb2+1,(Ra2+)”.

FIG. 102 is a diagram explaining Instruction “ldhp Rb:Rb+1, (Ra+)”.

FIG. 103 is a diagram explaining Instruction “ldhp Rb:Rb+1,(Ra)”.

FIG. 104 is a diagram explaining Instruction “ldbp Rb:Rb+1,(Ra,D9)”.

FIG. 105 is a diagram explaining Instruction “ldbp Rb:Rb+1,(Ra+)I9”.

FIG. 106 is a diagram explaining Instruction “ldbp Rb:Rb+1,(Ra+)”.

FIG. 107 is a diagram explaining Instruction “ldbp Rb:Rb+1,(Ra)”.

FIG. 108 is a diagram explaining Instruction “ldbh Rb, (Ra+)I7”.

FIG. 109 is a diagram explaining Instruction “ldbh Rb, (Ra+)”.

FIG. 110 is a diagram explaining Instruction “ldbh Rb, (Ra)”.

FIG. 111 is a diagram explaining Instruction “ldbuh Rb,(Ra+)I7”.

FIG. 112 is a diagram explaining Instruction “ldbuh Rb,(Ra+)”.

FIG. 113 is a diagram explaining Instruction “ldbuh Rb,(Ra)”.

FIG. 114 is a diagram explaining Instruction “ldbhp Rb:Rb+1,(Ra+)I7”.

FIG. 115 is a diagram explaining Instruction “ldbhp Rb:Rb+1,(Ra+)”.

FIG. 116 is a diagram explaining Instruction “ldbhp Rb:Rb+1,(Ra)”.

FIG. 117 is a diagram explaining Instruction “ldbuhp Rb:Rb+1,(Ra+)I7”.

FIG. 118 is a diagram explaining Instruction “ldbuhp Rb:Rb+1,(Ra+)”.

FIG. 119 is a diagram explaining Instruction “ldbuhp Rb:Rb+1,(Ra)”.

FIG. 120 is a diagram explaining Instruction “st (Ra, D10),Rb”.

FIG. 121 is a diagram explaining Instruction “st (Ra3, D5),Rb3”.

FIG. 122 is a diagram explaining Instruction “st (GP, D13),Rb”.

FIG. 123 is a diagram explaining Instruction “st (GP,D6), Rb2”.

FIG. 124 is a diagram explaining Instruction “st (GP), Rb2”.

FIG. 125 is a diagram explaining Instruction “st (SP,D13), Rb”.

FIG. 126 is a diagram explaining Instruction “st (SP,D6), Rb2”.

FIG. 127 is a diagram explaining Instruction “st (SP), Rb2”.

FIG. 128 is a diagram explaining Instruction “st (Ra+) I10,Rb”.

FIG. 129 is a diagram explaining Instruction “st (Ra+), Rb”.

FIG. 130 is a diagram explaining Instruction “st (Ra2+), Rb2”.

Figure 1:
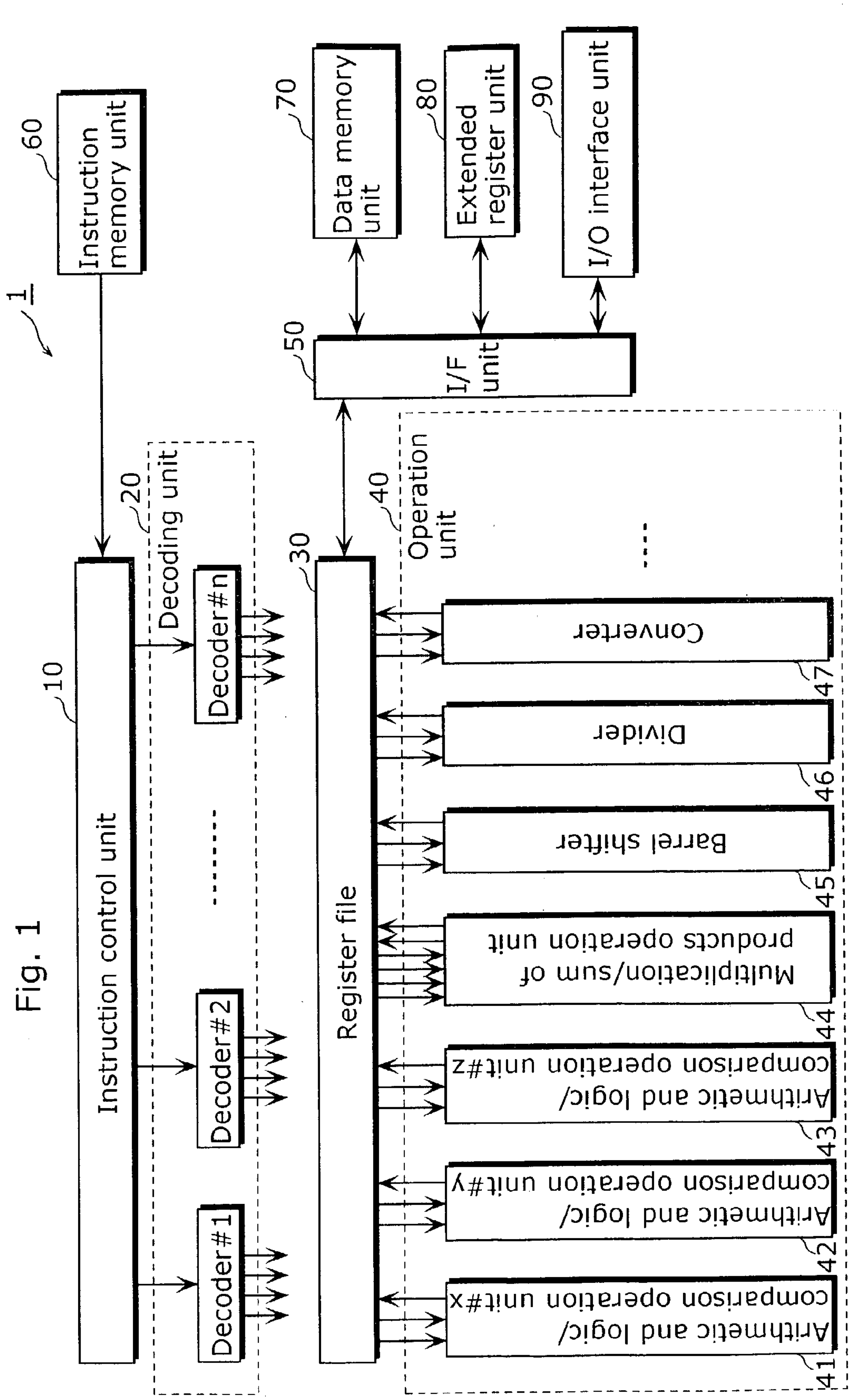
FIG. 1 is a schematic block diagram showing a processor according to the present invention.

FIG. 131 is a diagram explaining Instruction “st (Ra),Rb”.

FIG. 132 is a diagram explaining Instruction “st (Ra2), Rb2”.

FIG. 133 is a diagram explaining Instruction “sth (Ra, D9),Rb”.

FIG. 134 is a diagram explaining Instruction “sth (Ra3, D4),Rb3”.

FIG. 135 is a diagram explaining Instruction “sth (GP, D12),Rb”.

FIG. 136 is a diagram explaining Instruction "sth (GP, D5),Rb2".

FIG. 137 is a diagram explaining Instruction "sth (GP), Rb2".

FIG. 138 is a diagram explaining Instruction "sth (SP, D12),Rb".

FIG. 139 is a diagram explaining Instruction "sth (SP, D5),Rb2".

FIG. 140 is a diagram explaining Instruction "sth (SP), Rb2".

FIG. 141 is a diagram explaining Instruction "sth (Ra+) I9,Rb".

FIG. 142 is a diagram explaining Instruction "sth (Ra+), Rb".

FIG. 143 is a diagram explaining Instruction "sth (Ra2+), Rb2".

FIG. 144 is a diagram explaining Instruction "sth (Ra), Rb".

FIG. 145 is a diagram explaining Instruction "sth (Ra2), Rb2".

FIG. 146 is a diagram explaining Instruction "stb (Ra, D8),Rb".

FIG. 147 is a diagram explaining Instruction "stb (GP, D11),Rb".

FIG. 148 is a diagram explaining Instruction "stb (SP, D11),Rb".

FIG. 149 is a diagram explaining Instruction "stb (Ra+) I8,Rb".

FIG. 150 is a diagram explaining Instruction "stb (Ra+), Rb".

FIG. 151 is a diagram explaining Instruction "stb (Ra), Rb".

FIG. 152 is a diagram explaining Instruction "stp (Ra, D11),Rb:Rb+1".

FIG. 153 is a diagram explaining Instruction "stp (GP, D14),Rb:Rb+1".

FIG. 154 is a diagram explaining Instruction "stp (SP, D14),Rb:Rb+1".

FIG. 155 is a diagram explaining Instruction "stp (SP, D7),Rb:Rb+1".

FIG. 156 is a diagram explaining Instruction "stp (SP), Rb:Rb+1".

FIG. 157 is a diagram explaining Instruction "stp (Ra+) I11,Rb:Rb+1".

FIG. 158 is a diagram explaining Instruction "stp (Ra+), Rb:Rb+1".

FIG. 159 is a diagram explaining Instruction "stp (Ra2+), Rb2:Rb2+1".

FIG. 160 is a diagram explaining Instruction "stp (Ra), Rb:Rb+1".

FIG. 161 is a diagram explaining Instruction "stp (Ra, D11),LR:SVR".

FIG. 162 is a diagram explaining Instruction "stp (Ra), LR:SVR".

FIG. 163 is a diagram explaining Instruction "stp (GP, D14),LR:SVR".

FIG. 164 is a diagram explaining Instruction "stp (SP, D14),LR:SVR".

FIG. 165 is a diagram explaining Instruction "stp (SP, D7),LR:SVR".

FIG. 166 is a diagram explaining Instruction "stp (SP), LR:SVR".

FIG. 167 is a diagram explaining Instruction "stp (Ra, D11),TAR:UDR".

FIG. 168 is a diagram explaining Instruction "stp (GP, D14),TAR:UDR".

FIG. 169 is a diagram explaining Instruction "stp (SP, D14),TAR:UDR".

FIG. 170 is a diagram explaining Instruction "sthp (Ra, D10),Rb:Rb+1".

FIG. 171 is a diagram explaining Instruction "sthp (Ra+) I10,Rb:Rb+1".

FIG. 172 is a diagram explaining Instruction "sthp (Ra+), Rb:Rb+1".

FIG. 173 is a diagram explaining Instruction "sthp (Ra2+),Rb2:Rb2+1".

FIG. 174 is a diagram explaining Instruction "sthp (Ra), Rb:Rb+1".

FIG. 175 is a diagram explaining Instruction "stbp (Ra, D9),Rb:Rb+1".

FIG. 176 is a diagram explaining Instruction "stbp (Ra+) I9,Rb:Rb+1".

FIG. 177 is a diagram explaining Instruction "stbp (Ra+), Rb:Rb+1".

FIG. 178 is a diagram explaining Instruction "stbp (Ra), Rb:Rb+1".

FIG. 179 is a diagram explaining Instruction "stbh (Ra+) I7,Rb".

FIG. 180 is a diagram explaining Instruction "stbh (Ra+), Rb".

FIG. 181 is a diagram explaining Instruction "stbh (Ra), Rb".

FIG. 182 is a diagram explaining Instruction "stbhp (Ra+)I7,Rb:Rb+1".

FIG. 183 is a diagram explaining Instruction "stbhp (Ra+),Rb:Rb+1".

FIG. 184 is a diagram explaining Instruction "stbhp (Ra),Rb:Rb+1".

FIG. 185 is a diagram explaining Instruction "dpref (Ra,D8)".

FIG. 186 is a diagram explaining Instruction "ldstb Rb, (Ra)".

FIG. 187 is a diagram explaining Instruction "rd C0:C1, Rb,(D11)".

FIG. 188 is a diagram explaining Instruction "rd C0:C1, Rb,(Ra,D5)".

FIG. 189 is a diagram explaining Instruction "rd C0:C1, Rb,(Ra)".

FIG. 190 is a diagram explaining Instruction "rd C0:C1, Rb2,(Ra2)".

FIG. 191 is a diagram explaining Instruction "rd C2:C3, Rb,(Ra,D5)".

FIG. 192 is a diagram explaining Instruction "rd C2:C3, Rb,(Ra)".

FIG. 193 is a diagram explaining Instruction "rde C0:C1, Rb,(Ra,D5)".

FIG. 194 is a diagram explaining Instruction "rde C0:C1, Rb,(Ra)".

FIG. 195 is a diagram explaining Instruction "rde C2:C3, Rb,(Ra,D5)".

FIG. 196 is a diagram explaining Instruction "rde C2:C3, Rb,(Ra)".

FIG. 197 is a diagram explaining Instruction "wt C0:C1, (D11),Rb".

FIG. 198 is a diagram explaining Instruction "wt C0:C1, (Ra,D5),Rb".

FIG. 199 is a diagram explaining Instruction "wt C0:C1, (Ra),Rb".

FIG. 200 is a diagram explaining Instruction "wt C0:C1, (Ra2),Rb2".

FIG. 201 is a diagram explaining Instruction "wt C2:C3, (Ra,D5),Rb".

FIG. 202 is a diagram explaining Instruction "wt C2:C3,(Ra),Rb".

FIG. 203 is a diagram explaining Instruction "wte C0:C1,(Ra,D5),Rb".

FIG. 204 is a diagram explaining Instruction "wte C0:C1,(Ra),Rb".

FIG. 205 is a diagram explaining Instruction "wte C2:C3,(Ra,D5),Rb".

FIG. 206 is a diagram explaining Instruction "wte C2:C3,(Ra),Rb".

FIG. 207 is a diagram explaining Instruction "br D20".

FIG. 208 is a diagram explaining Instruction "br D9".

FIG. 209 is a diagram explaining Instruction "brl D20".

FIG. 210 is a diagram explaining Instruction "call D20".

FIG. 211 is a diagram explaining Instruction "brl D9".

FIG. 212 is a diagram explaining Instruction "call D9".

FIG. 213 is a diagram explaining Instruction "jmp LR".

FIG. 214 is a diagram explaining Instruction "jmp TAR".

FIG. 215 is a diagram explaining Instruction "jmpl LR".

FIG. 216 is a diagram explaining Instruction "call LR".

FIG. 217 is a diagram explaining Instruction "jmpl TAR".

FIG. 218 is a diagram explaining Instruction "call TAR".

FIG. 219 is a diagram explaining Instruction "jmpr LR".

FIG. 220 is a diagram explaining Instruction "ret".

FIG. 221 is a diagram explaining Instruction "jmpf LR".

FIG. 222 is a diagram explaining Instruction "jmpf C6,C2:C4,TAR".

FIG. 223 is a diagram explaining Instruction "jmpf Cm,TAR".

FIG. 224 is a diagram explaining Instruction "jmpf TAR".

FIG. 225 is a diagram explaining Instruction "jloop C6,TAR,Ra,I8".

FIG. 226 is a diagram explaining Instruction "jloop C6,TAR,Ra".

FIG. 227 is a diagram explaining Instruction "jloop C6,TAR, Ra2".

FIG. 228 is a diagram explaining Instruction "jloop C6,TAR,Ra2,−1".

FIG. 229 is a diagram explaining Instruction "jloop C6,Cm,TAR,Ra,I8".

FIG. 230 is a diagram explaining Instruction "jloop C6,Cm,TAR,Ra".

FIG. 231 is a diagram explaining Instruction "jloop C6,Cm,TAR,Ra2".

FIG. 232 is a diagram explaining Instruction "jloop C6,Cm,TAR,Ra2,−1".

FIG. 233 is a diagram explaining Instruction "jloop C6,C2:C4,TAR,Ra,I8".

FIG. 234 is a diagram explaining Instruction "jloop C6,C2:C4,TAR,Ra".

FIG. 235 is a diagram explaining Instruction "jloop C6,C2:C4,TAR,Ra2".

FIG. 236 is a diagram explaining Instruction "jloop C6,C2:C4,TAR,Ra2,−1".

FIG. 237 is a diagram explaining Instruction "jloop C5,LR,Ra,I8".

FIG. 238 is a diagram explaining Instruction "jloop C5,LR,Ra".

FIG. 239 is a diagram explaining Instruction "settar D9".

FIG. 240 is a diagram explaining Instruction "settar C6,Cm,D9".

FIG. 241 is a diagram explaining Instruction "settar C6,D9".

FIG. 242 is a diagram explaining Instruction "settar C6,C2:C4,D9".

FIG. 243 is a diagram explaining Instruction "settar C6,C4,D9".

FIG. 244 is a diagram explaining Instruction "setlr D9".

FIG. 245 is a diagram explaining Instruction "setlr C5,D9".

FIG. 246 is a diagram explaining Instruction "setbb TAR".

FIG. 247 is a diagram explaining Instruction "setbb LR".

FIG. 248 is a diagram explaining Instruction "intd".

FIG. 249 is a diagram explaining Instruction "inte".

FIG. 250 is a diagram explaining Instruction "vmpswd".

FIG. 251 is a diagram explaining Instruction "vmpswe".

FIG. 252 is a diagram explaining Instruction "vmpsleep".

FIG. 253 is a diagram explaining Instruction "vmpwait".

FIG. 254 is a diagram explaining Instruction "vmpsus".

FIG. 255 is a diagram explaining Instruction "rti".

FIG. 256 is a diagram explaining Instruction "piNl(pi0l,pi1l,pi2l,pi3l,pi4l,pi5l,pi6l,pi7l)".

FIG. 257 is a diagram explaining Instruction "piN(pi0,pi1,pi2,pi3,pi4,pi5,pi6,pi7)".

FIG. 258 is a diagram explaining Instruction "scN(sc0,sc1,sc2,sc3,sc4,sc5,sc6,sc7)".

FIG. 259 is a diagram explaining Instruction "add Rc,Ra,Rb".

FIG. 260 is a diagram explaining Instruction "add Rc3,Ra3,Rb3".

FIG. 261 is a diagram explaining Instruction "add Ra2,Rb2".

FIG. 262 is a diagram explaining Instruction "add Rb,Ra,I12".

FIG. 263 is a diagram explaining Instruction "add Ra2,I5".

FIG. 264 is a diagram explaining Instruction "add SP,I19".

FIG. 265 is a diagram explaining Instruction "add SP,I11".

FIG. 266 is a diagram explaining Instruction "addu Rb,GP,I13".

FIG. 267 is a diagram explaining Instruction "addu Rb,SP,I13".

FIG. 268 is a diagram explaining Instruction "addu Ra3,SP,I6".

FIG. 269 is a diagram explaining Instruction "addvw Rc,Ra,Rb".

FIG. 270 is a diagram explaining Instruction "addvh Rc,Ra,Rb".

FIG. 271 is a diagram explaining Instruction "addc Rc,Ra,Rb".

FIG. 272 is a diagram explaining Instruction "adds Rc,Ra,Rb".

FIG. 273 is a diagram explaining Instruction "addsr Rc,Ra,Rb".

FIG. 274 is a diagram explaining Instruction "sladd Rc,Ra,Rb".

FIG. 275 is a diagram explaining Instruction "sladd Rc3,Ra3,Rb3".

FIG. 276 is a diagram explaining Instruction "s2add Rc,Ra,Rb".

FIG. 277 is a diagram explaining Instruction "s2add Rc3,Ra3,Rb3".

FIG. 278 is a diagram explaining Instruction "addmsk Rc,Ra,Rb".

FIG. 279 is a diagram explaining Instruction "addarvw Rc, Ra, Rb".

FIG. 280 is a diagram explaining Instruction "sub Rc,Rb,Ra".

FIG. 281 is a diagram explaining Instruction "sub Rc3,Rb3,Ra3".

FIG. 282 is a diagram explaining Instruction "sub Rb2, Ra2".

FIG. 283 is a diagram explaining Instruction "sub Rb,Ra, I12".

FIG. 284 is a diagram explaining Instruction "sub Ra2, I5".

FIG. 285 is a diagram explaining Instruction "sub SP,I19".

FIG. 286 is a diagram explaining Instruction "sub SP,I11".

FIG. 287 is a diagram explaining Instruction "subc Rc,Rb, Ra".

FIG. 288 is a diagram explaining Instruction "subvw Rc,Rb,Ra".

FIG. 289 is a diagram explaining Instruction "subvh Rc,Rb,Ra".

FIG. 290 is a diagram explaining Instruction "subs Rc,Rb, Ra".

FIG. 291 is a diagram explaining Instruction "submsk Rc,Rb,Ra".

FIG. 292 is a diagram explaining Instruction "rsub Rb,Ra, I8".

FIG. 293 is a diagram explaining Instruction "rsub Ra2, I4".

FIG. 294 is a diagram explaining Instruction "rsub Ra2, Rb2".

FIG. 295 is a diagram explaining Instruction "neg Rb,Ra".

FIG. 296 is a diagram explaining Instruction "neg Ra2".

FIG. 297 is a diagram explaining Instruction "negvh Rb,Ra".

FIG. 298 is a diagram explaining Instruction "negvw Rb,Ra".

FIG. 299 is a diagram explaining Instruction "abs Rb,Ra".

FIG. 300 is a diagram explaining Instruction "absvw Rb,Ra".

FIG. 301 is a diagram explaining Instruction "absvh Rb,Ra".

FIG. 302 is a diagram explaining Instruction "max Rc,Ra, Rb".

FIG. 303 is a diagram explaining Instruction "min Rc,Ra, Rb".

FIG. 304 is a diagram explaining Instruction "and Rc,Ra, Rb".

FIG. 305 is a diagram explaining Instruction "and Ra2, Rb2".

FIG. 306 is a diagram explaining Instruction "and Rb,Ra, I8".

FIG. 307 is a diagram explaining Instruction "andn Rc,Ra,Rb".

FIG. 308 is a diagram explaining Instruction "andn Ra2, Rb2".

FIG. 309 is a diagram explaining Instruction "andn Rb,Ra,I8".

FIG. 310 is a diagram explaining Instruction "or Rc,Ra, Rb".

FIG. 311 is a diagram explaining Instruction "or Ra2, Rb2".

FIG. 312 is a diagram explaining Instruction "or Rb,Ra, I8".

FIG. 313 is a diagram explaining Instruction "xor Rc,Ra, Rb".

FIG. 314 is a diagram explaining Instruction "xor Ra2, Rb2".

FIG. 315 is a diagram explaining Instruction "xor Rb,Ra, I8".

FIG. 316 is a diagram explaining Instruction "not Rb,Ra".

FIG. 317 is a diagram explaining Instruction "not Ra2".

FIG. 318 is a diagram explaining Instruction "cmpCC Cm,Ra,Rb".

FIG. 319 is a diagram explaining Instruction "cmpCC C6,Ra2,Rb2".

FIG. 320 is a diagram explaining Instruction "cmpCC".

FIG. 321 is a diagram explaining Instruction "cmpCC C6,Ra2,I4".

FIG. 322 is a diagram explaining Instruction "cmpCC".

FIG. 323 is a diagram explaining Instruction "cmpCC".

FIG. 324 is a diagram explaining Instruction "cmpCCn Cm,Ra,Rb,Cn".

FIG. 325 is a diagram explaining Instruction "cmpCCn Cm,Ra,I5,Cn".

FIG. 326 is a diagram explaining Instruction "cmpCCn Cm:Cm+1,Ra,Rb,Cn".

FIG. 327 is a diagram explaining Instruction "cmpCCn Cm:Cm+1,Ra,I5,Cn".

FIG. 328 is a diagram explaining Instruction "cmpCCa Cm:Cm+1,Ra,Rb,Cn".

FIG. 329 is a diagram explaining Instruction "cmpCCa Cm:Cm+1,Ra,I5,Cn".

FIG. 330 is a diagram explaining Instruction "cmpCCo Cm:Cm+1,Ra,Rb,Cn".

FIG. 331 is a diagram explaining Instruction "cmpCCo Cm:Cm+1,Ra,I5,Cn".

FIG. 332 is a diagram explaining Instruction "tstz Cm,Ra, Rb".

FIG. 333 is a diagram explaining Instruction "tstz C6,Ra2,Rb2".

FIG. 334 is a diagram explaining Instruction "tstz Cm,Ra, I5".

FIG. 335 is a diagram explaining Instruction "tstz C6,Ra2,I4".

FIG. 336 is a diagram explaining Instruction "tstz Cm:Cm+1,Ra,Rb".

FIG. 337 is a diagram explaining Instruction "tstz Cm:Cm+1,Ra,I5".

FIG. 338 is a diagram explaining Instruction "tstzn Cm,Ra,Rb,Cn".

FIG. 339 is a diagram explaining Instruction "tstzn Cm,Ra,I5,Cn".

FIG. 340 is a diagram explaining Instruction "tstzn Cm:Cm+1,Ra,Rb,Cn".

FIG. 341 is a diagram explaining Instruction "tstzn Cm:Cm+1,Ra,I5,Cn".

FIG. 342 is a diagram explaining Instruction "tstza Cm:Cm+1,Ra,Rb,Cn".

FIG. 343 is a diagram explaining Instruction "tstza Cm:Cm+1,Ra,I5,Cn".

FIG. 344 is a diagram explaining Instruction "tstzo Cm:Cm+1,Ra,Rb,Cn".

FIG. 345 is a diagram explaining Instruction "tstzo Cm:Cm+1,Ra,I5,Cn".

FIG. 346 is a diagram explaining Instruction "tstn Cm,Ra, Rb".

FIG. 347 is a diagram explaining Instruction "tstn C6,Ra2,Rb2".

FIG. 348 is a diagram explaining Instruction "tstn Cm,Ra, I5".

FIG. 349 is a diagram explaining Instruction "tstn C6,Ra2,I4".

FIG. 350 is a diagram explaining Instruction "tstn Cm:Cm+1,Ra,Rb".

FIG. 351 is a diagram explaining Instruction "tstn Cm:Cm+1,Ra,I5".

FIG. 352 is a diagram explaining Instruction "tstnn Cm,Ra,Rb,Cn".

FIG. 353 is a diagram explaining Instruction "tstnn Cm,Ra,I5,Cn".

FIG. 354 is a diagram explaining Instruction "tstnn Cm:Cm+1,Ra,Rb,Cn".

FIG. 355 is a diagram explaining Instruction "tstnn Cm:Cm+1,Ra,I5,Cn".

FIG. 356 is a diagram explaining Instruction "tstna Cm:Cm+1,Ra,Rb,Cn".

FIG. 357 is a diagram explaining Instruction "tstna Cm:Cm+1,Ra,I5,Cn".

FIG. 358 is a diagram explaining Instruction "tstno Cm:Cm+1,Ra,Rb,Cn".

FIG. 359 is a diagram explaining Instruction "tstno Cm:Cm+1,Ra,I5,Cn".

FIG. 360 is a diagram explaining Instruction "mov Rb,Ra".

FIG. 361 is a diagram explaining Instruction "mov Ra2, Rb".

FIG. 362 is a diagram explaining Instruction "mov Ra,I16".

FIG. 363 is a diagram explaining Instruction "mov Ra2, I8".

FIG. 364 is a diagram explaining Instruction "mov Rb,TAR".

FIG. 365 is a diagram explaining Instruction "mov Rb2, TAR".

FIG. 366 is a diagram explaining Instruction "mov Rb,LR".

FIG. 367 is a diagram explaining Instruction "mov Rb2, LR".

FIG. 368 is a diagram explaining Instruction "mov Rb,SVR".

FIG. 369 is a diagram explaining Instruction "mov Rb,PSR".

FIG. 370 is a diagram explaining Instruction "mov Rb,CFR".

FIG. 371 is a diagram explaining Instruction "mov Rb,MH0".

FIG. 372 is a diagram explaining Instruction "mov Rb2, MH0".

FIG. 373 is a diagram explaining Instruction "mov Rb,MH1".

FIG. 374 is a diagram explaining Instruction "mov Rb2, MH1".

FIG. 375 is a diagram explaining Instruction "mov Rb,ML0".

FIG. 376 is a diagram explaining Instruction "mov Rb,ML1".

FIG. 377 is a diagram explaining Instruction "mov Rb,IPC".

FIG. 378 is a diagram explaining Instruction "mov Rb,I-PSR".

FIG. 379 is a diagram explaining Instruction "mov Rb,PC".

FIG. 380 is a diagram explaining Instruction "mov Rb,EPC".

FIG. 381 is a diagram explaining Instruction "mov Rb,EPSR".

FIG. 382 is a diagram explaining Instruction "mov Rb,PSR0".

FIG. 383 is a diagram explaining Instruction "mov Rb,PSR1".

FIG. 384 is a diagram explaining Instruction "mov Rb,PSR2".

FIG. 385 is a diagram explaining Instruction "mov Rb,PSR3".

FIG. 386 is a diagram explaining Instruction "mov Rb,CFR0".

FIG. 387 is a diagram explaining Instruction "mov Rb,CFR1".

FIG. 388 is a diagram explaining Instruction "mov Rb,CFR2".

FIG. 389 is a diagram explaining Instruction "mov Rb,CFR3".

FIG. 390 is a diagram explaining Instruction "mov LR,Rb".

FIG. 391 is a diagram explaining Instruction "mov LR,Rb2".

FIG. 392 is a diagram explaining Instruction "mov TAR, Rb".

FIG. 393 is a diagram explaining Instruction "mov TAR, Rb2".

FIG. 394 is a diagram explaining Instruction "mov SVR, Rb".

FIG. 395 is a diagram explaining Instruction "mov PSR, Rb".

FIG. 396 is a diagram explaining Instruction "mov CFR, Rb".

FIG. 397 is a diagram explaining Instruction "mov MH0, Rb".

FIG. 398 is a diagram explaining Instruction "mov MH0, Rb2".

FIG. 399 is a diagram explaining Instruction "mov MH1, Rb".

FIG. 400 is a diagram explaining Instruction "mov MH1, Rb2".

FIG. 401 is a diagram explaining Instruction "mov ML0, Rb".

FIG. 402 is a diagram explaining Instruction "mov ML1, Rb".

FIG. 403 is a diagram explaining Instruction "mov IPC, Rb".

FIG. 404 is a diagram explaining Instruction "mov IPSR, Rb".

FIG. 405 is a diagram explaining Instruction "mov EPC, Rb".

FIG. 406 is a diagram explaining Instruction "mov EPSR, Rb".

FIG. 407 is a diagram explaining Instruction "mov PSR0, Rb".

FIG. 408 is a diagram explaining Instruction "mov PSR1, Rb".

FIG. 409 is a diagram explaining Instruction "mov PSR2, Rb".

FIG. 410 is a diagram explaining Instruction "mov PSR3, Rb".

FIG. 411 is a diagram explaining Instruction "mov CFR0, Rb".

FIG. 412 is a diagram explaining Instruction "mov CFR1, Rb".

FIG. 413 is a diagram explaining Instruction "mov CFR2, Rb".

FIG. 414 is a diagram explaining Instruction "mov CFR3, Rb".

FIG. 415 is a diagram explaining Instruction "mvclovs Cm:Cm+1".

FIG. 416 is a diagram explaining Instruction "movcf Ci,Cj,Cm,Cn".

FIG. 417 is a diagram explaining Instruction "mvclcas Cm:Cm+1".

FIG. 418 is a diagram explaining Instruction "sethi Ra,I16".

FIG. 419 is a diagram explaining Instruction “setlo Ra,I16”.

FIG. 420 is a diagram explaining Instruction “vcchk”.

FIG. 421 is a diagram explaining Instruction “nop”.

FIG. 422 is a diagram explaining Instruction “asl Rc,Ra,Rb”.

FIG. 423 is a diagram explaining Instruction “asl Rb,Ra,I5”.

FIG. 424 is a diagram explaining Instruction “asl Ra2,I4”.

FIG. 425 is a diagram explaining Instruction “aslvw Rc,Ra,Rb”.

FIG. 426 is a diagram explaining Instruction “aslvw Rb,Ra,I5”.

FIG. 427 is a diagram explaining Instruction “aslvh Rc,Ra,Rb”.

FIG. 428 is a diagram explaining Instruction “aslvh Rb,Ra,I5”.

FIG. 429 is a diagram explaining Instruction “asr Rc,Ra,Rb”.

FIG. 430 is a diagram explaining Instruction “asr Rb,Ra,I5”.

FIG. 431 is a diagram explaining Instruction “asr Ra2,I4”.

FIG. 432 is a diagram explaining Instruction “asrvw Rc,Ra,Rb”.

FIG. 433 is a diagram explaining Instruction “asrvh Rc,Ra,Rb”.

FIG. 434 is a diagram explaining Instruction “lsl Rc,Ra,Rb”.

FIG. 435 is a diagram explaining Instruction “lsl Rc,Ra,I5”.

FIG. 436 is a diagram explaining Instruction “lsl Ra2,I4”.

FIG. 437 is a diagram explaining Instruction “lsr Rc,Ra,Rb”.

FIG. 438 is a diagram explaining Instruction “lsr Rb,Ra,I5”.

FIG. 439 is a diagram explaining Instruction “rol Rc,Ra,Rb”.

FIG. 440 is a diagram explaining Instruction “rol Rb,Ra,I5”.

FIG. 441 is a diagram explaining Instruction “ror Rb,Ra,I5”.

FIG. 442 is a diagram explaining Instruction “aslp Mm,Ra,Mn,Rb”.

FIG. 443 is a diagram explaining Instruction “aslp Mm,Rb,Mn,I6”.

FIG. 444 is a diagram explaining Instruction “aslp Mm,Rc,MHn,Ra,Rb”.

FIG. 445 is a diagram explaining Instruction “aslp Mm,Rb,MHn,Ra,I6”.

FIG. 446 is a diagram explaining Instruction “aslpvw Mm,Ra,Mn,Rb”.

FIG. 447 is a diagram explaining Instruction “aslpvw Mm,Rb,Mn,I6”.

FIG. 448 is a diagram explaining Instruction “asrp Mm,Ra,Mn,Rb”.

FIG. 449 is a diagram explaining Instruction “asrp Mm,Rb,Mn,I6”.

FIG. 450 is a diagram explaining Instruction “asrp Mm,Rc,MHn,Ra,Rb”.

FIG. 451 is a diagram explaining Instruction “asrp Mm,Rb,MHn,Ra,I6”.

FIG. 452 is a diagram explaining Instruction “asrpvw Mm,Ra,Mn,Rb”.

FIG. 453 is a diagram explaining Instruction “lslp Mm,Ra,Mn,Rb”.

FIG. 454 is a diagram explaining Instruction “lslp Mm,Rb,Mn,I6”.

FIG. 455 is a diagram explaining Instruction “lslp Mm,Rc,MHn,Ra,Rb”.

FIG. 456 is a diagram explaining Instruction “lslp Mm,Rb,MHn,Ra,I6”.

FIG. 457 is a diagram explaining Instruction “lsrp Mm,Ra,Mn,Rb”.

FIG. 458 is a diagram explaining Instruction “lsrp Mm,Rb,Mn,I6”.

FIG. 459 is a diagram explaining Instruction “lsrp Mm,Rc,MHn,Ra,Rb”.

FIG. 460 is a diagram explaining Instruction “lsrp Mm,Rb,MHn,Ra,I6”.

FIG. 461 is a diagram explaining Instruction “extr Rc,Ra,Rb”.

FIG. 462 is a diagram explaining Instruction “extr Rb,Ra,Ib5,Ia5”.

FIG. 463 is a diagram explaining Instruction “ext Rb,Ra,I5”.

FIG. 464 is a diagram explaining Instruction “exth Ra2”.

FIG. 465 is a diagram explaining Instruction “extb Ra2”.

FIG. 466 is a diagram explaining Instruction “extru Rc,Ra,Rb”.

FIG. 467 is a diagram explaining Instruction “extru Rb,Ra,Ib5,Ia5”.

FIG. 468 is a diagram explaining Instruction “extu Rb,Ra,I5”.

FIG. 469 is a diagram explaining Instruction “exthu Ra2”.

FIG. 470 is a diagram explaining Instruction “extbu Ra2”.

FIG. 471 is a diagram explaining Instruction “mskgen Rc,Rb”.

FIG. 472 is a diagram explaining Instruction “mskgen Rb,Ib5,Ia5”.

FIG. 473 is a diagram explaining Instruction “msk Rc,Ra,Rb”.

FIG. 474 is a diagram explaining Instruction “msk Rb,Ra,Ib5,Ia5”.

FIG. 475 is a diagram explaining Instruction “satw Mm,Rb,Mn”.

FIG. 476 is a diagram explaining Instruction “sath Rb,Ra”.

FIG. 477 is a diagram explaining Instruction “sat12 Rb,Ra”.

FIG. 478 is a diagram explaining Instruction “sat9 Rb,Ra”.

FIG. 479 is a diagram explaining Instruction “satb Rb,Ra”.

FIG. 480 is a diagram explaining Instruction “satbu Rb,Ra”.

FIG. 481 is a diagram explaining Instruction “extw Mm,Rb,Ra”.

FIG. 482 is a diagram explaining Instruction “vintllh Rc,Ra,Rb”.

FIG. 483 is a diagram explaining Instruction “vintlhh Rc,Ra,Rb”.

FIG. 484 is a diagram explaining Instruction “vintllb Rc,Ra,Rb”.

FIG. 485 is a diagram explaining Instruction “vintlhb Rc,Ra,Rb”.

FIG. 486 is a diagram explaining Instruction “valn Rc,Ra,Rb”.

FIG. 487 is a diagram explaining Instruction “valn1 Rc,Ra,Rb”.

FIG. 488 is a diagram explaining Instruction “valn2 Rc,Ra,Rb”.

FIG. 489 is a diagram explaining Instruction “valn3 Rc,Ra,Rb”.

FIG. 490 is a diagram explaining Instruction “valnvc1 Rc,Ra,Rb”.

FIG. 491 is a diagram explaining Instruction “valnvc2 Rc,Ra,Rb”.

FIG. 492 is a diagram explaining Instruction “valnvc3 Rc,Ra,Rb”.

FIG. 493 is a diagram explaining Instruction “valnvc4 Rc,Ra,Rb”.

FIG. 494 is a diagram explaining Instruction “vxchngh Rb,Ra”.

FIG. 495 is a diagram explaining Instruction “byterev Rb,Ra”.

FIG. 496 is a diagram explaining Instruction “vstovb Rb,Ra”.

FIG. 497 is a diagram explaining Instruction “vstovh Rb,Ra”.

FIG. 498 is a diagram explaining Instruction “vlunpkh Rb:Rb+1,Ra”.

FIG. 499 is a diagram explaining Instruction “vlunpkhu Rb:Rb+1,Ra”.

FIG. 500 is a diagram explaining Instruction “vlunpkb Rb:Rb+1,Ra”.

FIG. 501 is a diagram explaining Instruction “vlunpkbu Rb:Rb+1,Ra”.

FIG. 502 is a diagram explaining Instruction “vhunpkh Rb:Rb+1,Ra”.

FIG. 503 is a diagram explaining Instruction “vhunpkb Rb:Rb+1,Ra”.

FIG. 504 is a diagram explaining Instruction “vunpk1 Rb,Mn”.

FIG. 505 is a diagram explaining Instruction “vunpk2 Rb,Mn”.

FIG. 506 is a diagram explaining Instruction “vlpkh Rc,Rb,Ra”.

FIG. 507 is a diagram explaining Instruction “vlpkhu Rc,Rb,Ra”.

FIG. 508 is a diagram explaining Instruction “vlpkb Rc,Rb,Ra”.

FIG. 509 is a diagram explaining Instruction “vlpkbu Rc,Rb,Ra”.

FIG. 510 is a diagram explaining Instruction “vhpkh Rc,Ra,Rb”.

FIG. 511 is a diagram explaining Instruction “vhpkb Rc,Ra,Rb”.

FIG. 512 is a diagram explaining Instruction “vexth Mm,Rb,Ra”.

FIG. 513 is a diagram explaining Instruction “bseq0 Rb,Ra”.

FIG. 514 is a diagram explaining Instruction “bseq1 Rb,Ra”.

FIG. 515 is a diagram explaining Instruction “bseq Rb,Ra”.

FIG. 516 is a diagram explaining Instruction “bcnt1 Rb,Ra”.

FIG. 517 is a diagram explaining Instruction “rndvh Rb,Ra”.

FIG. 518 is a diagram explaining Instruction “mskbrvb Rc,Ra,Rb”.

FIG. 519 is a diagram explaining Instruction “mskbrvh Rc,Ra,Rb”.

FIG. 520 is a diagram explaining Instruction “movp Rc:Rc+1,Ra,Rb”.

FIG. 521 is a diagram explaining Instruction “hmul Mm,Rc,Ra,Rb”.

FIG. 522 is a diagram explaining Instruction “lmul Mm,Rc,Ra,Rb”.

FIG. 523 is a diagram explaining Instruction “fmulhh Mm,Rc,Ra,Rb”.

FIG. 524 is a diagram explaining Instruction “fmulhhr Mm,Rc,Ra,Rb”.

FIG. 525 is a diagram explaining Instruction “fmulhw Mm,Rc,Ra,Rb”.

FIG. 526 is a diagram explaining Instruction “fmulhww Mm,Rc,Ra,Rb”.

FIG. 527 is a diagram explaining Instruction “mul Mm,Rc,Ra,Rb”.

FIG. 528 is a diagram explaining Instruction “mul Mm,Rb,Ra,I8”.

FIG. 529 is a diagram explaining Instruction “mulu Mm,Rc,Ra,Rb”.

FIG. 530 is a diagram explaining Instruction “mulu Mm,Rb,Ra,I8”.

FIG. 531 is a diagram explaining Instruction “fmulww Mm,Rc,Ra,Rb”.

FIG. 532 is a diagram explaining Instruction “hmac Mm,Rc,Ra,Rb,Mn”.

FIG. 533 is a diagram explaining Instruction “hmac M0,Rc,Ra,Rb,Rx”.

FIG. 534 is a diagram explaining Instruction “lmac Mm,Rc,Ra,Rb,Mn”.

FIG. 535 is a diagram explaining Instruction “lmac M0,Rc,Ra,Rb,Rx”.

FIG. 536 is a diagram explaining Instruction “fmachh Mm,Rc,Ra,Rb,Mn”.

FIG. 537 is a diagram explaining Instruction “fmachh M0,Rc,Ra,Rb,Rx”.

FIG. 538 is a diagram explaining Instruction “fmachhr Mm,Rc,Ra,Rb,Mn”.

FIG. 539 is a diagram explaining Instruction “fmachhr M0,Rc,Ra,Rb,Rx”.

FIG. 540 is a diagram explaining Instruction “fmachw Mm,Rc,Ra,Rb,Mn”.

FIG. 541 is a diagram explaining Instruction “fmachw M0,Rc,Ra,Rb,Rx”.

FIG. 542 is a diagram explaining Instruction “fmachww Mm,Rc,Ra,Rb,Mn”.

FIG. 543 is a diagram explaining Instruction “fmachww M0,Rc,Ra,Rb,Rx”.

FIG. 544 is a diagram explaining Instruction “mac Mm,Rc,Ra,Rb,Mn”.

FIG. 545 is a diagram explaining Instruction “mac M0,Rc,Ra,Rb,Rx”.

FIG. 546 is a diagram explaining Instruction “fmacww Mm,Rc,Ra,Rb,Mn”.

FIG. 547 is a diagram explaining Instruction “fmacww M0,Rc,Ra,Rb,Rx”.

FIG. 548 is a diagram explaining Instruction “hmsu Mm,Rc,Ra,Rb,Mn”.

FIG. 549 is a diagram explaining Instruction “hmsu M0,Rc,Ra,Rb,Rx”.

FIG. 550 is a diagram explaining Instruction “lmsu Mm,Rc,Ra,Rb,Mn”.

FIG. 551 is a diagram explaining Instruction “lmsu M0,Rc,Ra,Rb,Rx”.

FIG. 552 is a diagram explaining Instruction “fmsuhh Mm,Rc,Ra,Rb,Mn”.

FIG. 553 is a diagram explaining Instruction “fmsuhh M0,Rc,Ra,Rb,Rx”.

FIG. 554 is a diagram explaining Instruction “fmsuhhr Mm,Rc,Ra,Rb,Mn”.

FIG. 555 is a diagram explaining Instruction “fmsuhhr M0,Rc,Ra,Rb,Rx”.

FIG. 556 is a diagram explaining Instruction "fmsuhw Mm,Rc,Ra,Rb,Mn".

FIG. 557 is a diagram explaining Instruction "fmsuhw M0,Rc,Ra,Rb,Rx".

FIG. 558 is a diagram explaining Instruction "fmsuhww Mm,Rc,Ra,Rb,Mn".

FIG. 559 is a diagram explaining Instruction "fmsuhww M0,Rc,Ra,Rb,Rx".

FIG. 560 is a diagram explaining Instruction "msu Mm,Rc,Ra,Rb,Mn".

FIG. 561 is a diagram explaining Instruction "msu M0,Rc,Ra,Rb,Rx".

FIG. 562 is a diagram explaining Instruction "fmsuww Mm,Rc,Ra,Rb,Mn".

FIG. 563 is a diagram explaining Instruction "fmsuww M0,Rc,Ra,Rb,Rx".

FIG. 564 is a diagram explaining Instruction "div MHm, Rc,MHn,Ra,Rb".

FIG. 565 is a diagram explaining Instruction "divu MHm, Rc,MHn,Ra,Rb".

FIG. 566 is a diagram explaining Instruction "dbgm0".

FIG. 567 is a diagram explaining Instruction "dbgm1".

FIG. 568 is a diagram explaining Instruction "dbgm2 I15".

FIG. 569 is a diagram explaining Instruction "dbgm3 I15".

FIG. 570 is a diagram explaining Instruction "vaddh Rc,Ra,Rb".

FIG. 571 is a diagram explaining Instruction "vxaddh Rc,Ra,Rb".

FIG. 572 is a diagram explaining Instruction "vhaddh Rc,Ra,Rb".

FIG. 573 is a diagram explaining Instruction "vladdh Rc,Ra,Rb".

FIG. 574 is a diagram explaining Instruction "vaddhvh Rc,Ra,Rb".

FIG. 575 is a diagram explaining Instruction "vxaddhvh Rc,Ra,Rb".

FIG. 576 is a diagram explaining Instruction "vhaddhvh Rc,Ra,Rb".

FIG. 577 is a diagram explaining Instruction "vladdhvh Rc,Ra,Rb".

FIG. 578 is a diagram explaining Instruction "vsaddh Rb,Ra,I8".

FIG. 579 is a diagram explaining Instruction "vaddsh Rc,Ra,Rb".

FIG. 580 is a diagram explaining Instruction "vaddsrh Rc,Ra,Rb".

FIG. 581 is a diagram explaining Instruction "vaddhvc Rc,Ra,Rb".

FIG. 582 is a diagram explaining Instruction "vaddrhvc Rc,Ra,Rb".

FIG. 583 is a diagram explaining Instruction "vaddb Rc,Ra,Rb".

FIG. 584 is a diagram explaining Instruction "vsaddb Rb,Ra,I8".

FIG. 585 is a diagram explaining Instruction "vaddsb Rc,Ra,Rb".

FIG. 586 is a diagram explaining Instruction "vaddsrb Rc,Ra,Rb".

FIG. 587 is a diagram explaining Instruction "vsubh Rc,Rb,Ra".

FIG. 588 is a diagram explaining Instruction "vxsubh Rc,Rb,Ra".

FIG. 589 is a diagram explaining Instruction "vhsubh Rc,Rb,Ra".

FIG. 590 is a diagram explaining Instruction "vlsubh Rc,Rb,Ra".

FIG. 591 is a diagram explaining Instruction "vsubhvh Rc,Rb,Ra".

FIG. 592 is a diagram explaining Instruction "vxsubhvh Rc,Rb,Ra".

FIG. 593 is a diagram explaining Instruction "vhsubhvh Rc,Rb,Ra".

FIG. 594 is a diagram explaining Instruction "vlsubhvh Rc,Rb,Ra".

FIG. 595 is a diagram explaining Instruction "vssubh Rb,Ra,I8".

FIG. 596 is a diagram explaining Instruction "vsubb Rc,Rb,Ra".

FIG. 597 is a diagram explaining Instruction "vssubb Rb,Ra,I8".

FIG. 598 is a diagram explaining Instruction "vsubsh Rc,Rb,Ra".

FIG. 599 is a diagram explaining Instruction "vsrsubh Rb,Ra,I8".

FIG. 600 is a diagram explaining Instruction "vsrsubb Rb,Ra,I8".

FIG. 601 is a diagram explaining Instruction "vsumh Rb,Ra".

FIG. 602 is a diagram explaining Instruction "vsumh2 Rb,Ra".

FIG. 603 is a diagram explaining Instruction "vsumrh2 Rb,Ra".

FIG. 604 is a diagram explaining Instruction "vnegh Rb,Ra".

FIG. 605 is a diagram explaining Instruction "vneghvh Rb,Ra".

FIG. 606 is a diagram explaining Instruction "vnegb Rb,Ra".

FIG. 607 is a diagram explaining Instruction "vabshvh Rb,Ra".

FIG. 608 is a diagram explaining Instruction "vasubb Rc,Rb,Ra".

FIG. 609 is a diagram explaining Instruction "vsgnh Rb,Ra".

FIG. 610 is a diagram explaining Instruction "vmaxh Rc,Ra,Rb".

FIG. 611 is a diagram explaining Instruction "vmaxb Rc,Ra,Rb".

FIG. 612 is a diagram explaining Instruction "vminh Rc,Ra,Rb".

FIG. 613 is a diagram explaining Instruction "vminb Rc,Ra,Rb".

FIG. 614 is a diagram explaining Instruction "vsel Rc,Ra, Rb".

FIG. 615 is a diagram explaining Instruction "vmovt Rb,Ra".

FIG. 616 is a diagram explaining Instruction "vscmpeqb Ra,I5".

FIG. 617 is a diagram explaining Instruction "vscmpneb Ra,I5".

FIG. 618 is a diagram explaining Instruction "vscmpgtb Ra,I5".

FIG. 619 is a diagram explaining Instruction "vscmpleb Ra,I5".

FIG. 620 is a diagram explaining Instruction "vscmpgeb Ra,I5".

FIG. 621 is a diagram explaining Instruction "vscmpltb Ra,I5".

FIG. 622 is a diagram explaining Instruction "vscmpeqh Ra,I5".

FIG. 623 is a diagram explaining Instruction "vscmpneh Ra,I5".

FIG. 624 is a diagram explaining Instruction "vscmpgth Ra,I5".

FIG. 625 is a diagram explaining Instruction "vscmpleh Ra,I5".

FIG. 626 is a diagram explaining Instruction "vscmpgeh Ra,I5".

FIG. 627 is a diagram explaining Instruction "vscmplth Ra,I5".

FIG. 628 is a diagram explaining Instruction "vcmpeqh Ra,Rb".

FIG. 629 is a diagram explaining Instruction "vcmpneh Ra,Rb".

FIG. 630 is a diagram explaining Instruction "vcmpgth Ra,Rb".

FIG. 631 is a diagram explaining Instruction "vcmpleh Ra,Rb".

FIG. 632 is a diagram explaining Instruction "vcmpgeh Ra,Rb".

FIG. 633 is a diagram explaining Instruction "vcmplth Ra,Rb".

FIG. 634 is a diagram explaining Instruction "vcmpeqb Ra,Rb".

FIG. 635 is a diagram explaining Instruction "vcmpneb Ra,Rb".

FIG. 636 is a diagram explaining Instruction "vcmpgtb Ra,Rb".

FIG. 637 is a diagram explaining Instruction "vcmpleb Ra,Rb".

FIG. 638 is a diagram explaining Instruction "vcmpgeb Ra,Rb".

FIG. 639 is a diagram explaining Instruction "vcmpltb Ra,Rb".

FIG. 640 is a diagram explaining Instruction "vaslh Rc,Ra,Rb".

FIG. 641 is a diagram explaining Instruction "vaslh Rb,Ra,I4".

FIG. 642 is a diagram explaining Instruction "vaslvh Rc,Ra,Rb".

FIG. 643 is a diagram explaining Instruction "vaslvh Rb,Ra,I4".

FIG. 644 is a diagram explaining Instruction "vasrh Rb,Ra,I4".

FIG. 645 is a diagram explaining Instruction "vasrvh Rc,Ra,Rb".

FIG. 646 is a diagram explaining Instruction "vlslh Rc,Ra,Rb".

FIG. 647 is a diagram explaining Instruction "vlslh Rb,Ra,I4".

FIG. 648 is a diagram explaining Instruction "vlsrh Rc,Ra,Rb".

FIG. 649 is a diagram explaining Instruction "vlsrh Rb,Ra,I4".

FIG. 650 is a diagram explaining Instruction "vrolh Rc,Ra,Rb".

FIG. 651 is a diagram explaining Instruction "vrolh Rb,Ra,I4".

FIG. 652 is a diagram explaining Instruction "vrorh Rb,Ra,I4".

FIG. 653 is a diagram explaining Instruction "vasrh Rc,Ra,Rb".

FIG. 654 is a diagram explaining Instruction "vaslb Rc,Ra,Rb".

FIG. 655 is a diagram explaining Instruction "vaslb Rb,Ra,I3".

FIG. 656 is a diagram explaining Instruction "vasrb Rc,Ra,Rb".

FIG. 657 is a diagram explaining Instruction "vasrb Rb,Ra,I3".

FIG. 658 is a diagram explaining Instruction "vlslb Rc,Ra,Rb".

FIG. 659 is a diagram explaining Instruction "vlslb Rb,Ra,I3".

FIG. 660 is a diagram explaining Instruction "vlsrb Rc,Ra,Rb".

FIG. 661 is a diagram explaining Instruction "vlsrb Rb,Ra,I3".

FIG. 662 is a diagram explaining Instruction "vrolb Rc,Ra,Rb".

FIG. 663 is a diagram explaining Instruction "vrolb Rb,Ra,I3".

FIG. 664 is a diagram explaining Instruction "vrorb Rb,Ra,I3".

FIG. 665 is a diagram explaining Instruction "vasl Mm,Ra,Mn,Rb".

FIG. 666 is a diagram explaining Instruction "vasl Mm,Rb,Mn,I5".

FIG. 667 is a diagram explaining Instruction "vaslvw Mm,Ra,Mn,Rb".

FIG. 668 is a diagram explaining Instruction "vaslvw Mm,Rb,Mn,I5".

FIG. 669 is a diagram explaining Instruction "vasr Mm,Ra,Mn,Rb".

FIG. 670 is a diagram explaining Instruction "vasr Mm,Rb,Mn,I5".

FIG. 671 is a diagram explaining Instruction "vasrvw Mm,Ra,Mn,Rb".

FIG. 672 is a diagram explaining Instruction "vlsl Mm,Ra,Mn,Rb".

FIG. 673 is a diagram explaining Instruction "vlsl Mm,Rb,Mn,I5".

FIG. 674 is a diagram explaining Instruction "vlsr Mm,Ra,Mn,Rb".

FIG. 675 is a diagram explaining Instruction "vlsr Mm,Rb,Mn,I5".

FIG. 676 is a diagram explaining Instruction "vsath Mm,Rb,Mn".

FIG. 677 is a diagram explaining Instruction "vsath12 Rb,Ra".

FIG. 678 is a diagram explaining Instruction "vsath9 Rb,Ra".

FIG. 679 is a diagram explaining Instruction "vsath8 Rb,Ra".

FIG. 680 is a diagram explaining Instruction "vsath8u Rb,Ra".

FIG. 681 is a diagram explaining Instruction "vrndvh Rb,Mn".

FIG. 682 is a diagram explaining Instruction "vabssumb Rc,Ra,Rb".

FIG. 683 is a diagram explaining Instruction "vmul Mm,Rc,Ra,Rb".

FIG. 684 is a diagram explaining Instruction "vxmul Mm,Rc,Ra,Rb".

FIG. 685 is a diagram explaining Instruction "vhmul Mm,Rc,Ra,Rb".

FIG. 686 is a diagram explaining Instruction "vlmul Mm,Rc,Ra,Rb".

FIG. 687 is a diagram explaining Instruction "vfmulh Mm,Rc,Ra,Rb".

FIG. 688 is a diagram explaining Instruction "vxfmulh Mm,Rc,Ra,Rb".

FIG. 689 is a diagram explaining Instruction "vhfmulh Mm,Rc,Ra,Rb".

FIG. 690 is a diagram explaining Instruction "vlfmulh Mm,Rc,Ra,Rb".

FIG. 691 is a diagram explaining Instruction "vfmulhr Mm,Rc,Ra,Rb".

FIG. 692 is a diagram explaining Instruction "vxfmulhr Mm,Rc,Ra,Rb".

FIG. 693 is a diagram explaining Instruction "vhfmulhr Mm,Rc,Ra,Rb".

FIG. 694 is a diagram explaining Instruction "vlfmulhr Mm,Rc,Ra,Rb".

FIG. 695 is a diagram explaining Instruction "vfmulw Mm,Rc,Ra,Rb".

FIG. 696 is a diagram explaining Instruction "vxfmulw Mm,Rc,Ra,Rb".

FIG. 697 is a diagram explaining Instruction "vhfmulw Mm,Rc,Ra,Rb".

FIG. 698 is a diagram explaining Instruction "vlfmulw Mm,Rc,Ra,Rb".

FIG. 699 is a diagram explaining Instruction "vpfmulhww Mm,Rc:Rc+1,Ra,Rb".

FIG. 700 is a diagram explaining Instruction "vmac Mm,Rc,Ra,Rb,Mn".

FIG. 701 is a diagram explaining Instruction "vmac M0,Rc,Ra,Rb,Rx".

FIG. 702 is a diagram explaining Instruction "vxmac Mm,Rc,Ra,Rb,Mn".

FIG. 703 is a diagram explaining Instruction "vxmac M0,Rc,Ra,Rb,Rx".

FIG. 704 is a diagram explaining Instruction "vhmac Mm,Rc,Ra,Rb,Mn".

FIG. 705 is a diagram explaining Instruction "vhmac M0,Rc,Ra,Rb,Rx".

FIG. 706 is a diagram explaining Instruction "vlmac Mm,Rc,Ra,Rb,Mn".

FIG. 707 is a diagram explaining Instruction "vlmac M0,Rc,Ra,Rb,Rx".

FIG. 708 is a diagram explaining Instruction "vfmach Mm,Rc,Ra,Rb,Mn".

FIG. 709 is a diagram explaining Instruction "vfmach M0,Rc,Ra,Rb,Rx".

FIG. 710 is a diagram explaining Instruction "vxfmach Mm,Rc,Ra,Rb,Mn".

FIG. 711 is a diagram explaining Instruction "vxfmach M0,Rc,Ra,Rb,Rx".

FIG. 712 is a diagram explaining Instruction "vhfmach Mm,Rc,Ra,Rb,Mn".

FIG. 713 is a diagram explaining Instruction "vhfmach M0,Rc,Ra,Rb,Rx".

FIG. 714 is a diagram explaining Instruction "vlfmach Mm,Rc,Ra,Rb,Mn".

FIG. 715 is a diagram explaining Instruction "vlfmach M0,Rc,Ra,Rb,Rx".

FIG. 716 is a diagram explaining Instruction "vfmachr Mm,Rc,Ra,Rb,Mn".

FIG. 717 is a diagram explaining Instruction "vfmachr M0,Rc,Ra,Rb,Rx".

FIG. 718 is a diagram explaining Instruction "vxfmachr Mm,Rc,Ra,Rb,Mn".

FIG. 719 is a diagram explaining Instruction "vxfmachr M0,Rc,Ra,Rb,Rx".

FIG. 720 is a diagram explaining Instruction "vhfmachr Mm,Rc,Ra,Rb,Mn".

FIG. 721 is a diagram explaining Instruction "vhfmachr M0,Rc,Ra,Rb,Rx".

FIG. 722 is a diagram explaining Instruction "vlfmachr Mm,Rc,Ra,Rb,Mn".

FIG. 723 is a diagram explaining Instruction "vlfmachr M0,Rc,Ra,Rb,Rx".

FIG. 724 is a diagram explaining Instruction "vfmacw Mm,Rc,Ra,Rb,Mn".

FIG. 725 is a diagram explaining Instruction "vxfmacw Mm,Rc,Ra,Rb,Mn".

FIG. 726 is a diagram explaining Instruction "vhfmacw Mm,Rc,Ra,Rb,Mn".

FIG. 727 is a diagram explaining Instruction "vlfmacw Mm,Rc,Ra,Rb,Mn".

FIG. 728 is a diagram explaining Instruction "vpfmachww Mm,Rc:Rc+1,Ra,Rb,Mn".

FIG. 729 is a diagram explaining Instruction "vmsu Mm,Rc,Ra,Rb,Mn".

FIG. 730 is a diagram explaining Instruction "vmsu M0,Rc,Ra,Rb,Rx".

FIG. 731 is a diagram explaining Instruction "vxmsu Mm,Rc,Ra,Rb,Mn".

FIG. 732 is a diagram explaining Instruction "vxmsu M0,Rc,Ra,Rb,Rx".

FIG. 733 is a diagram explaining Instruction "vhmsu Mm,Rc,Ra,Rb,Mn".

FIG. 734 is a diagram explaining Instruction "vhmsu M0,Rc,Ra,Rb,Rx".

FIG. 735 is a diagram explaining Instruction "vlmsu Mm,Rc,Ra,Rb,Mn".

FIG. 736 is a diagram explaining Instruction "vlmsu M0,Rc,Ra,Rb,Rx".

FIG. 737 is a diagram explaining Instruction "vfmsuh Mm,Rc,Ra,Rb,Mn".

FIG. 738 is a diagram explaining Instruction "vfmsuh M0,Rc,Ra,Rb,Rx".

FIG. 739 is a diagram explaining Instruction "vxfmsuh Mm,Rc,Ra,Rb,Mn".

FIG. 740 is a diagram explaining Instruction "vxfmsuh M0,Rc,Ra,Rb,Rx".

FIG. 741 is a diagram explaining Instruction "vhfmsuh Mm,Rc,Ra,Rb,Mn".

FIG. 742 is a diagram explaining Instruction "vhfmsuh M0,Rc,Ra,Rb,Rx".

FIG. 743 is a diagram explaining Instruction "vlfmsuh Mm,Rc,Ra,Rb,Mn".

FIG. 744 is a diagram explaining Instruction "vlfmsuh M0,Rc,Ra,Rb,Rx".

FIG. 745 is a diagram explaining Instruction "vfmsuw Mm,Rc,Ra,Rb,Mn".

FIG. 746 is a diagram explaining Instruction "vxfmsuw Mm,Rc,Ra,Rb,Mn".

FIG. 747 is a diagram explaining Instruction "vhfmsuw Mm,Rc,Ra,Rb,Mn".

FIG. 748 is a diagram explaining Instruction "vlfmsuw Mm,Rc,Ra,Rb,Mn".

DETAILED DESCRIPTION OF THE PREFERRED EMBODIMENT

An explanation is given for the architecture of the processor according to the present invention. The processor of the present invention is a general-purpose processor which has been developed targeting at the field of AV media signal processing technology, and instructions issued in this processor offer a higher degree of parallelism than ordinary microcomputers. Used as a core common to mobile phones, mobile AV devices, digital televisions, DVDs and others, the processor can improve software usability. Furthermore, the processor of the present invention allows multiple high-performance media processes to be performed with high cost effectiveness, and provides a development environment for high-level languages intended for improving development efficiency.

FIG. 1 is a schematic block diagram showing the processor of the present invention. The processor 1 is comprised of an instruction control unit 10, a decoding unit 20, a register file 30, an operation unit 40, an I/F unit 50, an instruction memory unit 60, a data memory unit 70, an extended register unit 80, and an I/O interface unit 90. The operation unit 40 includes arithmetic and logic/comparison operation units 41–43, a multiplication/sum of products operation unit 44, a barrel shifter 45, a divider 46, and a converter 47 for performing SIMD instructions. The multiplication/sum of products operation unit 44 is capable of handling a maximum of 65-bit accumulation so as not to decrease bit precision. The multiplication/sum of products operation unit 44 is also capable of executing SIMD instructions as in the case of the arithmetic and logic/comparison operation units 41–43. Furthermore, the processor 1 is capable of parallel execution of an arithmetic and logic/comparison operation instruction on a maximum of three data elements.

Figure 2:
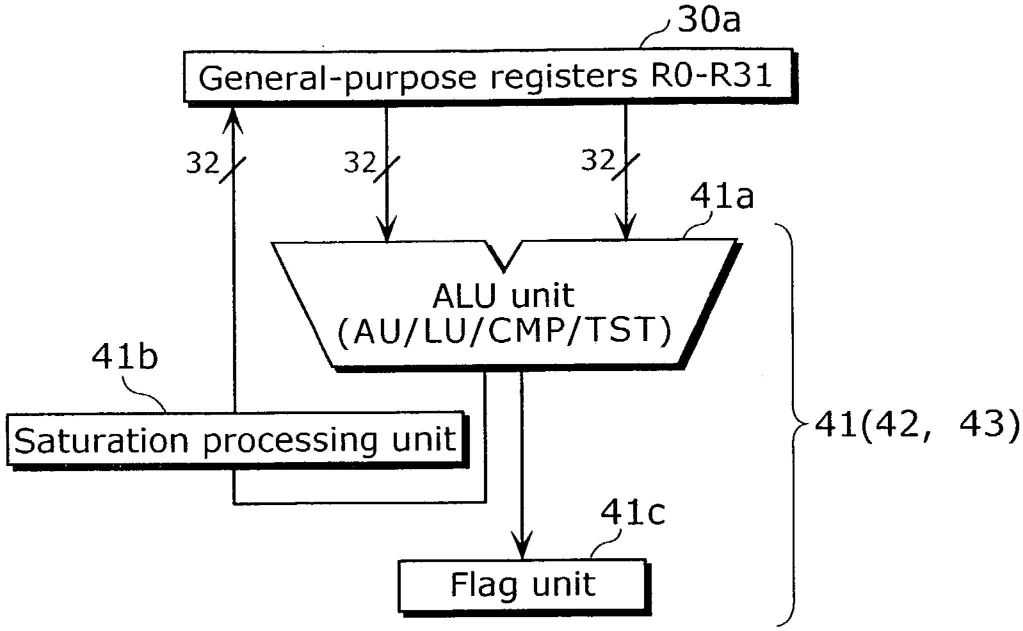
FIG. 2 is a schematic diagram showing arithmetic and logic/comparison operation units of the processor.

FIG. 2 is a schematic diagram showing the arithmetic and logic/comparison operation units 41–43. Each of the arithmetic and logic/comparison operation units 41–43 is made up of an ALU unit 41*a*, a saturation processing unit 41*b*, and a flag unit 41*c*. The ALU unit 41*a* includes an arithmetic operation unit, a logical operation unit, a comparator, and a TST. The bit widths of operation data to be supported are 8 bits (use four operation units in parallel), 16 bits (use two operation units in parallel) and 32 bits (process 32-bit data using all operation units). For a result of an arithmetic operation, the flag unit 41*c* and the like detects an overflow and generates a condition flag. For a result of each of the operation units, the comparator and the TST, an arithmetic shift right, saturation by the saturation processing unit 41*b*, the detection of maximum/minimum values, absolute value generation processing are performed.

Figure 3:
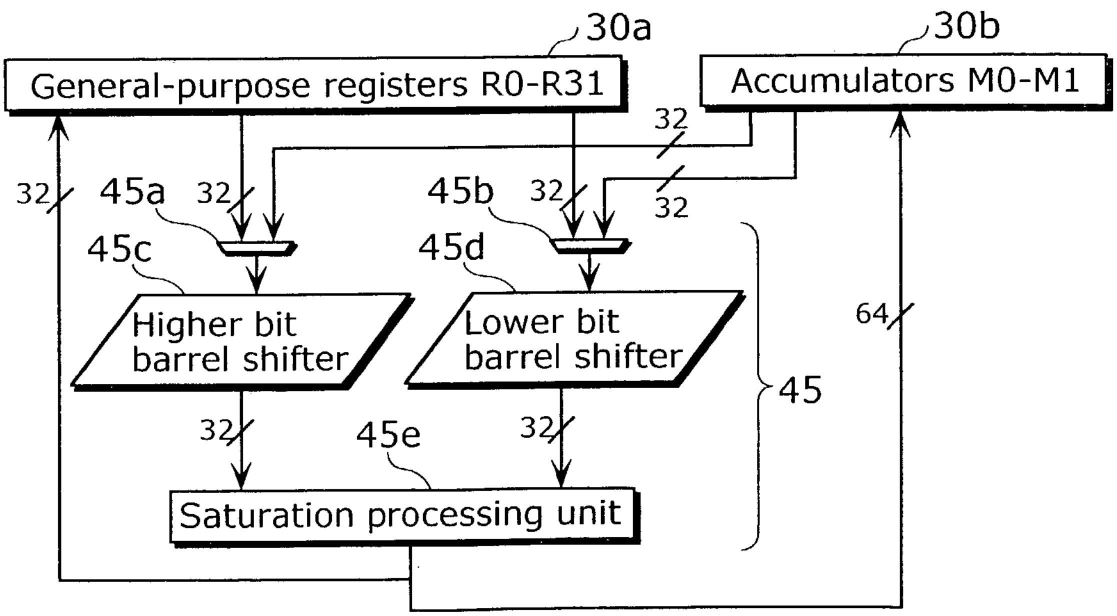
FIG. 3 is a block diagram showing a configuration of a barrel shifter of the processor.

FIG. 3 is a block diagram showing the configuration of the barrel shifter 45. The barrel shifter 45, which is made up of selectors 45*a* and 45*b*, a higher bit shifter 45*c*, a lower bit shifter 45*d*, and a saturation processing unit 45*e*, executes an arithmetic shift of data (shift in the 2's complement number system) or a logical shift of data (unsigned shift). Usually, 32-bit or 64-bit data are inputted to and outputted from the barrel shifter 45. The amount of shift of target data stored in the registers 30*a* and 30*b* are specified by another register or according to its immediate value. An arithmetic or logical shift in the range of left 63 bits and right 63 bits is performed for the data, which is then outputted in an input bit length.

The barrel shifter 45 is capable of shifting 8-, 16-, 32-, and 64-bit data in response to a SIMD instruction. For example, the barrel shifter 45 can shift four pieces of 8-bit data in parallel.

Arithmetic shift, which is a shift in the 2's complement number system, is performed for aligning decimal points at the time of addition and subtraction, for multiplying a power of 2 (2, the $2^{nd}$ power of 2, the $-1^{st}$ power of 2) and other purposes.

Figure 4:
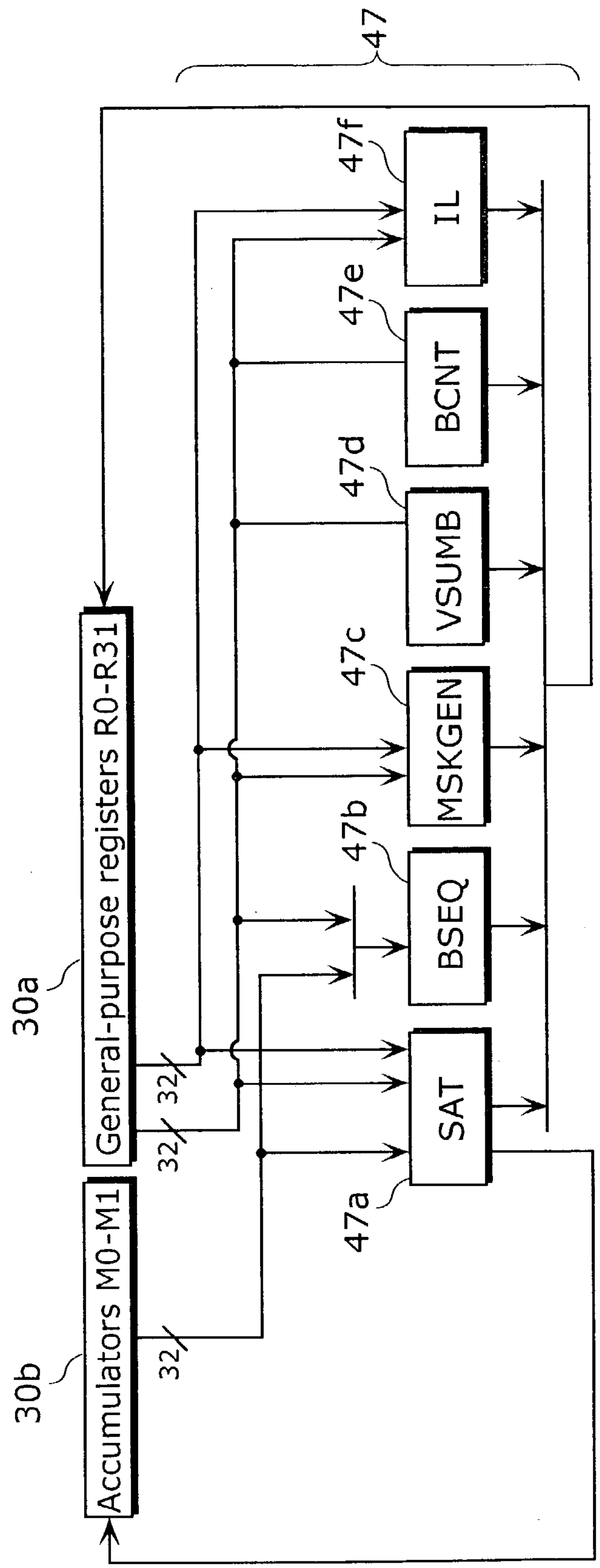
FIG. 4 is a block diagram showing a configuration of a converter of the processor.

FIG. 4 is a block diagram showing the configuration of the converter 47. The converter 47 is made up of a saturation block (SAT) 47*a*, a BSEQ block 47*b*, an MSKGEN block 47*c*, a VSUMB block 47*d*, a BCNT block 47*e*, and an IL block 47*f*.

The saturation block (SAT) 47*a* performs saturation processing for input data. Having two blocks for the saturation processing of 32-bit data makes it possible to support a SIMD instruction that is executed for two data elements in parallel.

The BSEQ block 47*b* counts consecutive 0s or 1s from the MSB.

The MSKGEN block 47*c* outputs a specified bit segment as 1, while outputting the other bit segments as 0.

The VSUMB block 47*d* divides the input data into specified bit widths, and outputs their total sum.

The BCNT block 47*e* counts the number of bits in the input data specified as 1.

The IL block 47*f* divides the input data into specified bit widths, and outputs a value resulting from exchanging the position of each data block.

Figure 5:
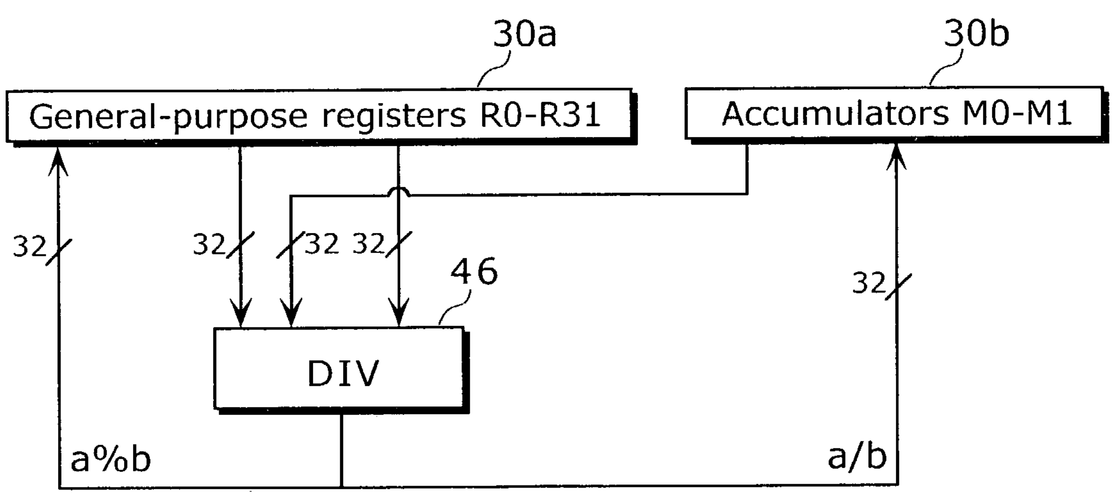
FIG. 5 is a block diagram showing a configuration of a divider of the processor.

FIG. 5 is a block diagram showing the configuration of the divider 46. Letting a dividend be 64 bits and a divisor be 32 bits, the divider 46 outputs 32 bits as a quotient and a modulo, respectively. 34 cycles are involved for obtaining a quotient and a modulo. The divider 46 can handle both singed and unsigned data. Note, however, that an identical setting is made concerning the presence/absence of signs of data serving as a dividend and a divisor. Also, the divider 46 has the capability of outputting an overflow flag, and a 0 division flag.

Figure 6:
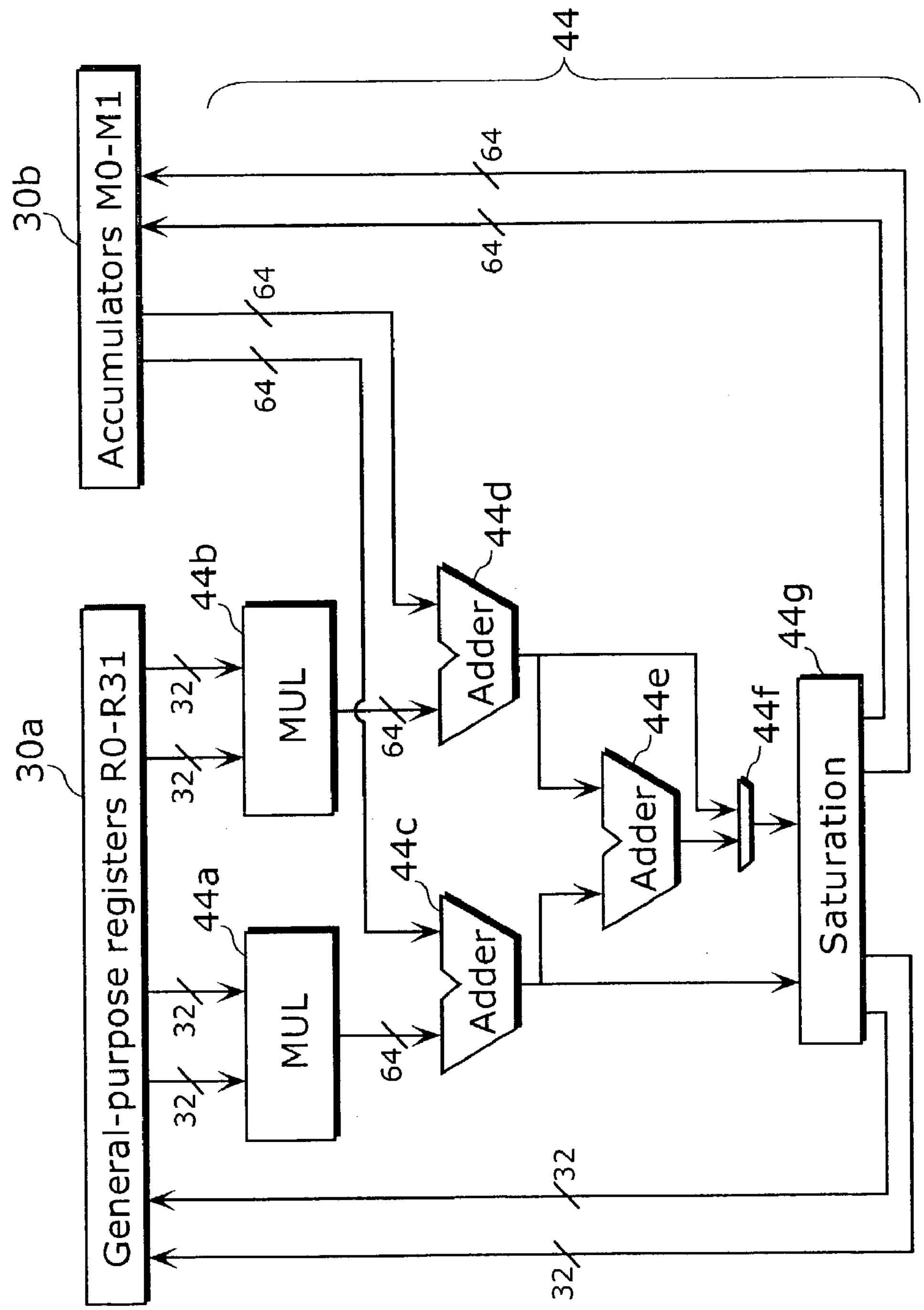
FIG. 6 is a block diagram showing a configuration of a multiplication/sum of products operation unit of the processor.

FIG. 6 is a block diagram showing the configuration of the multiplication/sum of products operation unit 44. The multiplication/sum of products operation unit 44, which is made up of two 32-bit multipliers (MUL) 44*a* and 44*b*, three 64-bit adders (Adder) 44*c*–44*e*, a selector 44*f* and a saturation processing unit (Saturation) 44*g*, performs the following multiplications and sums of products:

- 32×32-bit signed multiplication, sum of products, and difference of products;
- 32×32-bit unsigned multiplication;
- 16×16-bit signed multiplication, sum of products, and difference of products performed on two data elements in parallel; and
- 32×16-bit t signed multiplication, sum of products, and difference of products performed on two data elements in parallel;

The above operations are performed on data in integer and fixed point format (h1, h2, w1, and w2). Also, the results of these operations are rounded and saturated.

Figure 7:
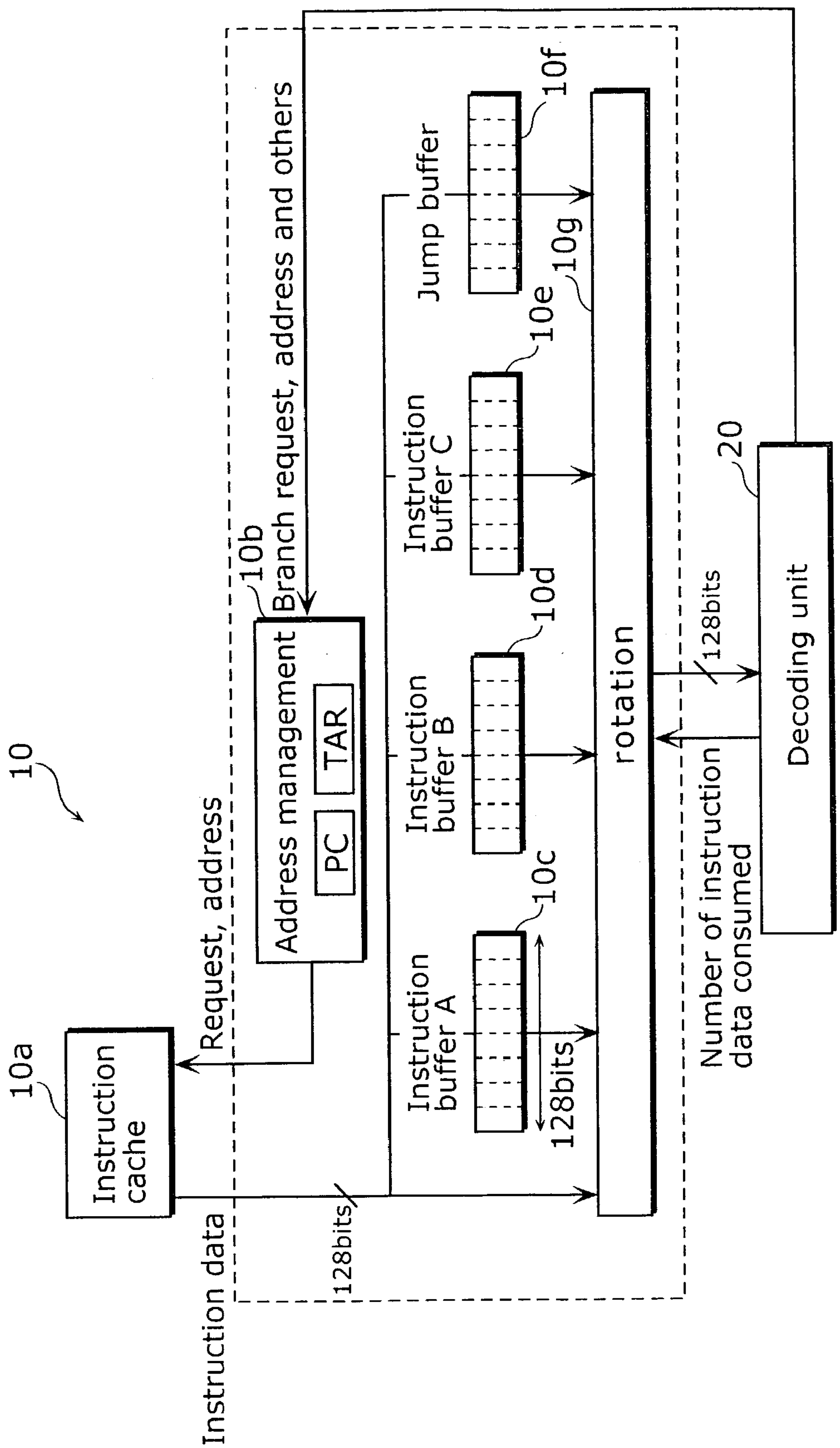
FIG. 7 is a block diagram showing a configuration of an instruction control unit of the processor.

FIG. 7 is a block diagram showing the configuration of the instruction control unit 10. The instruction control unit 10, which is made up of an instruction cache 10*a*, an address management unit 10*b*, instruction buffers 10*c*–10*e*, a jump buffer 10*f*, and a rotation unit (rotation) 10*g*, issues instructions at ordinary times and at branch points. Having three 128-bit instruction buffers (the instruction buffers 10*c*–10*e*) makes it possible to support the maximum number of parallel instruction execution. Regarding branch processing, the instruction control unit 10 stores, in advance, a branch destination address in the below-described TAR register via the jump buffer 10*f* and others before performing a branch (settar instruction). The branch is performed by using the branch destination address stored in the TAR register.

Note that the processor 1 is a processor employing the VLIW architecture. The VLIW architecture is an architecture allowing a plurality of instructions (e.g. load, store, operation, and branch) to be stored in a single instruction word, and such instructions to be executed all at once. By programmers describing a set of instructions which can be executed in parallel as a single issue group, it is possible for such an issue group to be processed in parallel. In this specification, the delimiter of an issue group is indicated by ";;". Notational examples are described below.

EXAMPLE 1 mov r1, 0×23;;

This instruction description indicates that only an instruction "mov" shall be executed.

EXAMPLE 2 mov r1, 0×38
add r0, r1, r2
sub r3, r1, r2;;

These instruction descriptions indicate that three instructions of "mov", "add" and "sub" shall be executed in parallel.

The instruction control unit 10 identifies an issue group and sends the identified issue group to the decoding unit 20. The decoding unit 20 decodes the instructions in the issue group, and controls resources that are required for executing such instructions.

Next, an explanation is given for registers included in the processor 1.

Table 1 below lists a set of registers of the processor 1.

TABLE 1

| Register name | Bit width | No. of registers | Usage |
|---|---|---|---|
| R0~R31 | 32 bits | 32 | General-purpose registers. Used as data memory pointer, data storage and the like when operation instruction is executed. |
| TAR | 32 bits | 1 | Branch register. Used as branch address storage at branch point. |
| LR | 32 bits | 1 | Link register. |
| SVR | 16 bits | 2 | Save register. Used for saving condition flag (CFR) and various modes. |
| M0~M1 (MH0:ML0~ MH1~ML1) | 64 bits | 2 | Operation registers. Used as data storage when operation instruction is executed. |

Table 2 below lists a set of flags (flags managed in a condition flag register and the like described later) of the processor 1.

TABLE 2

| Flag name | Bit width | No. of flags | Usage |
|---|---|---|---|
| C0~C7 | 1 | 8 | Condition flags. Indicate if condition is established or not. |
| VC0~VC3 | 1 | 4 | Condition flags for media processing extension instruction. Indicate if condition is established or not. |
| OVS | 1 | 1 | Overflow flag. Detects overflow at the time of operation. |
| CAS | 1 | 1 | Carry flag. Detects carry at the time of operation. |
| BPO | 5 | 1 | Specifies bit position. Specifies bit positions to be processed when mask processing instruction is executed. |
| ALN | 2 | 1 | Specified byte alignment. |
| FXP | 1 | 1 | Fixed point operation mode. |
| UDR | 32 | 1 | Undefined register. |

Figure 8:
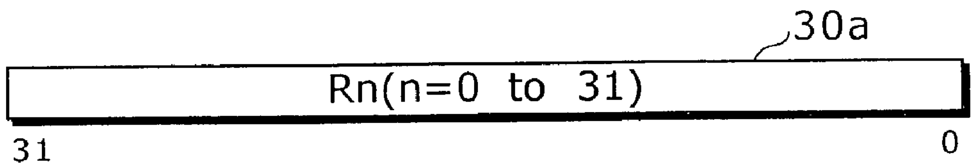
FIG. 8 is a diagram showing a configuration of general-purpose registers (R0–R31) of the processor.

FIG. 8 is a diagram showing the configuration of the general-purpose registers (R0–R31) 30*a*. The general-purpose registers (R0–R31) 30*a* are a group of 32-bit registers that constitute an integral part of the context of a task to be executed and that store data or addresses. Note that the general-purpose registers R30 and R31 are used by hardware as a global pointer and a stack pointer, respectively.

Figure 9:
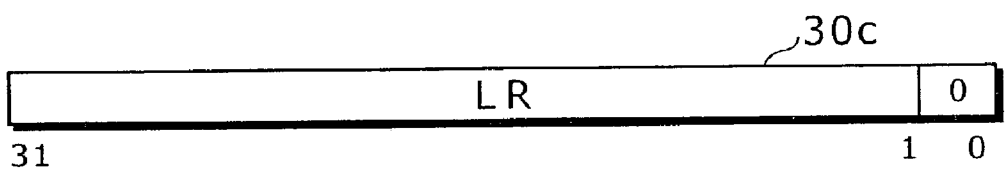
FIG. 9 is a diagram showing a configuration of a link register (LR) of the processor.

FIG. 9 is a diagram showing the configuration of a link register (LR) 30*c*. In connection with this link register (LR) 30*c*, the processor 1 also has a save register (SVR) that is not illustrated in FIG. 9. The link register (LR) 30*c* is a 32-bit register for storing a return address at the time of a function call. Note that the save register (SVR) is a 16-bit register for saving a condition flag (CFR.CF) of the condition flag register at the time of a function call. The link register (LR) 30*c* is also used for the purpose of increasing the speed of loops, as in the case of a branch register (TAR) to be explained later. 0 is always read out as the lower 1 bit, but 0 must be written at the time of writing.

For example, when "call (brl, jmpl)" instructions are executed, the processor 1 saves a return address in the link register (LR) 30*c* and saves a condition flag (CFR.CF) in the save register (SVR). When a "jmp" instruction is executed, the processor 1 fetches the return address (branch destination address) from the link register (LR) 30*c*, and restores a program counter (PC). Furthermore, when a "ret (jmpr)" instruction is executed, the processor 1 fetches the branch destination address (return address) from the link register (LR) 30*c*, and stores (restores) the fetched branch destination address in/to the program counter (PC). Moreover, the processor 1 fetches the condition flag from the save register (SVR) so as to store (restore) the condition flag in/to a condition flag area CFR.CF in the condition flag register (CFR) 32.

Figure 10:
FIG. 10 is a diagram showing a configuration of a branch register (TAR) of the processor.

FIG. 10 is a diagram showing the configuration of the branch register (TAR) 30*d*. The branch register (TAR) 30*d* is a 32-bit register for storing a branch target address, and is used mainly for the purpose of increasing the speed of loops. 0 is always read out as the lower 1 bit, but 0 must be written at the time of writing.

For example, when "jmp" and "jloop" instructions are executed, the processor 1 fetches a branch destination address from the branch register (TAR) 30*d*, and stores the fetched branch destination address in the program counter (PC). When the instruction indicated by the address stored in the branch register (TAR) 30*d* is stored in a branch instruction buffer, a branch penalty will be 0. An increased loop speed can be achieved by storing the top address of a loop in the branch register (TAR) 30*d*.

FIG. 11 is a diagram showing the configuration of a program status register (PSR) 31. The program status register (PSR) 31, which constitutes an integral part of the context of a task to be executed, is a 32-bit register for storing the following processor status information:

Bit SWE: indicates whether the switching of VMP (Virtual Multi-Processor) to LP (Logical Processor) is enabled or disabled. "0" indicates that switching to LP is disabled and "1" indicates that switching to LP is enabled.

Bit FXP: indicates a fixed point mode. "0" indicates the mode 0 and "1" indicates the mode 1.

Bit IH: is an interrupt processing flag indicating that maskable interrupt processing is ongoing or not. "1" indicates that there is an ongoing interrupt processing and "0" indicates that there is no ongoing interrupt processing. This flag is automatically set on the occurrence of an interrupt. This flag is used to make a distinction of whether interrupt processing or program processing is taking place at a point in the program to which the processor returns in response to a "rti" instruction.

Bit EH: is a flag indicating that an error or an NMI is being processed or not. "0" indicates that error/NMI interrupt processing is not ongoing and "1" indicates that error/NMI interrupt processing is ongoing. This flag is masked if an asynchronous error or an NMI occurs when EH=1. Meanwhile, when VMP is enabled, plate switching of VMP is masked.

Bit PL [1:0]: indicates a privilege level. "00" indicates the privilege level 0, i.e., the processor abstraction level, "01" indicates the privilege level 1 (non-settable), "10" indicates the privilege level 2, i.e., the system program level, and "11" indicates the privilege level 3, i.e., the user program level.

Bit LPIE3: indicates whether LP-specific interrupt 3 is enabled or disabled. "1" indicates that an interrupt is enabled and "0" indicates that an interrupt is disabled.

Bit LPIE2: indicates whether LP-specific interrupt 2 is enabled or disabled. "1" indicates that an interrupt is enabled and "0" indicates that an interrupt is disabled.

Bit LPIE1: indicates whether LP-specific interrupt 1 is enabled or disabled. "1" indicates that an interrupt is enabled and "0" indicates that an interrupt is disabled.

Bit LPIE0: indicates whether LP-specific interrupt 0 is enabled or disabled. "1" indicates that an interrupt is enabled and "0" indicates that an interrupt is disabled.

Bit AEE: indicates whether a misalignment exception is enabled or disabled. "1" indicates that a misalignment exception is enabled and "0" indicates that a misalignment exception is disabled.

Bit IE: indicates whether a level interrupt is enabled or disabled. "1" indicates that a level interrupt is enabled and "0" indicates a level interrupt is disabled.

Bit IM [7:0]: indicates an interrupt mask, and ranges from levels 0–7, each being able to be masked at its own level. Level 0 is the highest level. Of interrupt requests which are not masked by any IMs, only the interrupt request with the highest level is accepted by the processor 1. When an interrupt request is accepted, levels below the accepted level are automatically masked by hardware. IM[0] denotes a mask of level 0, IM[1] a mask of level 1, IM[2] a mask of level 2, IM[3] a mask of level 3, IM[4] a mask of level 4, IM[5] a mask of level 5, IM[6] a mask of level 6, and IM[7] a mask of level 7.

reserved: indicates a reserved bit. 0 is always read out. 0 must be written at the time of writing.

FIG. 12 is a diagram showing the configuration of the condition flag register (CFR) 32. The condition flag register (CFR) 32, which constitutes an integral part of the context of a task to be executed, is a 32-bit register made up of condition flags, operation flags, vector condition flags, an operation instruction bit position specification field, and a SIMD data alignment information field.

Bit ALN [1:0]: indicates an alignment mode. An alignment mode of "valnvc" instruction is set.

Bit BPO [4:0]: indicates a bit position. It is used in an instruction that requires a bit position specification.

Bit VC0–VC3: are vector condition flags. Starting from a byte on the LSB side or a half word through to the MSB side, each corresponds to a flag ranging from VC0 through to VC3.

Bit OVS: is an overflow flag (summary). It is set on the detection of saturation and overflow. If not detected, a value before the instruction is executed is retained. Clearing of this flag needs to be carried out by software.

Bit CAS: is a carry flag (summary). It is set when a carry occurs under "addc" instruction, or when a borrow occurs under a "subc" instruction. If there is no occurrence of a carry under a "addc" instruction, or a borrow under a "subc" instruction, a value before the instruction is executed is retained. Clearing of this flag needs to be carried out by software.

Bit C0–C7: are condition flags. The value of the flag C7 is always 1. A reflection of a FALSE condition (writing of 0) made to the flag C7 is ignored.

reserved: indicates a reserved bit. 0 is always read out. 0 must be written at the time of writing.

Figure 13A:
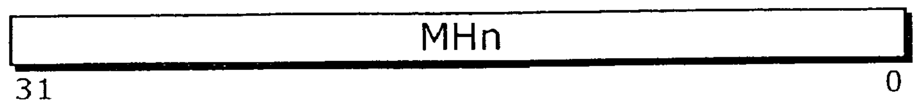
FIGS. 13A and 13B are diagrams showing configurations of accumulators (M0, M1) of the processor.
Figure 13B:
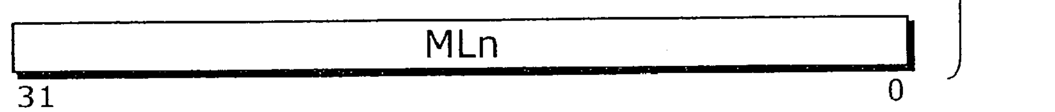

FIGS. 13A and 13B are diagrams showing the configurations of accumulators (M0, M1) 30*b*. Such accumulators (M0, M1) 30*b*, which constitute an integral part of the context of a task to be executed, are made up of a 32-bit register MHO–MH1 (register for multiply and divide/sum of products (the higher 32 bits)) shown in FIG. 13A and a 32-bit register MLO–ML1 (register for multiply and divide/sum of products (the lower 32 bits)) shown in FIG. 13B.

The register MHO–MH1 is used for storing the higher 32 bits of operation results at the time of a multiply instruction, and is used as the higher 32 bits of the accumulators at the time of a sum of products instruction. Moreover, the register MHO–MH1 can be used in combination with the general-purpose registers in the case where a bit stream is handled. Meanwhile, the register MLO–ML1 is used for storing the lower 32 bits of operation results at the time of a multiply instruction, and is used as the lower 32 bits of the accumulators at the time of a sum of products instruction.

Figure 14:
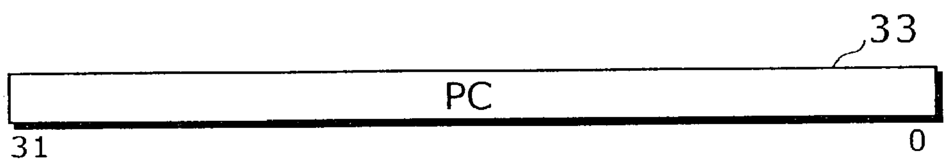
FIG. 14 is a diagram showing a configuration of a program counter (PC) of the processor.

FIG. 14 is a diagram showing the configuration of a program counter (PC) 33. This program counter (PC) 33, which constitutes an integral part of the context of a task to be executed, is a 32-bit counter that holds the address of an instruction being executed.

Figure 15:
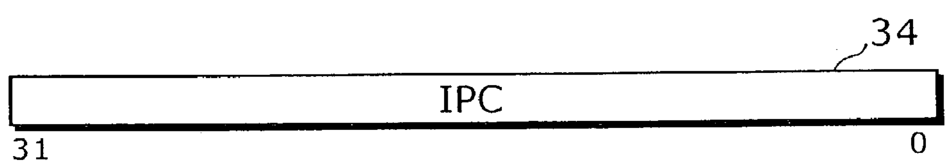
FIG. 15 is a diagram showing a configuration of a PC save register (IPC) of the processor.

FIG. 15 is a diagram showing the configuration of a PC save register (IPC) 34. This PC save register (IPC) 34, which constitutes an integral part of the context of a task to be executed is a 32-bit register.

Figure 16:
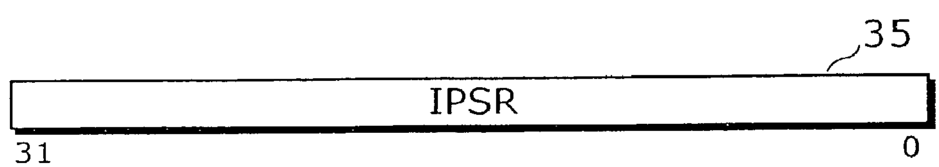
FIG. 16 is a diagram showing a configuration of a PSR save register (IPSR) of the processor.

FIG. 16 is a diagram showing the configuration of a PSR save register (IPSR) 35. This PSR save register (IPSR) 35, which constitutes an integral part of the context of a task to be executed, is a 32-bit register for saving the program status register (PSR) 31. 0 is always read out as a part corresponding to a reserved bit, but 0 must be written at the time of writing.

Next, an explanation is given for the memory space of the processor 1. In the processor 1, a linear memory space with a capacity of 4 GB is divided into 32 segments, and an instruction SRAM (Static RAM) and a data SRAM are allocated to 128-MB segments. With a 128-MB segment serving as one block, a target block to be accessed is set in a SAR (SRAM Area Register). A direct access is made to the instruction SRAM/data SRAM when the accessed address is a segment set in the SAR, but an access request shall be issued to a bus controller (BCU) when the accessed address is not a segment set in the SAR. An on chip memory (OCM), an external memory, an external device, an I/O port and others are connected to the BUC. Data reading/writing from and to these devices is possible.

Figure 17:
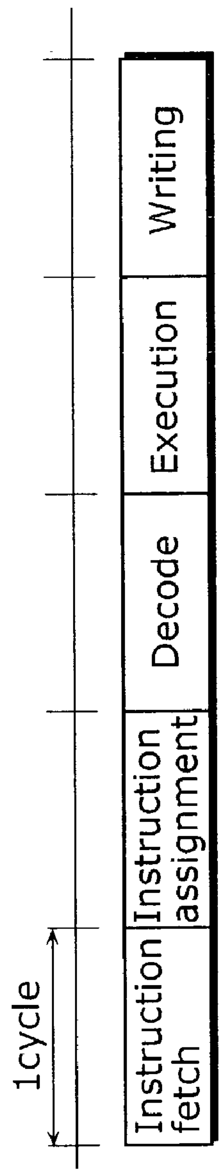
FIG. 17 is a timing diagram showing a pipeline behavior of the processor.

FIG. 17 is a timing diagram showing the pipeline behavior of the processor 1. As illustrated in FIG. 17, the pipeline of the processor 1 basically consists of the following five stages: instruction fetch; instruction assignment (dispatch); decode; execution; and writing.

Figure 18:
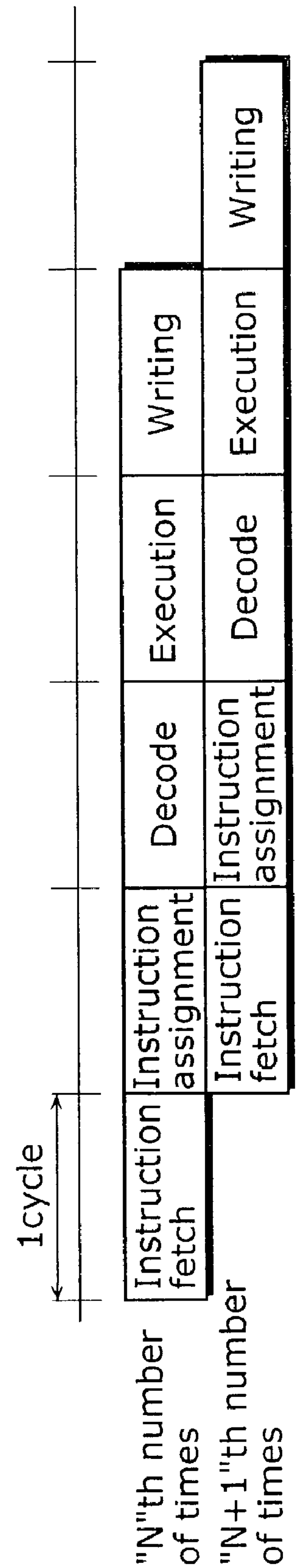
FIG. 18 is a timing diagram showing each stage of the pipeline behavior of the processor at the time of executing an instruction.

FIG. 18 is a timing diagram showing each stage of the pipeline behavior of the processor 1 at the time of executing an instruction. In the instruction fetch stage, an access is made to an instruction memory which is indicated by an address specified by the program counter (PC) 33, and the instruction is transferred to the instruction buffers 10*c*–10*e* and the like. In the instruction assignment stage, the output of branch destination address information in response to a branch instruction, the output of an input register control signal, and the assignment of a variable length instruction are carried out, which is followed by the transfer of the instruction to an instruction register (IR). In the decode stage, the IR is inputted to the decoding unit 20, and an operation unit control signal and a memory access signal are outputted. In the execution stage, an operation is executed and the result of the operation is outputted either to the data memory or the general-purpose registers (R0–R31) 30*a*. In the writing stage, a value obtained as a result of data transfer, and the operation results are stored in the general-purpose registers (R0–R31) 30*a*.

Figure 19:
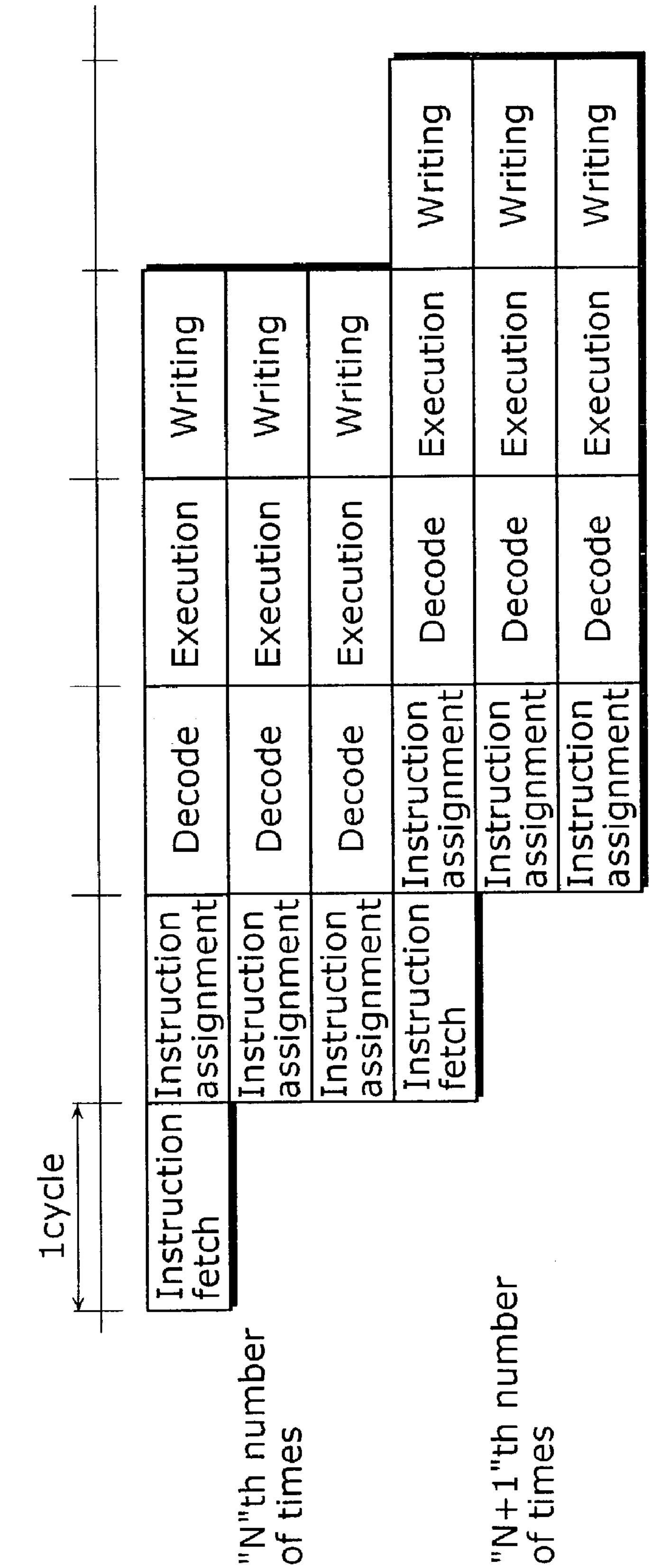
FIG. 19 is a diagram showing a parallel behavior of the processor.

The VLIW architecture of the processor 1 allows parallel execution of the above processing on a maximum of three data elements. Therefore, the processor 1 performs the behavior shown in FIG. 18 in parallel at the timing shown in FIG. 19.

Next, an explanation is given for a set of instructions executed by the processor 1 with the above configuration.

Tables 3–5 list categorized instructions to be executed by the processor 1.

TABLE 3

| Category | Operation unit | Instruction operation code |
|---|---|---|
| Memory transfer instruction (load) | M | ld,ldh,ldhu,ldb,ldbu,ldp,ldhp,ldbp,ldbh, ldbuh,ldbhp,ldbuhp |
| Memory transfer instruction (store) | M | st,sth,stb,stp,sthp,stbp,stbh,stbhp |

TABLE 3-continued

| Category | Operation unit | Instruction operation code |
|---|---|---|
| Memory transfer instruction (others) | M | dpref,ldstb |
| External register transfer instruction | M | rd,rde,wt,wte |
| Branch instruction | B | br,brl,call,jmp,jmpl,jmpr,ret,jmpf,jloop, setbb,setlr,settar |
| Software interrupt instruction | B | rti,pi0,pi0l,pi1,pi1l,pi2,pi2l,pi3,pi3l,pi4, pi4l,pi5,pi5l,pi6,pi6l,pi7,pi7l,sc0,sc1,sc2, sc3,sc4,sc5,sc6,sc7 |
| VMP/interrupt control instruction | B | intd,inte,vmpsleep,vmpsus,vmpswd,vmpswe, vmpwait |
| Arithmetic operation instruction | A | abs,absvh,absvw,add,addarvw,addc,addmsk, adds,addsr,addu,addvh,addvw,neg, negvh,negvw,rsub,s1add,s2add,sub, subc,submsk,subs,subvh,subvw,max, min |
| Logical operation instruction | A | and,andn,or,sethi,xor,not |
| Compare instruction | A | cmpCC,cmpCCa,cmpCCn,cmpCCo,tstn, tstna,tstnn,tstno,tstz,tstza,tstzn,tstzo |
| Move instruction | A | mov,movcf,mvclcas,mvclovs,setlo,vcchk |
| NOP instruction | A | nop |
| Shift instruction1 | S1 | asl,aslvh,aslvw,asr,asrvh,asrvw,lsl,lsr, rol,ror |
| Shift instruction2 | S2 | aslp,aslpvw,asrp,asrpvw,lslp,lsrp |

TABLE 4

| Category | Operation unit | Instruction operation code |
|---|---|---|
| Extraction instruction | S2 | ext,extb,extbu,exth,exthu,extr,extru, extu |
| Mask instruction | C | msk,mskgen |
| Saturation instruction | C | sat12,sat9,satb,satbu,sath,satw |
| Conversion instruction | C | valn,valn1,valn2,valn3,valnvc1,valnvc2, valnvc3,valnvc4,vhpkb,vhpkh,vhunpkb, vhunpkh,vintlhb,vintlhh,vintllb,vintllh, vlpkb,vlpkbu,vlpkh,vlpkhu,vlunpkb, vlunpkbu,vlunpkh,vlunpkhu,vstovb, vstovh,vunpk1,vunpk2,vxchngh,vexth |
| Bit count instruction | C | bcnt1,bseq,bseq0,bseq1 |
| Others | C | byterev,extw,mskbrvb,mskbrvh,rndvh, movp |
| Multiply instruction1 | X1 | fmulhh,fmulhhr,fmulhw,fmulhww, hmul,lmul |
| Multiply instruction2 | X2 | fmulww,mul,mulu |
| Sum of products instruction1 | X1 | fmachh,fmachhr,fmachw,fmachww, hmac,lmac |
| Sum of products instruction2 | X2 | fmacww,mac |
| Difference of products instruction1 | X1 | fmsuhh,fmsuhhr,fmsuhw,fmsuww, hmsu,lmsu |
| Difference of products instruction2 | X2 | fmsuww,msu |
| Divide instruction | DIV | div,divu |
| Debugger instruction | DBGM | dbgm0,dbgm1,dbgm2,dbgm3 |

TABLE 5

| Category | Operation unit | Instruction operation code |
|---|---|---|
| SIMD arithmetic operation instruction | A | vabshvh,vaddb,vaddh,vaddhvc,vaddhvh, vaddrhvc,vaddsb,vaddsh,vaddsrb,vaddsrh, vasubb,vcchk,vhaddh,vhaddhvh, vhsubh,vhsubhvh,vladdh,vladdhvh,vlsubh, |

TABLE 5-continued

| Category | Operation unit | Instruction operation code |
|---|---|---|
| | | vlsubhvh,vnegb,vnegh,vneghvh,vsaddb, vsaddh,vsgnh,vsrsubb,vsrsubh,vssubb, vssubh,vsubb,vsubh,vsubhvh,vsubsh, vsumh,vsumh2,vsumrh2,vxaddh, vxaddhvh,vxsubh,vxsubhvh, vmaxb,vmaxh,vminb,vminh,vmovt,vsel |
| SIMD compare instruction | A | vcmpeqb,vcmpeqh,vcmpgeb,vcmpgeh, vcmpgtb,vcmpgth,vcmpleb,vcmpleh, vcmpltb,vcmplth,vcmpneb,vcmpneh, vscmpeqb,vscmpeqh,vscmpgeb,vscmpgeh, vscmpgtb,vscmpgth,vscmpleb,vscmpleh, vscmpltb,vscmplth,vscmpneb,vscmpneh |
| SIMD shift instruction1 | S1 | vaslb,vaslh,vaslvh,vasrb,vasrh,vasrvh, vlslb,vlslh,vlsrb,vlsrh,vrolb,vrolh,vrorb, vrorh |
| SIMD shift instruction2 | S2 | vasl,vaslvw,vasr,vasrvw,vlsl,vlsr |
| SIMD saturation instruction | C | vsath,vsath12,vsath8,vsath8u,vsath9 |
| Other SIMD instruction | C | vabssumb,vrndvh |
| SIMD multiply instruction | X2 | vfmulh,vfmulhr,vfmulw,vhfmulh,vhfmulhr, vhfmulw,vhmul,vlfmulh,vlfmulhr,vlfmulw, vlmul,vmul,vpfmulhww,vxfmulh, vxfmulhr,vxfmulw,vxmul |
| SIMD sum of products instruction | X2 | vfmach,vfmachr,vfmacw,vhfmach,vhfmachr, vhfmacw,vhmac,vlfmach,vlfmachr, vlfmacw,vlmac,vmac,vpfmachww,vxfmach, vxfmachr,vxfmacw,vxmac |
| SIMD difference of products instruction | X2 | vfmsuh,vfmsuw,vhfmsuh,vhfmsuw,vhmsu, vlfmsuh,vlfmsuw,vlmsu,vmsu,vxfmsuh, vxfmsuw,vxmsu |

Note that "Operation units" in the above tables refer to operation units used in the respective instructions. More specifically, "A" denotes a ALU instruction, "B" denotes a branch instruction, "C" denotes a conversion instruction, "DIV" denotes a divide instruction, "DBGM" denotes a debug instruction, "M" denotes a memory access instruction, "S1" and "S2" denote a shift instruction, and "X1" and "X2" denote a multiply instruction.

Figure 20:
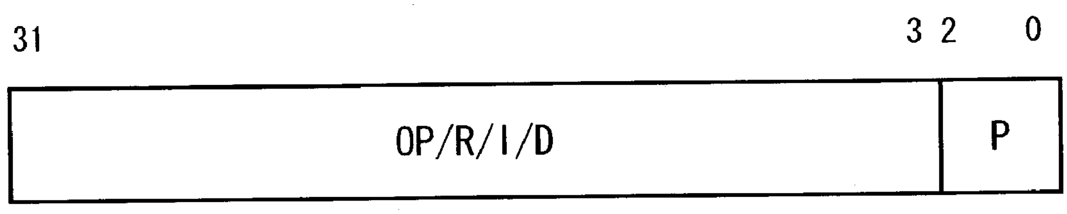
FIG. 20 is a diagram showing a format of instructions executed by the processor.

FIG. 20 is a diagram showing the format of the instructions executed by the processor 1.

The following describes what acronyms stand for in the diagrams: "P" is a predicate (execution condition: one of the eight condition flags C0–C7 is specified); "OP" is an operation code field; "R" is a register field; "I" is an immediate field; and "D" is a displacement field.

FIGS. 21–36 are diagrams explaining outlined functionality of the instructions executed by the processor 1. More specifically, FIG. 21 explains an instruction belonging to the category "ALUadd (addition) system"; FIG. 22 explains an instruction belonging to the category "ALUsub (subtraction) system"; FIG. 23 explains an instruction belonging to the category "ALUlogic (logical operation) system and others"; FIG. 24 explains an instruction belonging to the category "CMP (comparison operation) system"; FIG. 25 explains an instruction belonging to the category "mul (multiplication) system"; FIG. 26 explains an instruction belonging to the category "mac (sum of products operation) system"; FIG. 27 explains an instruction belonging to the category "msu (difference of products) system"; FIG. 28 explains an instruction belonging to the category "MEMld (load from memory) system"; FIG. 29 explains an instruction belonging to the category "MEMstore (store in memory) system"; FIG. 30 explains an instruction belonging to the category "BRA (branch) system"; FIG. 31 explains an instruction belonging to the category "BSasl (arithmetic barrel shift) system and others"; FIG. 32 explains an instruction belonging to the category "BSlsr (logical barrel shift) system and others"; FIG. 33 explains an instruction belonging to the category "CNVvaln (arithmetic conversion) system"; FIG. 34 explains an instruction belonging to the category "CNV (general conversion) system"; FIG. 35 explains an instruction belonging to the category "SATvlpk (saturation processing) system"; and FIG. 36 explains an instruction belonging to the category "ETC (et cetera) system".

The following describes the meaning of each column in these diagrams: "SIMD" indicates the type of an instruction (distinction between SISD (SINGLE) and SIMD); "Size" indicates the size of an individual operand to be an operation target; "Instruction" indicates the operation code of an operation; "Operand" indicates the operands of an instruction; "CFR" indicates a change in the condition flag register; "PSR" indicates a change in the processor status register; "Typical behavior" indicates the overview of a behavior; "Operation unit" indicates an operation unit to be used; and "3116" indicates the size of an instruction.

FIGS. 37–748 are diagrams explaining the detailed functionality of the instructions executed by the processor 1. Note that the meaning of each symbol used for explaining the instructions is as described in Tables 6–10 below.

TABLE 6

| Symbol | Meaning |
|---|---|
| X[i] | Bit number i of X |
| X[i:j] | Bit number j to bit number i of X |
| X:Y | Concatenated X and Y |
| {n{X}} | n repetitions of X |
| sextM(X,N) | Sign-extend X from N bit width to M bit width. Default of M is 32. Default of N is all possible bit widths of X. |
| uextM(X,N) | Zero-extend X from N bit width to M bit width. Default of M is 32. Default of N is all possible bit widths of X. |
| smul(X,Y) | Signed multiplication X * Y |
| umul(X,Y) | Unsigned multiplication X * Y |
| sdiv(X,Y) | Integer part in quotient of signed division X / Y |
| smod(X,Y) | Modulo with the same sign as dividend. |
| udiv(X,Y) | Quotient of unsigned division X / Y |
| umod(X,Y) | Modulo |
| abs(X) | Absolute value |
| bseq(X,Y) | for (i=0; i<32; i++) { if (X[31−i] != Y) break; } result = i; |
| bcnt(X,Y) | S = 0; for (i=0; i<32; i++) { if (X[i] == Y) S++; } result = S; |
| max(X,Y) | result = (X > Y)? X : Y |
| min(X,Y) | result = (X < Y)? X : Y; |
| tstz(X,Y) | X & Y == 0 |
| tstn(X,Y) | X & Y != 0 |

TABLE 7

| Symbol | Meaning |
|---|---|
| Ra Ra[31:0] | Register numbered a (0 <= a <= 31) |
| Ra+1 R(a+1)[31:0] | Register numbered a+1 (0 <= a <= 30) |
| Rb Rb[31:0] | Register numbered b (0 <= b <= 31) |
| Rb+1 R(b+1)[31:0] | Register numbered b+1 (0 <= b <= 30) |
| Rc Rc[31:0] | Register numbered c (0 <= c <= 31) |
| Rc+1 R(c+1)[31:0] | Register numbered c+1Register (0 <= c <= 30) |

TABLE 7-continued

| Symbol | Meaning |
|---|---|
| Ra2 Ra2[31:0] | Register numbered a2 (0 <= a2 <= 15) |
| Ra2+1 R(a2+1)[31:0] | Register numbered a2+1 (0 <= a2 <= 14) |
| Rb2 Rb2[31:0] | Register numbered b2 (0 <= b2 <= 15) |
| Rb2+1 R(b2+1)[31:0] | Register numbered b2+1 (0 <= b2 <= 14) |
| Rc2 Rc2[31:0] | Register numbered c2 (0 <= c2 <= 15) |
| Rc2+1 R(c2+1)[31:0] | Register numbered c2+1 (0 <= c2 <= 14) |
| Ra3 Ra3[31:0] | Register numbered a3 (0 <= a3 <= 7) |
| Ra3+1 R(a3+1)[31:0] | Register numbered a3+1 (0 <= a3 <= 6) |
| Rb3 Rb3[31:0] | Register numbered b3 (0 <= b3 <= 7) |
| Rb3+1 R(b3+1)[31:0] | Register numbered b3+1 (0 <= b3 <= 6) |
| Rc3 Rc3[31:0] | Register numbered c3 (0 <= c3 <= 7) |
| Rc3+1 R(c3+1)[31:0] | Register numbered c3+1 (0 <= c3 <= 6) |
| Rx Rx[31:0] | Register numbered x (0 <= x <= 3) |

TABLE 8

<table>
<tr><th>Symbol</th><th>Meaning</th></tr>
<tr><td>+</td><td>Addition</td></tr>
<tr><td>−</td><td>Subtraction</td></tr>
<tr><td>&</td><td>Logical AND</td></tr>
<tr><td>|</td><td>Logical OR</td></tr>
<tr><td>!</td><td>Logical NOT</td></tr>
</table>

TABLE 8-continued

| Symbol | Meaning |
|---|---|
| << | Logical shift left (arithmetic shift left) |
| >> | Arithmetic shift right |
| >>> | Logical shift right |
| ^ | Exclusive OR |
| ~ | Logical NOT |
| == | Equal |
| != | Not equal |
| > | Greater than Signed(regard left-and right-part MSBs as sign) |
| >= | Greater than or equal to Signed(regard left-and right-part MSBs as sign) |
| >(u) | Greater than Unsigned(Not regard left-and right-part MSBs as sign) |
| >=(u) | Greater than or equal to Unsigned(Not regard left-and right-part MSBs as sign) |
| < | Less than Signed(regard left-and right-part MSBs as sign) |
| <= | Less than or equal to Signed(regard left-and right-part MSBs as sign) |
| <(u) | Less than Unsigned(Not regard left-and right-part MSBs as sign) |
| <=(u) | Less than or equal to Unsigned(Not regard left-and right-part MSBs as sign) |

TABLE 9

| Symbol | Meaning |
|---|---|
| D(addr) | Double word data corresponding to address "addr" in Memory |
| W(addr) | Word data corresponding to address "addr" in Memory |
| H(addr) | Half data corresponding to address "addr" in Memory |
| B(addr) | Byte data corresponding to address "addr" in Memory |
| B(addr,bus_lock) | Access byte data corresponding to address "addr" in Memory, and lock used bus concurrently (unlockable bus shall not be locked) |
| B(addr,bus_unlock) | Access byte data corresponding to address "addr" in Memory, and unlock used bus concurrently (unlock shall be ignored for unlockable bus and bus which has not been locked) |
| EREG(num) | Extended register numbered "num" |
| EREG_ERR | To be 1 if error occurs when immediately previous access is made to extended register. To be 0, when there was no error. |
| <- | Write result |
| => | Synonym of instruction (translated by assembler) |
| reg#(Ra) | Register number of general-purpose register Ra(5-bit value) |
| 0x | Prefix of hexadecimal numbers |
| 0b | Prefix of binary numbers |
| tmp | Temporally variable |
| UD | Undefined value (value which is implementation-dependent value or which varies dynamically) |
| Dn | Displacement value (n is a natural value indicating the number of bits) |
| In | Immediate value (n is a natural value indicating the number of bits) |

TABLE 10

Symbol Meaning

○Explanation for syntax

```
if (condition) {
        Executed when condition is met;
} else {
        Executed when condition is not met;
}
Executed when condition A is met, if (condition A);        *    Not executed
when condition A is not met
for (Expression1;Expression2;Expression3)                 * Same as C language
```

TABLE 10-continued

| | |
|---|---|
| (Expression1)? Expression2:Expression3 | * Same as C language |

○Explanation for terms
The following explains terms used for explanations:
Integer multiplication    Multiplication defined as "smul"
Fixed point multiplication
Arithmetic shift left is performed after integer operation. When PSR.FXP is 0, the amount of shift is 1 bit, and when PSR.FXP is 1, 2 bits.
SIMD operation straight / cross / high / low / pair
Higher 16 bits and lower 16 bits of half word vector data is RH and RL, respectively. When operations performed on at Ra register and Rb register are defined as follows:

| | |
|---|---|
| straight | Operation is performed between RHa and RHb |
| cross | Operation is performed between RHa and RLb, and RLa and RHb |
| high | Operation is performed between RHa and RHb, and RLa and RHb |
| low | Operation is performed between RHa and RLb, and RLa and RLb |
| pair | Operation is performed between RH and RHb, and RH and RLb |

(RH is 32-bit data)

FIGS. 37–119 are diagrams explaining instructions relating to "load".

FIGS. 120–184 are diagrams explaining instructions relating to "store".

FIGS. 185–186 are diagrams explaining instructions relating to "memory (etc)".

FIGS. 187–206 are diagrams explaining instructions relating to "external register".

FIGS. 207–247 are diagrams explaining instructions relating to "branch".

FIGS. 248–264 are diagrams explaining instructions relating to "VMP/interrupt".

FIGS. 265–258 are diagrams explaining instructions relating to "program interrupt".

FIGS. 259–303 are diagrams explaining instructions relating to "arithmetic".

FIGS. 304–317 are diagrams explaining instructions relating to "logic".

FIGS. 318–359 are diagrams explaining instructions relating to "compare".

FIGS. 360–420 are diagrams explaining instructions relating to "move".

FIG. 421 is a diagram explaining an instruction relating to "nop".

FIGS. 422–441 are diagrams explaining instructions relating to "shift (S1)".

FIGS. 442–460 are diagrams explaining instructions relating to "shift (S2)".

FIGS. 461–470 are diagrams explaining instructions relating to "extract".

FIGS. 471–474 are diagrams explaining instructions relating to "mask".

FIGS. 475–480 are diagrams explaining instructions relating to "saturation".

FIGS. 481–512 are diagrams explaining instructions relating to "conversion".

FIGS. 513–516 are diagrams explaining instructions relating to "bit count".

FIGS. 517–520 are diagrams explaining instructions relating to "etc".

FIGS. 521–526 are diagrams explaining instructions relating to "mul (X1)".

FIGS. 527–531 are diagrams explaining instructions relating to "mul (X2)".

FIGS. 532–543 are diagrams explaining instructions relating to "mac (X1)".

FIGS. 544–547 are diagrams explaining instructions relating to "mac (X2)".

FIGS. 548–559 are diagrams explaining instructions relating to "msu (X1)".

FIGS. 560–563 are diagrams explaining instructions relating to "msu (X2)".

FIGS. 564–565 are diagrams explaining instructions relating to "divide".

FIGS. 566–569 are diagrams explaining instructions relating to "debug".

FIGS. 570–615 are diagrams explaining instructions relating to "SIMD arithmetic".

FIGS. 616–639 are diagrams explaining instructions relating to "SIMD compare".

FIGS. 640–664 are diagrams explaining instructions relating to "SIMD shift (S1)".

FIGS. 665–675 are diagrams explaining instructions relating to "SIMD shift (S2)".

FIGS. 676–680 are diagrams explaining instructions relating to "SIMD saturation".

FIGS. 681–682 are diagrams explaining instructions relating to "SIMD etc".

FIGS. 683–699 are diagrams explaining instructions relating to "SIMD mul (X2)".

FIGS. 700–728 are diagrams explaining instructions relating to "SIMD mac (X2)".

FIGS. 729–748 are diagrams explaining instructions relating to "SIMD msu (X2)".

Next, an explanation is given for the behaviors of the processor 1 concerning some of the characteristic instructions.

(1) Instructions for Performing SIMD Binary Operations by Crossing Operands:

First, an explanation is given for instructions for performing operations on operands in a diagonally crossed position, out of two parallel SIMD operations.

[Instruction vxaddh]

Instruction vxaddh is a SIMD instruction for adding two sets of operands in a diagonally crossed position on a per half word (16 bits) basis. For example, when vxaddh Rc, Ra, Rb the processor 1 behaves as follows by using the arithmetic and logic/comparison operation unit 41 and the like:

(i) adds the higher 16 bits of the register Ra to the lower 16 bits of the register Rb, stores the result in the higher 16 bits of the register Rc, and in parallel with this, (ii) adds the lower 16 bits of the register Ra to the higher 16 bits of the register Rb, and stores the result in the lower 16 bits of the register Rc.

The above instruction is effective in the case where two values which will be multiplied by the same coefficient need to be added to each other (or subtracted) in advance in order to reduce the number of times multiplications are performed in a symmetric filter (coefficients which are symmetric with respect to the center).

Note that the processor 1 performs processing equivalent to this add instruction for subtract instructions (vxsubh etc.).

[Instruction vxmul]

Instruction vxmul is a SIMD instruction for multiplying two sets of operands in a diagonally crossed position on a per half word (16 bits) basis, and retaining the lower half words of the respective results (SIMD storage). For example, when vxmul Rc, Ra, Rb the processor 1 behaves as follows by using the multiplication/sum of products operation unit 44 and the like:

(i) multiplies the higher 16 bits of the register Ra by the lower 16 bits of the register Rb, stores the multiplication result in the higher 16 bits of an operation register MHm and the higher 16 bits of an operation register MLm, as well as storing the lower 16 bits of such multiplication result in the higher 16 bits of the register Rc, and in parallel with this, (ii) multiplies the lower 16 bits of the register Ra by the higher 16 bits of the register Rb, and stores the multiplication result in the lower 16 bits of the operation register MHm and the lower 16 bits of the operation register MLm, as well as storing the lower 16 bits of such multiplication result in the lower 16 bits of the register Rc.

The above instruction is effective when calculating the inner products of complex numbers. Taking out the lower bits of a result is effective when handling integer data (mainly images).

[Instruction vxfmulh]

Instruction vxfmulh is a SIMD instruction for multiplying two sets of operands in a diagonally crossed position on a per half word (16 bits) basis, and retaining the higher half words of the respective results (SIMD storage). For example, when vxfmulh Rc, Ra, Rb the processor 1 behaves as follows by using the multiplication/sum of products operation unit 44 and the like:

(i) multiplies the higher 16 bits of the register Ra by the lower 16 bits of the register Rb, stores the multiplication result in the higher 16 bits of the operation register MHm and the higher 16 bits of the operation register MLm, as well as storing the higher 16 bits of such multiplication result in the higher 16 bits of the register Rc, and in parallel with this, (ii) multiplies the lower 16 bits of the register Ra by the higher 16 bits of the register Rb, and stores the multiplication result in the lower 16 bits of the operation register MHm and the lower 16 bits of the operation register MLm, as well as storing the higher 16 bits of such multiplication result in the lower 16 bits of the register Rc.

The above instruction is effective when calculating the inner products of complex numbers. Taking out the higher bits of a result is effective when handling fixed point data. This instruction can be applied to a standard format (MSB-aligned) known as Q31/Q15.

[Instruction vxfmulw]

Instruction vxfmulw is a SIMD instruction for multiplying two sets of operands in a diagonally crossed position on a per half word (16 bits) basis, and retaining only one of the two multiplication results (non-SIMD storage). For example, when vxfmulw Rc, Ra, Rb the processor 1 behaves as follows by using the multiplication/sum of products operation unit 44 and the like:

(i) multiplies the higher 16 bits of the register Ra by the lower 16 bits of the register Rb, stores the multiplication result in the higher 16 bits of the operation register MHm and the higher 16 bits of the operation register MLm, as well as storing such multiplication result (word) in the register Rc, and in parallel with this, (ii) multiplies the lower 16 bits of the register Ra by the higher 16 bits of the register Rb, and stores the multiplication result in the lower 16 bits of the operation register MHm and the lower 16 bits of the operation register MLm (not to be stored in the register Rc).

The above instruction is effective in a case where 16 bits becomes inefficient to maintain bit precision, making SIMD unable to be carried out (e.g. audio).

[Instruction vxmac]

Instruction vxmac is a SIMD instruction for calculating the sum of products of two sets of operands in a diagonally crossed position on a per half word (16 bits) basis, and retaining the lower half words of the respective results (SIMD storage). For example, when vxmac Mm, Rc, Ra, Rb, Mn the processor 1 behaves as follows by using the multiplication/sum of products operation unit 44 and the like:

(i) multiplies the higher 16 bits of the register Ra by the lower 16 bits of the register Rb, adds this multiplication result to 32 bits consisting of the higher 16 bits of the operation registers MHn and MLn, stores the 32 bits of the addition result in a 32-bit area consisting of the higher 16 bits of the operation registers MHm and MLm, as well as storing the lower 16 bits of such addition result in the higher 16 bits of the register Rc, and in parallel with this, (ii) multiplies the lower 16 bits of the register Ra by the higher 16 bits of the register Rb, adds this multiplication result to 32 bits consisting of the lower 16 bits of the operation registers MHn and MLn, stores the 32 bits of the addition result in a 32-bit area consisting of the lower 16 bits of the operation registers MHm and MLm, as well as storing the lower 16 bits of such addition result in the lower 16 bits of the register Rc.

The above instruction is effective when calculating the inner products of complex numbers. Taking out the lower bits of a result is effective when handling integer data (mainly images).

[Instruction vxfmach]

Instruction vxfmach is a SIMD instruction for calculating the sum of products of two sets of operands in a diagonally crossed position on a per half word (16 bits) basis, and retaining the higher half words of the respective results (SIMD storage). For example, when vxfmach Mm, Rc, Ra, Rb, Mn the processor 1 behaves as follows by using the multiplication/sum of products operation unit 44 and the like:

(i) multiplies the higher 16 bits of the register Ra by the lower 16 bits of the register Rb, adds this multiplication result to 32 bits consisting of the higher 16 bits of the operation registers MHn and MLn, stores the 32 bits of the addition result in a 32-bit area consisting of the higher 16 bits of the operation registers MHm and MLm, as well as storing the higher 16 bits of such addition result in the higher 16 bits of the register Rc, and in parallel with this, (ii) multiplies the lower 16 bits of the register Ra by the higher 16 bits of the register Rb, adds this multiplication result to 32 bits consisting of the lower 16 bits of the operation registers MHn and MLn, stores the 32 bits of the addition result in a 32-bit area consisting of the lower 16 bits of the operation registers MHm and MLm, as well as storing the higher 16 bits of such addition result in the lower 16 bits of the register Rc.

The above instruction is effective when calculating the inner products of complex numbers. Taking out the higher bits of a result is effective when handling fixed point data. This instruction can be applied to a standard format (MSB-aligned) known as Q31/Q15.

[Instruction vxfmacw]

Instruction vxfmacw is a SIMD instruction for multiplying two sets of operands in a diagonally crossed position on a per half word (16 bits) basis, and retaining only one of the two multiplication results (non-SIMD storage). For example, when vxfmacw Mm, Rc, Ra, Rb, Mn the processor 1 behaves as follows by using the multiplication/sum of products operation unit 44 and the like:

(i) multiplies the higher 16 bits of the register Ra by the lower 16 bits of the register Rb, adds this multiplication result to 32 bits consisting of the higher 16 bits of the operation registers MHn and MLn, stores the 32 bits of the addition result in a 32-bit area consisting of the higher 16 bits of the operation registers MHm and MLm, as well as storing the 32 bits of such addition result in the register Rc, and in parallel with this, (ii) multiplies the lower 16 bits of the register Ra by the higher 16 bits of the register Rb, adds this multiplication result to 32 bits consisting of the lower 16 bits of the operation registers MHn and MLn, stores the 32 bits of the addition result in a 32-bit area consisting of the lower 16 bits of the operation registers MHm and MLm (not to be stored in the register Rc).

The above instruction is effective in a case where 16 bits becomes inefficient to maintain bit precision, making SIMD unable to be carried out (e.g. audio).

Note that the processor 1 performs processing equivalent to these sum of products instructions for difference of products instructions (vxmsu, vxmsuh, vxmsuw etc.).

Also note that the processor 1 is capable of performing not only operations (addition, subtraction, multiplication, sum of products, and difference of products under two-parallel SIMD) on two sets of operands in a diagonally crossed position as described above, but also extended operations (four parallel, eight parallel SIMD operations etc.) on "n" sets of operands.

For example, assuming that four pieces of byte data stored in the register Ra are Ra1, Ra2, Ra3, and Ra4 from the most significant byte respectively, and that four pieces of byte data stored in the register Rb are Rb1, Rb2, Rb3, and Rb4 from the most significant byte respectively, the processor 1 may cover SIMD operation instructions executed on the register Ra and the register Rb, the instructions for performing operations on byte data in a diagonally crossed position in parallel, which are as listed below:

(i) One Symmetric Cross Instruction

Four parallel SIMD operation instruction executed on each of the following: Ra1 and Rb4; Ra2 and Rb3; Ra3 and Rb2; and Ra4 and Rb1;

(ii) Two Symmetric Cross Instruction

Four parallel SIMD operation instruction executed on each of the following: Ra1 and Rb2; Ra2 and Rb1; Ra3 and Rb4; and Ra4 and Rb3; and (iii) Double Cross Instruction Four parallel SIMD operations instruction executed on each of the following: Ra1 and Rb3; Ra2 and Rb4; Ra3 and Rb1; and Ra4 and Rb2.

These three types of SIMD operations executed on four data elements in parallel can be applied to all of addition, subtraction, multiplication, sum of products, and difference of products, as in the case of the aforementioned two-parallel SIMD operations. Furthermore, regarding multiplication, sum of products, and difference of products, the following instructions may be supported as in the case of the above two-parallel SIMD operation instructions (e.g. vxmul, vxfmulh, vxfmulw): an instruction capable of SIMD storage of only the lower bytes of each of four operation results to the register Rc or the like; an instruction capable of SIMD storage of only the higher bytes of each of four operation results to the register Rc or the like; and an instruction capable of SIMD storage of only two of four operation results to the register Rc or the like.

Note that three types of operations performed on data in the above-listed diagonally crossed positions can be generalized and represented as follows. Assuming that an operand is a set of data comprised of the "i"th data in a data array in the first data group made up of "n" data elements and the "j"th data in a data array in the second data group made up of "n" data elements, the following relationships are established:

in (i) One symmetric cross instruction, $j=n-i+1$;

in (ii) Two symmetric cross instruction, $j=i-(-1)\bigcirc(i \bmod 2)$; and in (iii) Double cross instruction, $j=n-i+1+(-1)\bigcirc(i \bmod 2)$.

Note that "$\bigcirc$" denotes exponentiation and "mod" denotes modulo here.

The above instructions are effective in a case where operations are performed simultaneously on two complex numbers such as in a case of inner products of complex numbers.

(2) Instructions for Performing SIMD Binary Operations with One of Two Operands being Fixed:

Next, an explanation is given for instructions for performing operations with one of two operands fixed (one of the operands is fixed as the common operand), out of two parallel SIMD operations.

[Instruction vhaddh]

Instruction vhaddh is a SIMD instruction for adding two sets of operands, one of which (the higher 16 bits of a register) is fixed as the common operand, on a per half word (16 bits) basis. For example, when vhaddh Rc, Ra, Rb the processor 1 behaves as follows by using the arithmetic and logic/comparison operation unit 41 and the like:

(i) adds the higher 16 bits of the register Ra to the higher 16 bits of the register Rb, stores the result in the higher 16 bits of the register Rc, and in parallel with this, (ii) adds the lower 16 bits of the register Ra to the higher 16 bits of the register Rb, and stores the result in the lower 16 bits of the register Rc.

The above instruction is effective in the case where SIMD is difficult to be applied to add and subtract operations to be executed on elements in two arrays due to misalignment between such arrays.

Note that the processor 1 performs processing equivalent to this add instruction for subtract instructions (vhsubh etc.).

[Instruction vhmul]

Instruction vhmul is a SIMD instruction for multiplying two sets of operands, one of which (the higher 16 bits of a register) is fixed as the common operand, on a per half word (16 bits) basis, and retaining the lower half words of the respective results (SIMD storage). For example, when vhmul Rc, Ra, Rb the processor 1 behaves as follows by using the multiplication/sum of products operation unit 44 and the like:

(i) multiplies the higher 16 bits of the register Ra by the higher 16 bits of the register Rb, stores the multiplication result in the higher 16 bits of the operation register MHm and the higher 16 bits of the operation register MLm, as well as storing the lower 16 bits of such multiplication result in the higher 16 bits of the register Rc, and in parallel with this, (ii) multiplies the lower 16 bits of the register Ra by the higher 16 bits of the register Rb, and stores the multiplication result in the lower 16 bits of the operation register MHm and the lower 16 bits of the operation register MLm, as well as storing the lower 16 bits of such multiplication result in the lower 16 bits of the register Rc.

The above instruction is effective in a case where SIMD is difficult to be applied, due to misaligned elements, when all elements are multiplied by coefficients such as in a case of gain control where such operation is performed by means of loop iteration and SIMD parallel processing. Basically, this instruction is used in a pair (alternately) with an instruction to be executed by fixing the lower bytes (lower-byte-fixed instruction) described below. Taking out the lower bits of a result is effective when handling integer data (mainly images).

[Instruction vhfmulh]

Instruction vhfmulh is a SIMD instruction for multiplying two sets of operands, one of which (the higher 16 bits of a register) is fixed as the common operand, on a per half word (16 bits) basis, and retaining the higher half words of the respective results (SIMD storage). For example, when vhfmulh Rc, Ra, Rb the processor 1 behaves as follows by using the multiplication/sum of products operation unit 44 and the like:

(i) multiplies the higher 16 bits of the register Ra by the higher 16 bits of the register Rb, stores the multiplication result in the higher 16 bits of the operation register MHm and the higher 16 bits of the operation register MLm, as well as storing the higher 16 bits of such multiplication result in the higher 16 bits of the register Rc, and in parallel with this, (ii) multiplies the lower 16 bits of the register Ra by the higher 16 bits of the register Rb, and stores the multiplication result in the lower 16 bits of the operation register MHm and the lower 16 bits of the operation register MLm, as well as storing the higher 16 bits of such multiplication result in the lower 16 bits of the register Rc.

The above instruction is effective as in the above case. Taking out the higher bits of a result is effective when handling fixed point data. This instruction can be applied to a standard format (MSB-aligned) known as Q31/Q15.

[Instruction vhfmulw]

Instruction vhfmulw is a SIMD instruction for multiplying two sets of operands, one of which (the higher 16 bits of a register) is fixed as the common operand, on a per half word (16 bits) basis, and retaining only one of the two multiplication results (non-SIMD storage). For example, when vhfmulw Rc, Ra, Rb the processor 1 behaves as follows by using the multiplication/sum of products operation unit 44 and the like:

(i) multiplies the higher 16 bits of the register Ra by the higher 16 bits of the register Rb, stores the multiplication result in the higher 16 bits of the operation register MHm and the higher 16 bits of the operation register MLm, as well as storing such multiplication result (word) in the register Rc, and in parallel with this, (ii) multiplies the lower 16 bits of the register Ra by the higher 16 bits of the register Rb, and stores the multiplication result in the lower 16 bits of the operation register MHm and the lower 16 bits of the operation register MLm (not to be stored in the register Rc).

The above instruction is effective when assuring precision.

[Instruction vhmac]

Instruction vhmac is a SIMD instruction for calculating the sum of products of two sets of operands, one of which (the higher 16 bits of a register) is fixed as the common operand, on a per half word (16 bits) basis, and retaining the lower half words of the respective results (SIMD storage). For example, when vhmac Mm, Rc, Ra, Rb, Mn the processor 1 behaves as follows by using the multiplication/sum of products operation unit 44 and the like:

(i) multiplies the higher 16 bits of the register Ra by the higher 16 bits of the register Rb, adds this multiplication result to 32 bits consisting of the higher 16 bits of the operation registers MHn and MLn, stores the 32 bits of the addition result in a 32-bit area consisting of the higher 16 bits of the operation registers MHm and MLm, as well as storing the lower 16 bits of such addition result in the higher 16 bits of the register Rc, and in parallel with this, (ii) multiplies the lower 16 bits of the register Ra by the higher 16 bits of the register Rb, adds this multiplication result to 32 bits consisting of the lower 16 bits of the operation registers MHn and MLn, stores the 32 bits of the addition result in a 32-bit area consisting of the lower 16 bits of the operation registers MHm and MLm, as well as storing the lower 16 bits of such addition result in the lower 16 bits of the register Rc.

The above instruction is effective in the case where SIMD is difficult to be applied to FIR (filter), due to misaligned elements, in which such filtering is performed by means of loop iteration and SIMD parallel processing. Basically, this instruction is used in a pair (alternately) with a lower byte-fixed instruction described below. Taking out the lower bits of a result is effective when handling integer data (mainly images).

[Instruction vhfmach]

Instruction vhfmach is a SIMD instruction for calculating the sum of products of two sets of operands, one of which (the higher 16 bits of a register) is fixed as the common operand, on a per half word (16 bits) basis, and retaining the higher half words of the respective results (SIMD storage). For example, when vhfmach Mm, Rc, Ra, Rb, Mn the processor 1 behaves as follows by using the multiplication/sum of products operation unit 44 and the like:

(i) multiplies the higher 16 bits of the register Ra by the higher 16 bits of the register Rb, adds this multiplication result to 32 bits consisting of the higher 16 bits of the operation registers MHn and MLn, stores the 32 bits of the addition result in a 32-bit area consisting of the higher 16 bits of the operation registers MHm and MLm, as well as storing the higher 16 bits of such addition result in the higher 16 bits of the register Rc, and in parallel with this, (ii) multiplies the lower 16 bits of the register Ra by the higher 16 bits of the register Rb, adds this multiplication result to 32 bits consisting of the lower 16 bits of the operation registers MHn and MLn, stores the 32 bits of the addition result in a 32-bit area consisting of the lower 16 bits of the operation registers MHm and MLm, as well as storing the higher 16 bits of such addition result in the lower 16 bits of the register Rc.

The above instruction is effective as in the above case. Taking out the higher bits of a result is effective when handling fixed point data. This instruction can be applied to a standard format (MSB-aligned) known as Q31/Q15.

[Instruction vhfmacw]

Instruction vhfmacw is a SIMD instruction for multiplying two sets of operands, one of which (the higher 16 bits of a register) is fixed as the common operand, on a per half word (16 bits) basis, and retaining only one of the two multiplication results (non-SIMD storage). For example, when vhfmacw Mm, Rc, Ra, Rb, Mn the processor 1 behaves as follows using the multiplication/sum of products operation unit 44 and the like:

(i) multiplies the higher 16 bits of the register Ra by the higher 16 bits of the register Rb, adds this multiplication result to 32 bits consisting of the higher 16 bits of the operation registers MHn and MLn, stores the 32 bits of the addition result in a 32-bit area consisting of the higher 16 bits of the operation registers MHm and MLm, as well as storing the 32 bits of such addition result in the register Rc, and in parallel with this, (ii) multiplies the lower 16 bits of the register Ra by the higher 16 bits of the register Rb, adds this multiplication result to 32 bits consisting of the lower 16 bits of the operation registers MHn and MLn, stores the 32 bits of the addition result in a 32-bit area consisting of the lower 16 bits of the operation registers MHm and MLm (not to be stored in the register Rc).

The above instruction is effective when assuring precision.

Note that the processor 1 performs processing equivalent to these sum of products instructions for difference of products instructions (vhmsu, vhmsuh, vhmsuw etc.).

Also note that although the higher 16 bits of a register is fixed (fixed as common) in the above instructions, the processor 1 is capable of performing processing equivalent to the above processing for instructions (vladdh, vlsubh, vlmul, vlfmulh, vlfmulw, vlmac, vlmsu, vlfmach, vlmsuh, vlfmacw, vlmsuw etc.) in which the lower 16 bits of a register is fixed (fixed as common). Such instructions are effective when used in a pair with the above higher byte-fixed instructions.

Also note that the processor 1 is capable of performing not only operations (addition, subtraction, multiplication, sum of products, and difference of products under two parallel SIMD instruction) on two sets of operands, one of which (the higher 16 bits of a register) is fixed as the common operand as described above, but also extended operations (four parallel, eight parallel SIMD operations etc.) to be performed on "n" sets of operands.

For example, assuming that four pieces of byte data stored in the register Ra are Ra1, Ra2, Ra3, and Ra4 from the most significant byte respectively, and that four pieces of byte data stored in the register Rb are Rb1, Rb2, Rb3, and Rb4 from the most significant byte respectively, the processor 1 may cover SIMD operation instructions executed on the register Ra and the register Rb, the instructions for executing parallel operations on byte data wherein one of the two operands (1 byte in a register) is fixed as the common operand, which are as listed below:

(i) Most Significant Byte-Fixed Instruction

Four parallel SIMD operation instruction executed on each of the following: Ra1 and Rb1; Ra2 and Rb1; Ra3 and Rb1; and Ra4 and Rb1;

(ii) Second Most Significant Byte-Fixed Instruction

Four parallel SIMD operations instruction executed on each of the following: Ra1 and Rb2; Ra2 and Rb2; Ra3 and Rb2; and Ra4 and Rb2;

(iii) Second Least Significant Byte-Fixed Instruction

Four parallel SIMD operations instruction executed on each of the following: Ra1 and Rb3; Ra2 and Rb3; Ra3 and Rb3; and Ra4 and Rb3; and (iv) Second Least Significant Byte-Fixed Instruction Four parallel SIMD operations instruction executed on each of the following: Ra1 and Rb4; Ra2 and Rb4; Ra3 and Rb4; and Ra4 and Rb4.

These four types of SIMD operations executed on four data elements in parallel can be applied to all of addition, subtraction, multiplication, sum of products, and difference of products, as in the case of the aforementioned two parallel SIMD operations. Furthermore, regarding multiplication, sum of products, and difference of products, the following instructions may be supported as in the case of the above two parallel SIMD operation instructions (e.g. vhmul, vhfmulh, vhfmulw): an instruction capable of SIMD storage of only the lower bytes of each of four operation results to the register Rc or the like; an instruction capable of SIMD storage of only the higher bytes of each of four operation results to the register Rc or the like; and an instruction capable of SIMD storage of only two of four operation results to the register Rc or the like. These instructions are effective in a case where operations are performed on each element by shifting one of the two elements one by one. This is because operations performed on one element shifted, two elements shifted and three elements shifted, are required.

Note that three types of operations performed for data wherein one of the two operands is fixed as the common operand, can be generalized and represented as follows. As a SIMD instruction which includes the first operand specifying the first data group containing a data array comprised of "n"(≧2) pieces of data and the second operand specifying the second data group containing a data array comprised of "n" pieces of data, the processor 1 may perform operations on each of "n" sets of operands, each made up of "i"th data in the first data group and the "j"th data in the second data group when "i"=1, 2, . . . , "n", and "j"=a fixed value.

(3) Instruction for Performing SIMD Binary Operations and Performing Bit Shifts of the Results:

Next, an explanation is given for an instruction for performing operations on operands in a diagonally crossed position, out of two parallel SIMD operations.

[Instruction vaddsh]

Instruction vaddsh is a SIMD instruction for adding two sets of operands on a per half word (16 bits) basis, and performing an arithmetic shift right of the result only by 1 bit. For example, when vaddsh Rc, Ra, Rb the processor 1 behaves as follows by using the arithmetic and logic/comparison operation unit 41 and the like:

(i) adds the higher 16 bits of the register Ra to the higher 16 bits of the register Rb, stores in the higher 16 bits of the register Rc the value obtained as a result of performing an arithmetic shift right of the result only by one bit, and in parallel with this, (ii) adds the lower 16 bits of the register Ra to the lower 16 bits of the register Rb, and stores in the lower 16 bits of the register Rc the value obtained as a result of performing an arithmetic shift right of the result only by one bit.

The above instruction is effective when precision needs to be assured by shifting down a result of addition before data exceeds 16-bit precision. Some results need to be rounded. This instruction is frequently utilized for fast Fourier transform (butterfly) which involves repetitive additions and subtractions performed on complex numbers.

Note that the processor 1 performs processing equivalent to this add instruction for subtract instructions (vsubsh etc.).

Also note that the processor 1 is capable of performing not only operations (addition and subtraction under two parallel SIMD instruction) on two sets of operands as described above, but also extended operations (four-parallel, eight-parallel SIMD operations etc.) performed on "n" sets of operands.

For example, assuming that four pieces of byte data stored in the register Ra are Ra1, Ra2, Ra3, and Ra4 from the most significant byte respectively, and that four pieces of byte data stored in the register Rb are Rb1, Rb2, Rb3, and Rb4 from the most significant byte respectively, the processor 1 may cover SIMD operation instructions executed on the register Ra and the register Rb, the instructions for performing such an operation and a bit shift, that is to say, a SIMD operation instruction for performing operations in parallel on the following fours sets of operands: Ra1 and Rb1, Ra2 and Rb2, Ra3 and Rb3, and Ra4 and Rb4 as its operand, respectively. An example of such instruction is Instruction vaddsb which performs additions on four sets of operands on a per byte basis, and performs an arithmetic shift right of the respective results only by 1 bit.

The above instruction is effective when assuring precision as in the above case, and is mainly used when calculating an average (a vertical average).

Also note that this characteristic instruction which performs SIMD operations and shifts is not limited to an instruction for performing a shift only by 1 bit to the right as described above. This means that the amount of a shift may be either fixed or variable, and such a shift may be performed either to the right or o the left. Moreover, overflow bits resulted from a shift right may be rounded (e.g. Instruction vaddsrh and Instruction vaddsrb).

(4) Instructions for Accumulating and Adding SIMD (Vector) Data so as to Convert Such Vector Data into Scalar Data or into a Lower Dimensional Vector:

Next, an explanation is given for a SIMD instruction for converting vector data into scalar data or into a lower dimensional vector.

[Instruction vsumh]

Instruction vsumh is a SIMD instruction for adding two pieces of SIMD data (vector data) on a per half word (16 bits) basis so as to convert such vector data into scalar data. For example, when vsumh Rb, Ra the processor 1, by using the arithmetic and logic/comparison operation unit 41 and the like, adds the higher 16 bits of the register Ra to the lower 16 bits of the register Ra, and stores the result in the register Rb.

The above instruction can be employed for various purposes such as calculating an average (horizontal average), summing up results of operations (sum of products and addition) obtained individually.

[Instruction vsumh2]

Instruction vsumh2 is a SIMD instruction for accumulating and adding elements of two sets of operands, each set made up of two pieces of SIMD data (vector data), on a per byte basis, so as to convert them into scalar data. For example, when vsumh2 Rb, Ra the processor 1 behaves as follows by using the arithmetic and logic/comparison operation unit 41 and the like:

(i) accumulates and adds the most significant byte and the second most significant byte in the register Ra, stores the result in the higher 16 bits of the register Rb, and in parallel with this, (ii) accumulates and adds the second least significant byte and the least significant byte in the register Ra, and stores the result in the lower 16 bits of the register Rb.

This is effective as an instruction intended for image processing, motion compensation (MC) and halfpels.

Note that the processor 1 is capable of performing not only the above operation for converting two parallel SIMD data into scalar data, but also an extended operation for converting "n" parallel SIMD data made up of "n" (e.g. 4, 8) pieces of elements into scalar data.

For example, assuming that four pieces of byte data stored in the register Ra are Ra1, Ra2, Ra3, and Ra4 from the most significant byte respectively, the processor 1 may cover an operation instruction for accumulating and adding Ra1, Ra2, Ra3, and Ra4, and storing the result in the register Rb.

Furthermore, not only is it possible for the processor 1 to convert a vector containing more than one piece of element data into a scalar containing only one element data, the processor 1 may also turn a vector into a lower dimensional vector containing a reduced number of elements data.

Also, addition is not the only operation type to which the above instruction is used, and therefore an operation for calculating an average value is also in the scope of application. This instruction is effective for such purposes as calculating an average, and summing up operation results.

(5) Other SIMD Instructions:

Next, an explanation is given for other SIMD instructions which do not belong to the aforementioned instruction categories.

[Instruction vexth]

Instruction vexth is a SIMD instruction for performing sign extension on each of two pieces of SIMD data on a per half word (16 bits) basis. For example, when vexth Mm, Rb, Ra the processor 1 behaves as follows by using the saturation block (SAT) 47*a* and the like of the converter 47:

(i) performs sign extension for the higher 16 bits of the register Ra so as to extend it to 32 bits, stores the result in the higher 16 bits of the operation register MHm and the higher 16 bits of the operation register MLm, and in parallel with this, (ii) performs sign extension for the lower 16 bits of the register Ra so as to extend it to 32 bits, stores the result in the lower 16 bits of the operation register MHm and the lower 16 bits of the operation register MLm, and in parallel with this, (iii) stores the 32 bits of the register Ra in the register Rb.

Note that "sign extension" is to lengthen data without changing its sign information. An example is to convert a signed value represented as a half word into the same value represented as a word. More specifically, sign extension is a process for filling extended higher bits with a sign bit (the most significant bit) of its original data.

The above instruction is effective when transferring SIMD data to the accumulators (when precision is required).

[Instruction vasubb]

Instruction vasubb is a SIMD instruction for performing a subtraction on each of four sets of SIMD data on a per byte basis, and storing the resulting four signs in the condition flag register. For example, when vasubb Rc, Rb, Ra the processor 1 behaves as follows using the arithmetic and logic/comparison operation unit 41 and the like:

(i) subtracts the most significant 8 bits of the register Ra from the most significant 8 bits of the register Rb, stores the result in the most significant 8 bits of the register Rc, as well as storing the resulting sign in the VC3 of the condition flag register (CFR) 32, and in parallel with this, (ii) subtracts the second most significant 8 bits of the register Ra from the second most significant 8 bits of the register Rb, stores the result in the second most significant 8 bits of the register Rc, as well as storing the resulting sign in the VC2 of the condition flag register (CFR) 32 and in parallel with this, (iii) subtracts the second least significant 8 bits of the register Ra from the second least significant 8 bits of the register Rb, stores the result in the second least significant 8 bits of the register Rc, as well as storing the resulting sign in the VC1 of the condition flag register (CFR) 32, and in parallel with this, (iv) subtracts the least significant 8 bits of the register Ra from the least significant 8 bits of the register Rb, stores the result in the least significant 8 bits of the register Rc, as well as storing the resulting sign in the VC0 of the condition flag register (CFR) 32.

The above instruction is effective when 9-bit precision is temporally required for obtaining a sum of absolute value differences.

[Instruction vabssumb]

Instruction vabssumb is a SIMD instruction for adding absolute values of respective four sets of SIMD data on a per byte basis, and adding the result to other 4-byte data. For example, when vabssumb Rc, Ra, Rb the processor 1, by using the arithmetic and logic/comparison operation unit 41 and the like, adds the absolute value of the most significant 8 bits, the absolute value of the second most significant 8 bits, the absolute value of the second least significant 8 bits and the absolute value of the least significant 8 bits of the register Ra, adds the result to the 32 bits of the register Rb, and stores such result in the register Rc. Note that the processor 1 uses the flags VC0–VC3 of the condition flag register (CFR) 32 to identify the absolute value of each byte stored in the register Ra.

The above instruction is effective for calculating a sum of absolute value differences in motion estimation as part of image processing, since when this instruction is used in combination with the aforementioned Instruction vasubb, a value resulting from summing up the absolute values of differences among a plurality of data pairs can be obtained after calculating the difference of each of such plurality of data pairs.

(6) Instructions Concerning Mask Operation and Others:

Next, an explanation is given for non-SIMD instructions for performing characteristic processing.

[Instruction addmsk]

Instruction addmsk is an instruction for performing addition by masking some of the bits (the higher bits) of one of two operands. For example, when addmsk Rc, Ra, Rb the processor 1, by using the arithmetic and logic/comparison operation unit 41, the converter 47 and the like, adds data stored in the register Ra and the register Rb only within the range (the lower bits) specified by the BPO of the condition flag register (CFR) 32 and stores the result in the register Rc. At the same time, as for data in the unspecified range (the higher bits), the processor 1 stores the value of the register Ra in the register Rc directly.

The above instruction is effective for supporting modulo addressing (which is commonly employed in DSP). This instruction is required when reordering data into a specific pattern in advance as a preparation for a butterfly operation.

Note that the processor 1 performs processing equivalent to this add instruction for subtract instructions (submsk etc.).

[Instruction mskbrvh]

Instruction mskbrvh is an instruction for concatenating bits of two operands after sorting some of the bits (the lower bits) of one of the two operands in reverse order. For example, when mskbrvh Rc, Ra, Rb the processor 1, by using the converter 47 and the like, concatenates data of the register Ra and data of the register Rb at a bit position specified by the BPO of the condition flag register (CFR) 32 after sorting the lower 16 bits of the register Rb in reverse order, and stores the result in the register Rc. When this is done, of the higher 16 bits of the register Rb, the part lower than the position specified by the BPO is masked to 0.

The above instruction, which supports reverse addressing, is required for reordering data into a specific pattern in advance as a preparation for a butterfly operation.

Note that the processor 1 performs processing equivalent to this instruction not only for instructions for sorting 16 bits in reverse order, but also for instructions for reordering 1 byte and other areas in reverse order (mskbrvb etc.).

[Instruction msk]

Instruction msk is an instruction for masking (putting to 0) an area sandwiched between specified two bit positions, or masking the area outside such area, out of the bits making up the operands. For example, when msk Rc, Rb, Ra the processor 1 behaves as follows by using the converter 47 and the like:

(i) when Rb[12:8]≧Rb[4:0], while leaving as it is an area from a bit position designated by the 0~4$^{th}$ 5-bit Rb [4:0] of the register Rb to a bit position designated by the 8~12$^{th}$ 5-bit Rb [12:8] of the register Rb, out of the 32 bits stored in the register Ra, masks (puts to 0) the other bits so as to store such masked bits in the register Rc, (ii) when Rb[12:8]<Rb[4:0], while masking (putting to 0) an area from a bit position designated by the 8~12$^{th}$ 5-bit Rb [12:8] of the register Rb to a bit position designated by the 0~4$^{th}$ 5-bit Rb [4:0] of the register Rb, out of the 32 bits stored in the register Ra, leaves the other bits as they are so as to store such bits in the register Rc.

The above instruction can be used for the extraction and insertion (construction) of bit fields, and when VLD/VLC is carried out by using software.

[Instruction bseq]

Instruction bseq is an instruction for counting the number of consecutive sign bits from 1 bit below the MSB of an operand. For example, when bseq Ra, Rb the processor 1, by using the BSEQ block 47*b* of the converter 47 and the like, counts the number of consecutive sign bits from one bit below the register Ra, and stores the result in the register Rb. When the value of the register Ra is 0, 0 is stored in the register Rb.

The above instruction can be used for detecting significant digits. Since a wide dynamic range is concerned, floating point operations need to be performed for some parts. This instruction can be used, for example, for normalizing all data in accordance with data with the largest number of significant digits in the array so as to perform an operation.

[Instruction ldbp]

Instruction ldbp is an instruction for performing sign extension for 2-byte data from a memory and loading such data into a register. For example, when ldbp Rb: Rb+1, (Ra, D9)

the processor 1, by using the I/F unit 50 and the like, performs sign extension for two pieces of byte data from an address resulted from adding a displacement value (D9) to the value of the register Ra, and loads such two data elements respectively into the register Ra and a register (Ra+1).

The above instruction contributes to a faster data supply.

Note that the processor 1 performs processing equivalent to this load instruction (load which involves sign extension) not only for loading data into two registers but also for loading data into the higher half word and the lower half word of a single register (ldbh etc.).

[Instruction rde]

Instruction rde is an instruction for reading a value of an external register and generating an error exception when such reading ends in failure. For example, when rde C0: C1, Rb, (Ra, D5)

the processor 1, by using the I/F unit 50 and the like, defines a value resulted from adding a displacement value (D5) to the value of the register Ra as an external register number and reads the value of such external register (extended register unit 80) into the register Rb, as well as outputting whether such reading ended in success or failure to the condition flags C0 and C1 of the condition flag register (CFR) 32. When reading fails, an extended register error exception is generated.

The above instruction is effective as an instruction for controlling a hardware accelerator. An exception is generated when the hardware accelerator returns an error, which will be reflected to flags.

Note that the processor 1 performs processing equivalent to this read instruction (setting of flags, generation of an exception) not only for data reading from the external register but also for data writing to the external register (Instruction wte).

[Instruction addarvw]

Instruction addarvw is an instruction for performing an addition intended for rounding an absolute value (rounding away from 0). For example, when addarvw Rc, Rb, Ra the processor 1, by using the arithmetic and logic/comparison operation unit 41 and the like, adds the 32 bits of the register Ra and the 32 bits of the register Rb, and rounds up a target bit if the result is positive, while rounding off a target bit if the result is negative. To be more specific, the processor 1 adds the values of the registers Ra and Rb, and adds 1 if the value of the register Ra is positive. Note that when an absolute value is rounded, a value resulting from padding, with 1, bits lower than the bit to be rounded is stored in the register Rb.

The above instruction is effective for add IDCT (Inverse Discrete Cosine Transform) intended for rounding an absolute value (rounding away from 0).

What is claimed is:

1. A SIMD (Single Instruction Multiple Data) processor for performing a SIMD operation on a plurality of data pairs, wherein each data pair of the plurality of data pairs is made up of one piece of data belonging to a first data group and one piece of data belonging to a second data group, and at least one data pair among the plurality of data pairs is made up of pieces of data in different positions of the first data group and the second data group, said SIMD processor comprising:

a decoding unit operable to decode an instruction; and an execution unit operable to execute the instruction according to a result of the decoding performed by said decoding unit, wherein:

when a SIMD instruction including (i) an operation code specifying an operation type, (ii) a first operand specifying the first data group containing a data array comprised of n pieces of data, n being $\geqq 2$, and (iii) a second operand specifying the second data group containing a data array comprised of n pieces of data, is decoded by said decoding unit, said execution unit is operable to perform an operation specified by the operation code on n data pairs, each of the n data pairs being made up of one piece of data belonging to the first data group and one piece of data belonging to the second data group;

at least one data pair among the n data pairs is made up of an i-th data in the data array of the first data group and a j-th data in the data array of the second data group, j being not equal to i;

the operation code specifies the operation type without including any fields specifying data in the n data pairs; and said execution unit is operable to execute the operation specified by the operation code simultaneously on the n data pairs, based on the result of the decoding performed by said decoding unit.

2. The SIMD processor according to claim 1, wherein:

n is 2;

the data array of the first data group comprises first data and second data;

the data array of the second data group comprises first data and second data; and said execution unit is operable to perform the operation on a data pair made up of the first data in the data array of the first data group and the second data in the data array of the second data group, and on a data pair made up of the second data in the data array of the first data group and the first data in the data array of the second data group.

3. The SIMD processor according to claim 2, wherein:

the operation type specified by the operation code is one of multiplication, sum of products, and difference of products;

the instruction includes a third operand specifying third data for storing operation results; and said execution unit is operable to store, into the third data, a lower-bit part of a result obtained by performing the operation on the data pair made up of the first data in the data array of the first data group and the second data in the data array of the second data group, and a lower-bit part of a result obtained by performing the operation on the data pair made up of the second data in the data array of the first data group and the first data in the data array of the second data group.

4. The SIMD processor according to claim 2, wherein:

the operation type specified by the operation code is one of multiplication, sum of products, and difference of products;

the instruction includes a third operand specifying third data for storing operation results; and said execution unit is operable to store, into the third data, a higher-bit part of a result obtained by performing the operation on the data pair made up of the first data in the data array of the first data group and the second data in the data array of the second data group, and a higher-bit part of a result obtained by performing the operation on the data pair made up of the second data in the data array of the first data group and the first data in the data array of the second data group.

5. The SIMD processor according to claim 2, wherein:

the operation type specified by the operation code is one of multiplication, sum of products, and difference of products;

the instruction includes a third operand specifying third data for storing operation results; and said execution unit is operable to store one of (a) a result obtained by performing the operation on the data pair made up of the first data in the data array of the first data group and the second data in the data array of the second data group, and (b) a result obtained by performing the operation on the data pair made up of the second data in the data array of the first data group and the first data in the data array of the second data group in the third data.

6. The SIMD processor according to claim 1, wherein:

n is 4;

the data array of the first data group comprises first to fourth data;

the data array of the second data group comprises first to fourth data; and said execution unit performs the operation on (a) a data pair made up of the first data in the data array of the first data group and the fourth data in the data array of the second data group, (b) a data pair made up of the second data in the data array of the first data group and the third data in the data array of the second data group, (c) a data pair made up of the third data in the data array of the first data group and the second data in the data array of the second data group, and (d) a data pair made up of the fourth data in the data array of the first data group and the first data in the data array of the second data group.

7. The SIMD processor according to claim 1, wherein:

n is 4;

the data array of the first data group comprises first to fourth data;

the data array of the second data group comprises first to fourth data; and said execution unit is operable to perform the operation on (a) a data pair made up of the first data in the data array of the first data group and the second data in the data array of the second data group, (b) a data pair made up of the second data in the data array of the first data group and the first data in the data array of the second data group, (c) a data pair made up of the third data in the data array of the first data group and the fourth data in the data array of the second data group, and (d) a data pair made up of the fourth data in the data array of the first data group and the third data in the data array of the second data group.

8. The SIMD processor according to claim 1, wherein:

n is 4;

the data array of the first data group comprises first to fourth data;

the data array of the second data group comprises first to fourth data; and said execution unit is operable to perform the operation on (a) a data pair made up of the first data in the data array of the first data group and the third data in the data array of the second data group, (b) a data pair made up of the second data in the data array of the first data group and the fourth data in the data array of the second data group, (c) a data pair made up of the third data in the data array of the first data group and the first data in the data array of the second data group, and (d) a data pair made up of the fourth data in the data array of the first data group and the second data in the data array of the second data group.

9. The SIMD processor according to claim 6, wherein:

the operation type specified by the operation code is one of multiplication, sum of products, and difference of products;

the instruction includes a third operand specifying third data for storing operation results; and said execution unit is operable to store, into the third data, a lower-bit part of respective results obtained by performing the operation on each of the four data pairs.

10. The SIMD processor according to claim 6, wherein:

the operation type specified by the operation code is one of multiplication, sum of products, and difference of products;

the instruction includes a third operand specifying third data for storing operation results; and said execution unit is operable to store, into the third data, a higher-bit part of respective results obtained by performing the operation on each of the four data pairs.

11. The SIMD processor according to claim 6, wherein:

the operation type specified by the operation code is one of multiplication, sum of products, and difference of products;

the instruction includes a third operand specifying third data for storing operation results; and said execution unit is operable to store, into the third data, two of four results obtained by performing the operation on each of the four data pairs.

12. The SIMD processor according to claim 1, wherein said execution unit is operable to perform the operation on each of the n data pairs, each of the n data pairs being made up of the i-th data in the first data group and the j-th data in the second data group, when i=1, 2, . . . , n, and j=a fixed value.

13. The SIMD processor according to claim 1, wherein:

n is 2;

the data array of the first data group comprises first data and second data;

the data array of the second data group comprises first data and second data; and said execution unit is operable to perform the operation on a data pair made up of the first data in the data array of the first data group and the first data in the data array of the second data group, and on a data pair made up of the second data in the data array of the first data group and the first data in the data array of the second data group.

14. The SIMD processor according to claim 1, wherein:

n is 2;

the data array of the first data group comprises first data and second data;

the data array of the second data group comprises first data and second data; and said execution unit is operable to perform the operation on a data pair made up of the first data in the data array of the first data group and the second data in the data array of the second data group, and on a data pair made up of the second data in the data array of the first data group and the second data in the data array of the second data group.

15. The SIMD processor according to claim 1, wherein:

n is 2;

the data array of the first data group comprises first data and second data;

the data array of the second data group comprises first data and second data; and said execution unit is operable to perform the operation on (a) a data pair made up of the first data in the data array of the first data group and the first data in the data array of the second data group, and on a data pair made up of the second data in the data array of the first data group and the first data in the data array of the second data group, when a first instruction is decoded by said decoding unit, and on (b) a data pair made up of the first data in the data array of the first data group and the second data in the data array of the second data group, and on a data pair made up of the second data in the data array of the first data group and the second data in the data array of the second data group, when a second instruction is decoded by said decoding unit.

16. The SIMD processor according to claim 13, wherein:

the operation type specified by the operation code is one of multiplication, sum of products, and difference of products;

the instruction includes a third operand specifying third data for storing operation results; and said execution unit is operable to store, into the third data, a lower-bit part of respective results obtained by performing the operation on each of the two data pairs.

17. The SIMD processor according to claim 13, wherein:

the operation type specified by the operation code is one of multiplication, sum of products, and difference of products;

the instruction includes a third operand specifying third data for storing operation results; and said execution unit is operable to store, into the third data, a higher-bit part of respective results obtained by performing the operation on each of the two data pairs.

18. The SIMD processor according to claim 13, wherein:

the operation type specified by the operation code is one of multiplication, sum of products, and difference of products;

the instruction includes a third operand specifying third data for storing operation results; and said execution unit is operable to store, into the third data, one of two results obtained by performing the operation on each of the two data pairs.

19. The SIMD processor according to claim 1, wherein:

n is 4, the data array of the first data group comprises first to fourth data;

the data array of the second data group comprises first to fourth data; and said execution unit is operable to perform the operation on (a) a data pair made up of the first data in the data array of the first data group and the first data in the data array of the second data group, (b) a data pair made up of the second data in the data array of the first data group and the first data in the data array of the second data group, (c) a data pair made up of the third data in the data array of the first data group and the first data in the data array of the second data group, and (d) a data pair made up of the fourth data in the data array of the first data group and the first data in the data array of the second data group.

20. The SIMD processor according to claim 1, wherein:

n is 4;

the data array of the first data group comprises first to fourth data;

the data array of the second data group comprises first to fourth data; and said execution unit is operable to perform the operation on (a) a data pair made up of the first data in the data array of the first data group and the second data in the data array of the second data group, (b) a data pair made up of the second data in the data array of the first data group and the second data in the data array of the second data group, (c) a data pair made up of the third data in the data array of the first data group and the second data in the data array of the second data group, and (d) a data pair made up of the fourth data in the data array of the first data group and the second data in the data array of the second data group.

21. The SIMD processor according to claim 1, wherein:

n is 4;

the data array of the first data group comprises first to fourth data;

the data array of the second data group comprises first to fourth data; and said execution unit is operable to perform the operation on (a) a data pair made up of the first data in the data array of the first data group and the third data in the data array of the second data group, (b) a data pair made up of the second data in the data array of the first data group and the third data in the data array of the second data group, (c) a data pair made up of the third data in the data array of the first data group and the third data in the data array of the second data group, and (d) a data pair made up of the fourth data in the data array of the first data group and the third data in the data array of the second data group.

22. The SIMD processor according to claim 1, wherein:

n is 4;

the data array of the first data group comprises first to fourth data;

the data array of the second data group comprises first to fourth data; and said execution unit is operable to perform the operation on (a) a data pair made up of the first data in the data array of the first data group and the fourth data in the data array of the second data group, (b) a data pair made up of the second data in the data array of the first data group and the fourth data in the data array of the second data group, (c) a data pair made up of the third data in the data array of the first data group and the fourth data in the data array of the second data group, and (d) a data pair made up of the fourth data in the data array of the first data group and the fourth data in the data array of the second data group.

23. The SIMD processor according to claim 19, wherein:

the operation type specified by the operation code is one of multiplication, sum of products, and difference of products; the instruction includes a third operand specifying third data for storing operation results; and said execution unit is operable to store, into the third data, a lower-bit part of respective results obtained by performing the operation on each of the four data pairs.

24. The SIMD processor according to claim 19, wherein:

the operation type specified by the operation code is one of multiplication, sum of products, and difference of products;

the instruction includes a third operand specifying third data for storing operation results; and said execution unit is operable to store, into the third data, a higher-bit part of respective results obtained by performing the operation on each of the four data pairs.

25. The SIMD processor according to claim 19, wherein:

the operation type specified by the operation code is one of multiplication, sum of products, and difference of products;

the instruction includes a third operand specifying a third data for storing operation results; and said execution unit is operable to store, into the third data, two of four results obtained by performing the operation on each of the four data pairs.

* * * * *